United States Patent [19]

Dean, Jr. et al.

[11] 4,123,795
[45] Oct. 31, 1978

[54] CONTROL SYSTEM FOR A STORED PROGRAM MULTIPROCESSOR COMPUTER

[75] Inventors: Lura C. Dean, Jr.; Gary T. Boswell, both of Austin; Wayne Winkelman, Leander; Frank S. Little, Austin, all of Tex.

[73] Assignee: Texas Instruments Incorporated, Dallas, Tex.

[21] Appl. No.: 435,042

[22] Filed: Jan. 21, 1974

Related U.S. Application Data

[63] Continuation of Ser. No. 178,357, Sep. 7, 1971.

[51] Int. Cl.² .............................................. G06F 9/06
[52] U.S. Cl. .................................................... 364/200
[58] Field of Search .................... 340/172.5; 444/1; 364/200, 300

[56] References Cited

U.S. PATENT DOCUMENTS

| | | | |
|---|---|---|---|
| 3,480,914 | 11/1969 | Schlaeppi | 340/172.5 |
| 3,530,438 | 9/1970 | Mellen et al. | 364/200 |
| 3,564,504 | 2/1971 | Morenoff et al. | 364/200 |
| 3,810,105 | 5/1974 | England | 364/200 |

OTHER PUBLICATIONS

Mueller, J. H., "Aspects of the Gemini Real-Time Operating System," IBM Systems Journal, vol. 6, issue 3, 1967, pp. 150-162.

*Primary Examiner*—Raulfe B. Zache
*Attorney, Agent, or Firm*—Rene' E. Grossman; James T. Comfort; Thomas G. Devine

[57] ABSTRACT

A stored program electronic digital computer has a control system for the computer. There are a plurality of processes in the computer. There are four stored program controllers in the computer which operate in different processors within the computer system. There is a master controller, a command controller, a task controller, and a disc I/O controller. These four controllers operate in a hierarchy of control. Each controller exercises control over a given level of work in the computing system.

23 Claims, 267 Drawing Figures

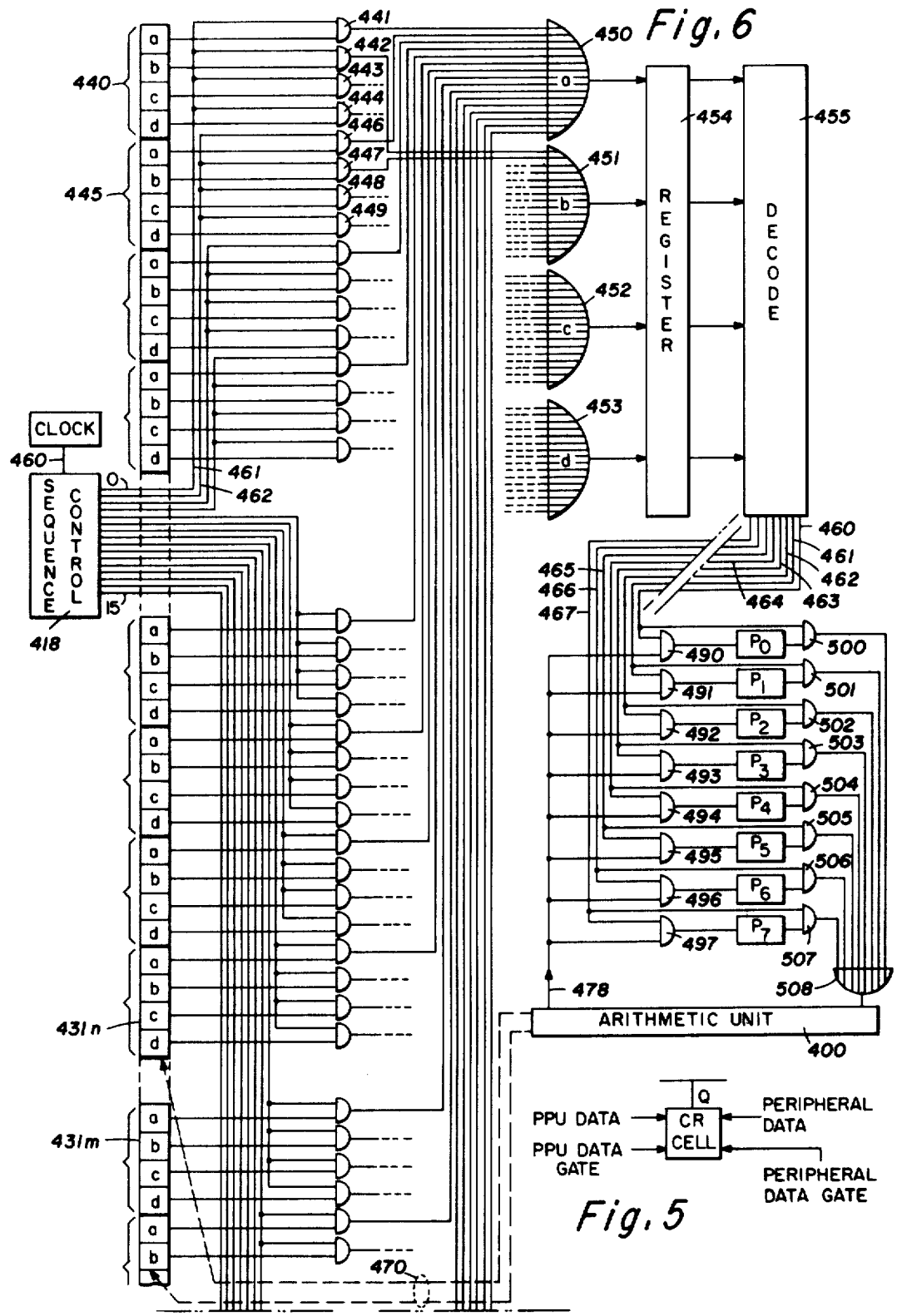

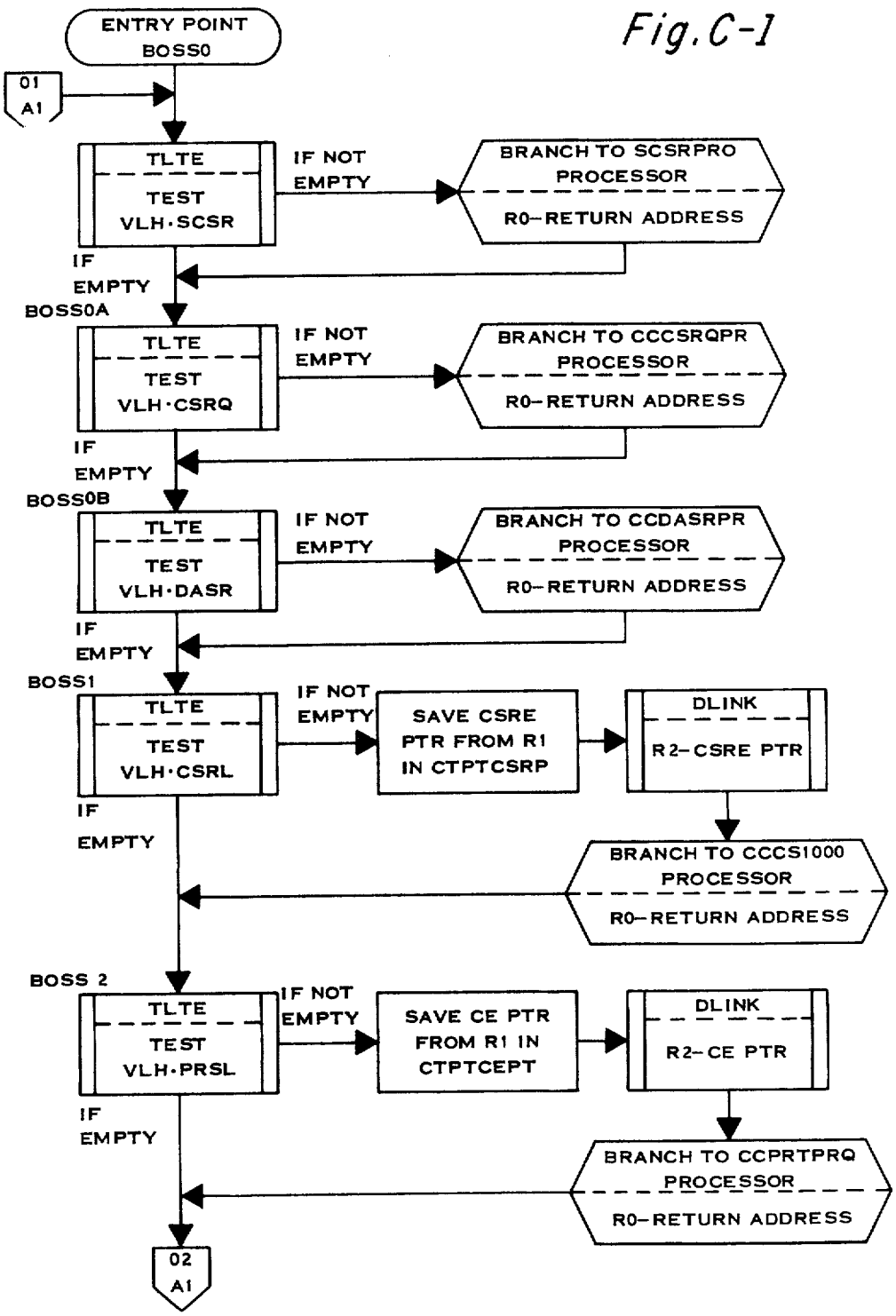
Fig. C-1

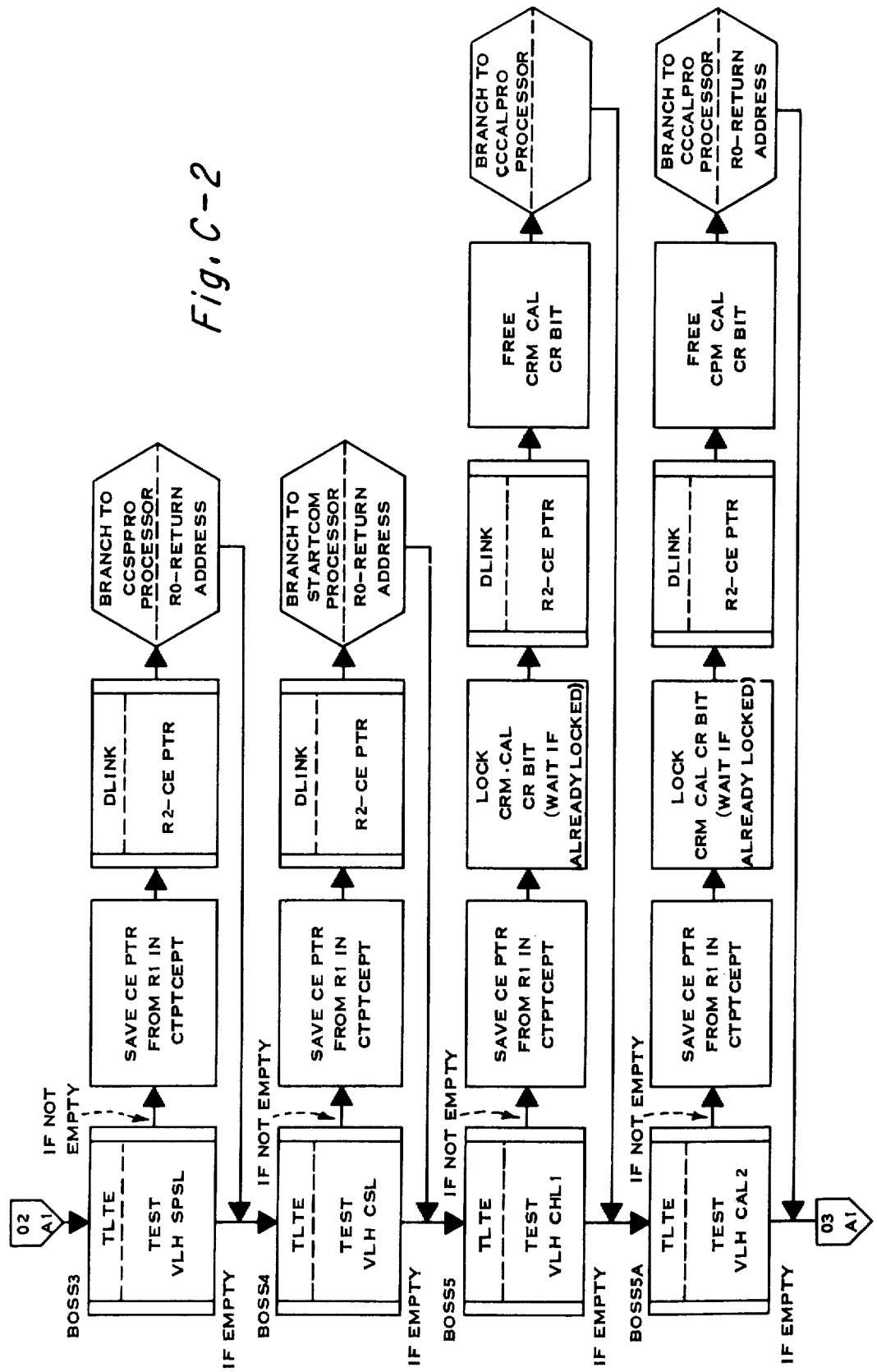
Fig. C-2

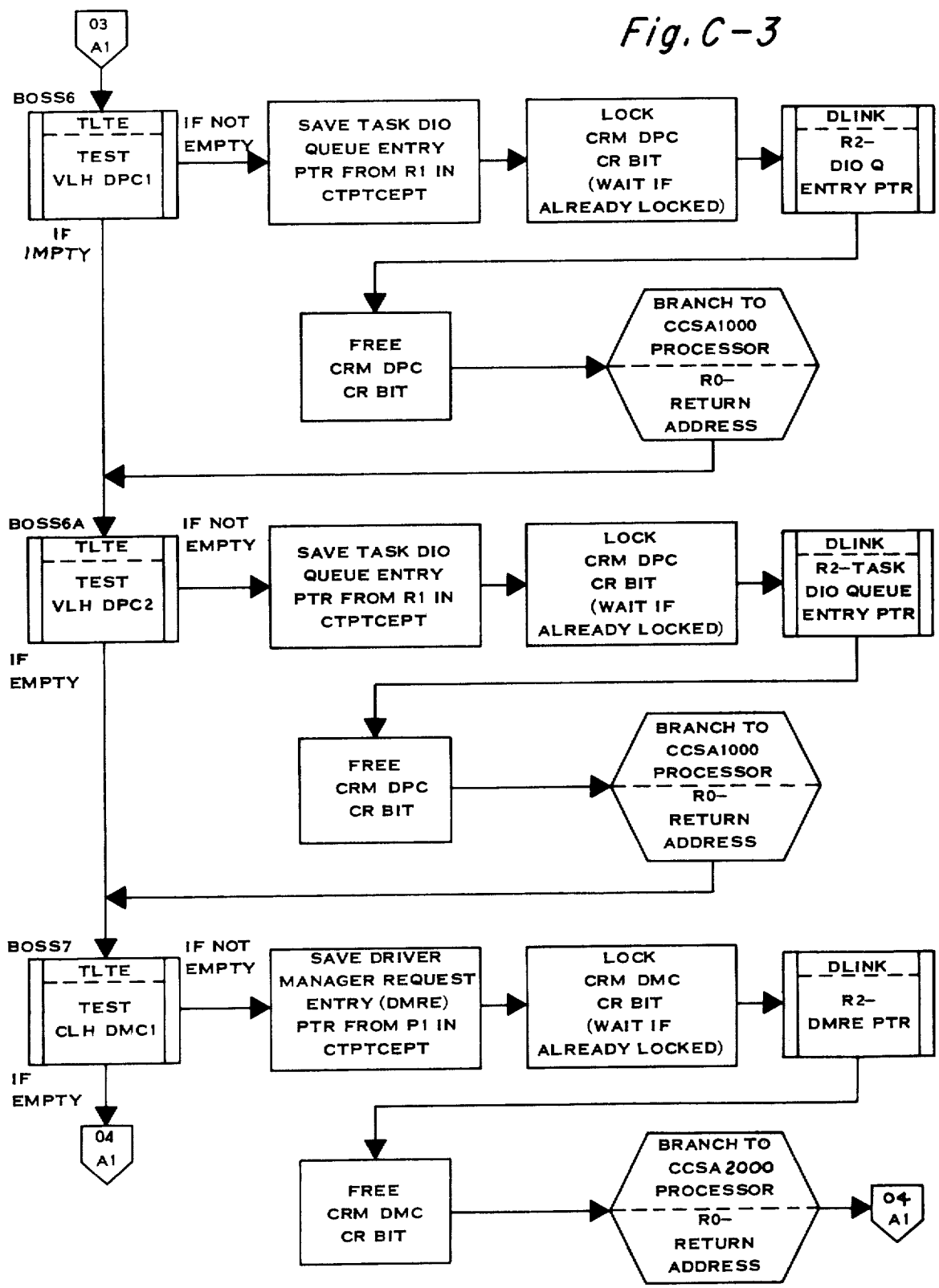
Fig. C-3

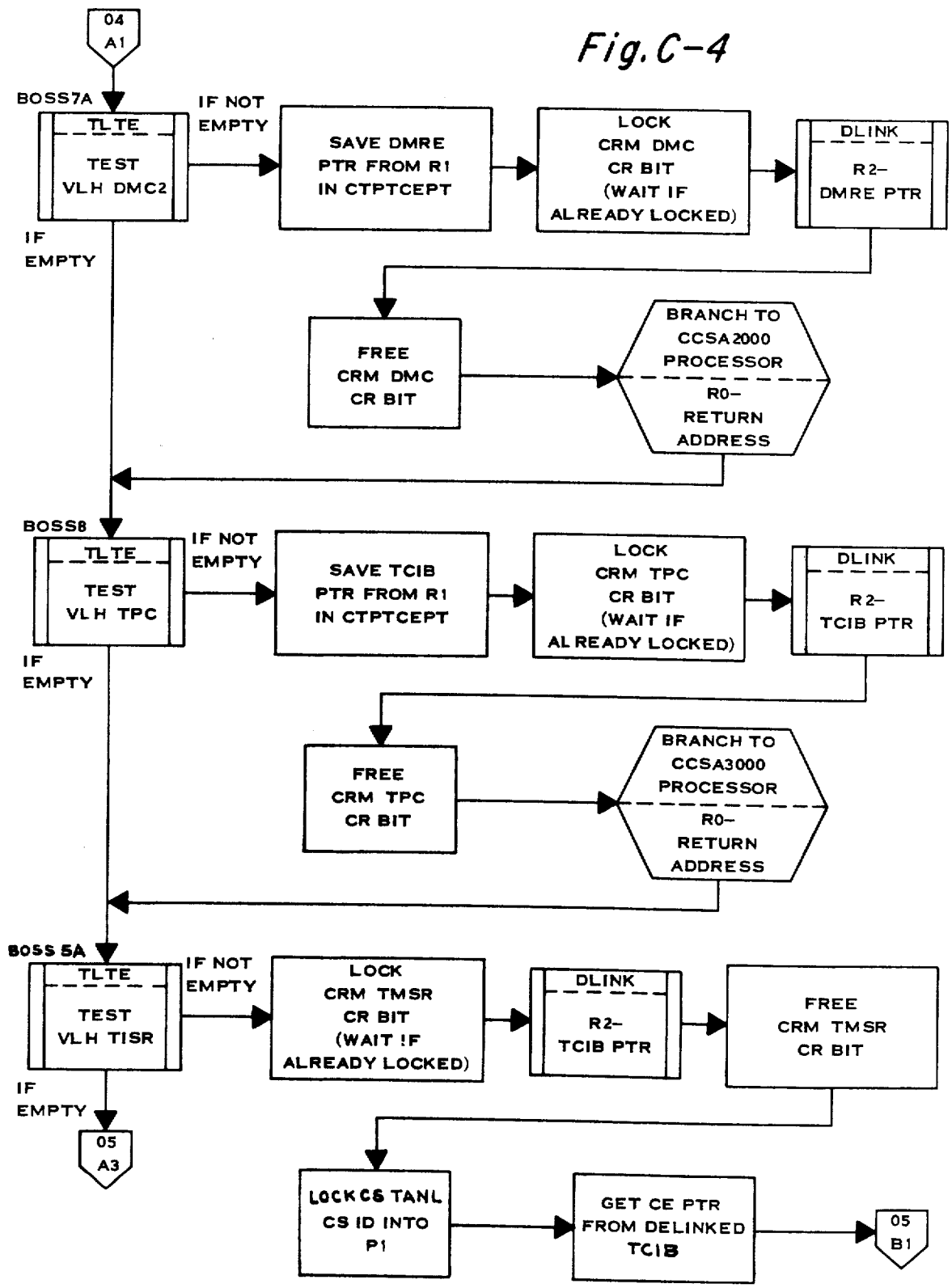
Fig. C-4

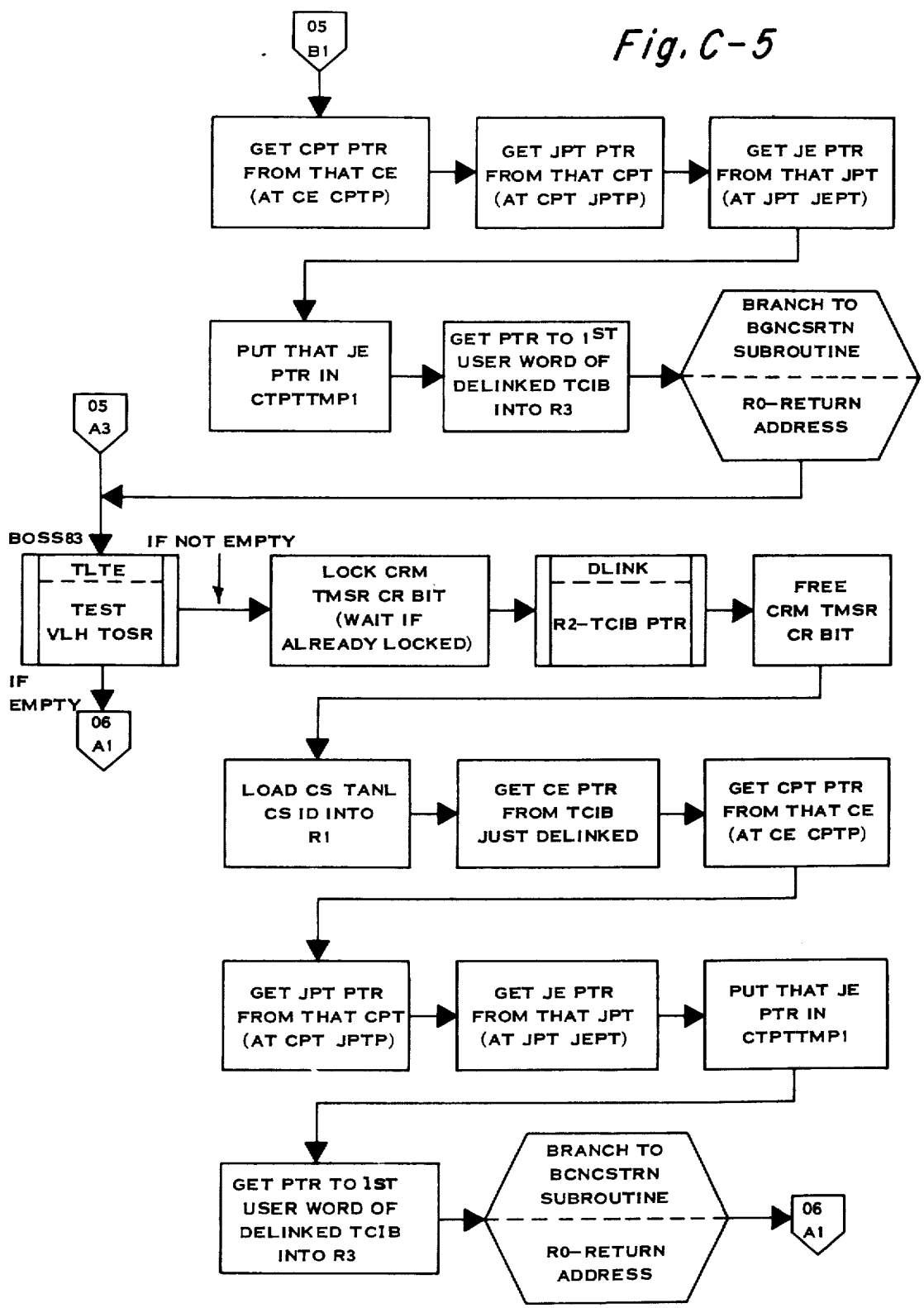
Fig. C-5

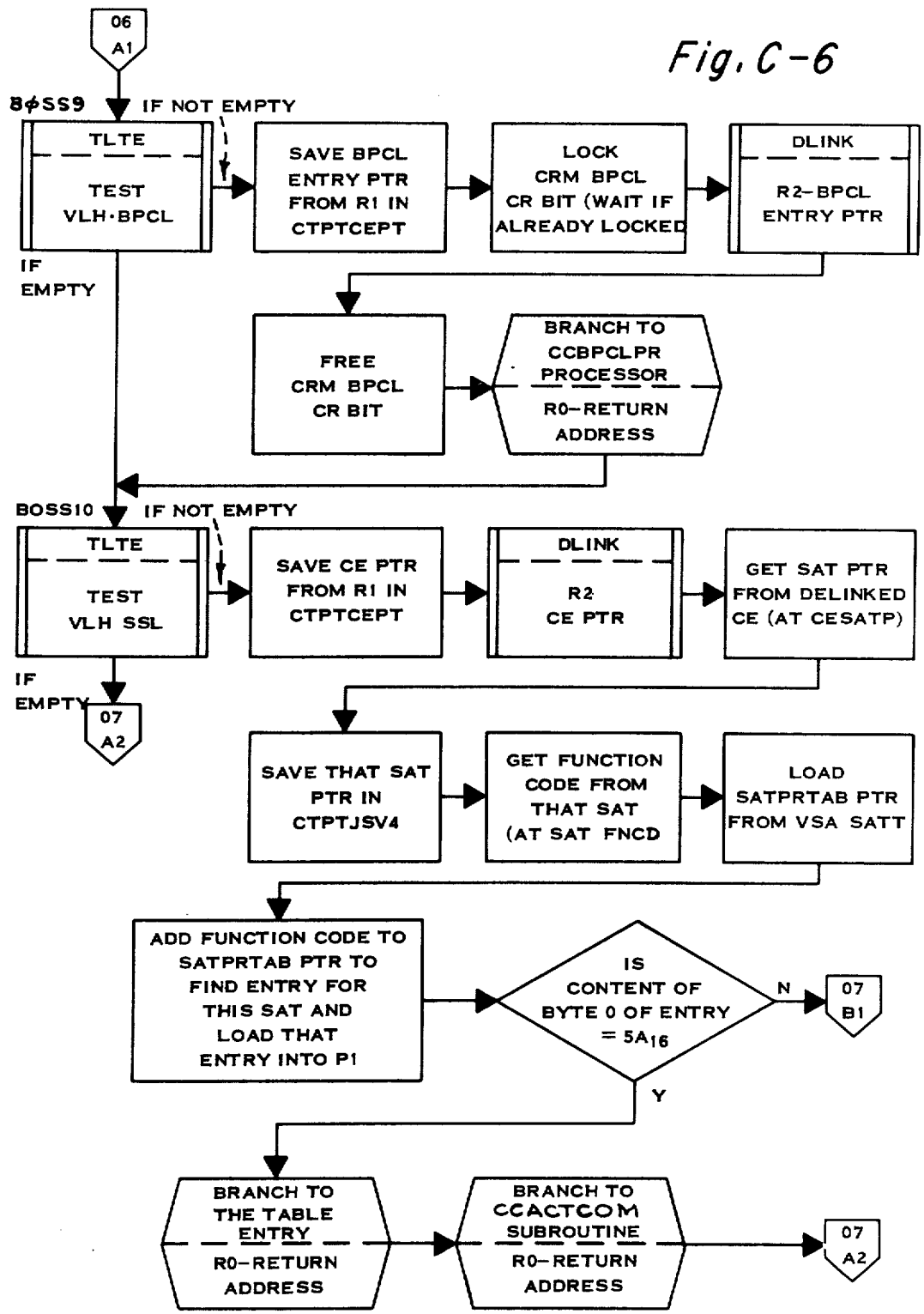
Fig. C-6

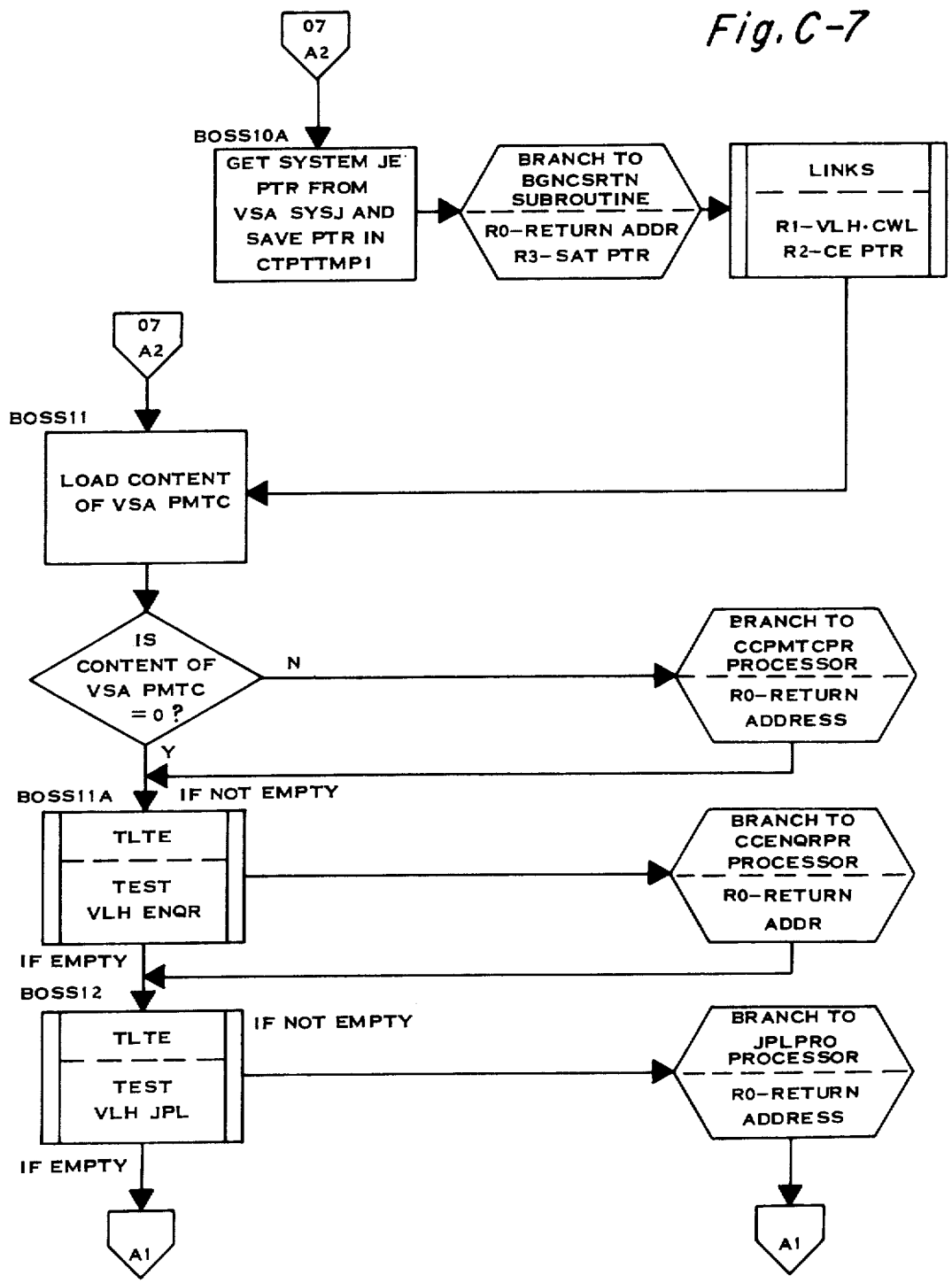
Fig. C-7

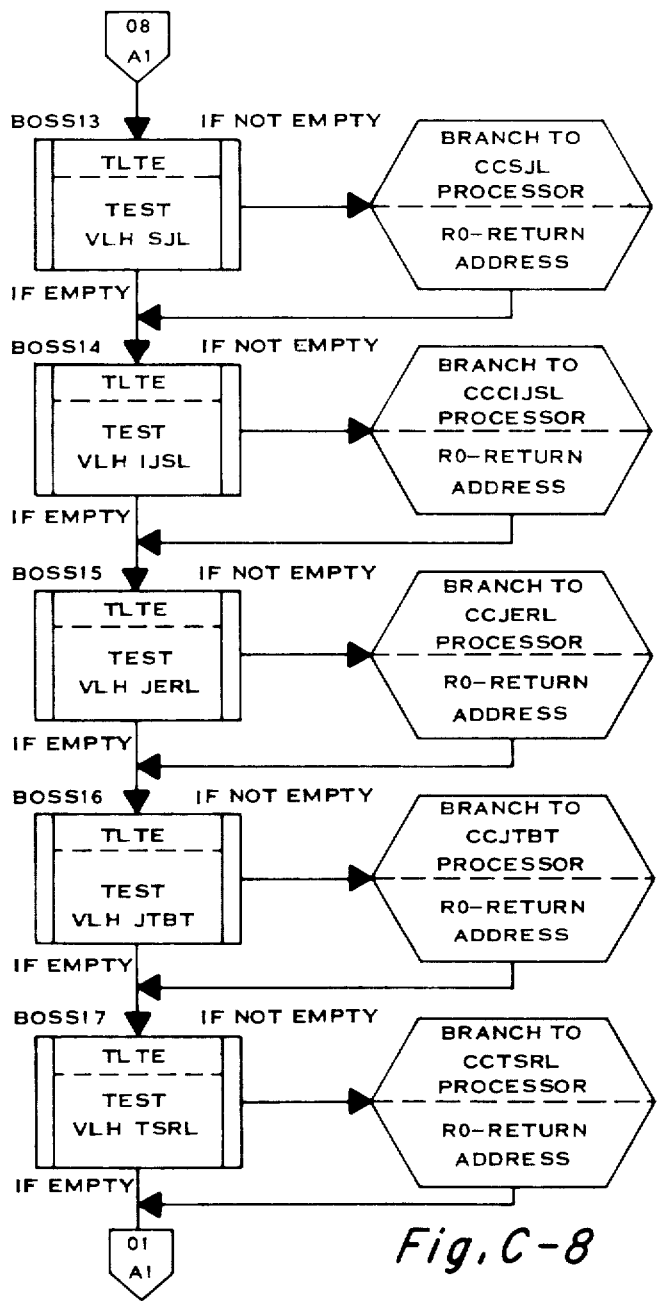
Fig. C-8
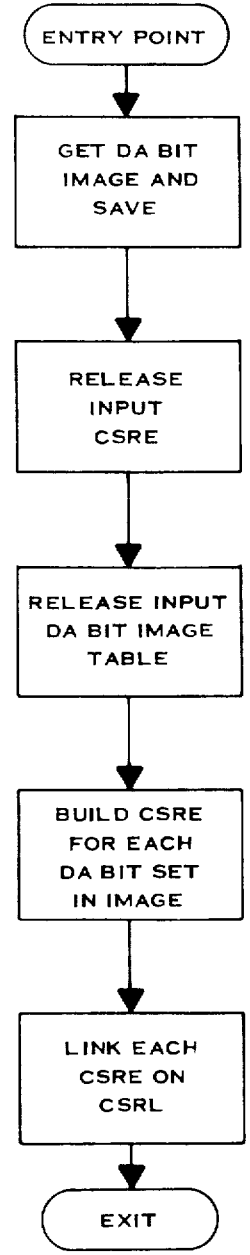
Fig. C-9

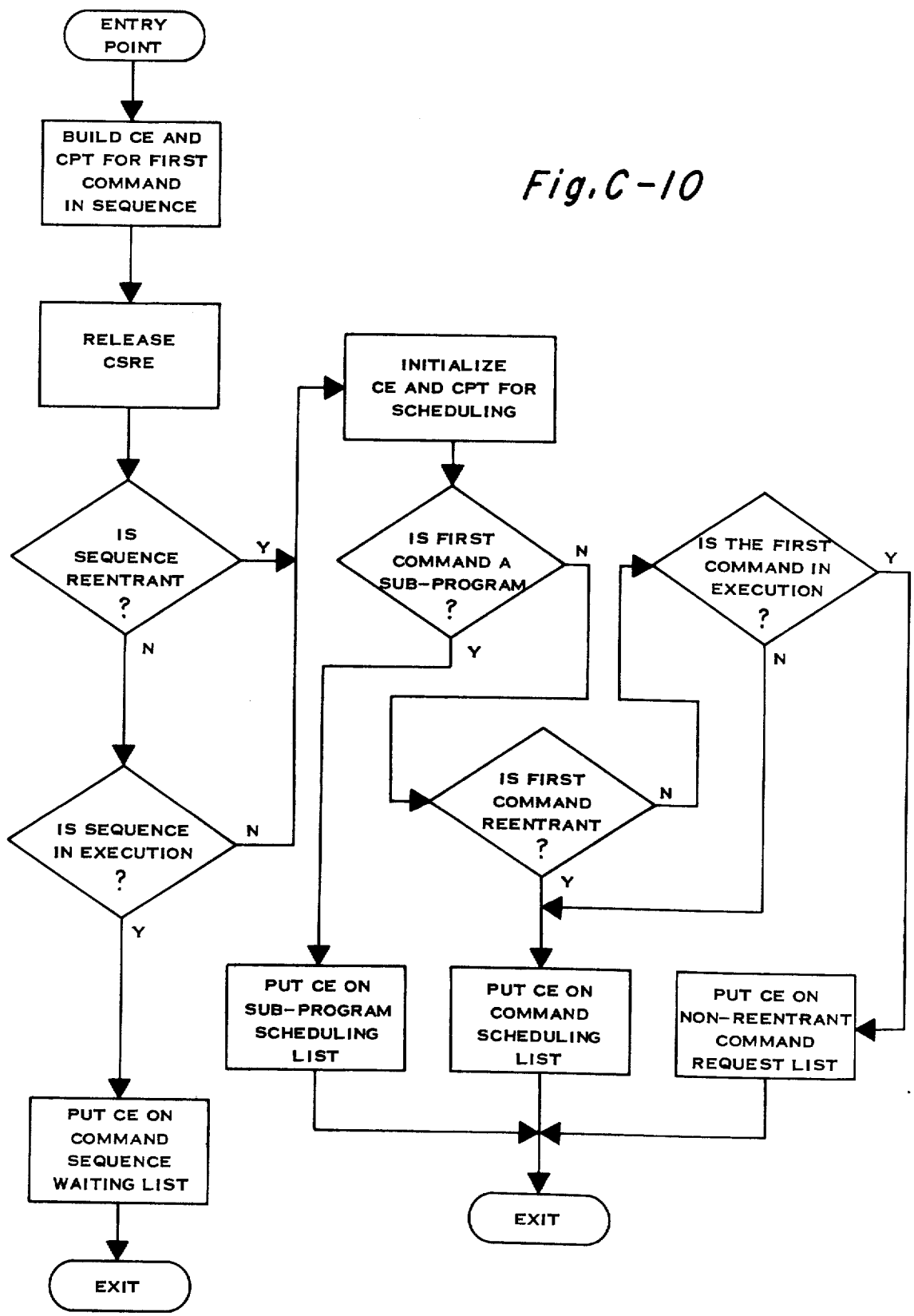
Fig. C-10

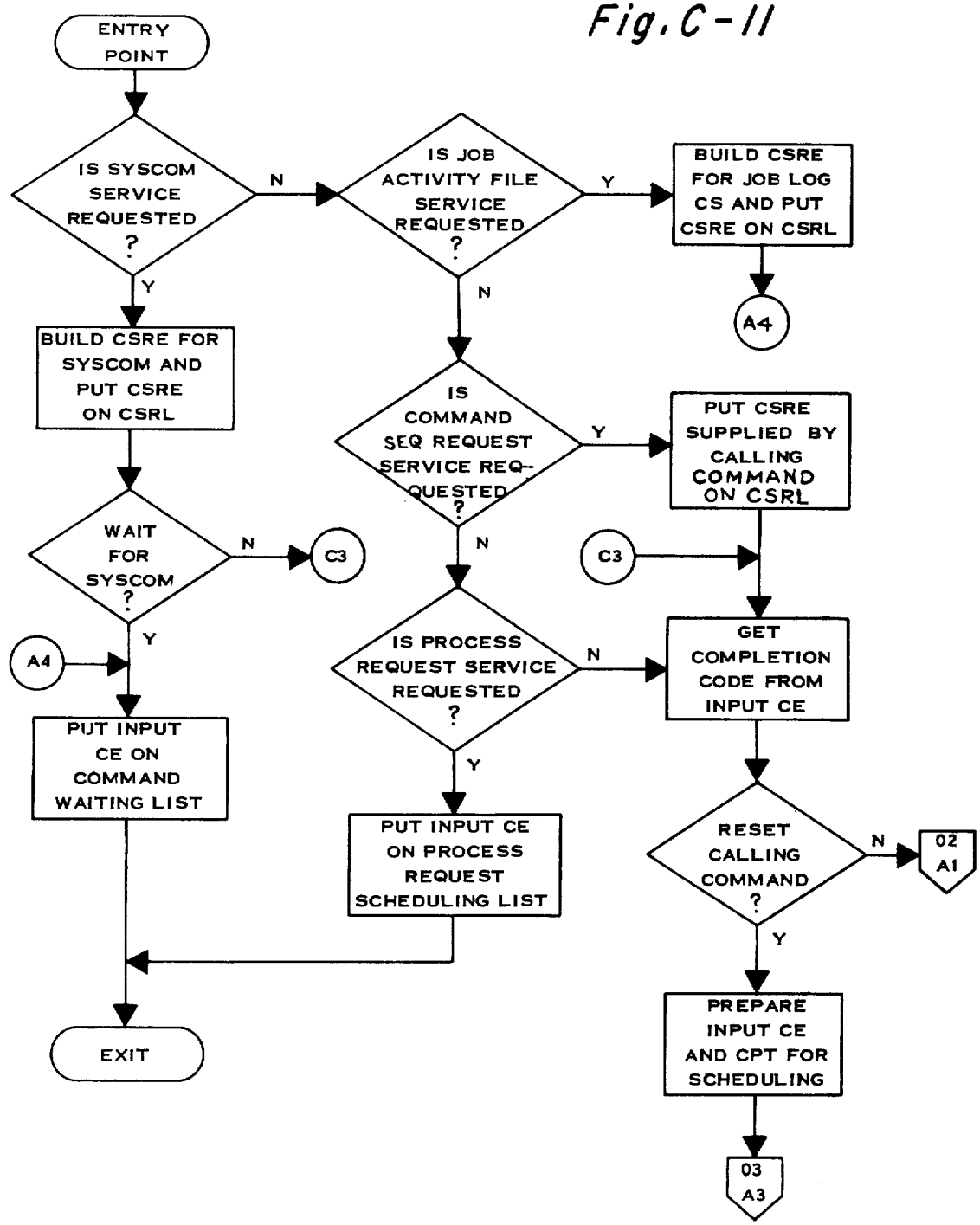
Fig. C-11

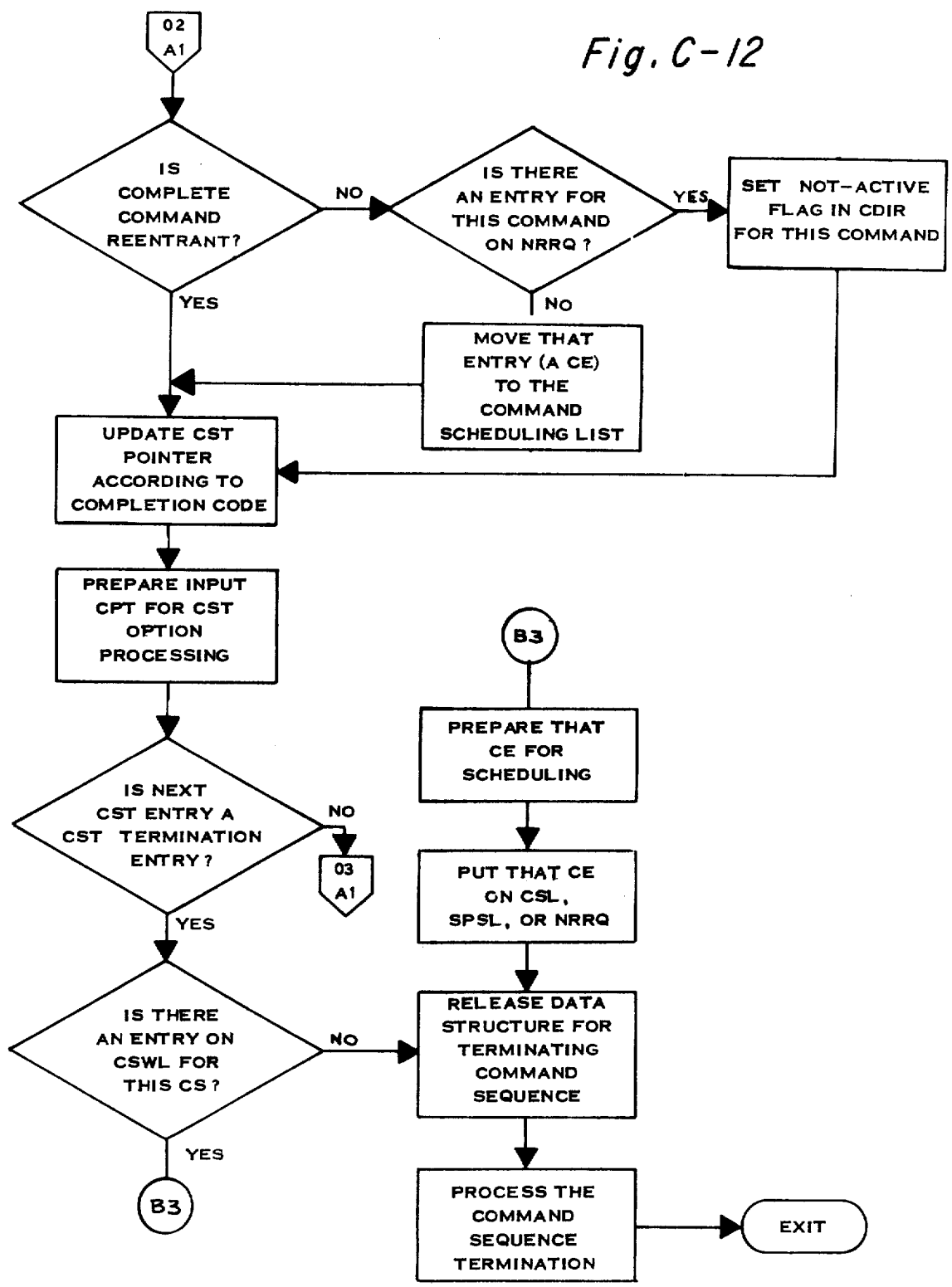
Fig. C-12

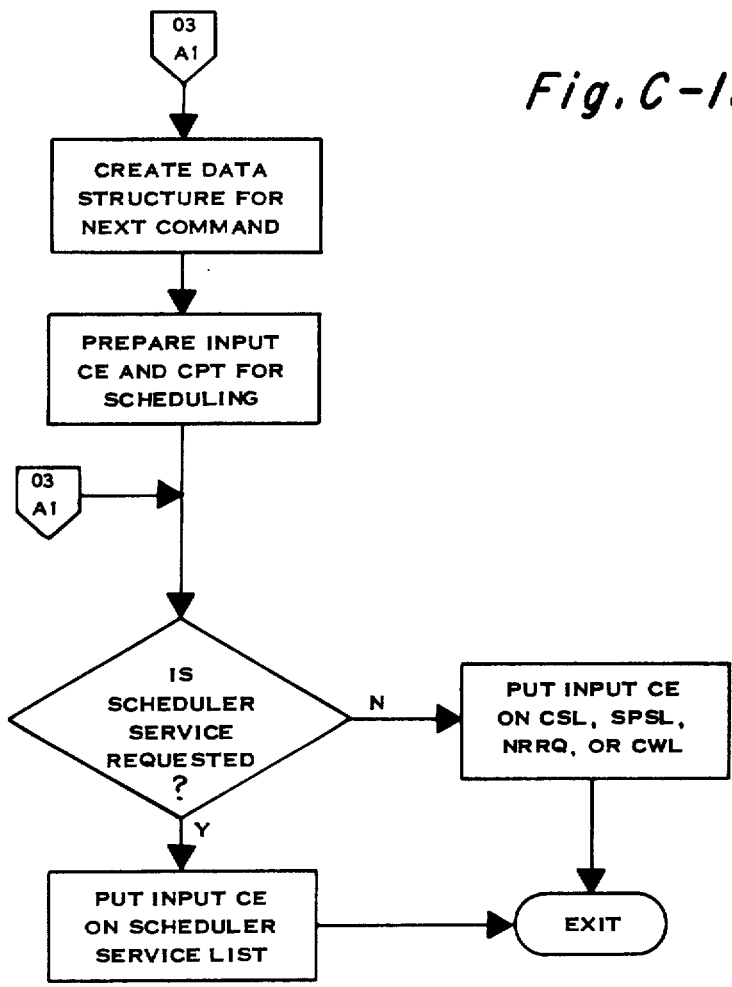
Fig. C-13

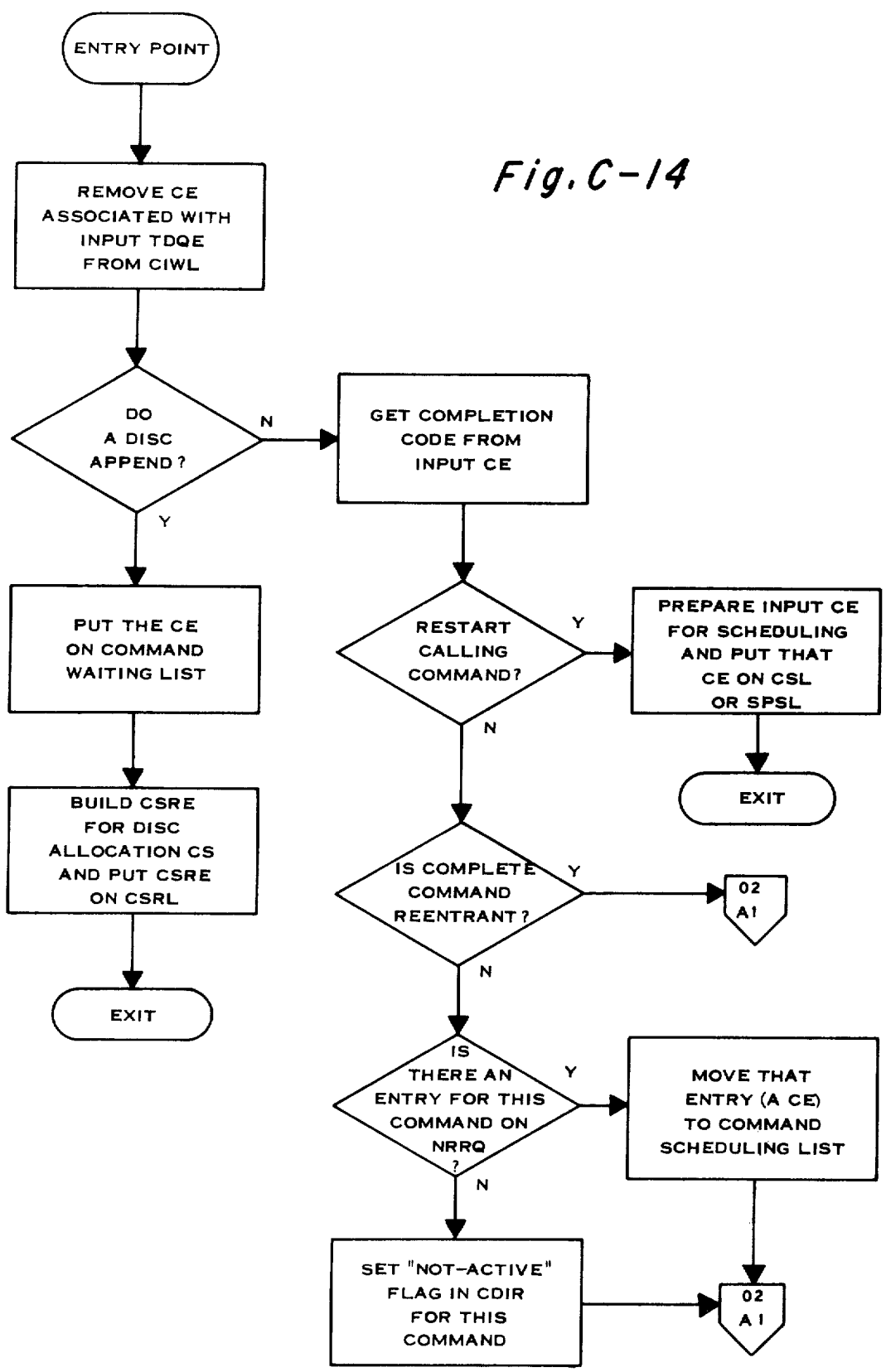
Fig. C-14

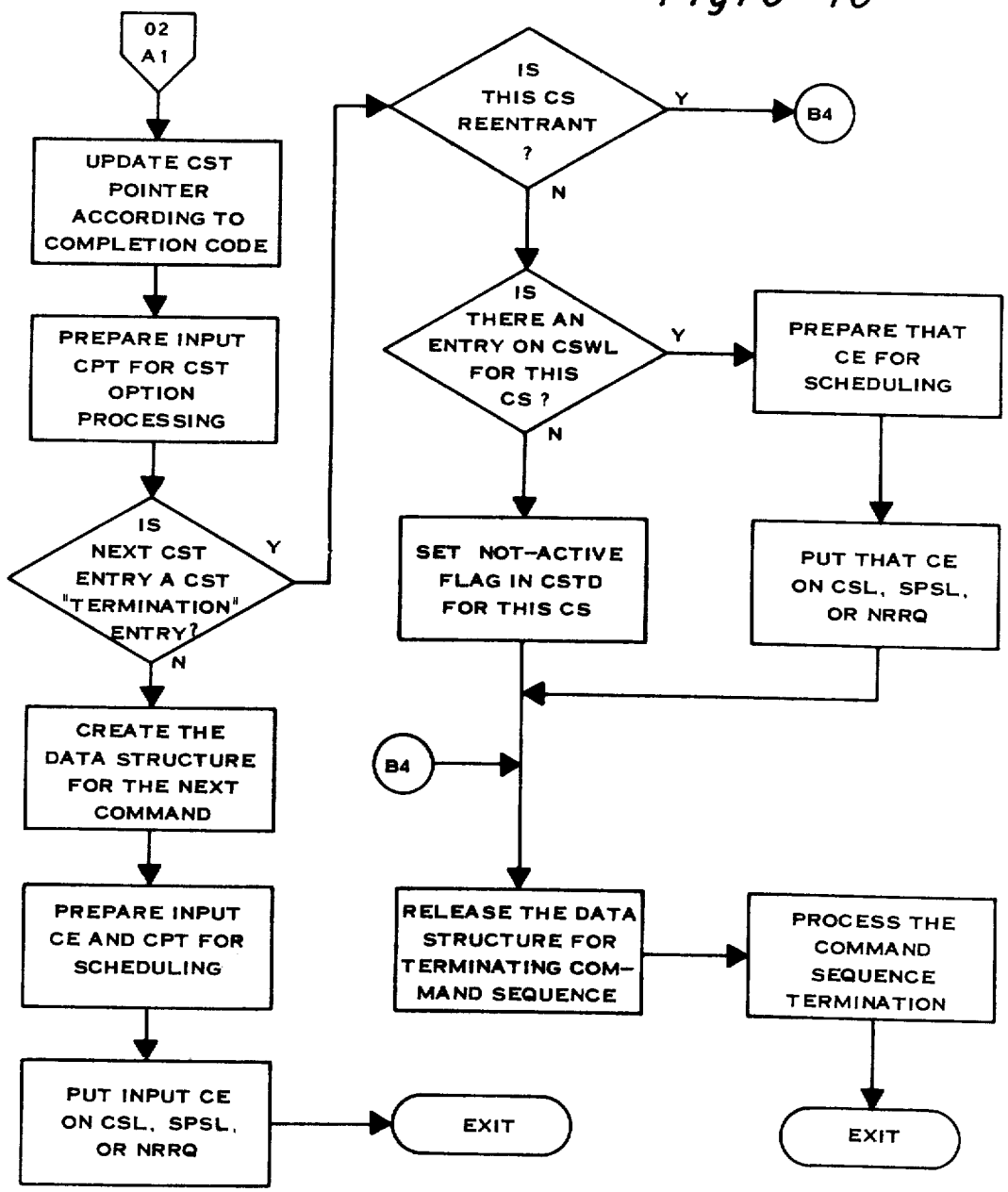
Fig. C-15

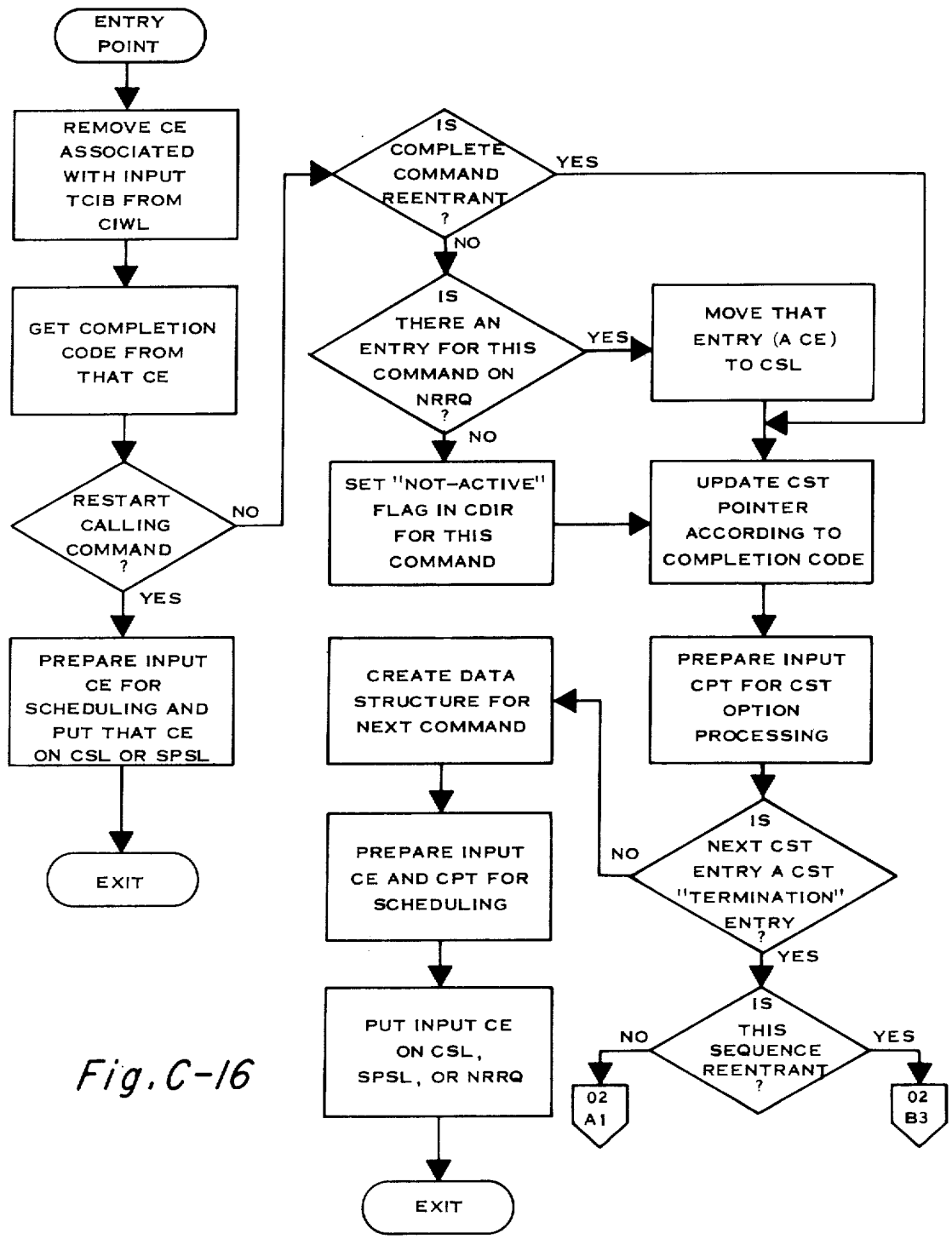
Fig. C-16

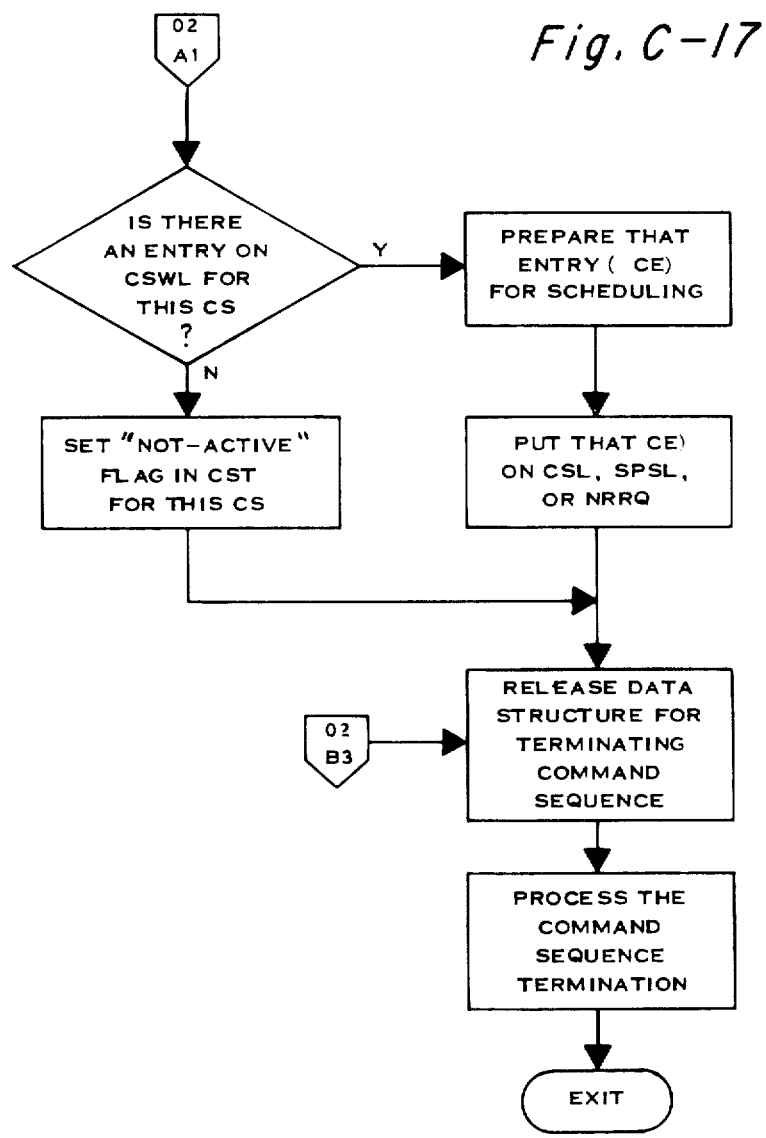
Fig. C-17

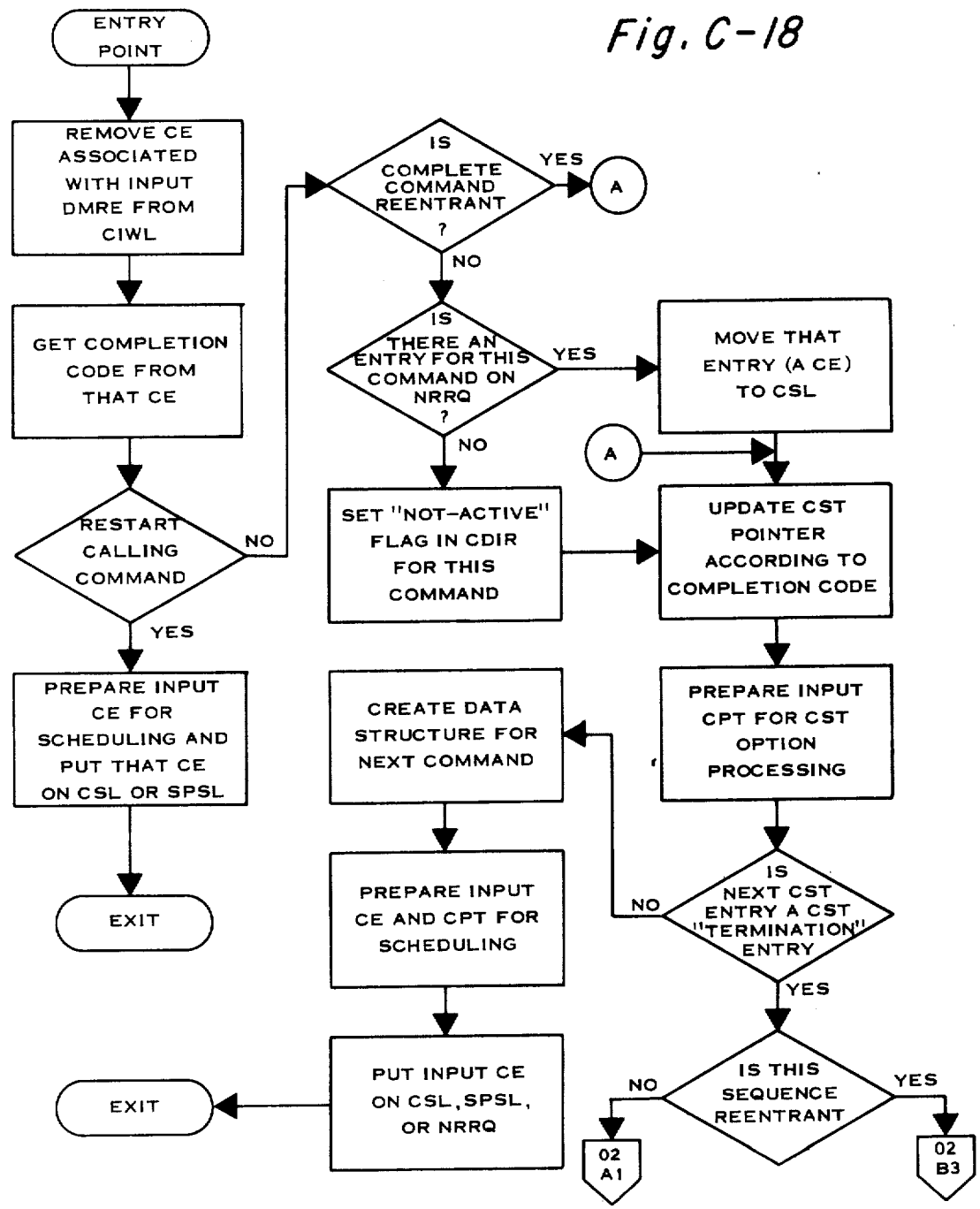
Fig. C-18

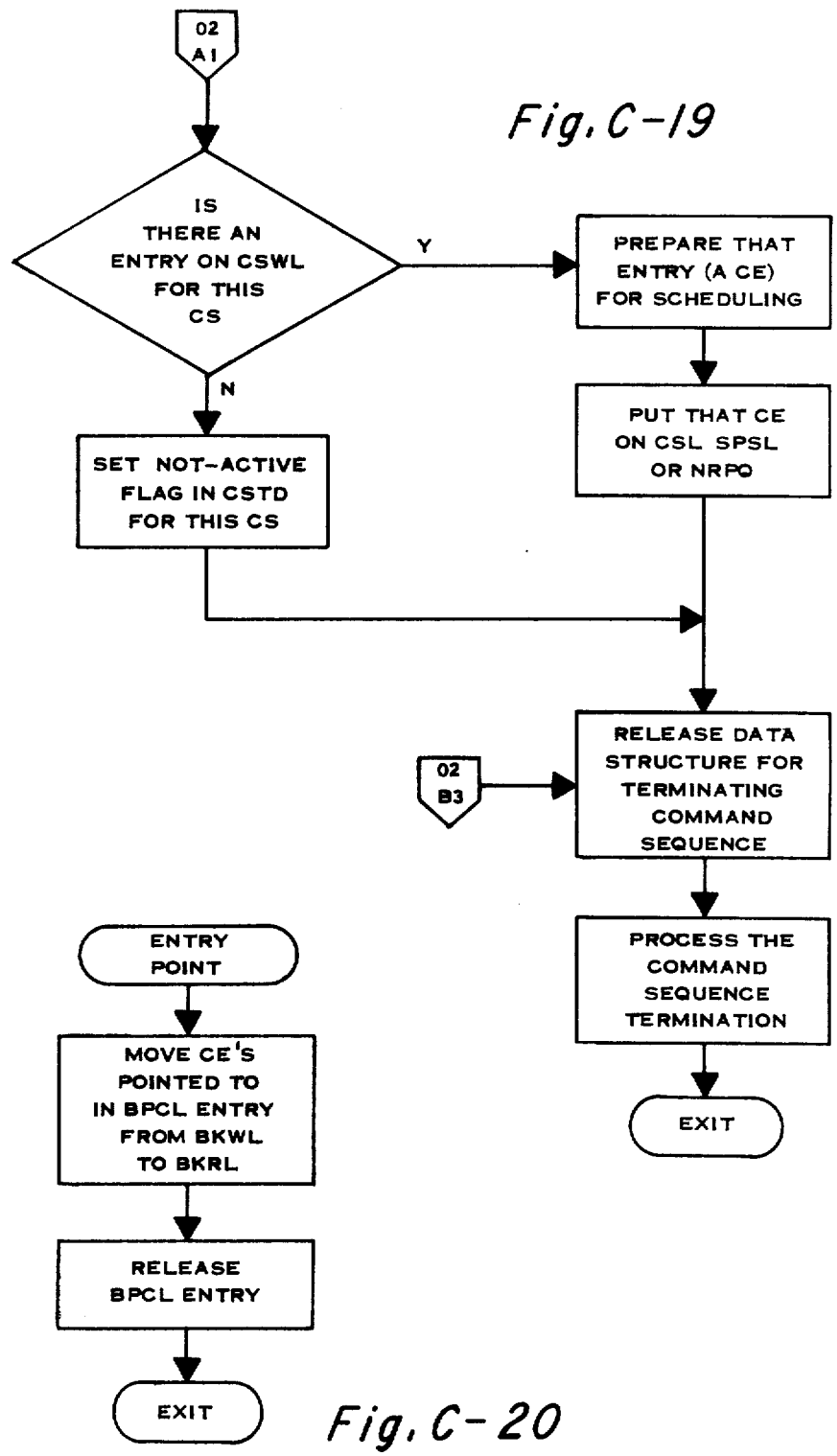

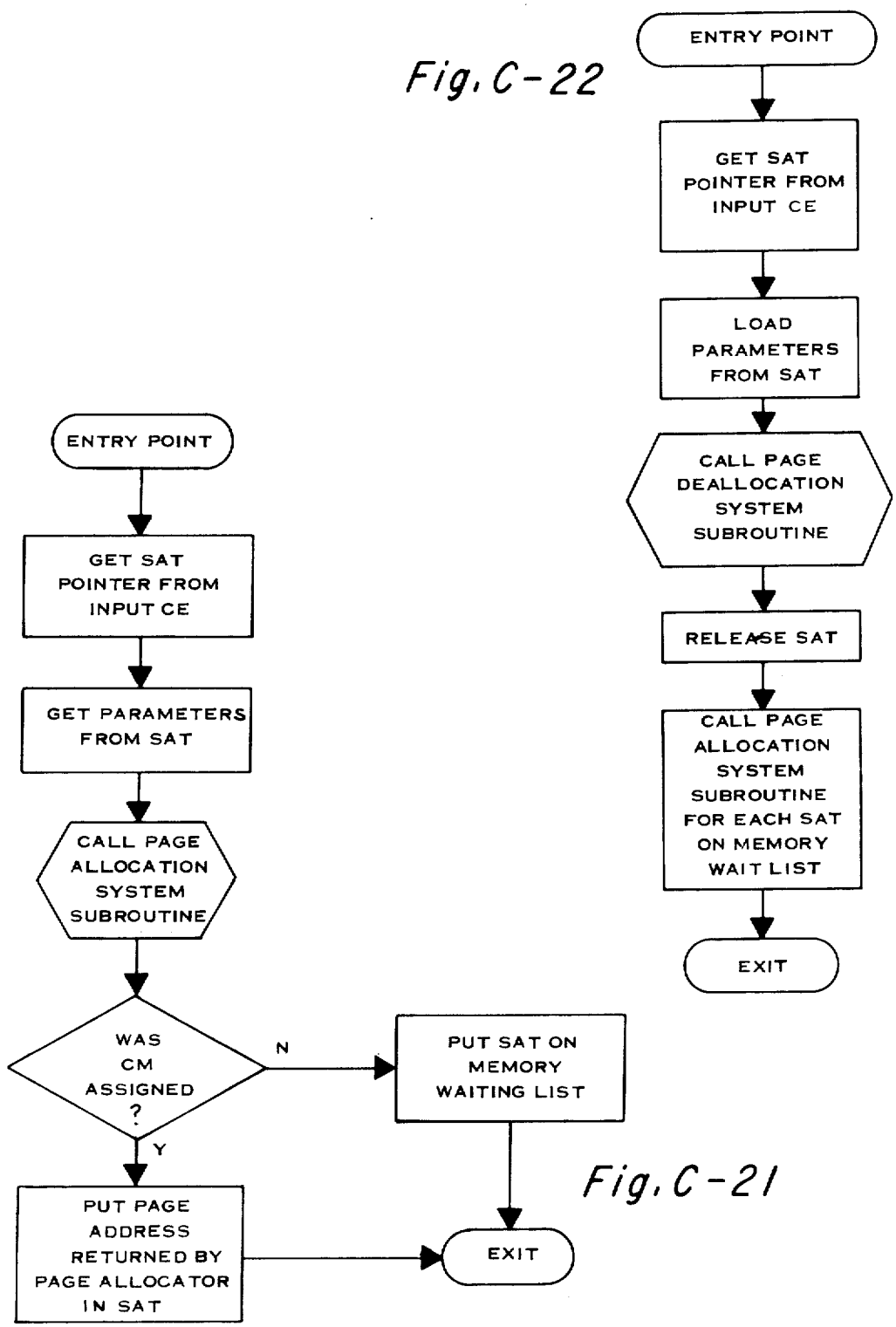
Fig. C-22
Fig. C-21

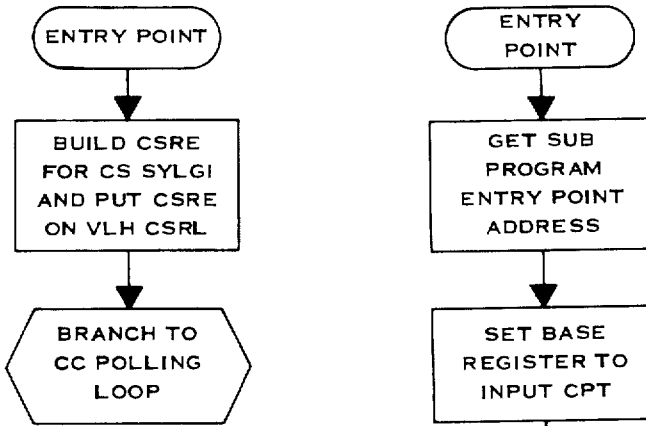
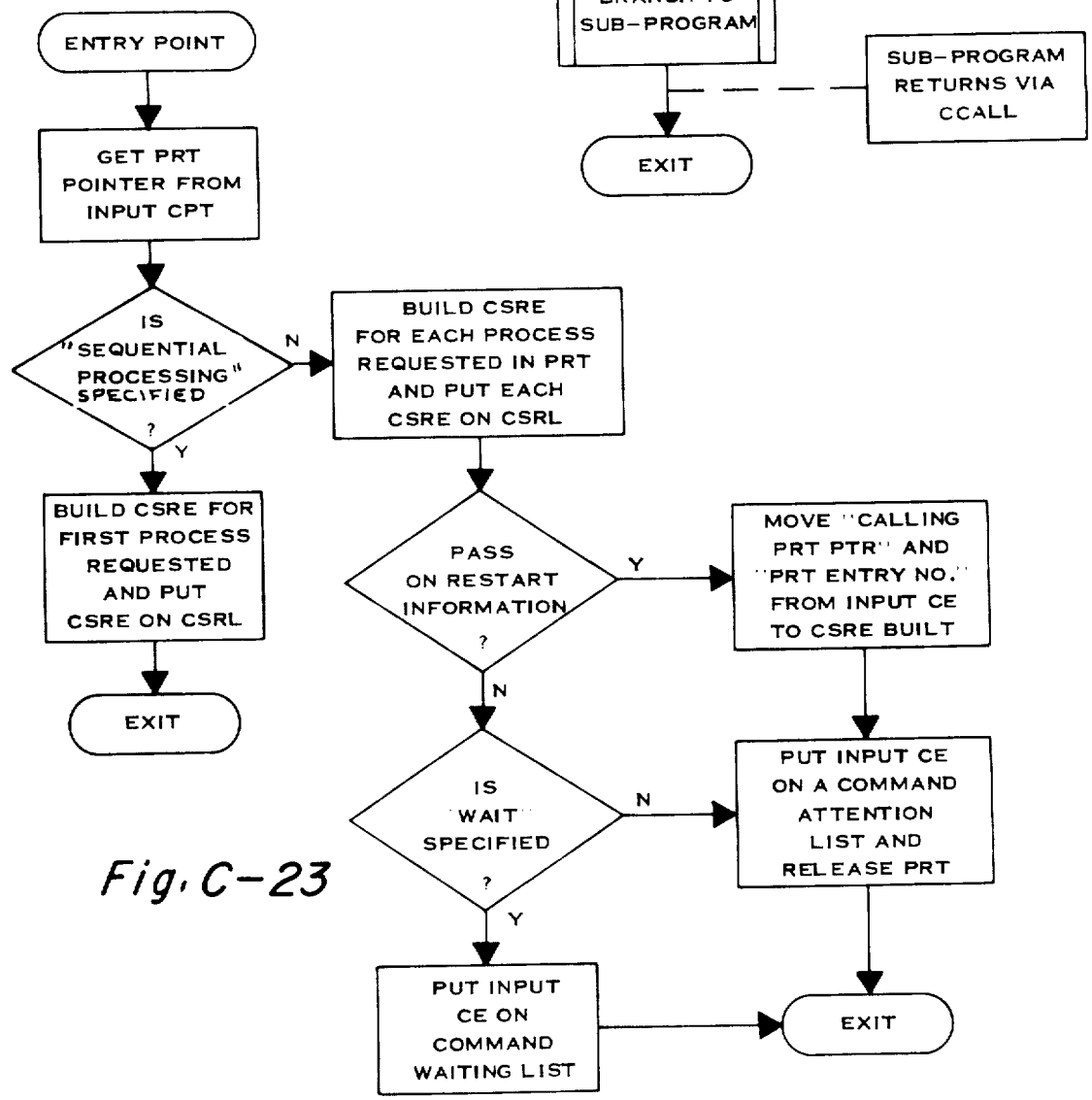

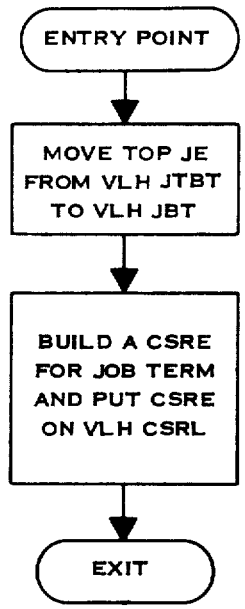
Fig. C-27
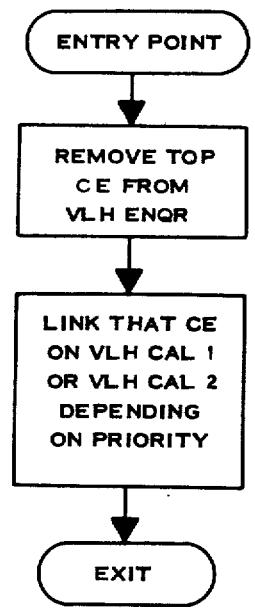
Fig. C-26
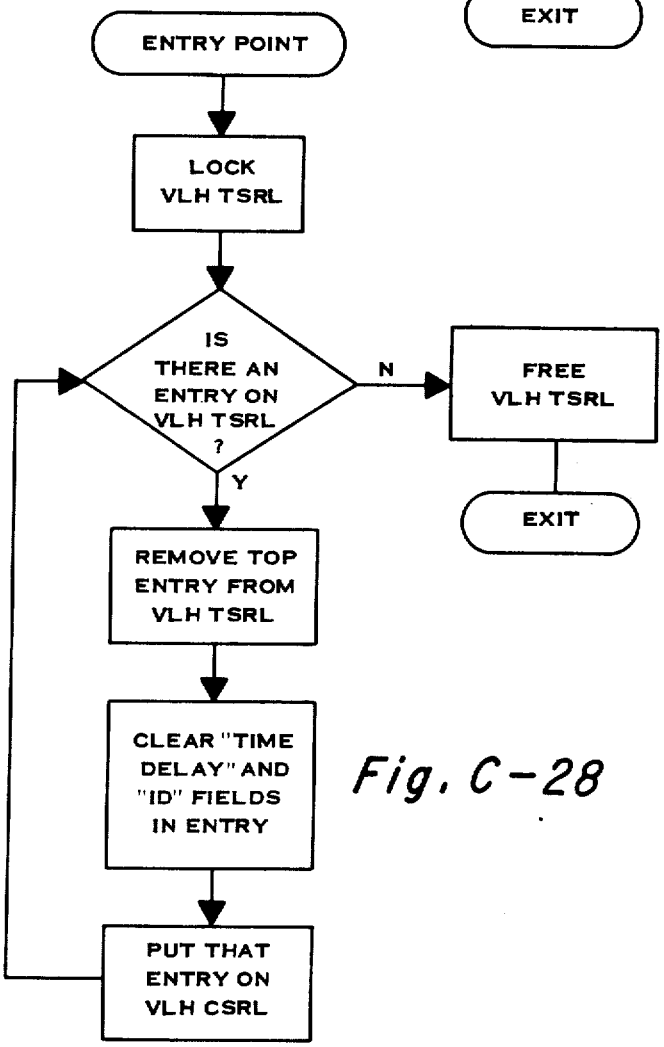
Fig. C-28

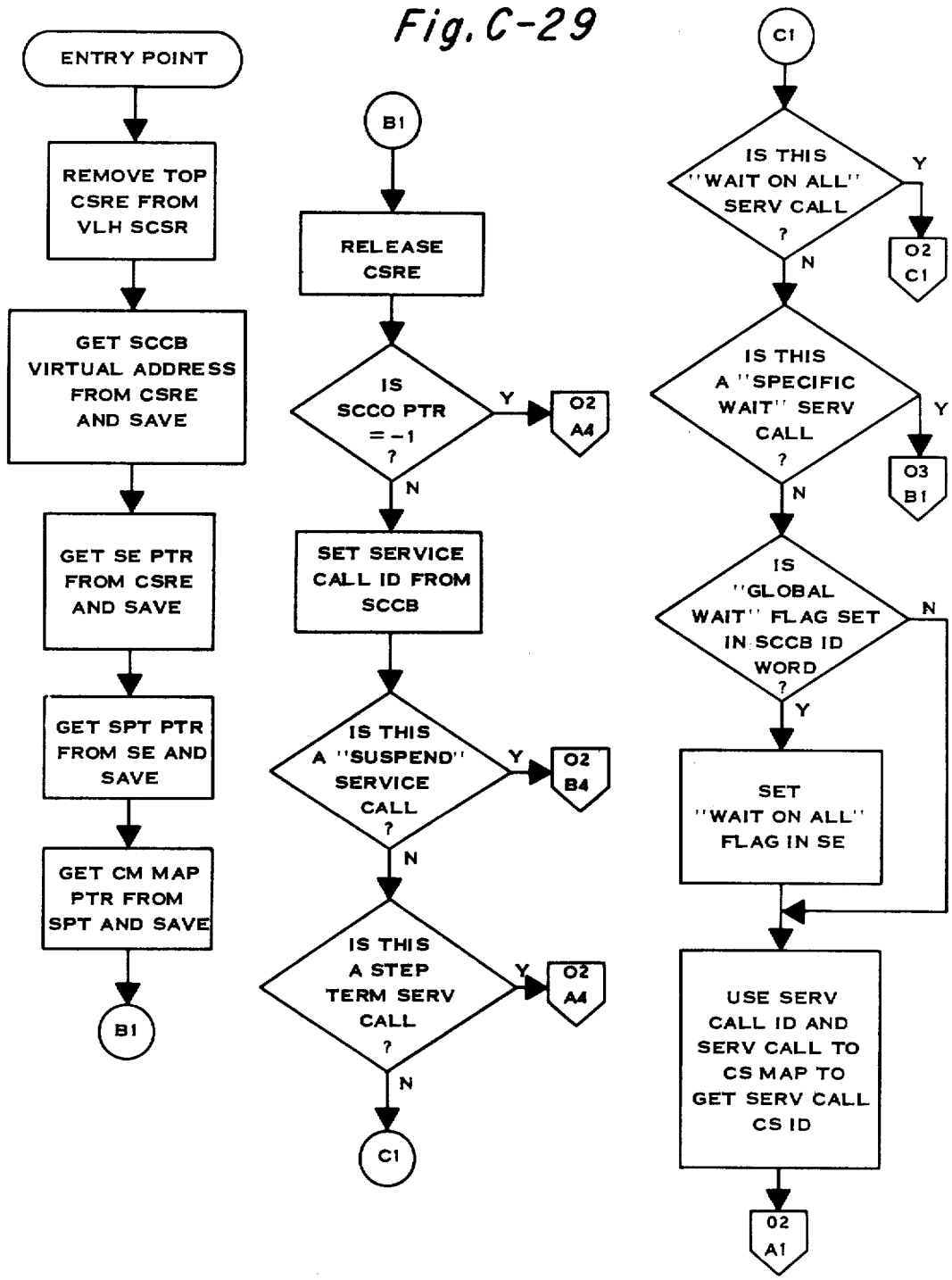
Fig. C-29

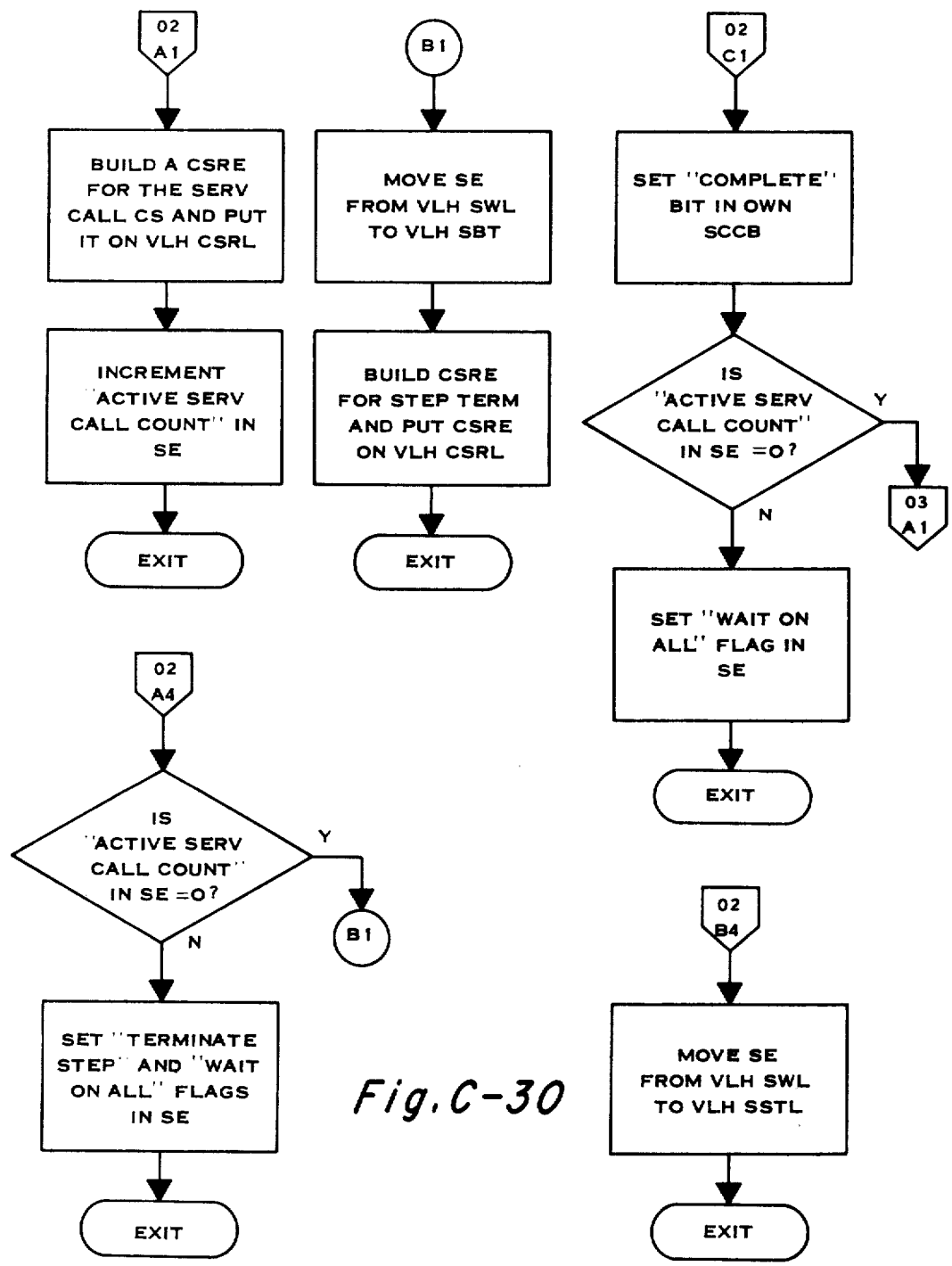
Fig. C-30

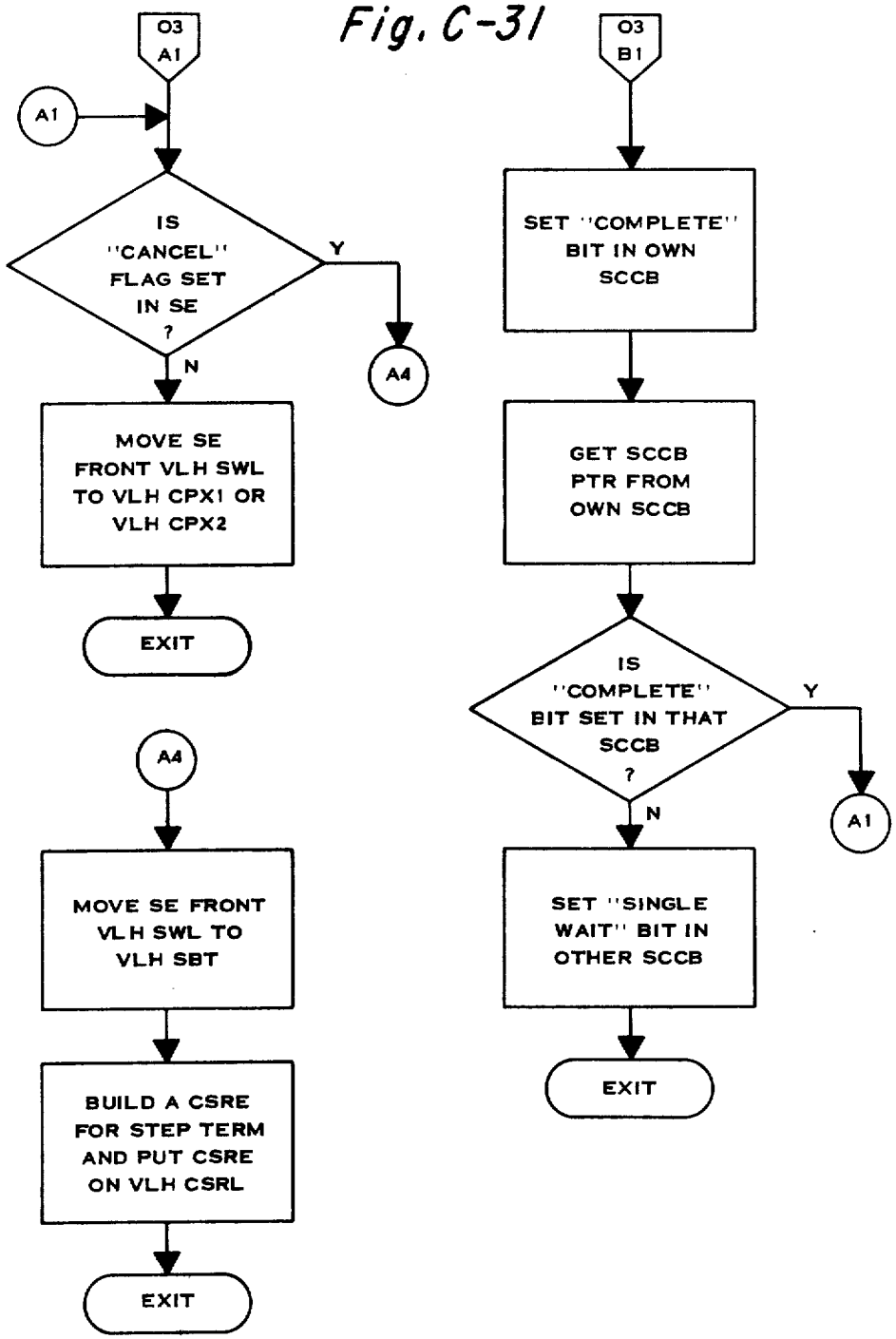
Fig. C-31

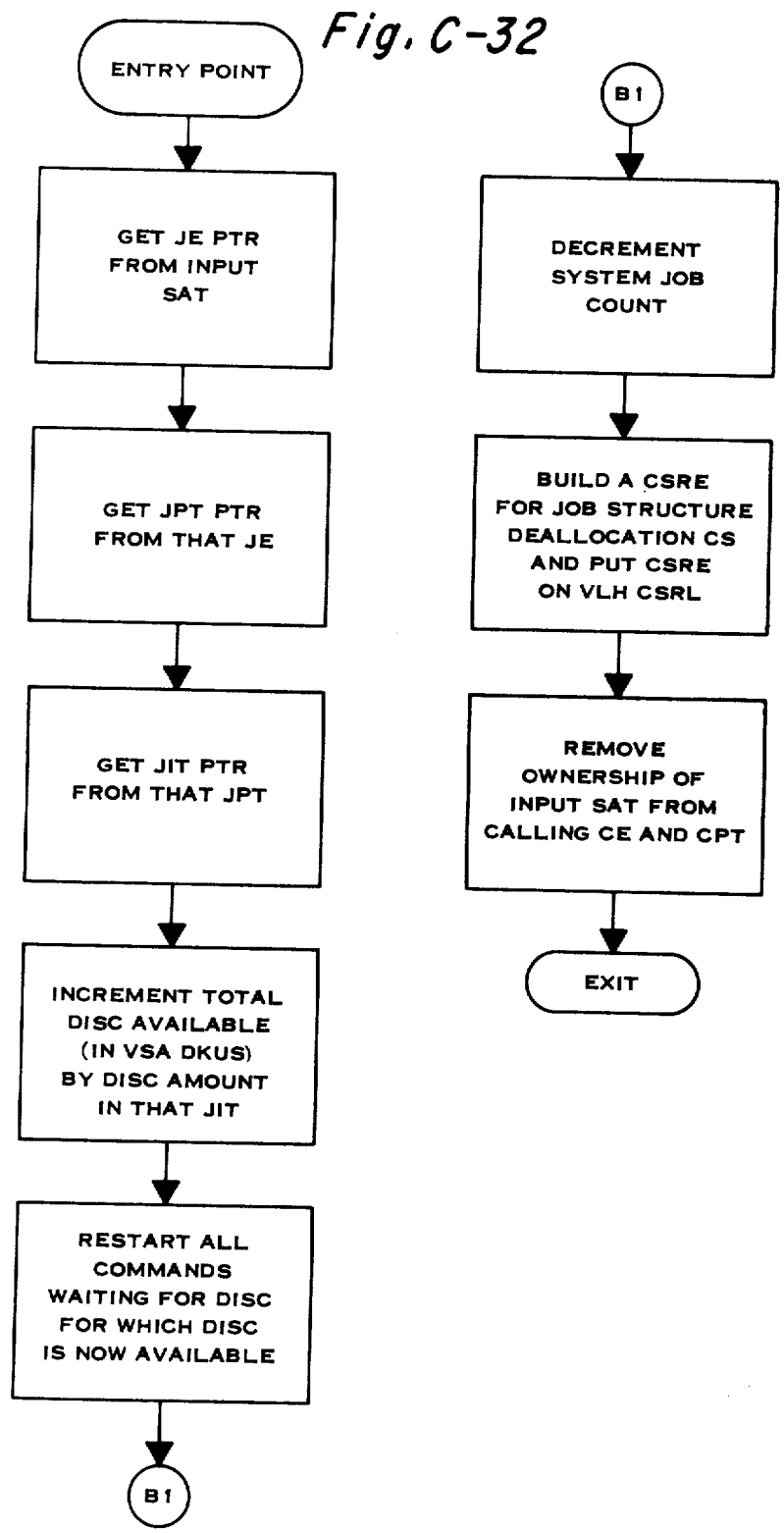
Fig. C-32

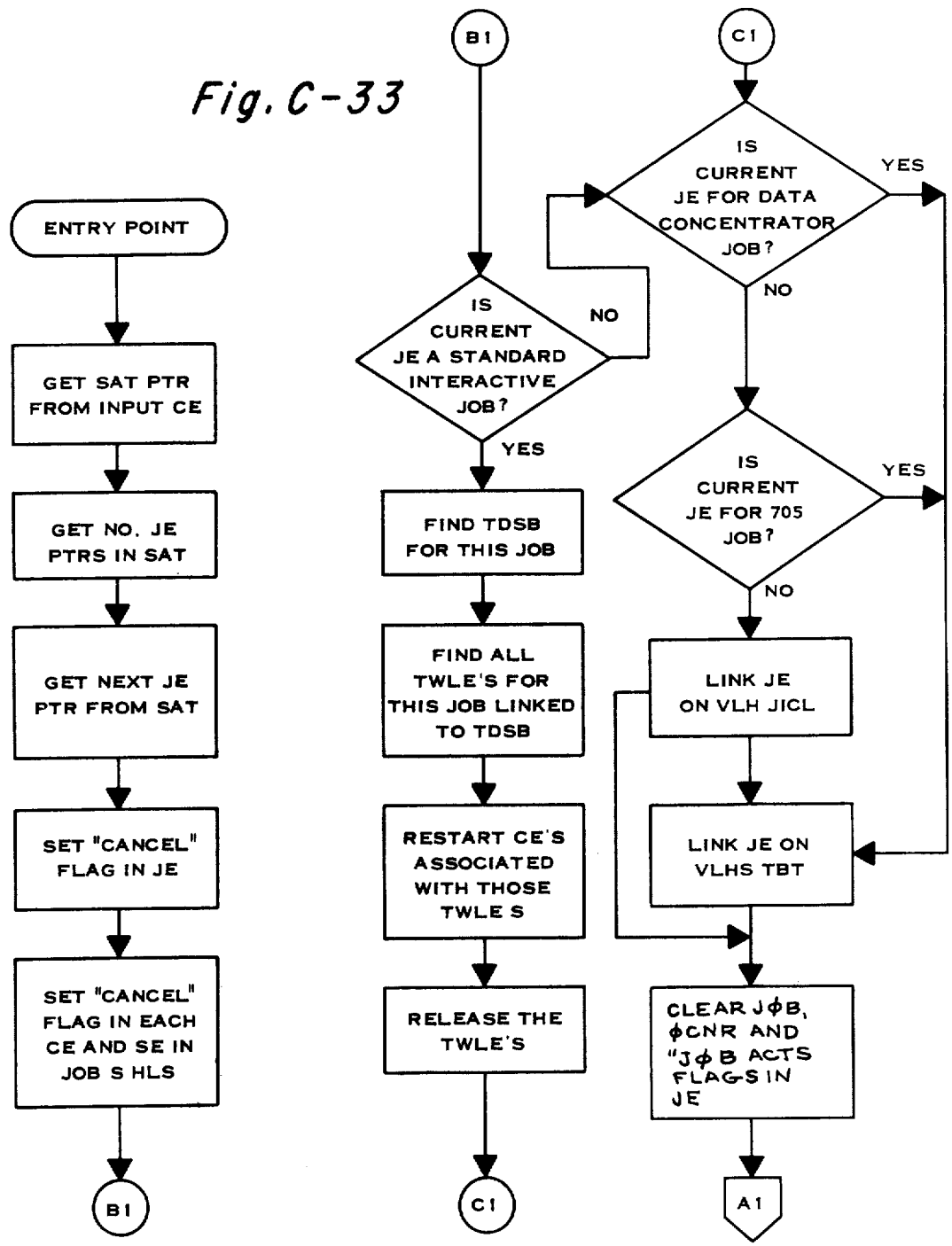
Fig. C-33

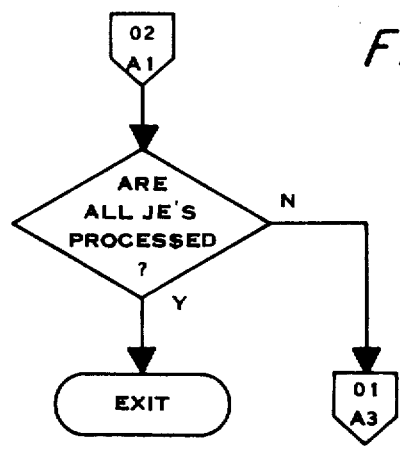
Fig. C-34
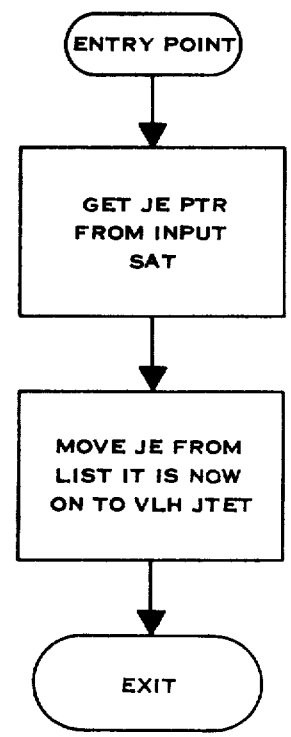
Fig. C-35

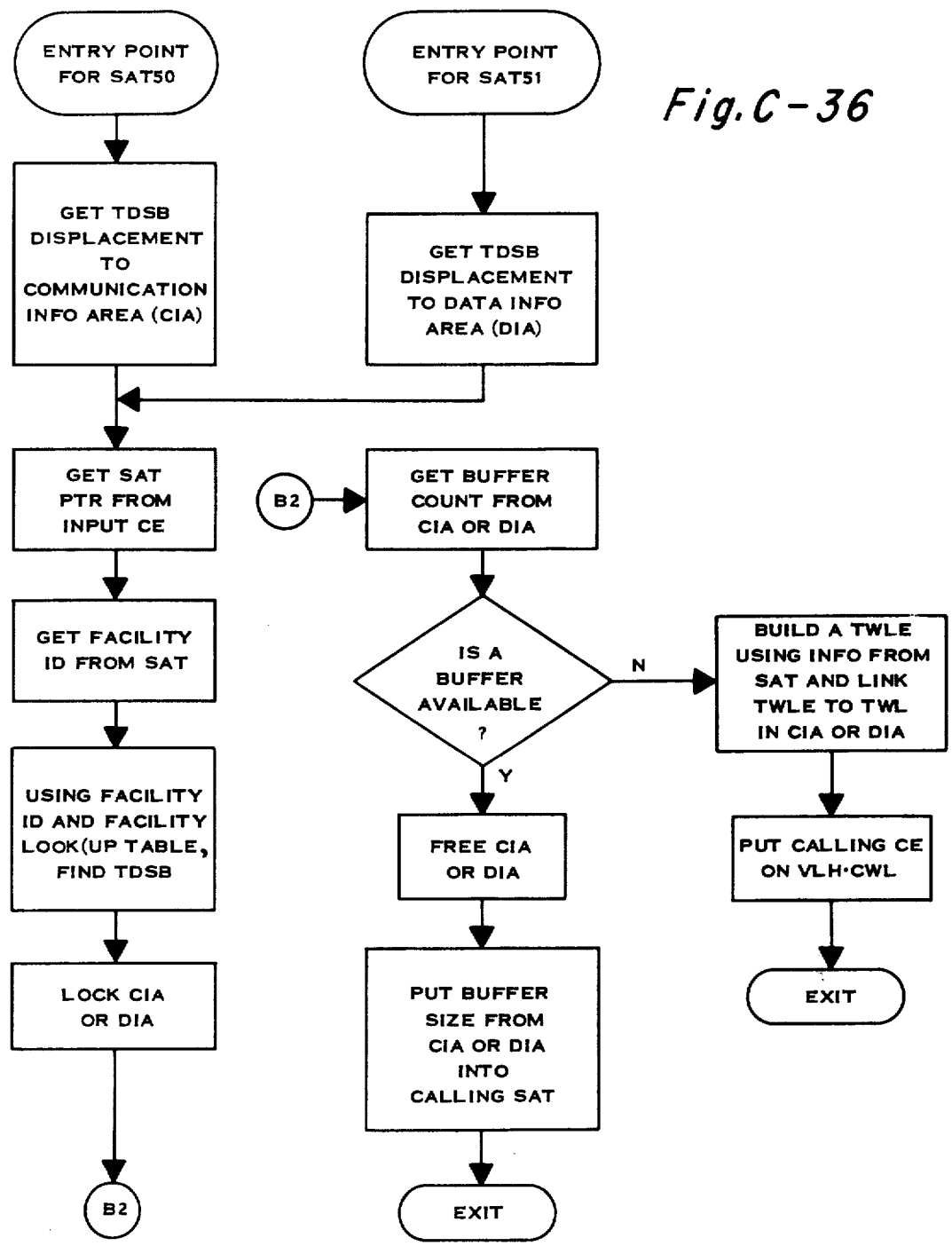
Fig. C-36

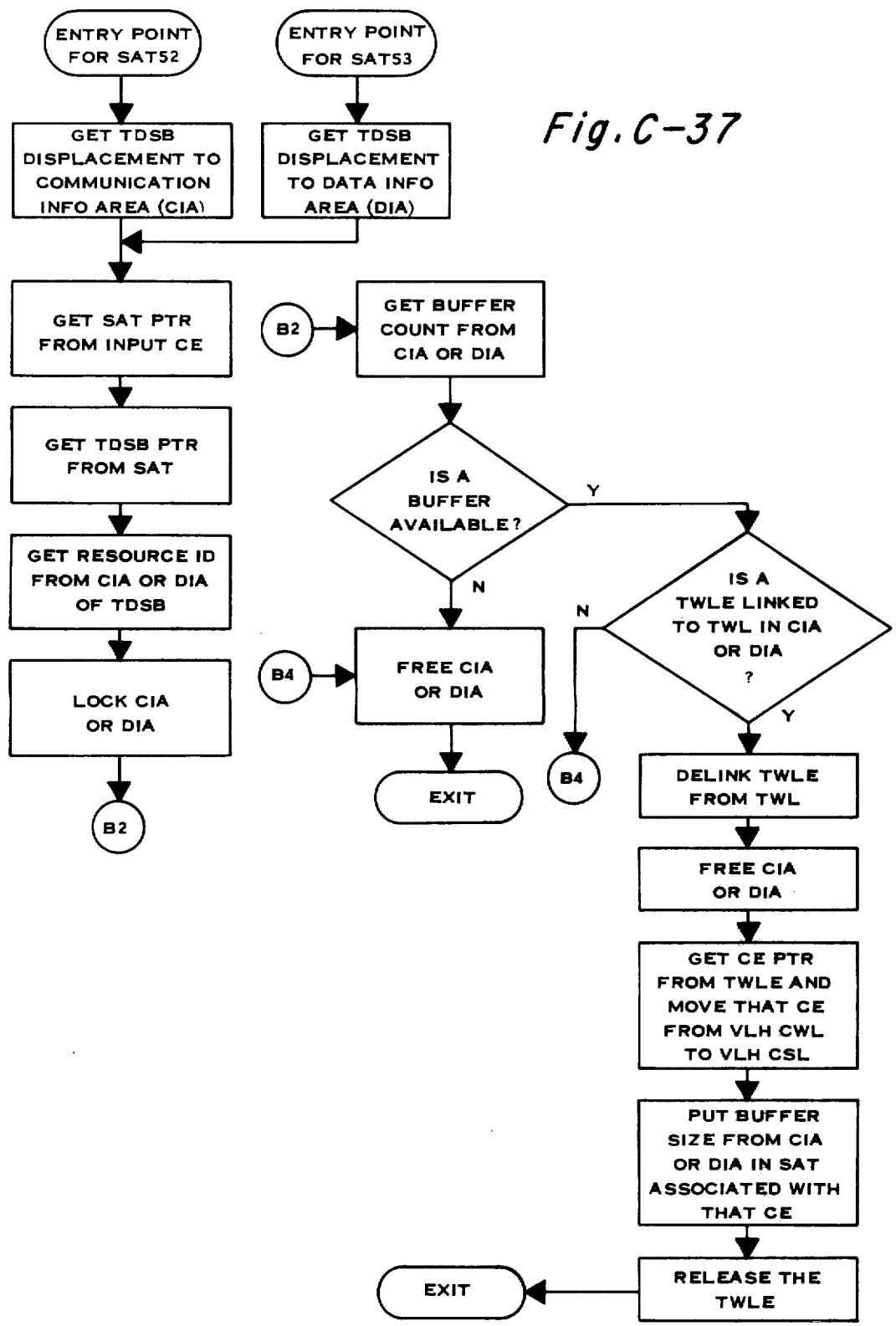
Fig. C-37

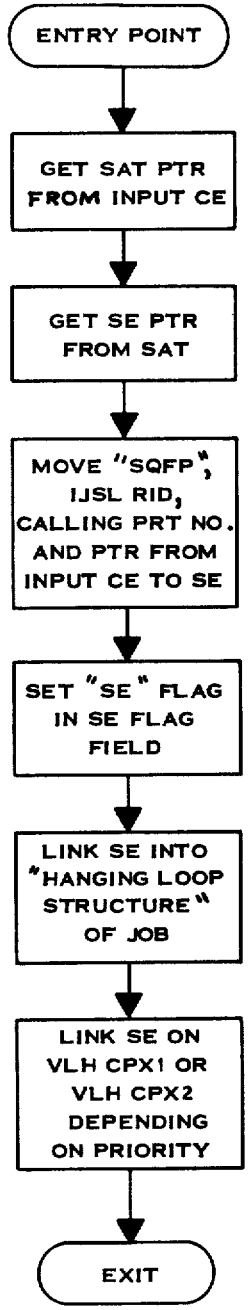
Fig. C-38
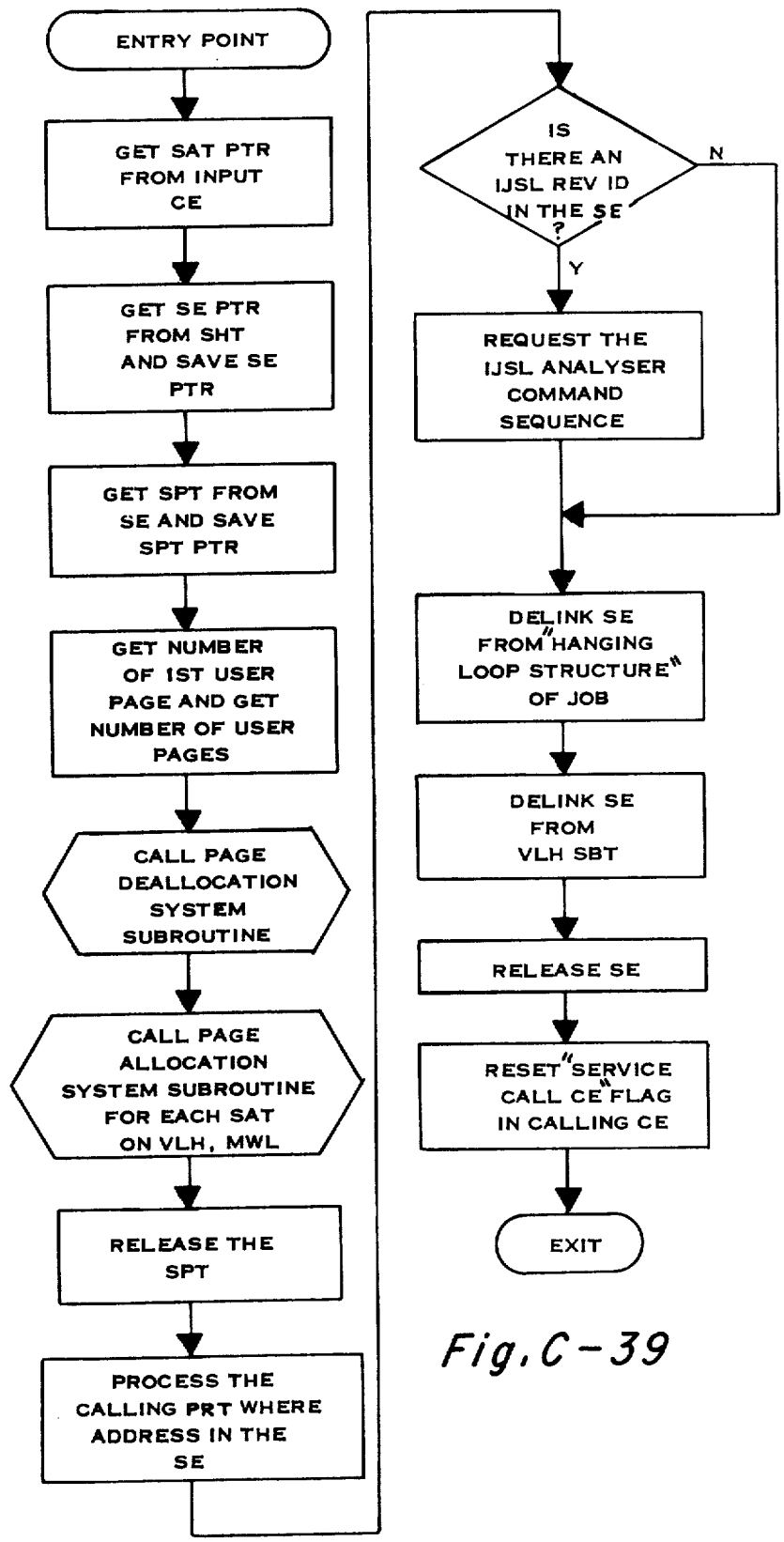
Fig. C-39

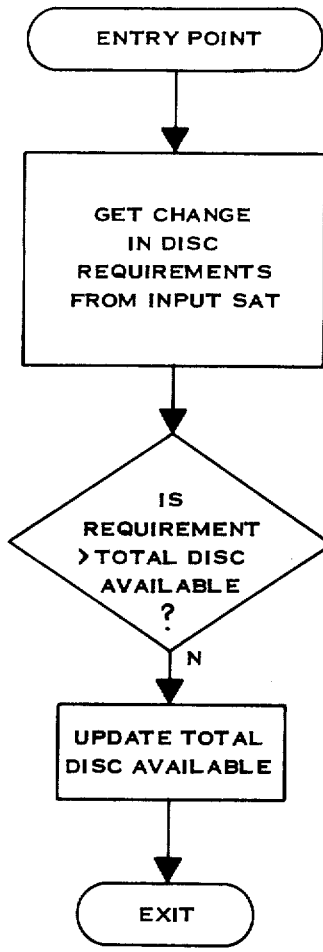
Fig. C-40
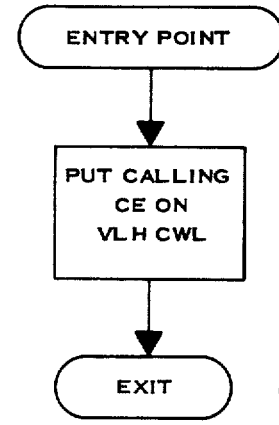
Fig. C-41
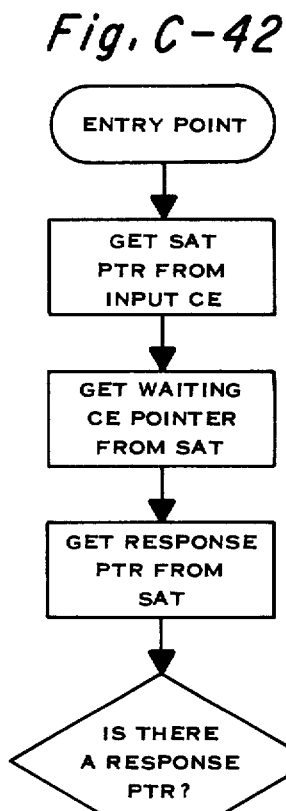
Fig. C-42

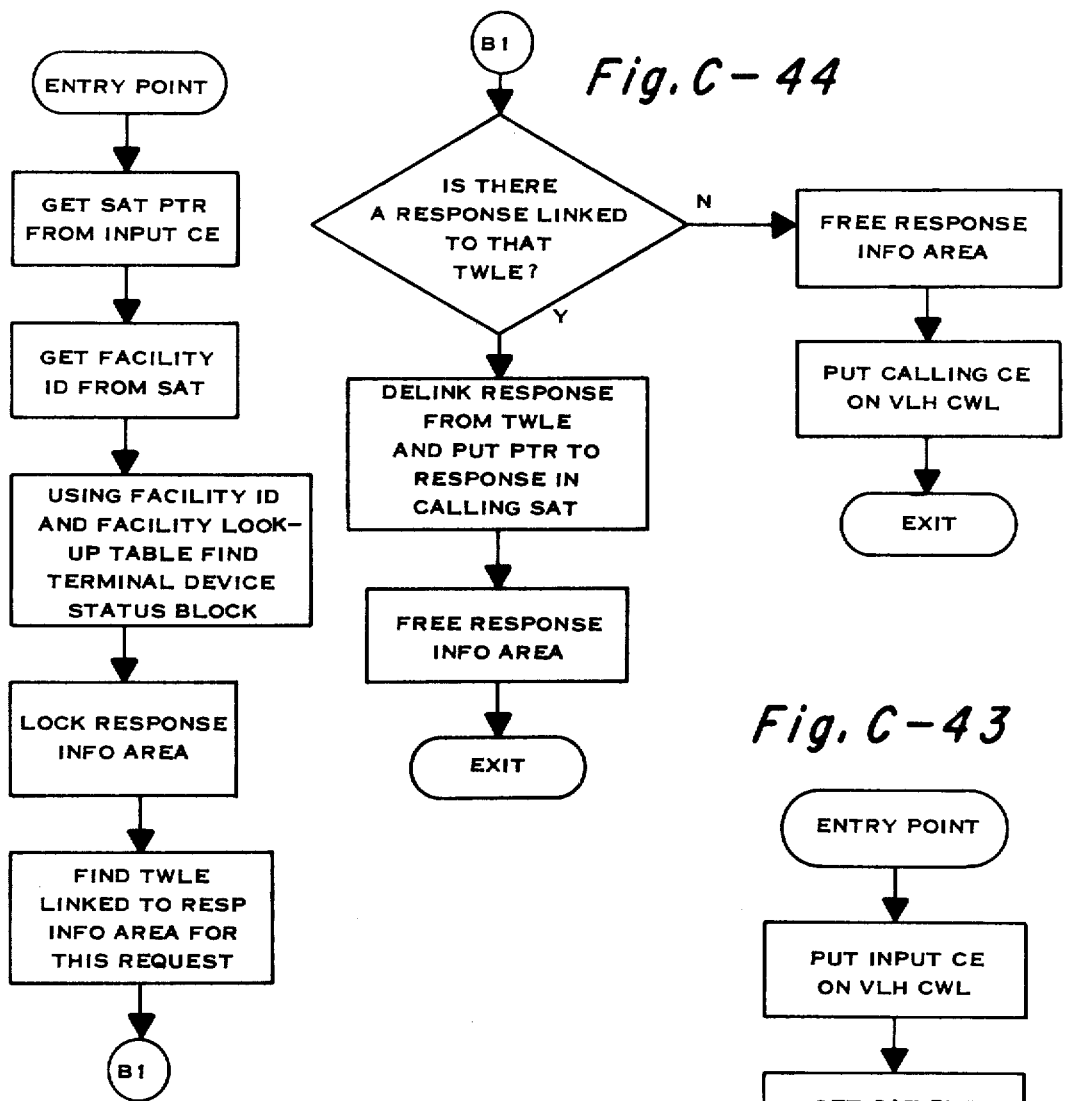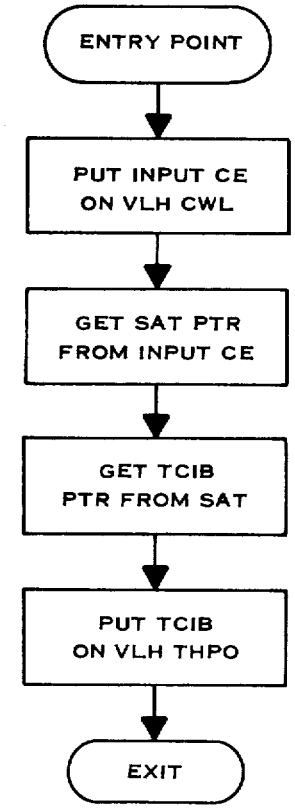

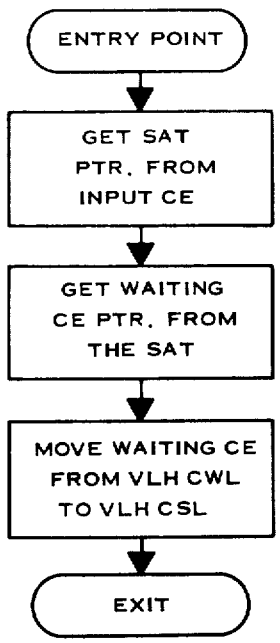
Fig. C-45
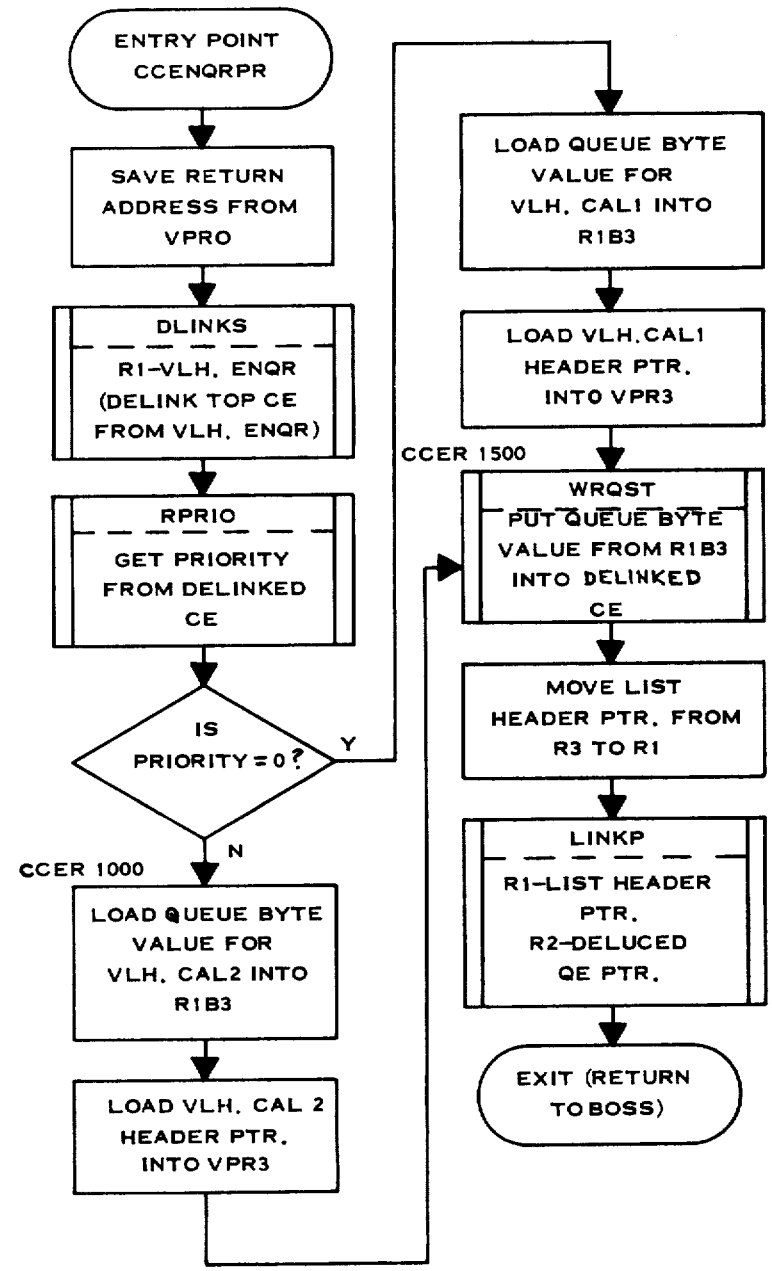
Fig. C-47
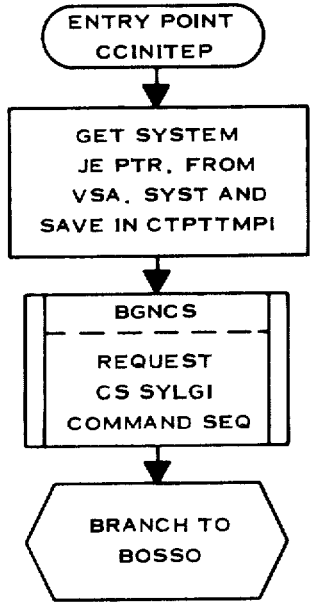
Fig. C-46

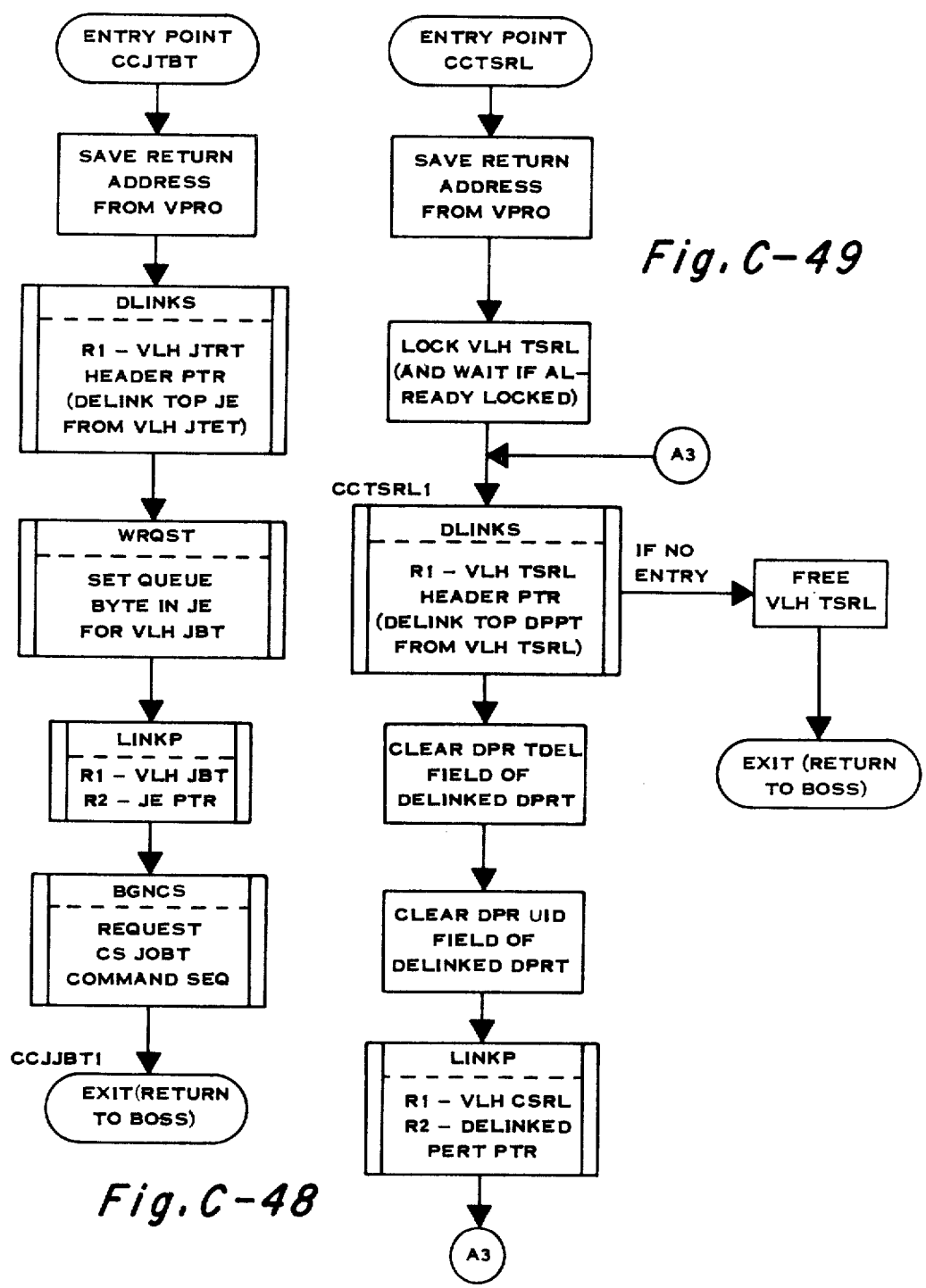
Fig. C-49
Fig. C-48

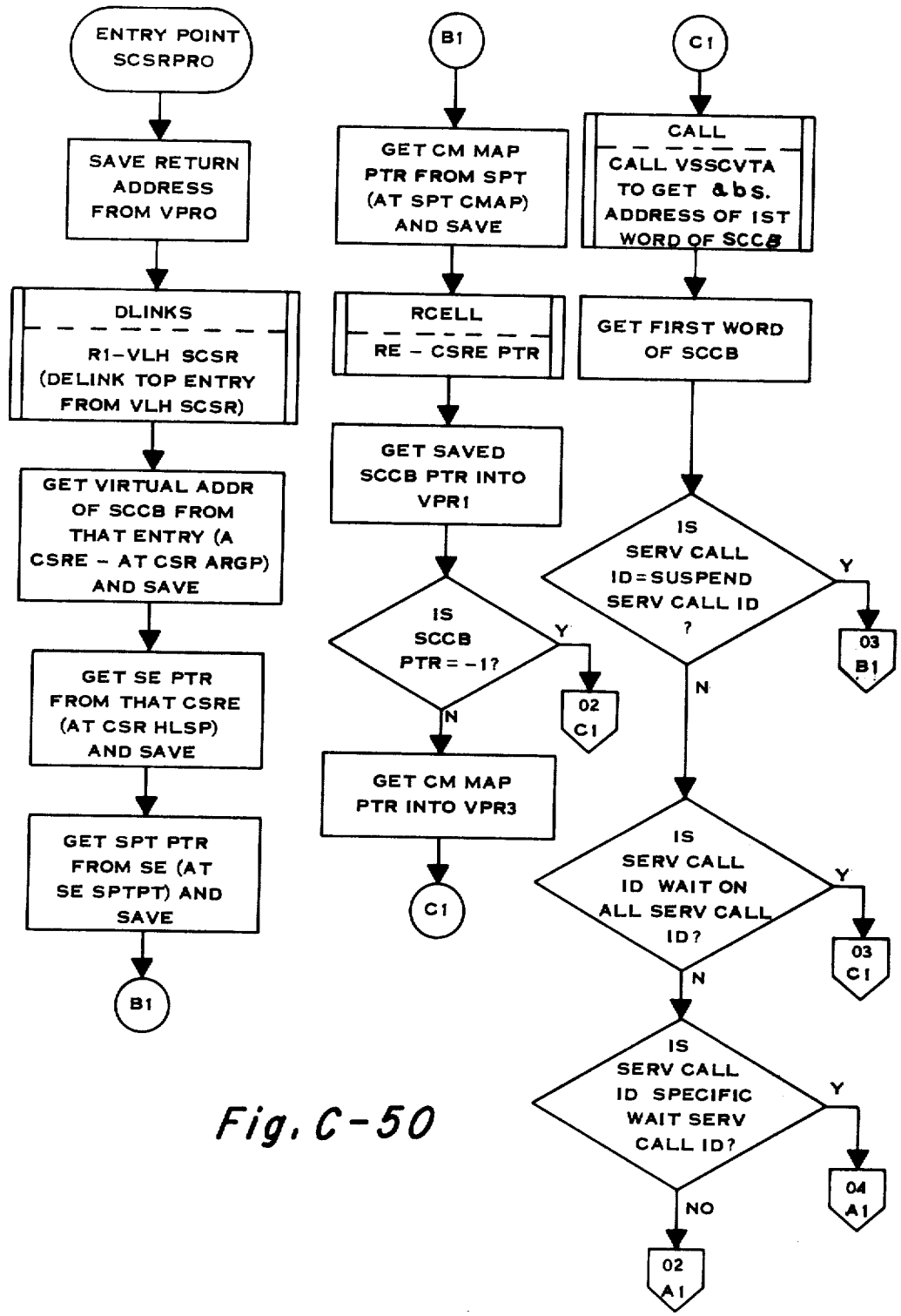
Fig. C-50

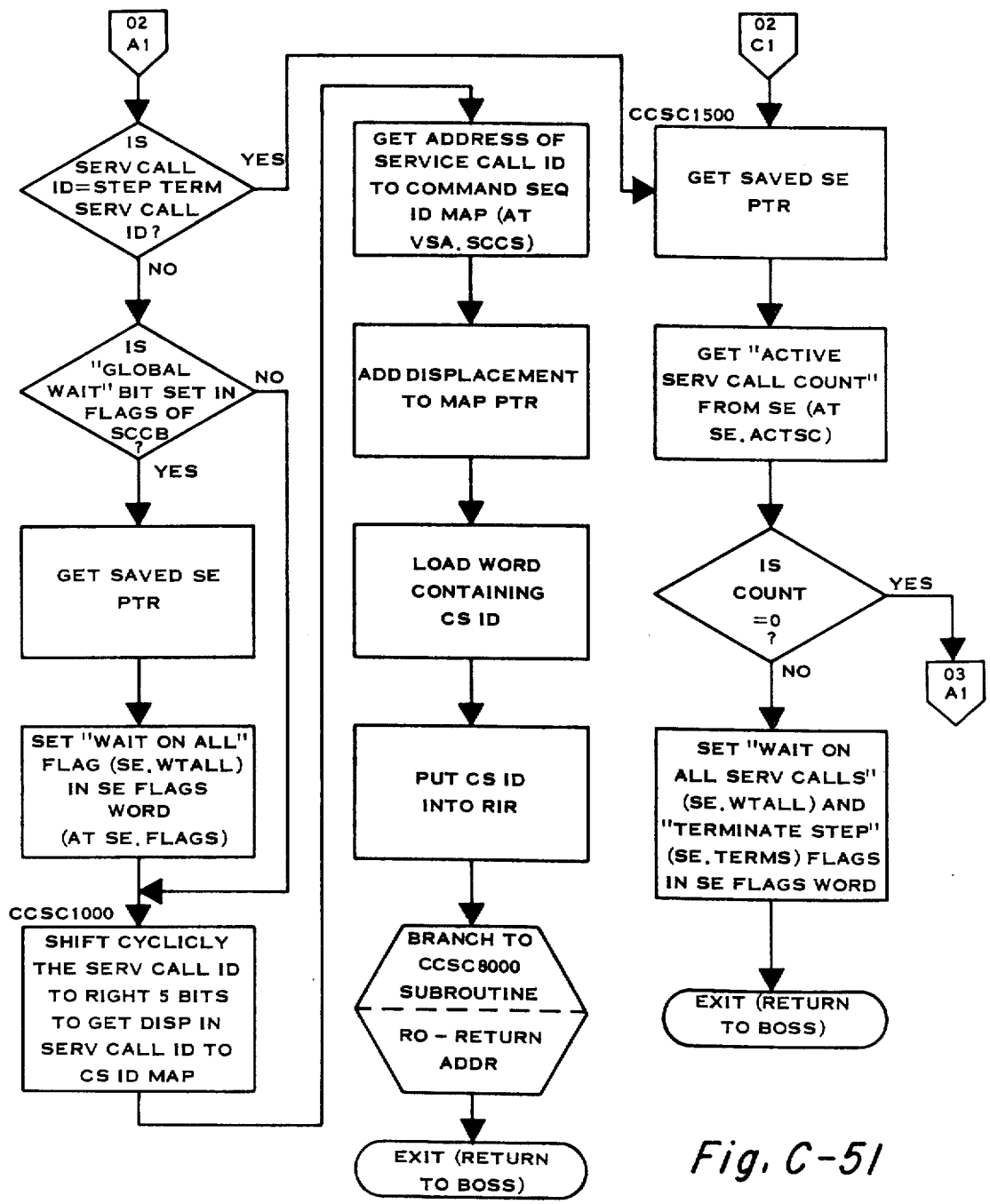
Fig. C-51

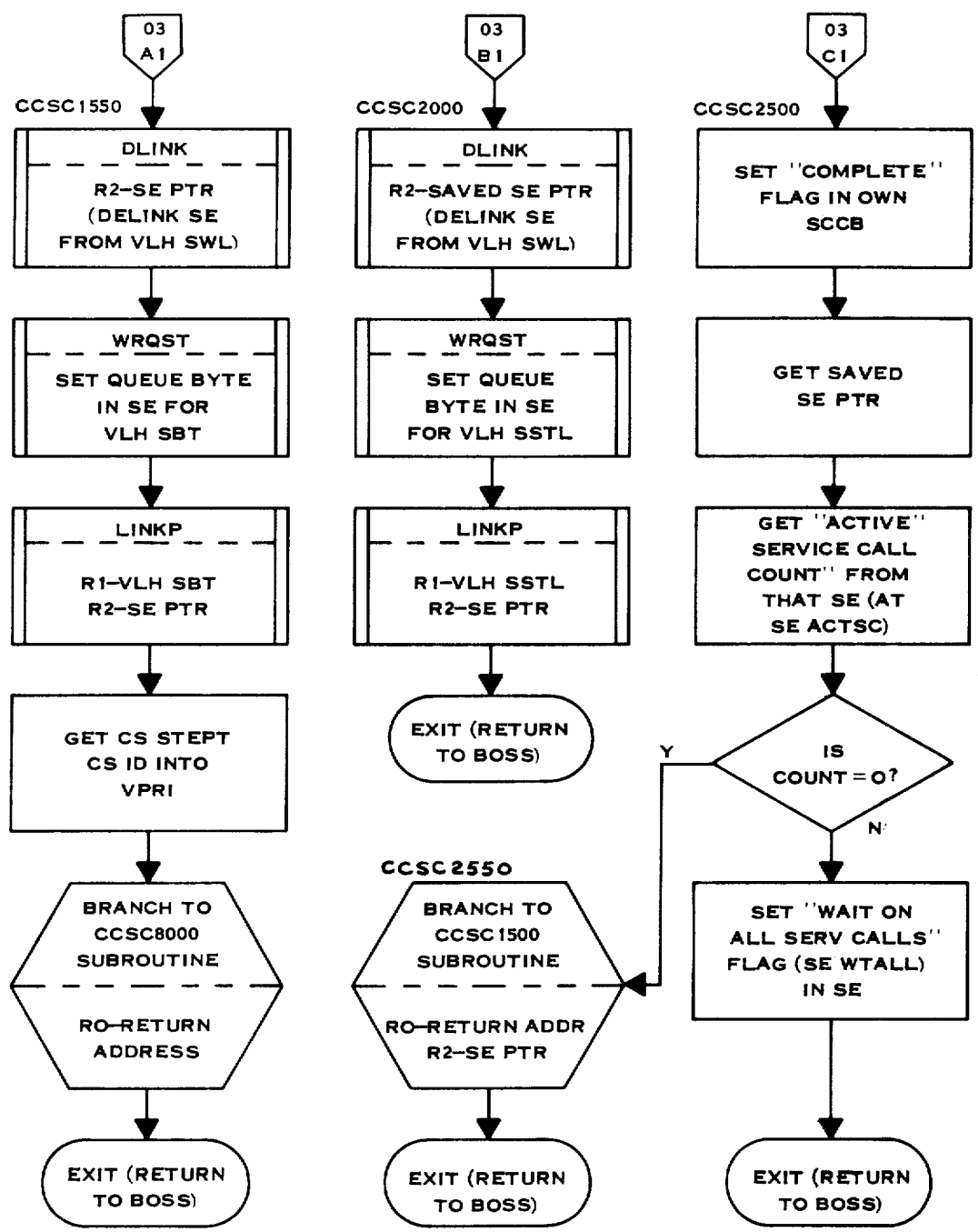
Fig. C-52

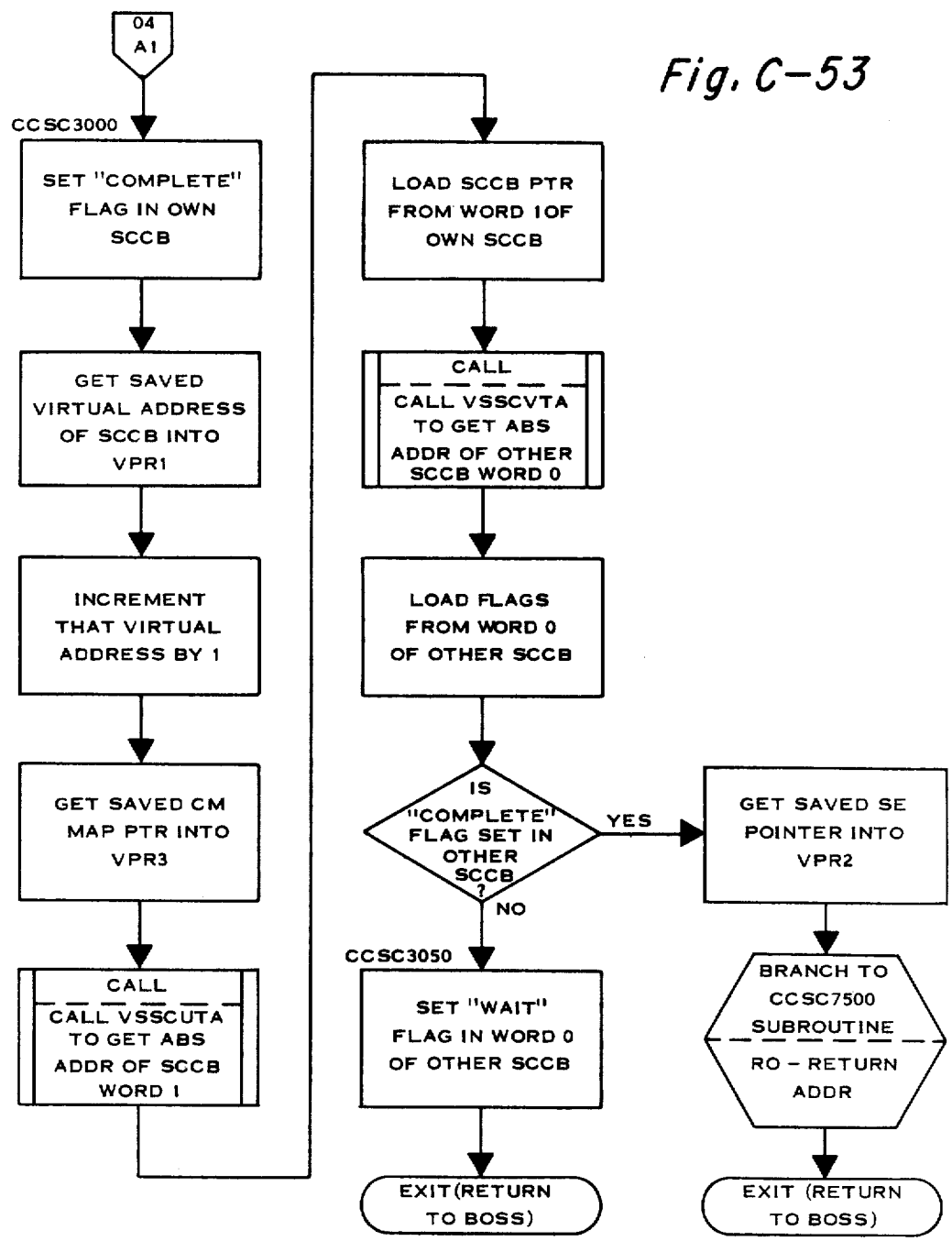
Fig. C-53

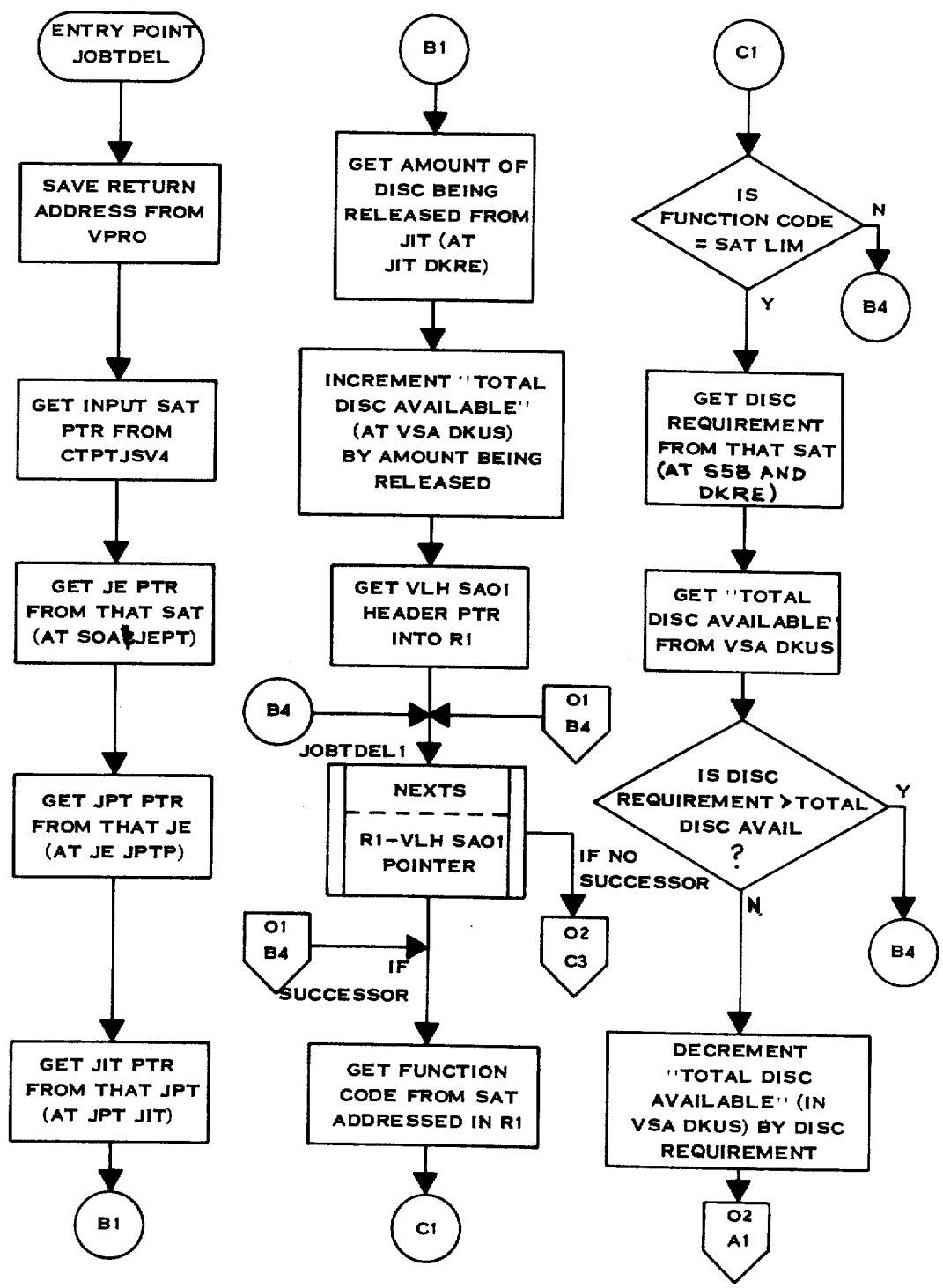
Fig. C-54

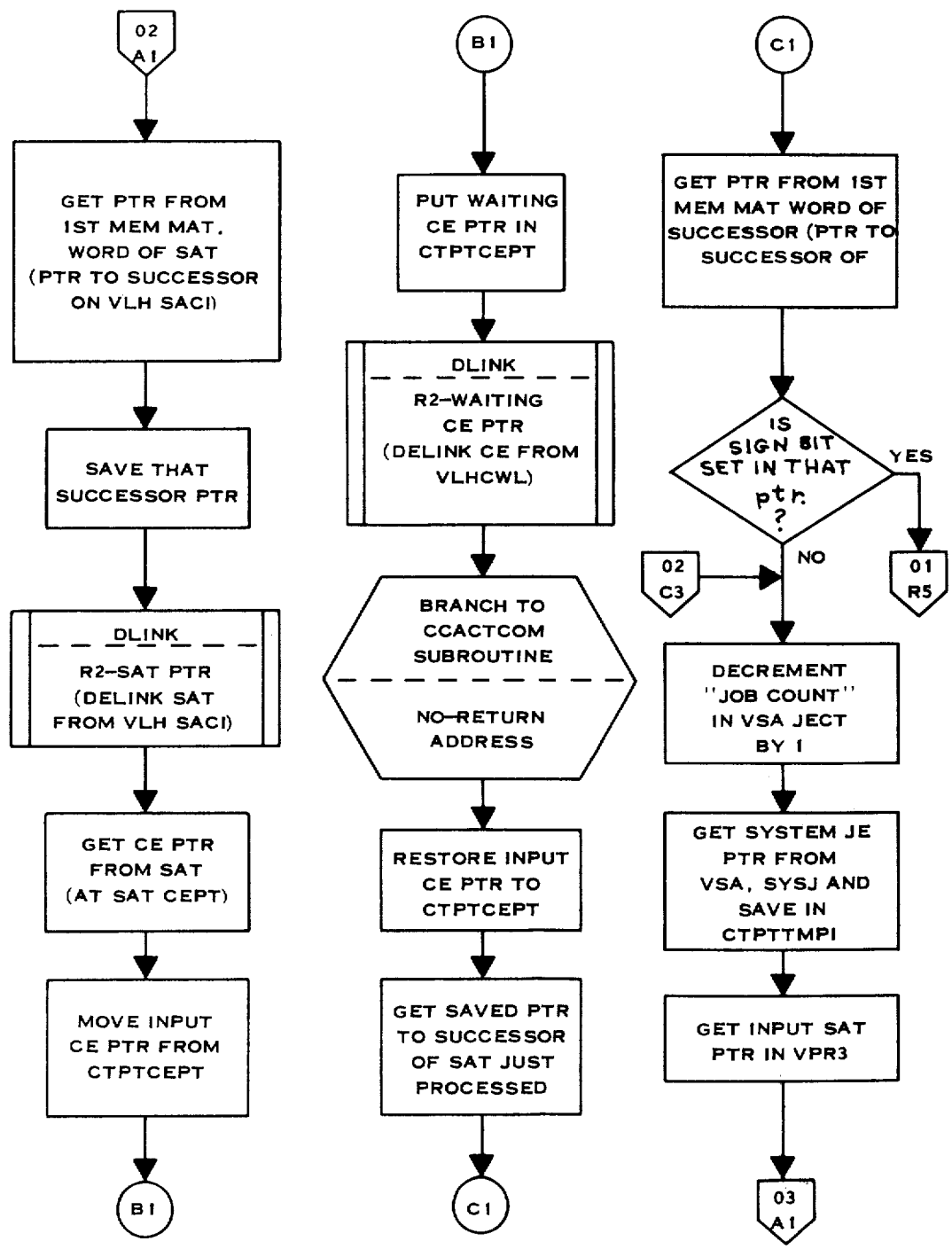
Fig. C-55

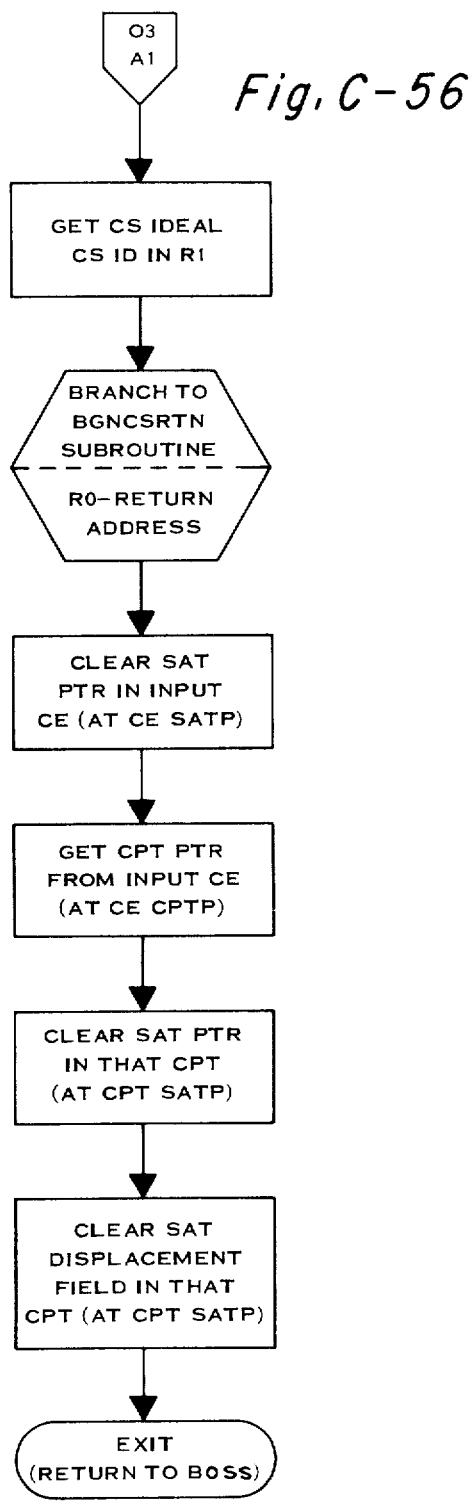
Fig. C-56

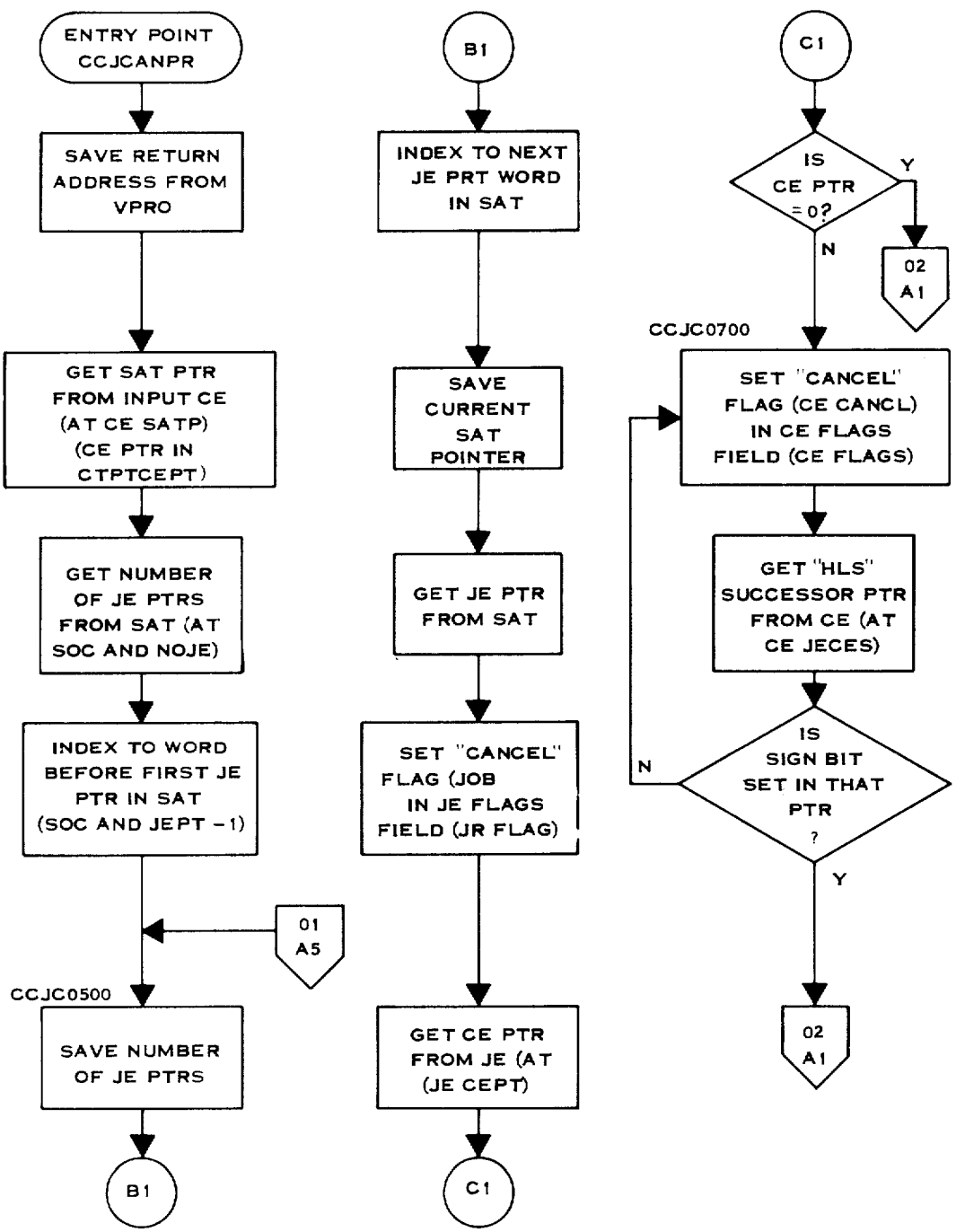
Fig. C-57

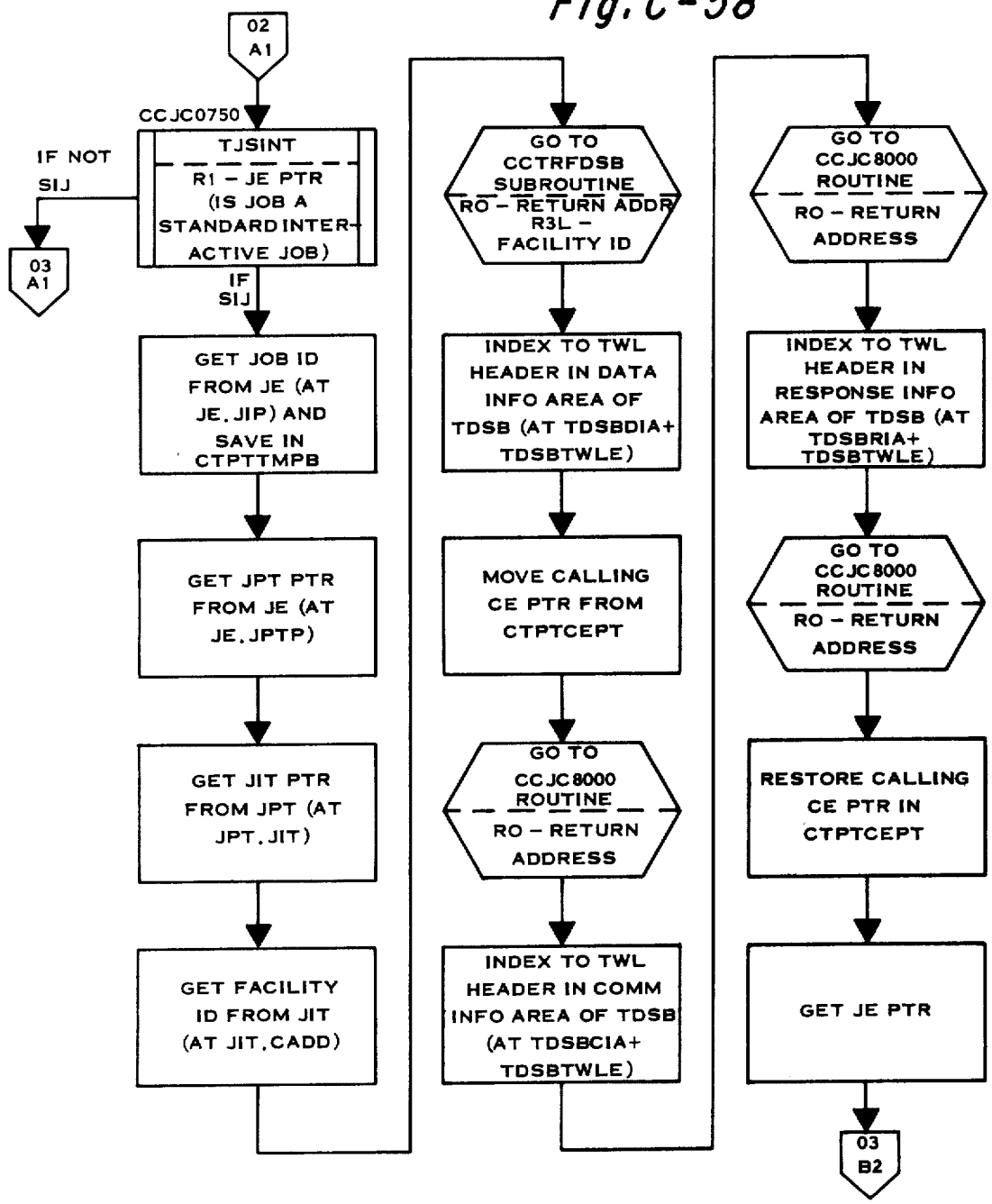
Fig. C-58

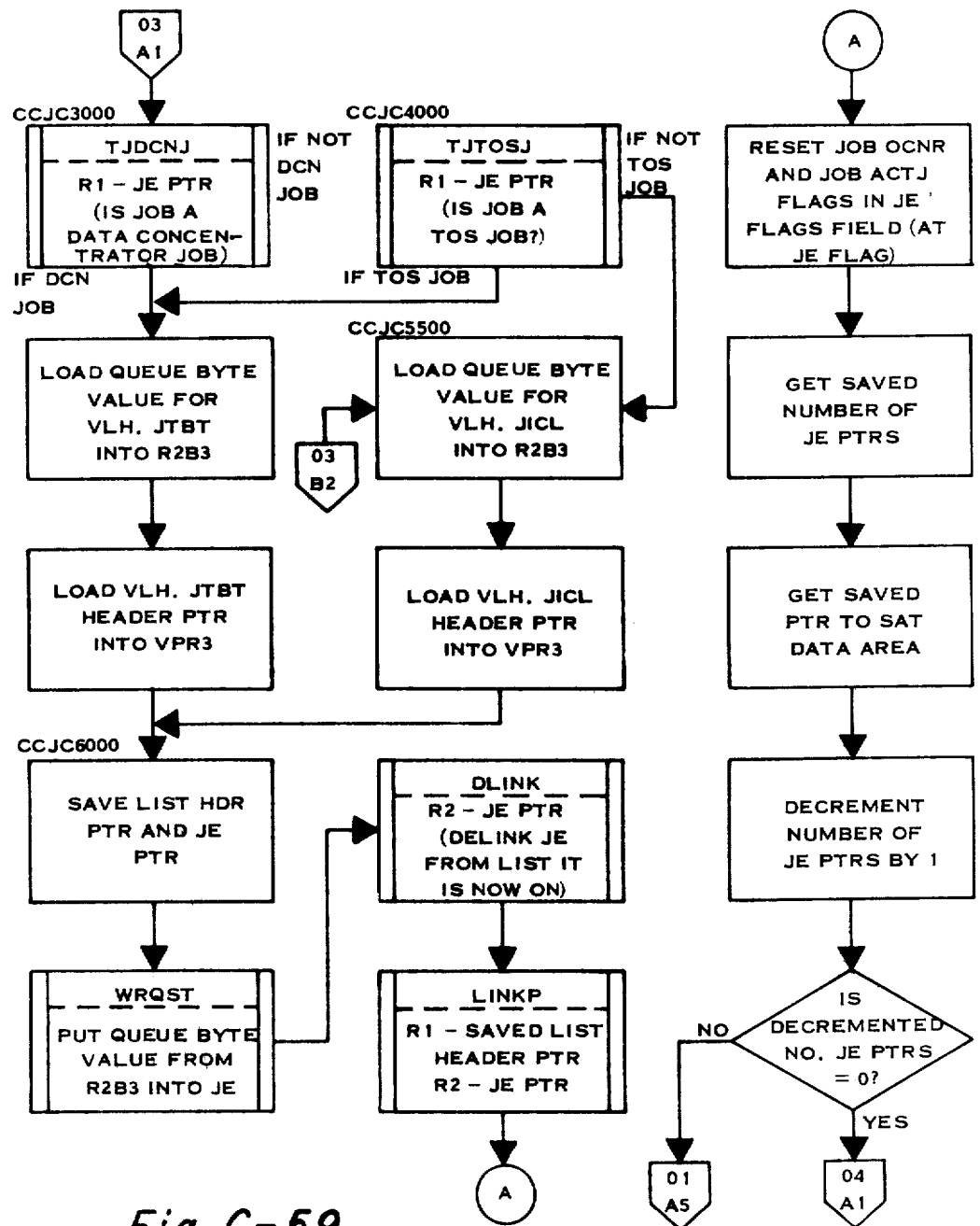
Fig. C-59

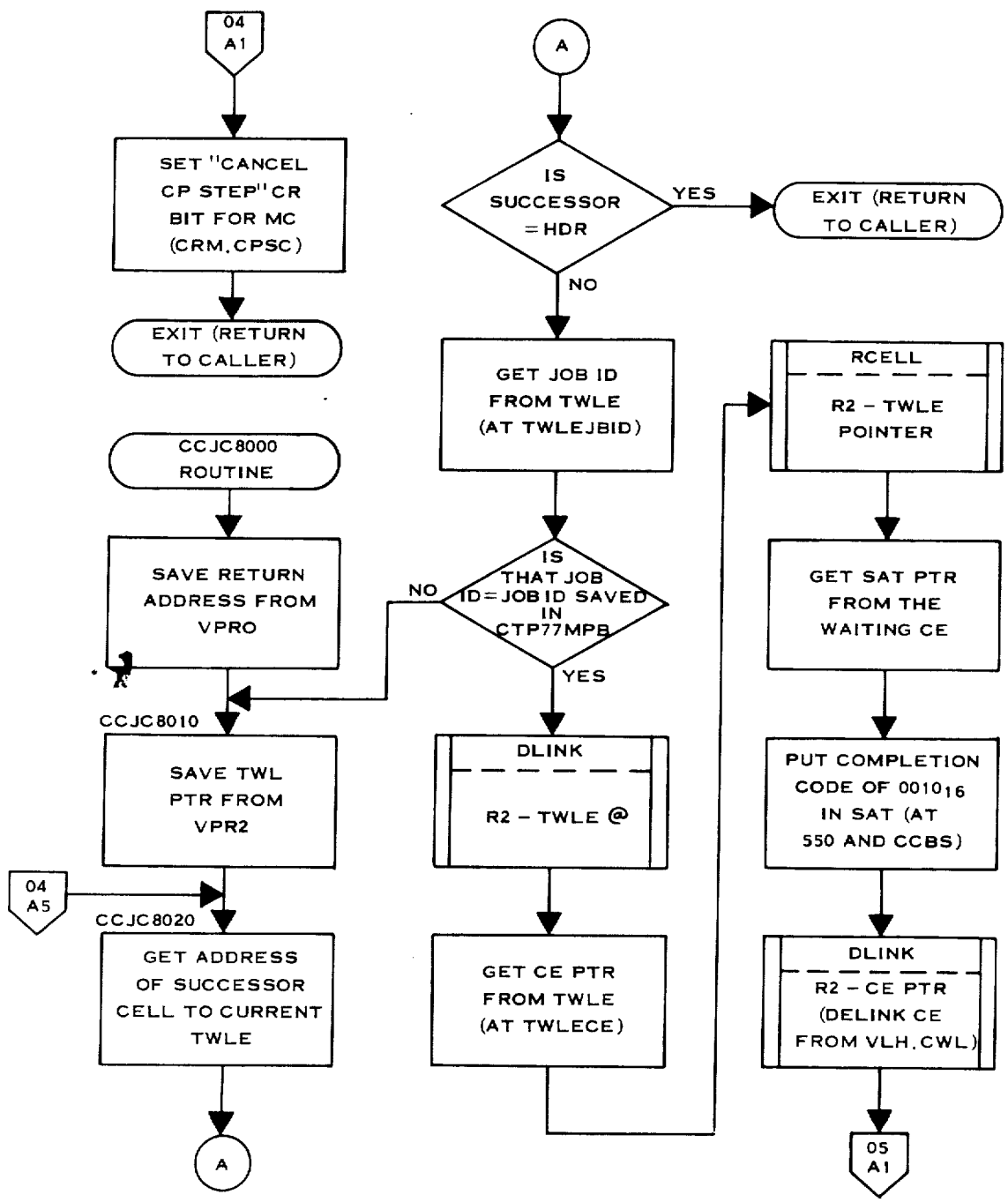
Fig. C-60

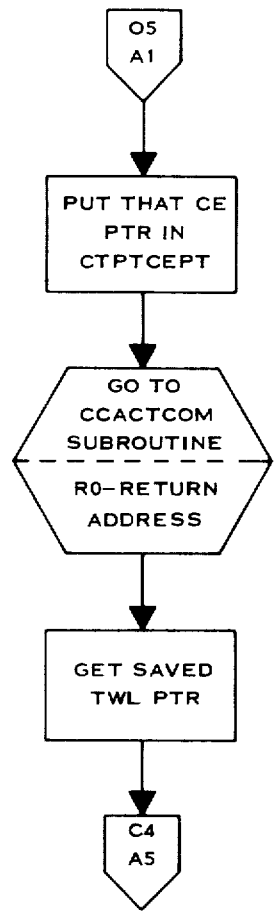
Fig. C-61
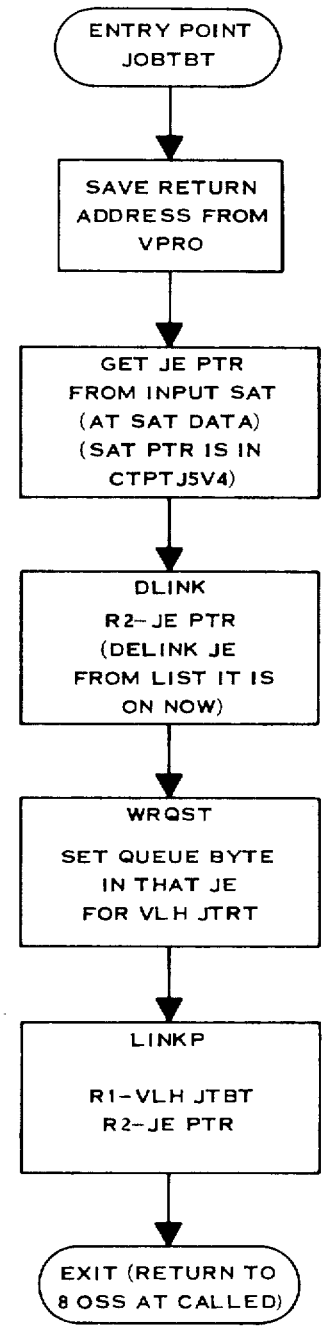
Fig. C-62

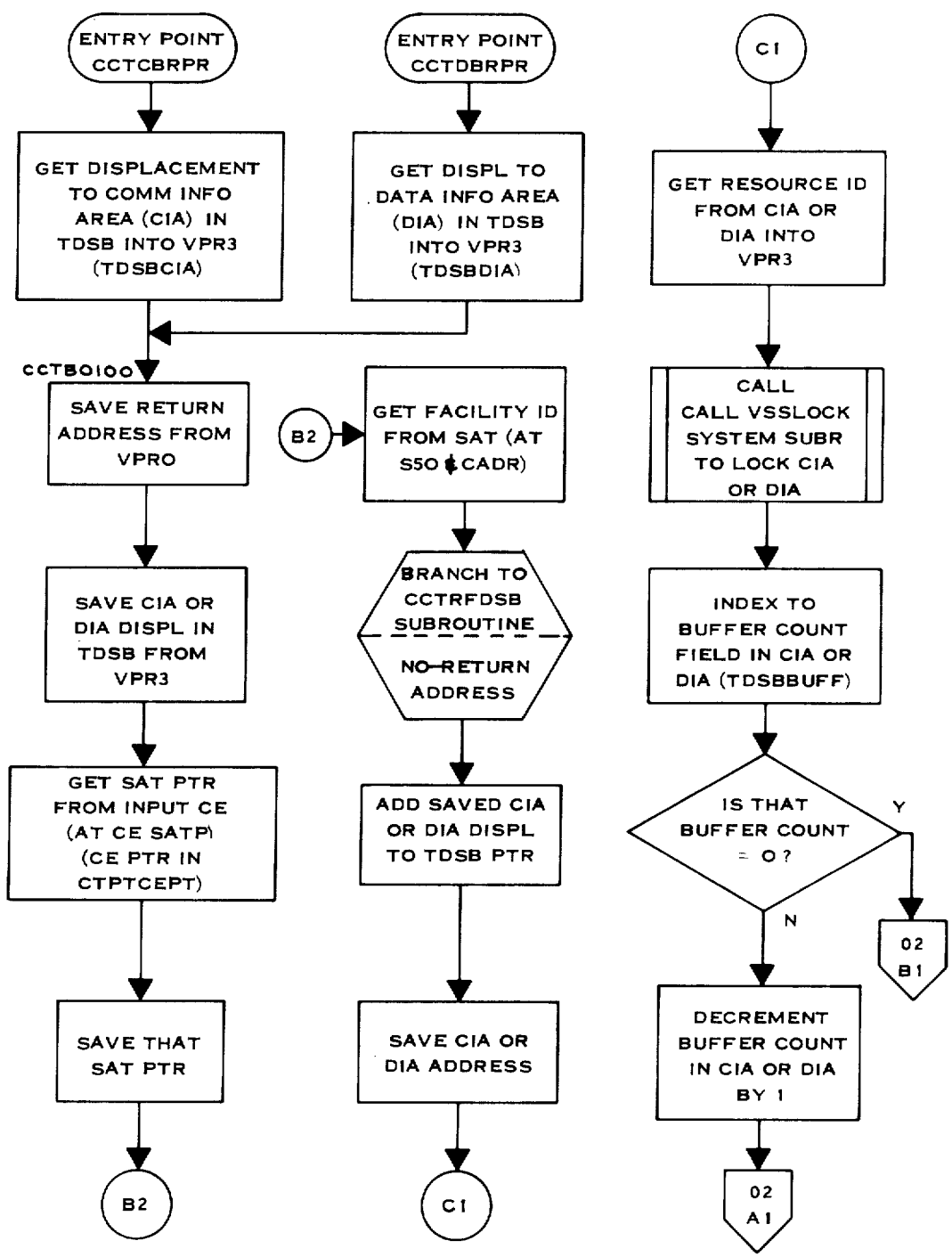
Fig. C-63

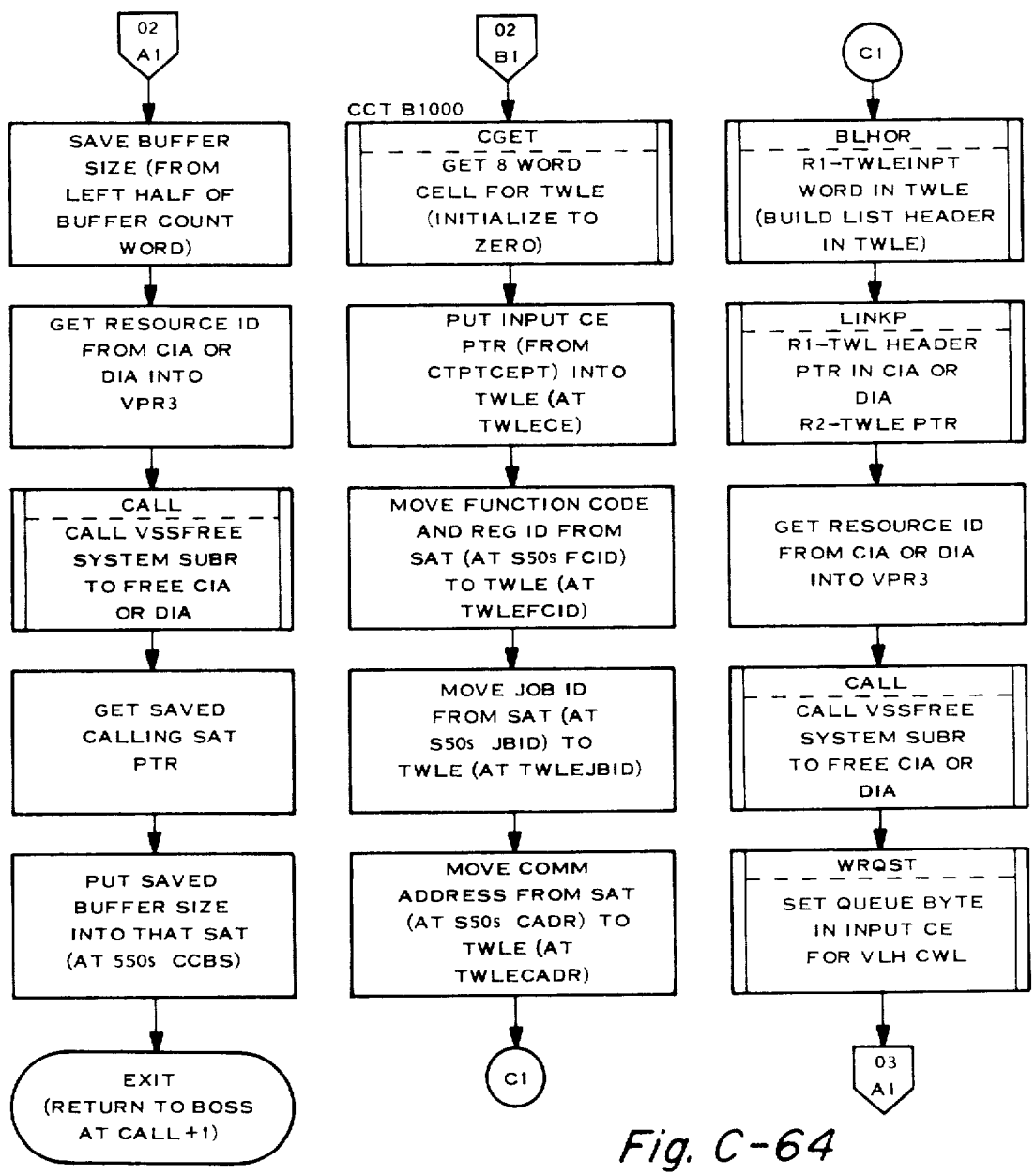
Fig. C-64

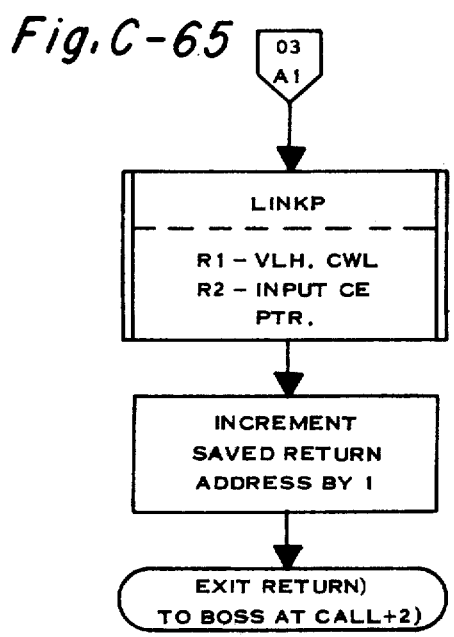
Fig. C-65
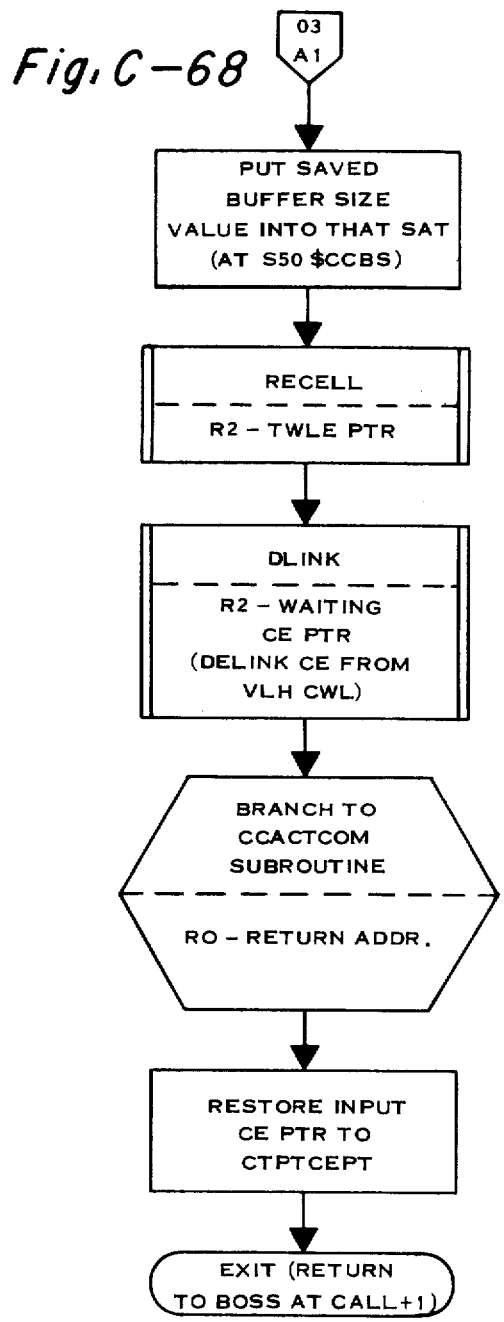
Fig. C-68

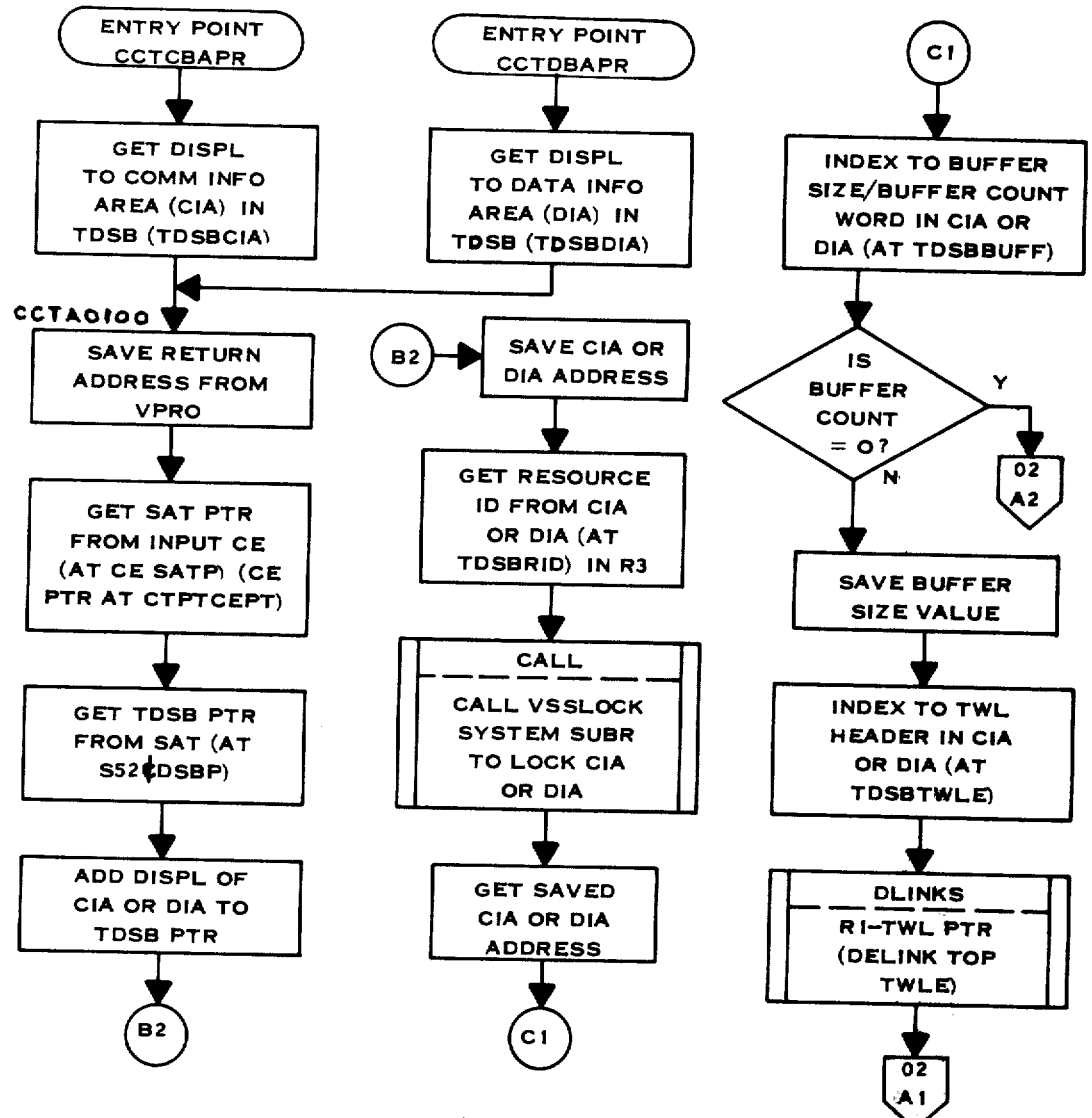
Fig. C-66

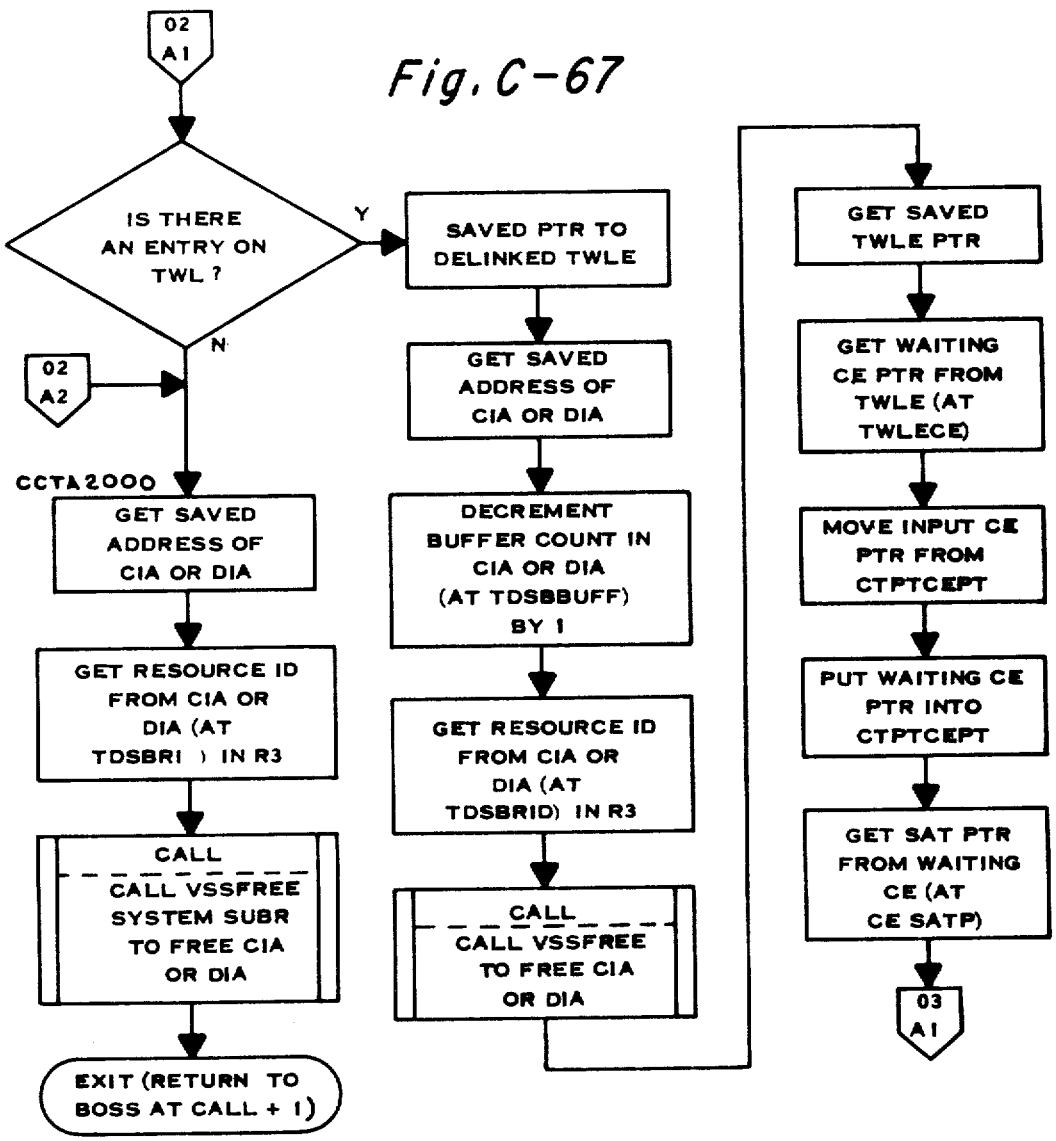
Fig. C-67

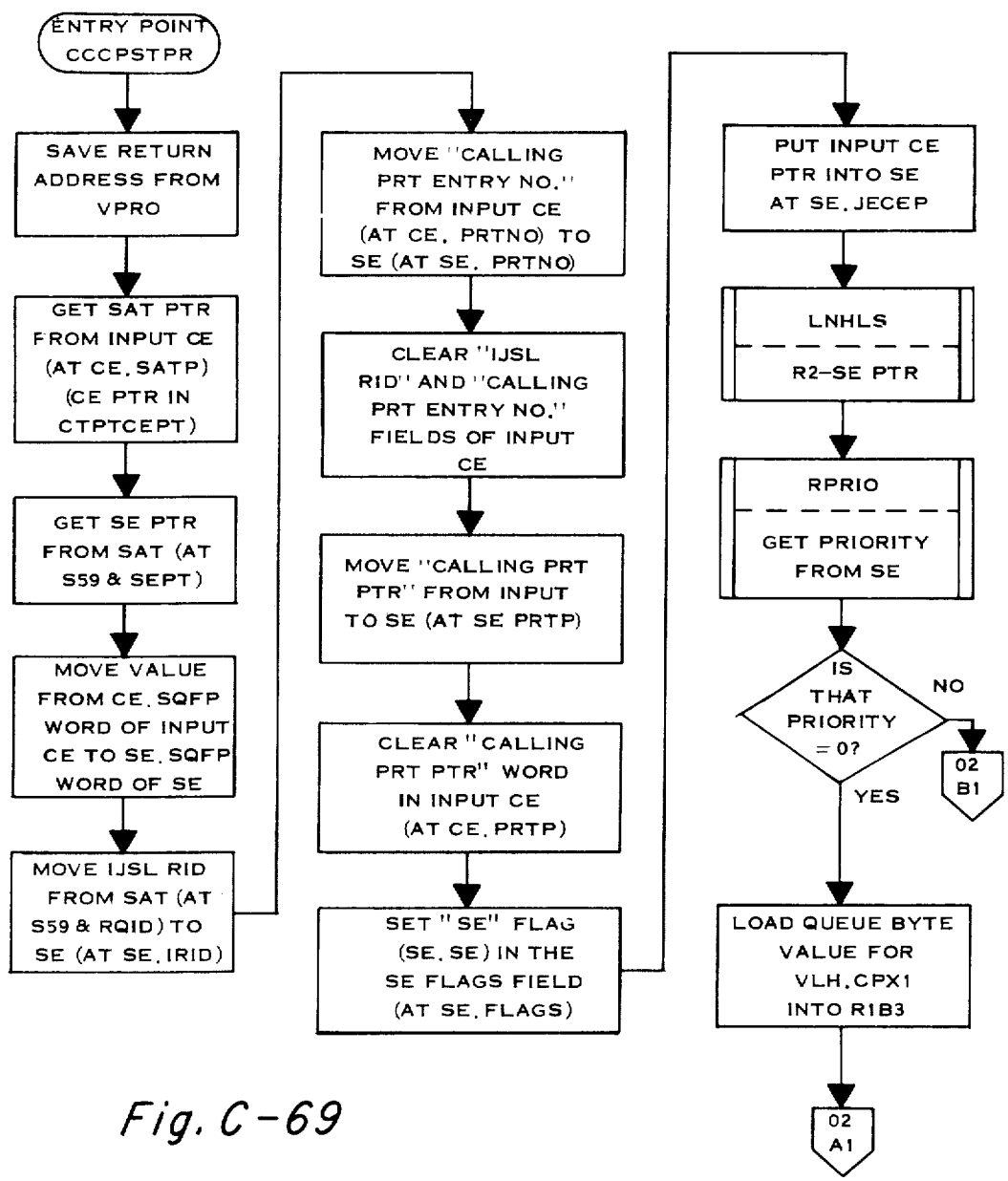
Fig. C-69

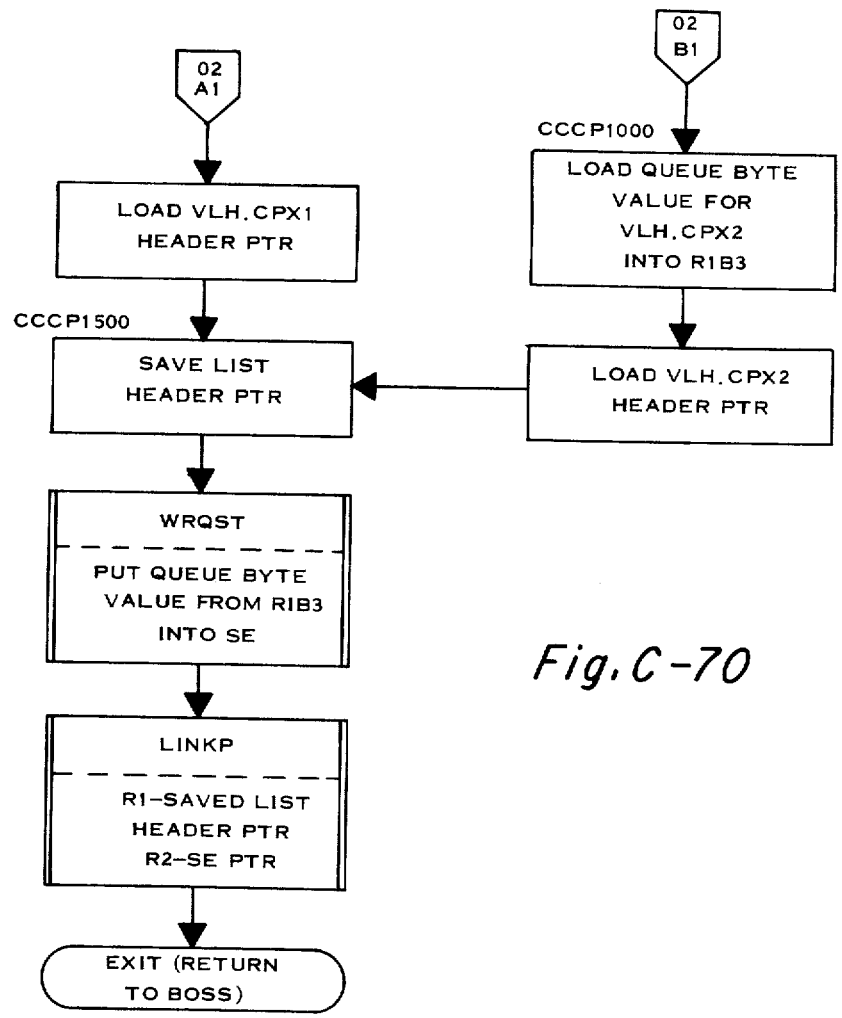
Fig. C-70

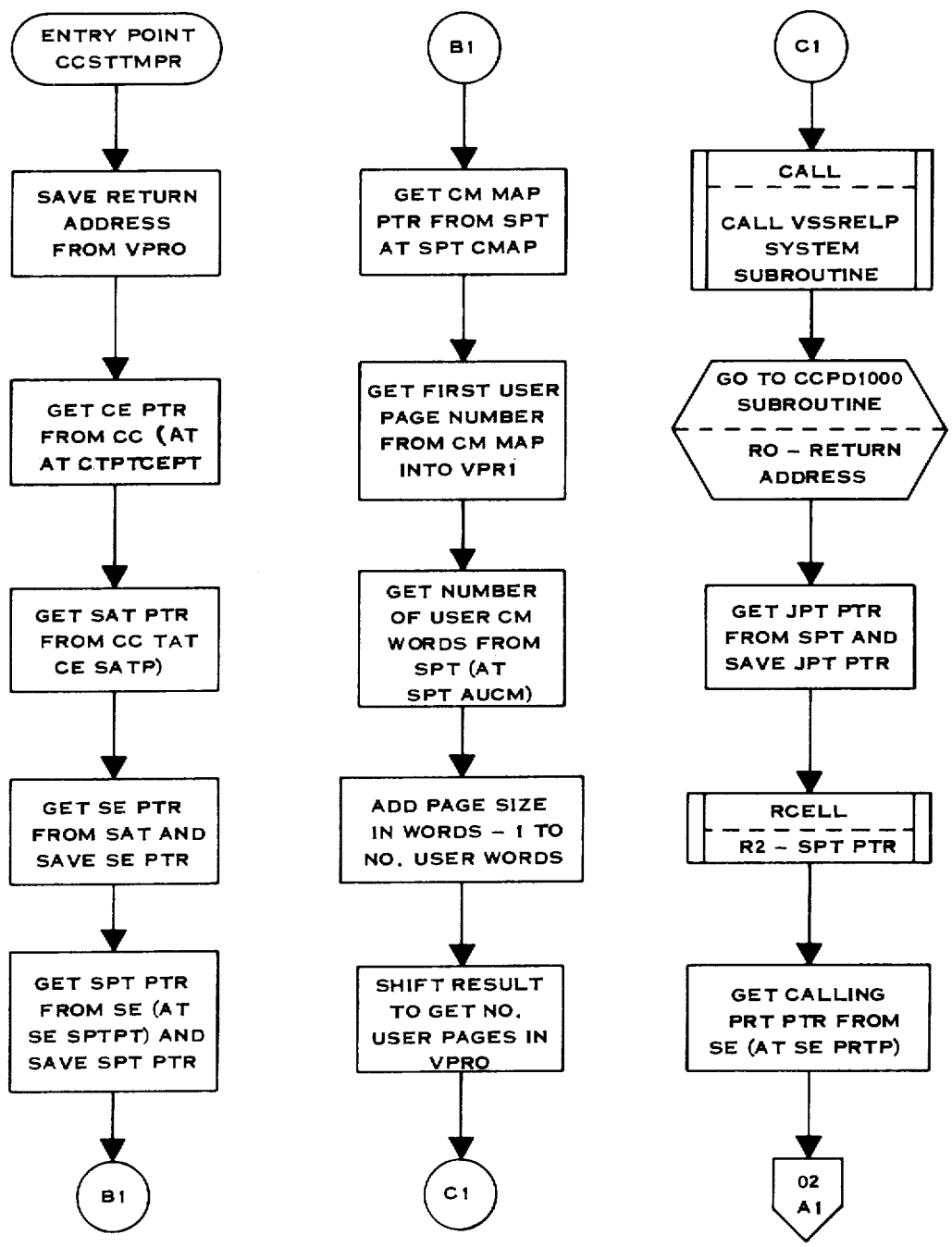
Fig. C-71

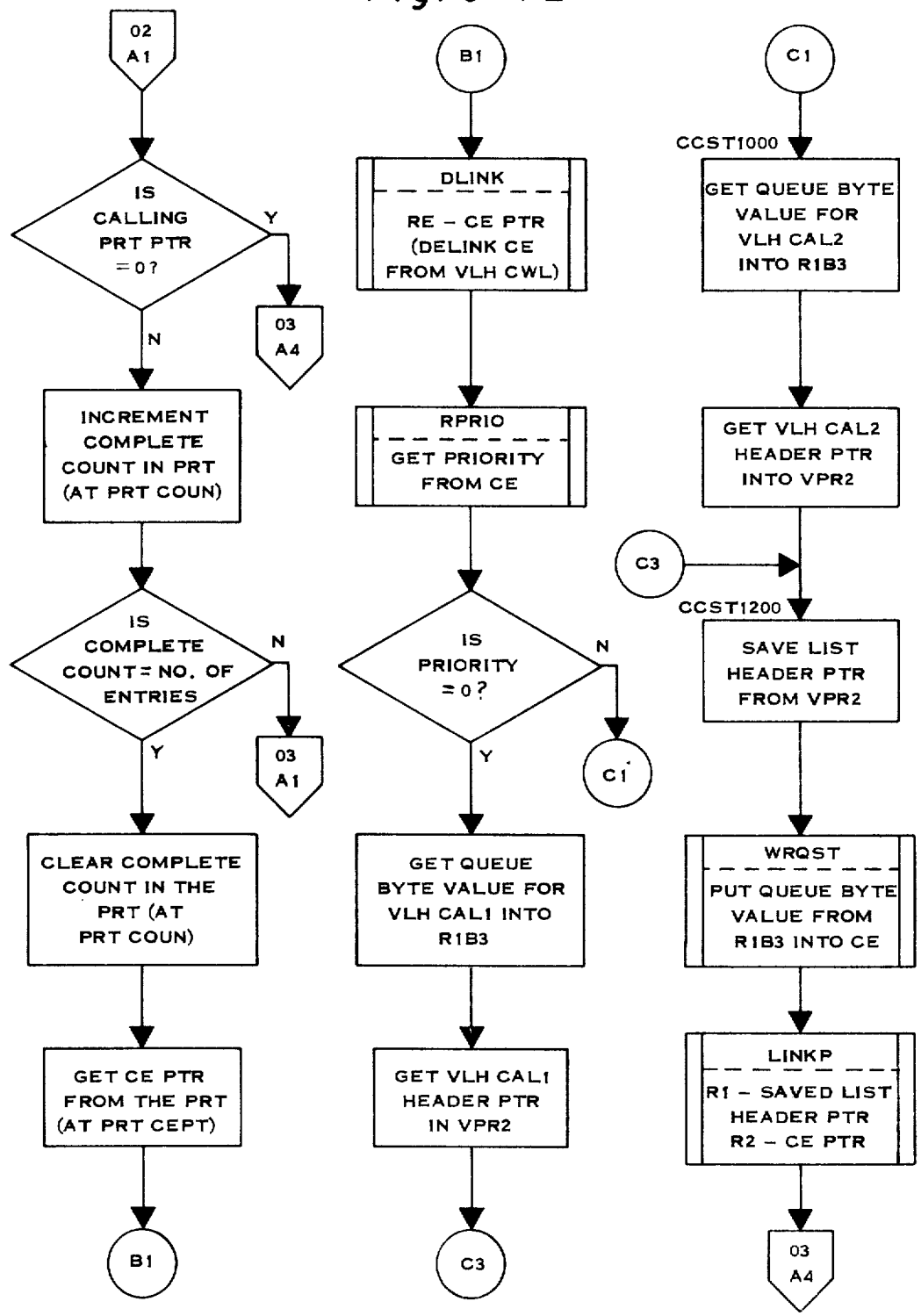
Fig. C-72

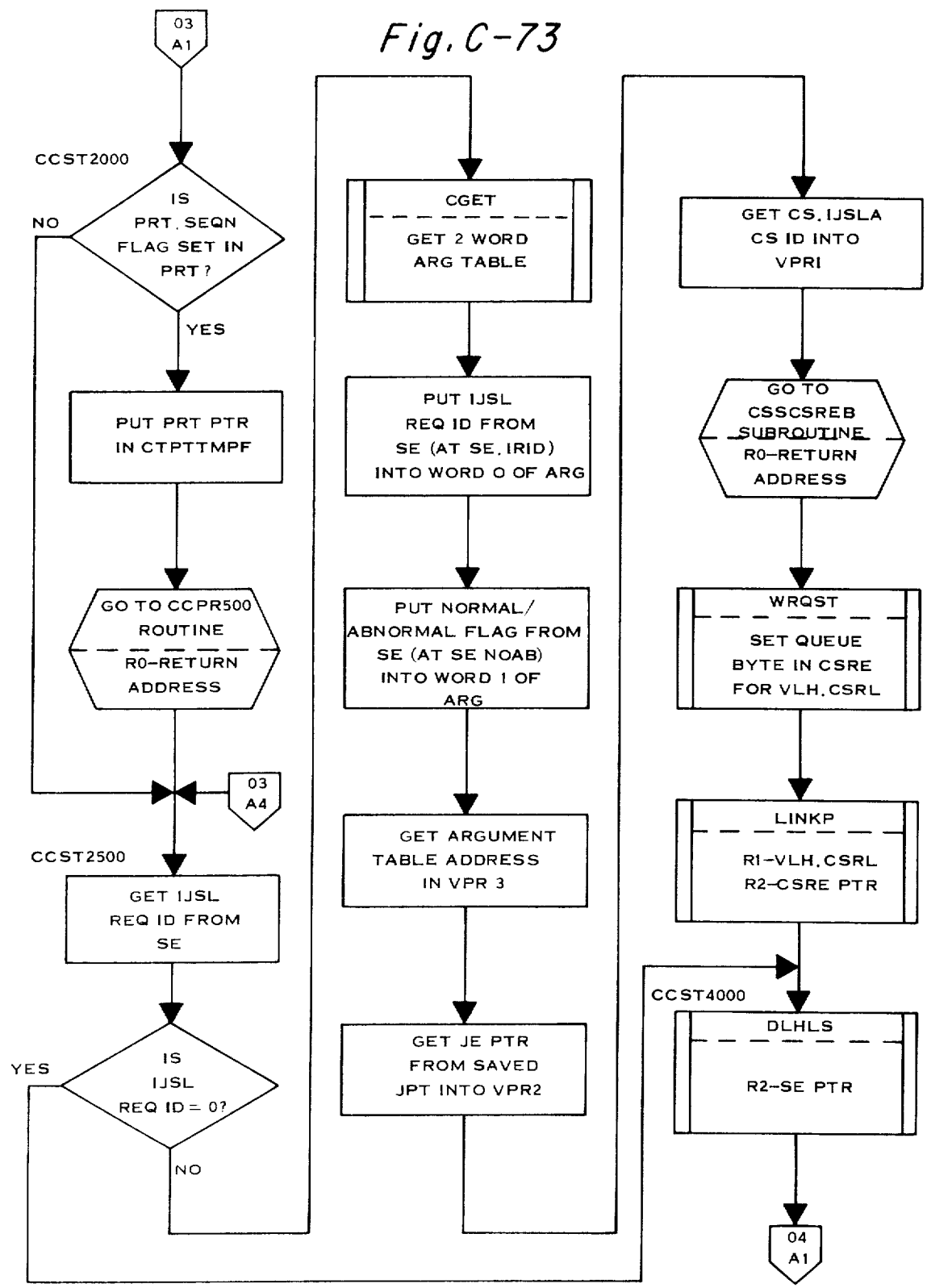
Fig. C-73

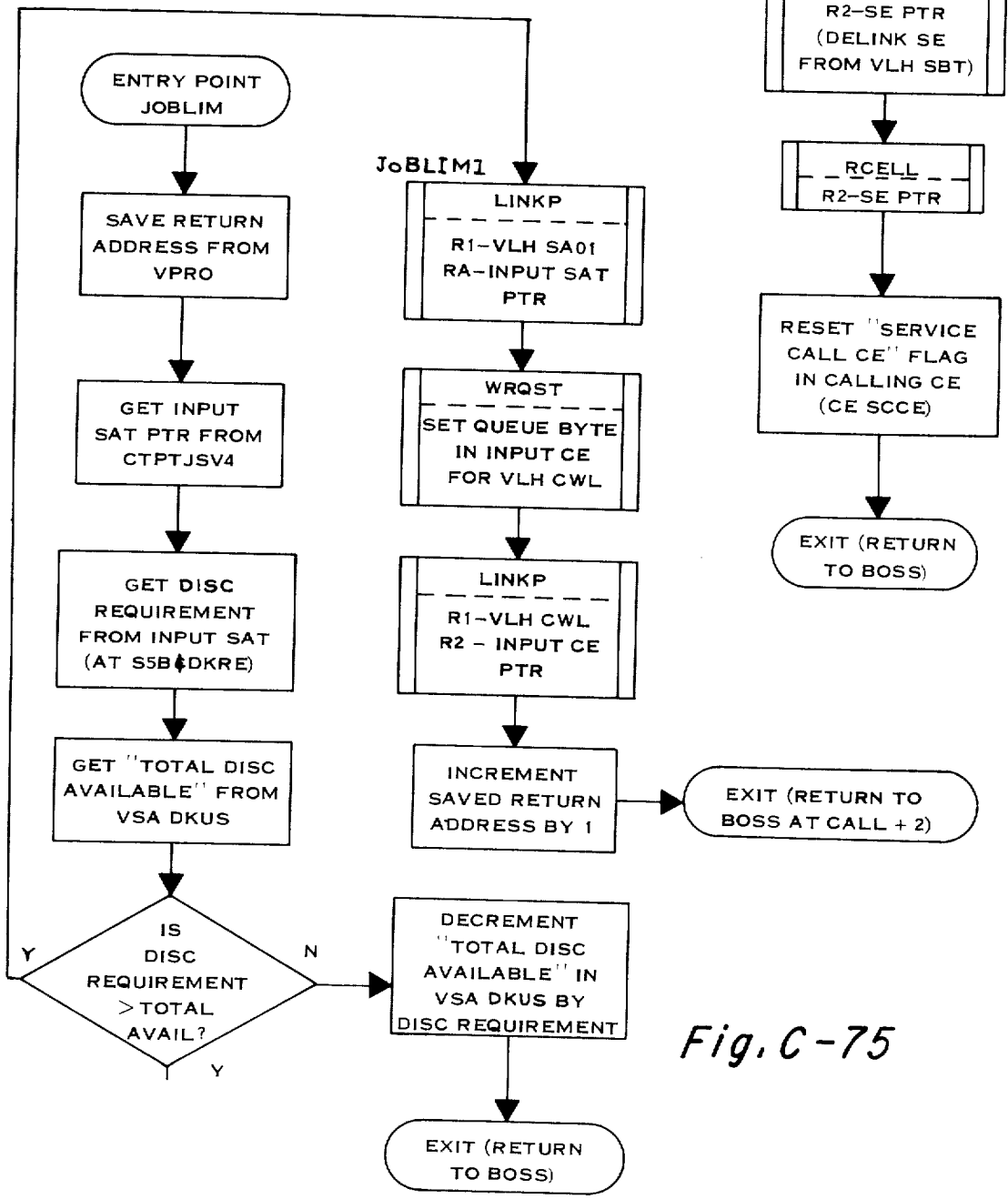
Fig. C-74
Fig. C-75

Fig. C-76
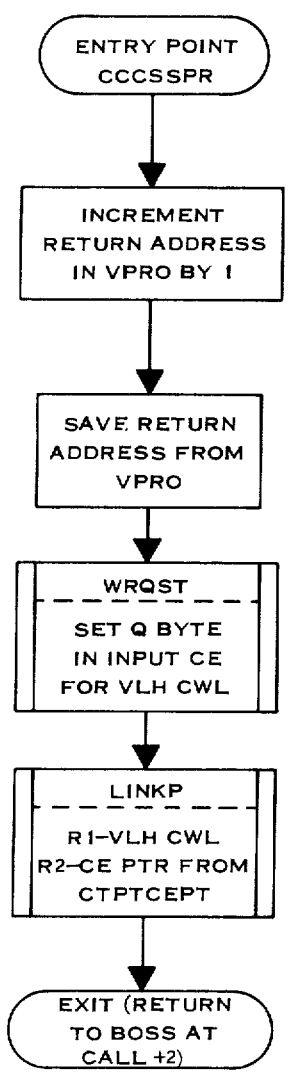

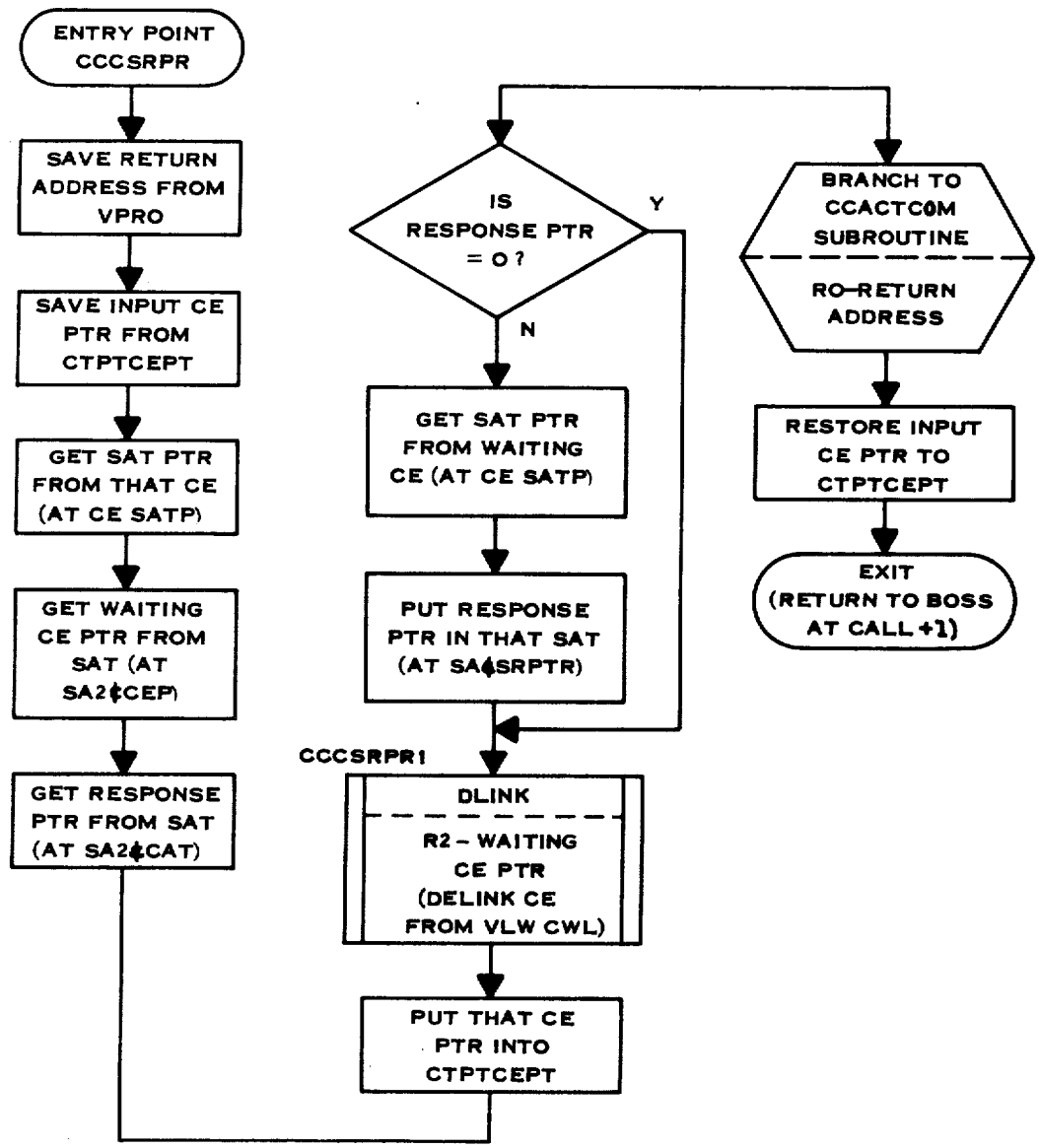
Fig. C-77

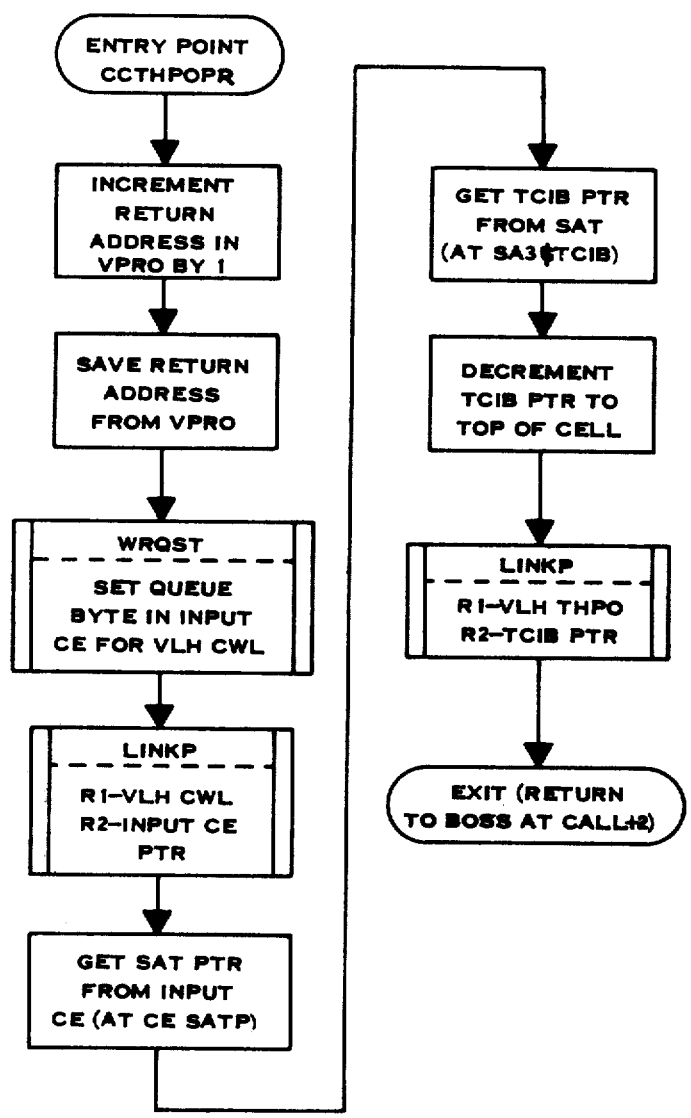
Fig. C-78

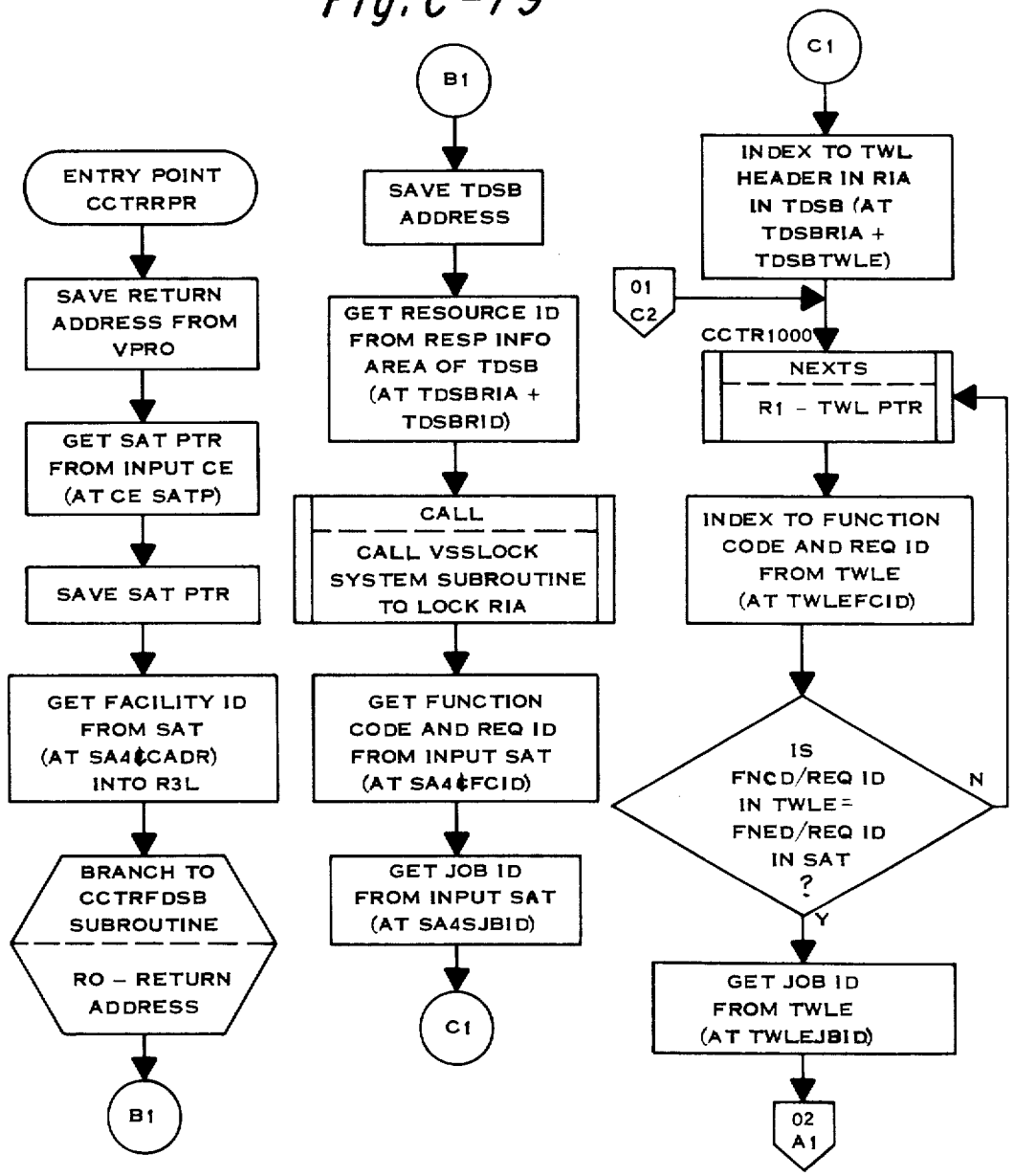
Fig. C-79

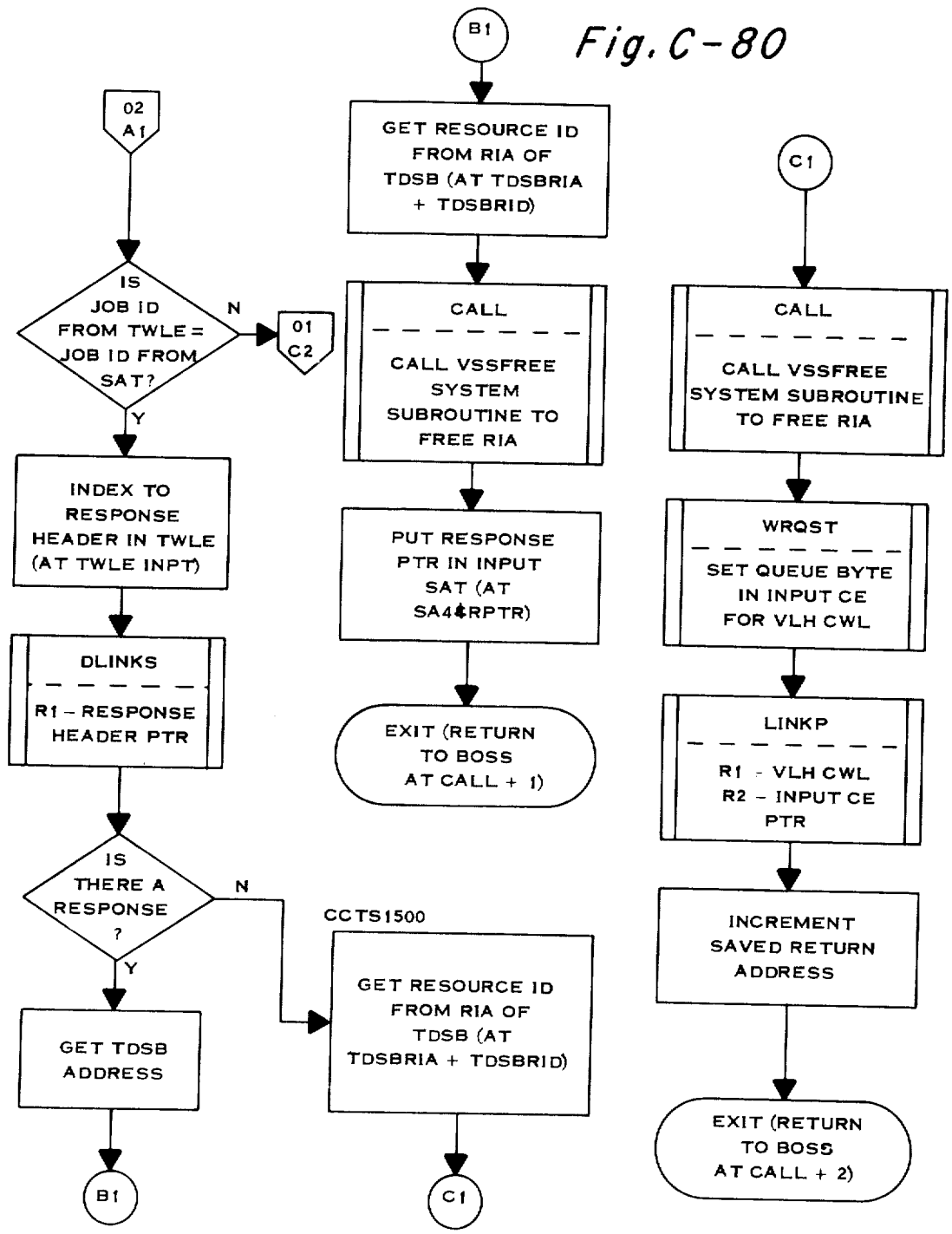
Fig. C-80

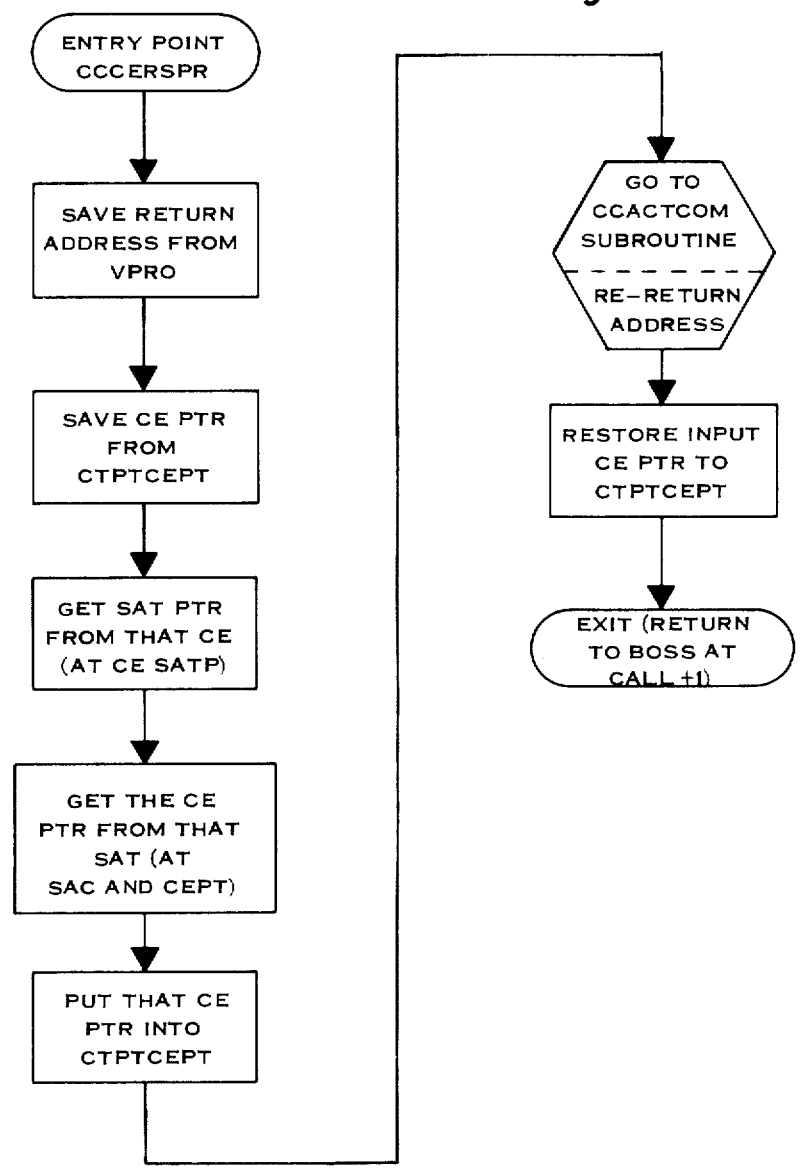
Fig. C-81

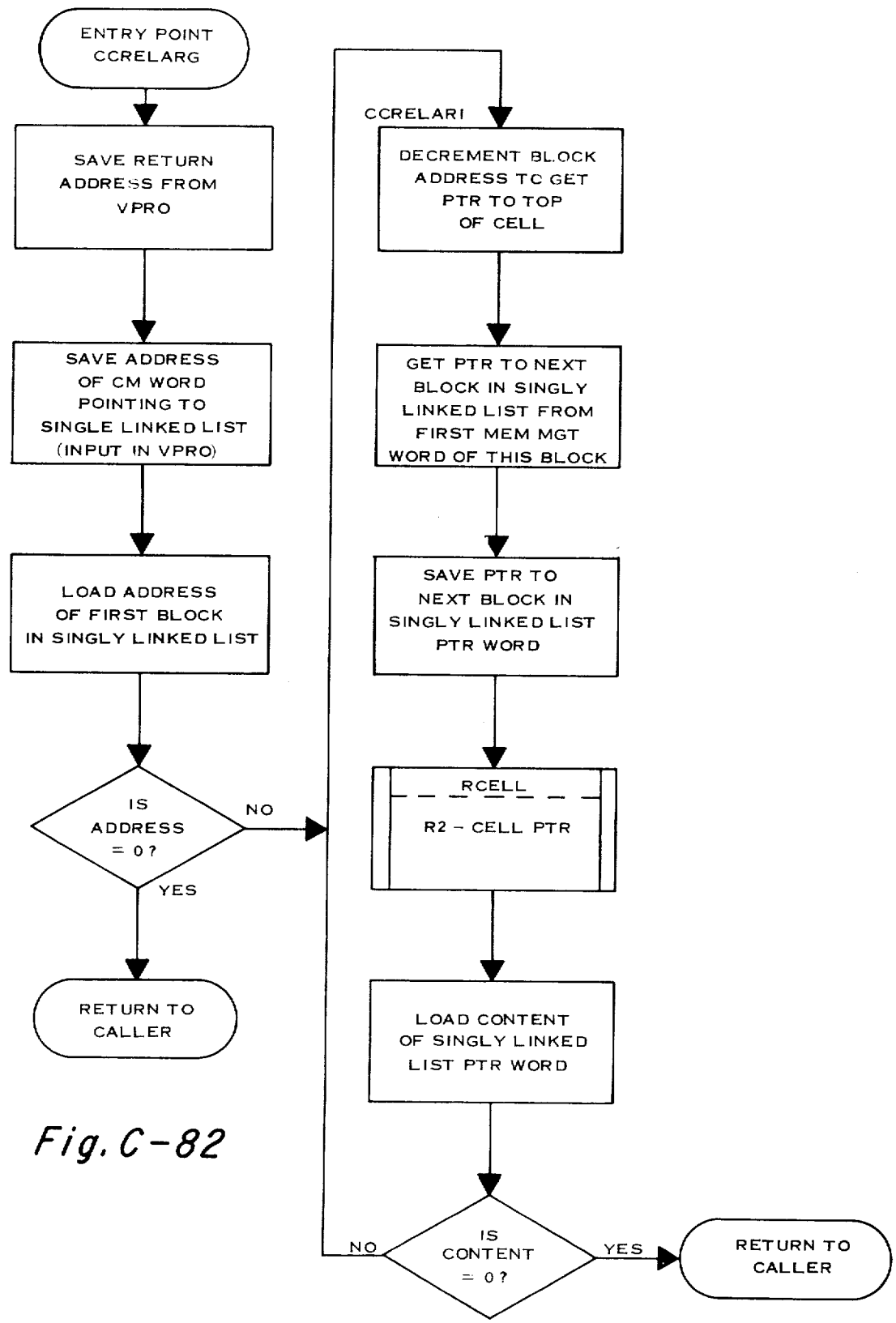
Fig. C-82

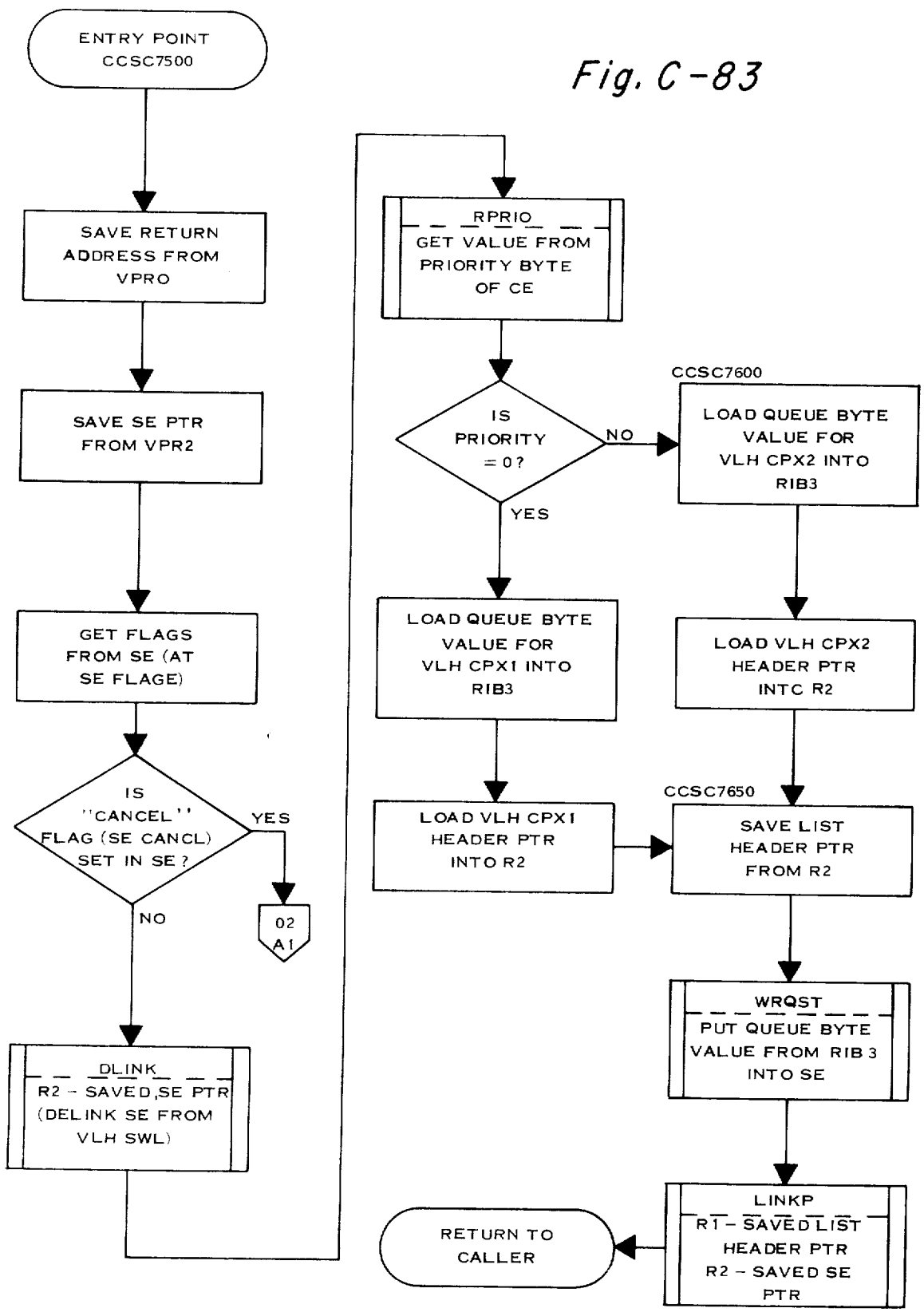
Fig. C-83

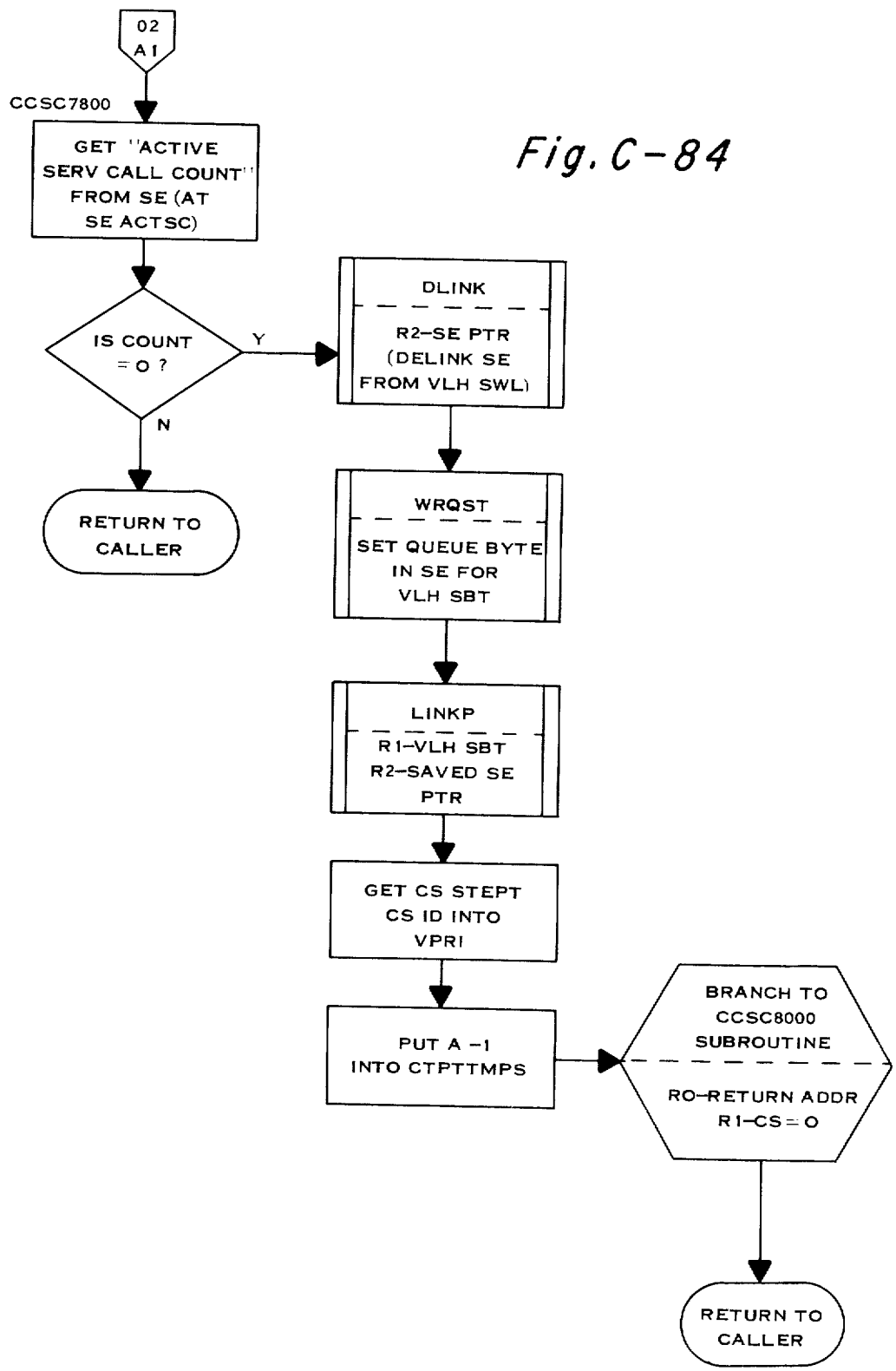
Fig. C-84

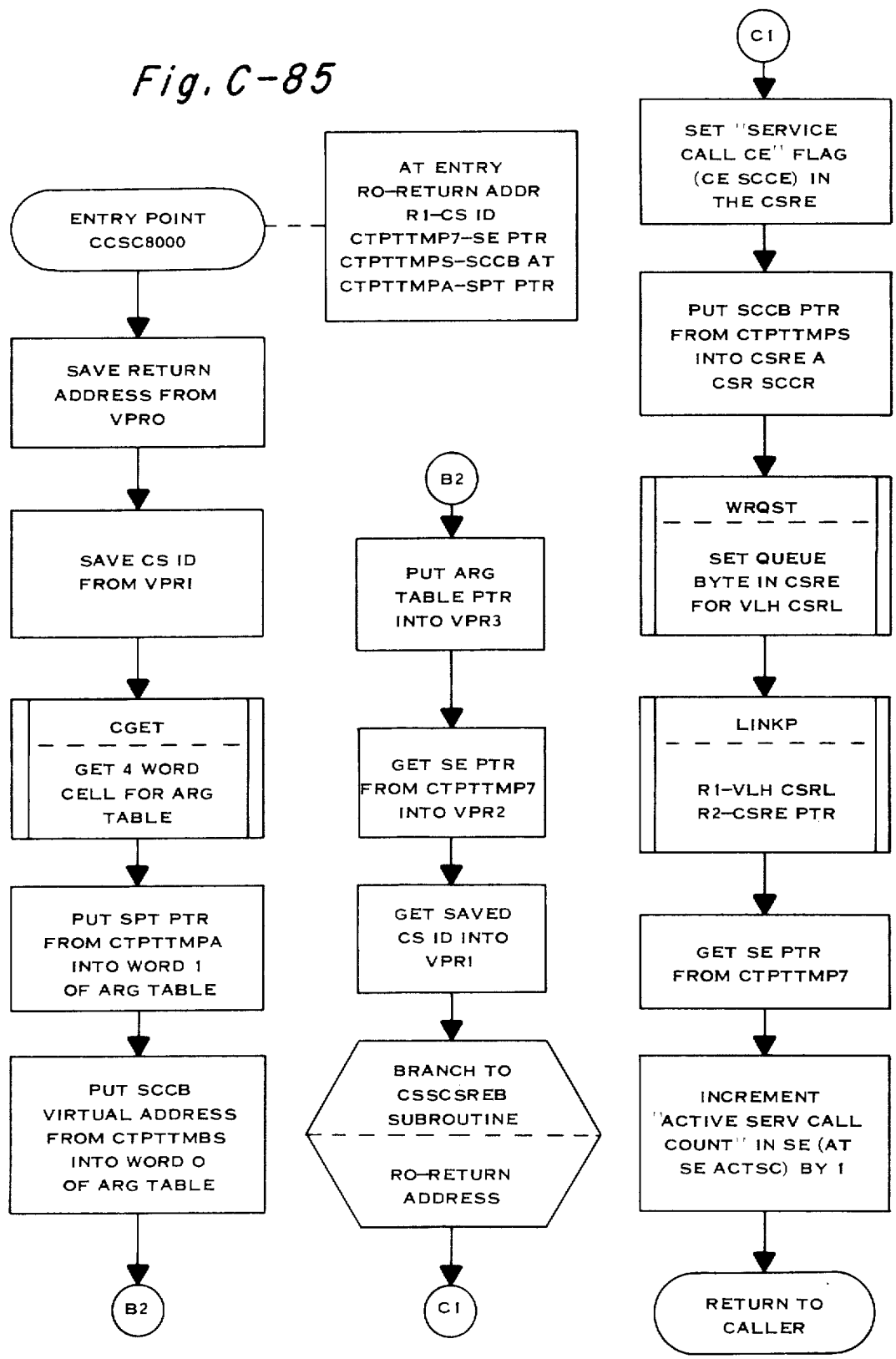
Fig. C-85

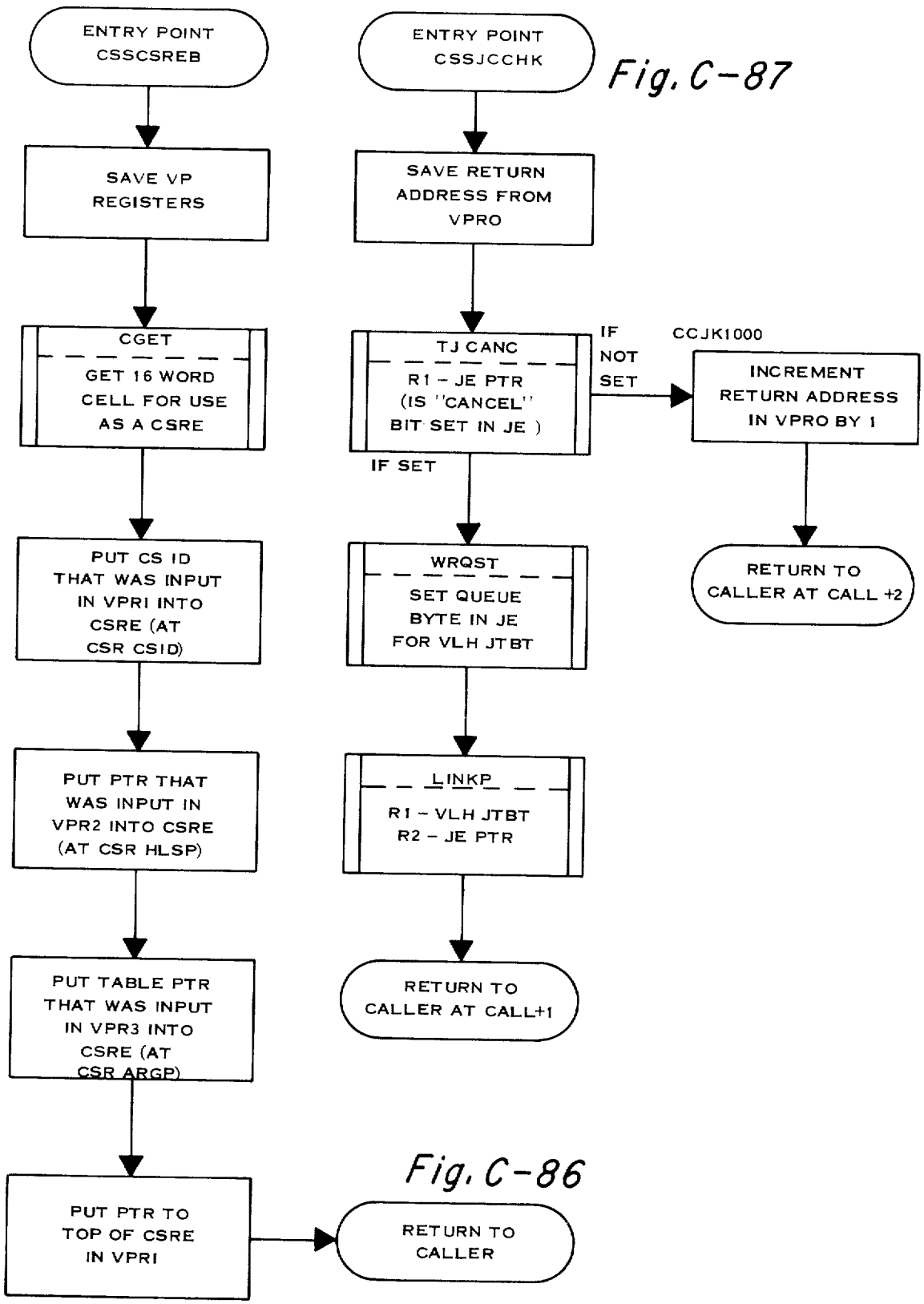

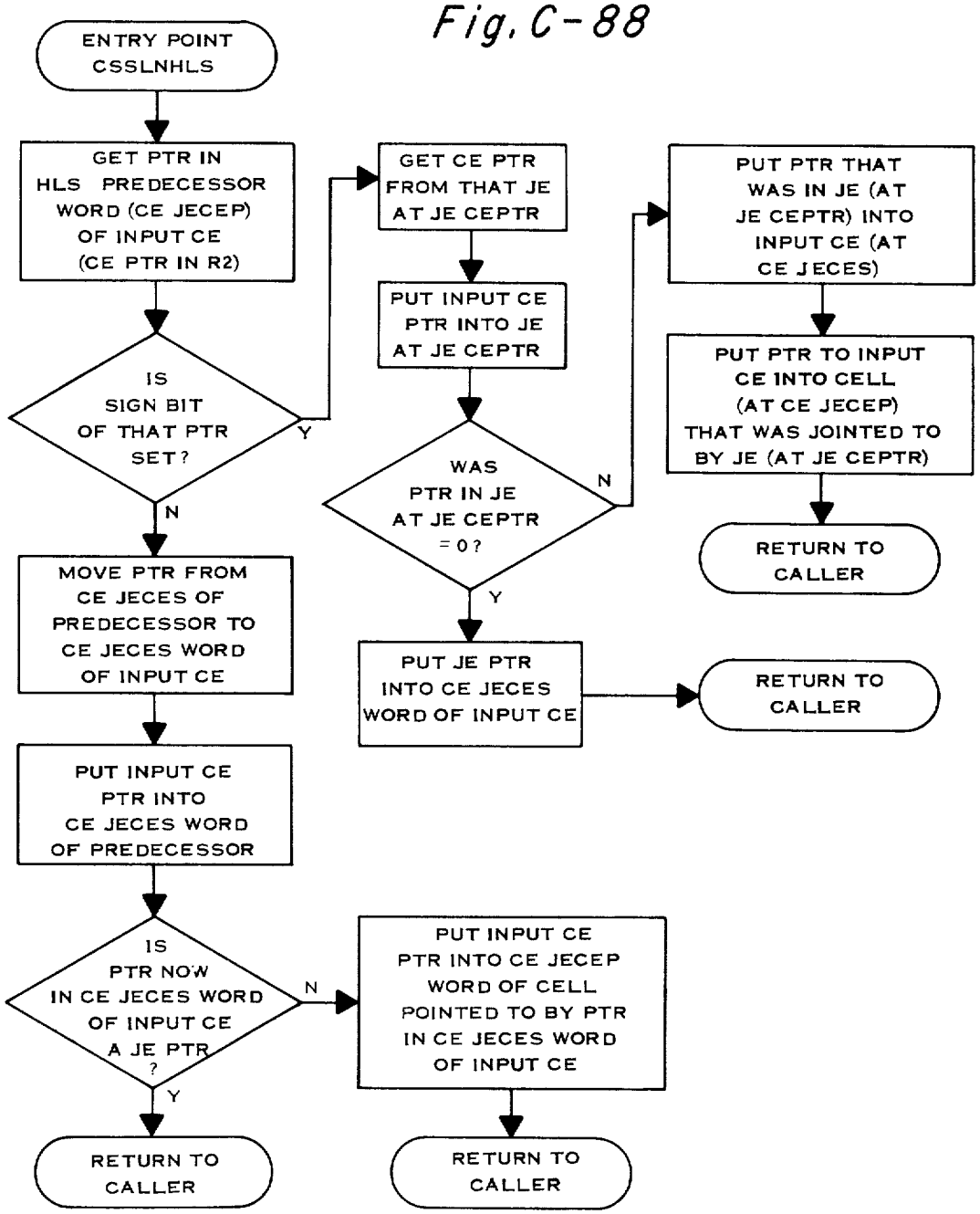
Fig. C-88

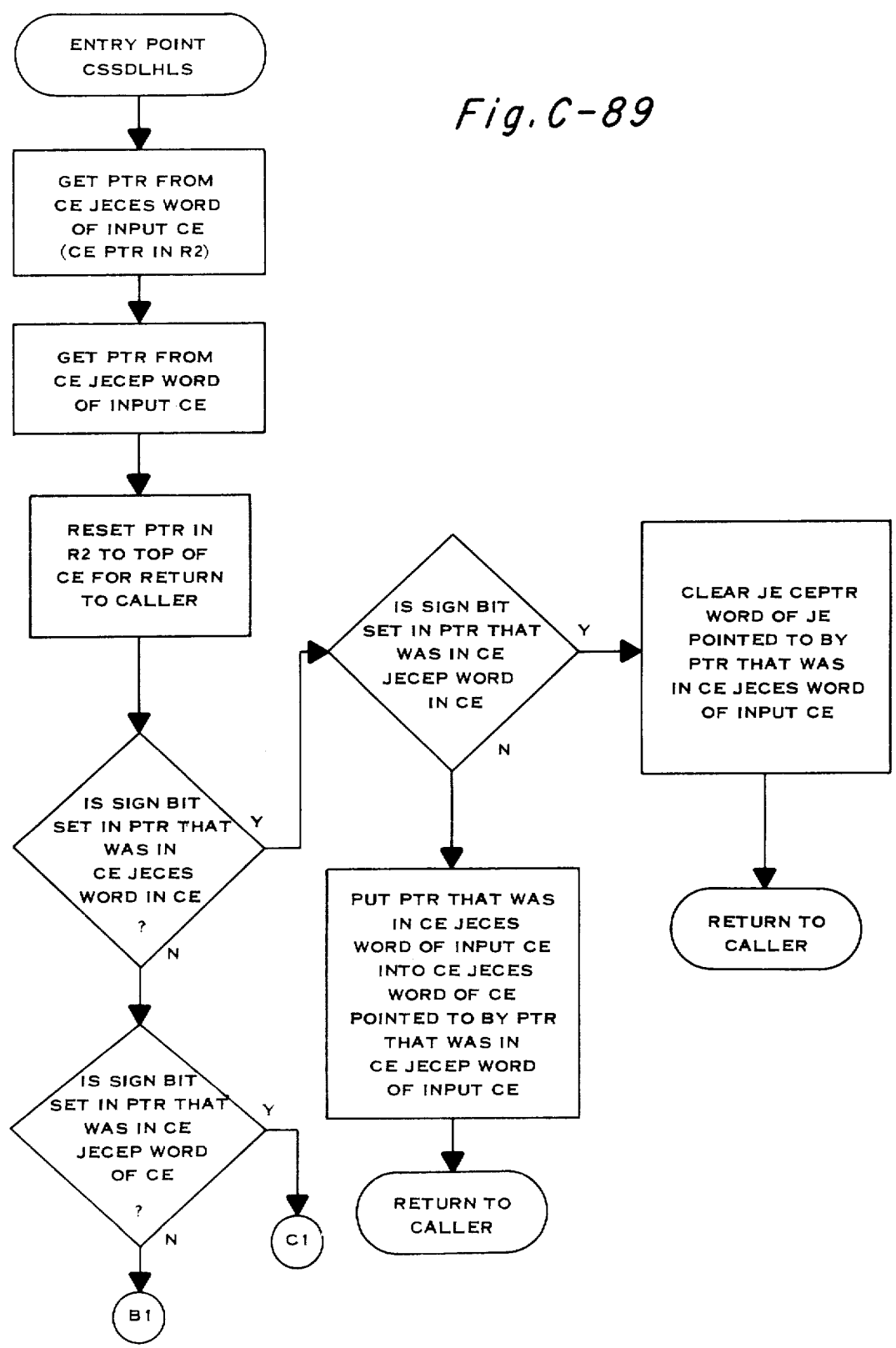
Fig. C-89

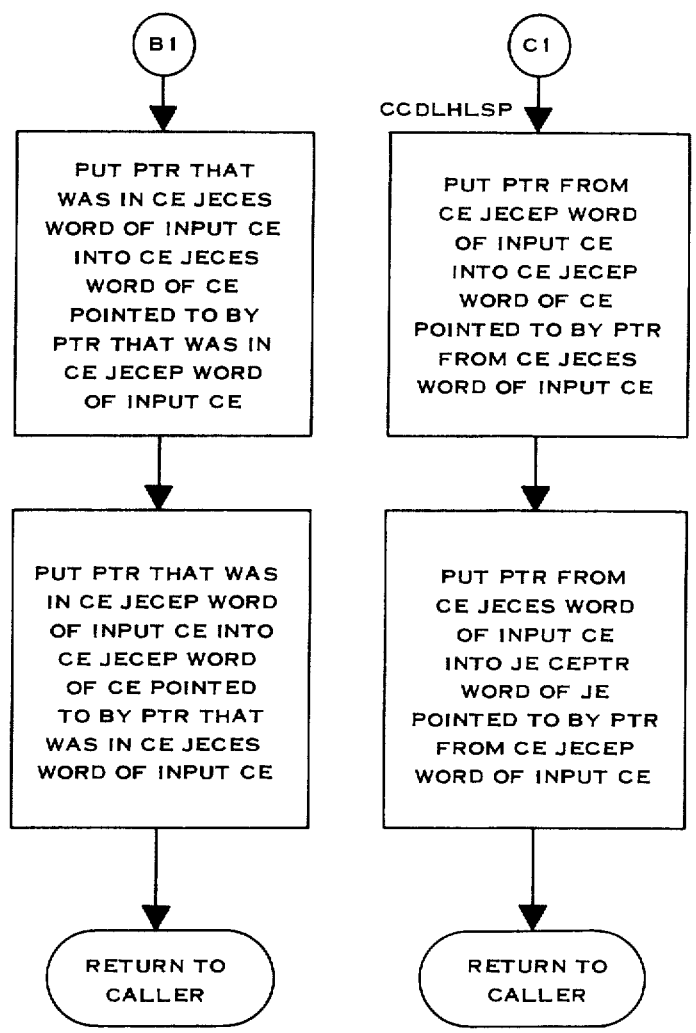
Fig. C-89 (con't.)

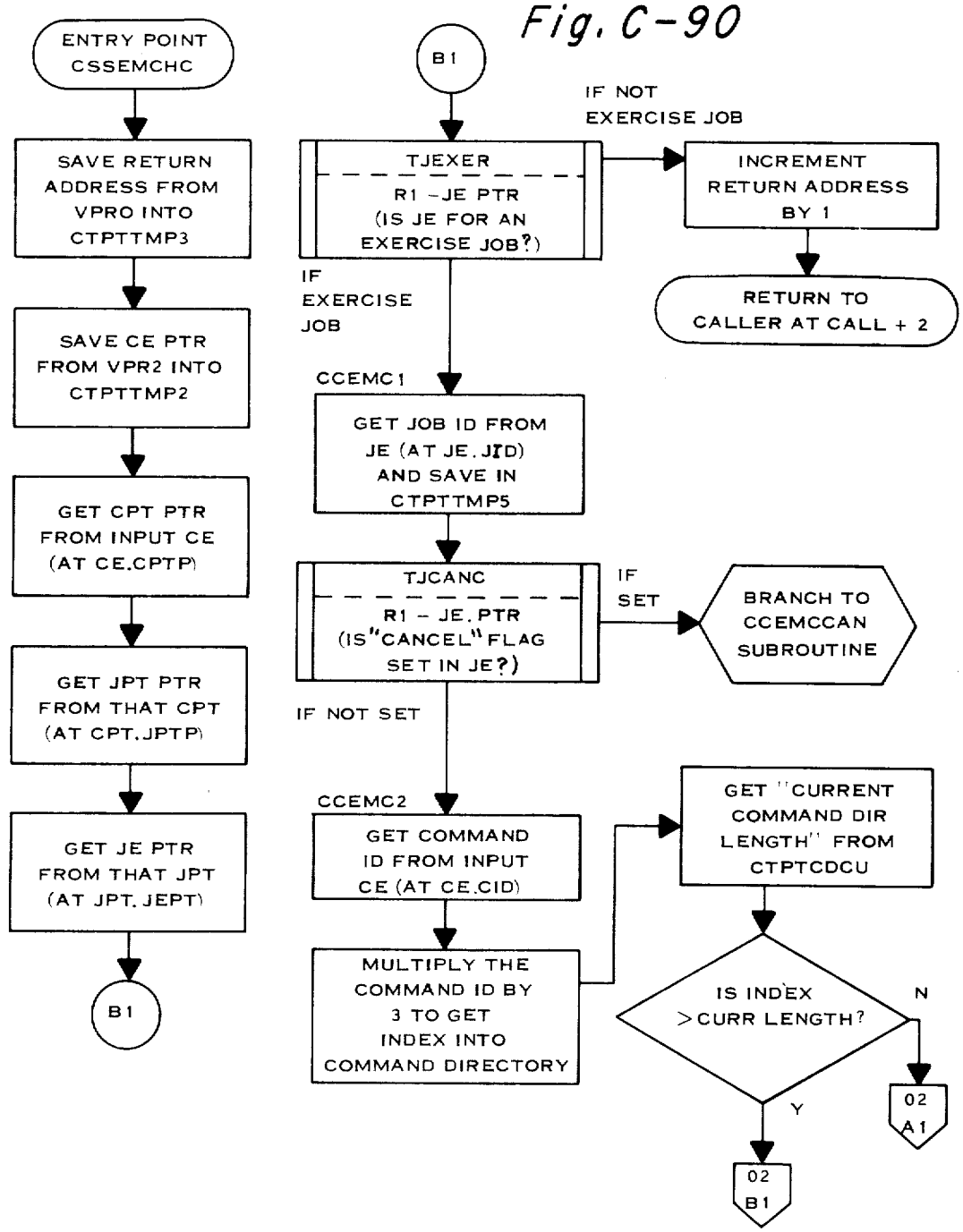
Fig. C-90

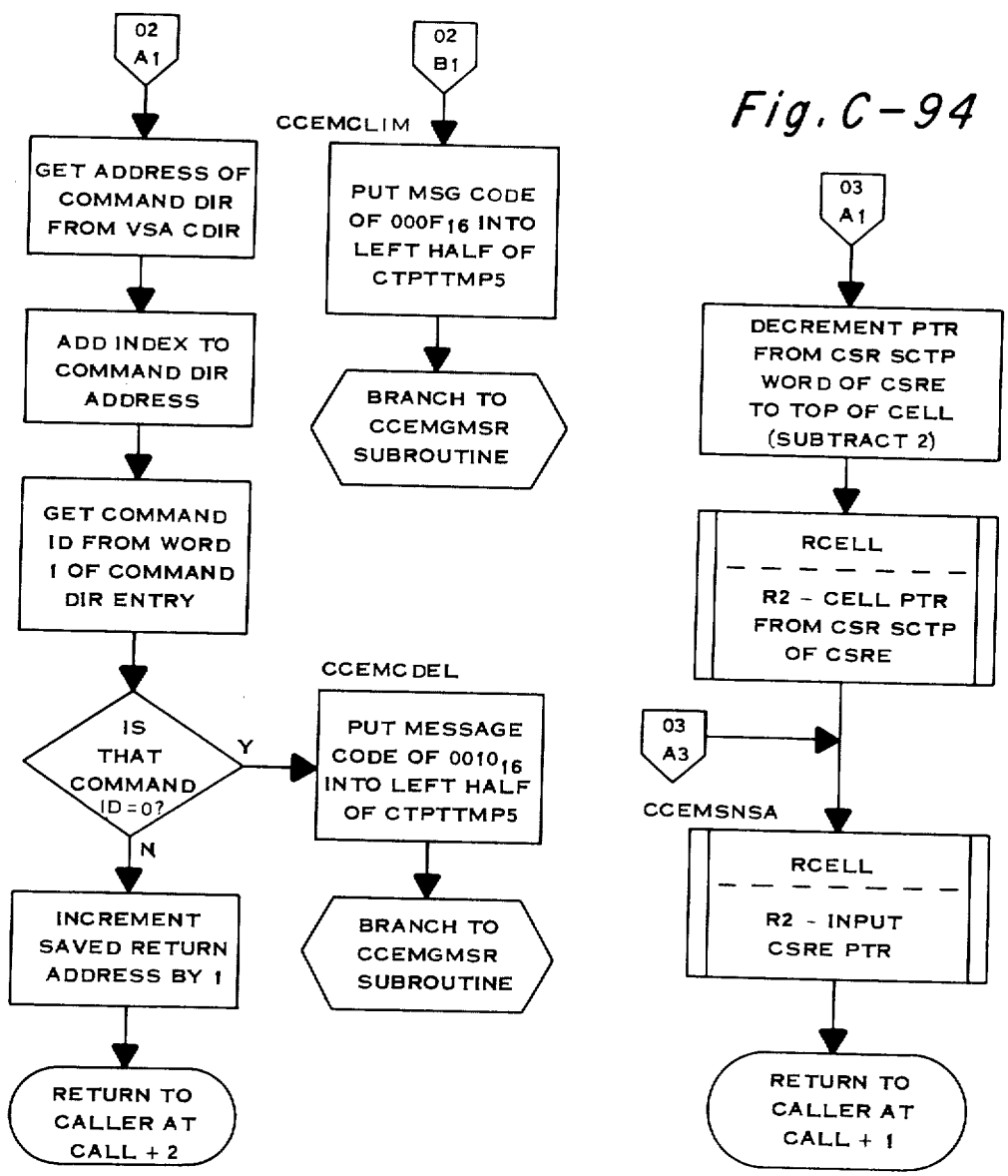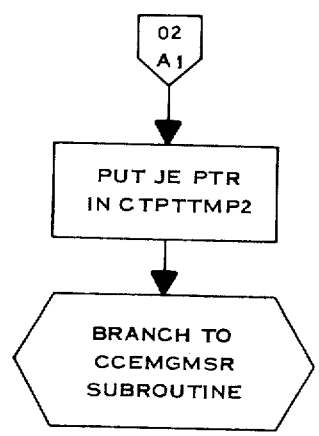

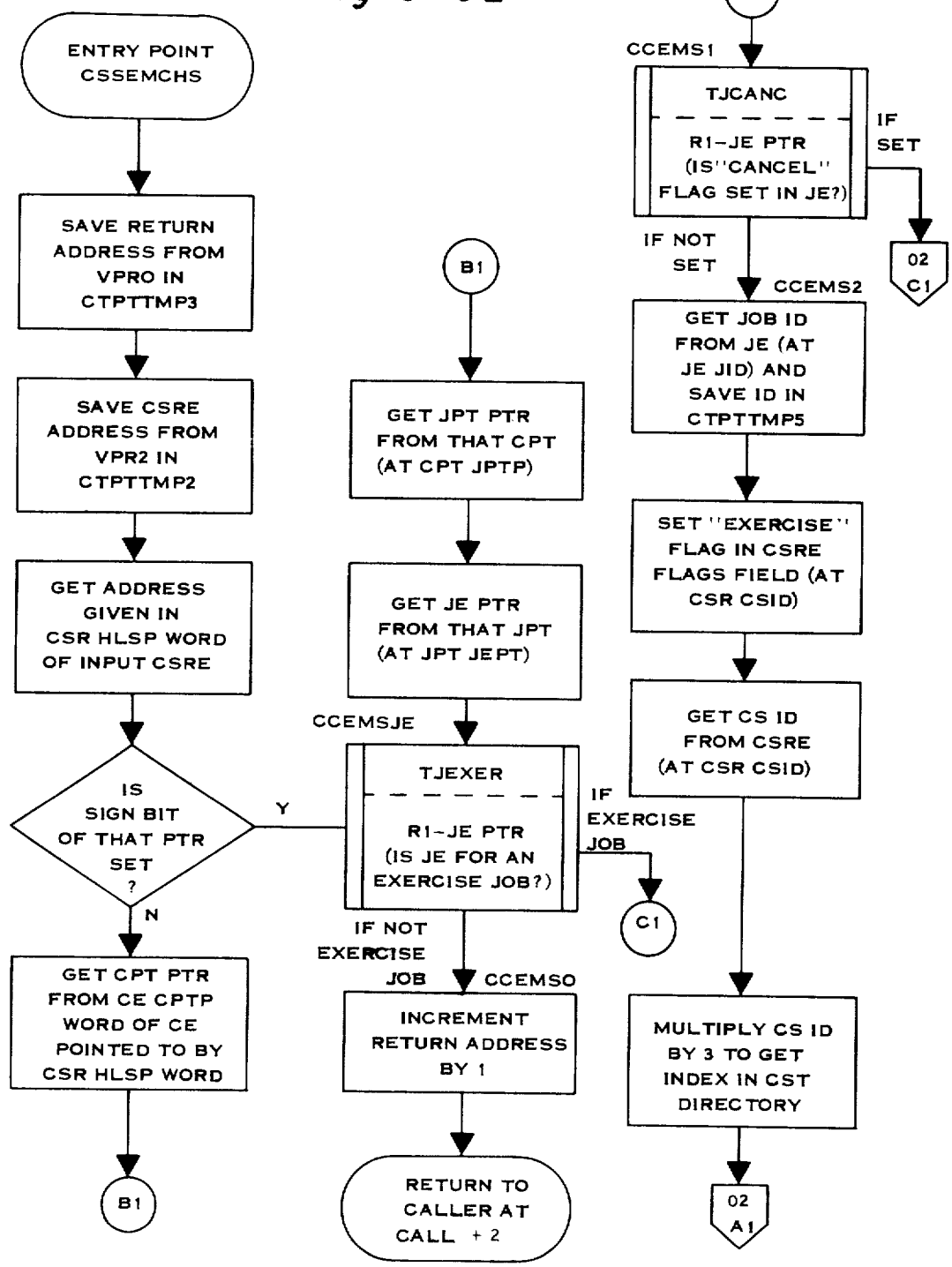
Fig. C-92

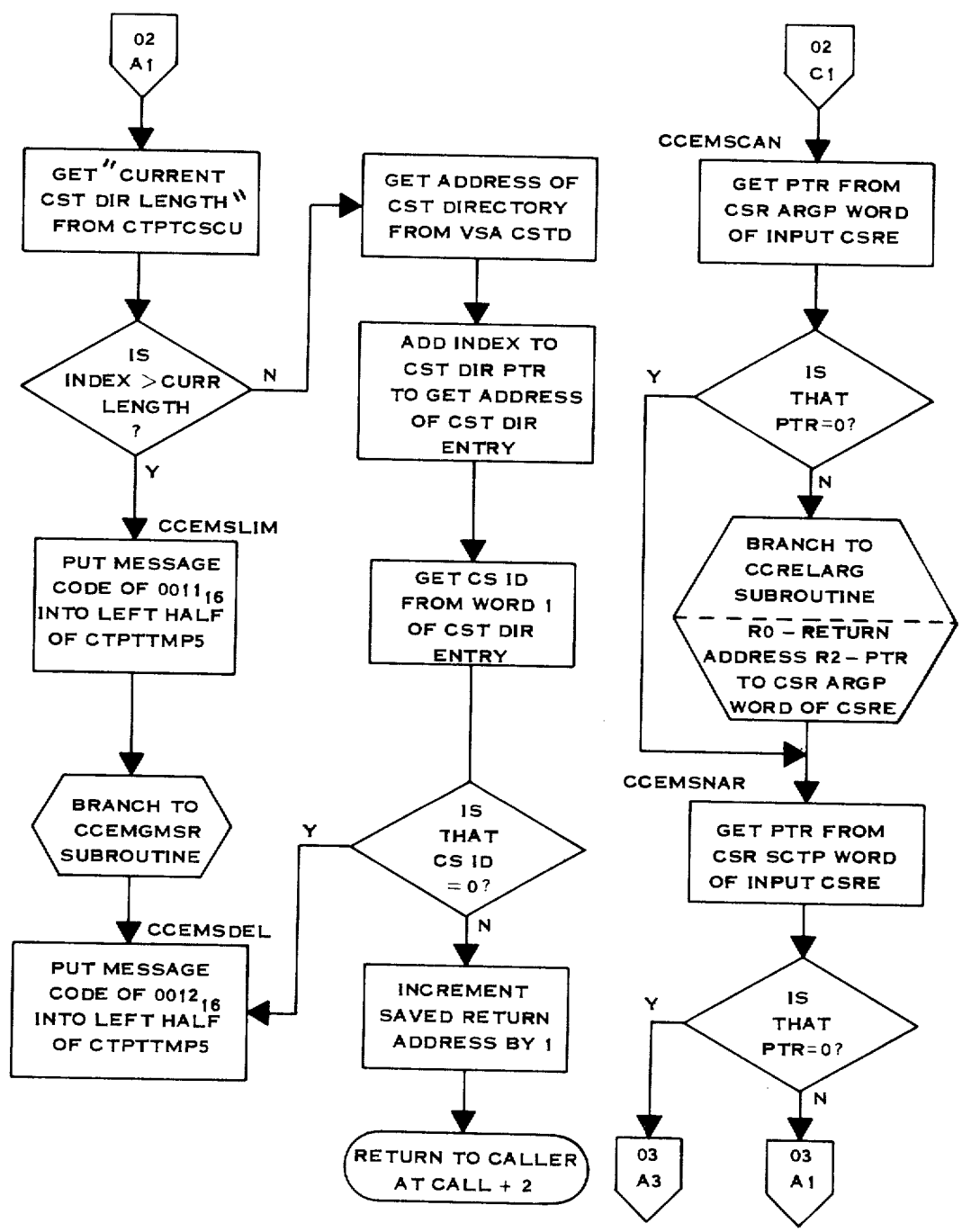
Fig. C-93

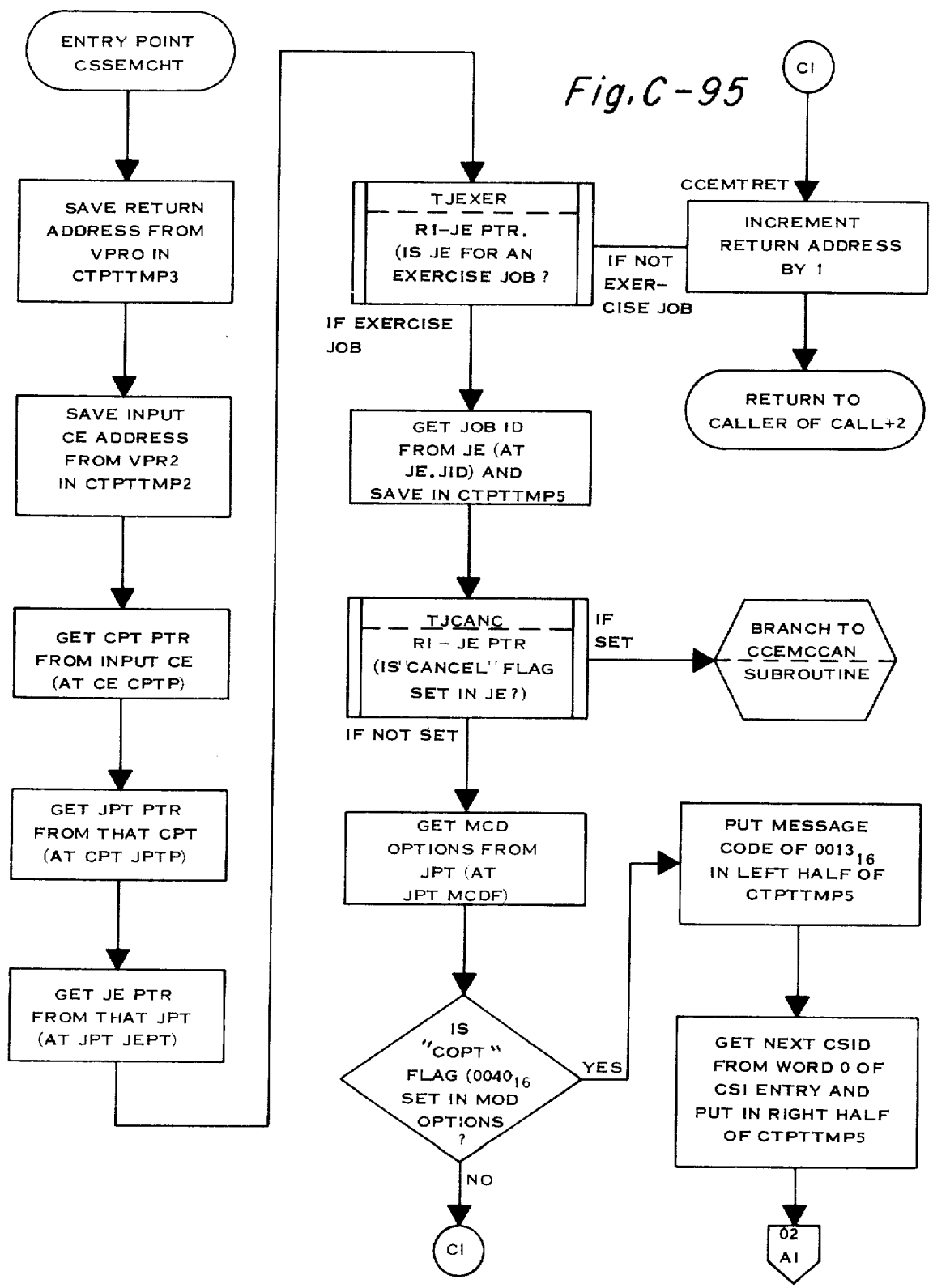
Fig. C-95

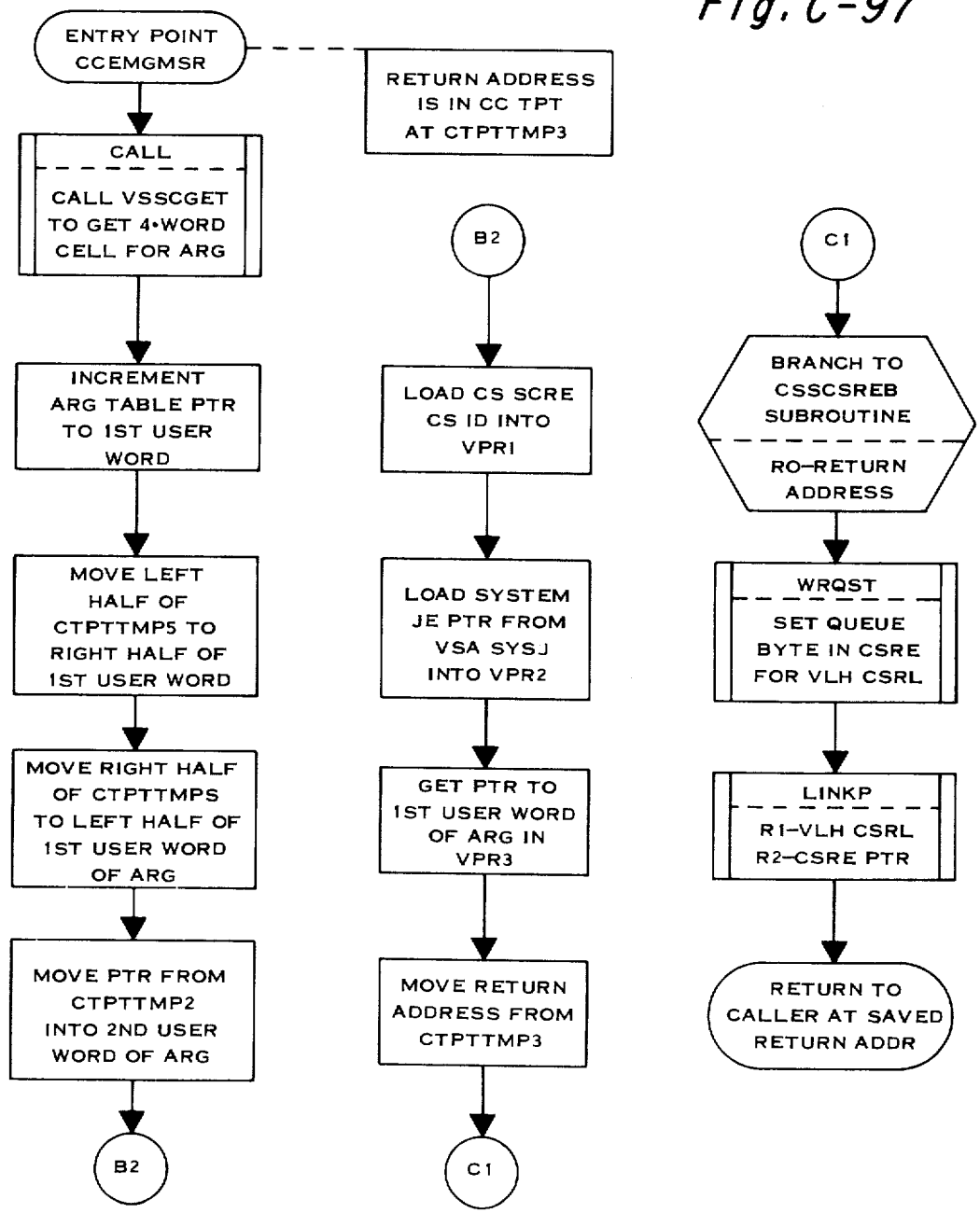
Fig. C-97

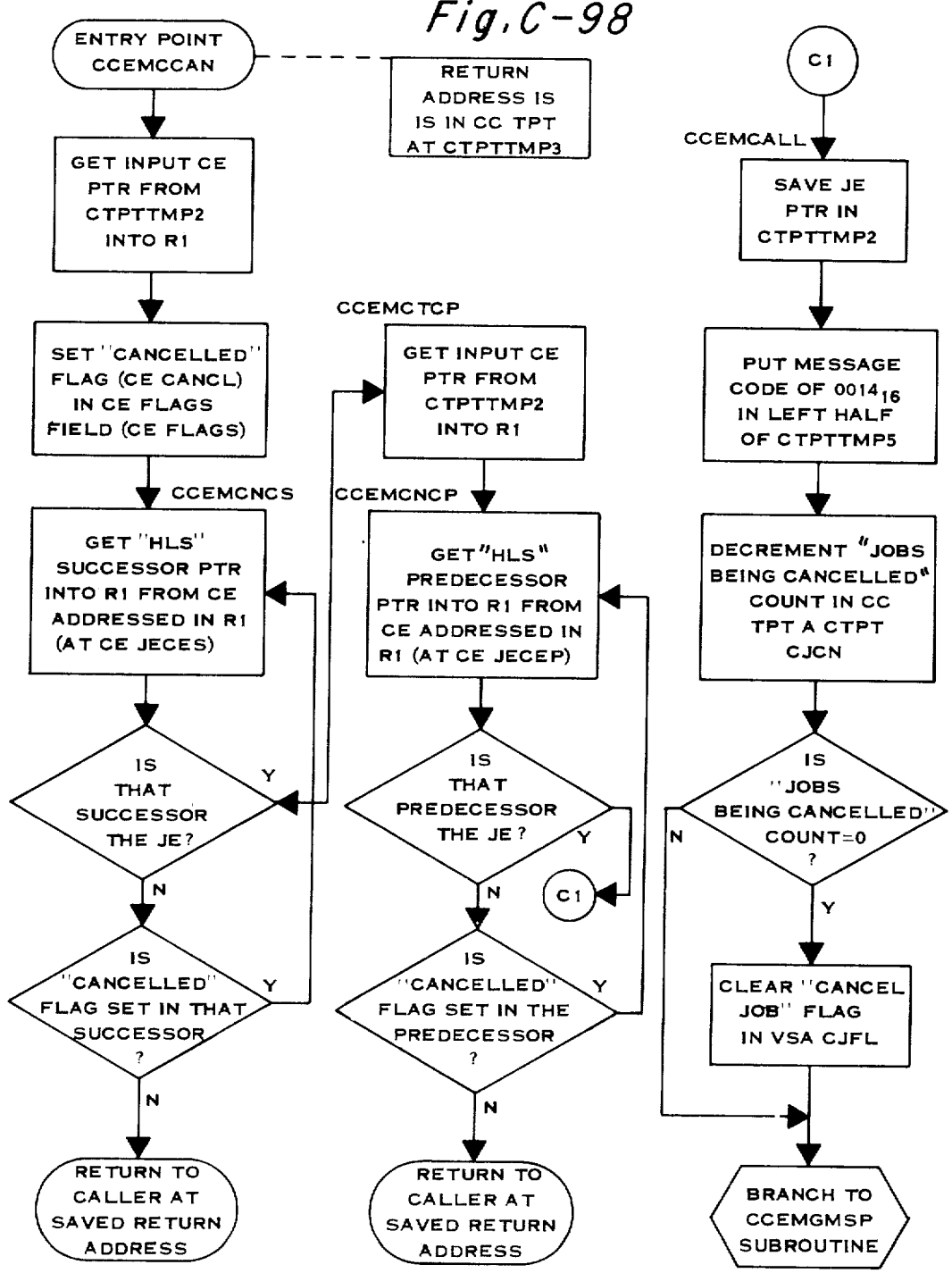
Fig. C-98

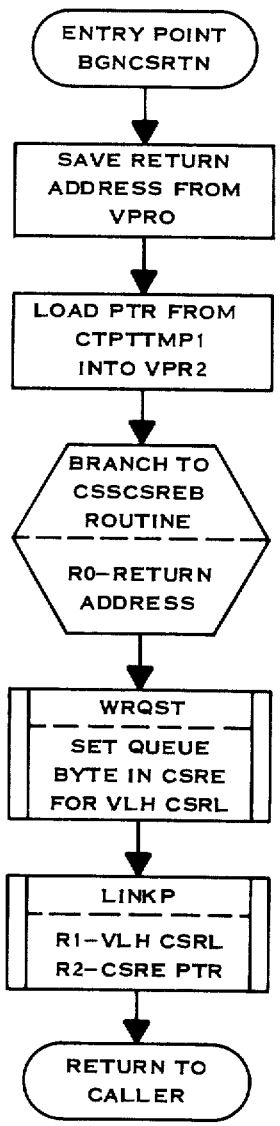
Fig. C-99
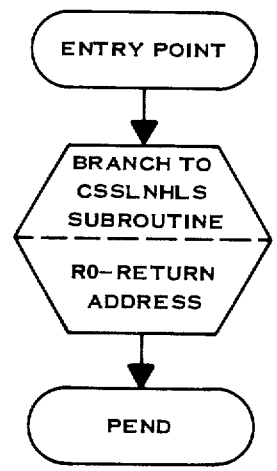
Fig. C-100
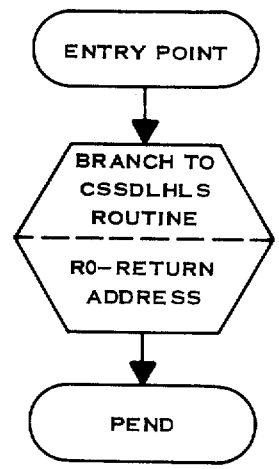
Fig. C-101

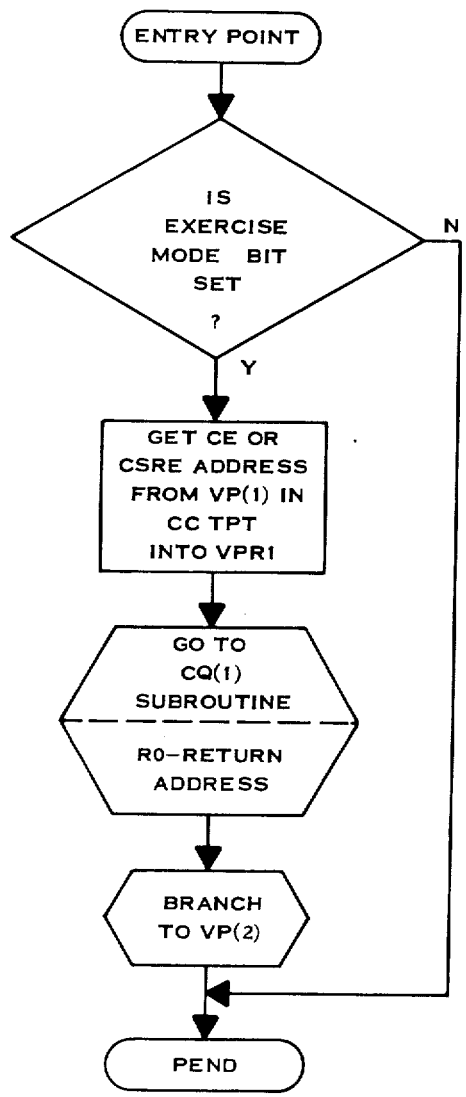
Fig. C-102
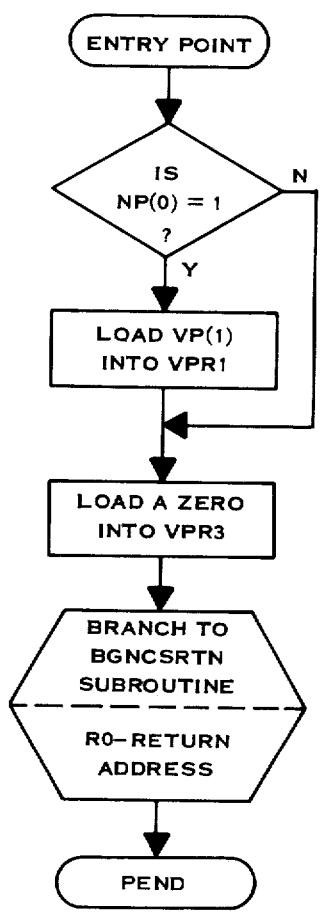
Fig. C-103

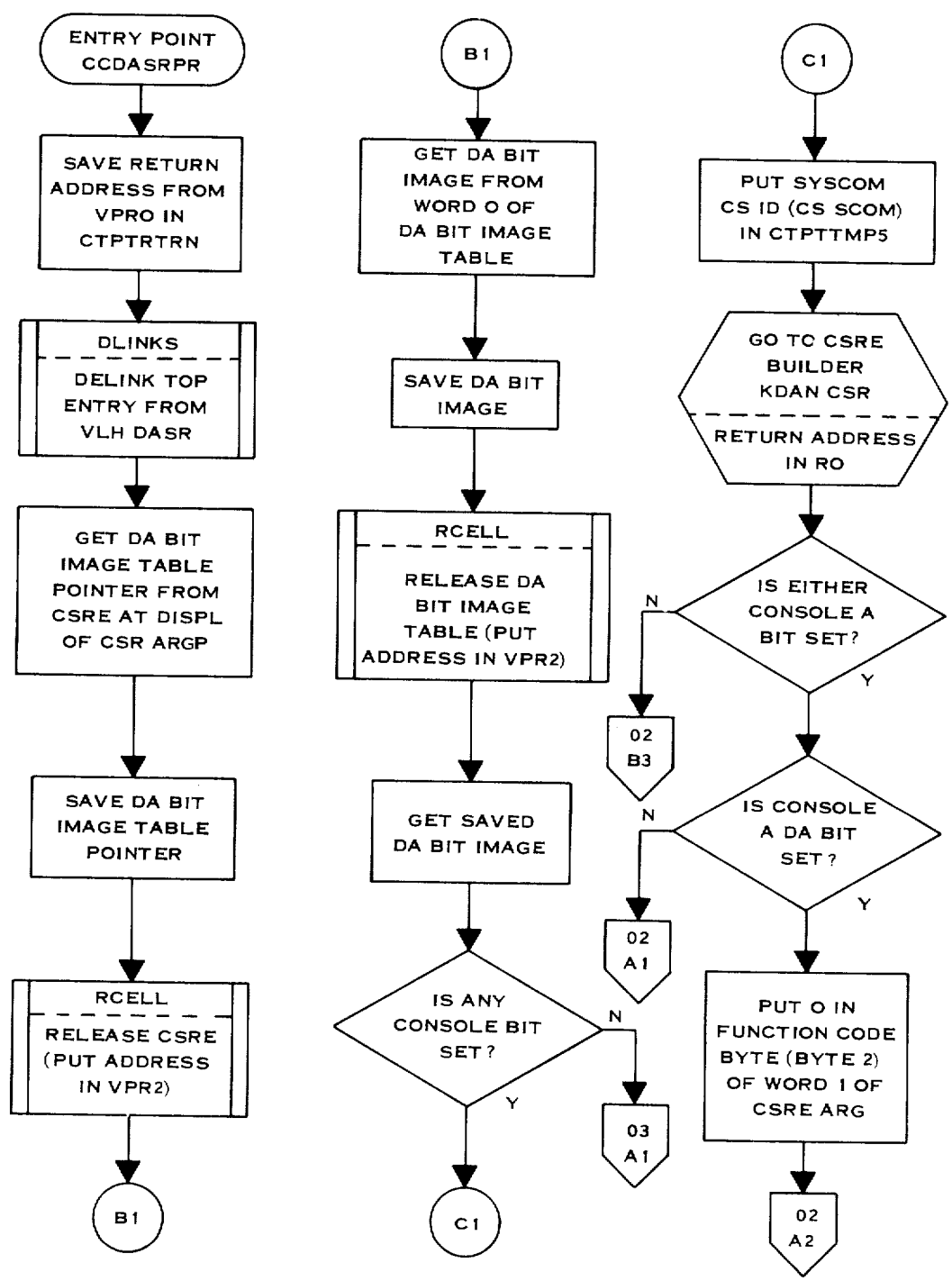
Fig. C-104

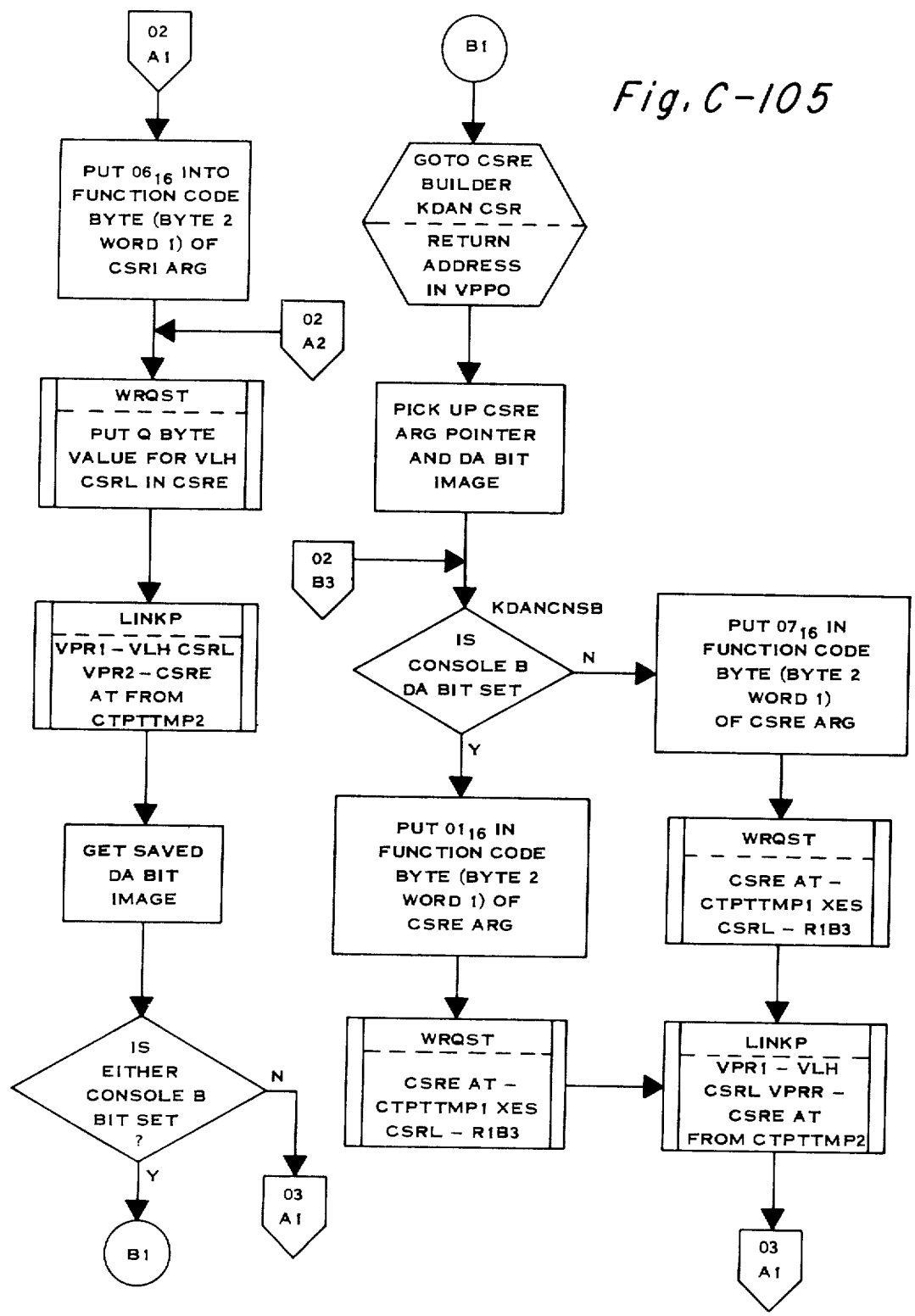
Fig. C-105

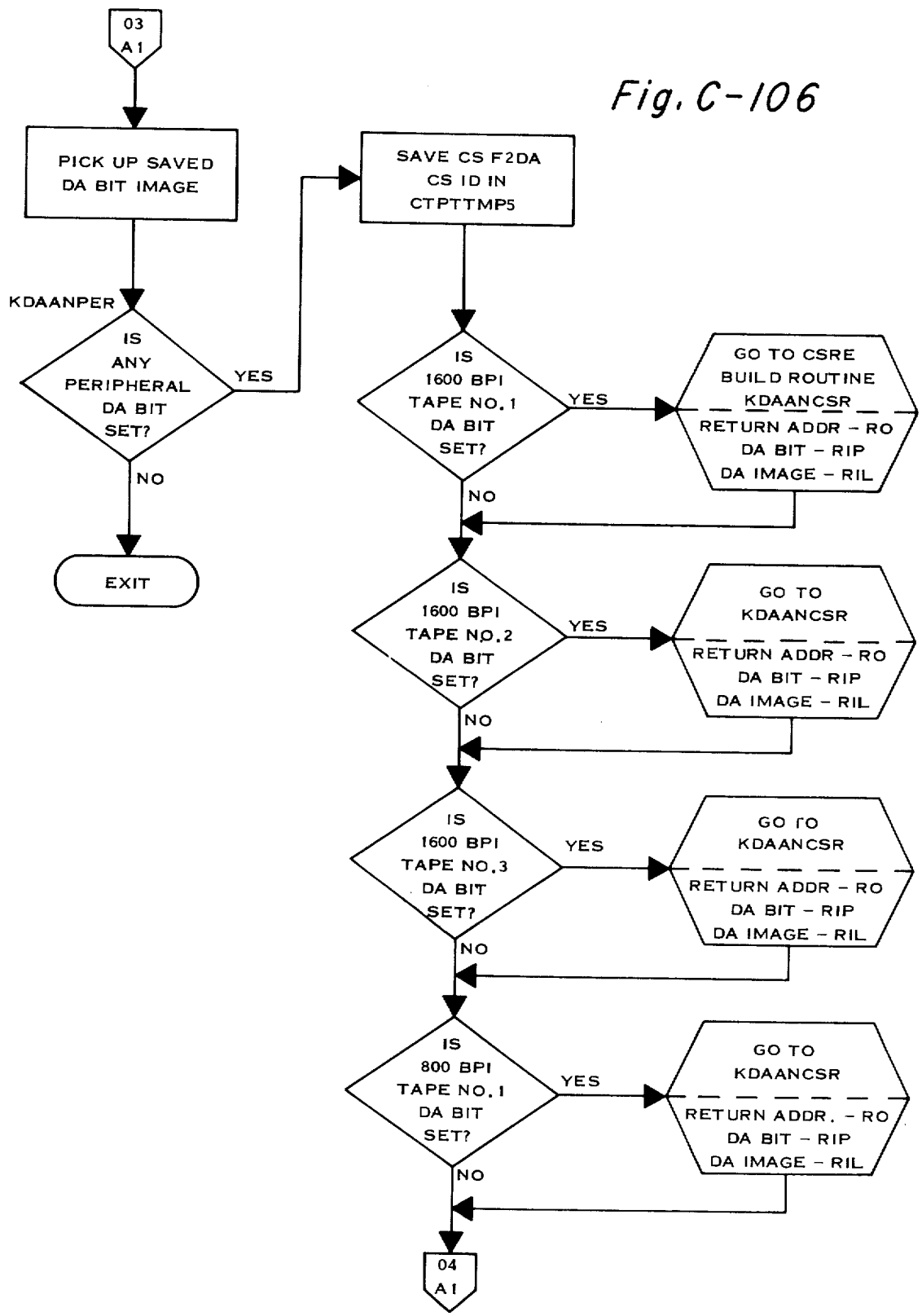
Fig. C-106

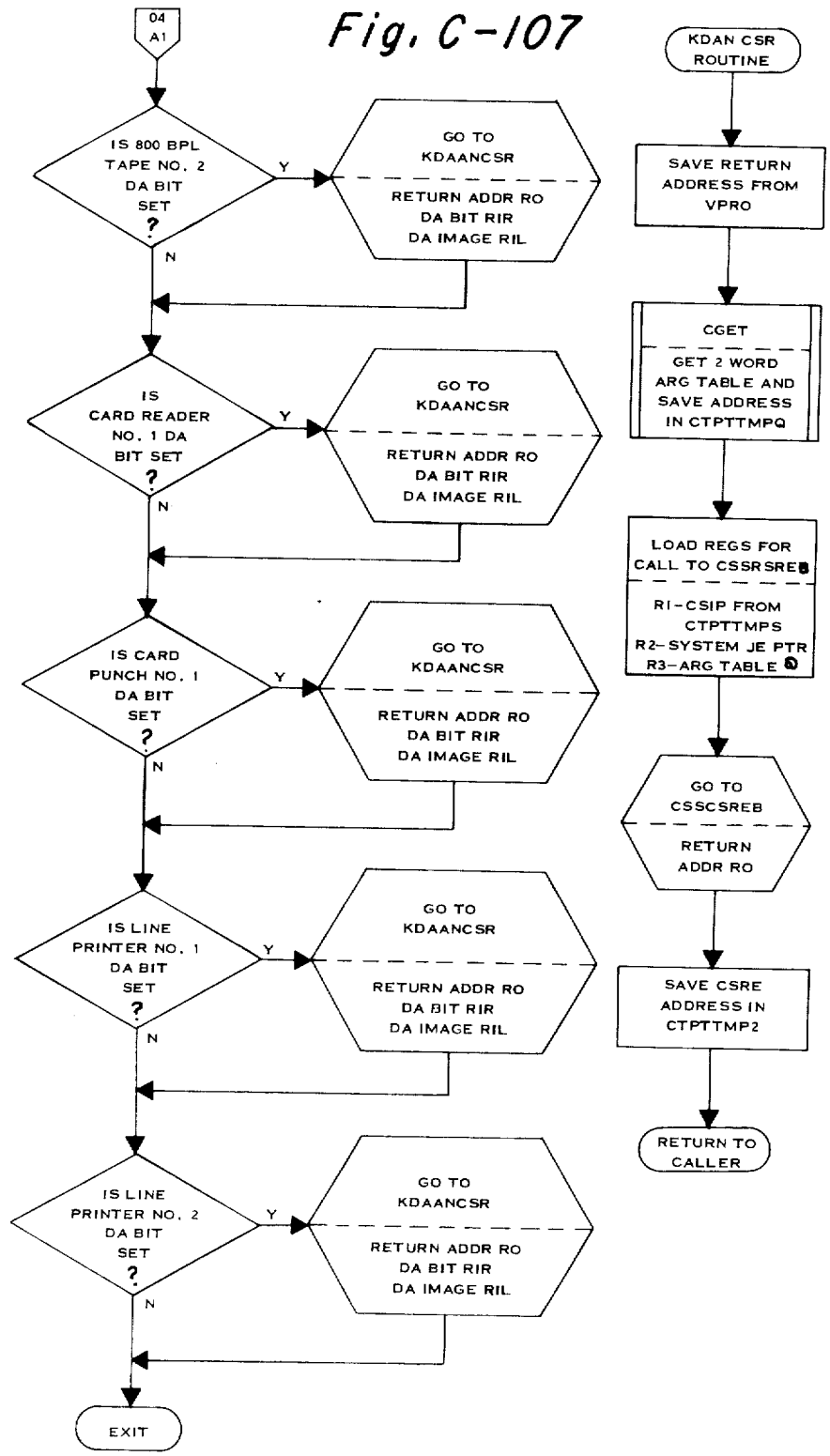
Fig. C-107

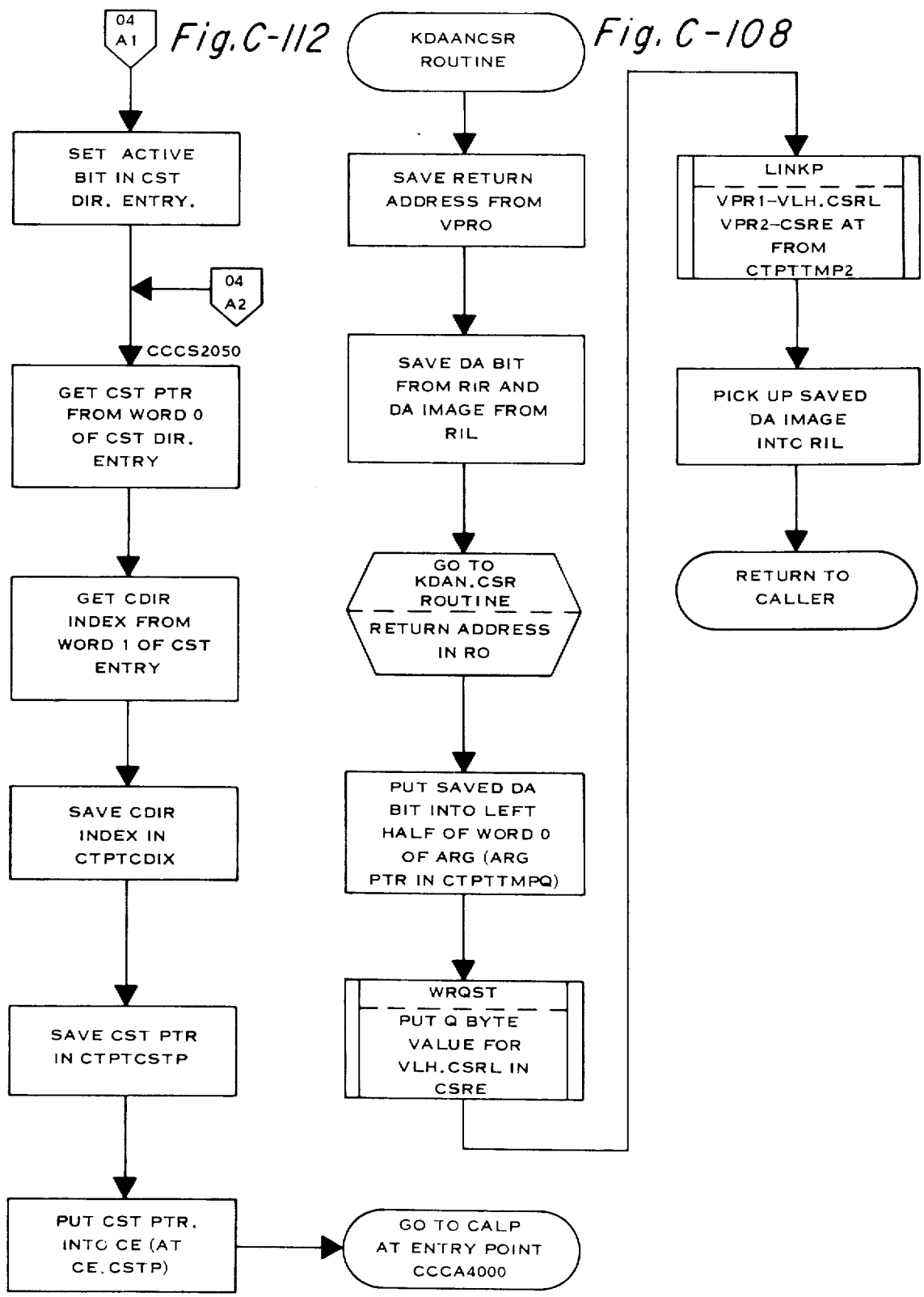

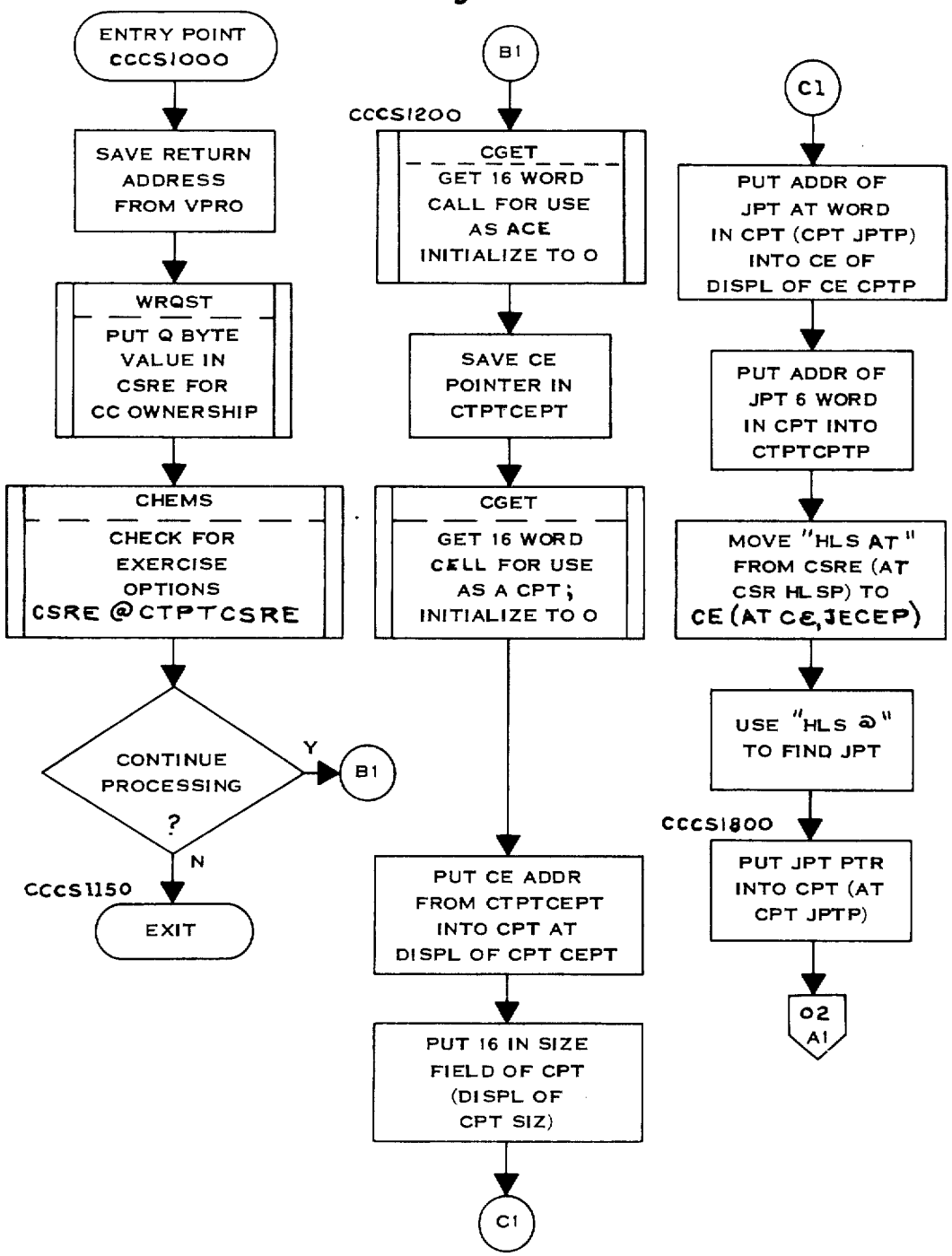
Fig. C-109

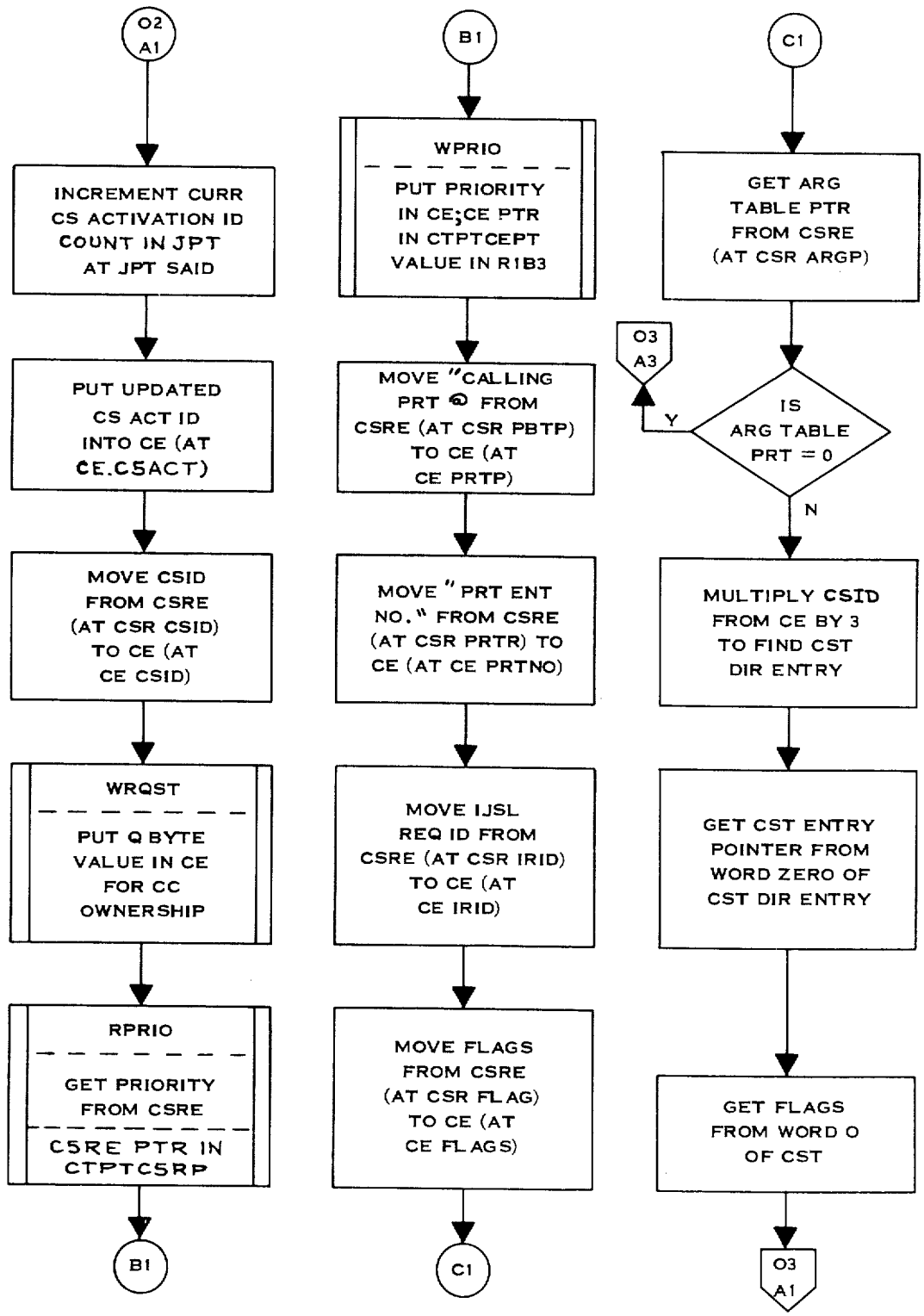
Fig. C-110

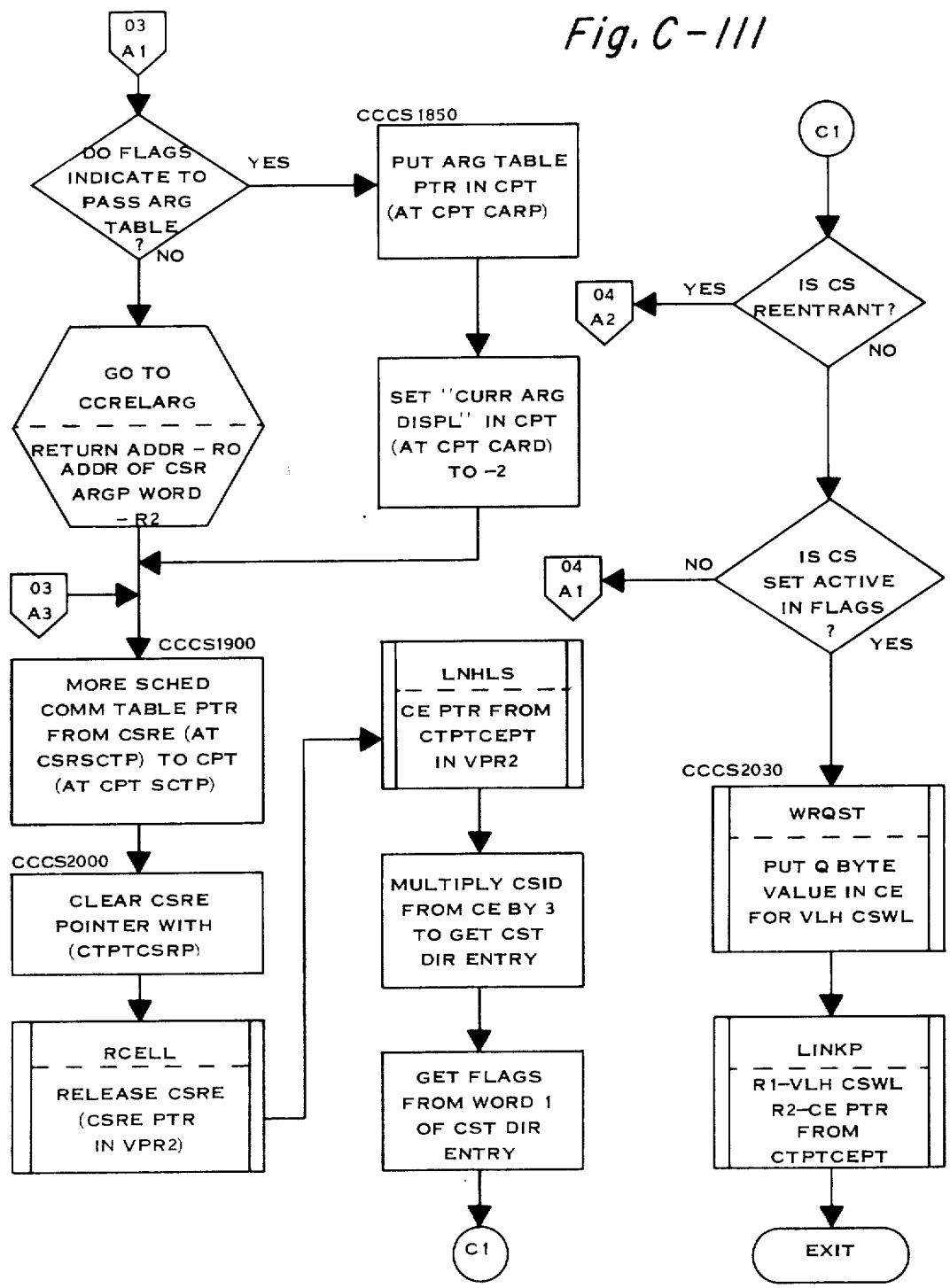
Fig. C-111

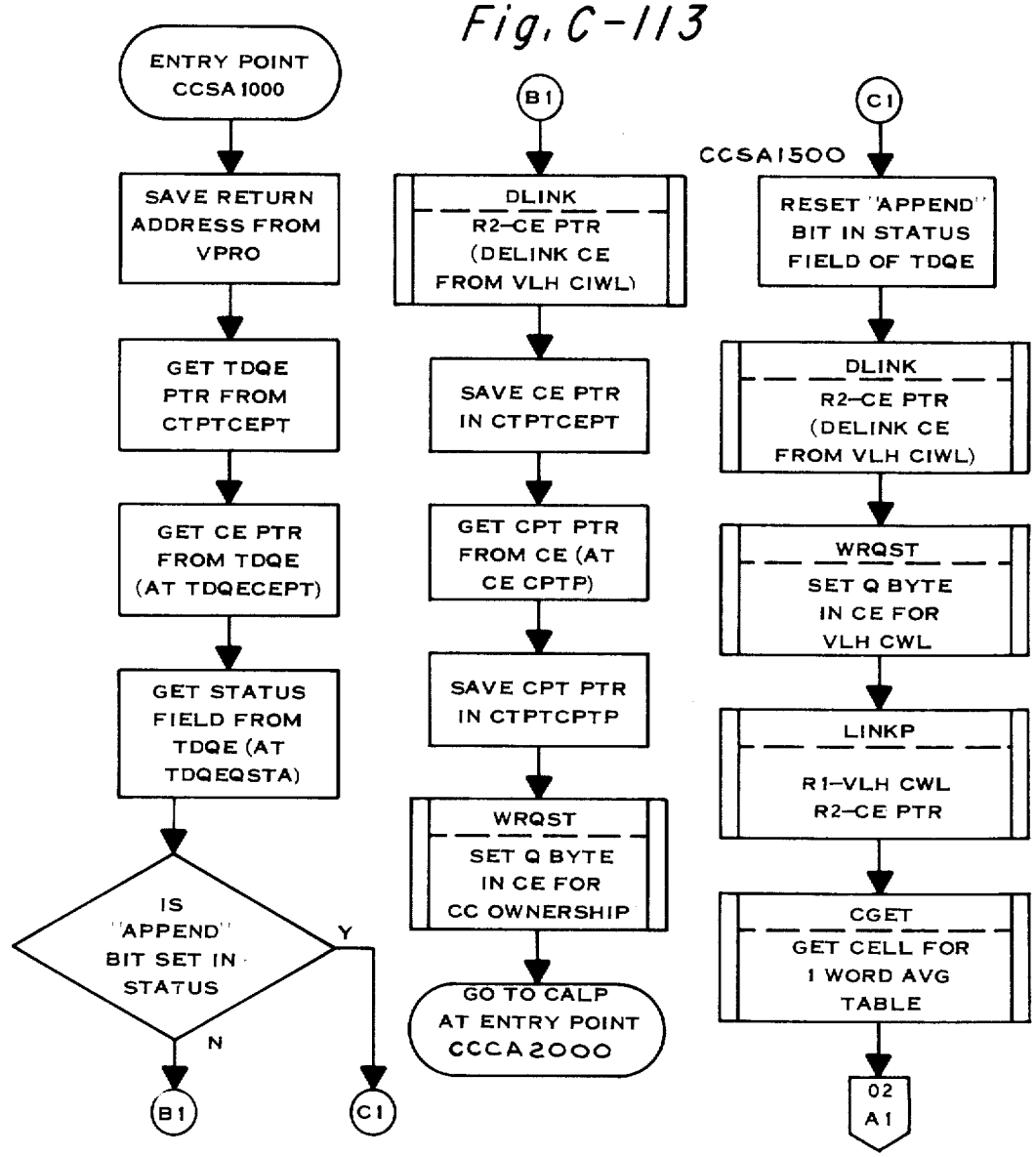
Fig. C-113

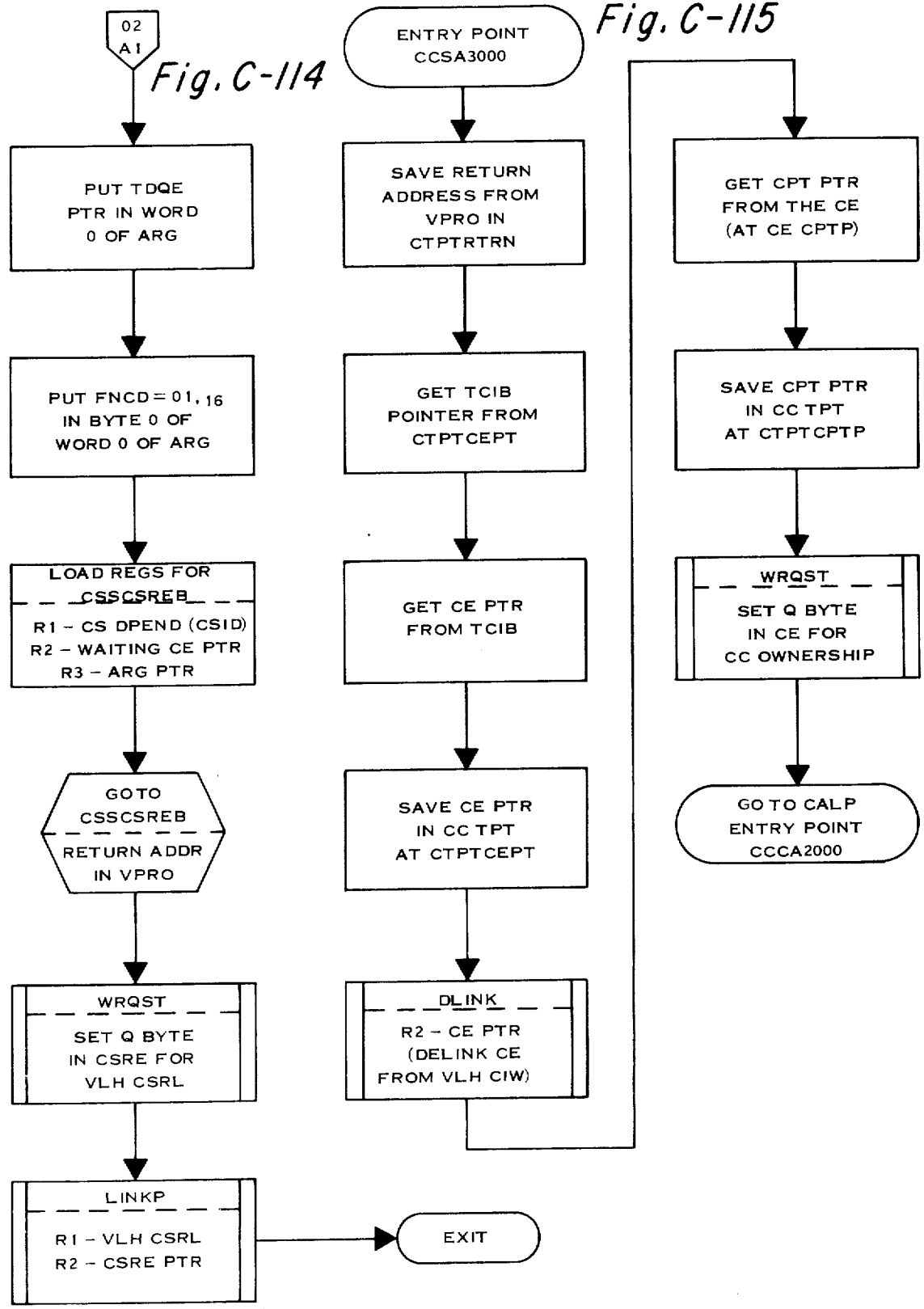

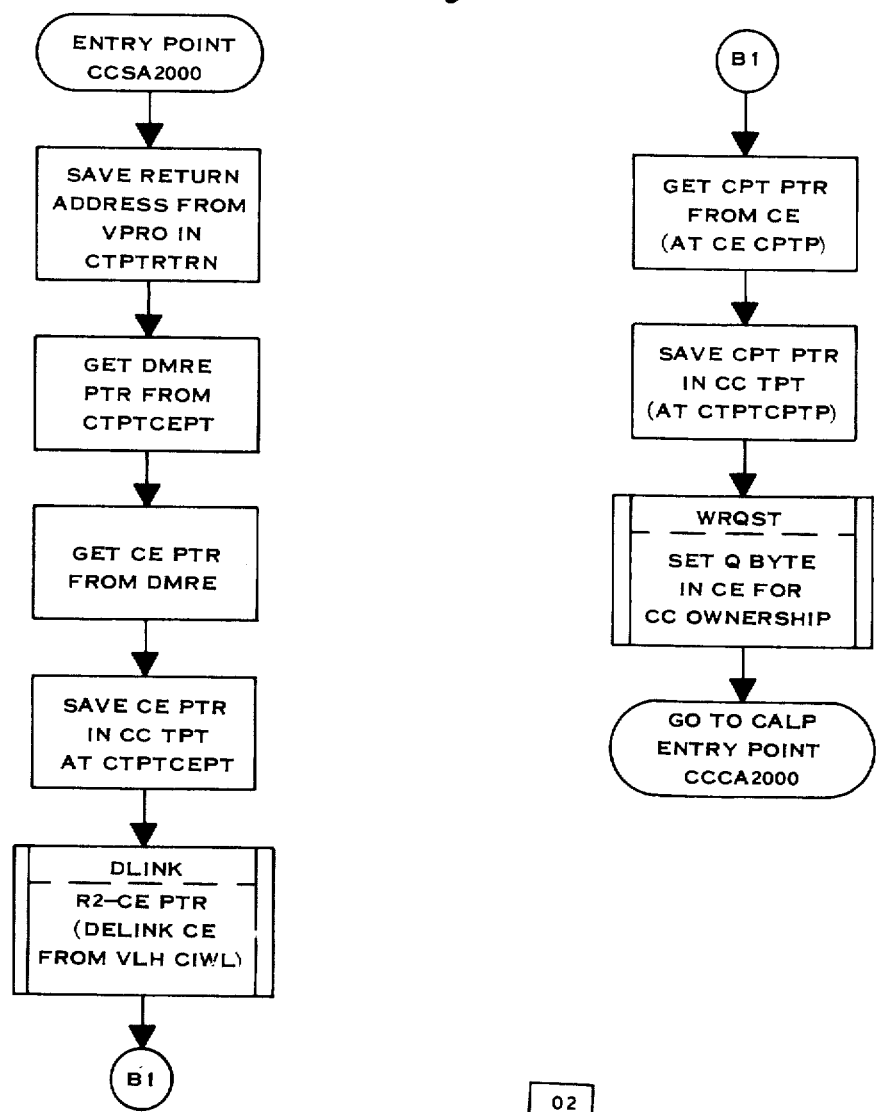
Fig. C-116
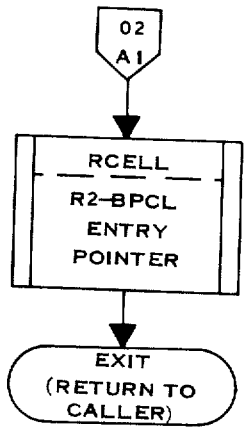
Fig. C-118

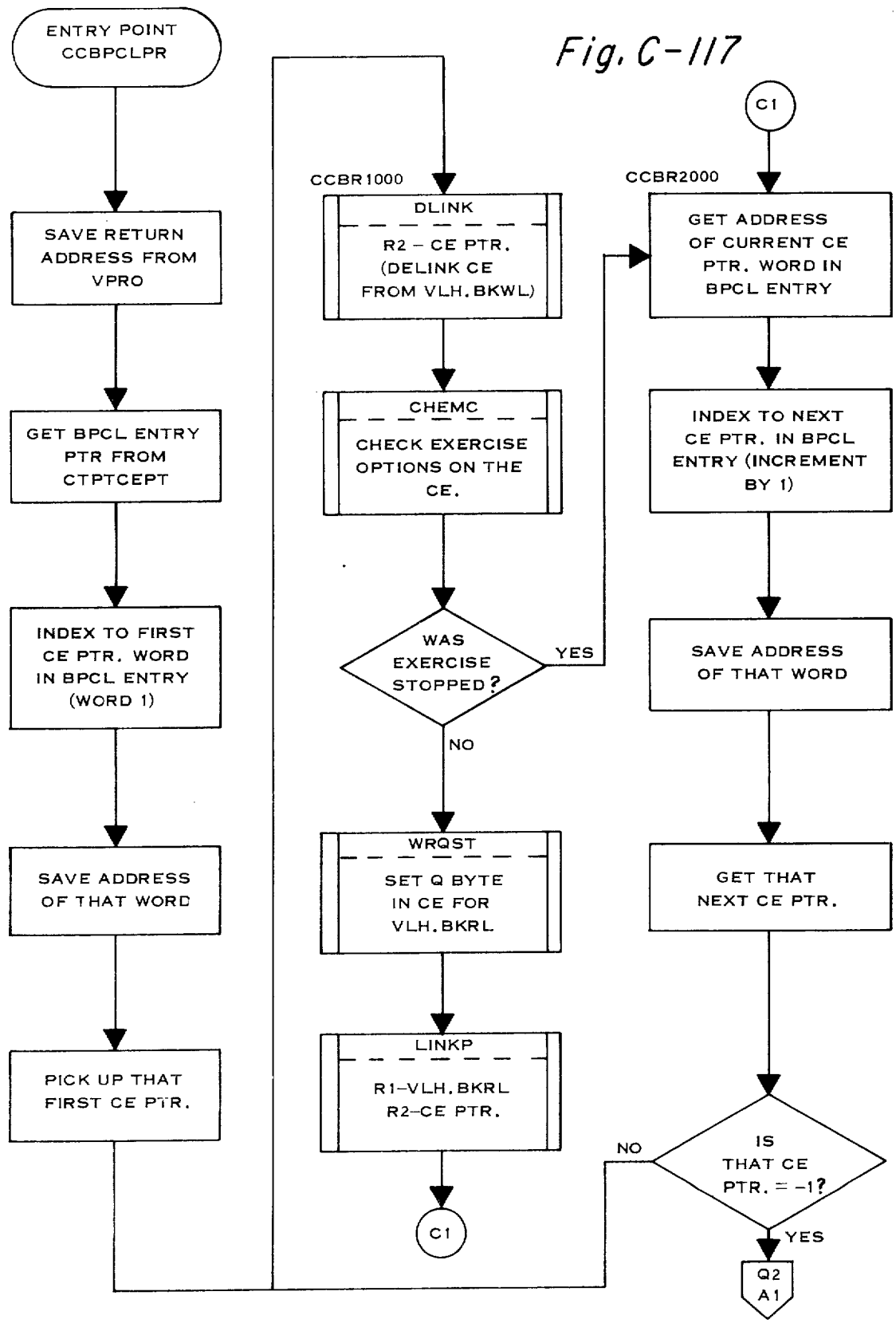
Fig. C-117

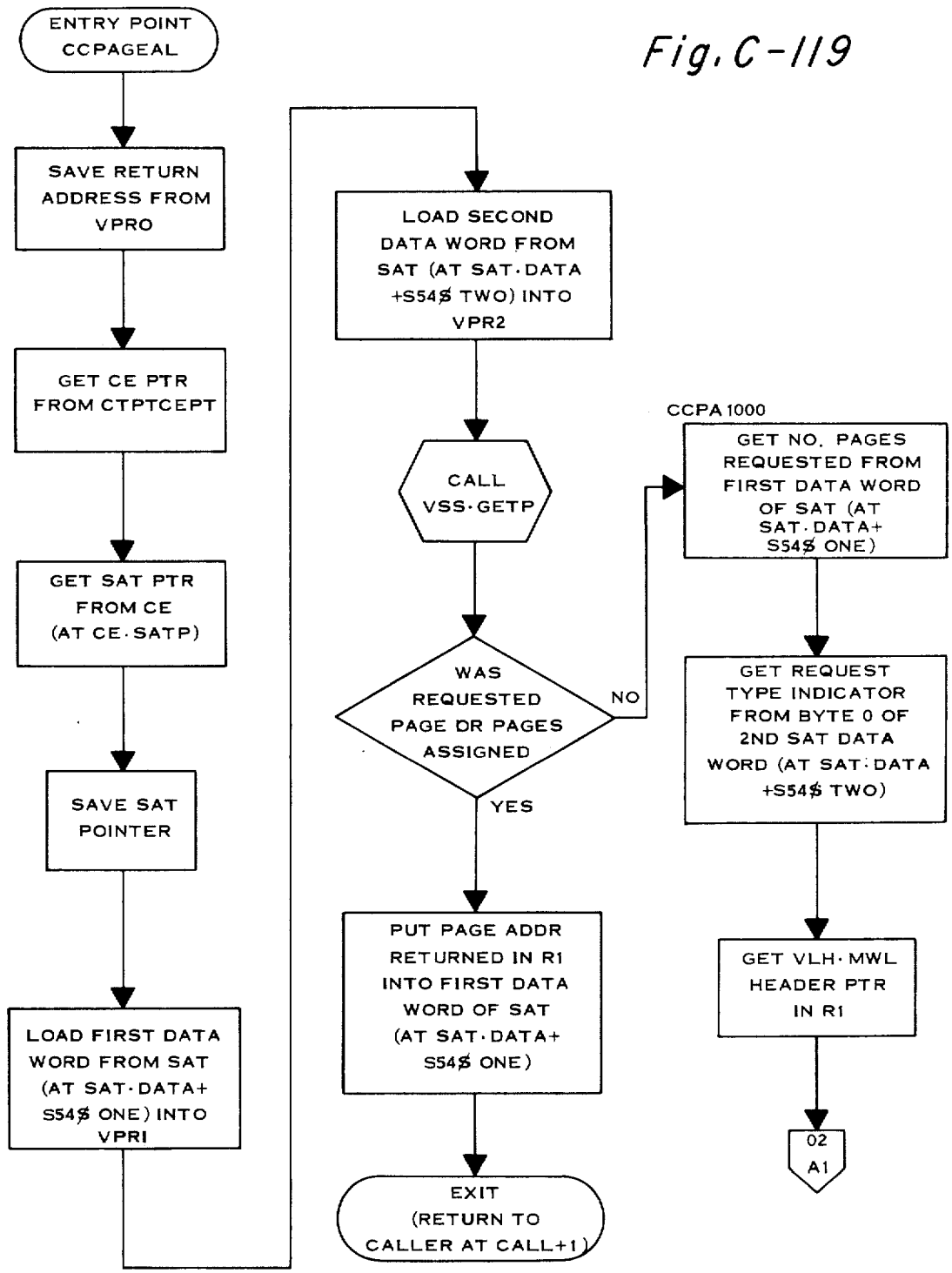
Fig. C-119

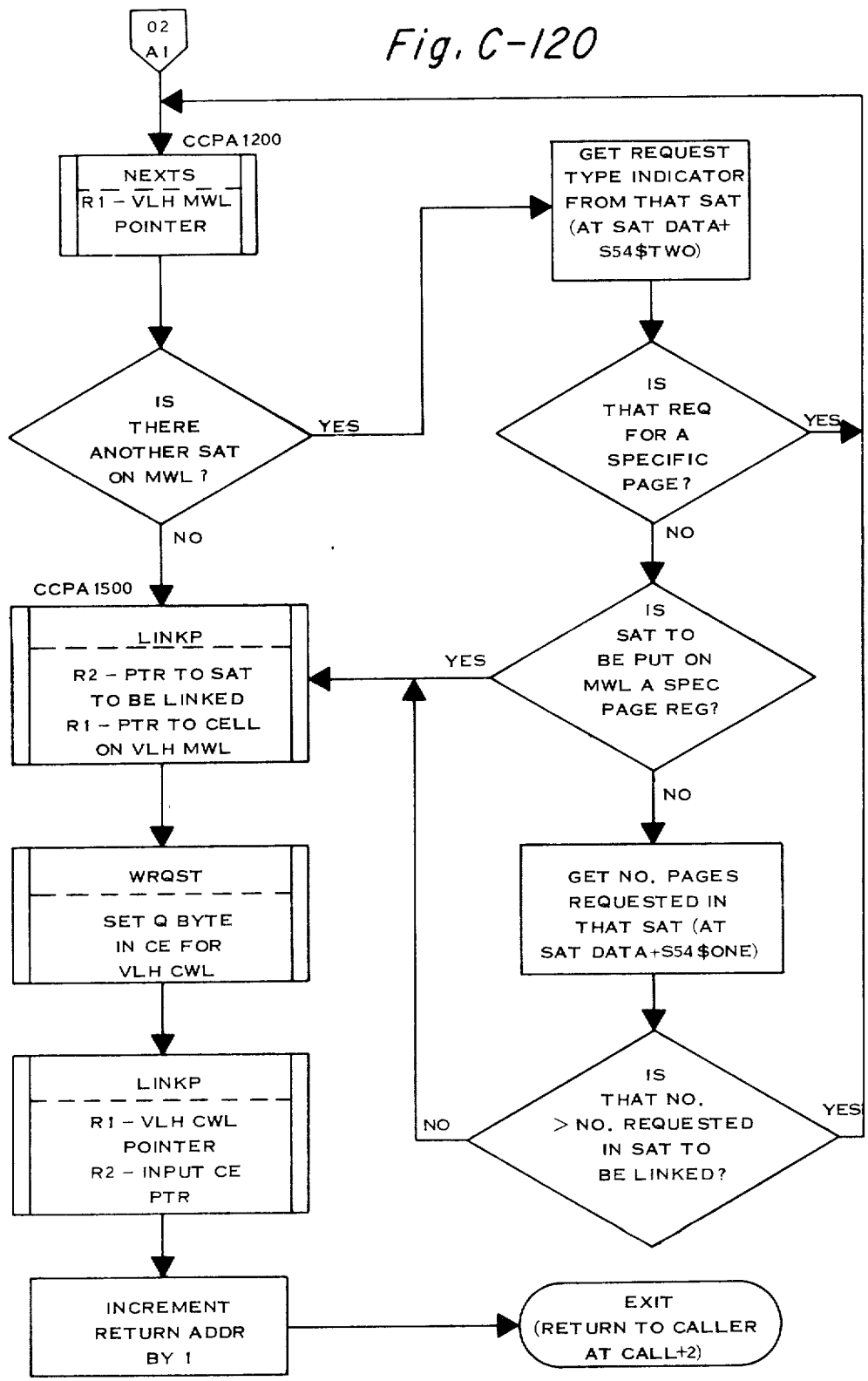
Fig. C-120

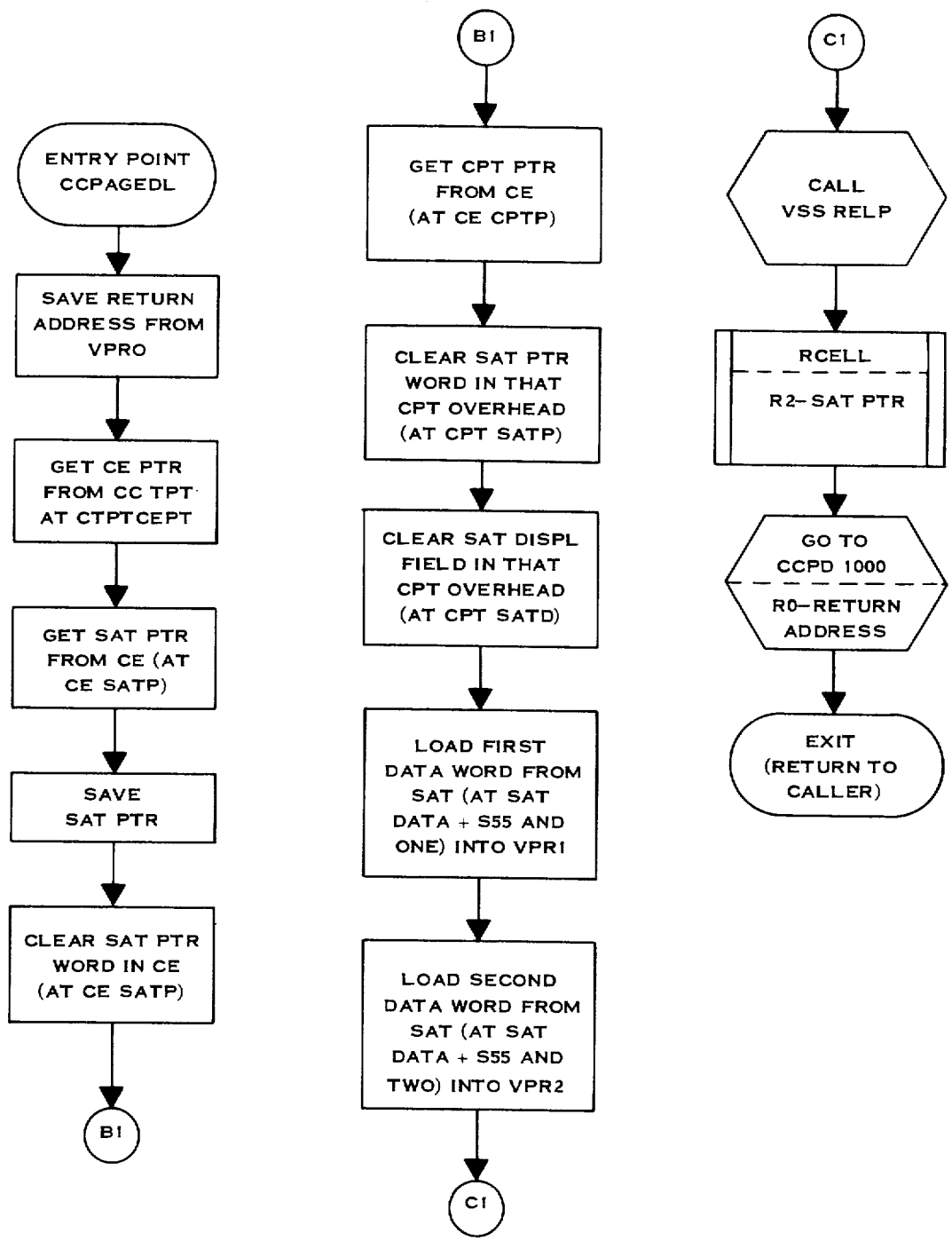
Fig. C-121

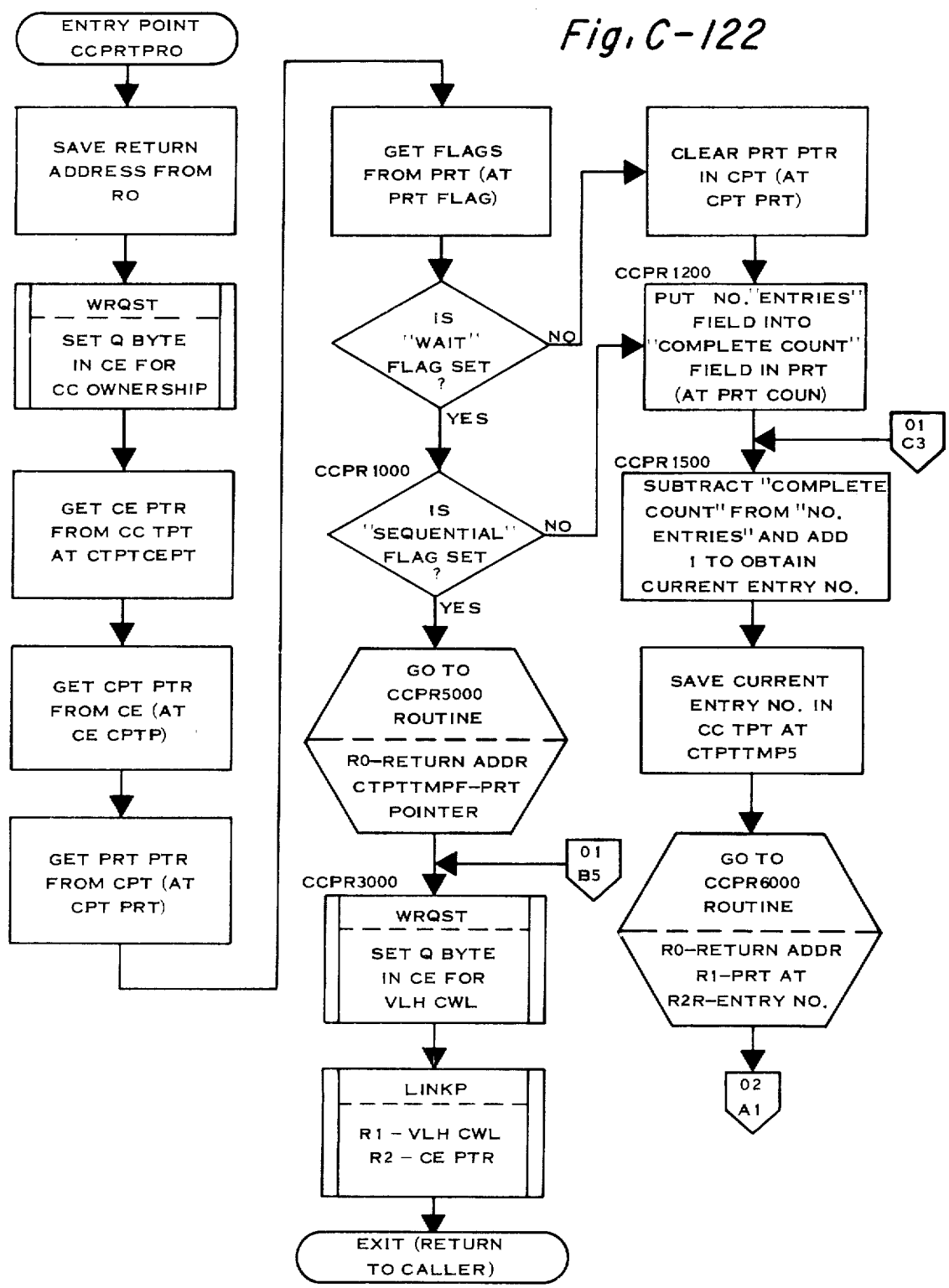
Fig. C-122

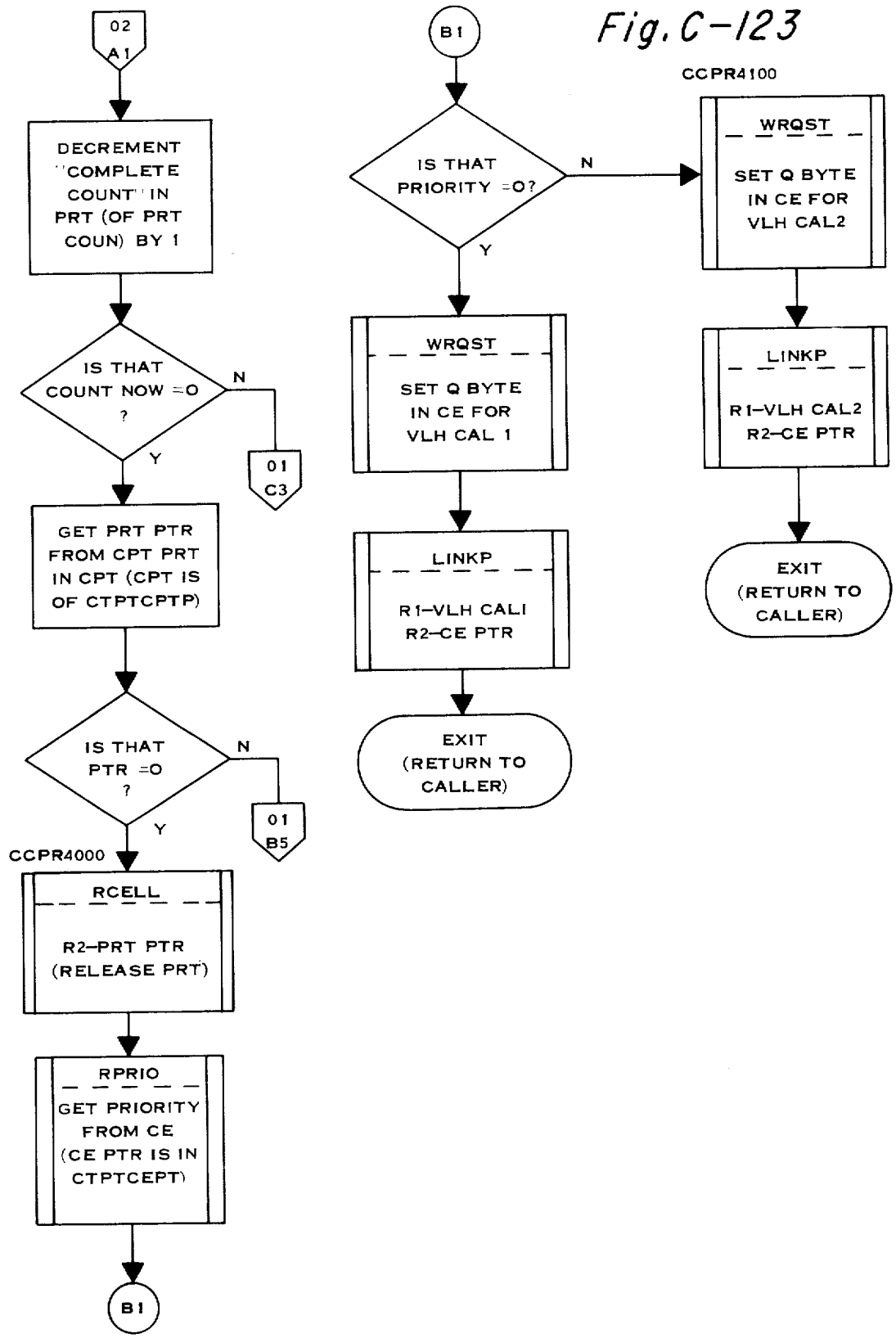
Fig. C-123

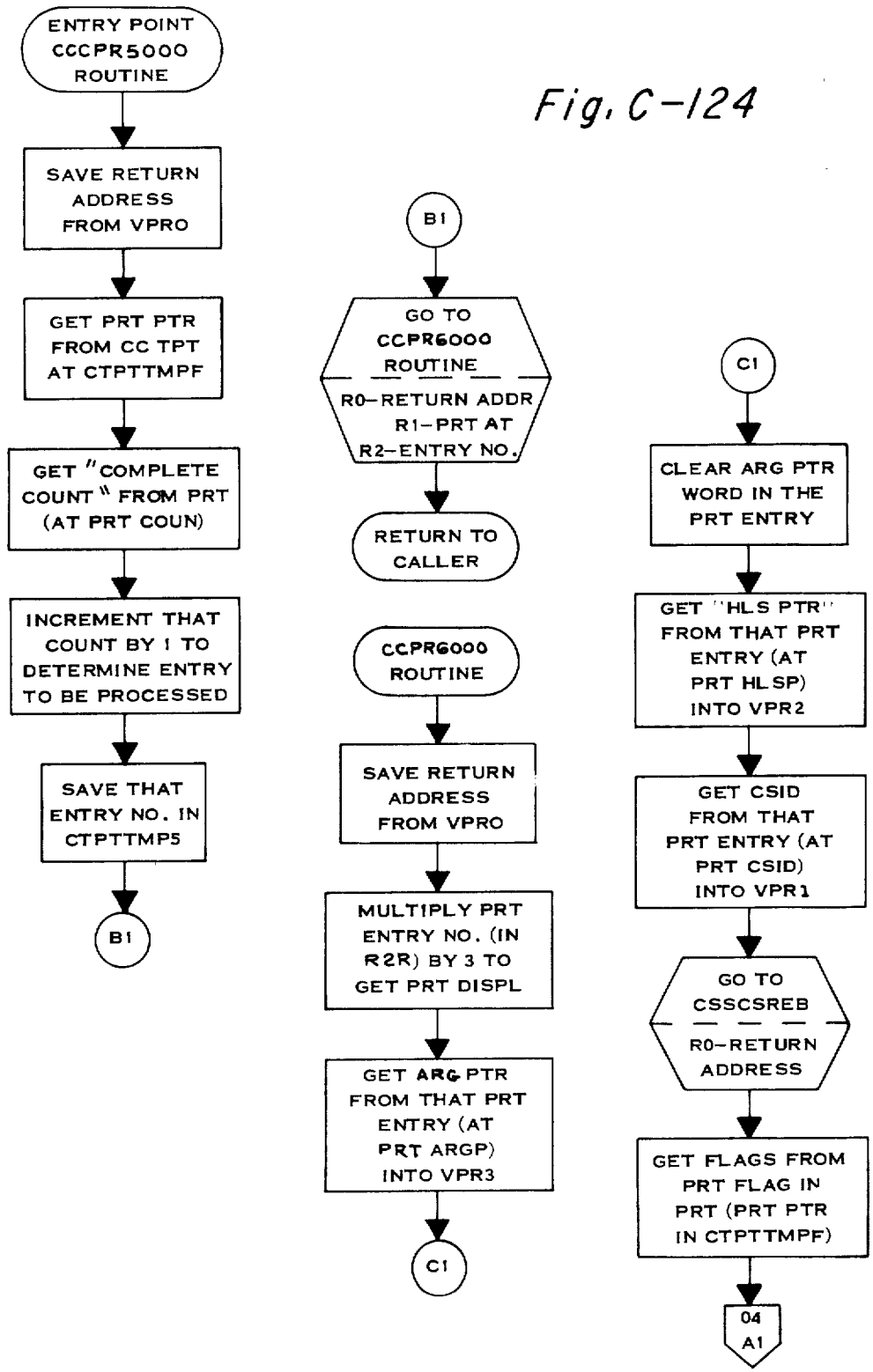
Fig. C-124

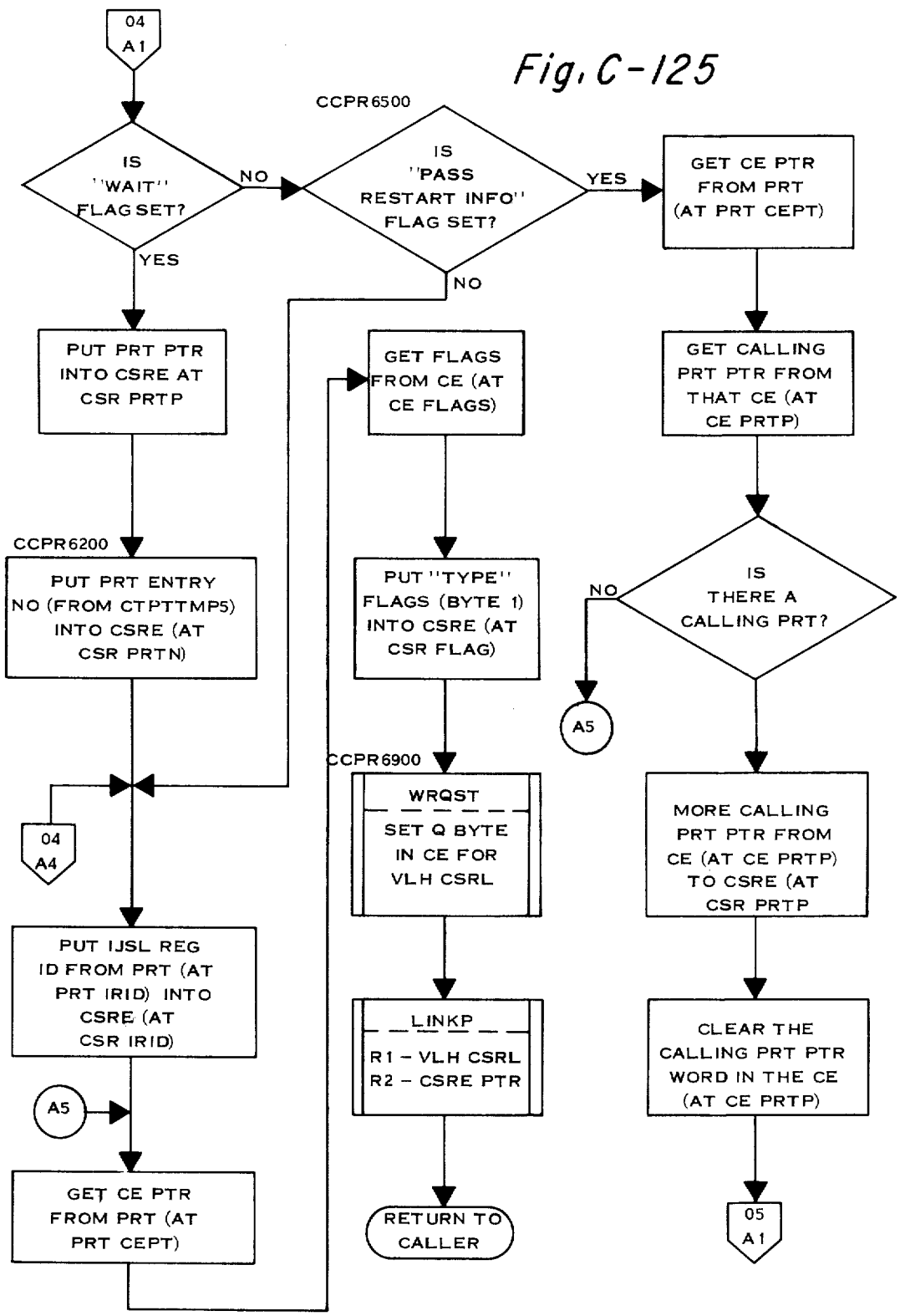
Fig. C-125

Fig. C-126
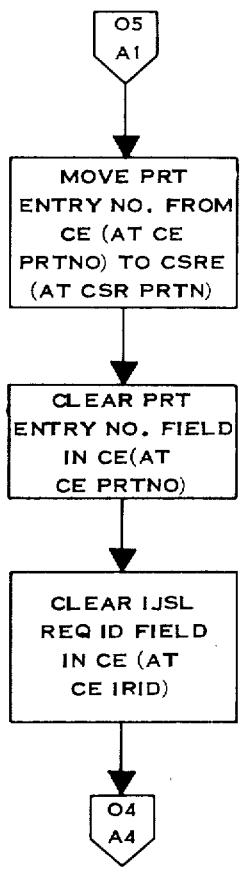
Fig. C-127
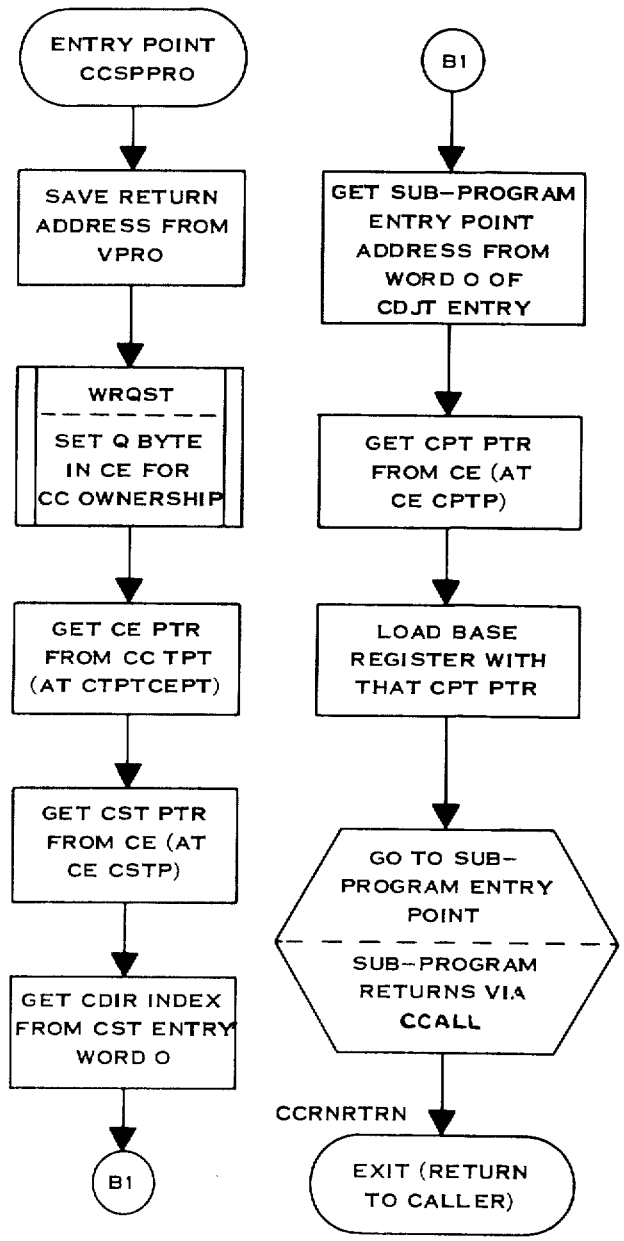

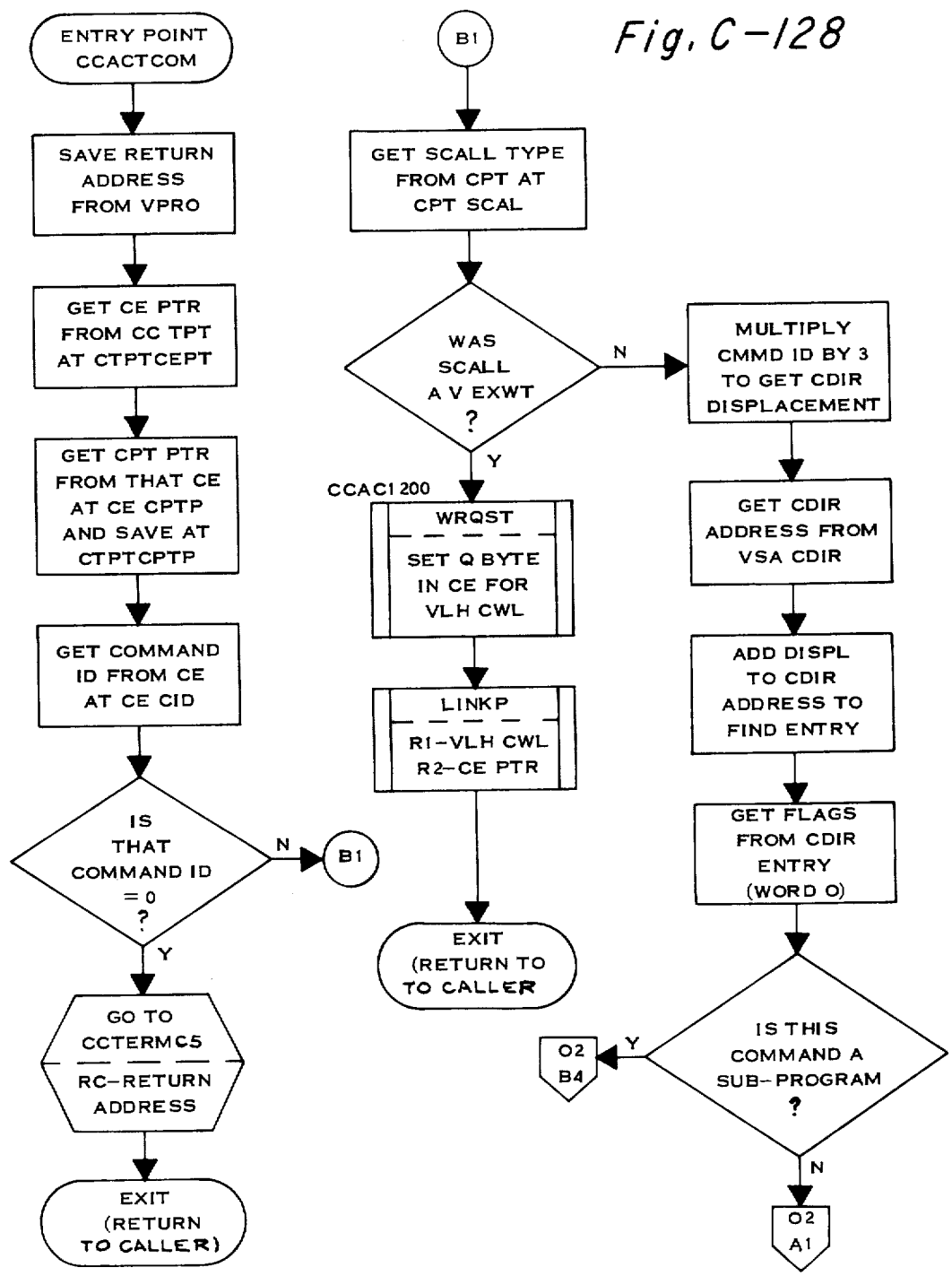
Fig. C-128

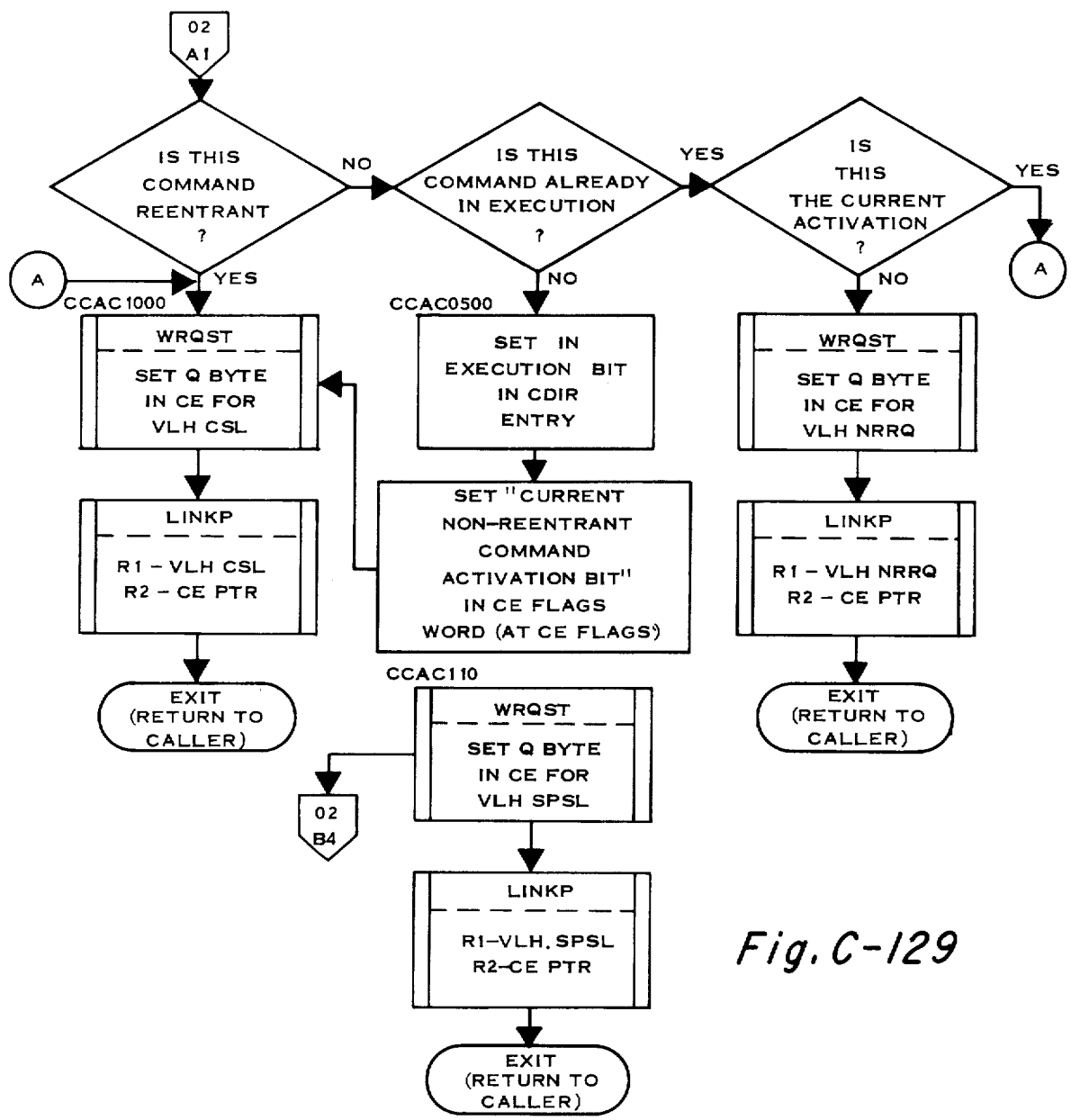
Fig. C-129

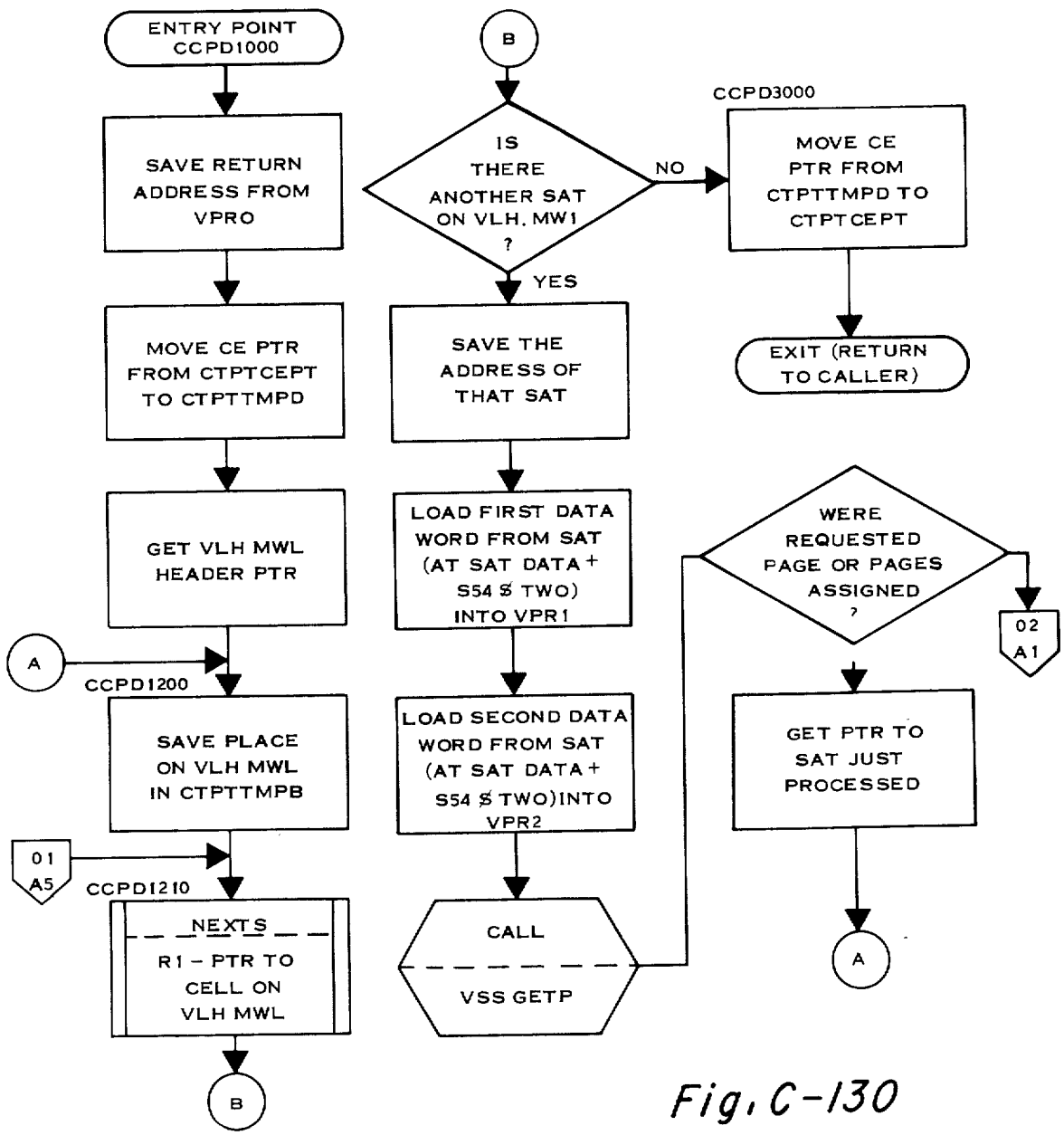
Fig. C-130

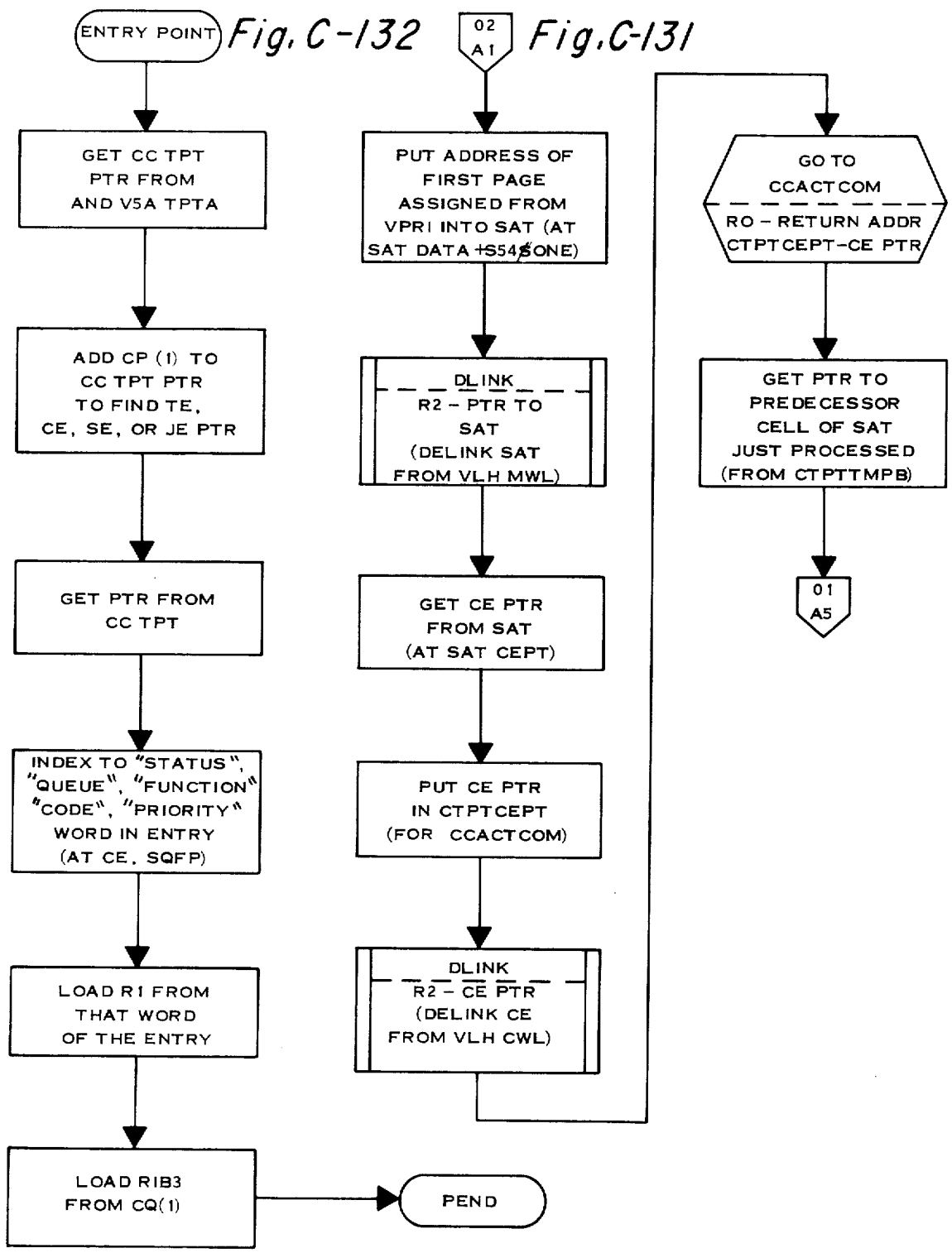

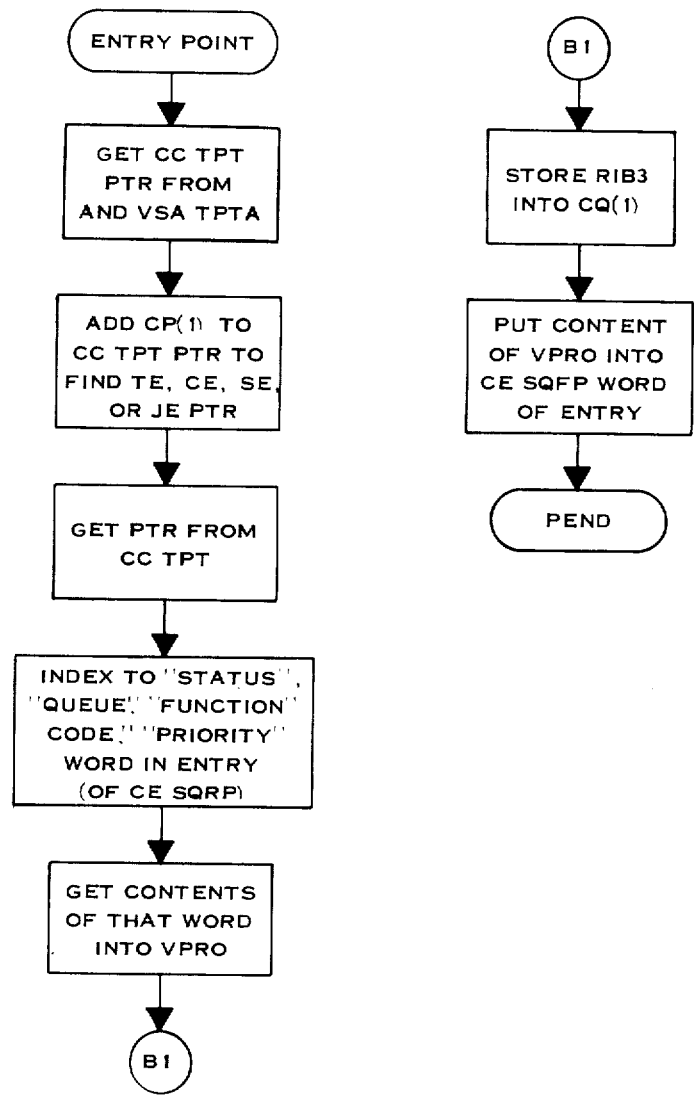
Fig. C-133

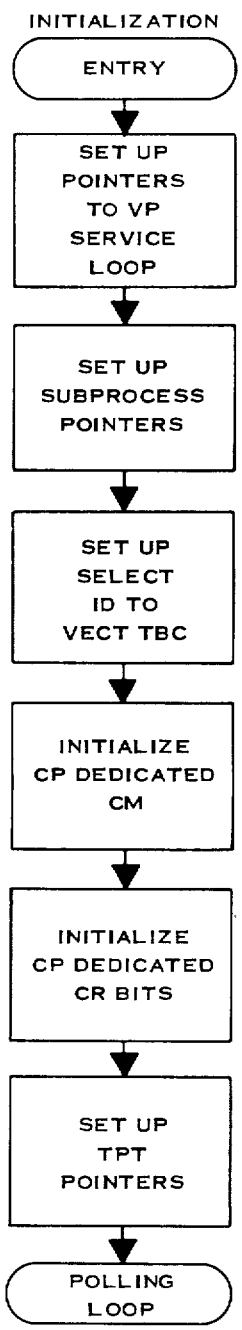
Fig. M-1
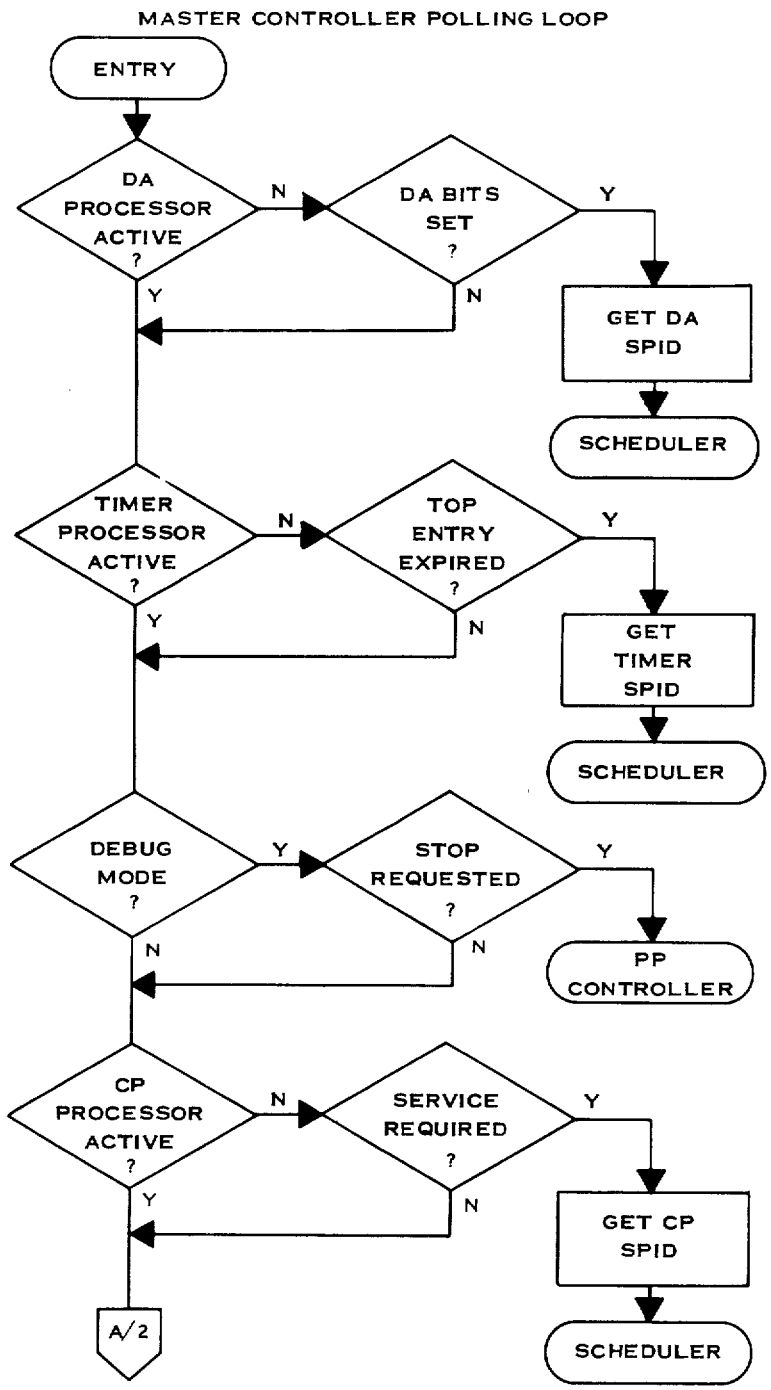
Fig. M-2

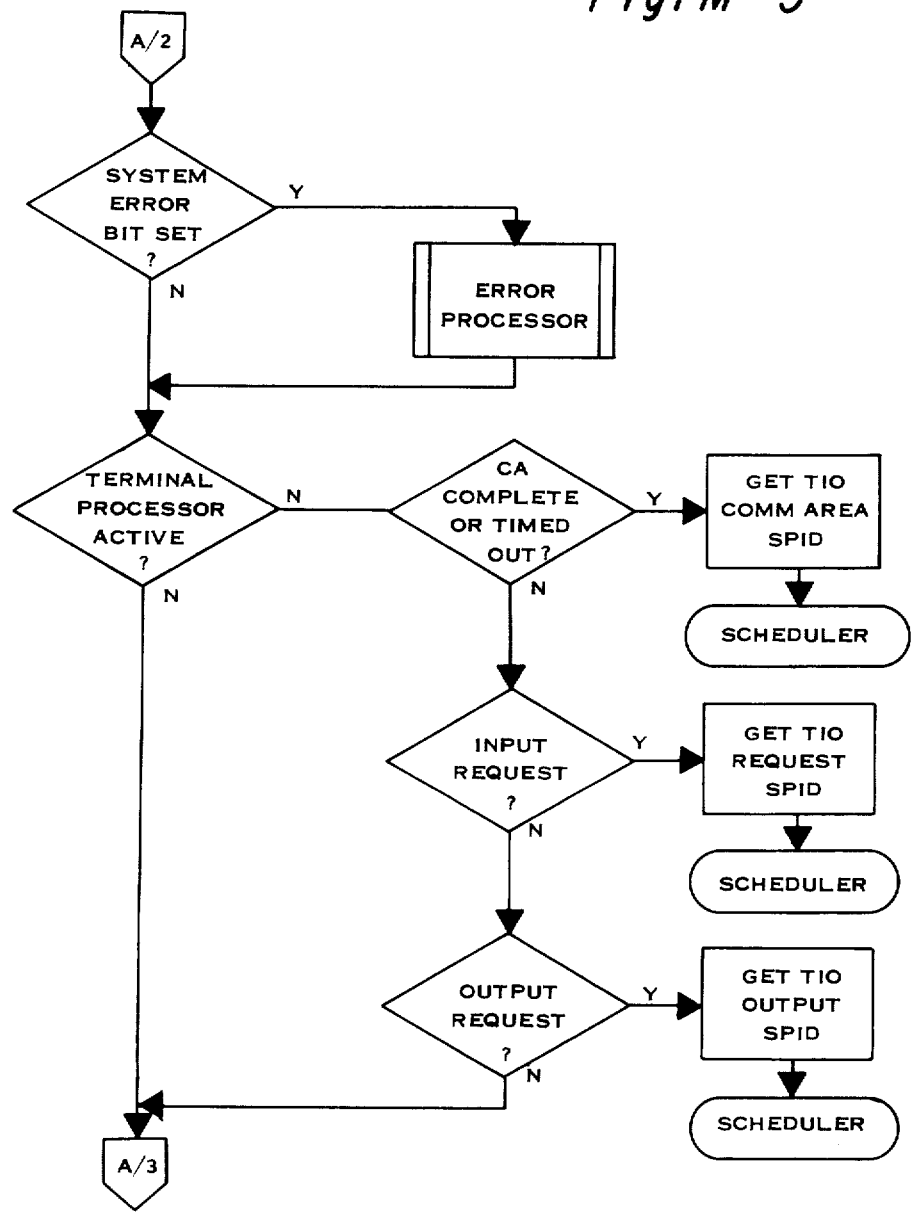

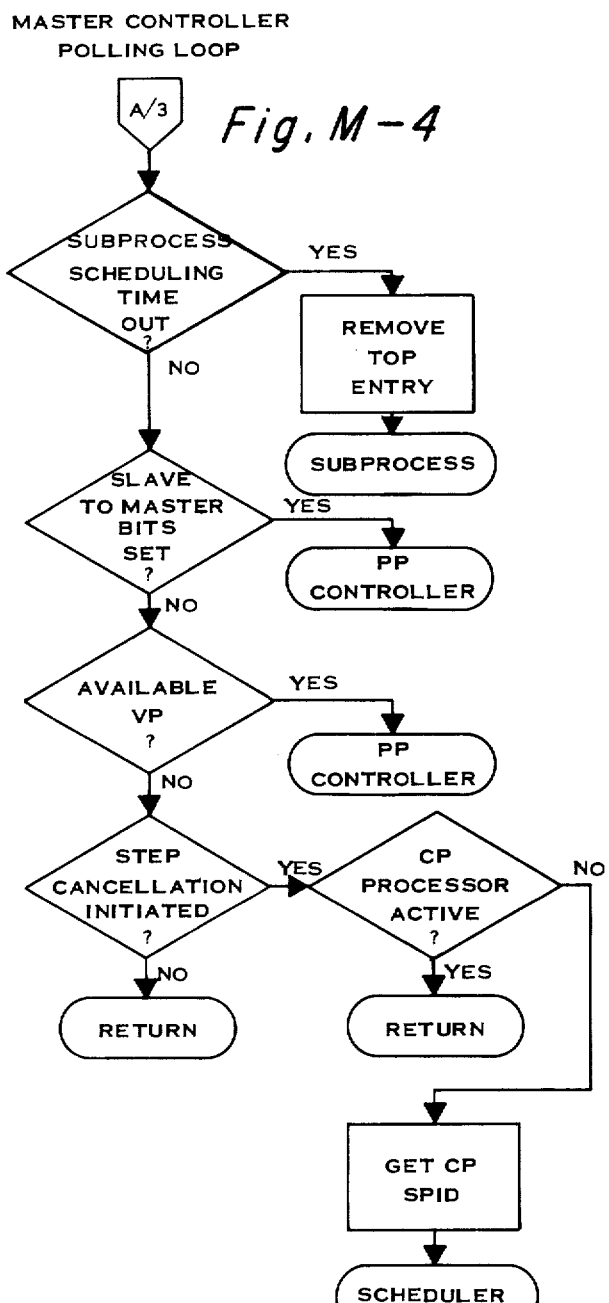
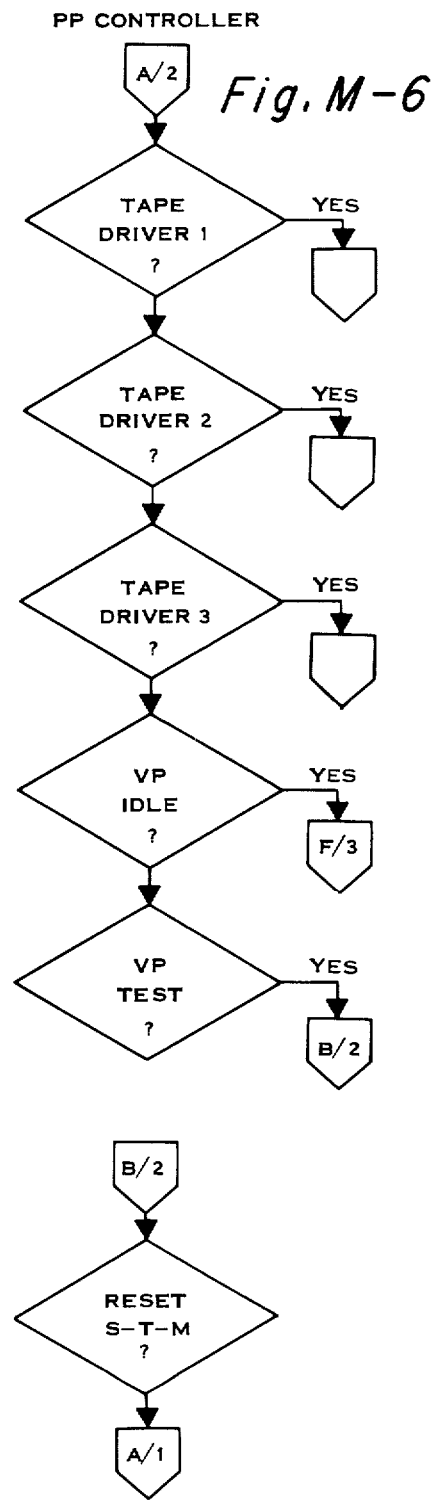

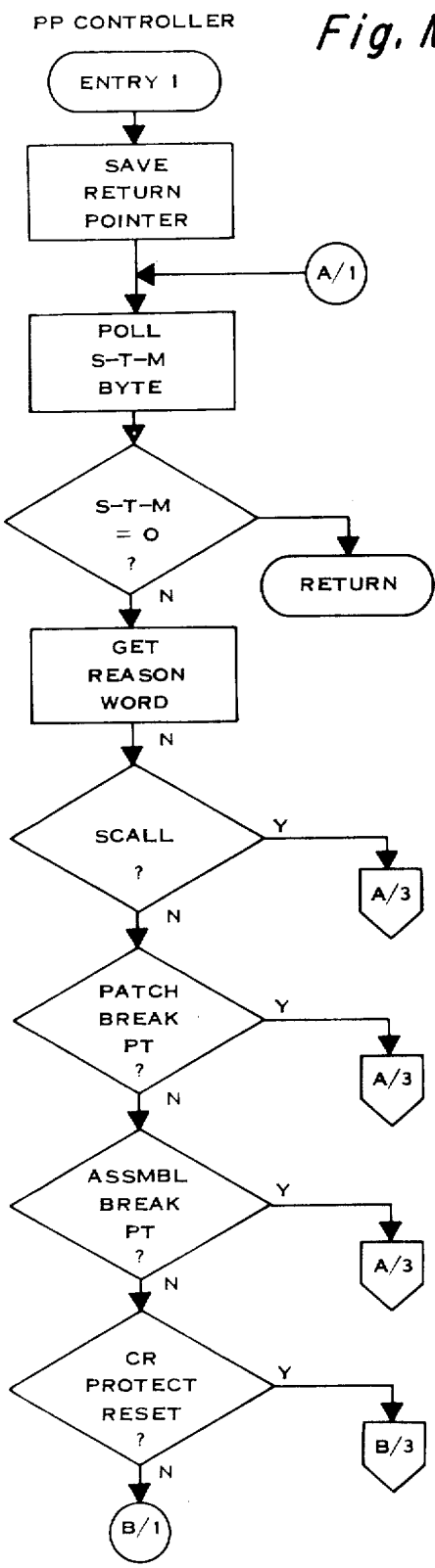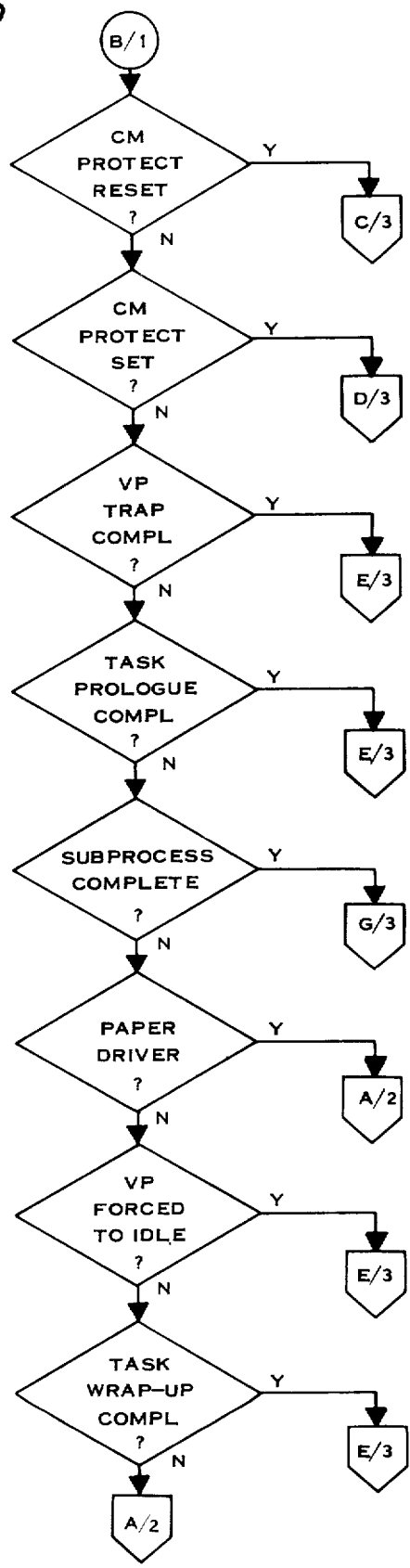
Fig. M-5

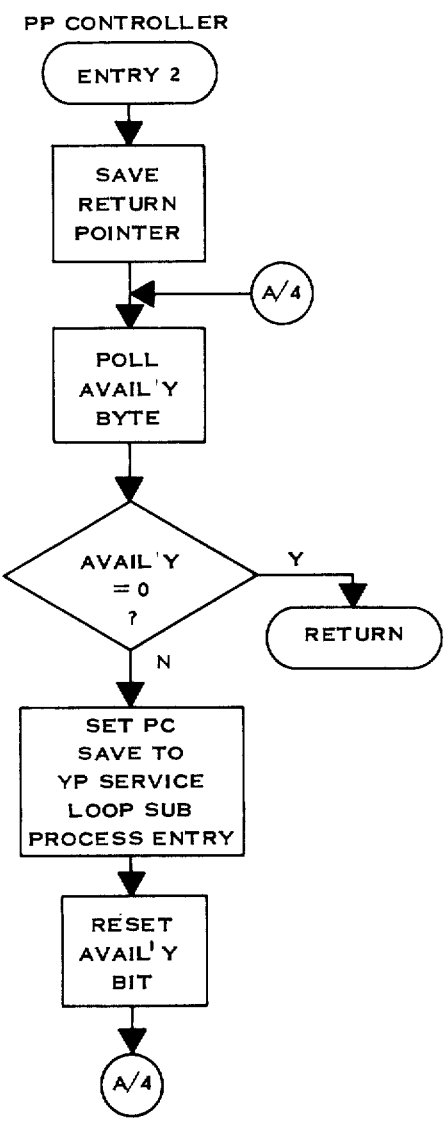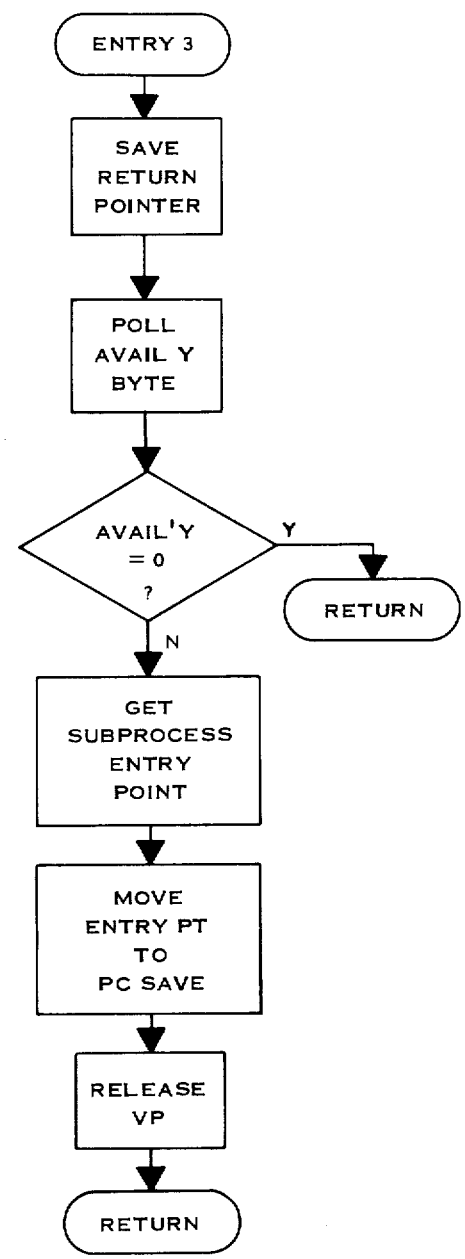
Fig. M-7
Fig. M-8

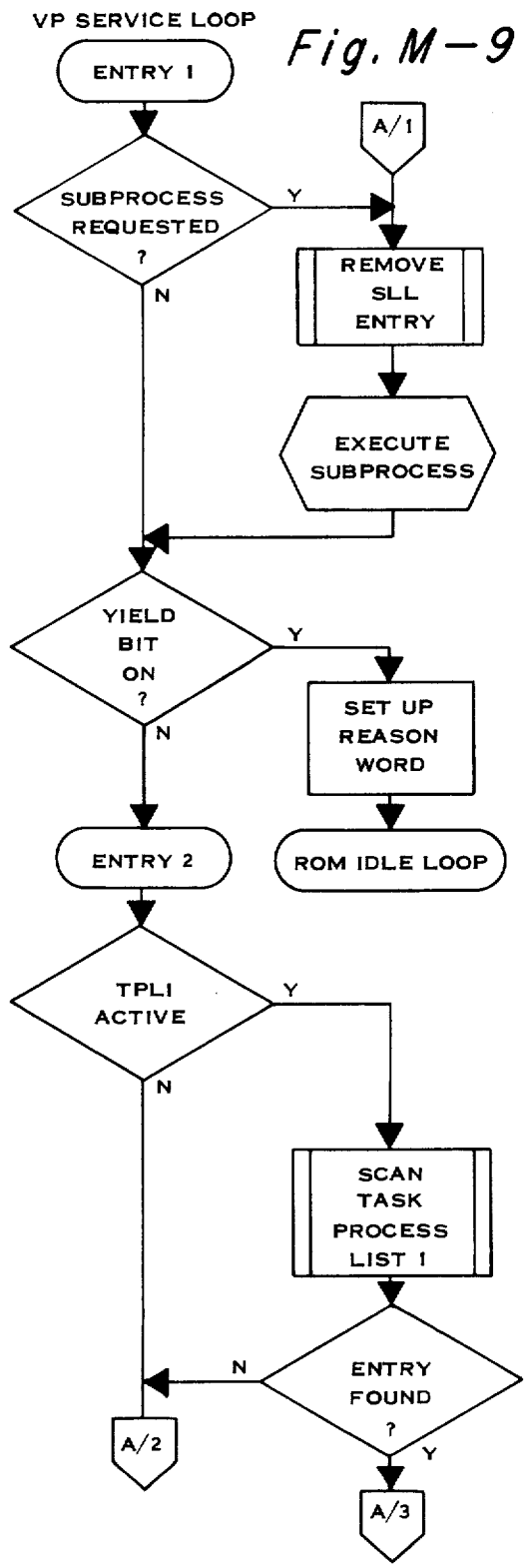
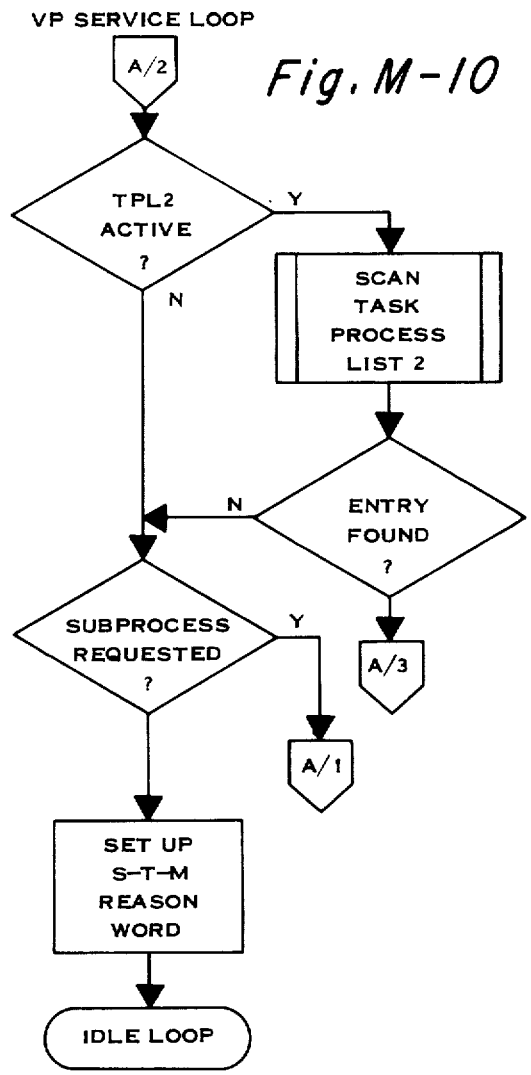
Fig. M-9
Fig. M-10

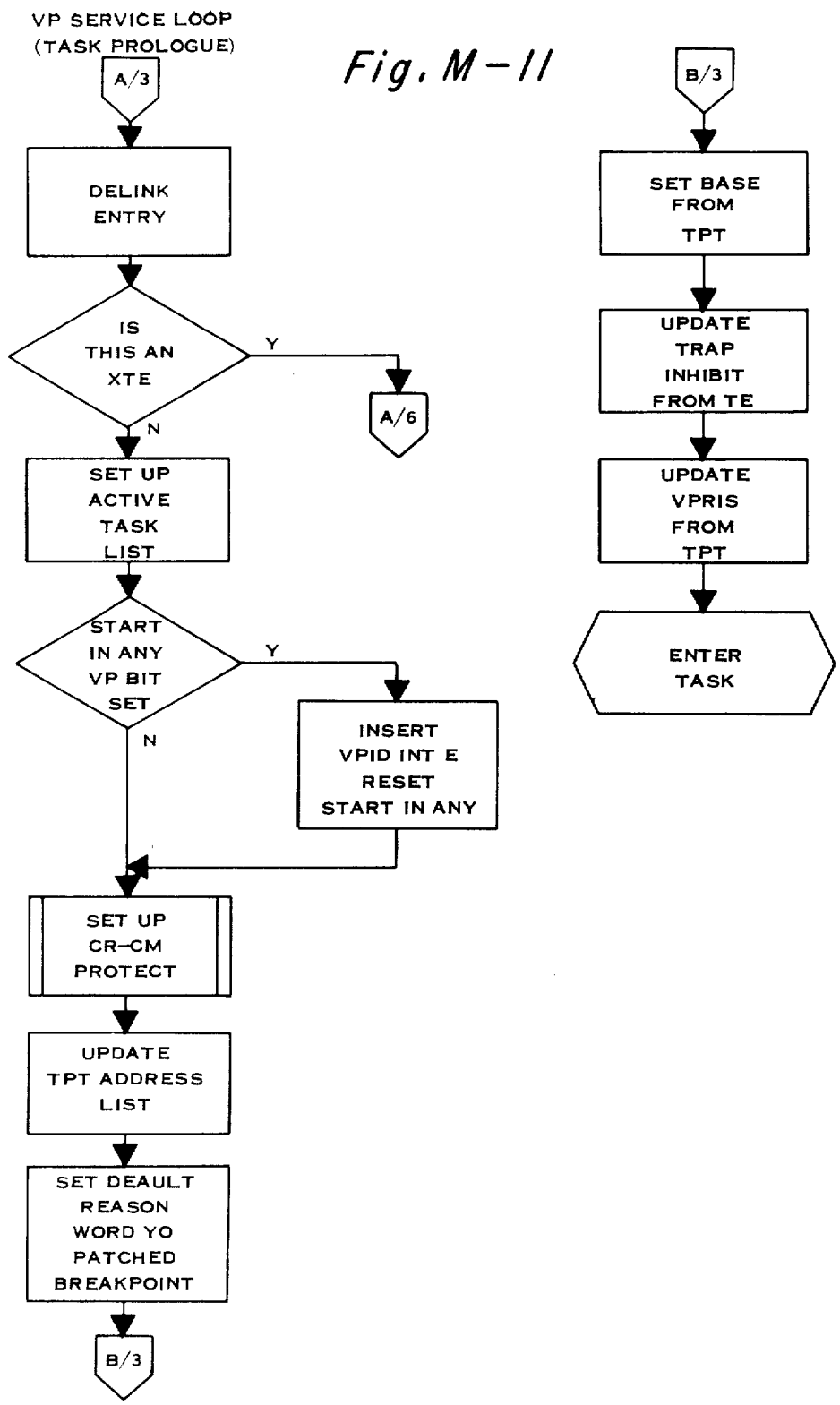
Fig. M-11

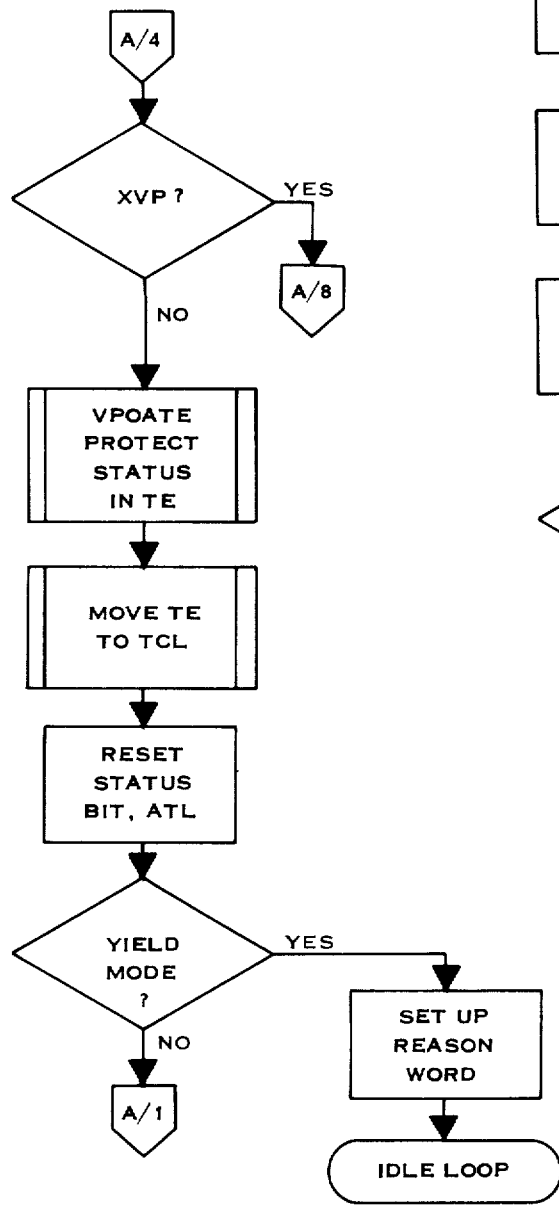
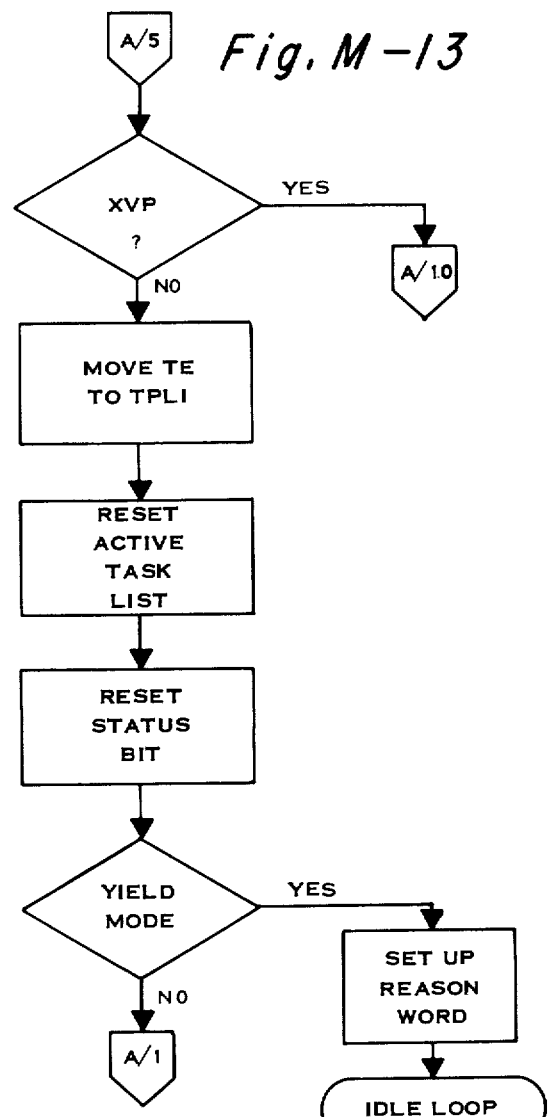

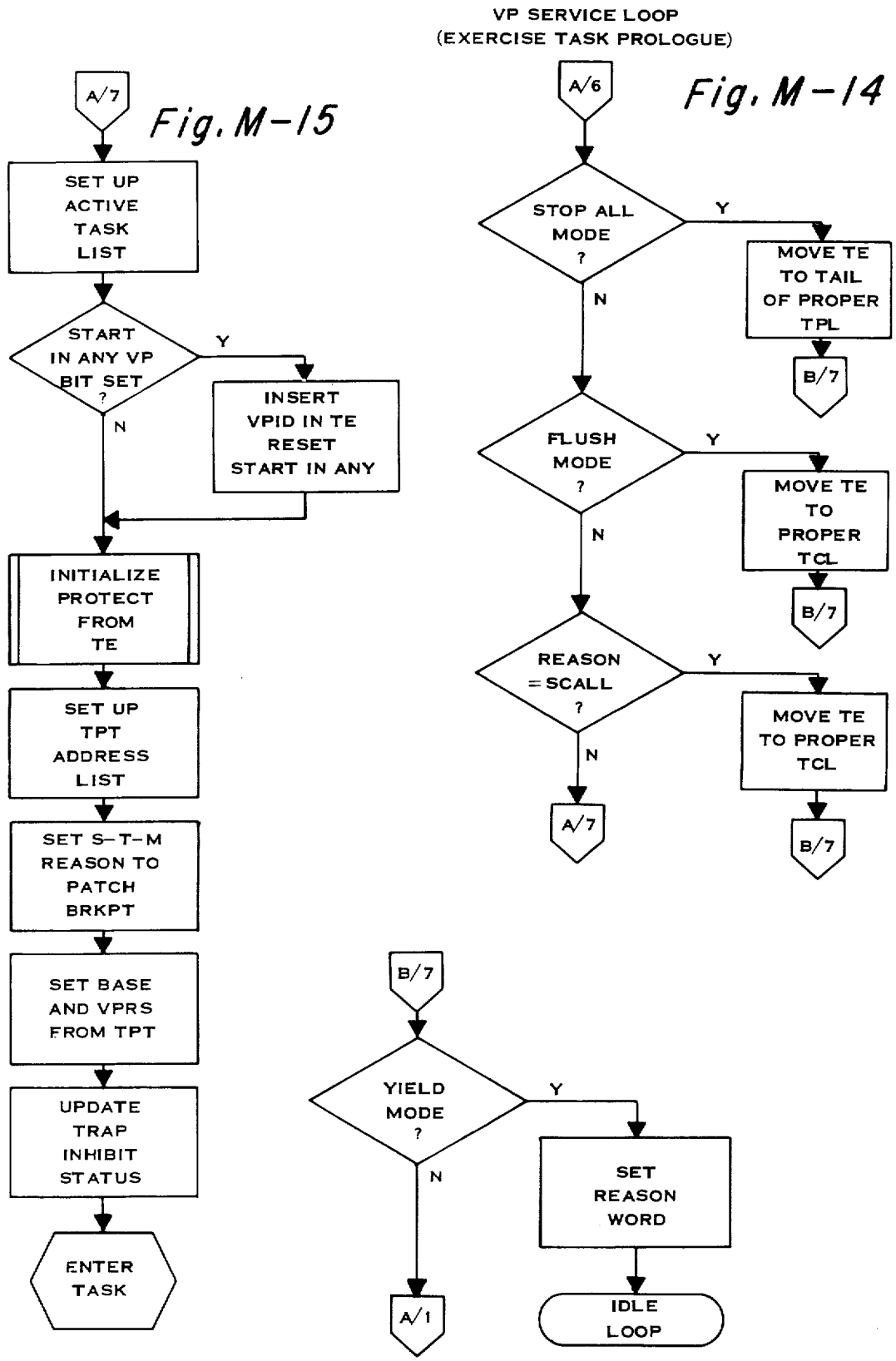

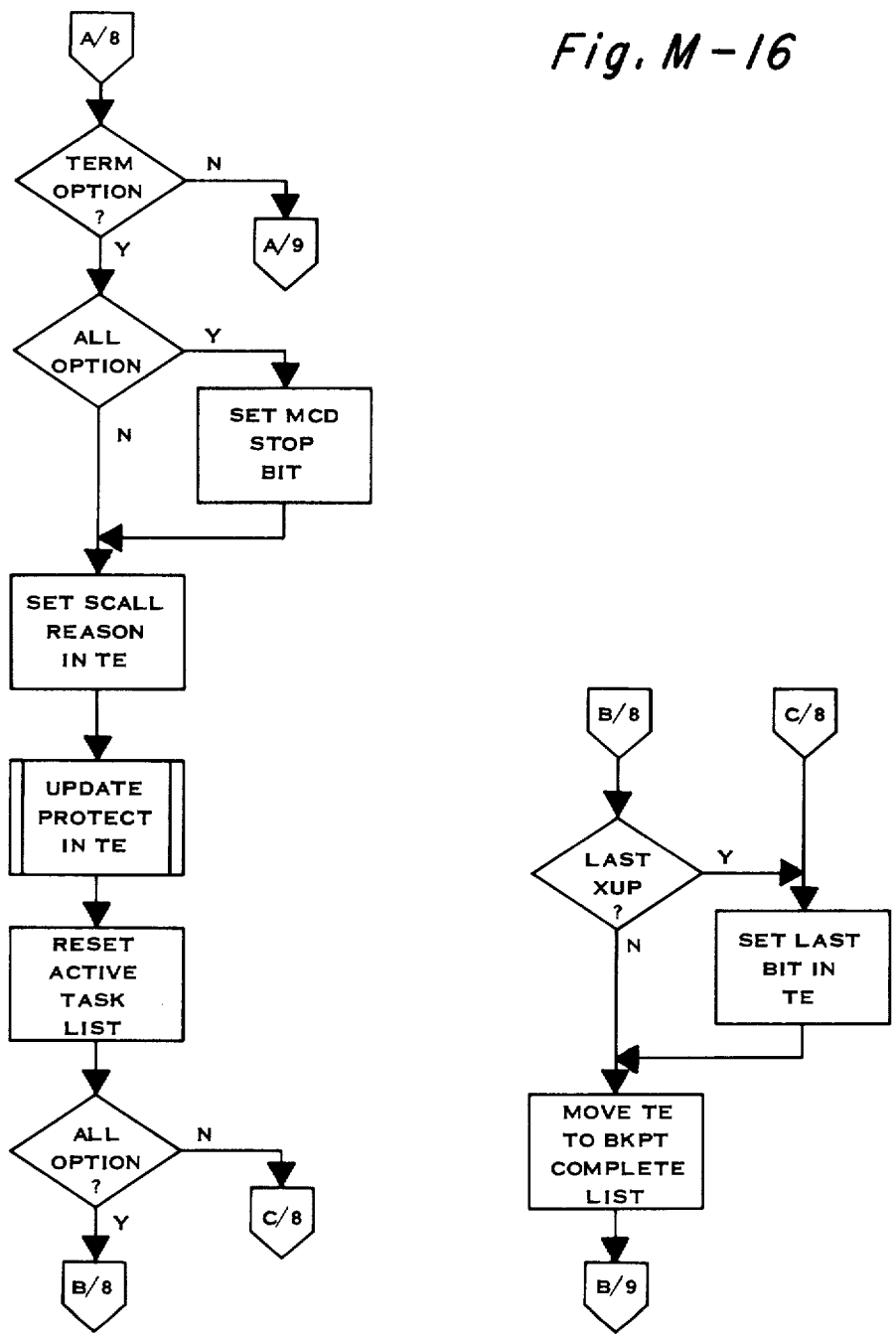
Fig. M-16

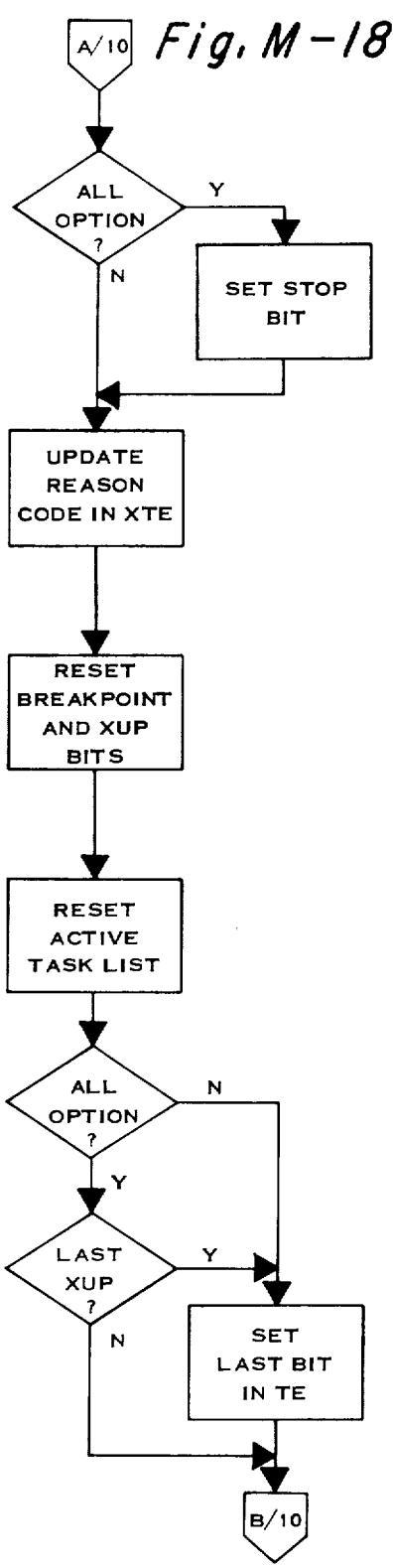
Fig. M-18
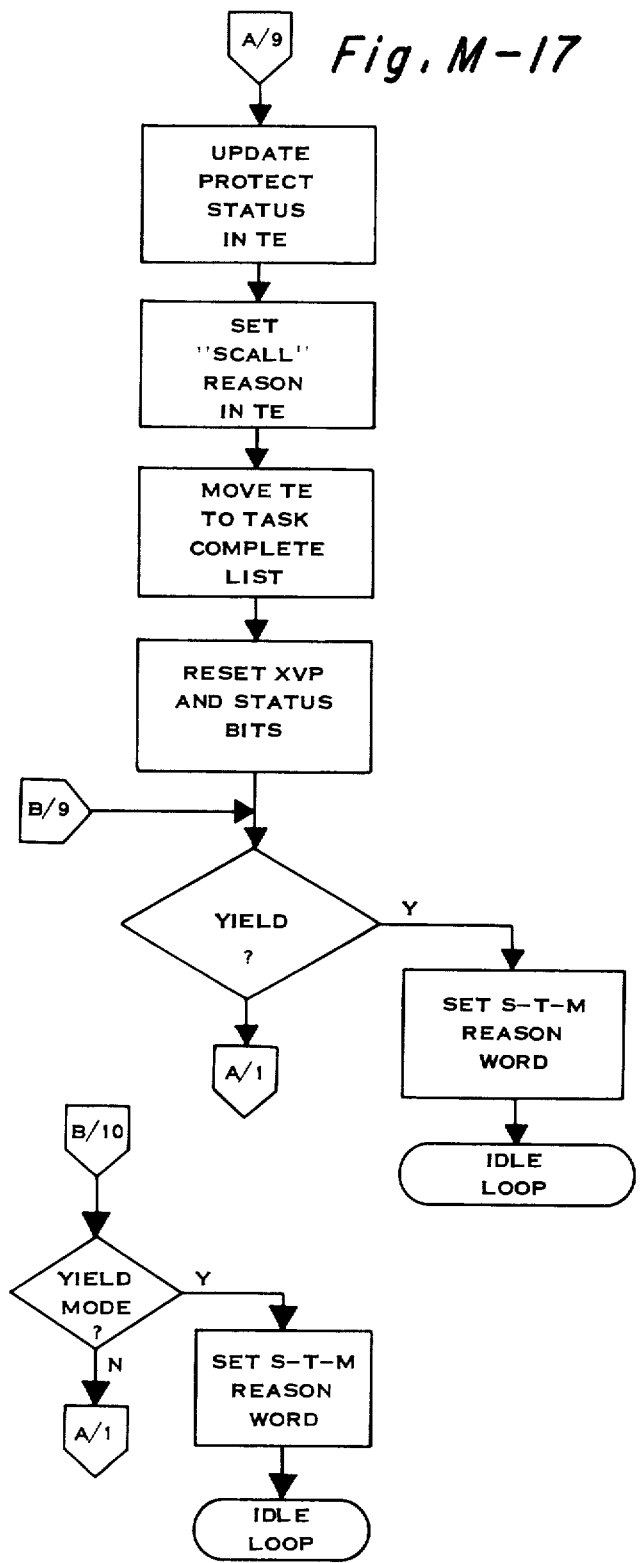
Fig. M-17

PROTECT SUBROUTINE
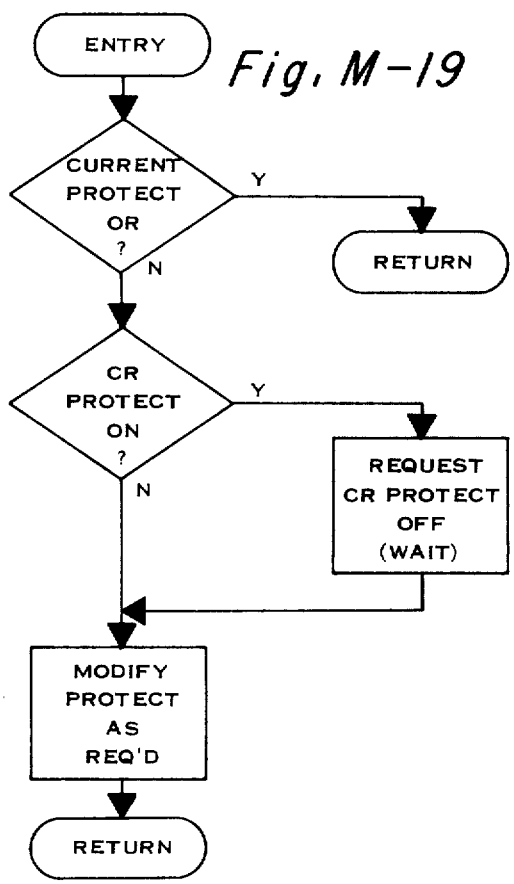
Fig. M-19
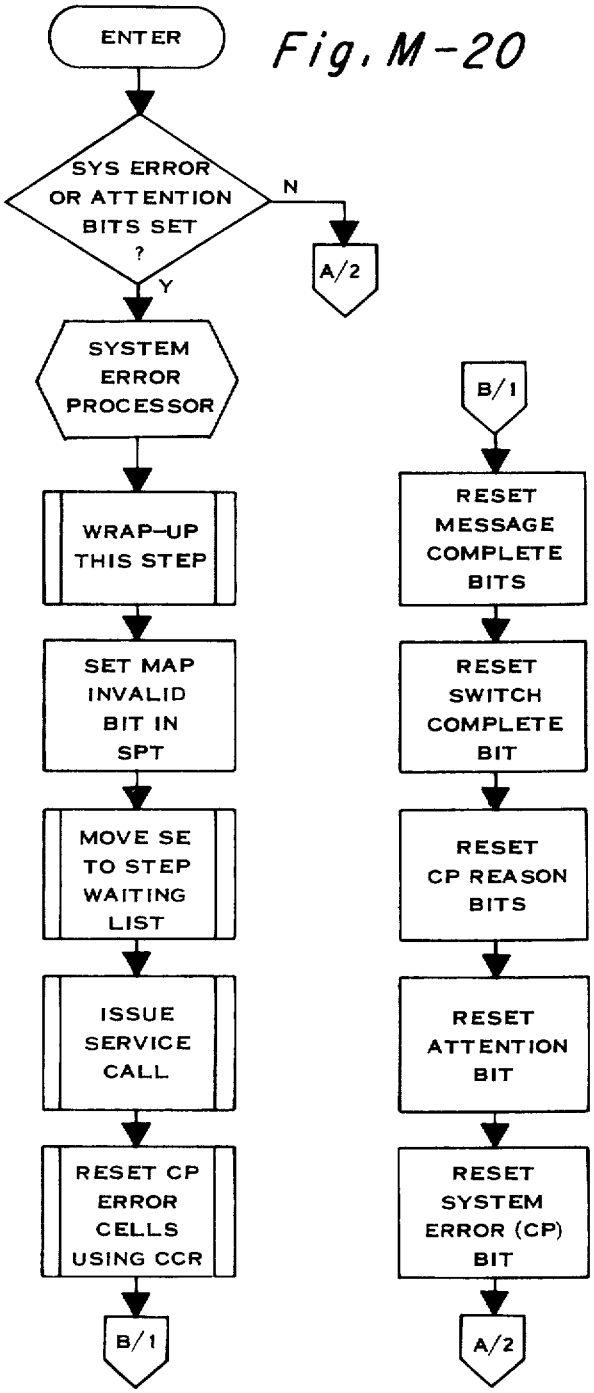
Fig. M-20

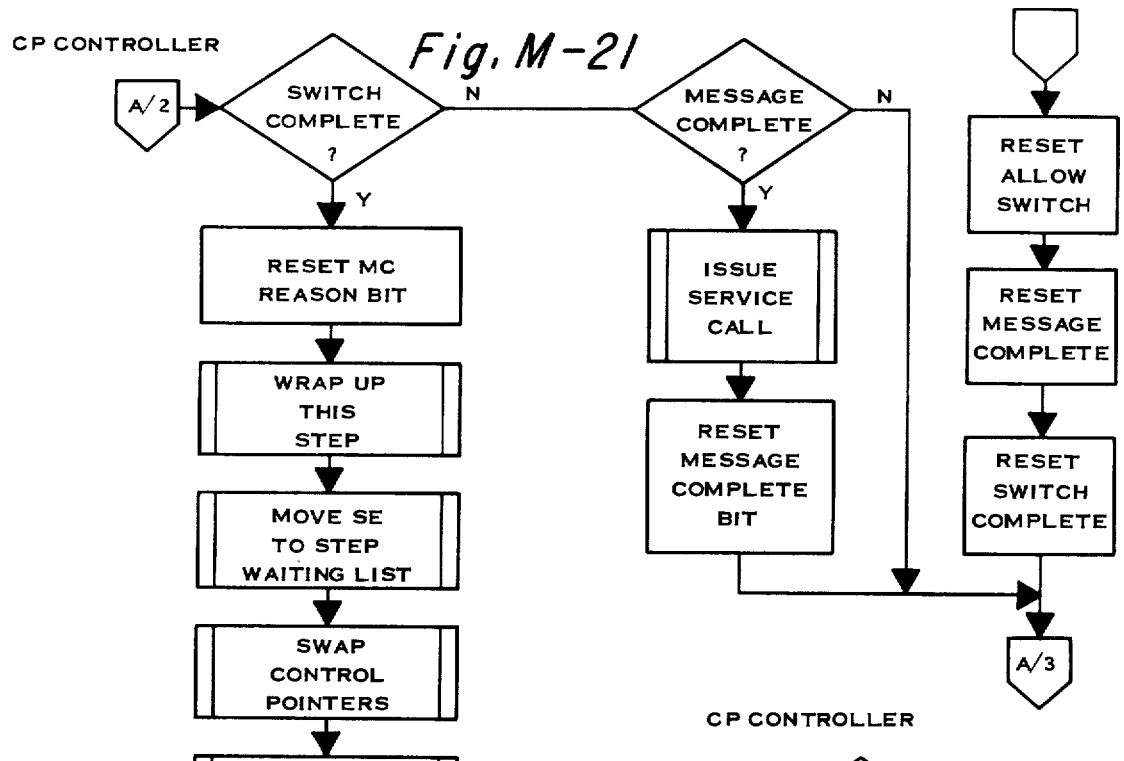
Fig. M-21
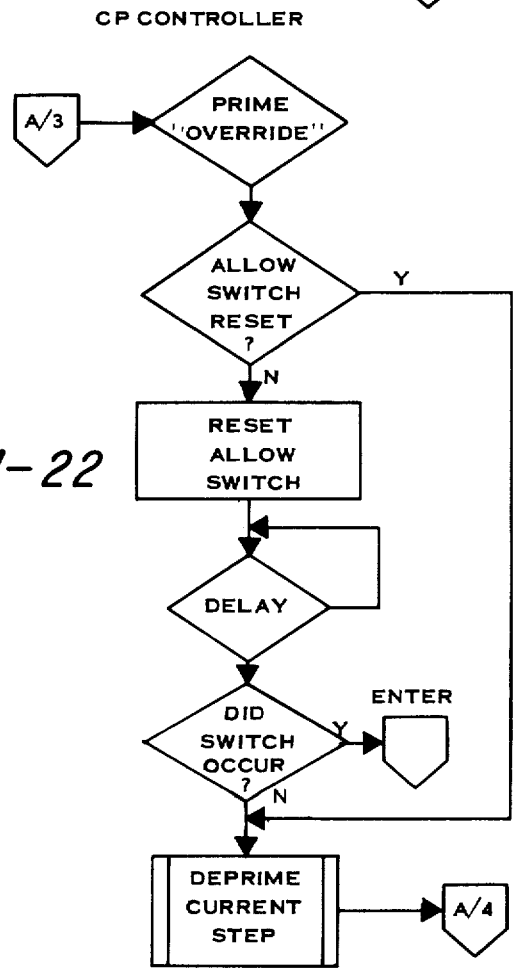
Fig. M-22

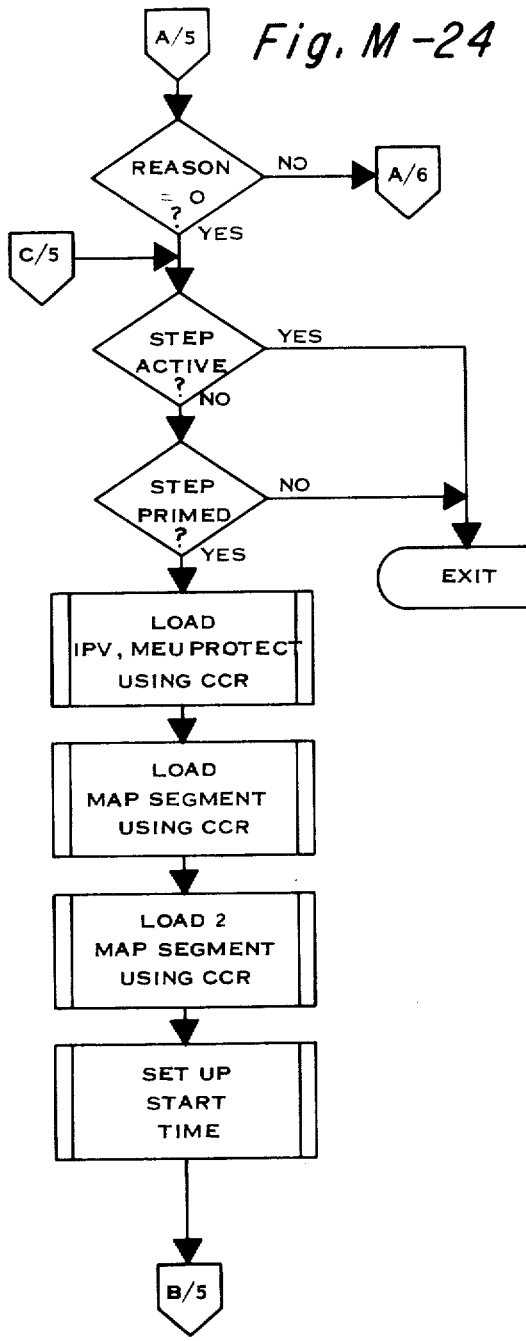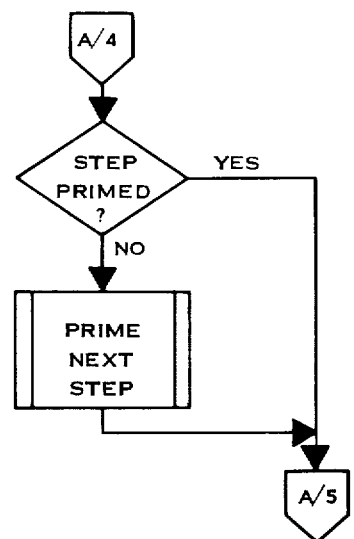
Fig. M-23
Fig. M-24

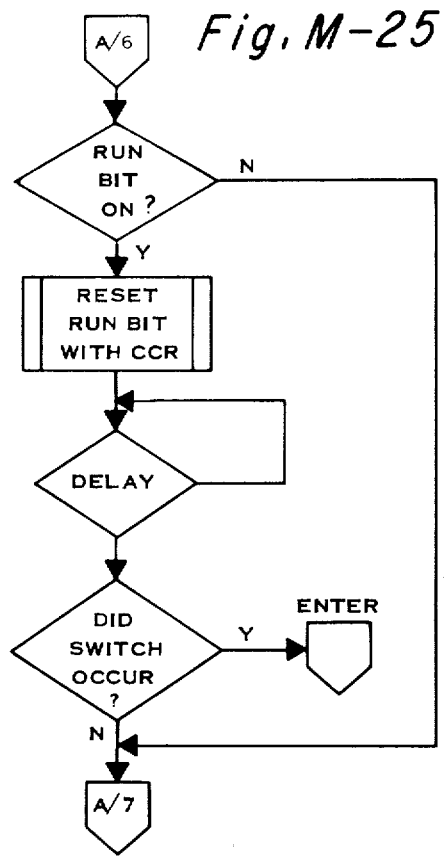
Fig. M-25
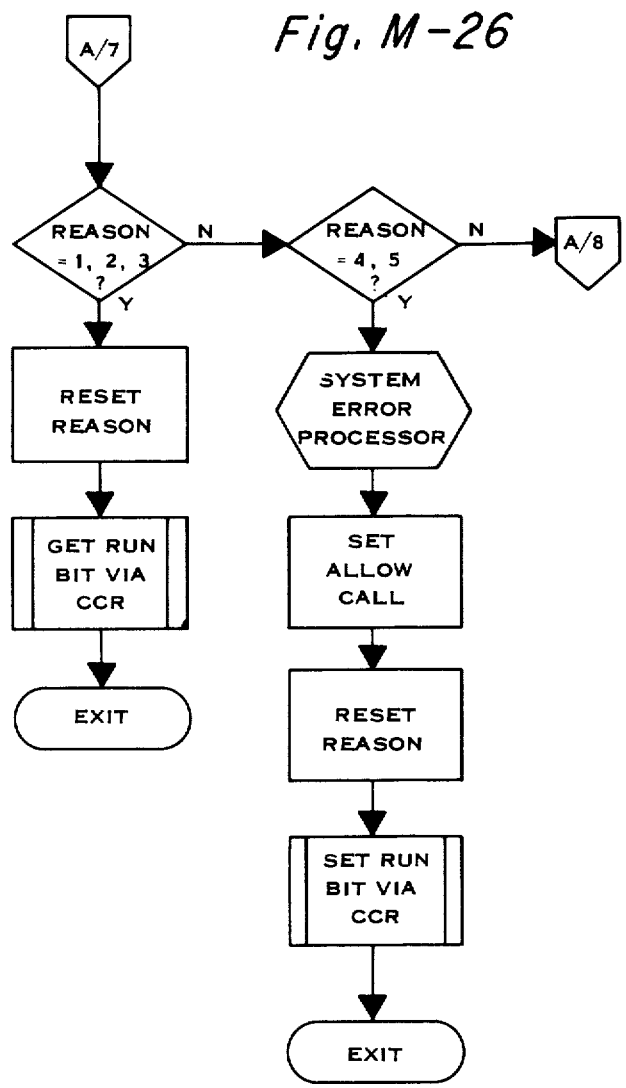
Fig. M-26

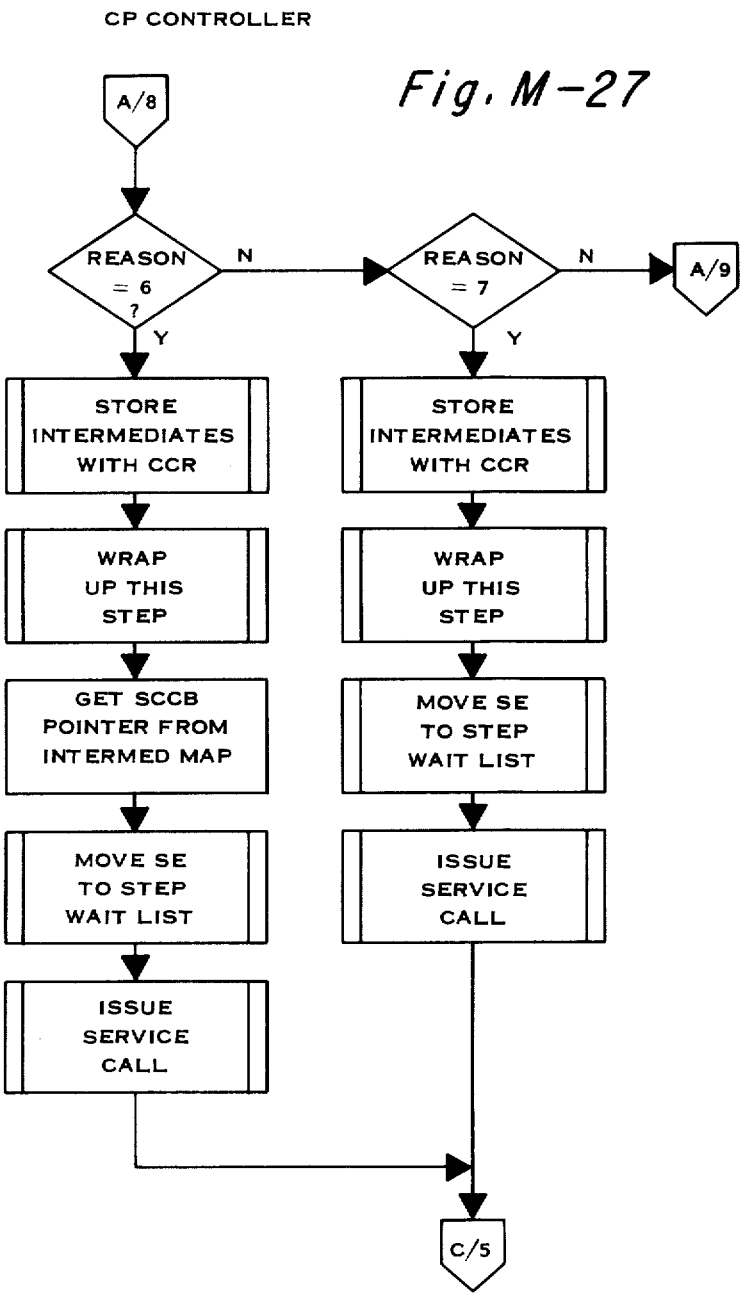
Fig. M-27

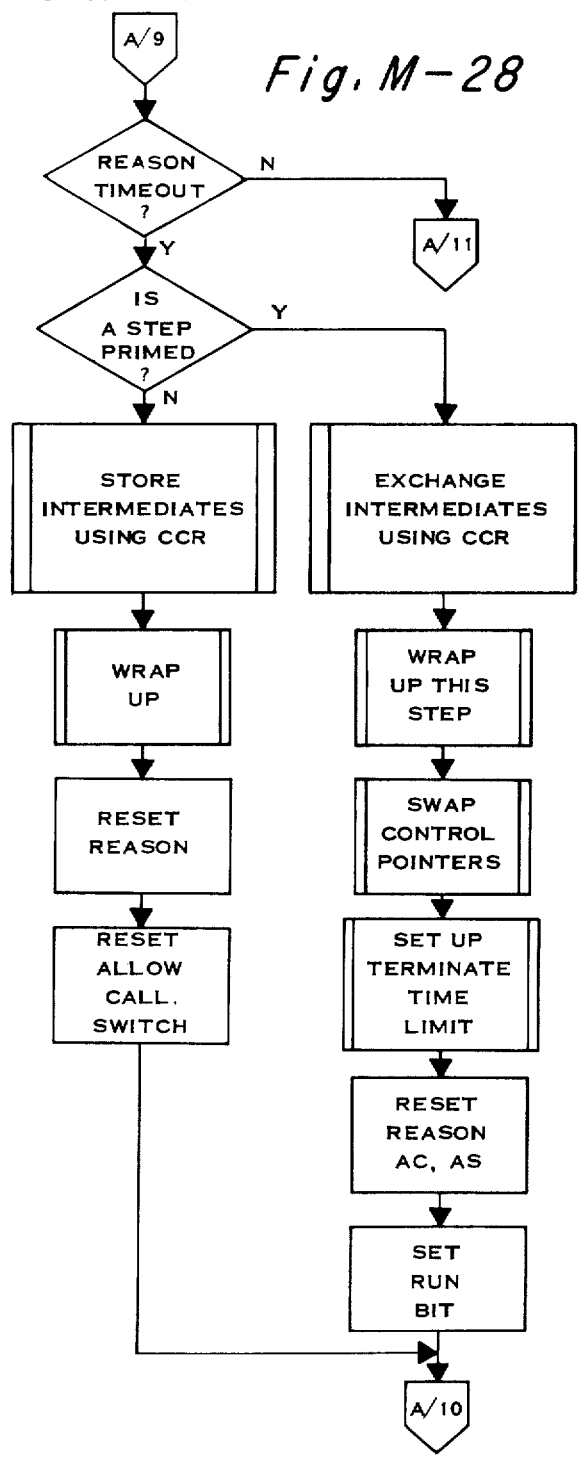
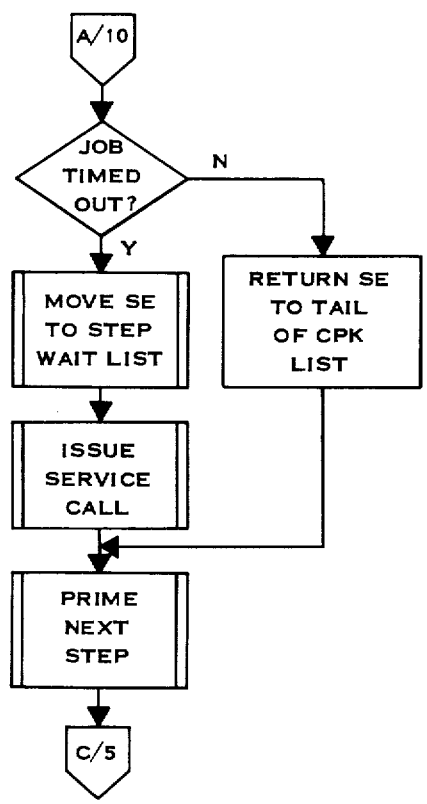
Fig. M-28
Fig. M-29

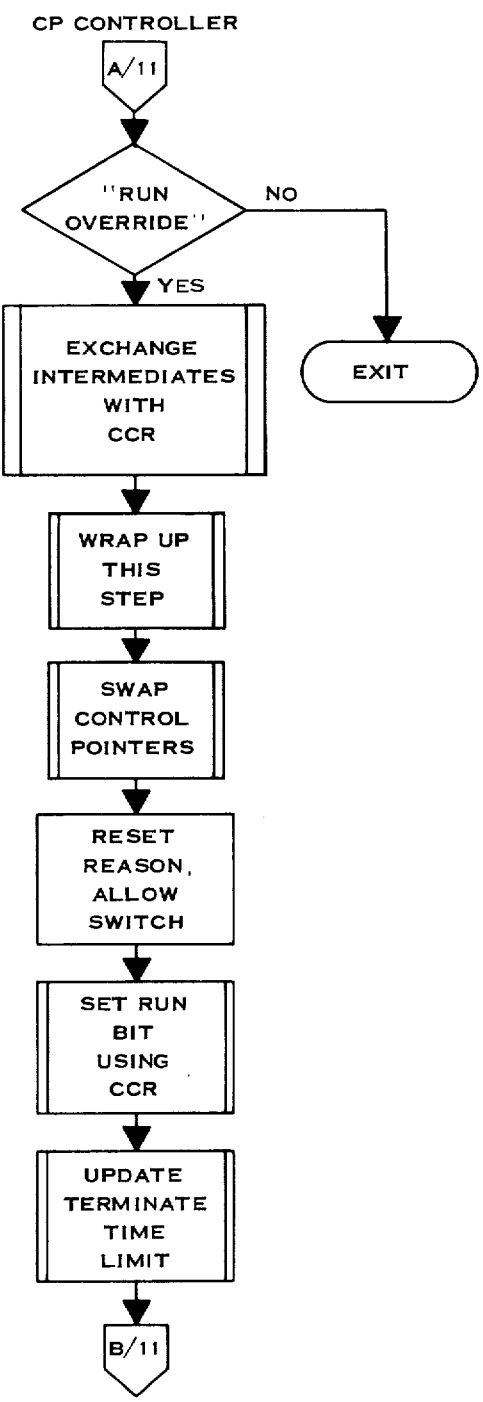
Fig. M-30
CP CONTROLLER
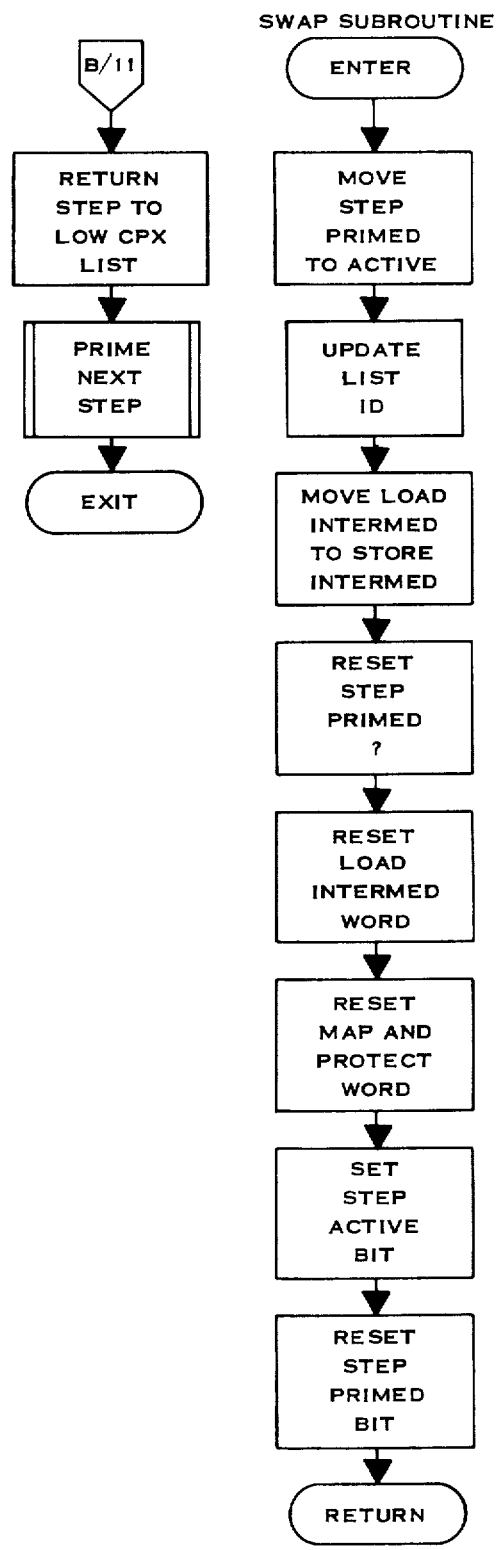
Fig. M-31
SWAP SUBROUTINE

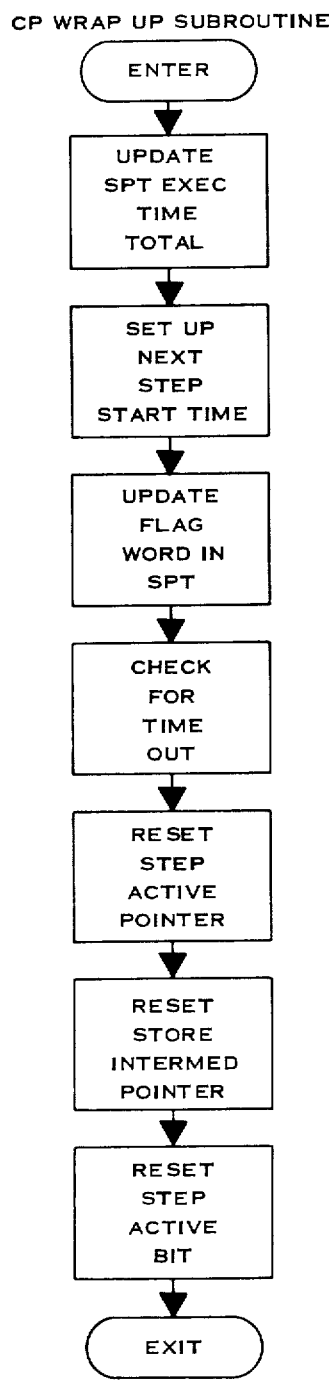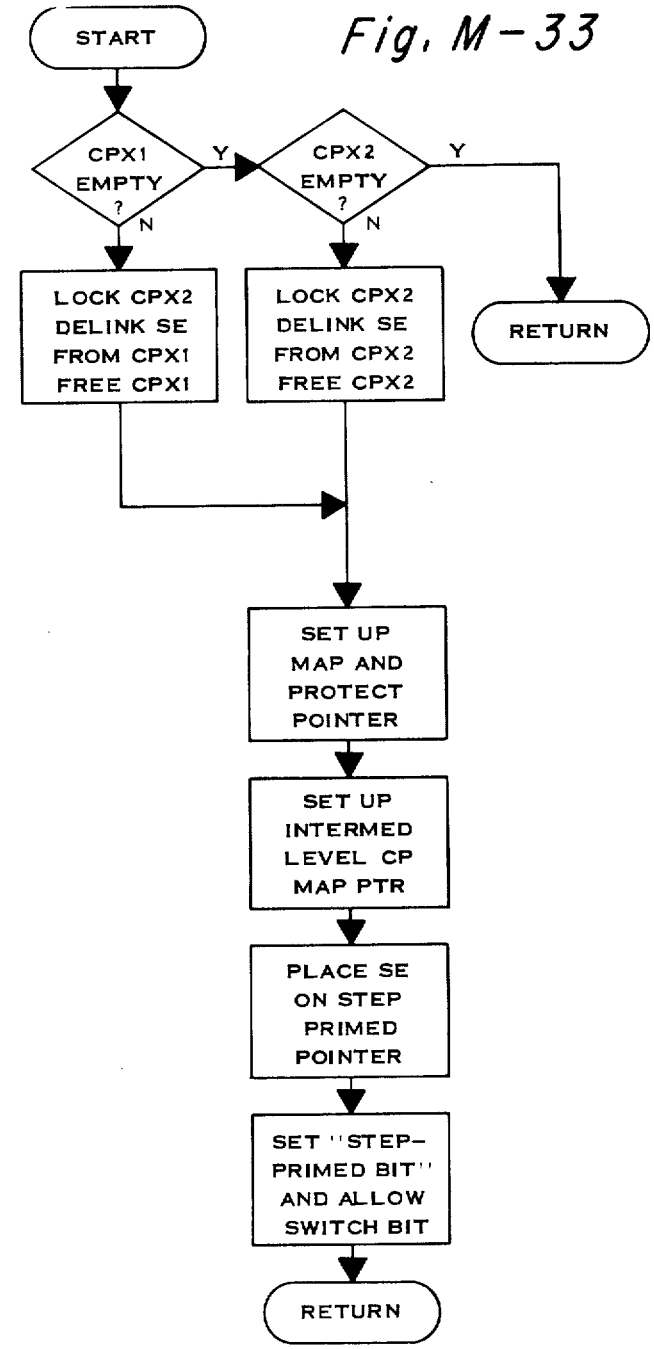
Fig. M-32
Fig. M-33

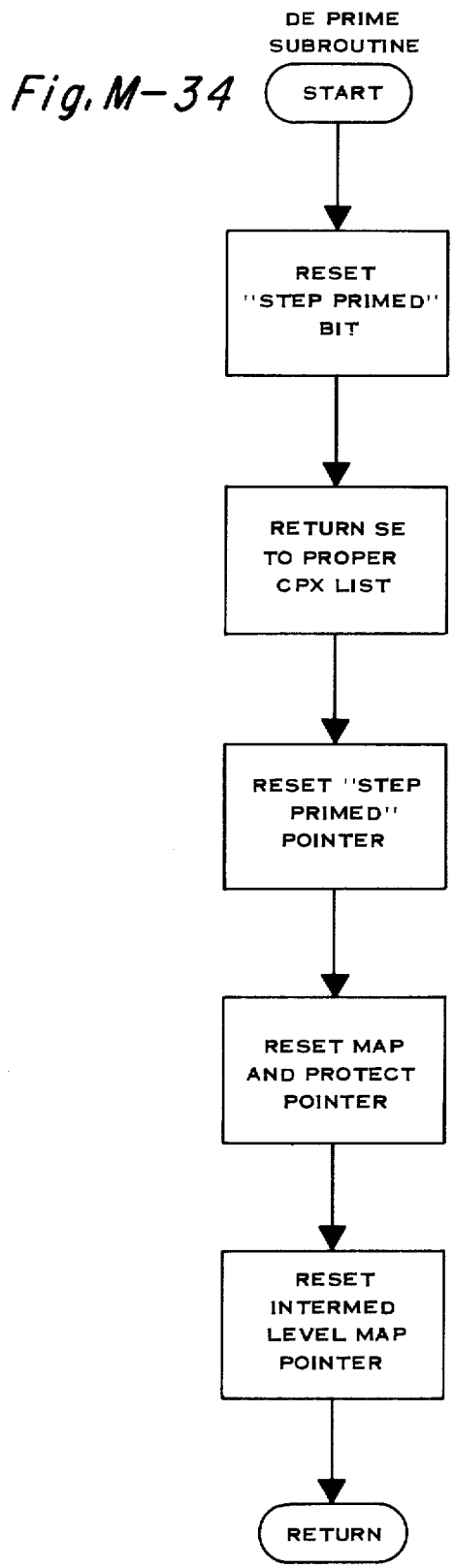
Fig. M-34
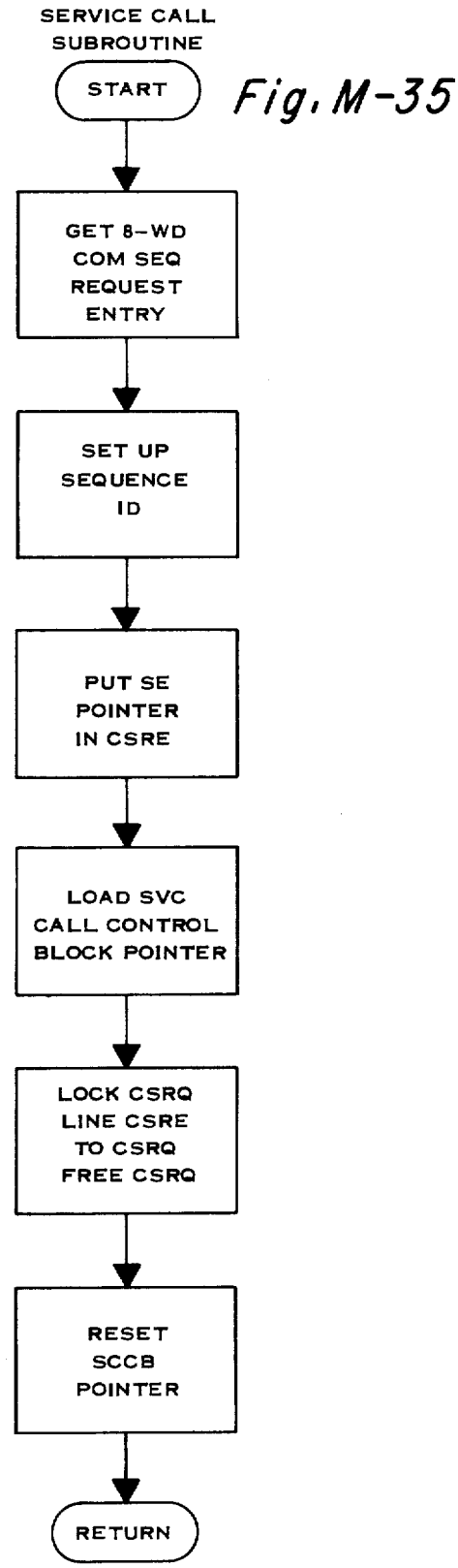
Fig. M-35

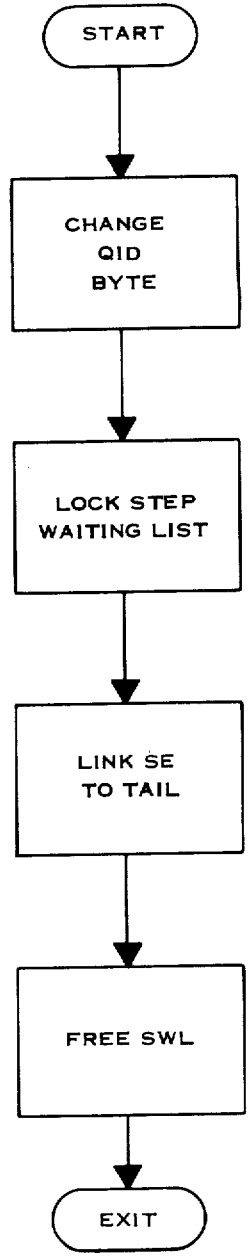
Fig. M-36
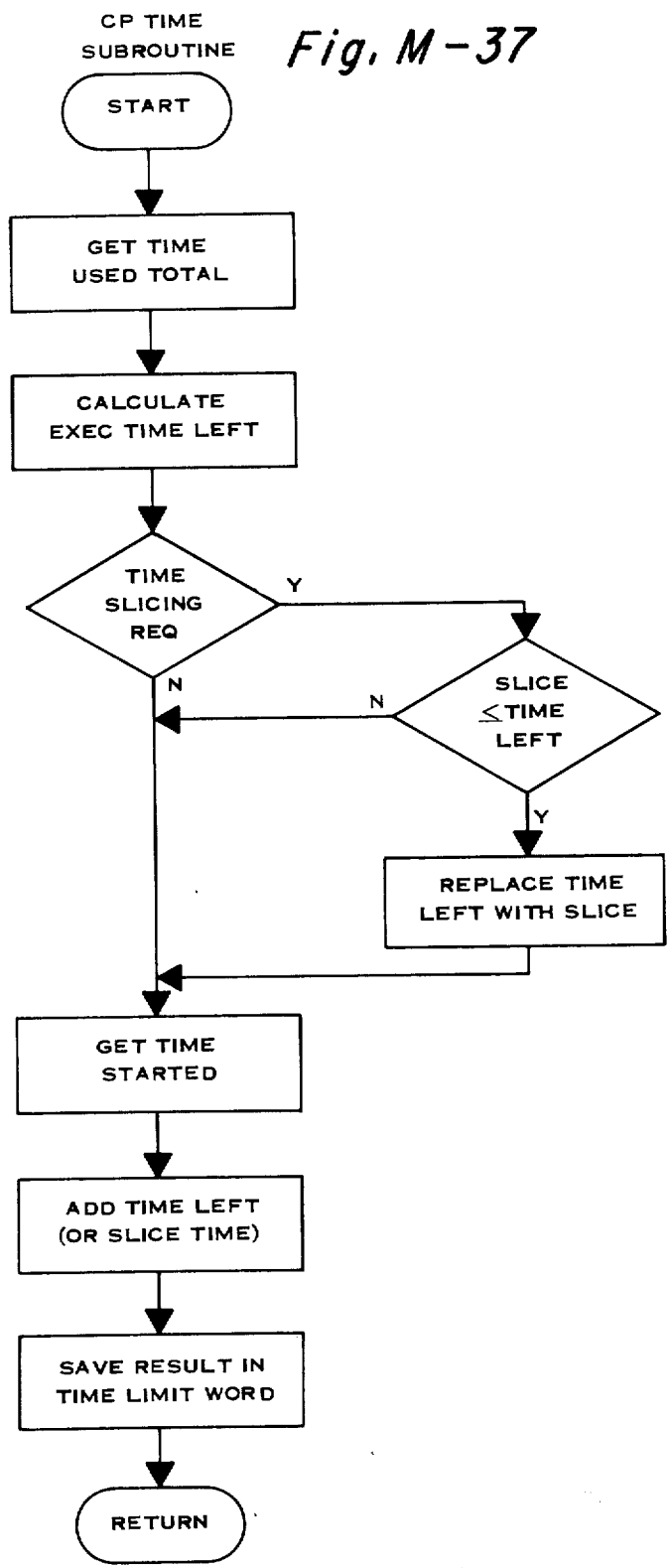
Fig. M-37

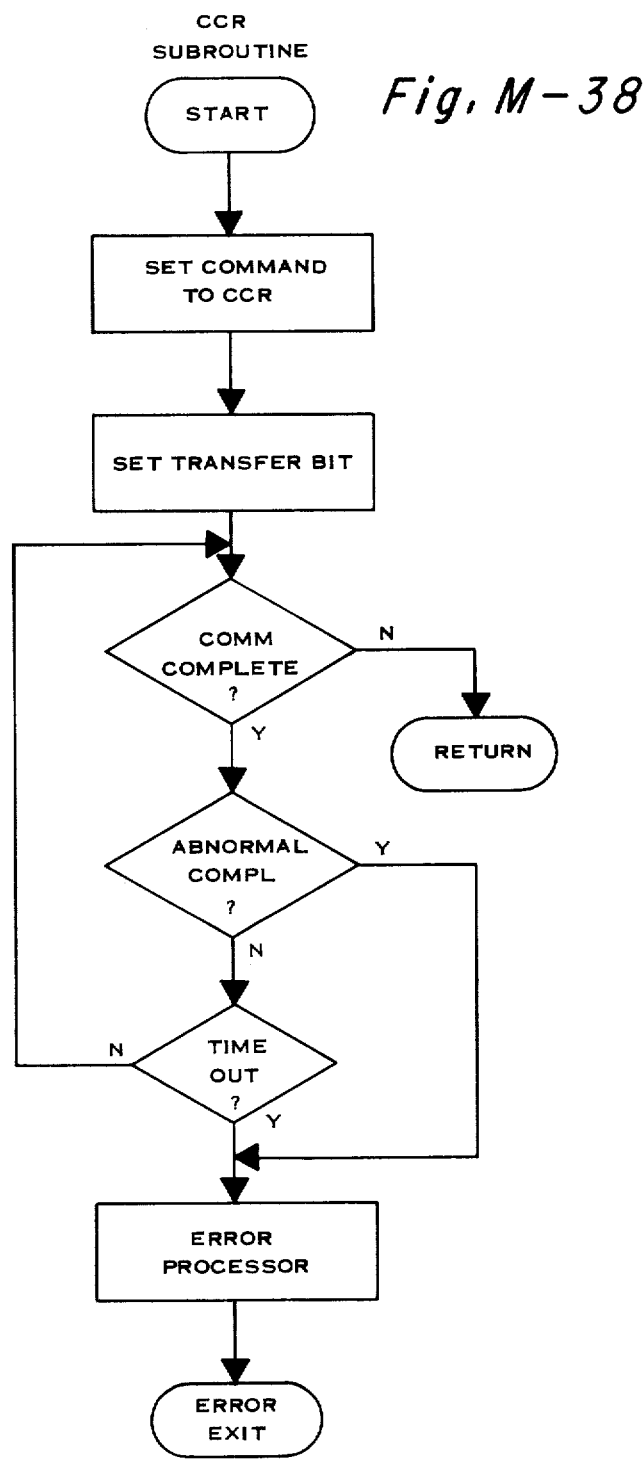
Fig. M-38

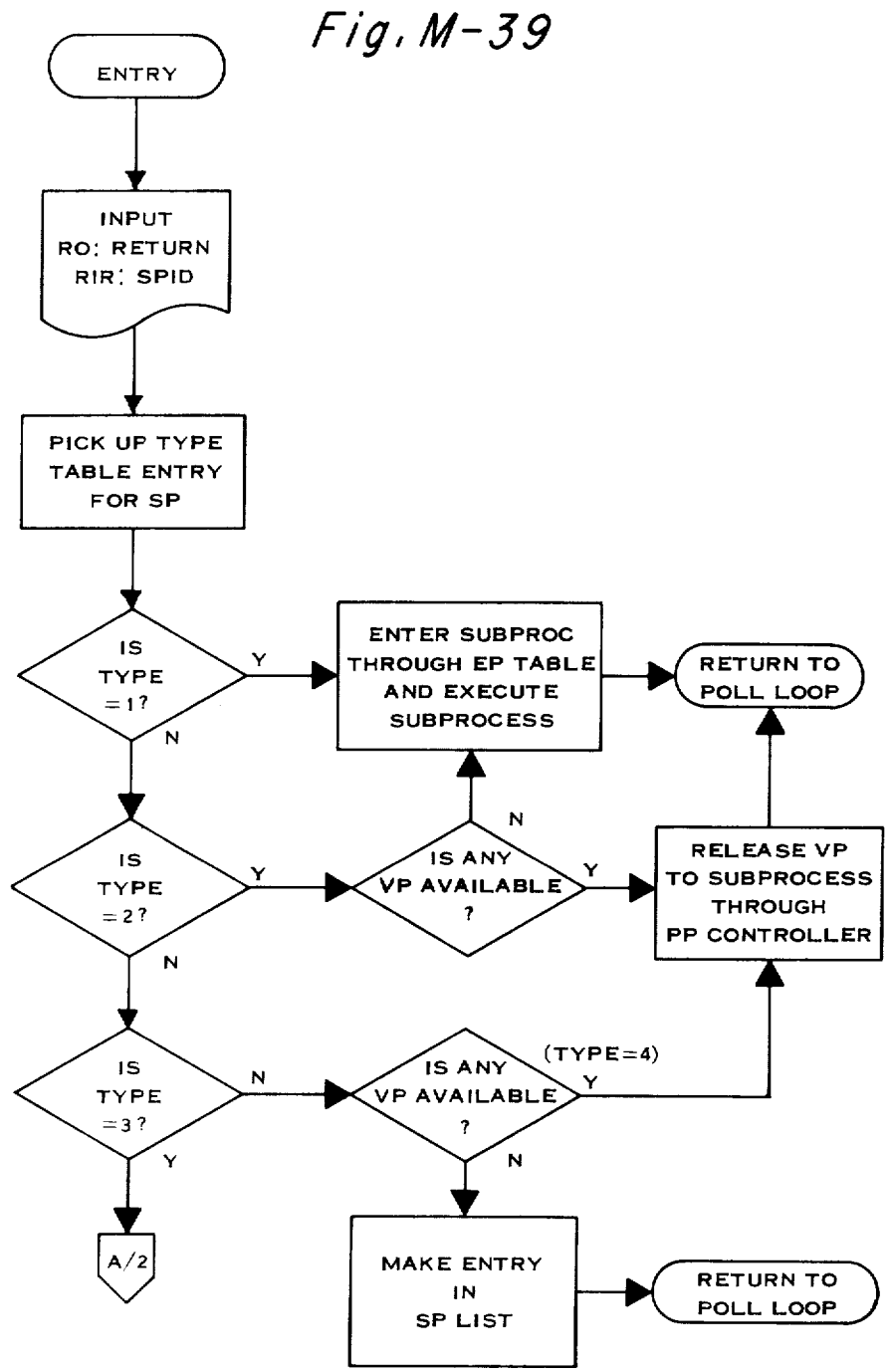
Fig. M-39

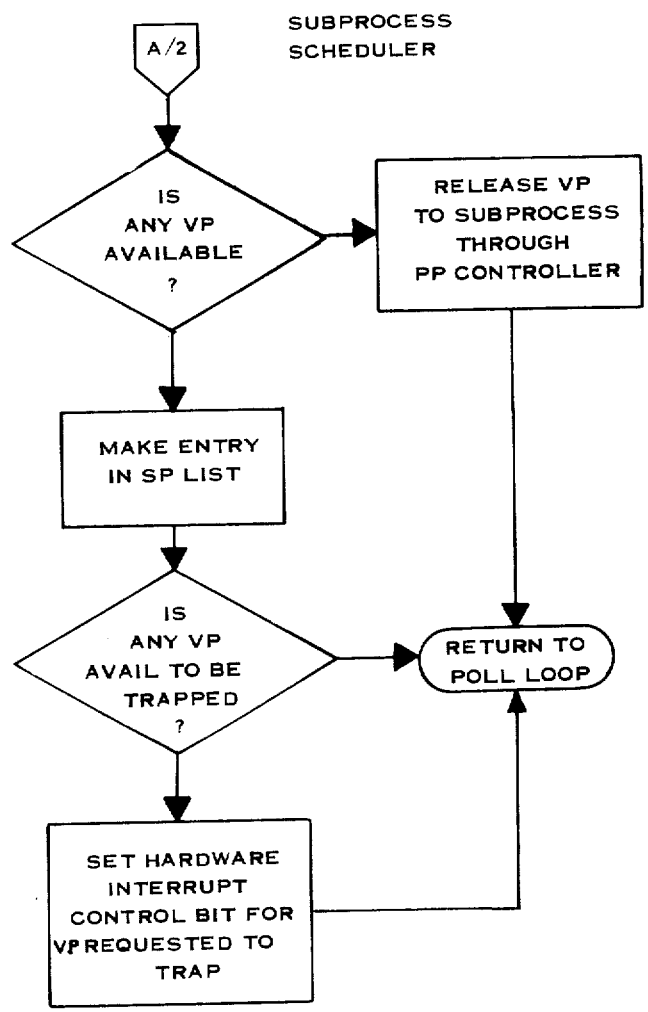
Fig. M-40

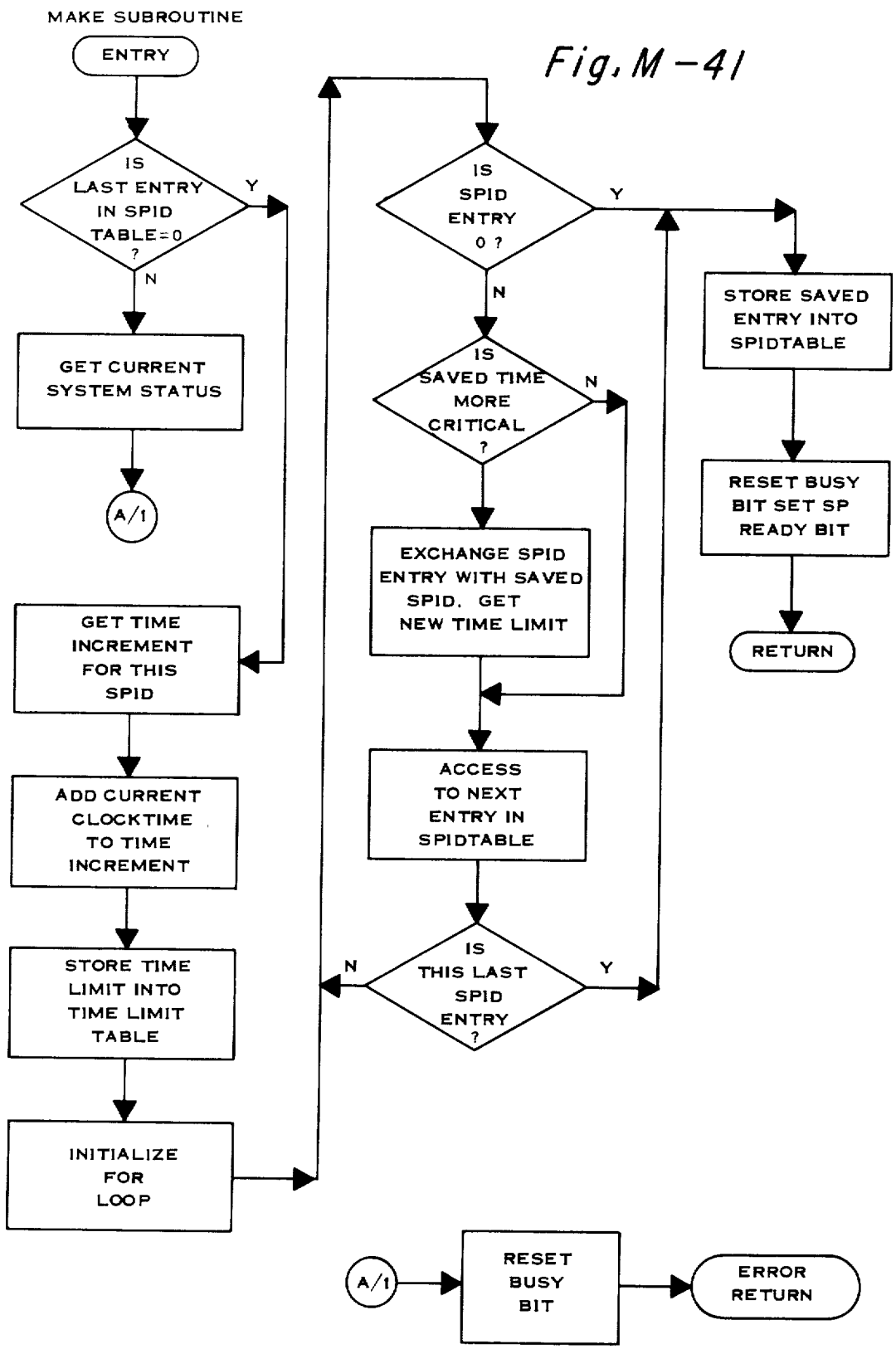
Fig. M-41

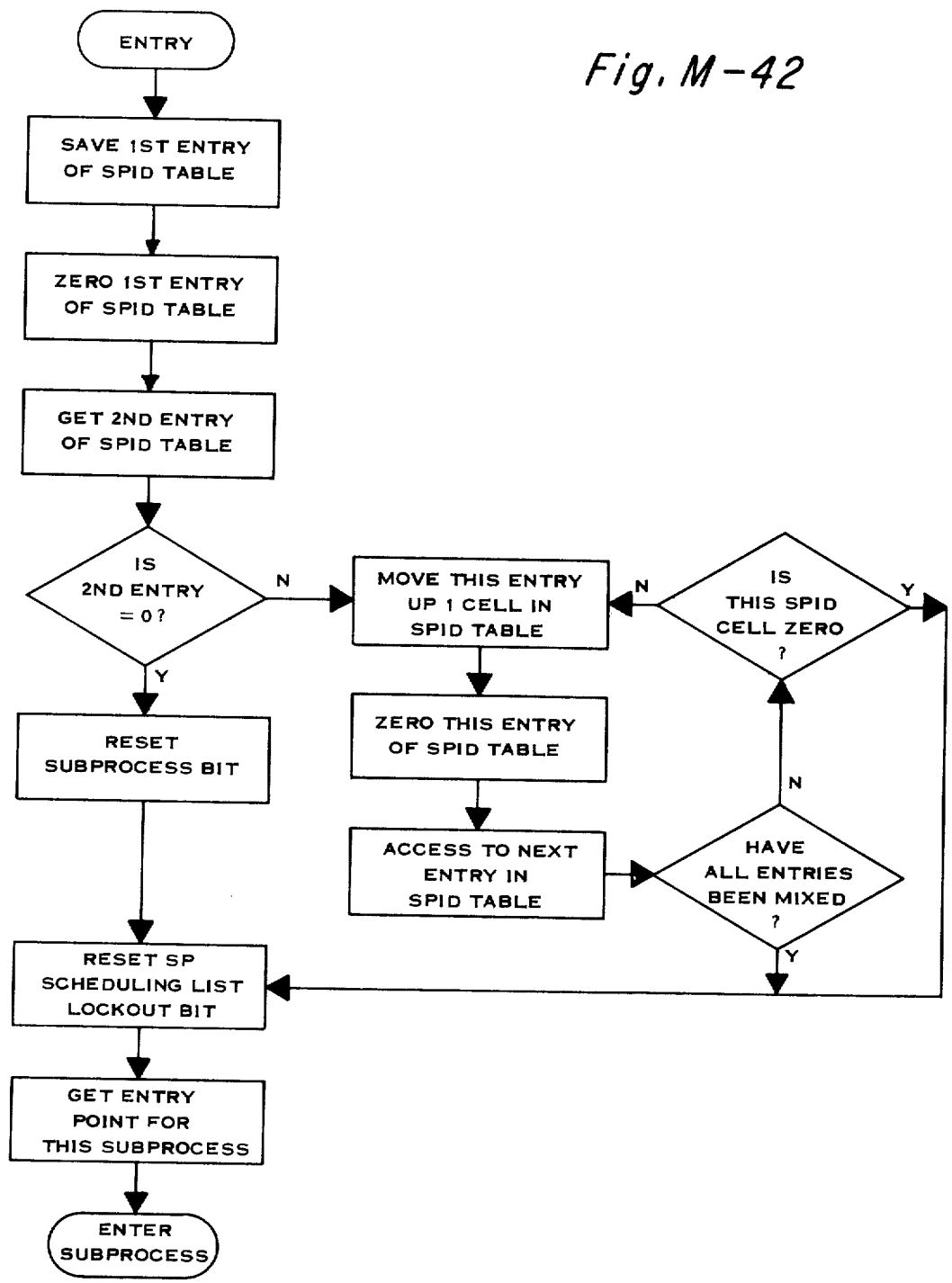
Fig. M-42

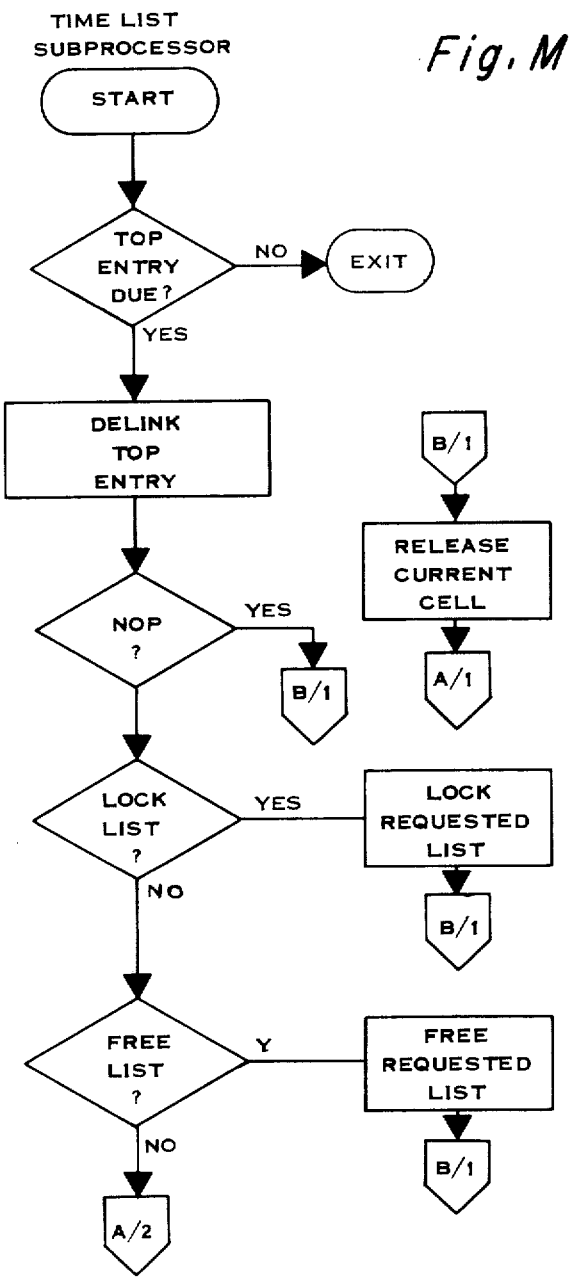
Fig. M-43

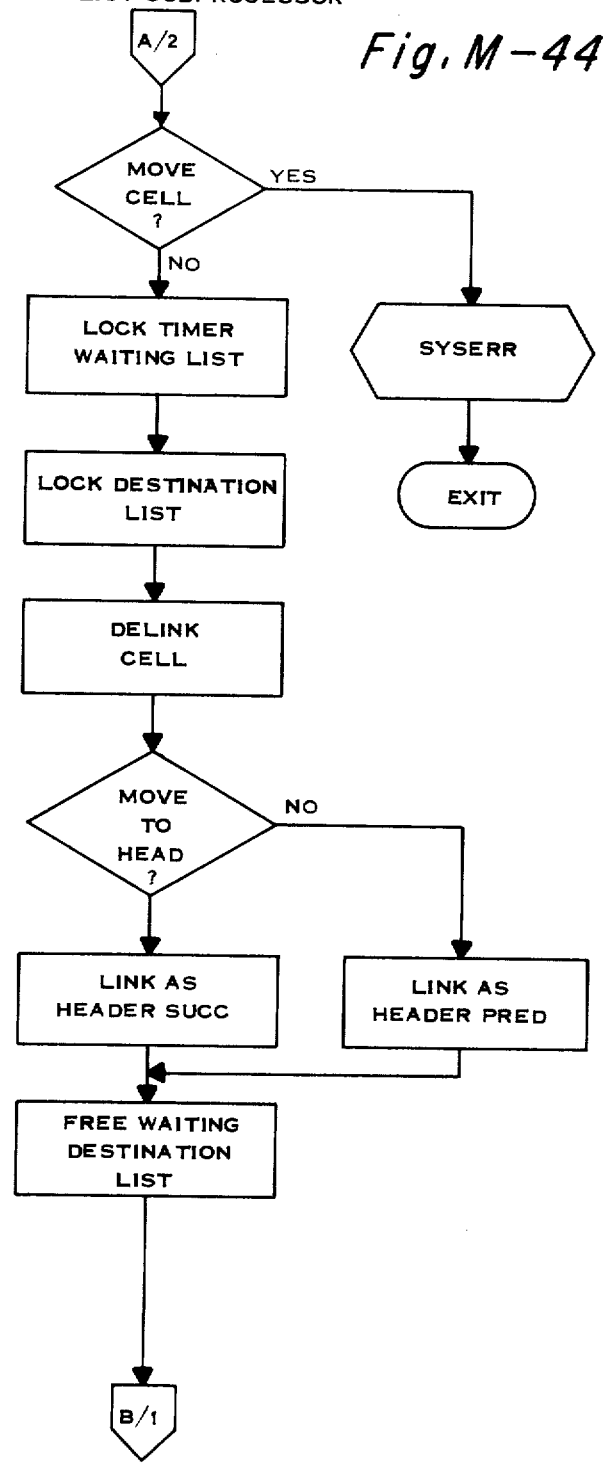
Fig. M-44

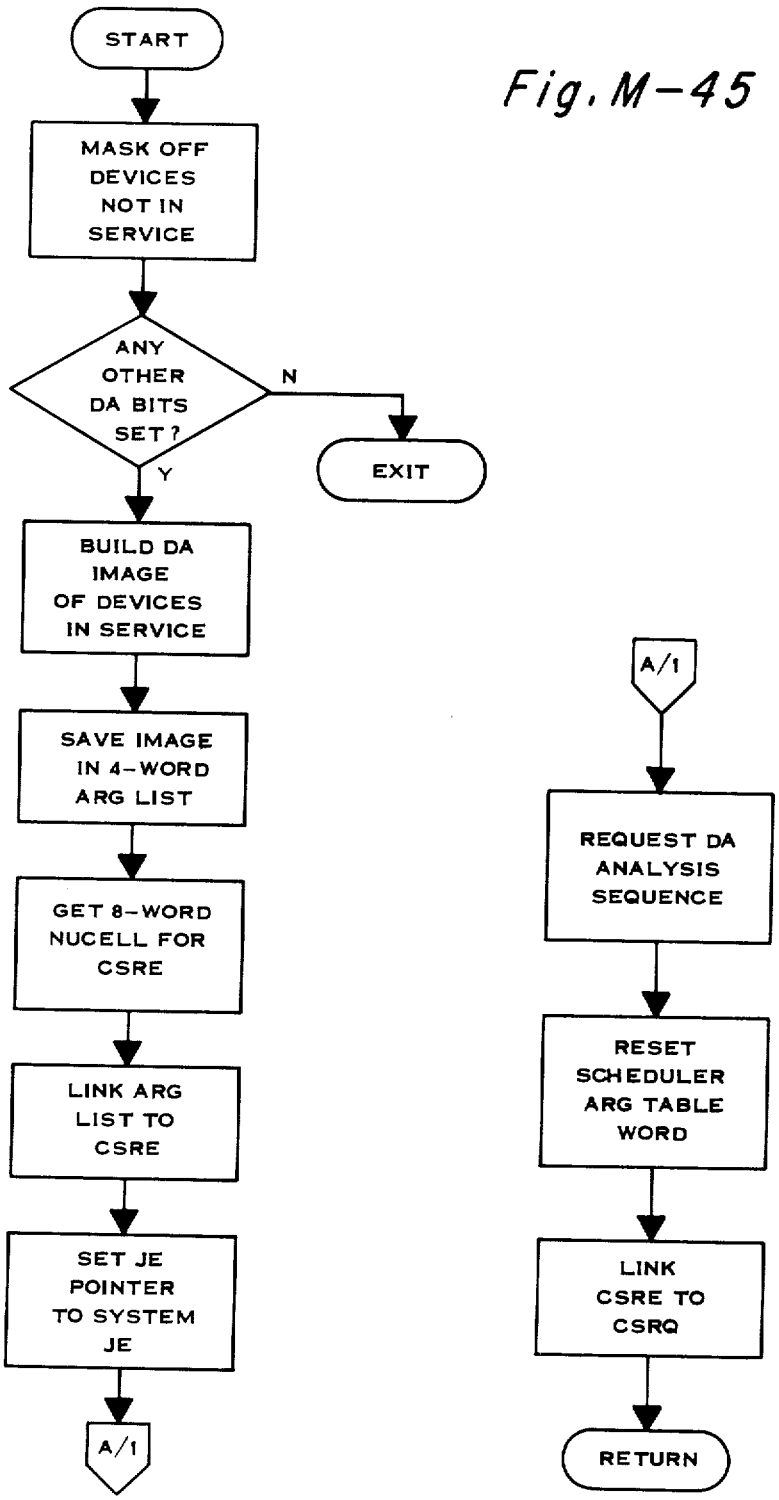
Fig. M-45

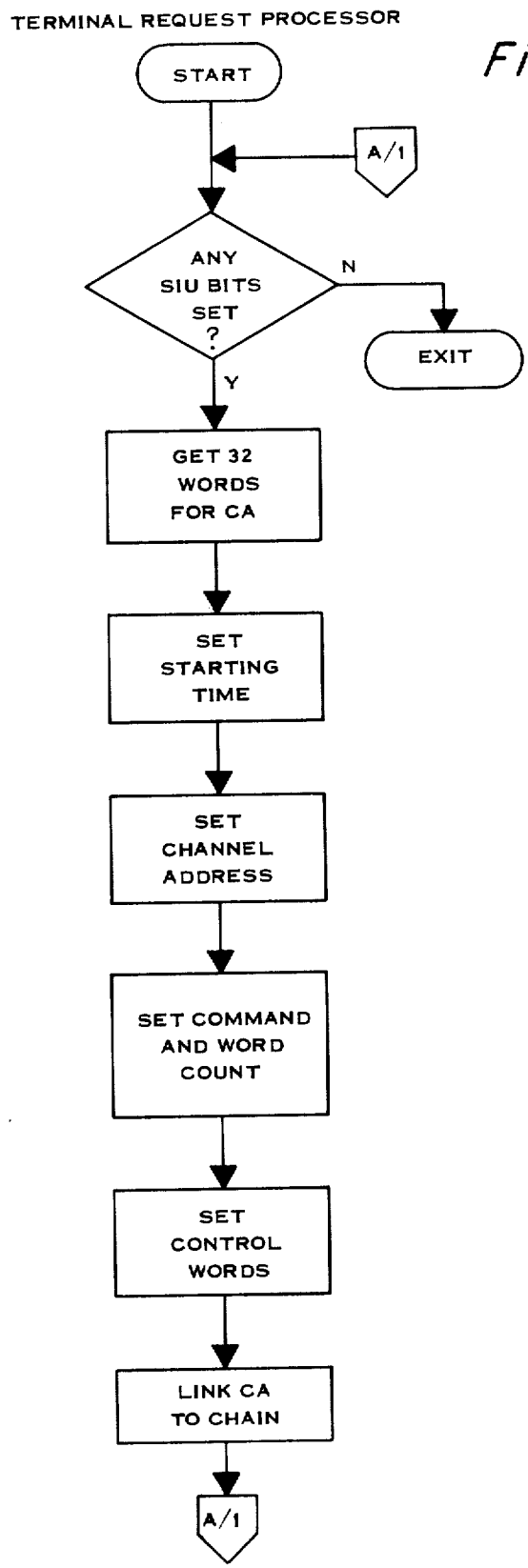

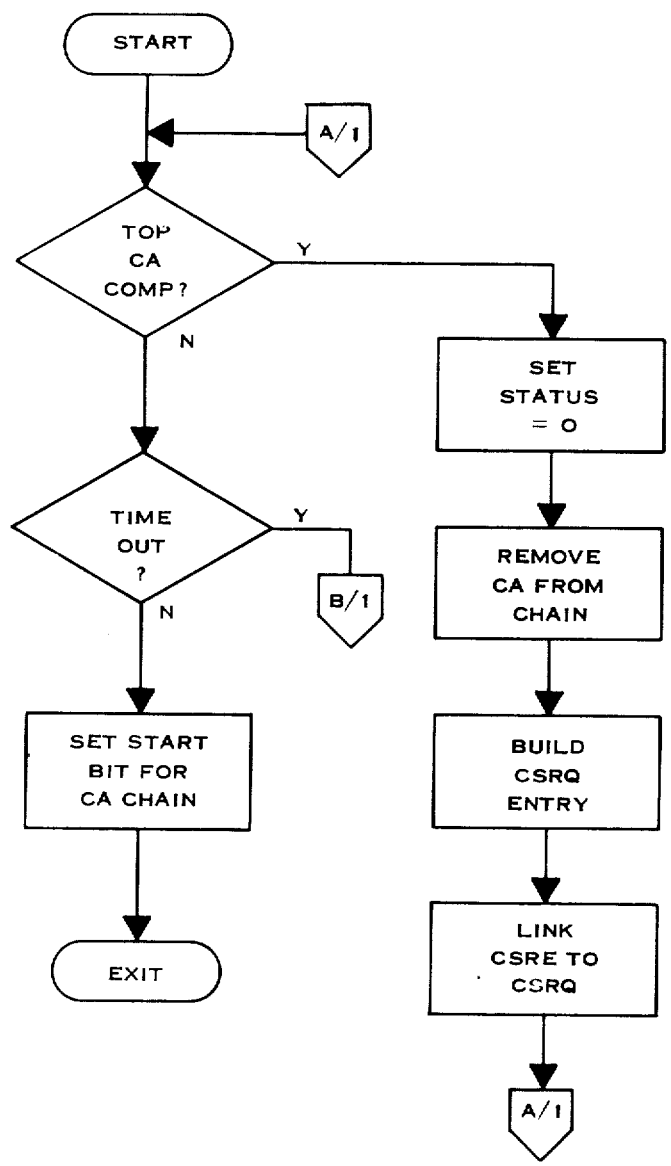
Fig. M-47

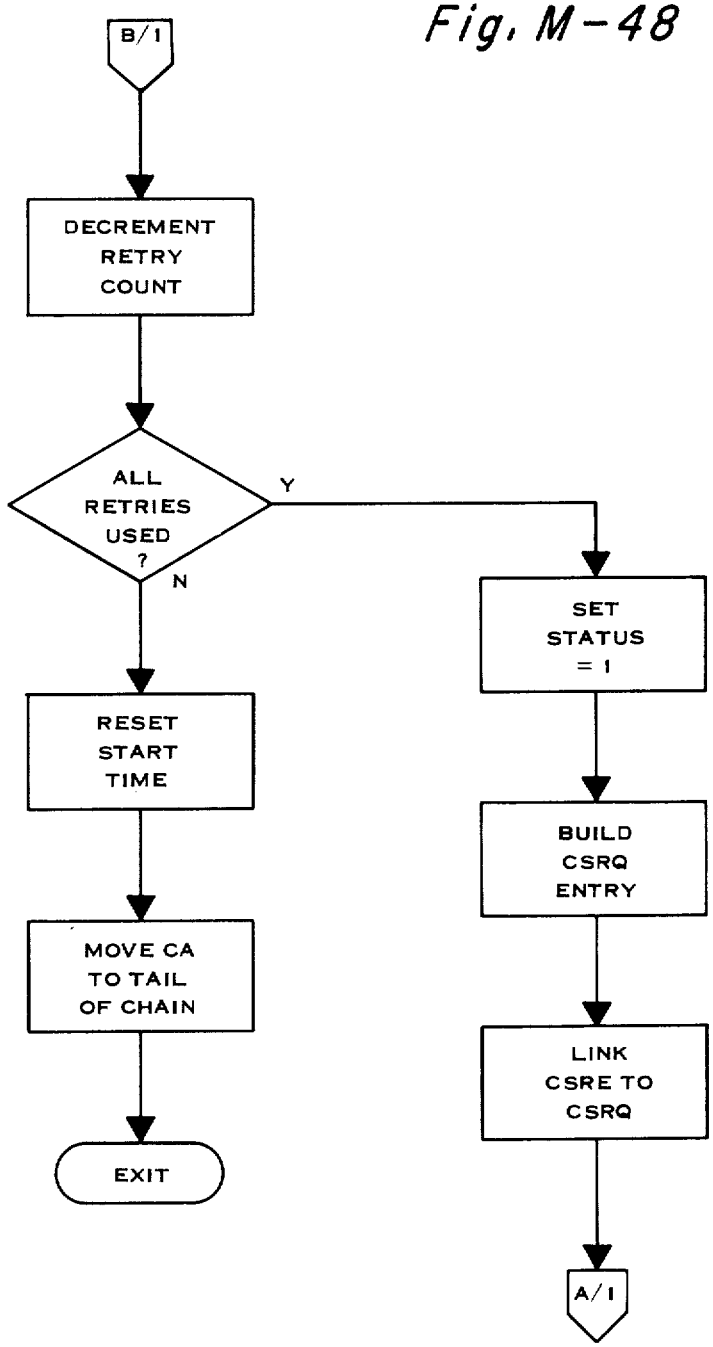
Fig. M-48

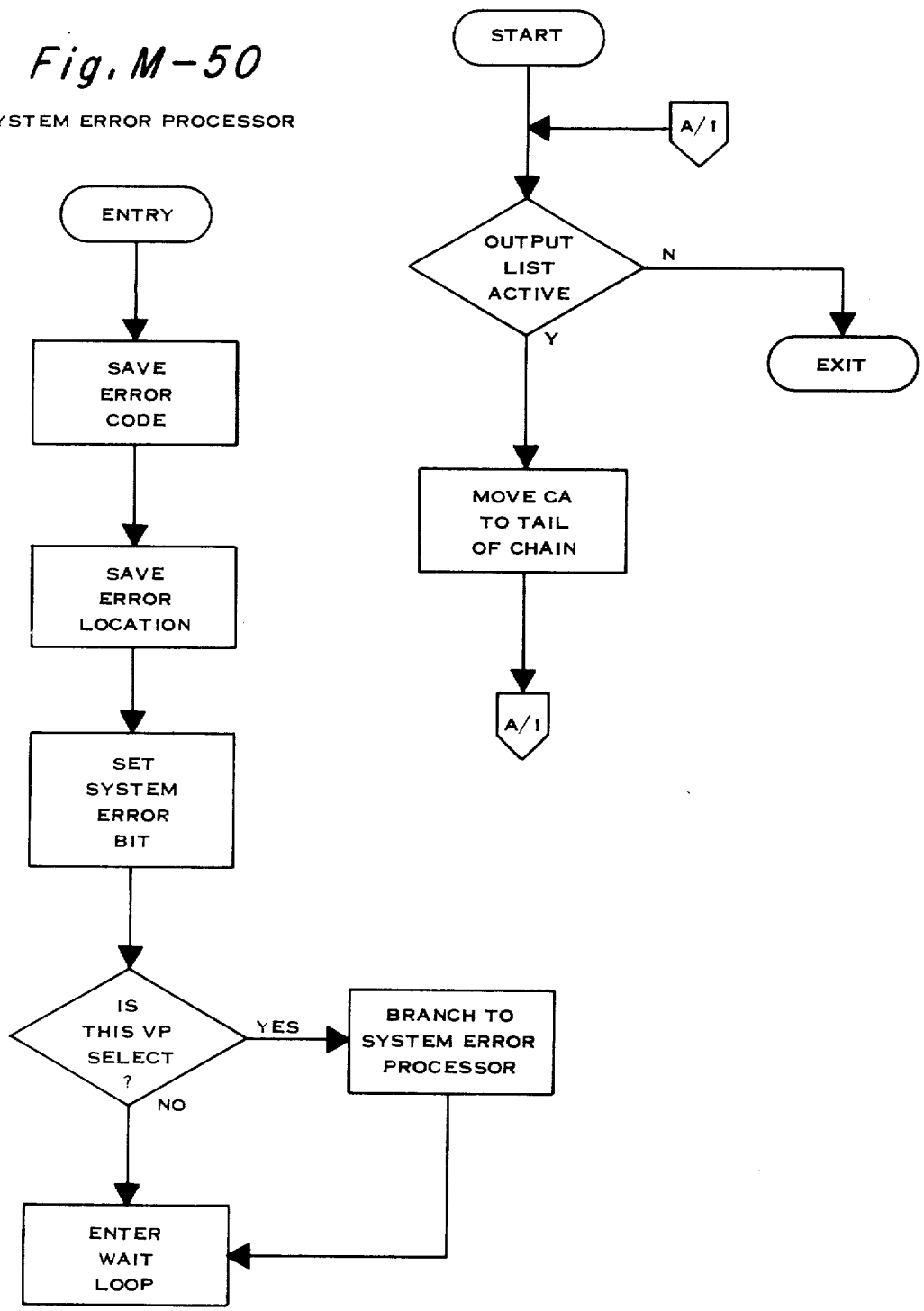

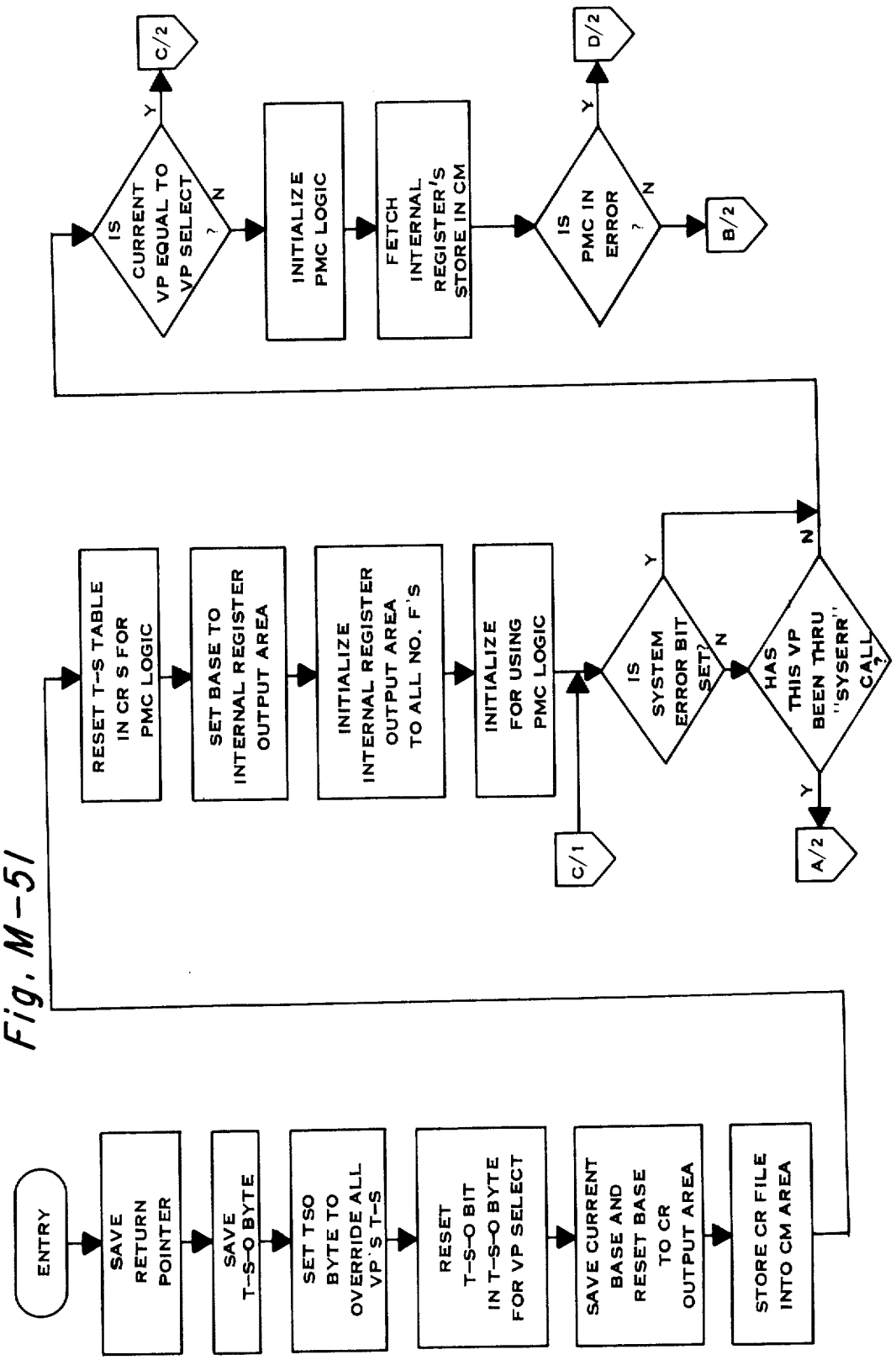
Fig. M-51

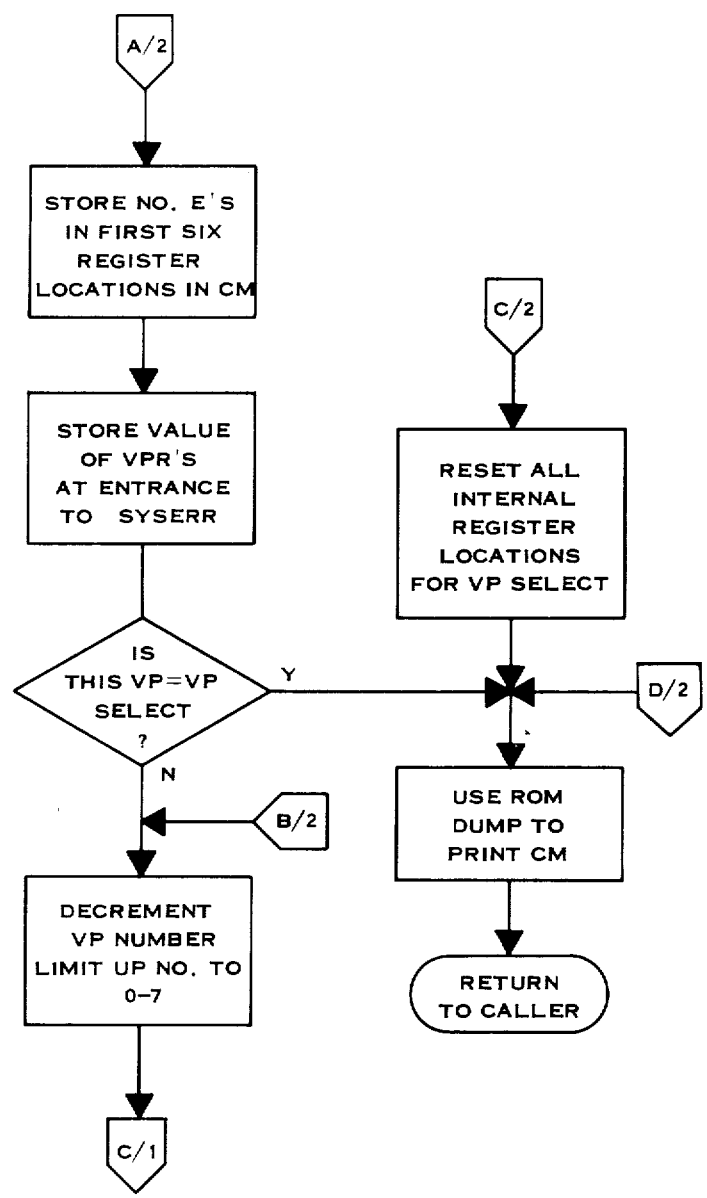
Fig. M-52

Fig. M-53

| | C1 | C2 | C3 | C4 | C5 | C6 | C7 |
|---|---|---|---|---|---|---|---|
| C0 | | | | | | | |
| C8 | | | | | | | |
| C16 | | | | | | | |
| C24 | | | | | | | |
| C32 | | | | | | | |
| C40 | | | | | | | |
| C48 | | | | | | | |
| C56 | | | | | | | |

CM LOCATION (HEX): 400, 408, 410, 418, 420, 428, 430, 438

COMMUNICATION REGISTER FILE UPON ENTRANCE TO SYSTEM ERROR PROCESSOR

Fig. M-54

INTERNAL REGISTERS OF VP S

| CM LOCATION (HEX) | VP0 | VP1 | VP2 | VP3 | VP4 | VP5 | VP6 | VP7 |
|---|---|---|---|---|---|---|---|---|
| 440 | 00\|00\|00\|00 | EE\|EE\|EE\|EE | PC | EE\|EE\|EE\|EE | PC | PC | PC | PC |
| 448 | 00\|00\|00\|00 | EE\|EE\|EE\|EE | NIR | EE\|EE\|EE\|EE | NIR | NIR | NIR | NIR |
| 450 | 00\|00\|00\|00 | EE\|EE\|EE\|EE | IR0 | EE\|EE\|EE\|EE | IR0 | IR0 | IR0 | IR0 |
| 458 | 00\|00\|00\|00 | EE\|EE\|EE\|EE | IR1 | EE\|EE\|EE\|EE | IR1 | IR1 | IR1 | IR1 |
| 460 | 00\|00\|00\|00 | EE\|EE\|EE\|EE | SWBD | EE\|EE\|EE\|EE | SWBD | SWBD | SWBD | SWBD |
| 468 | 00\|00\|00\|00 | EE\|EE\|EE\|EE | SWBA | EE\|EE\|EE\|EE | SWBA | SWBA | SWBA | SWBA |
| 470 | 00\|00\|00\|00 | VPR0 | VPR0 | VPR0 | VPR0 | VPR0 | VPR0 | VPR0 |
| 478 | 00\|00\|00\|00 | VPR1 | VPR1 | VPR1 | VPR1 | VPR1 | VPR1 | VPR1 |
| 480 | 00\|00\|00\|00 | VPR2 | VPR2 | VPR2 | VPR2 | VPR2 | VPR2 | VPR2 |
| 488 | 00\|00\|00\|00 | VPR3 | VPR3 | VPR3 | VPR3 | VPR3 | VPR3 | VPR3 |

Fig. M-55

(A) ERROR CODES (B) ERROR LOCATIONS

CM LOCATION (HEX)

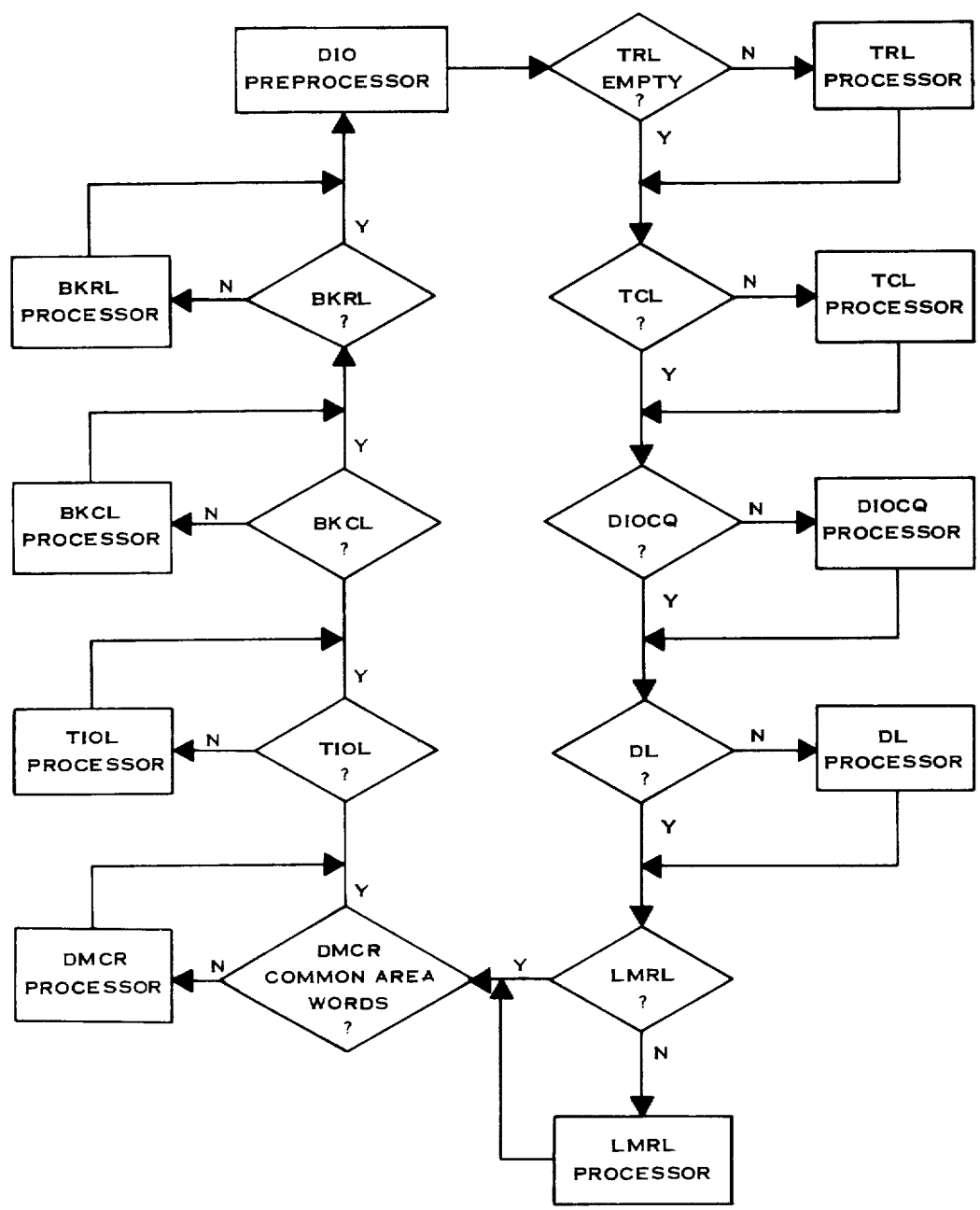
Fig. T-1

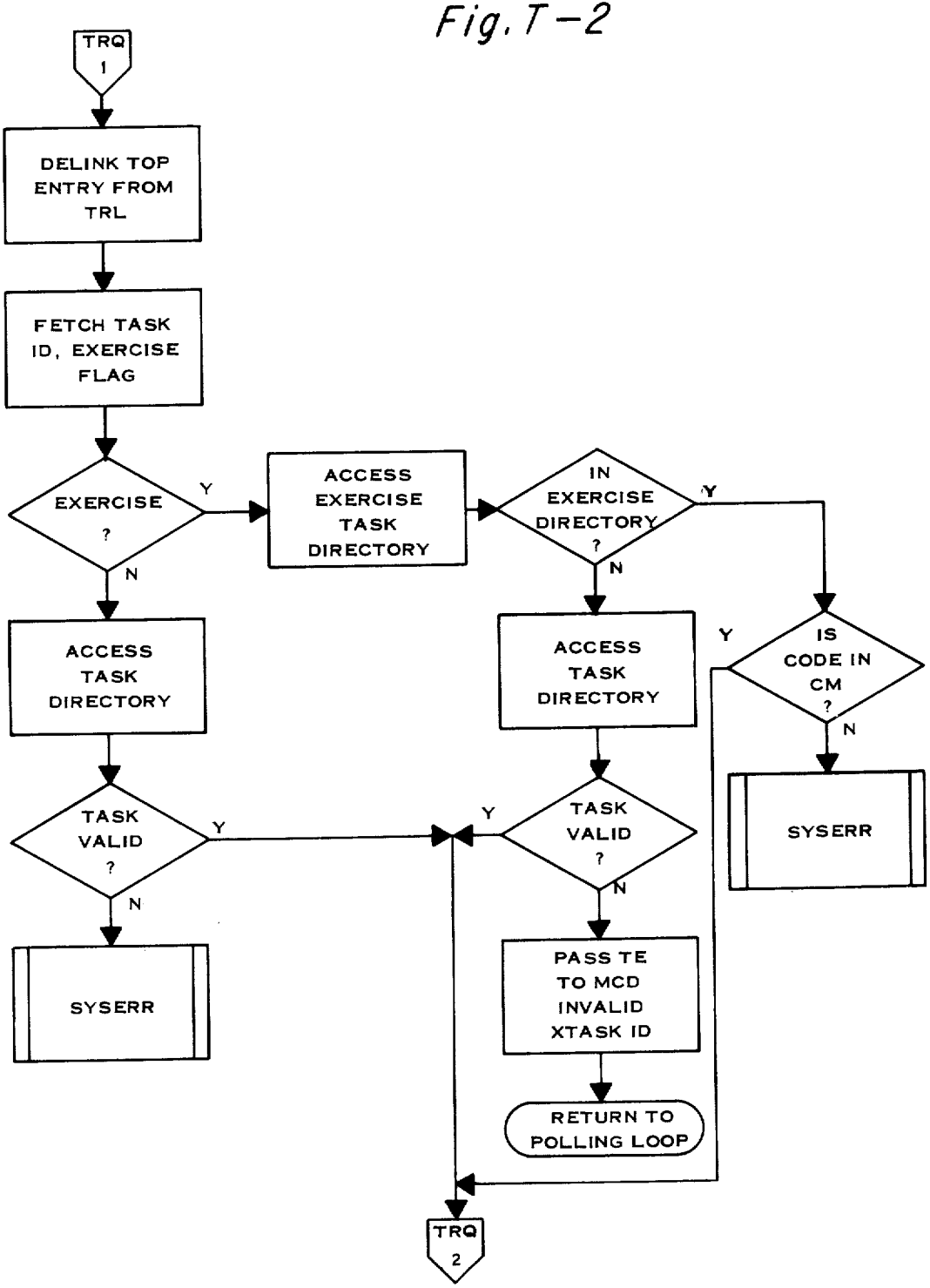
Fig. T-2

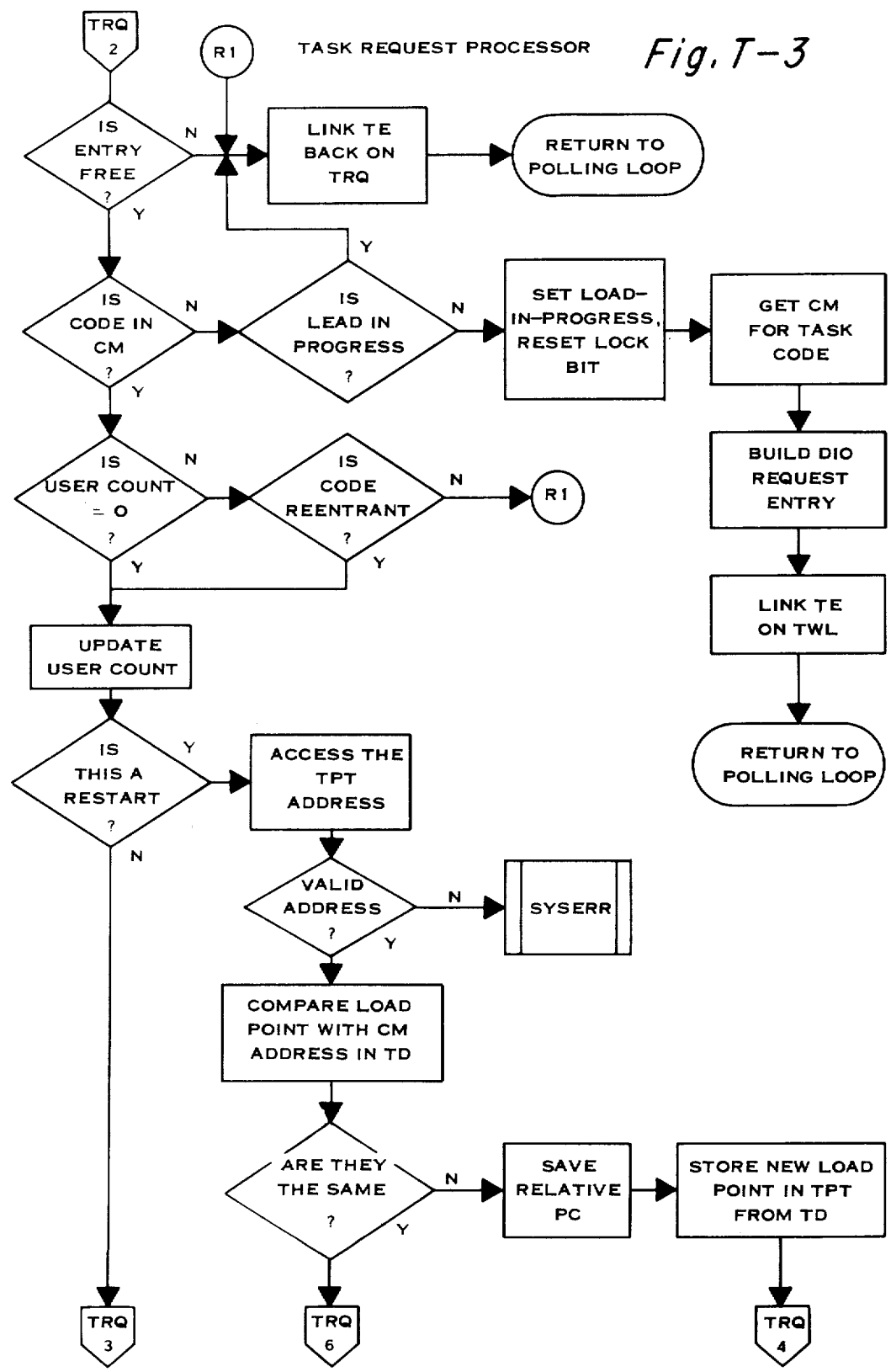
Fig. T-3

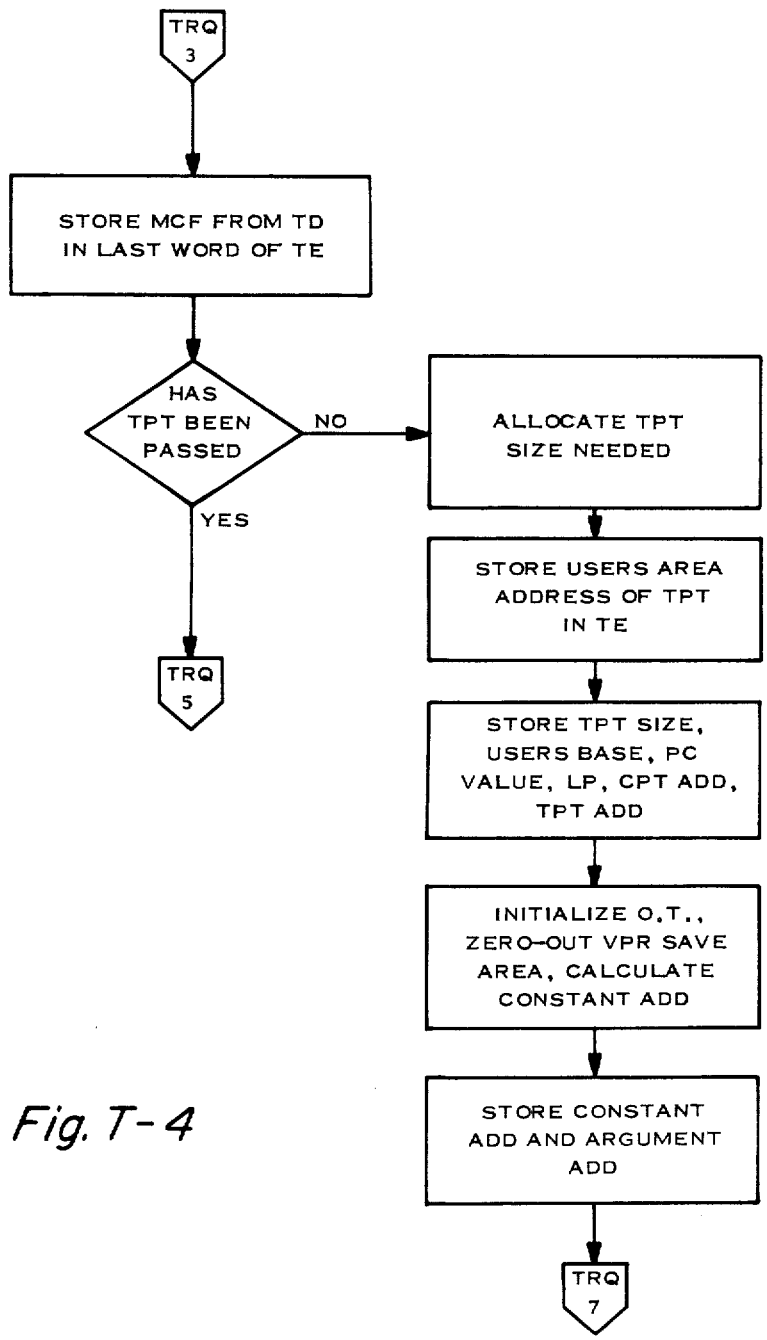
Fig. T-4

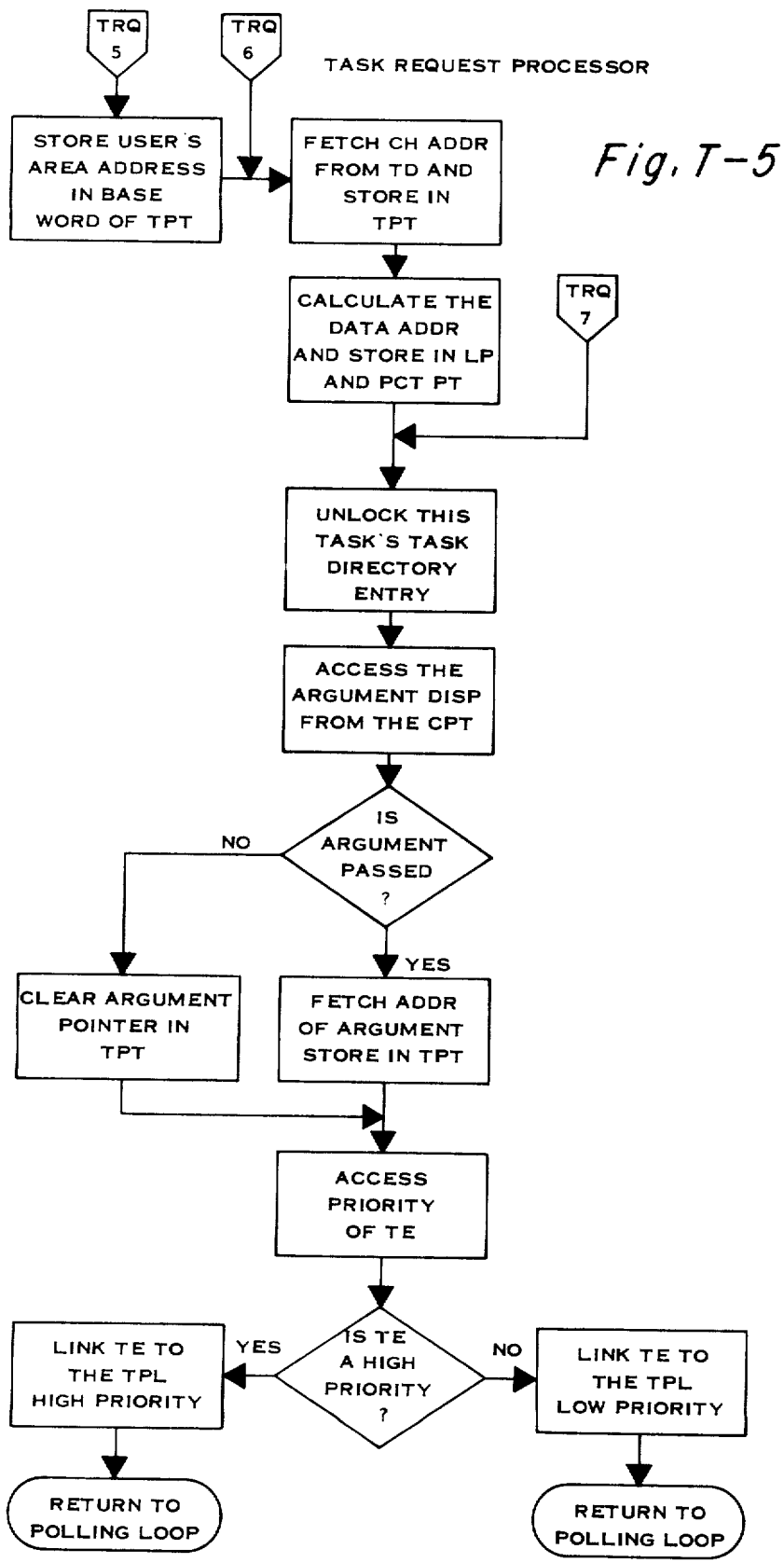

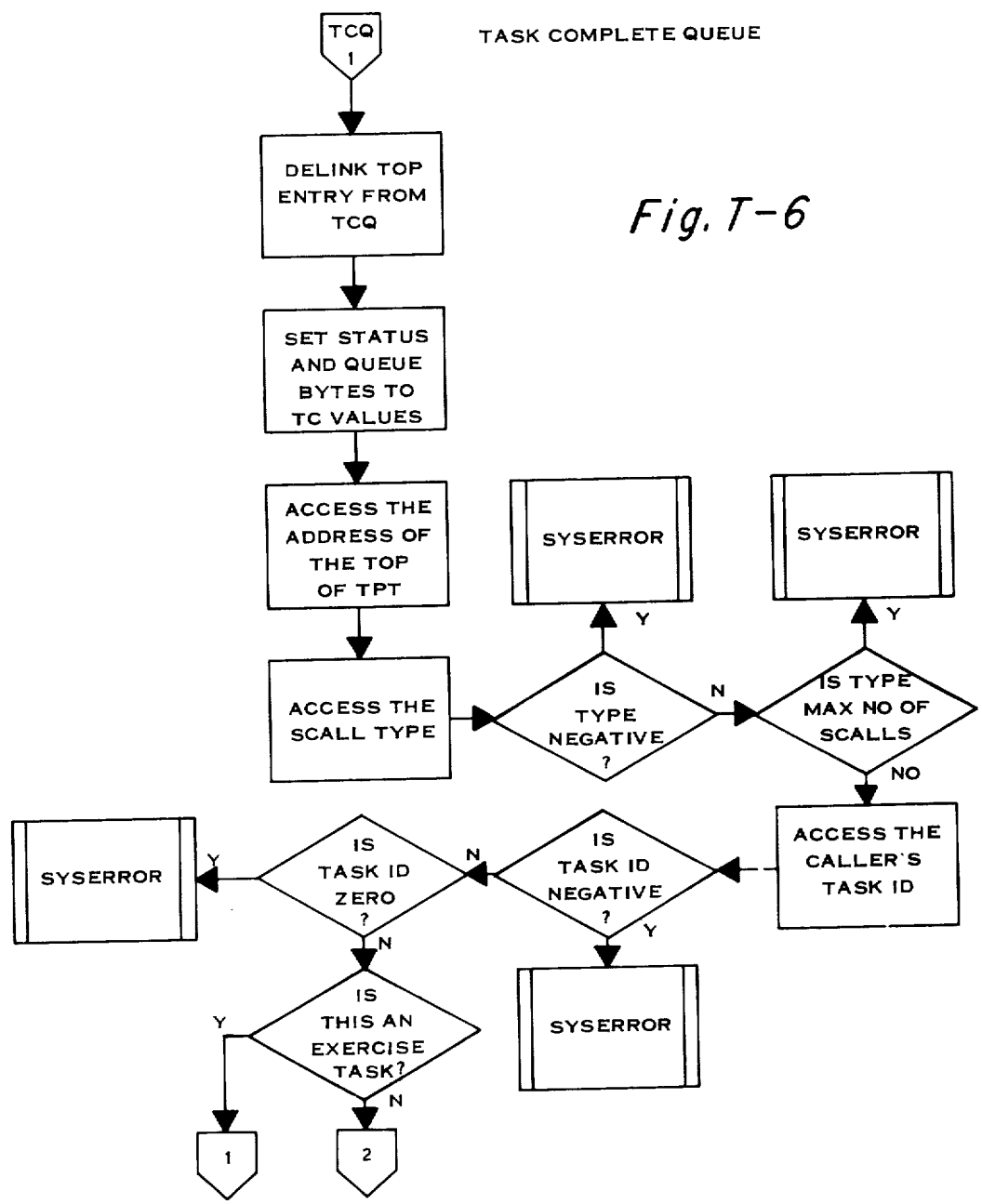
Fig. T-6

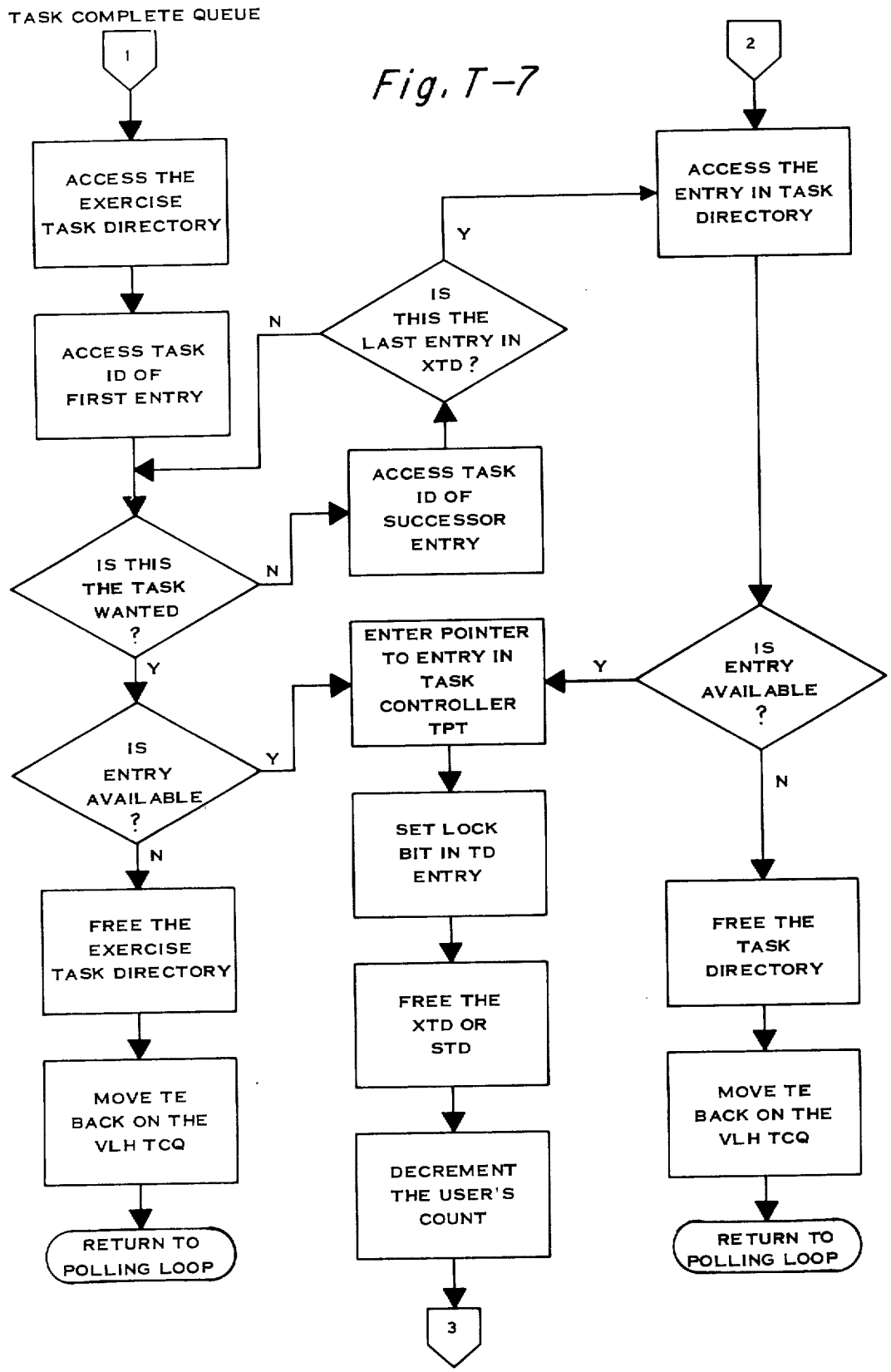
Fig. T-7

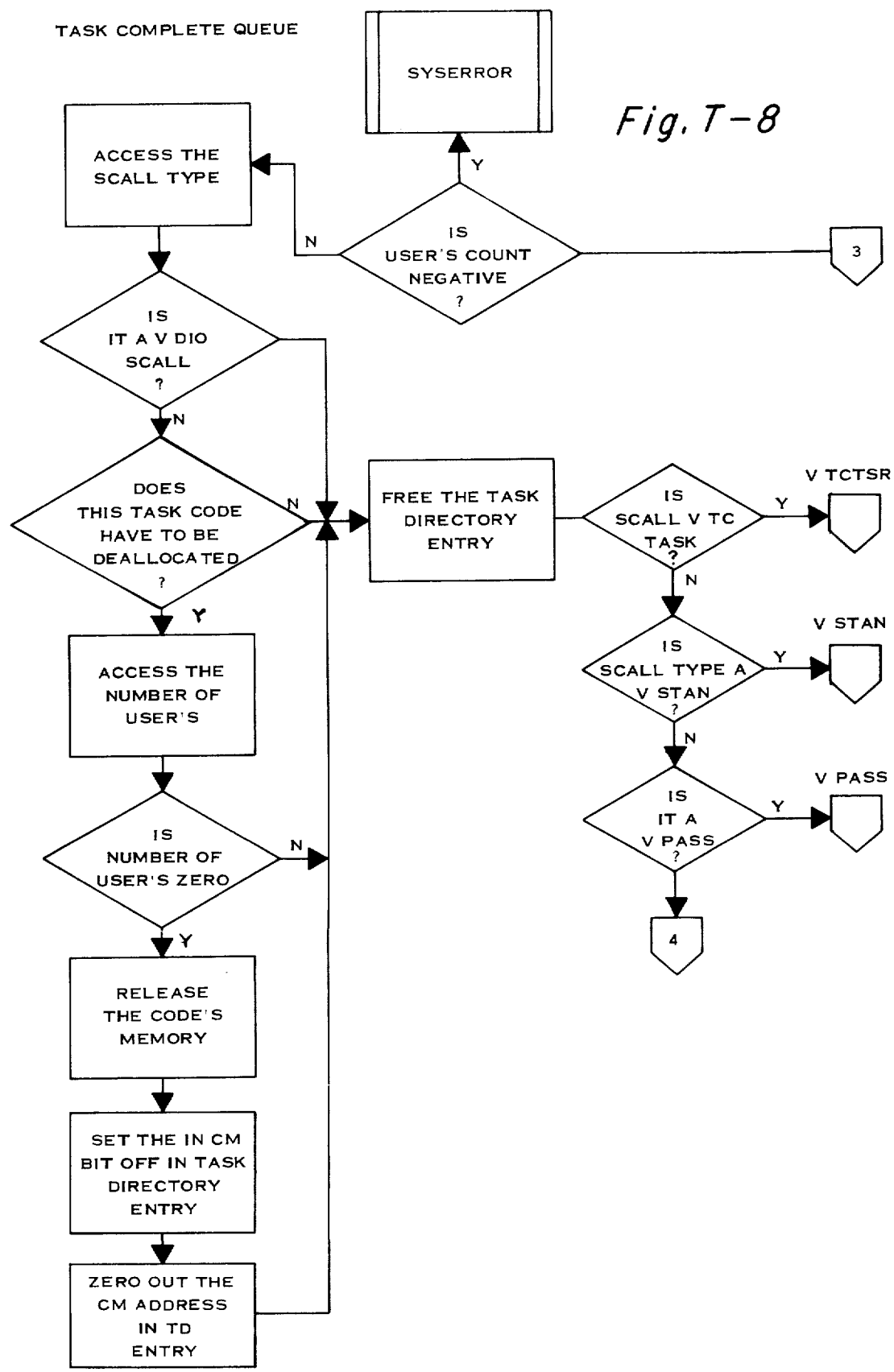
Fig. T-8

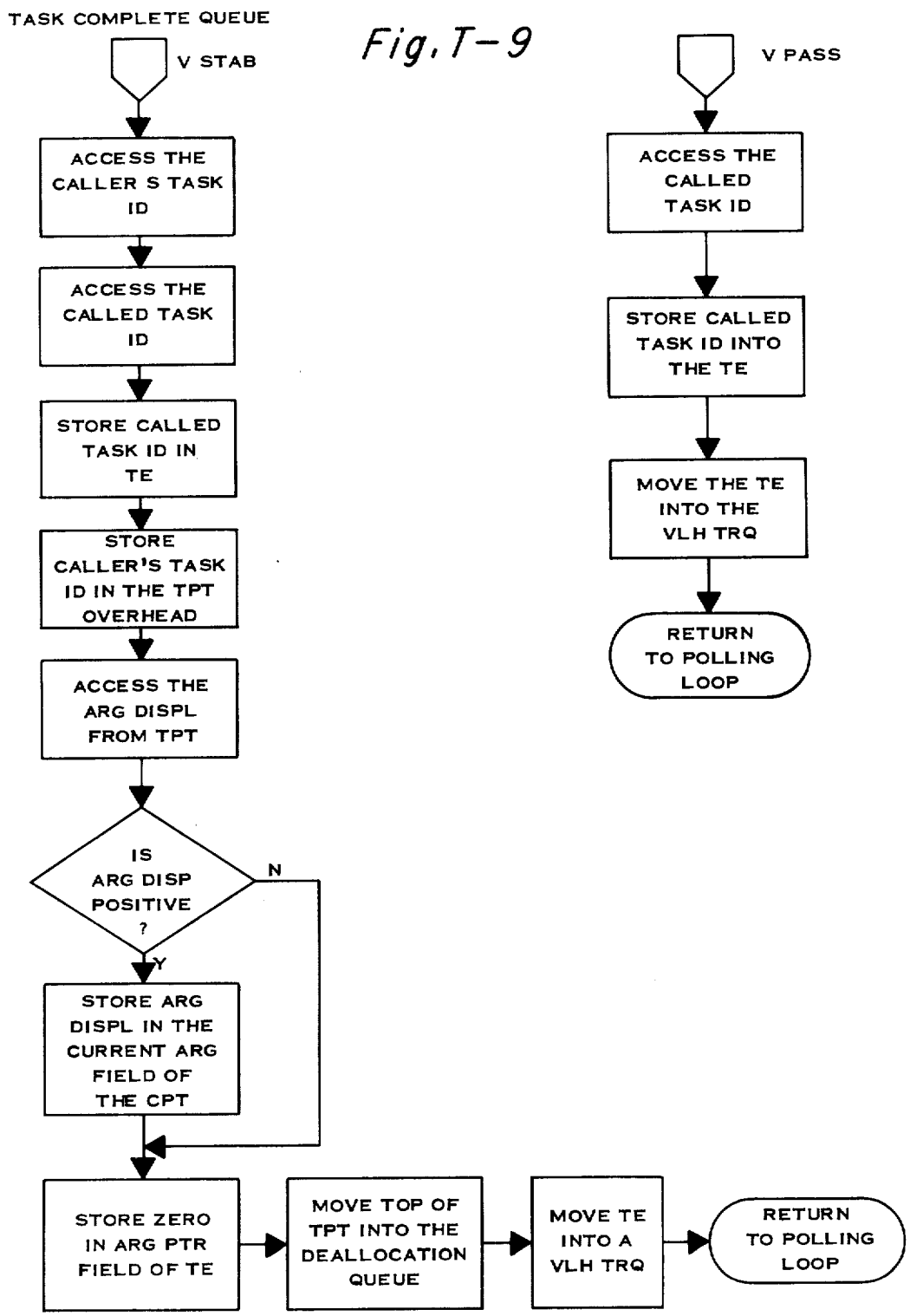
Fig. T-9

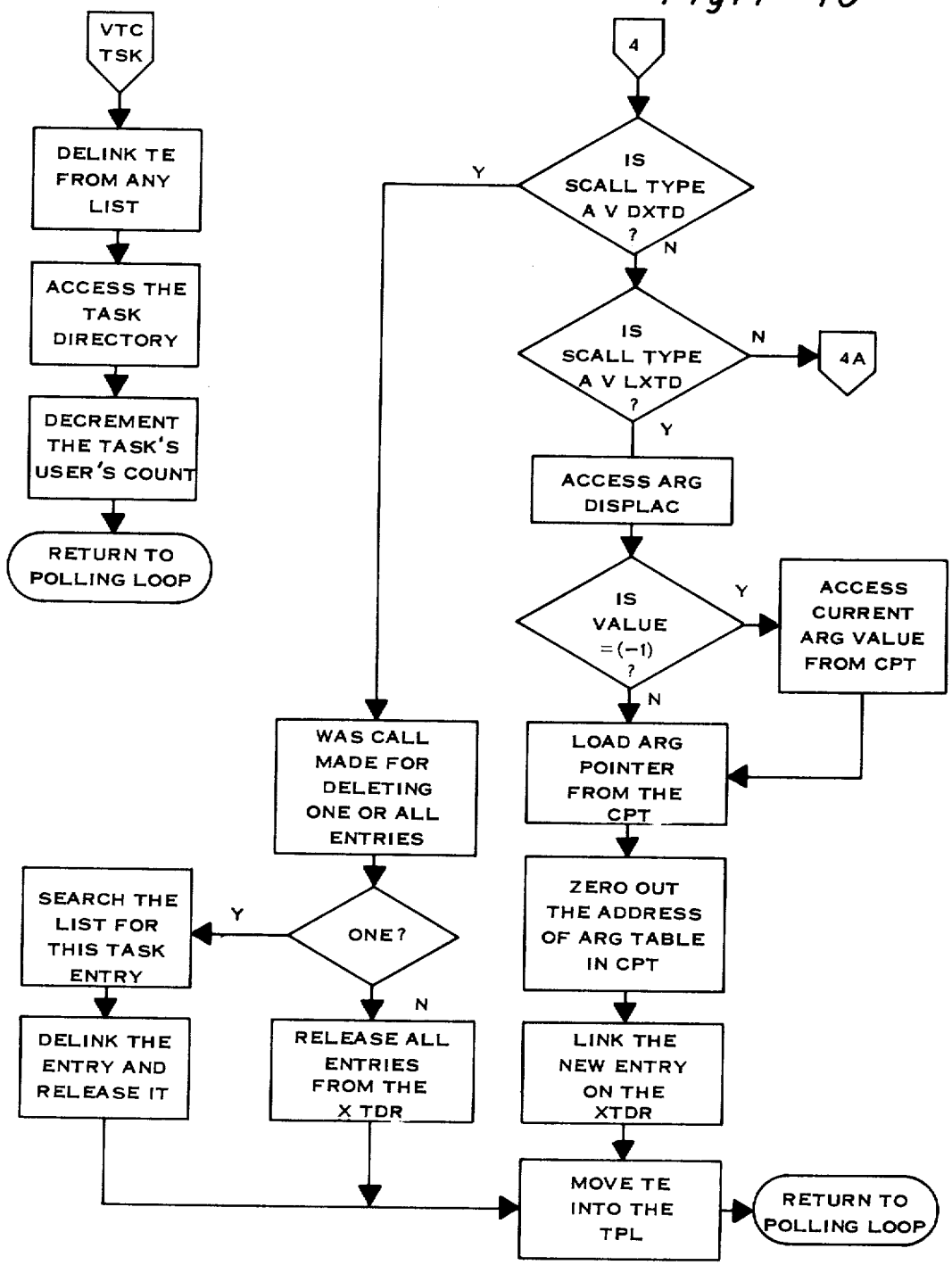
Fig. T-10

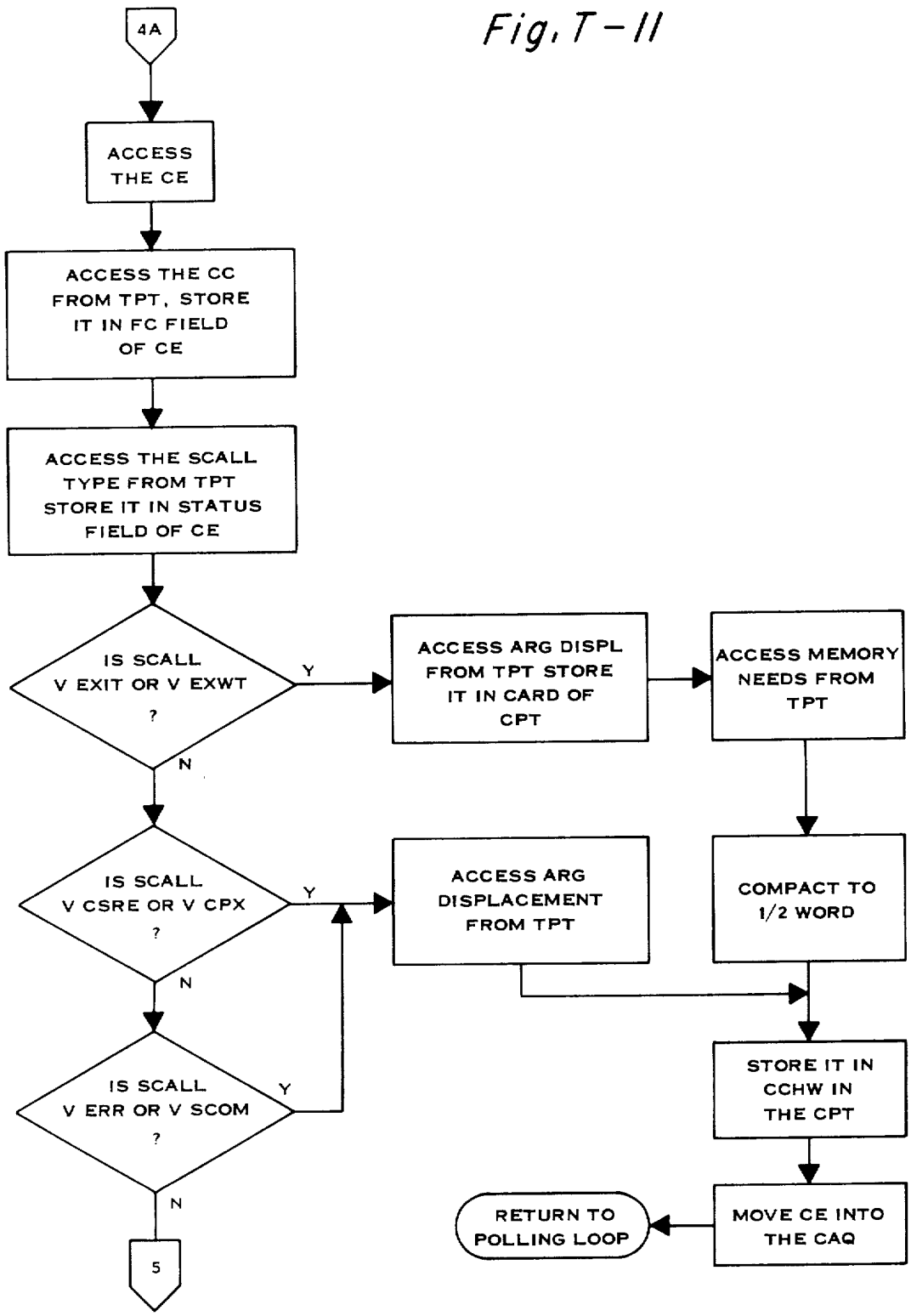
Fig. T-11

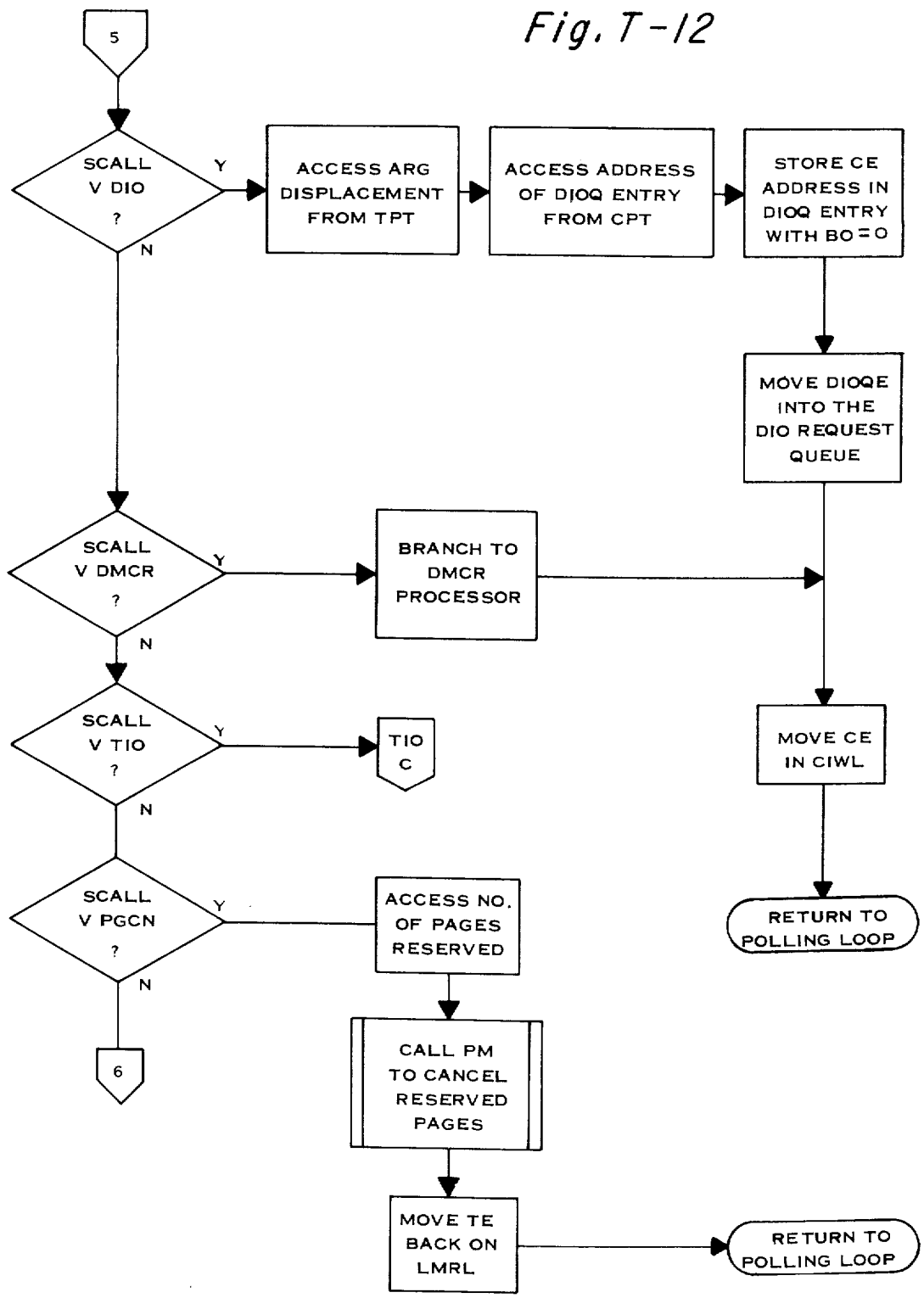
Fig. T-12

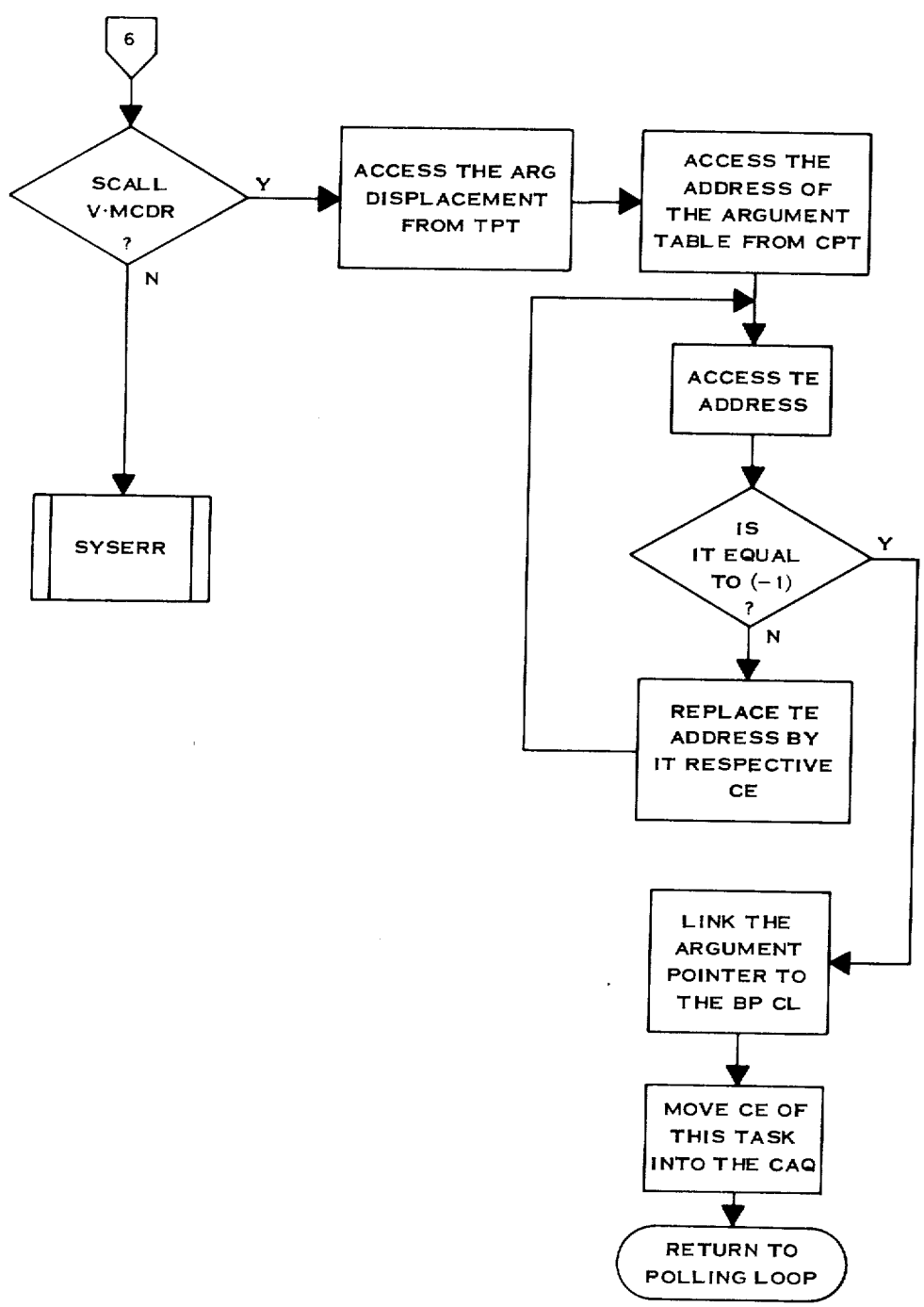
Fig. T-13

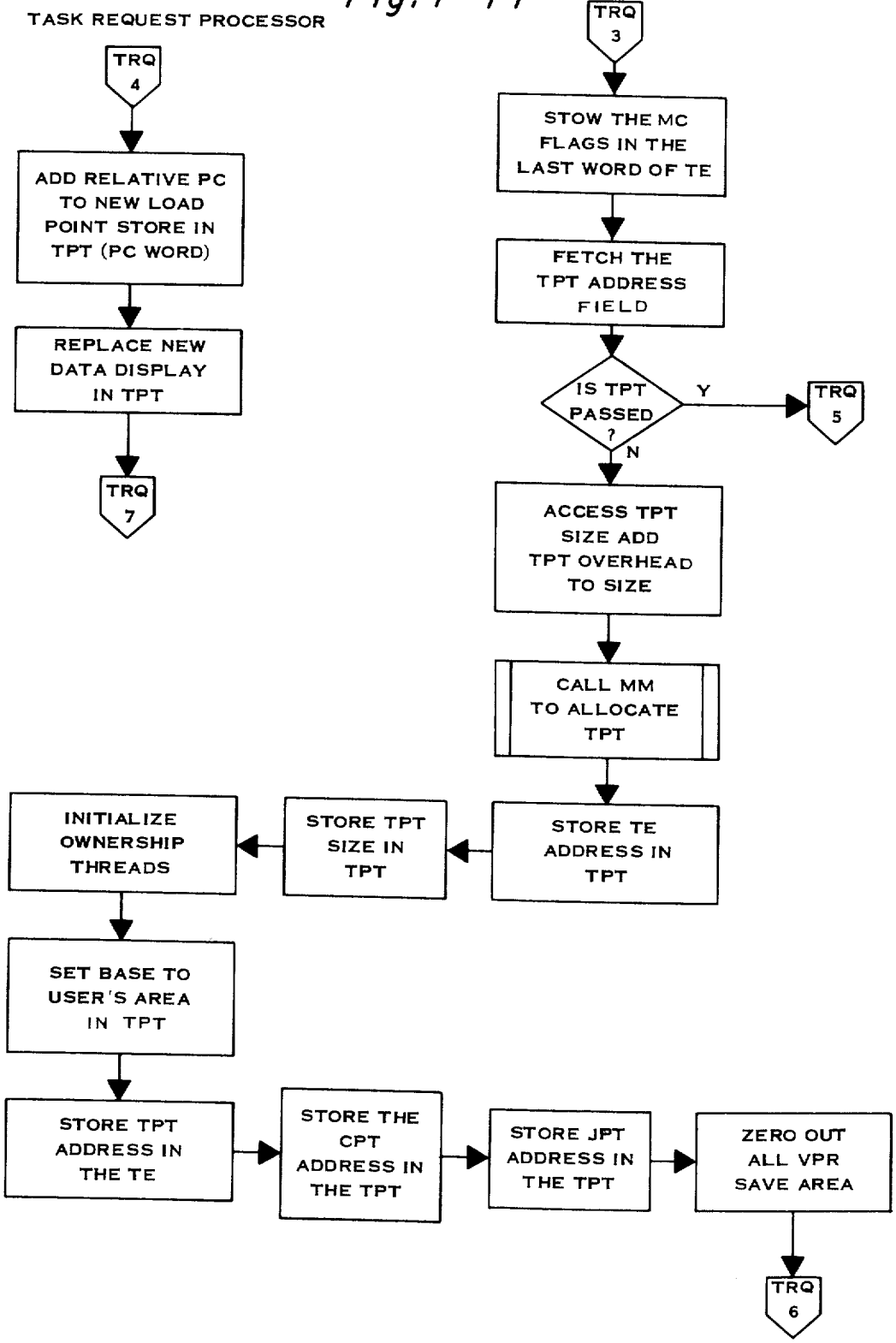
Fig. T-14

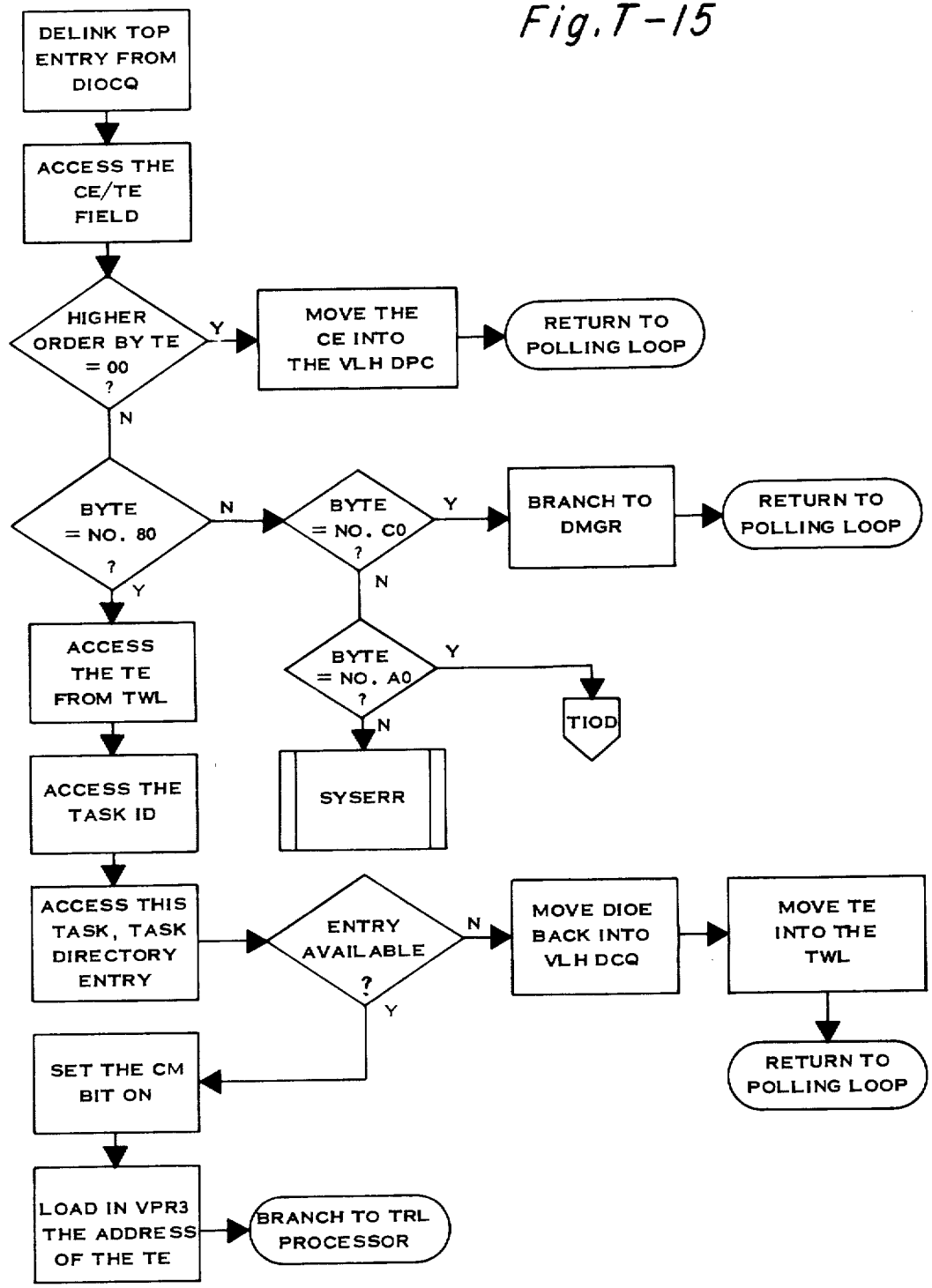
Fig. T-15

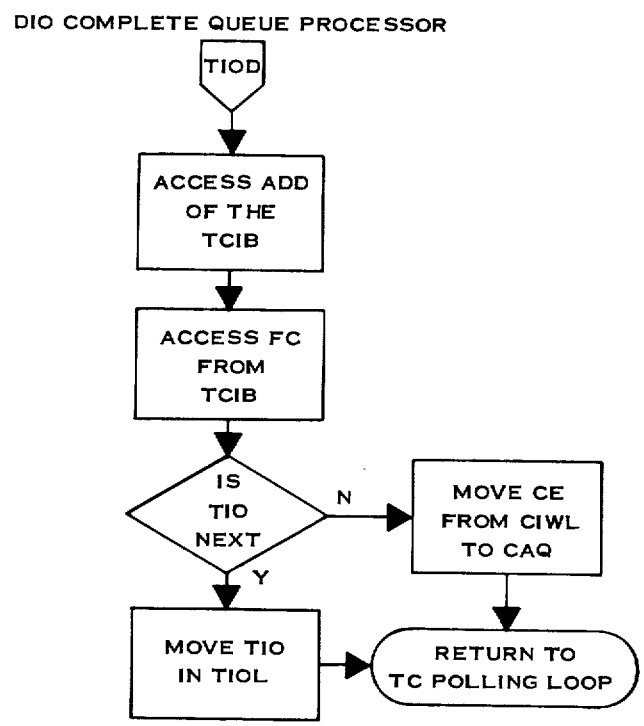
Fig. T-16

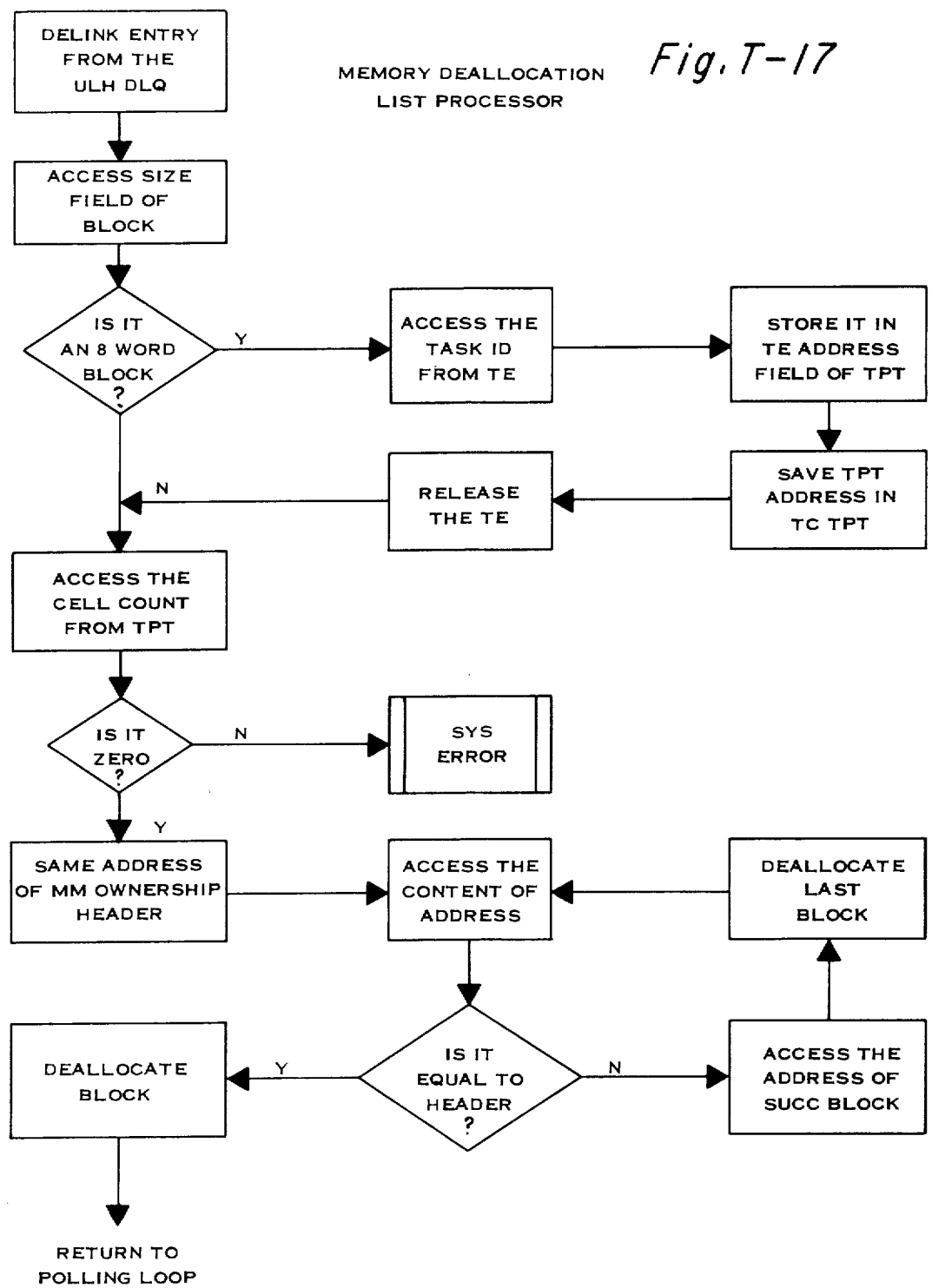

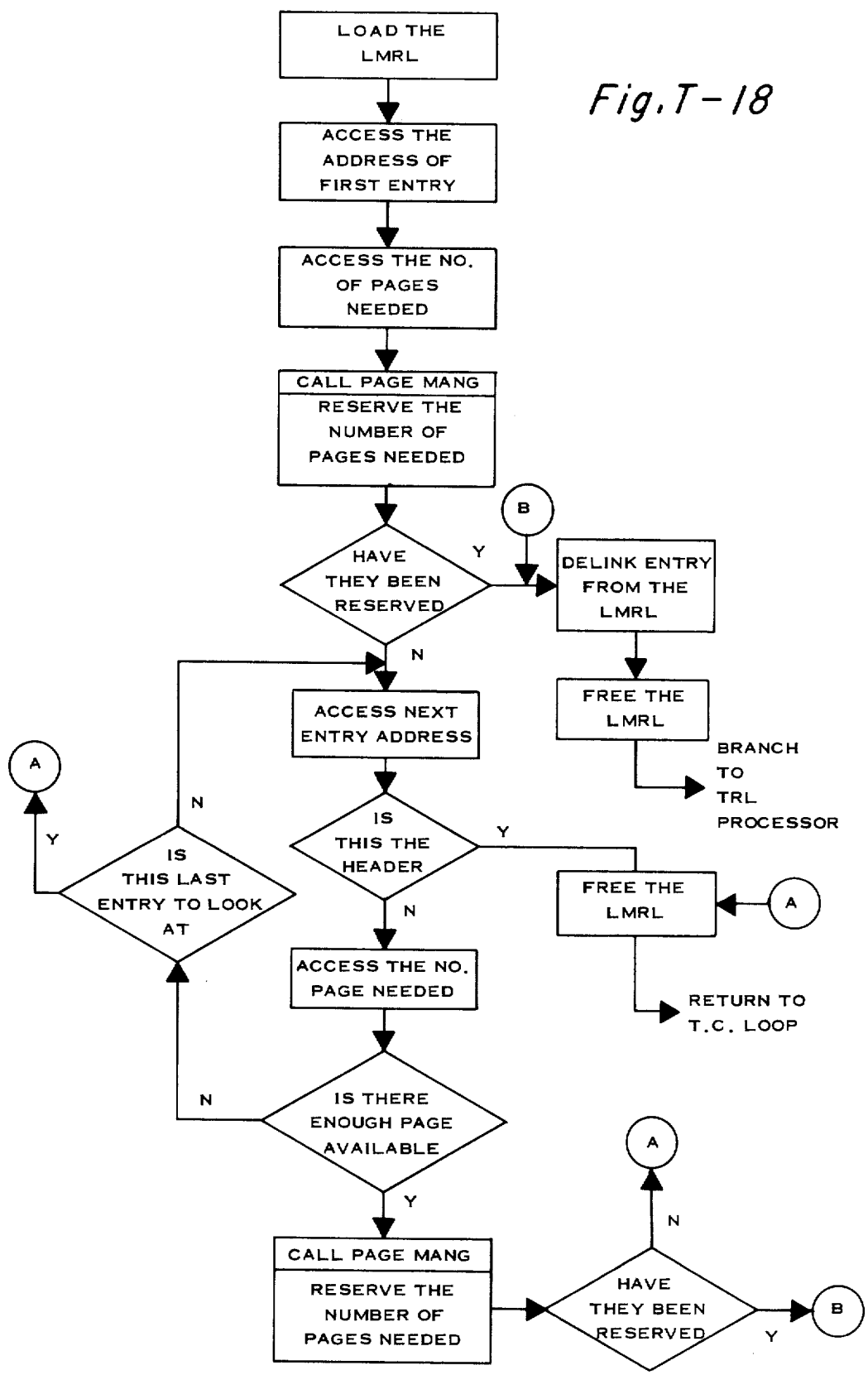
Fig. T-18

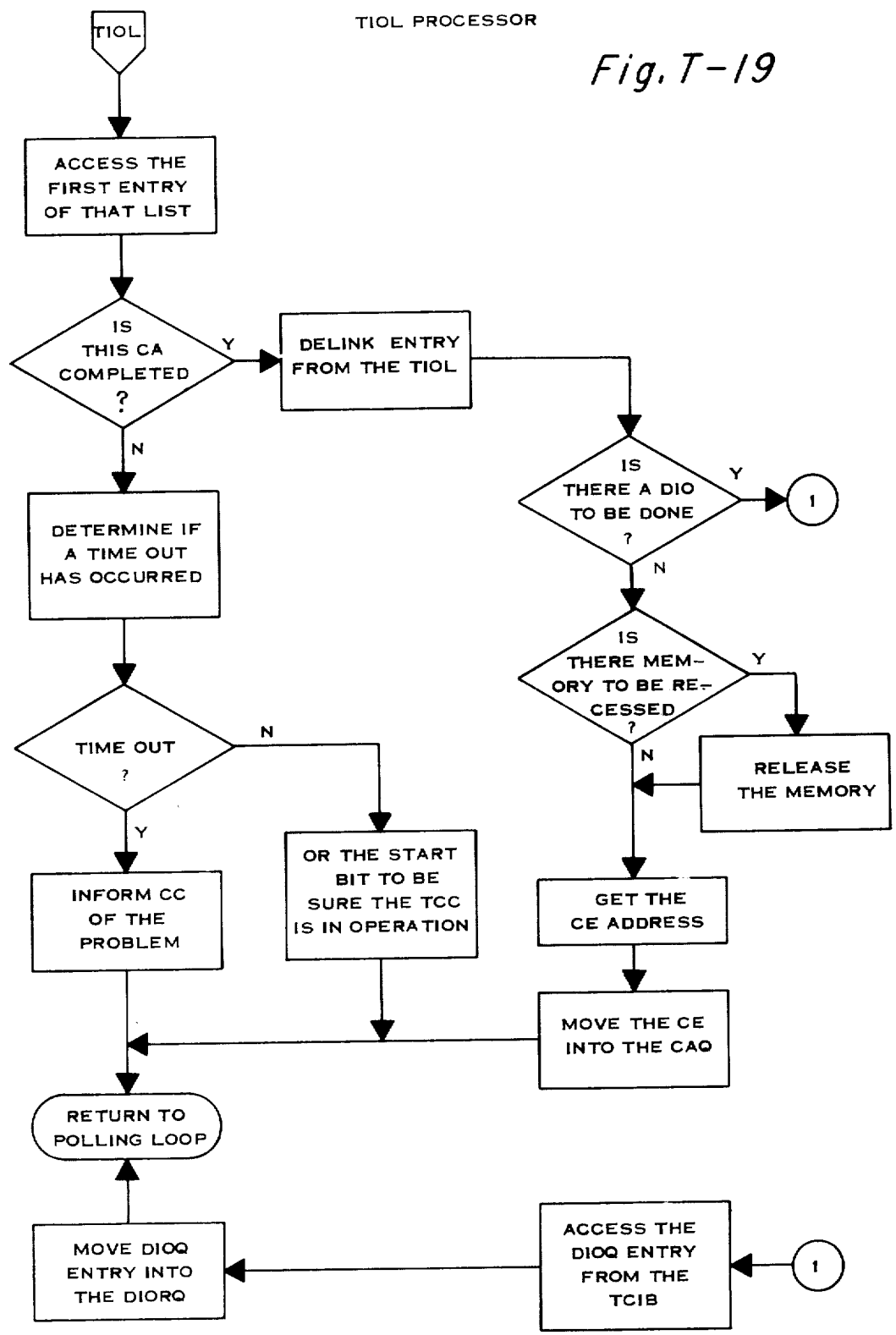
Fig. T-19

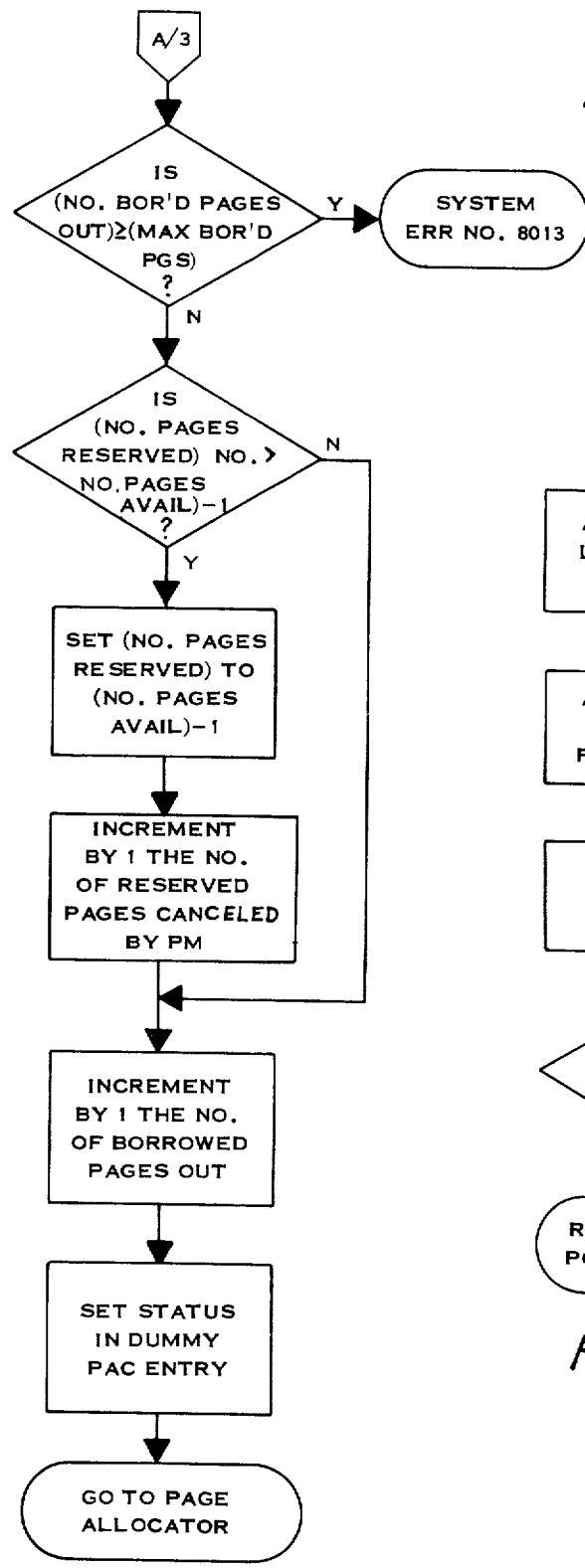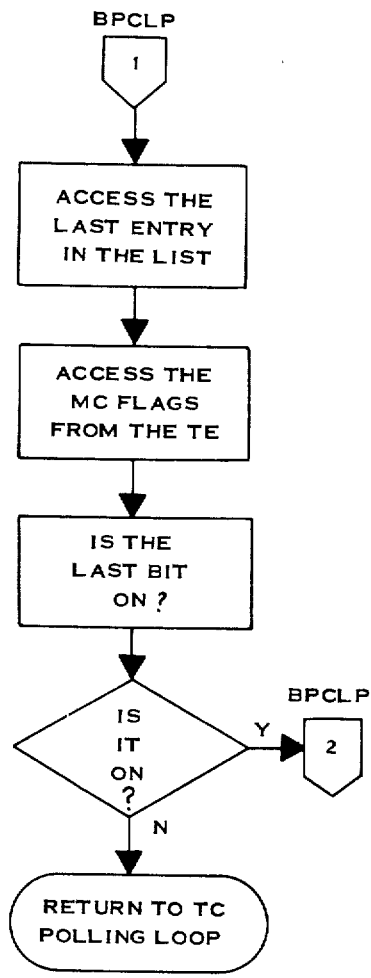
Fig. T-20
Fig. T-21A

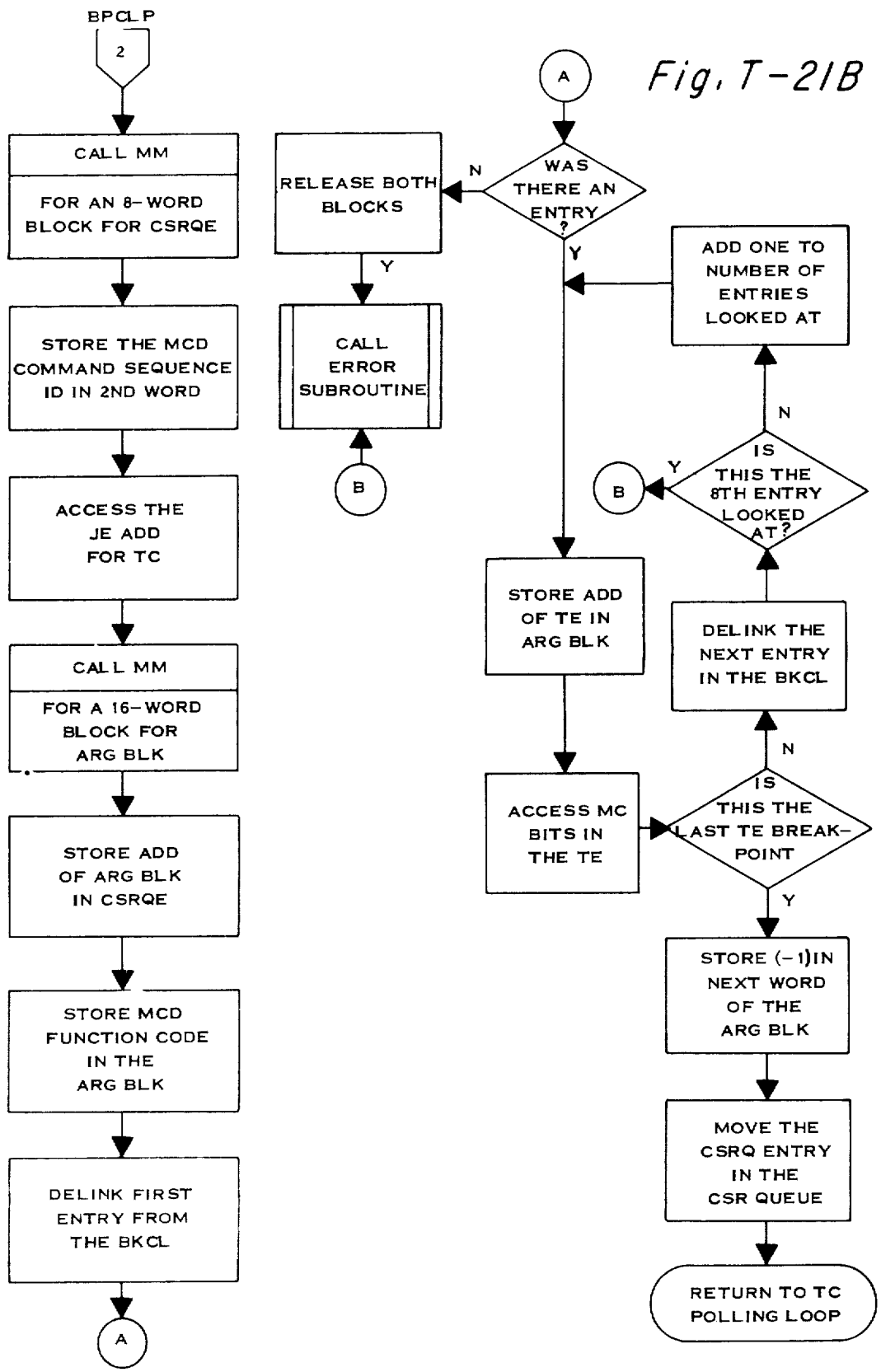
Fig. T-21B

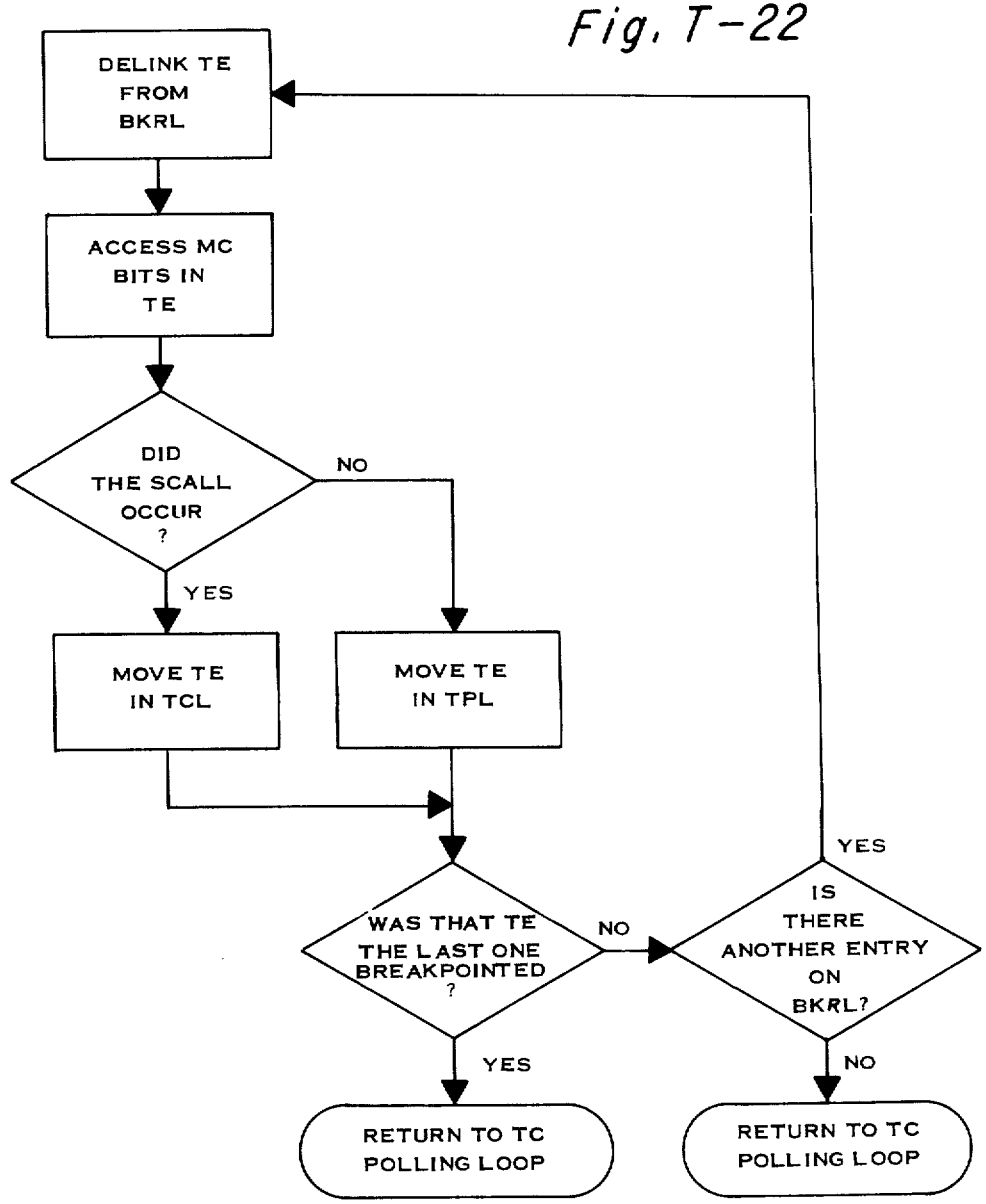
Fig. T-22

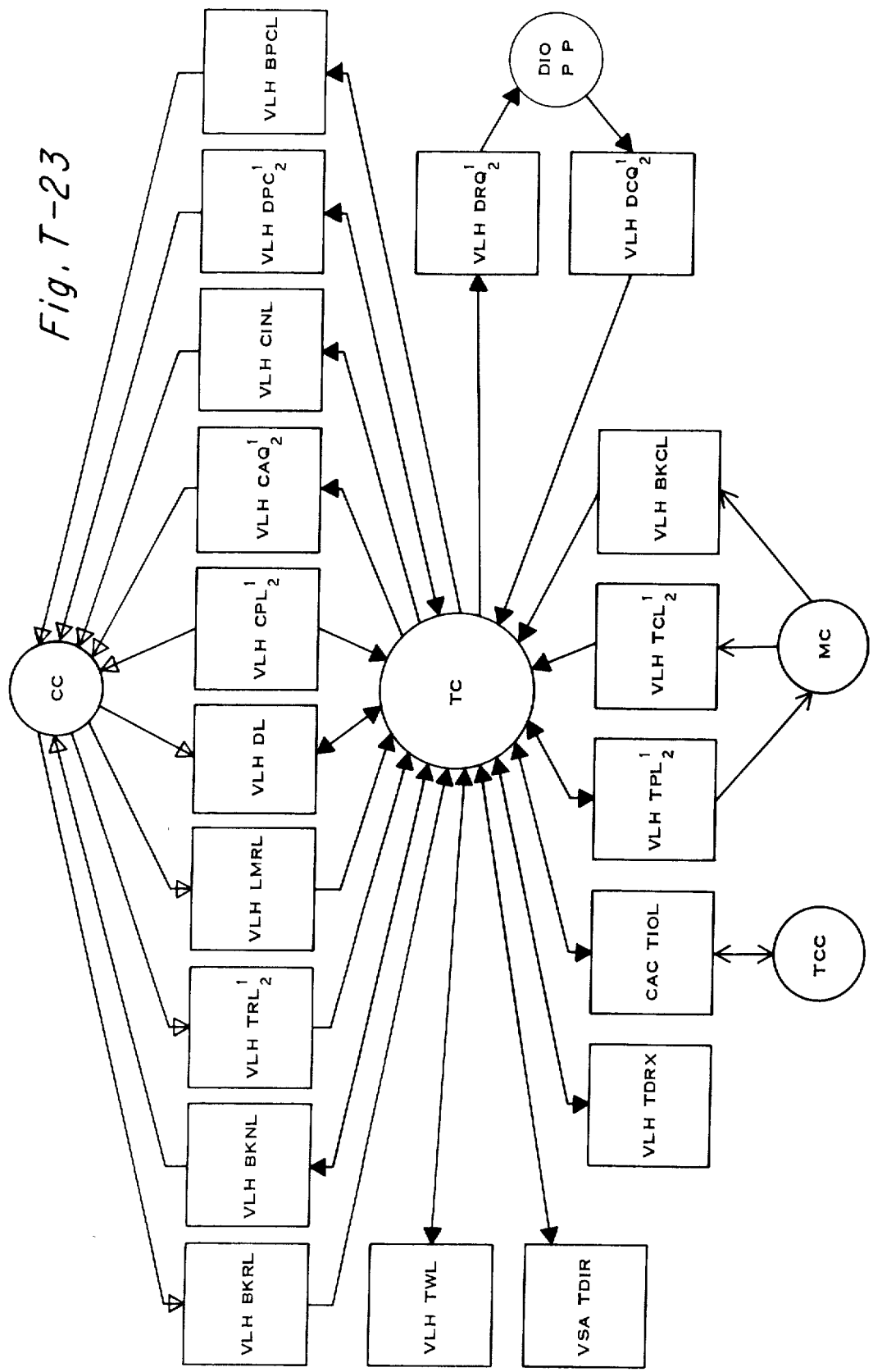
Fig. T-23

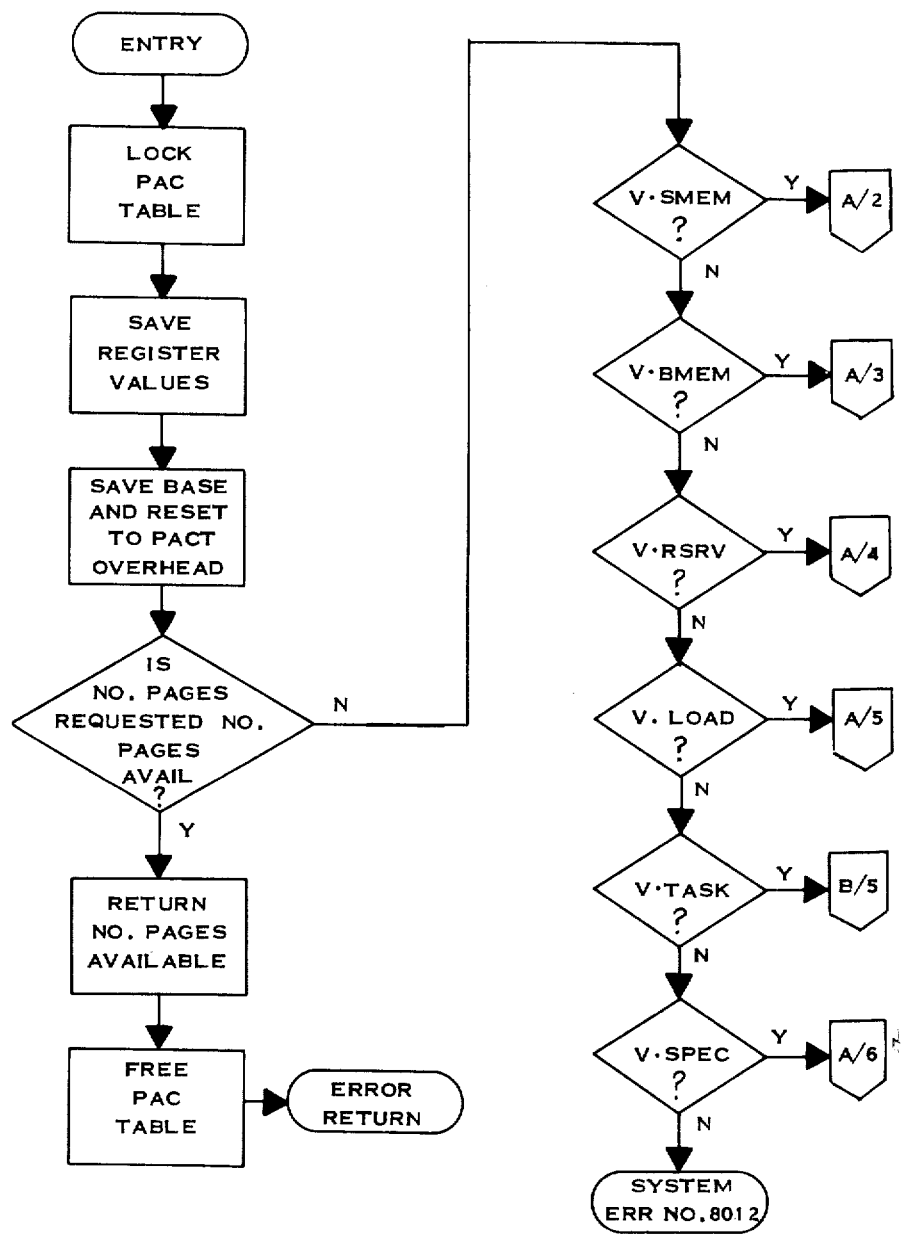
Fig. T-24

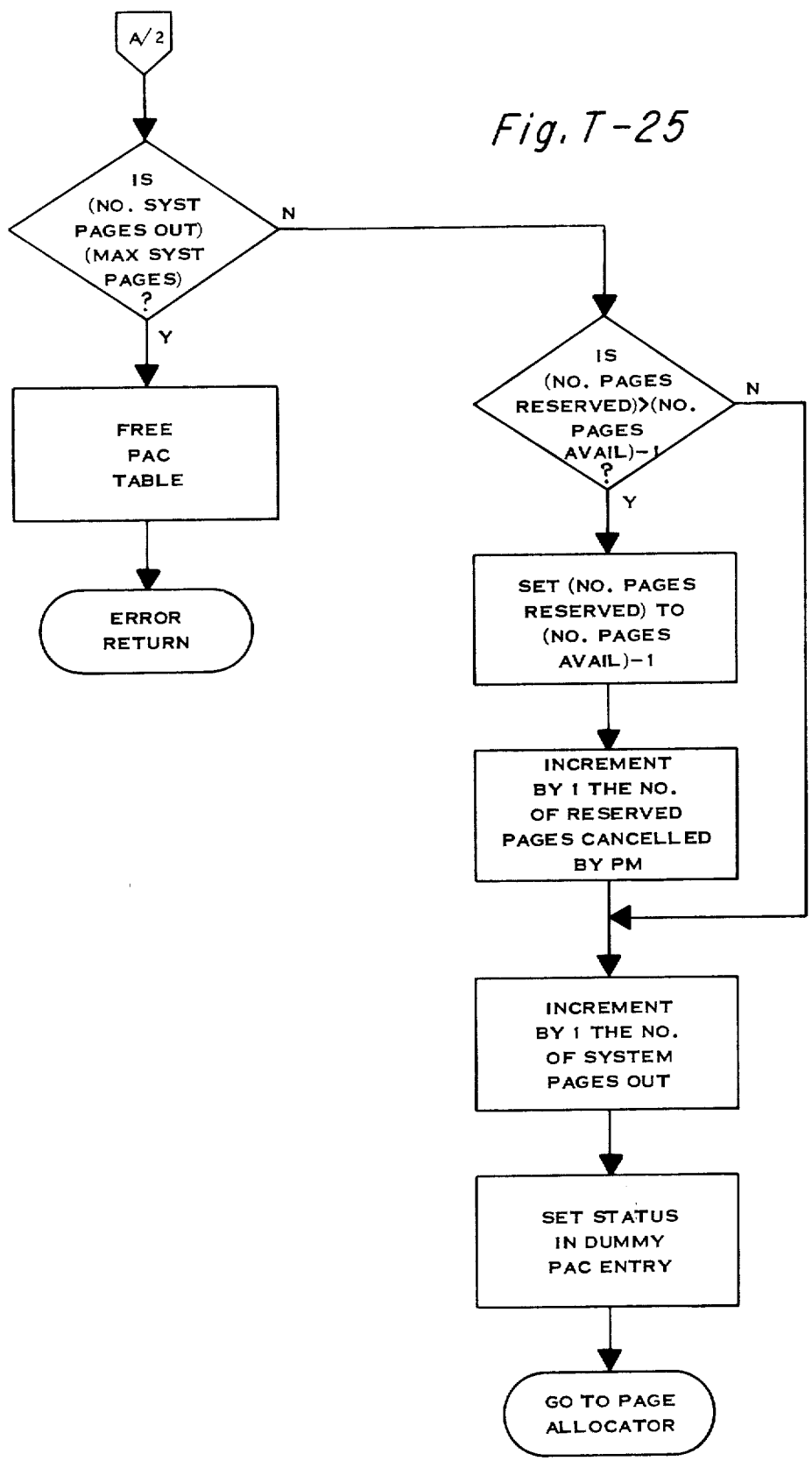
Fig. T-25

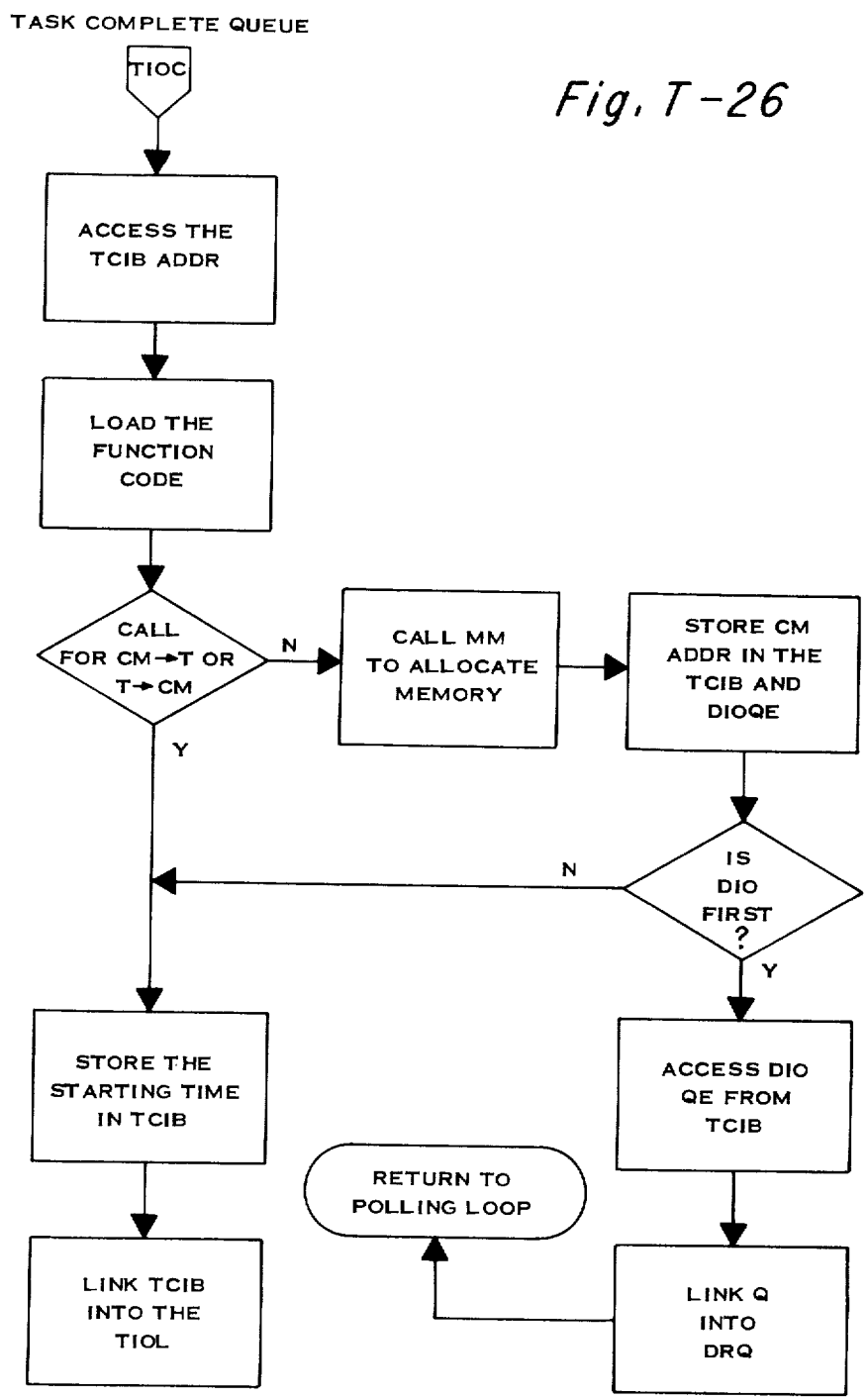
Fig. T-26

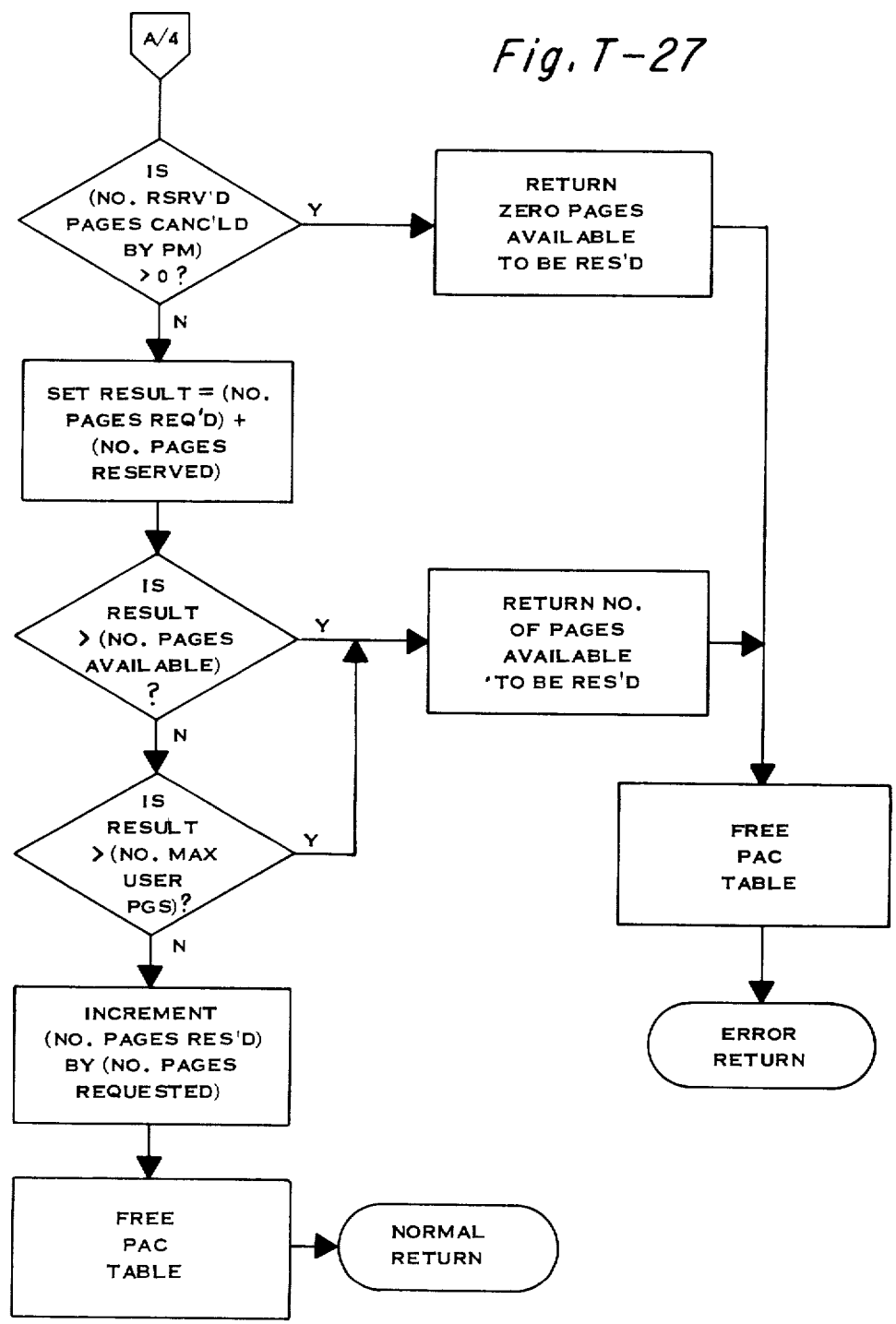
Fig. T-27

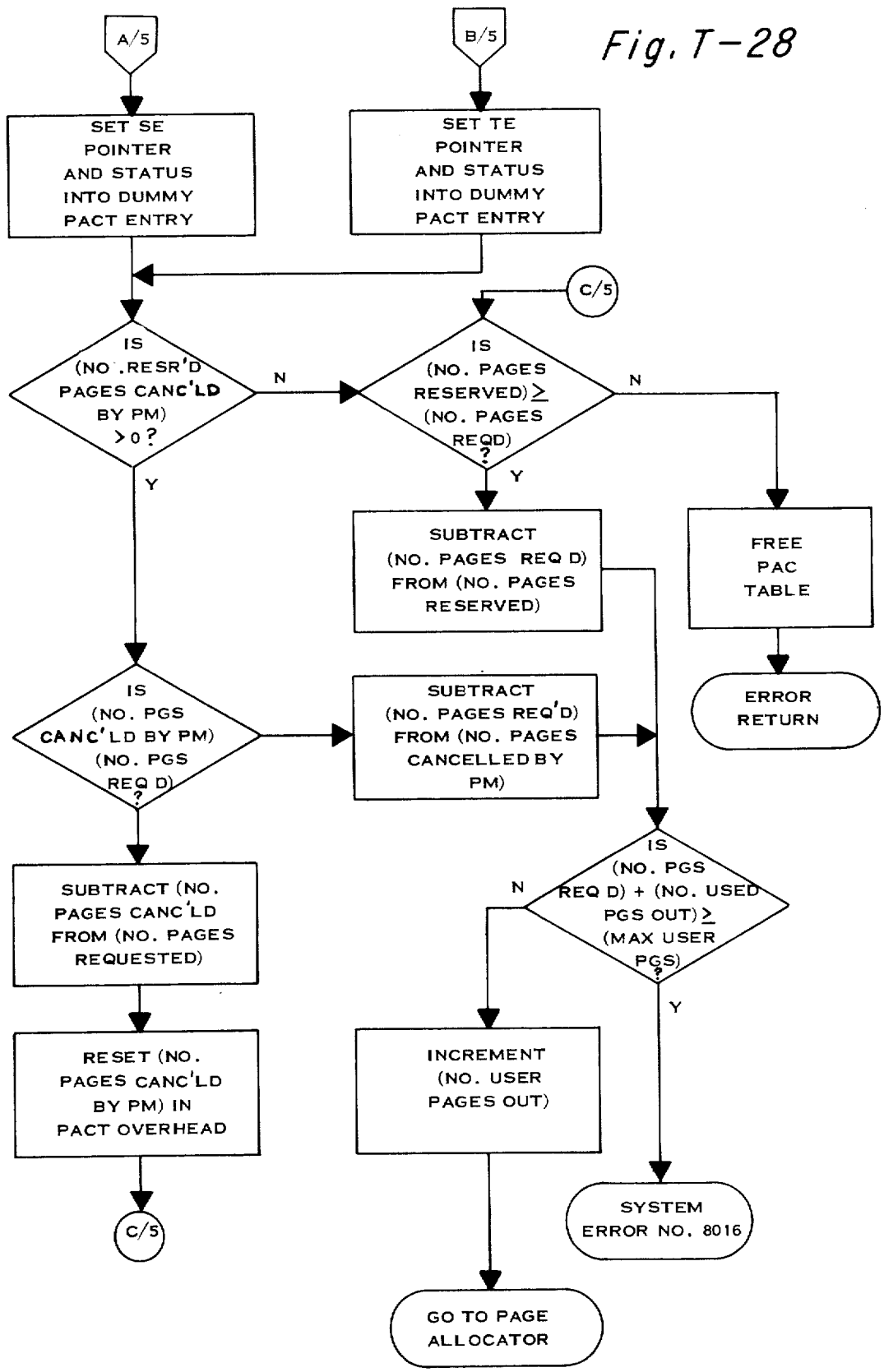
Fig. T-28

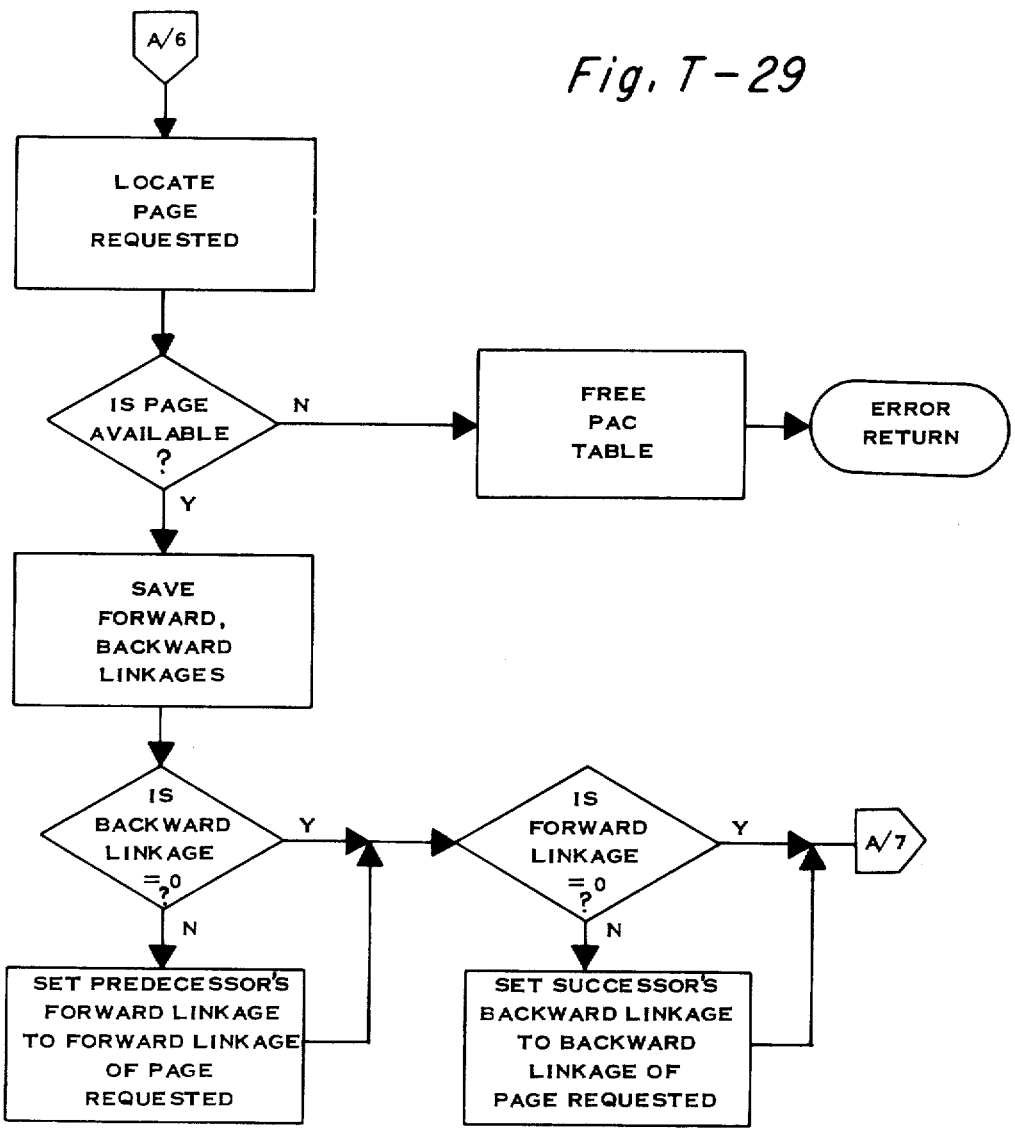
Fig. T-29

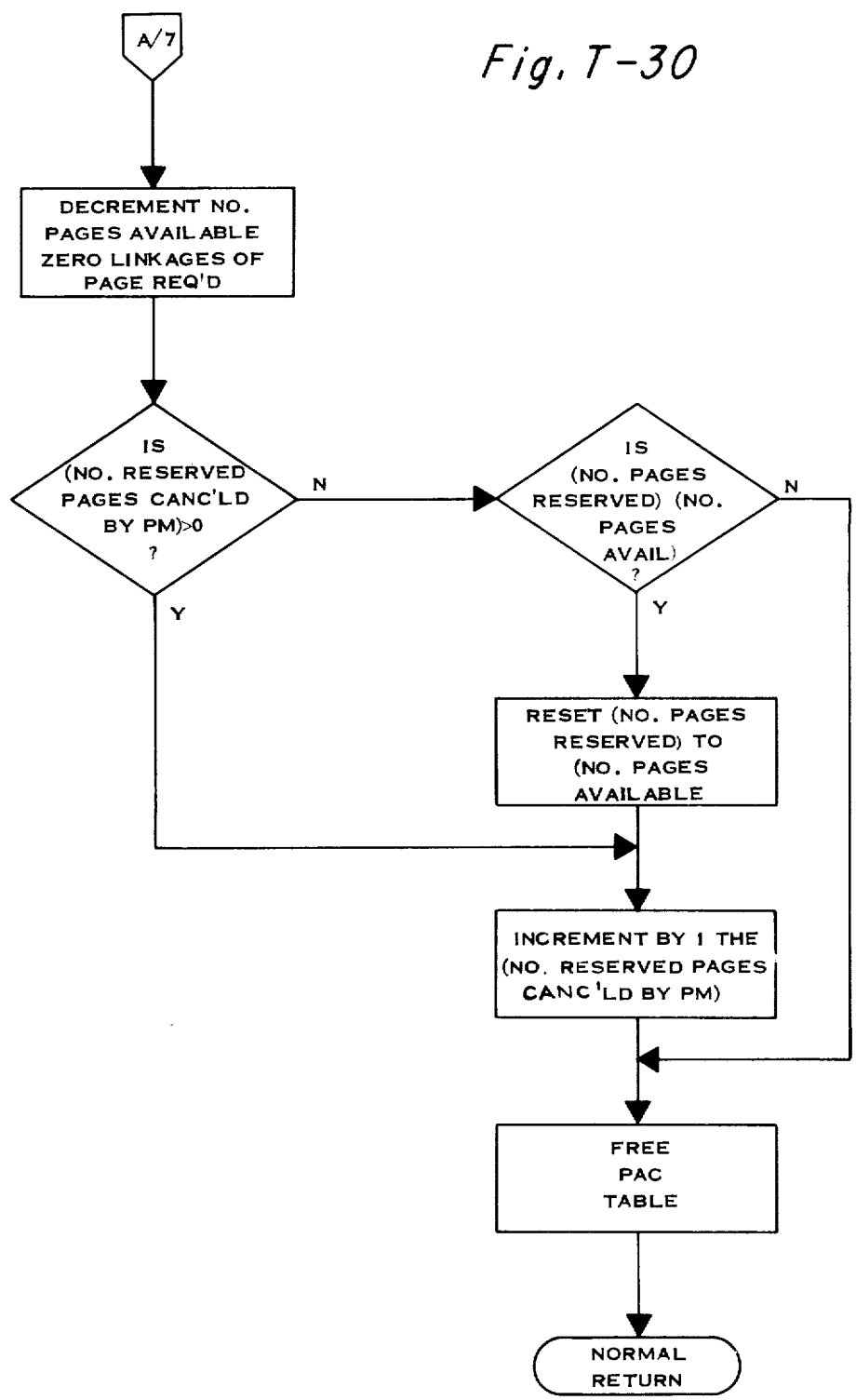
Fig. T-30

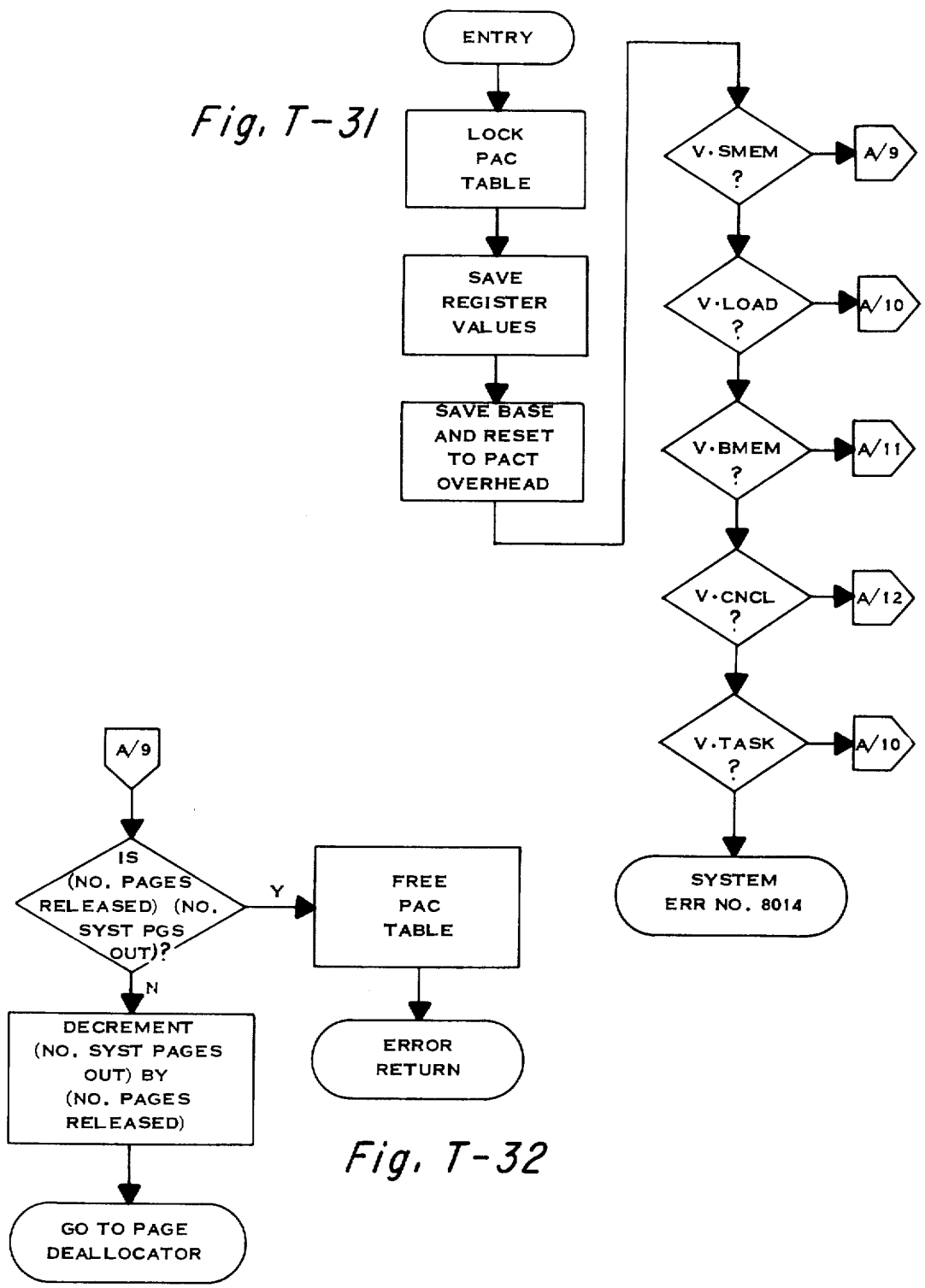
Fig. T-31
Fig. T-32

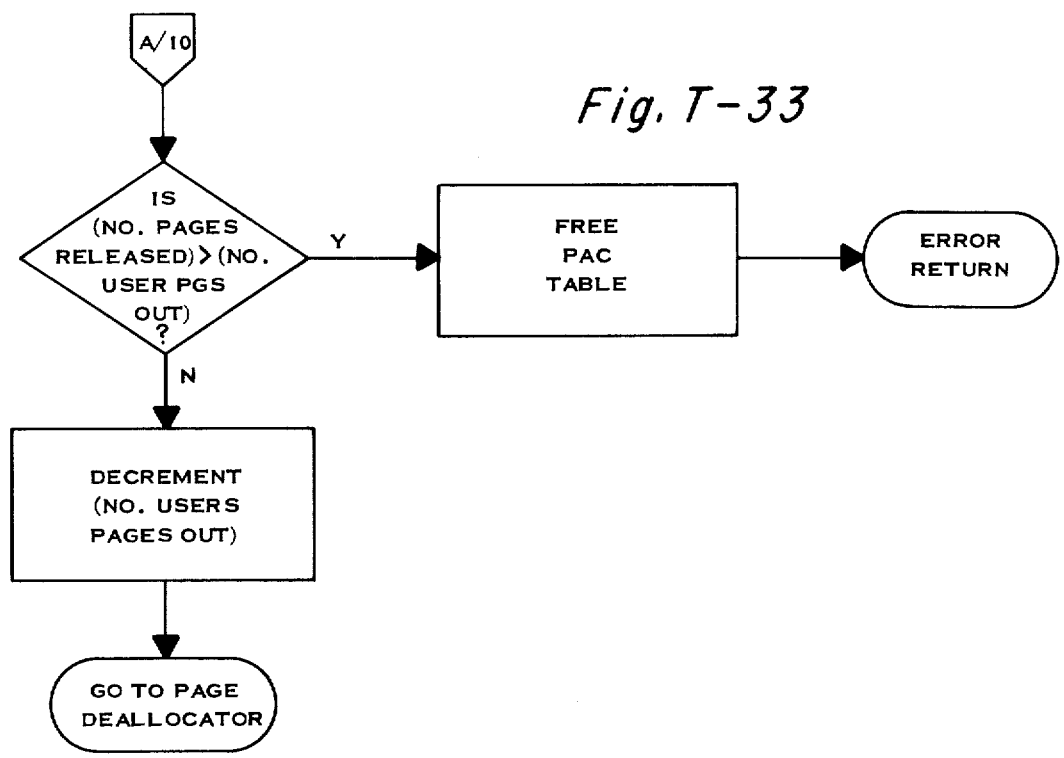
Fig. T-33
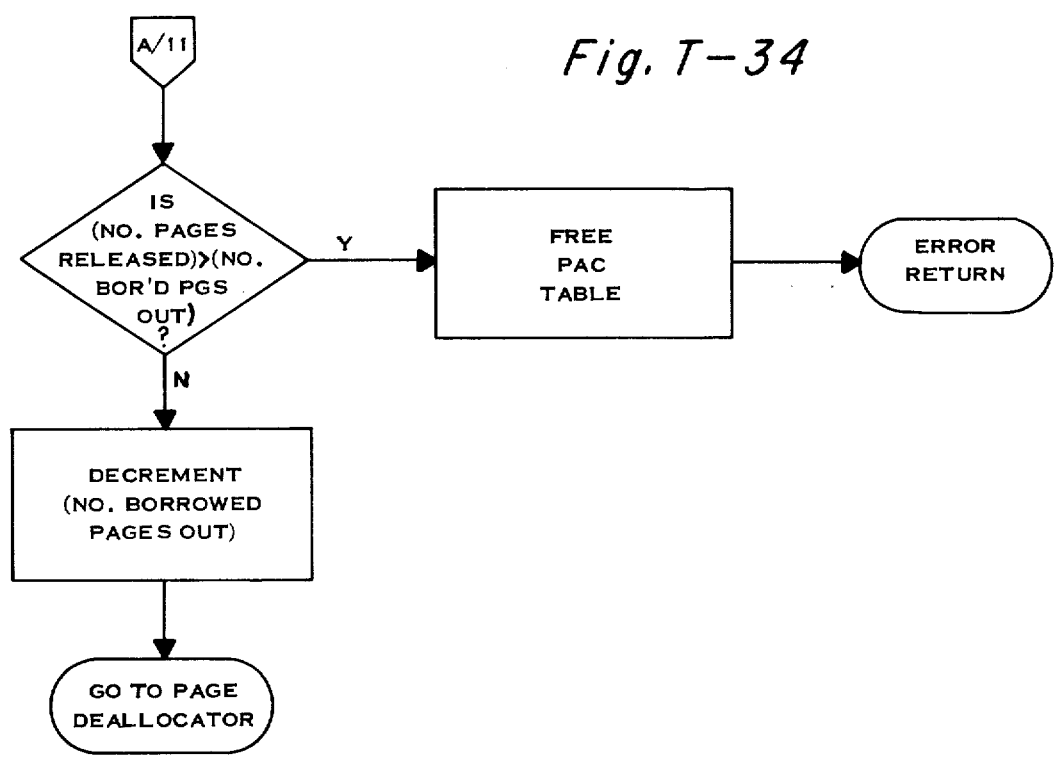
Fig. T-34

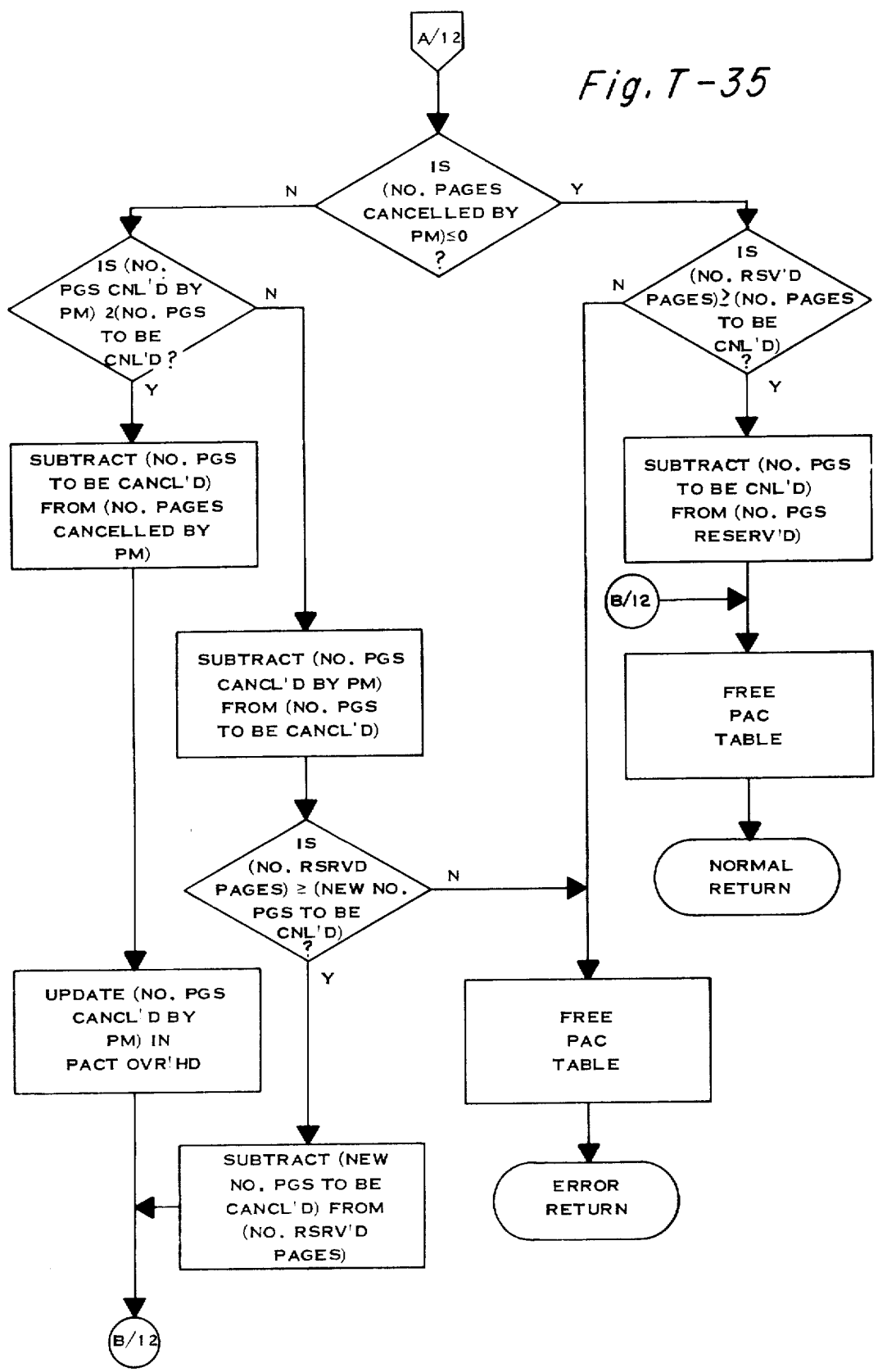
Fig. T-35

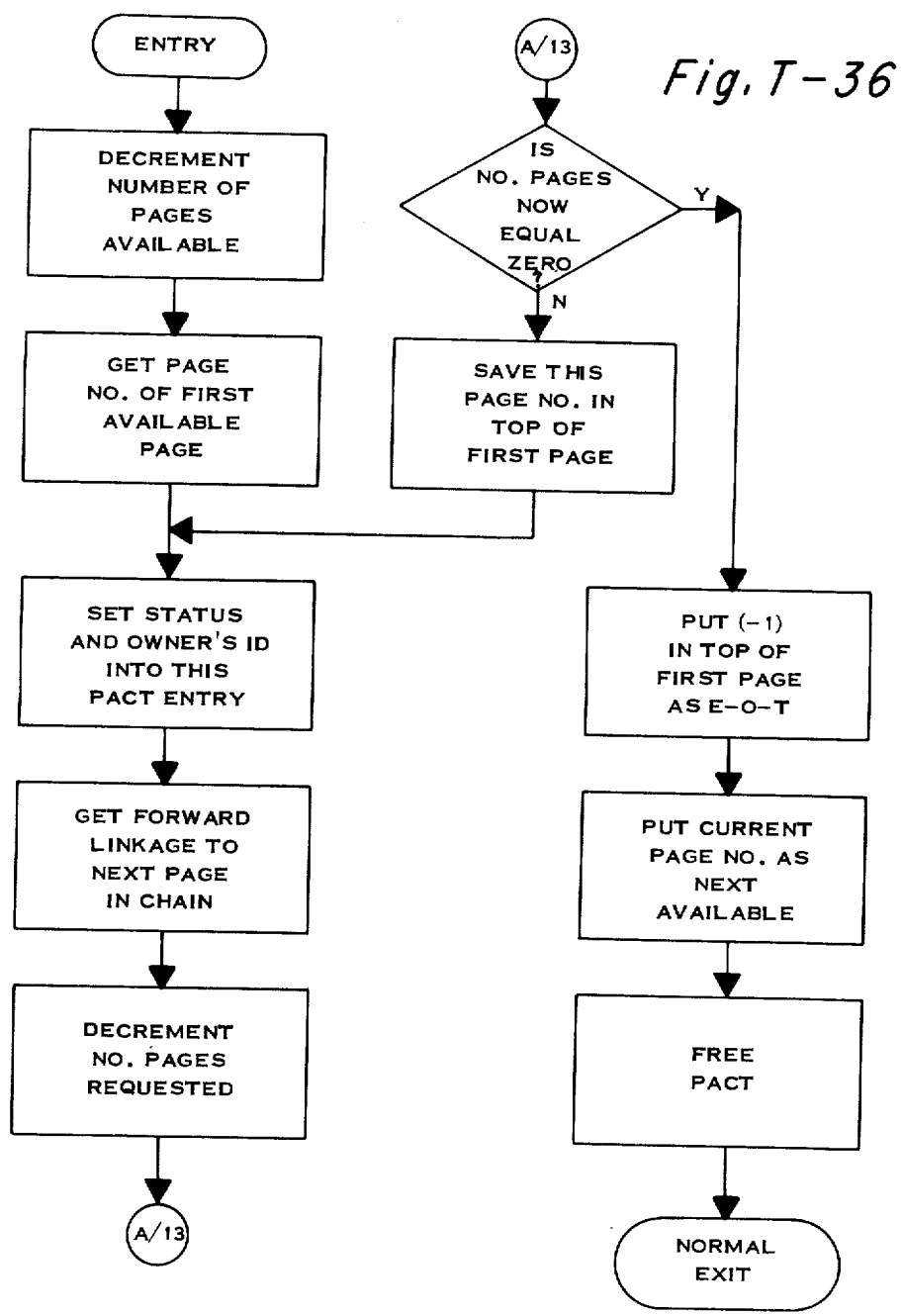
Fig. T-36

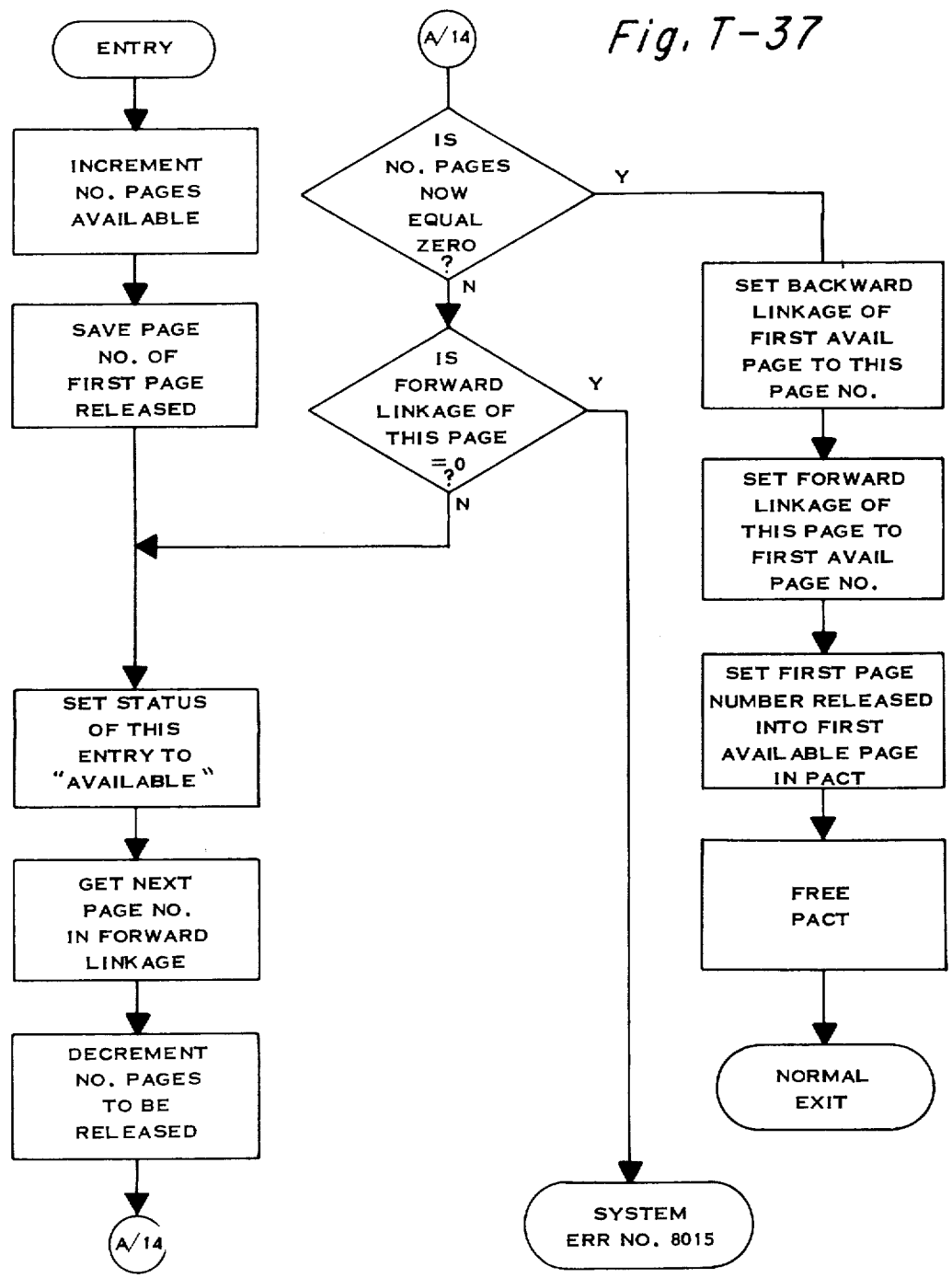
Fig. T-37

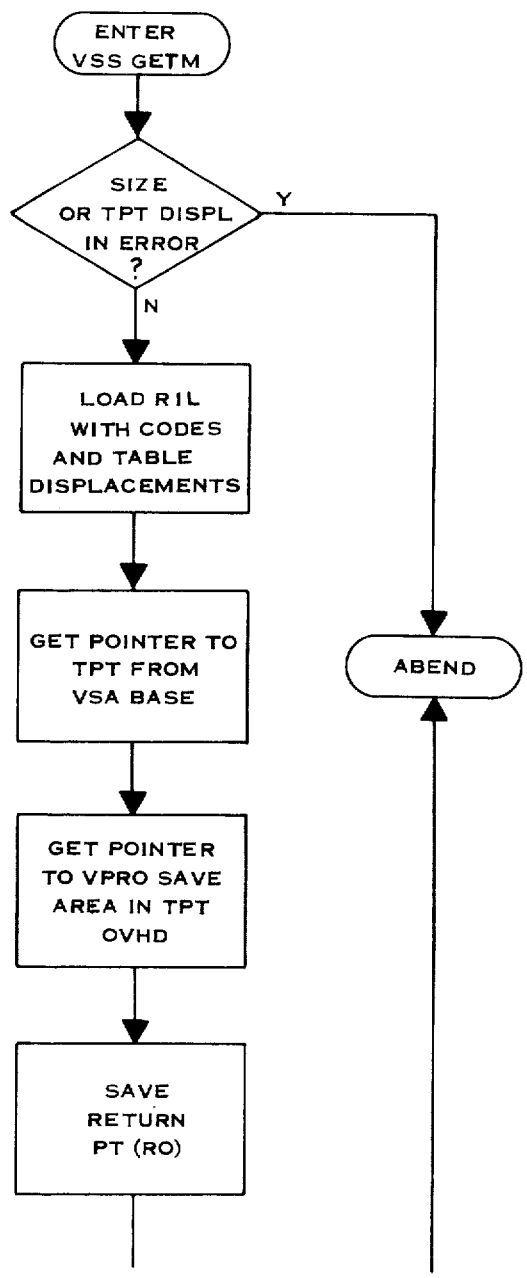
Fig. T-38A

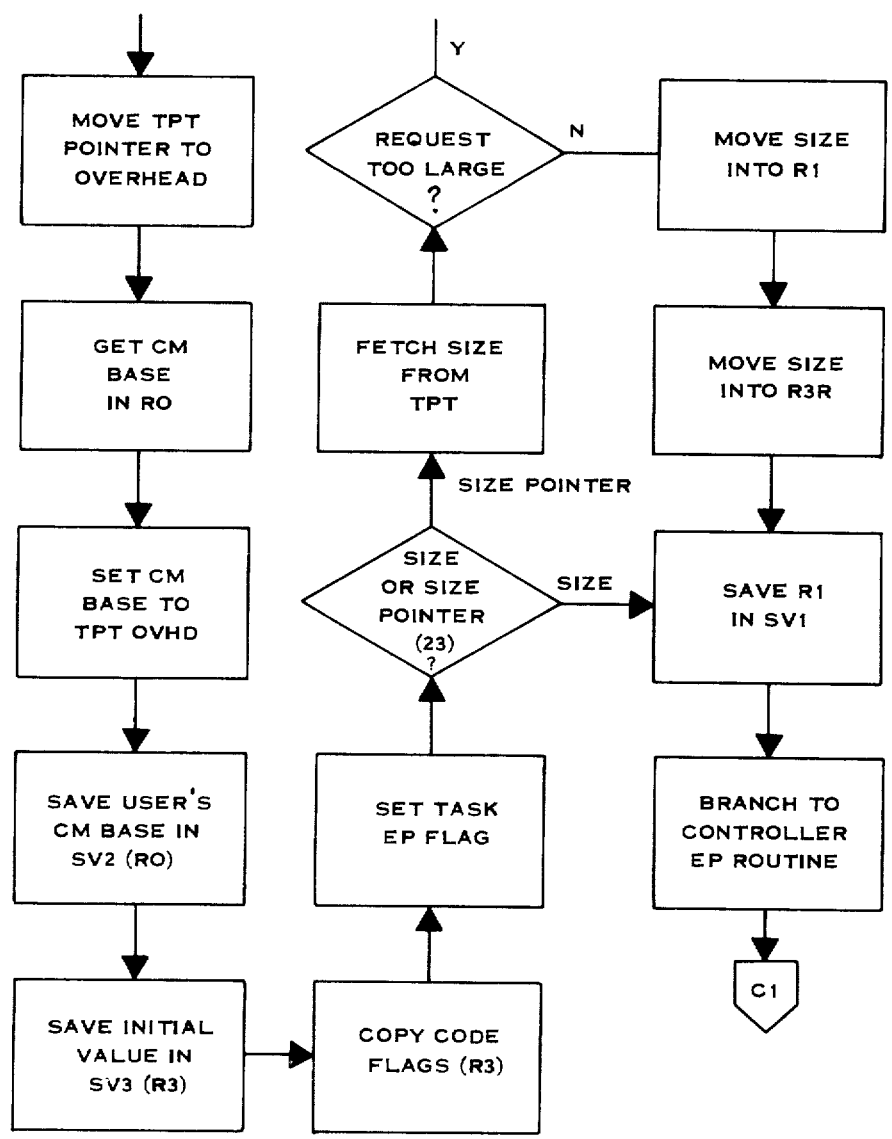
Fig. T-38B

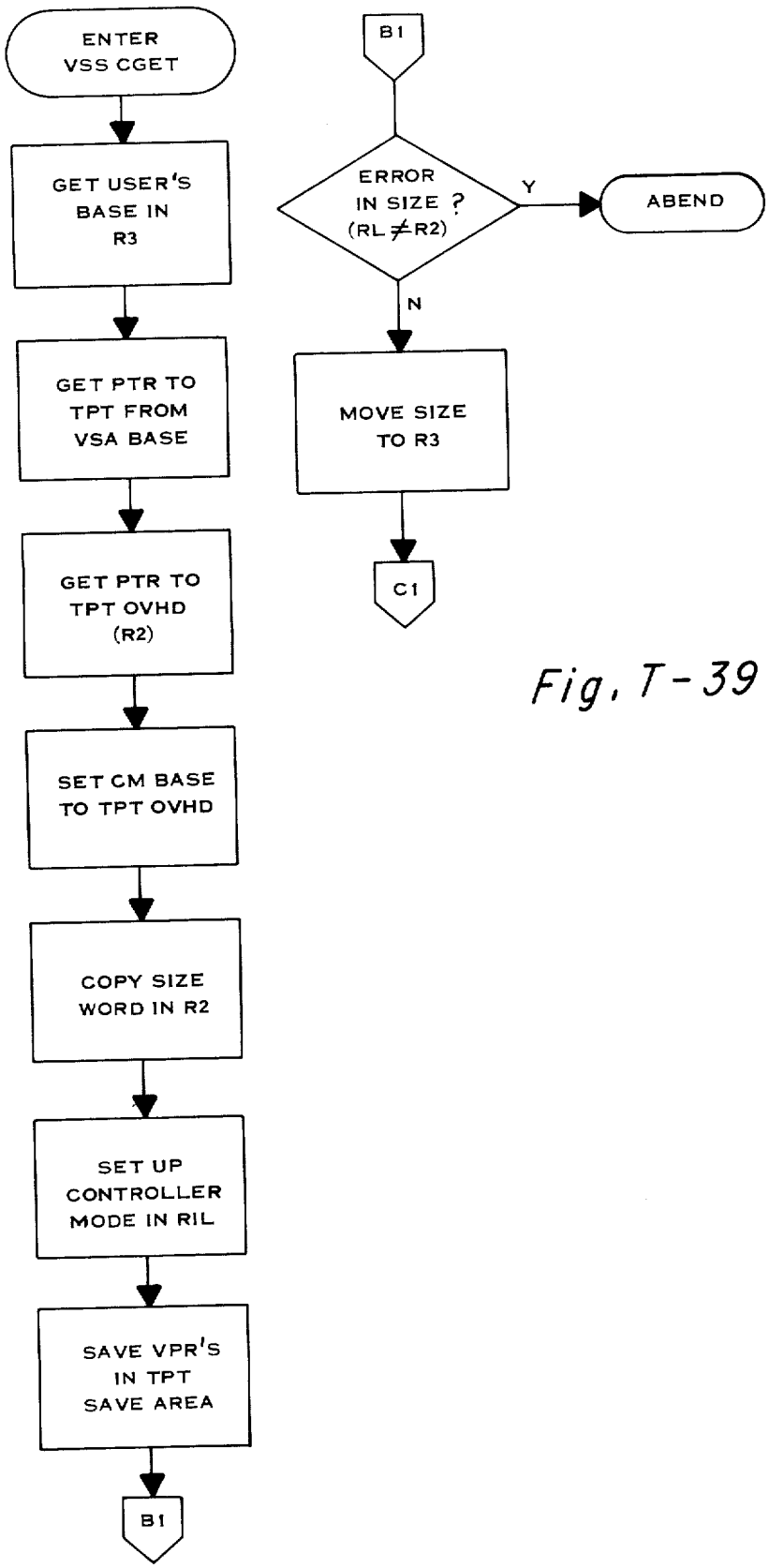
Fig. T-39

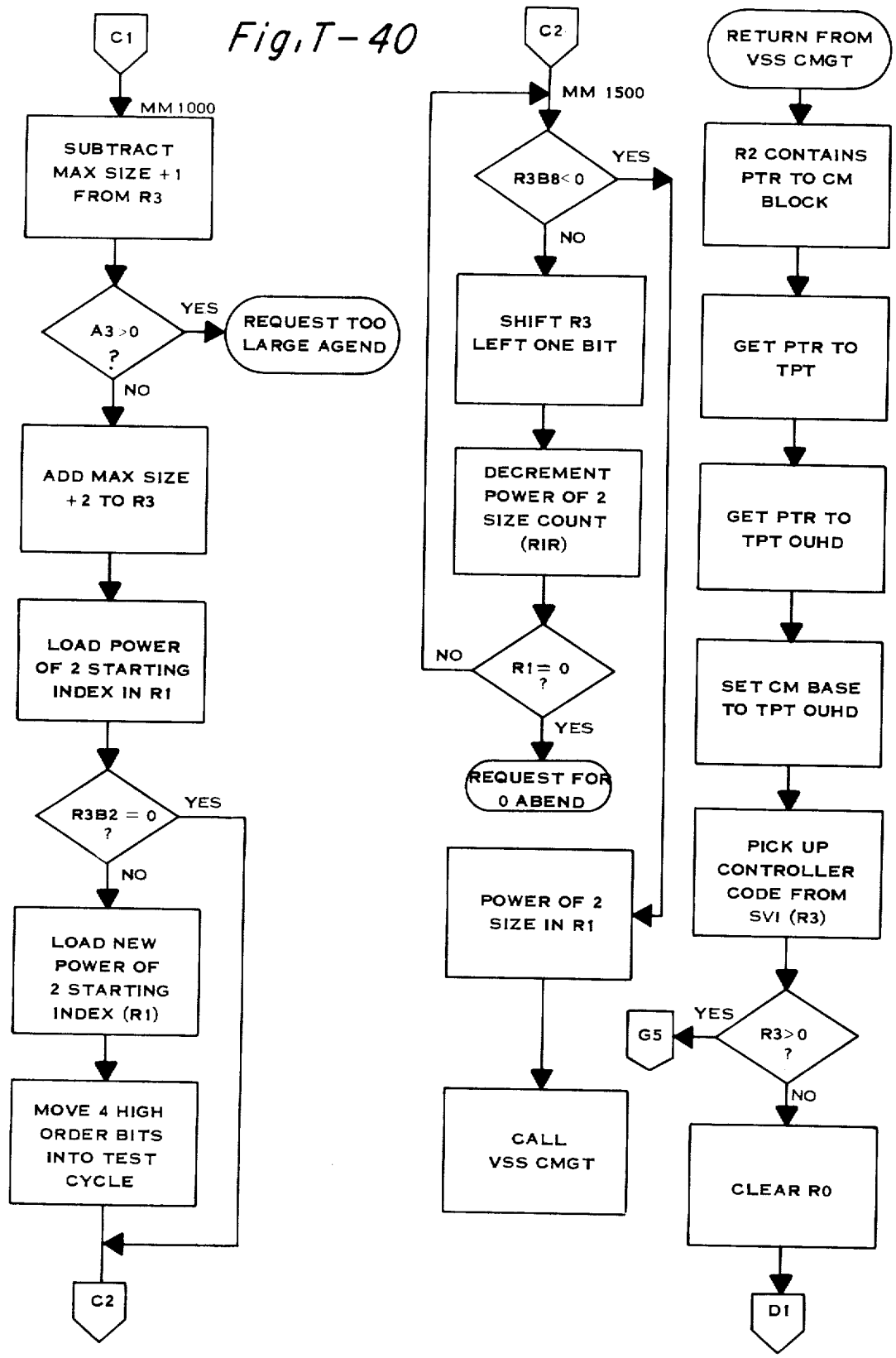
Fig. T-40 — COMMON CODE FOR VSS.GETM AND VSS.CGET

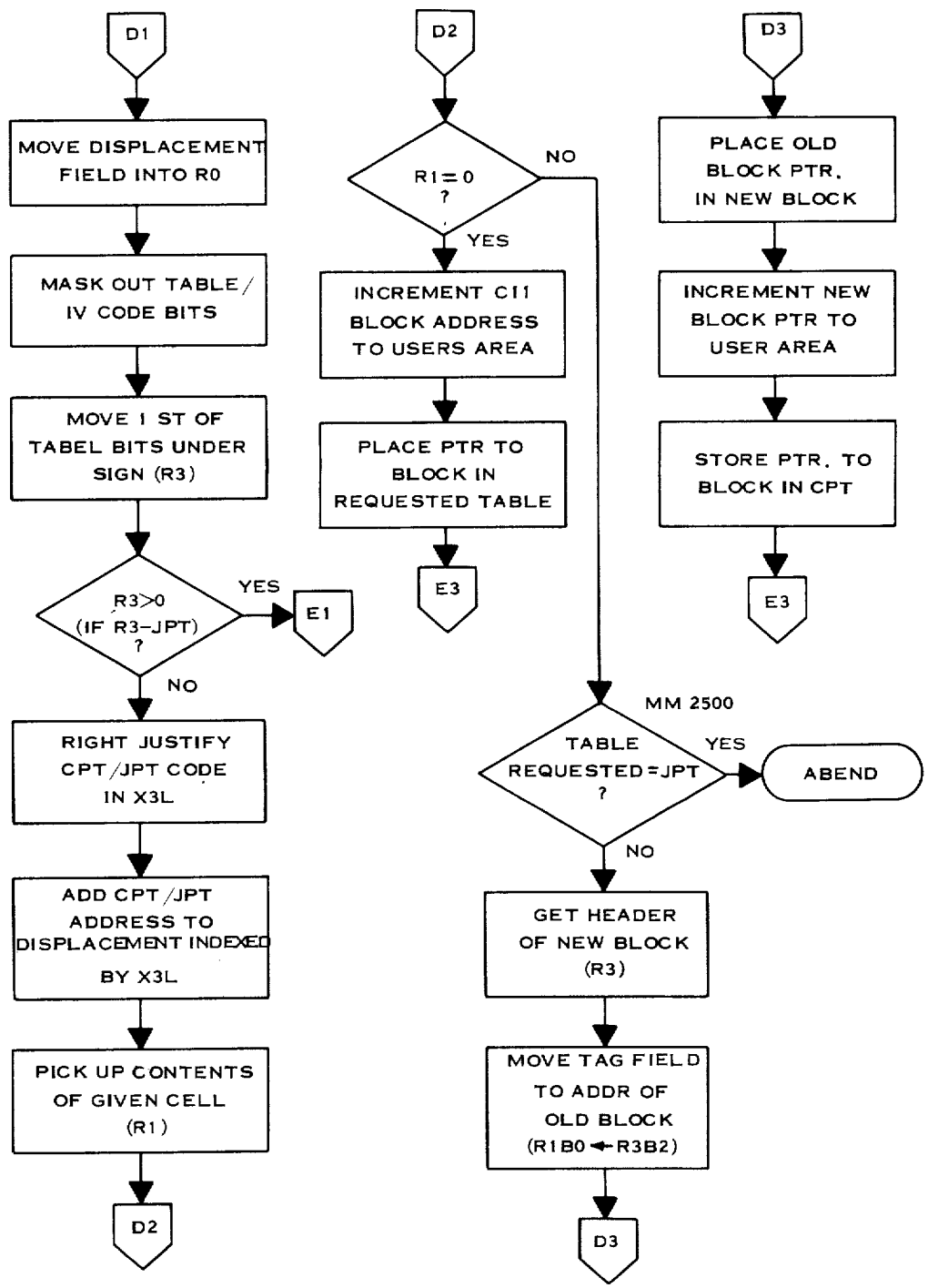
Fig. T-41

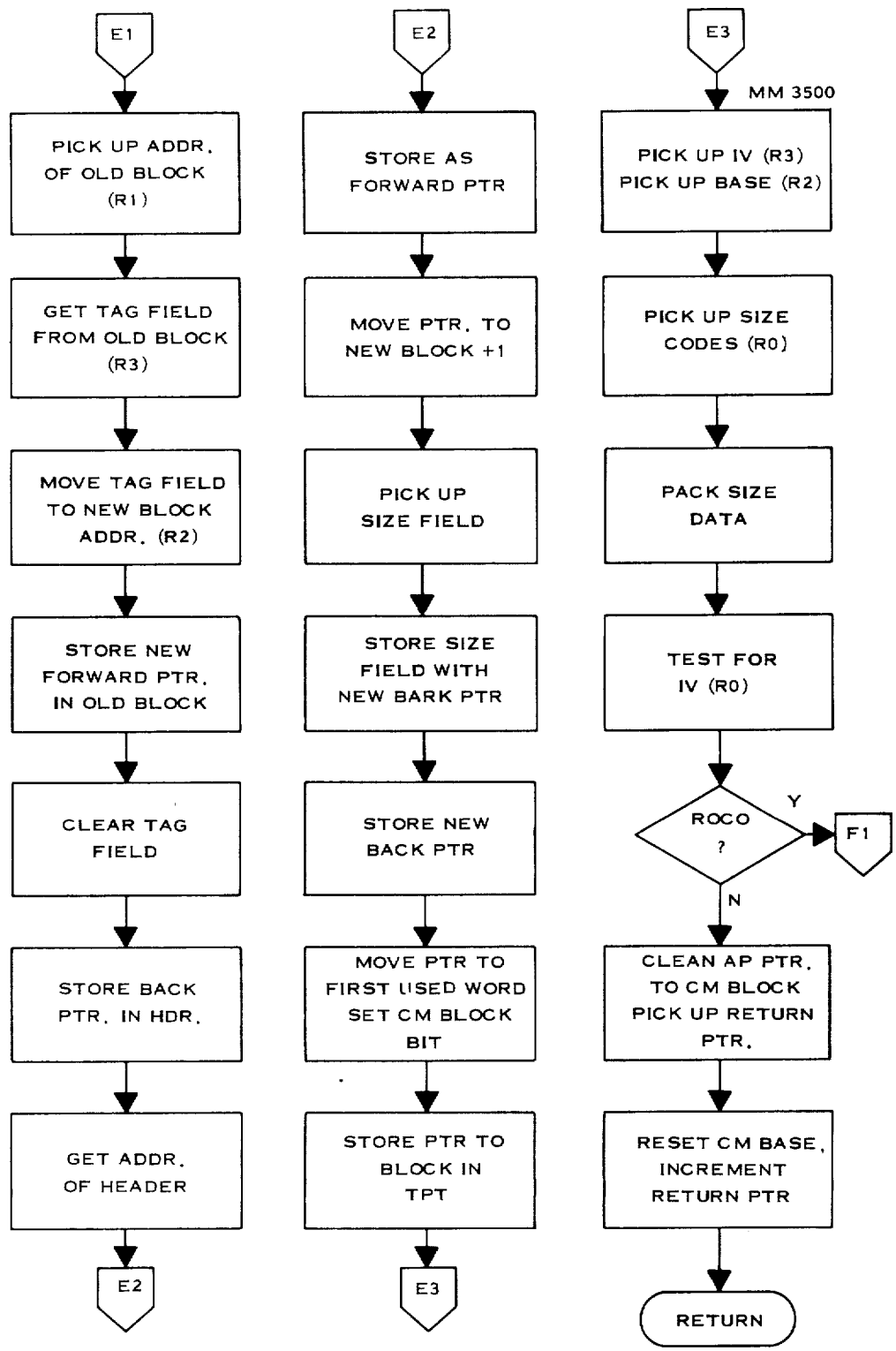
Fig. T-42

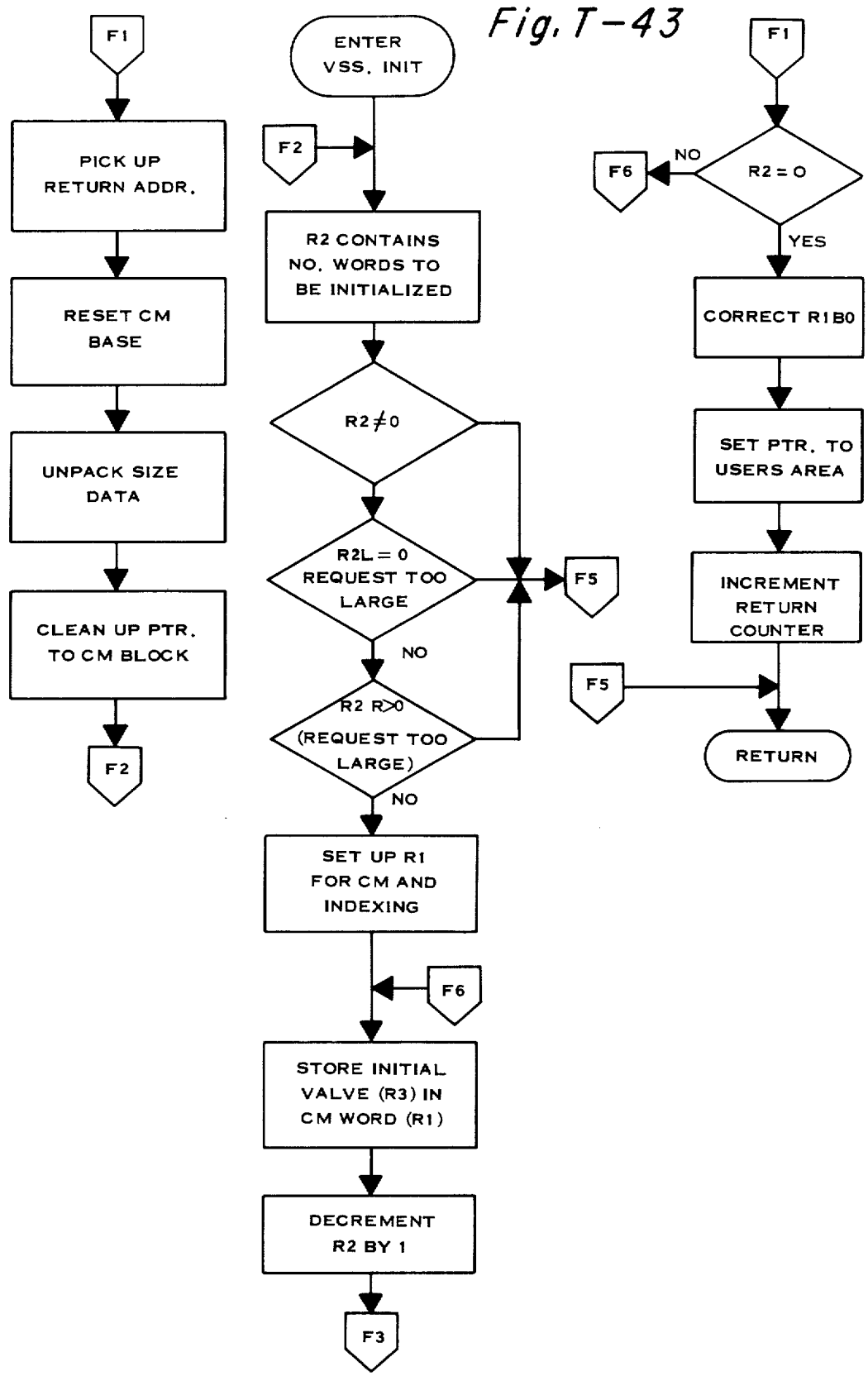
Fig. T-43

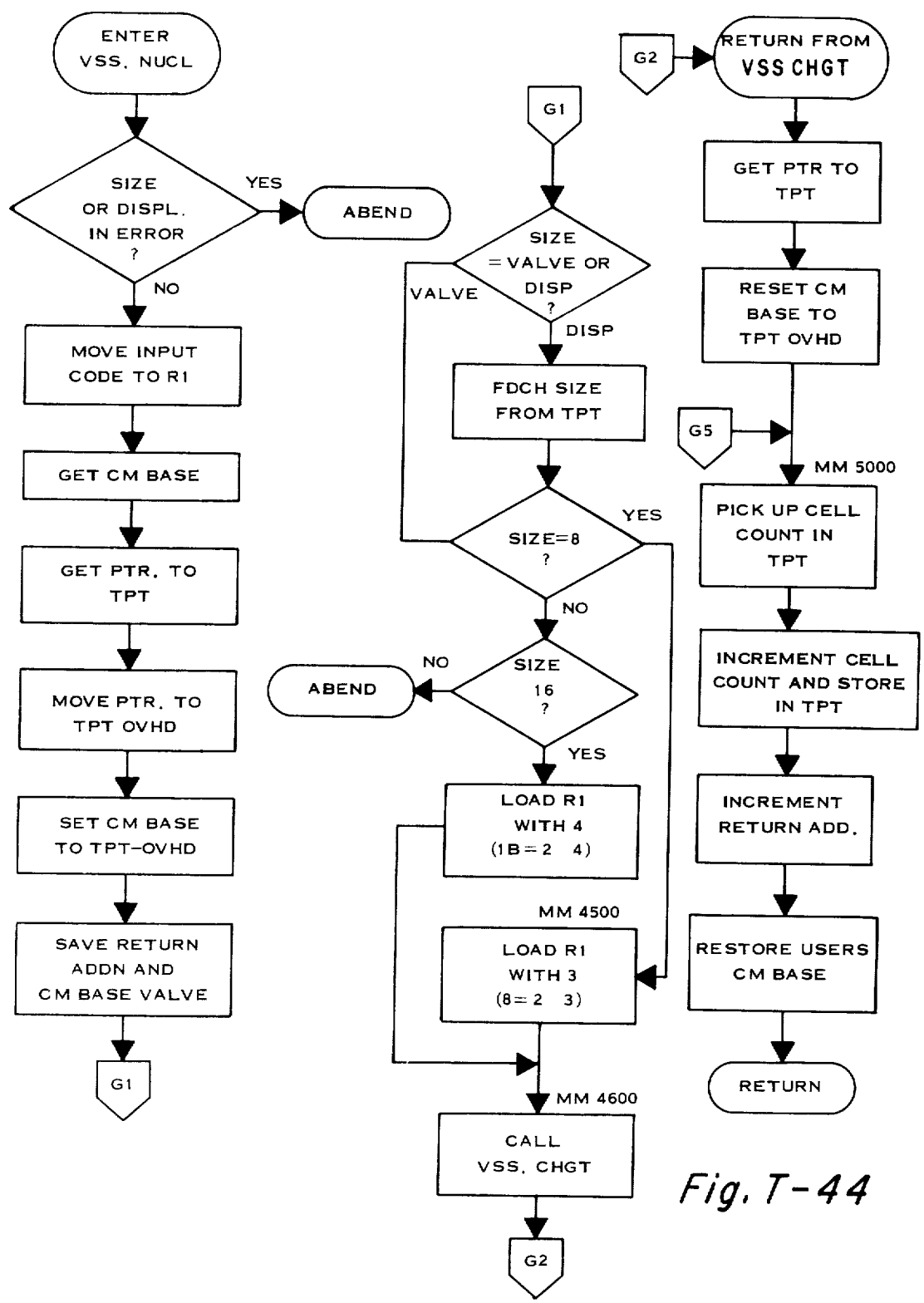
Fig. T-44

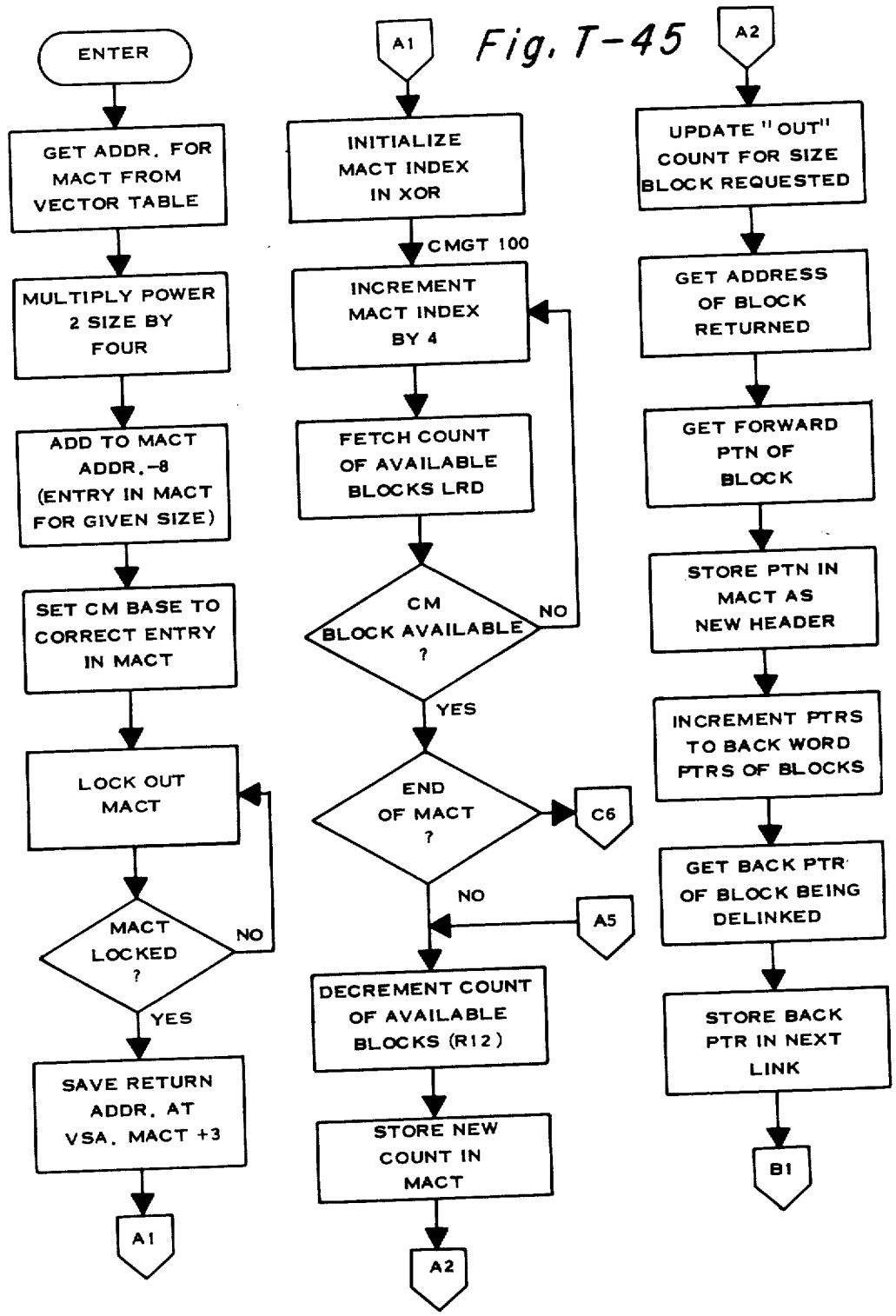
Fig. T-45

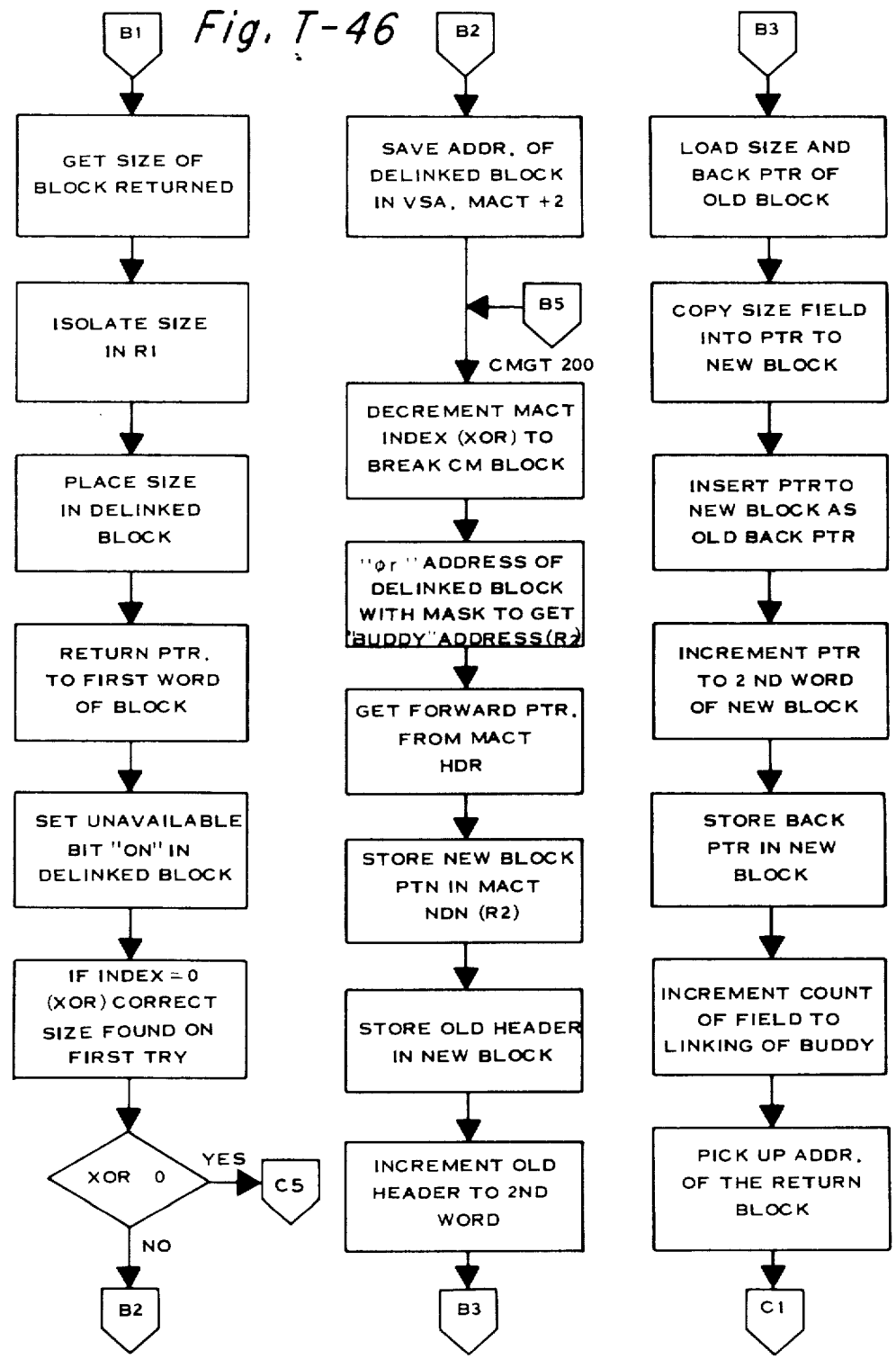
Fig. T-46

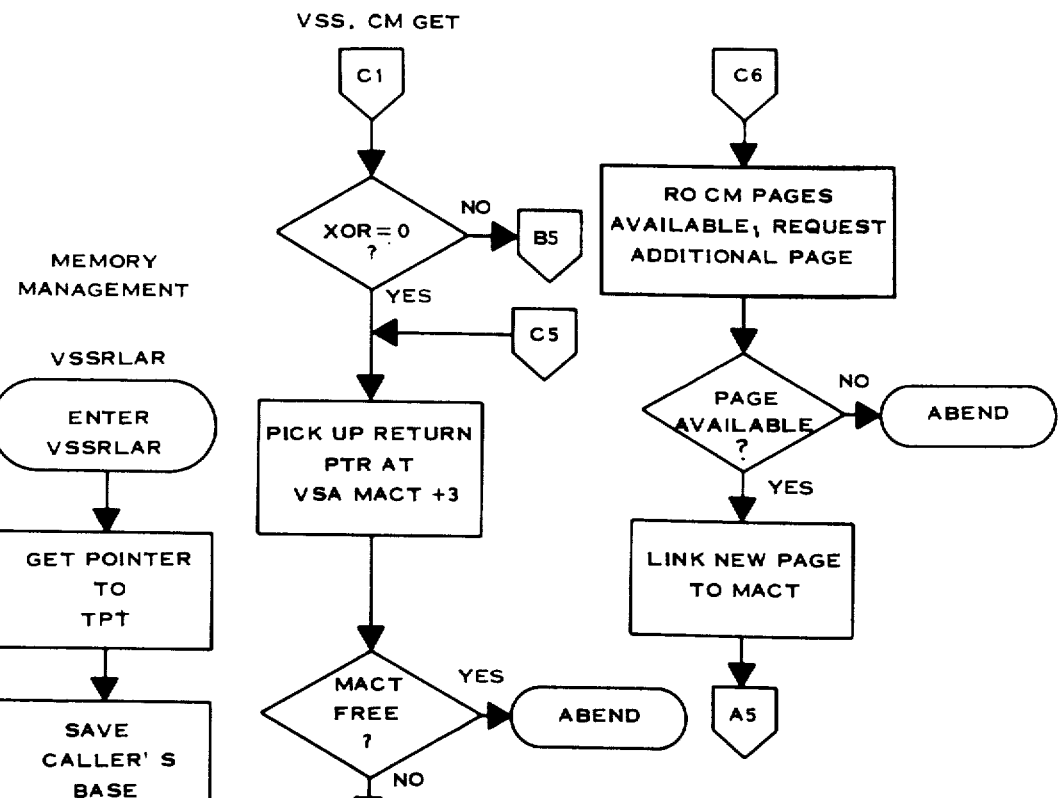
Fig. T-47
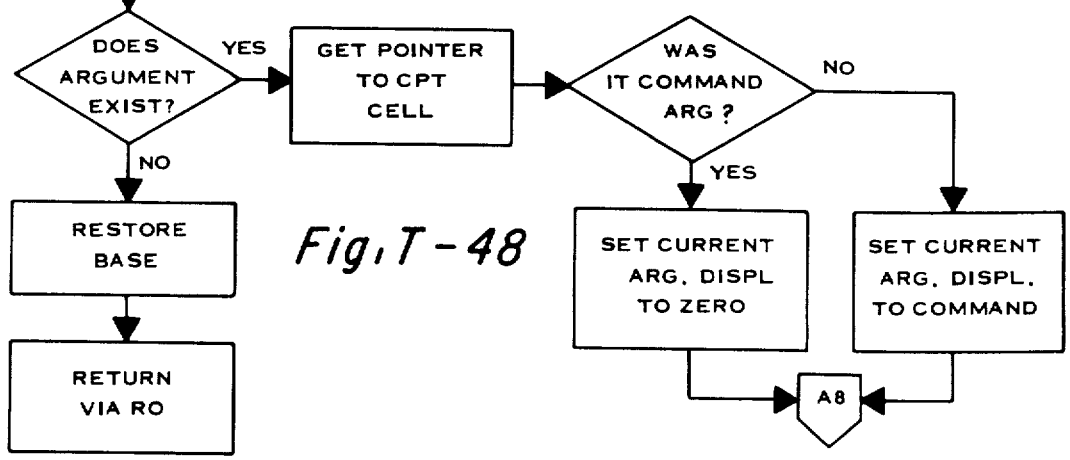
Fig. T-48

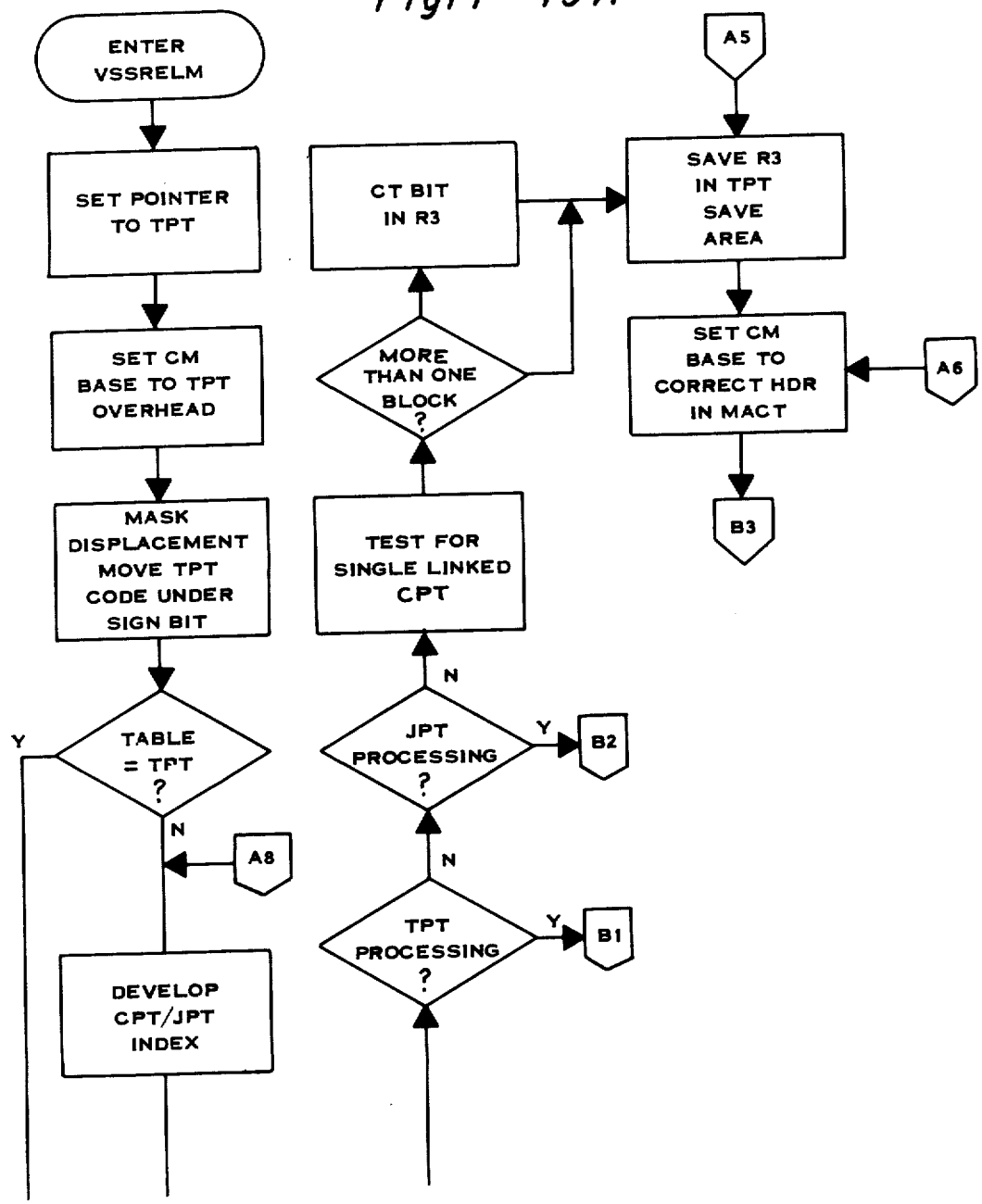
Fig. T-49A

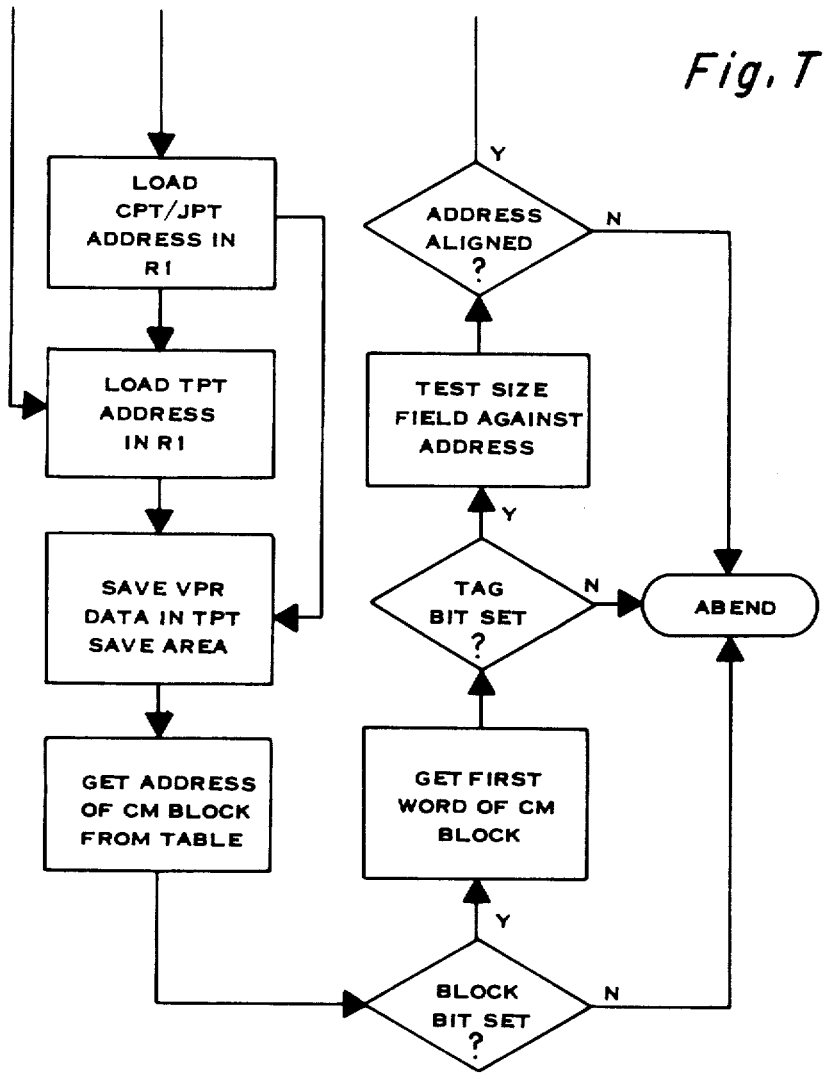
Fig. T-49B

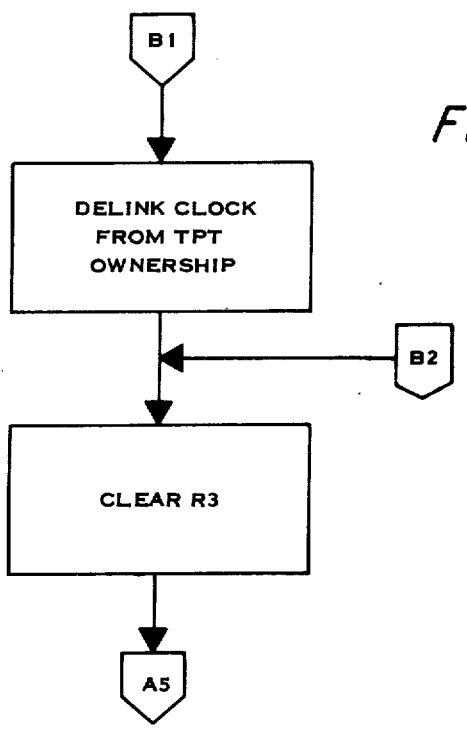
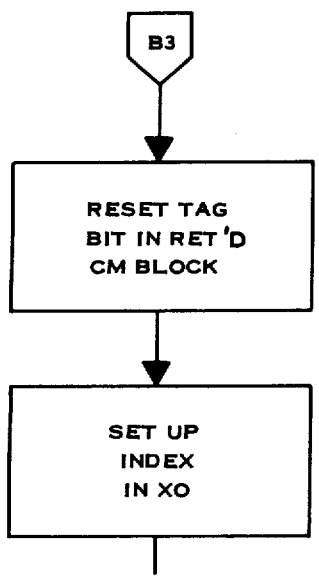
Fig. T-50A

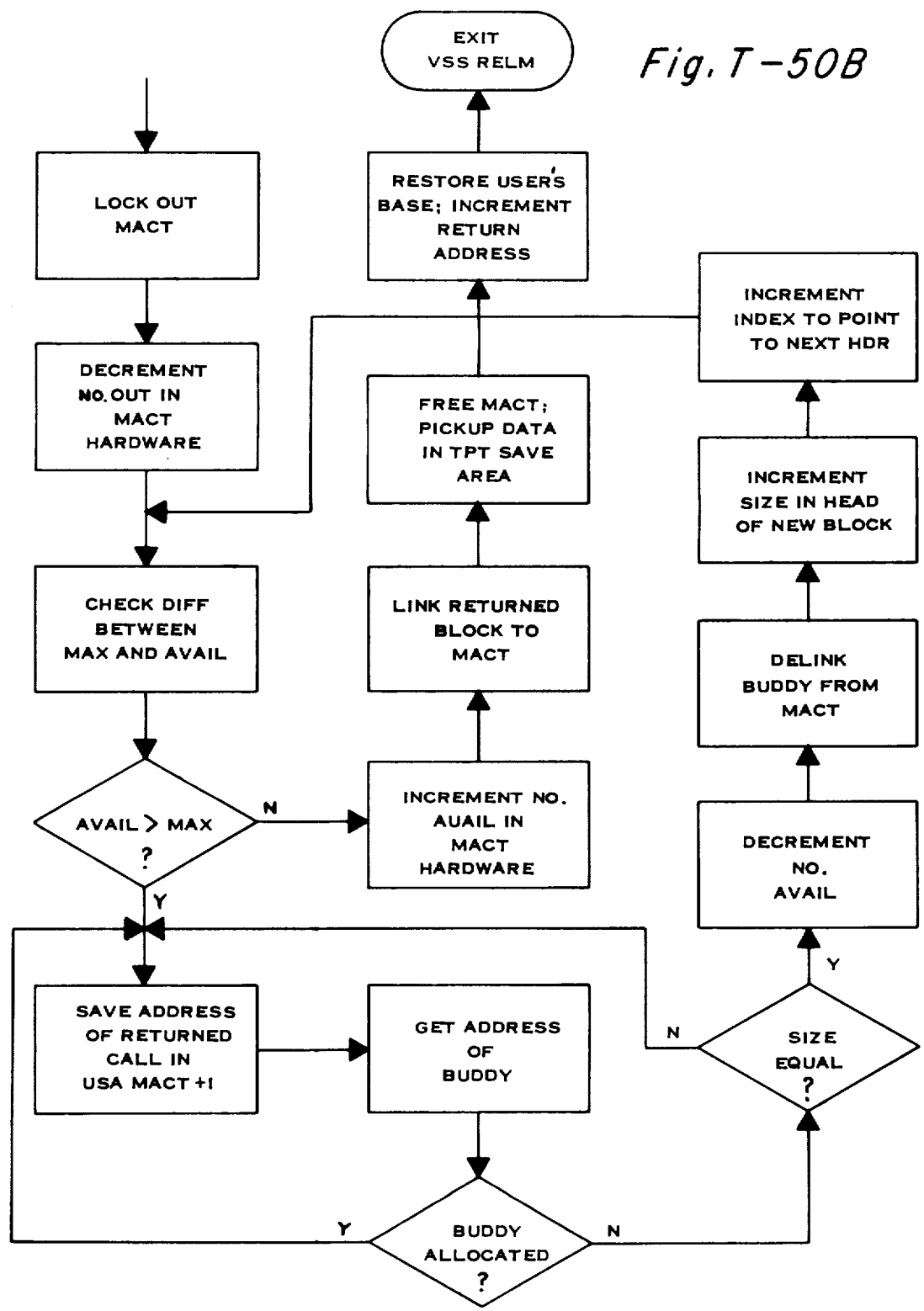
Fig. T-50B

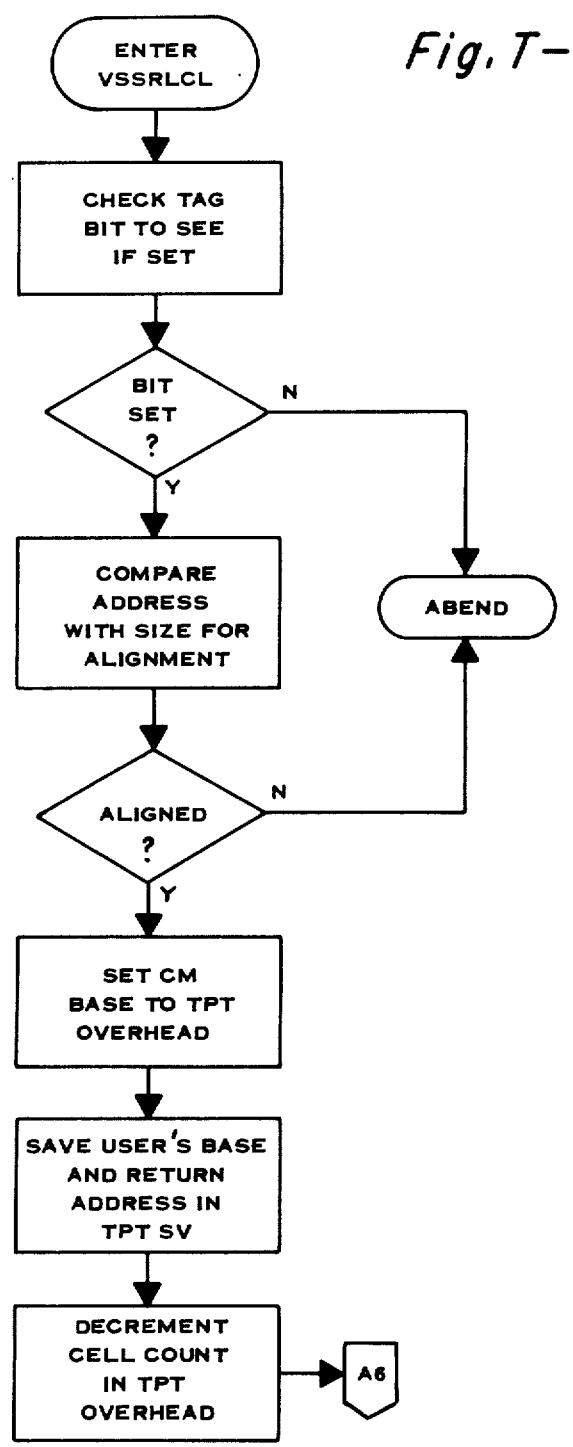
Fig. T-51

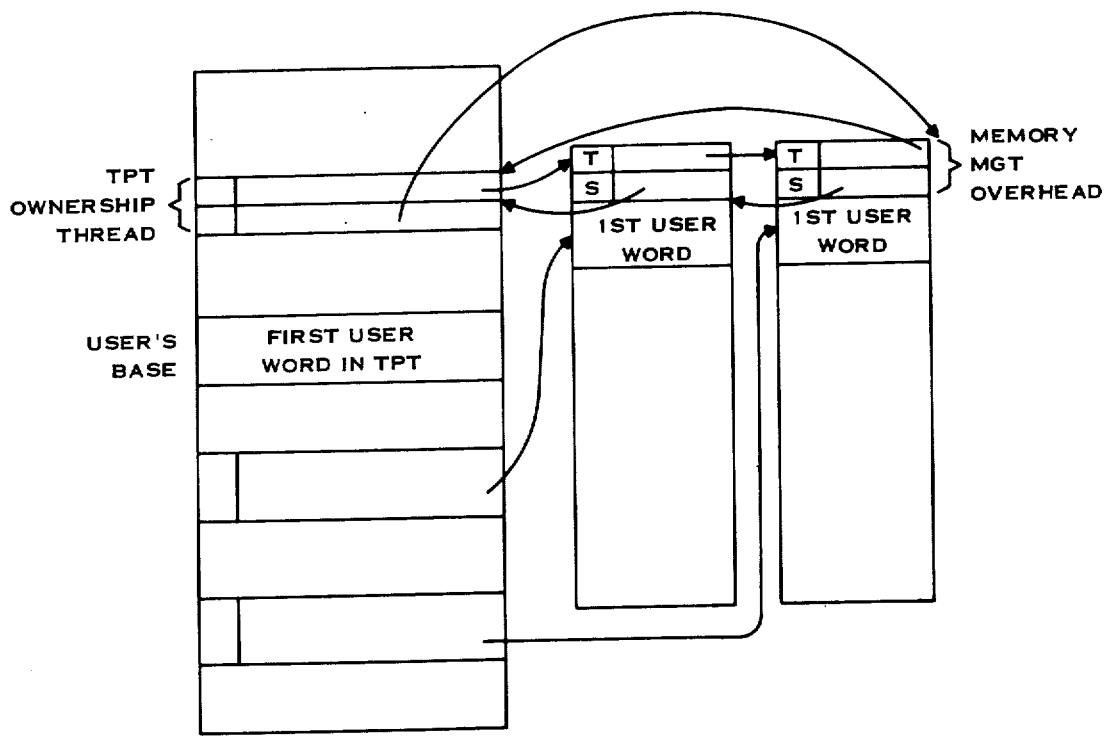
TPT OWNERSHIP  Fig. T-52
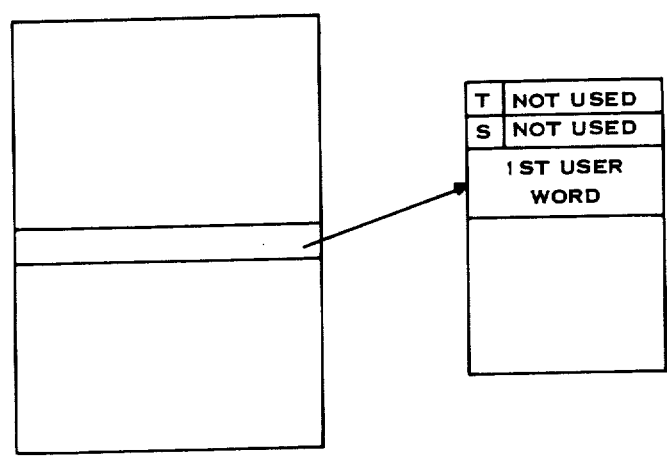
JPT OWNERSHIP

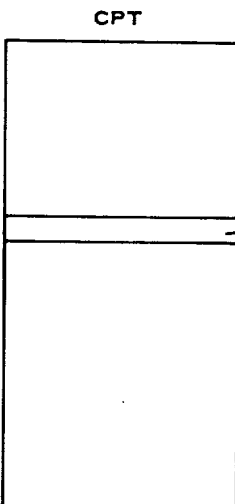
Fig. T-53
CPT WITH ONE BLOCK OF MEMORY
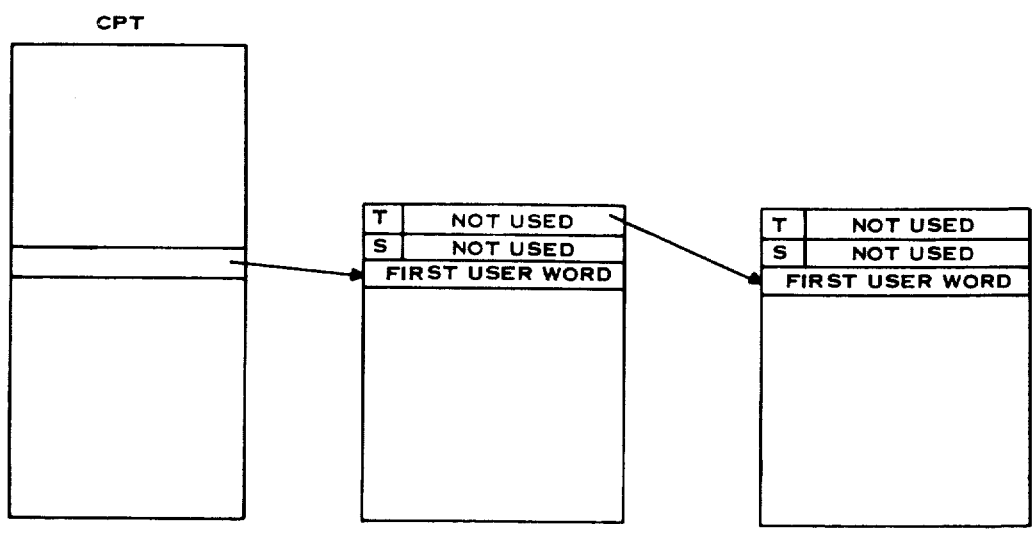
CPT WITH STACKED BLOCKS OF MEMORY

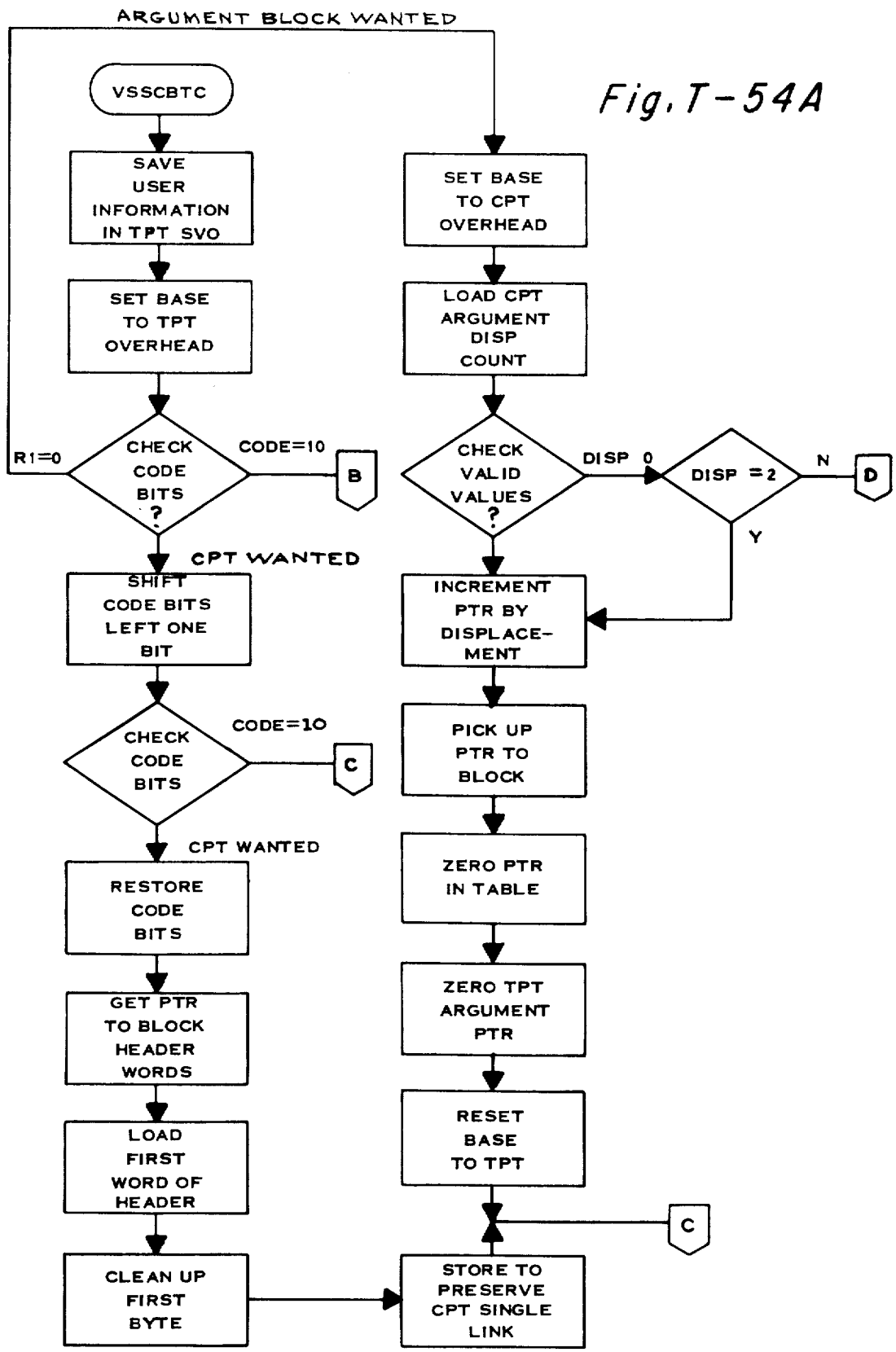
Fig. T-54A

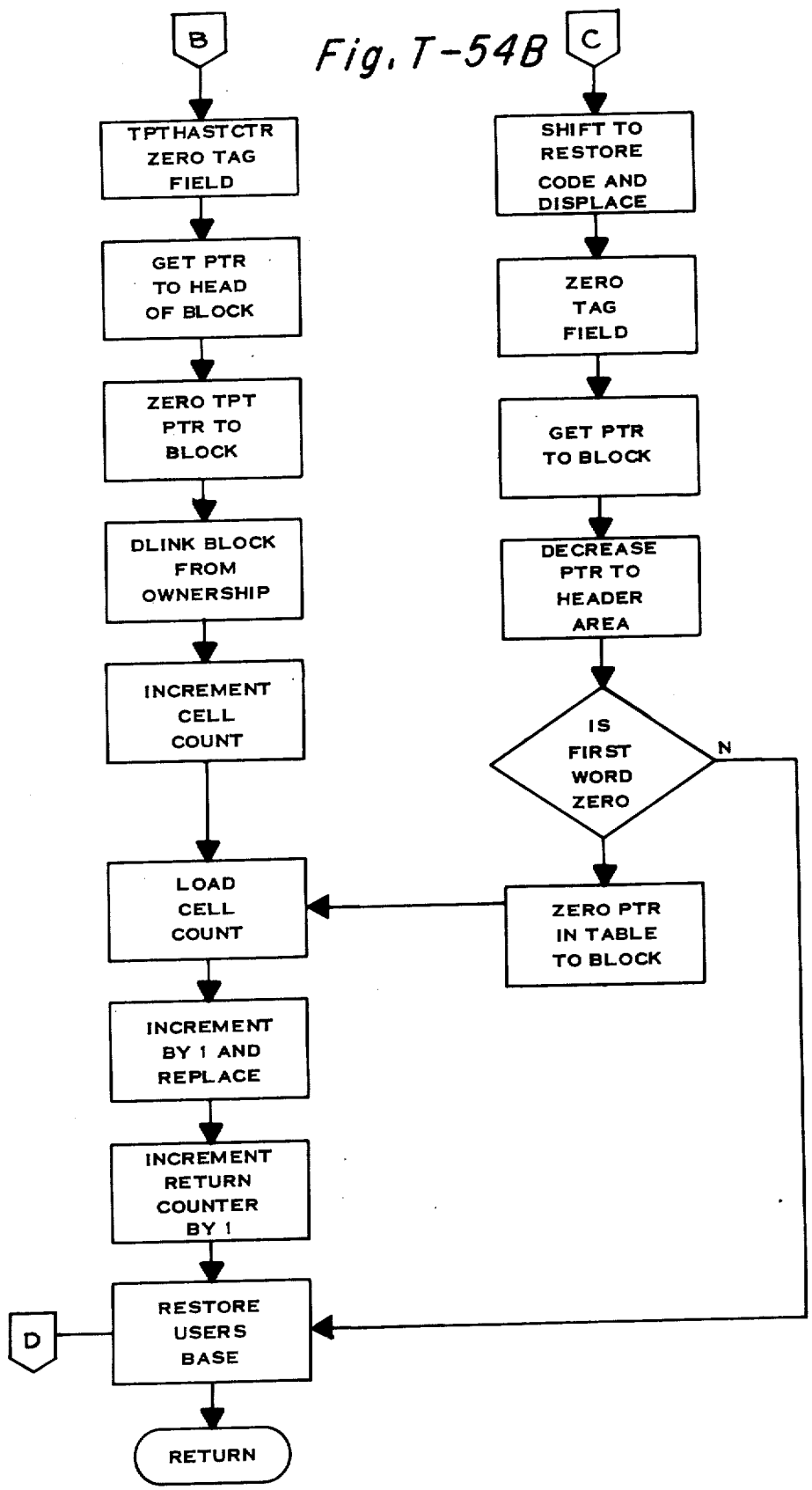
Fig. T-54B

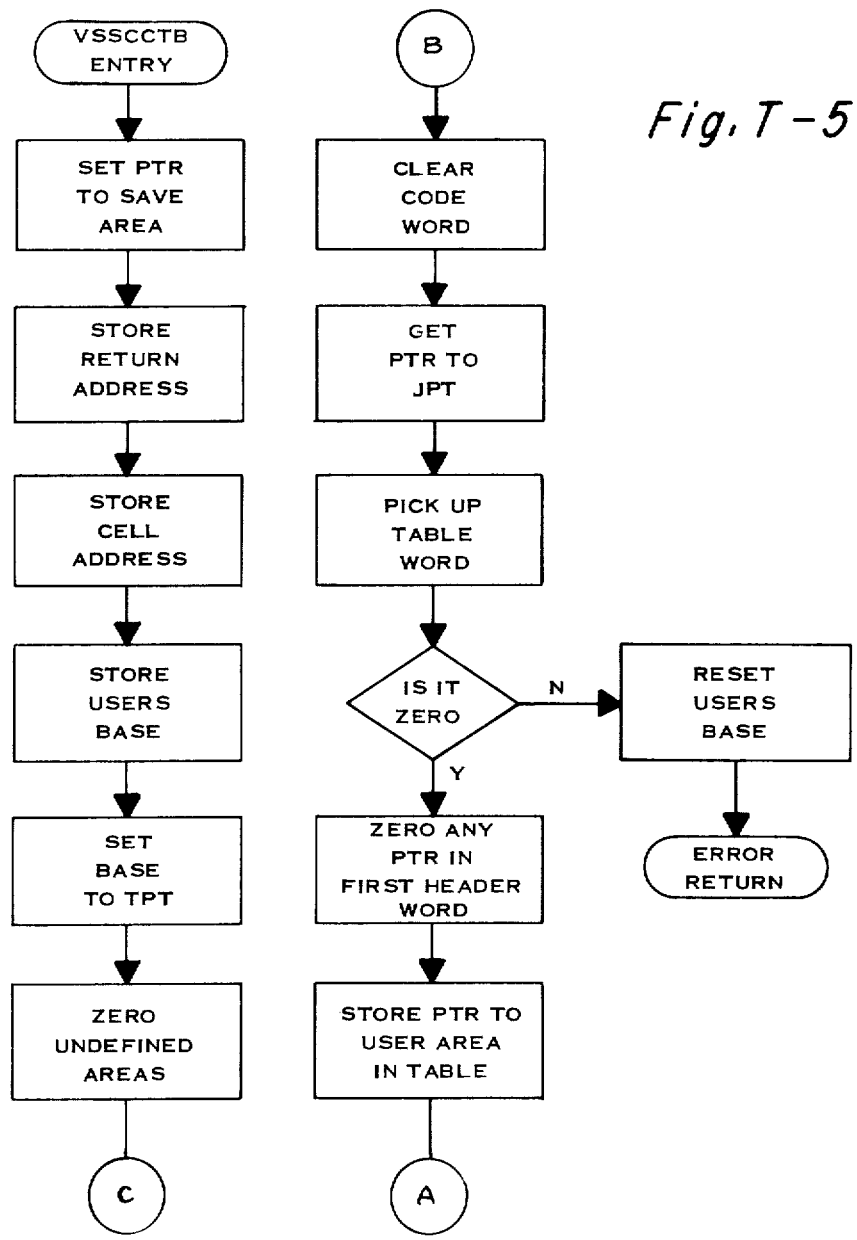
Fig. T-55A

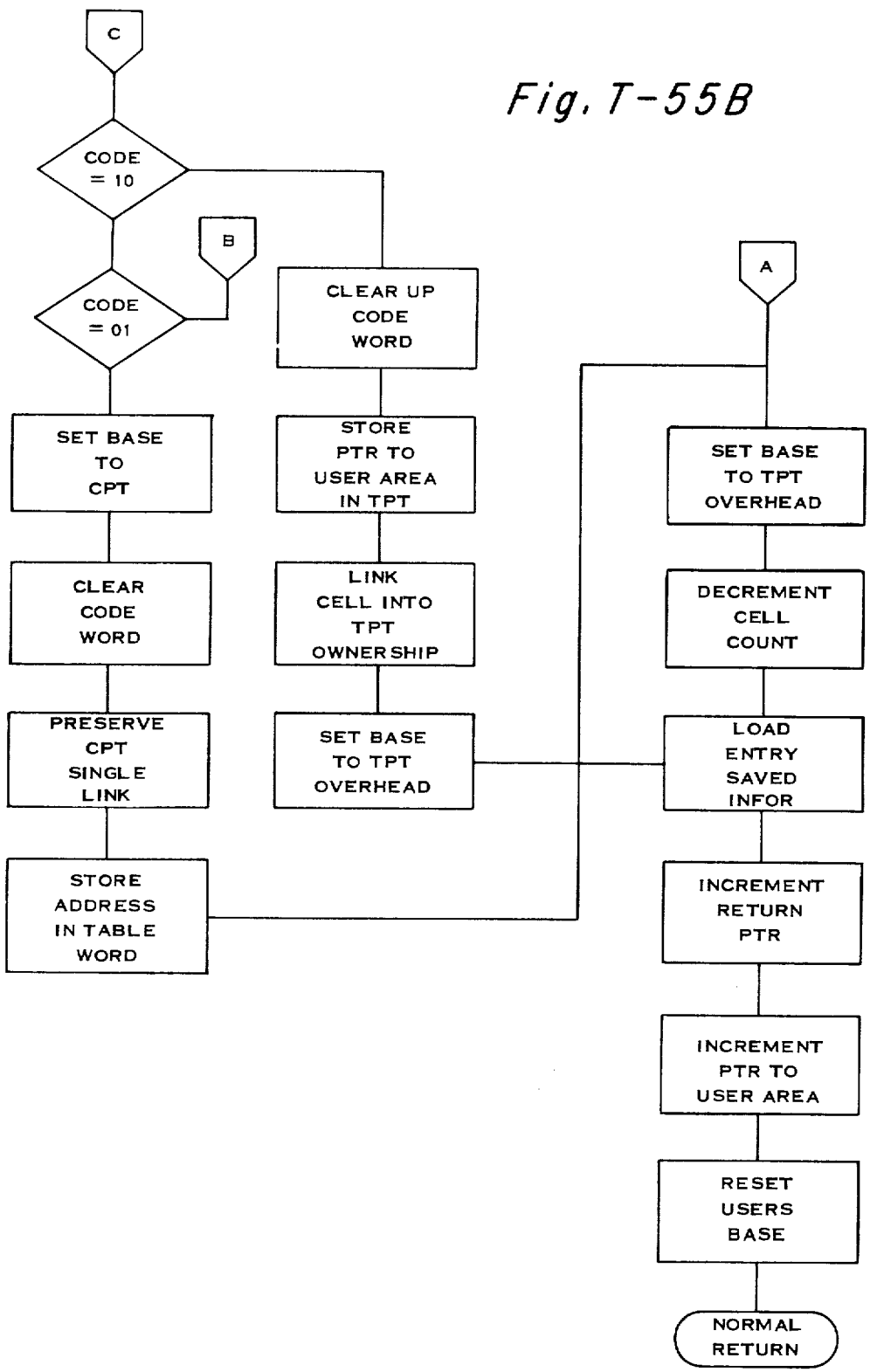
Fig. T-55B

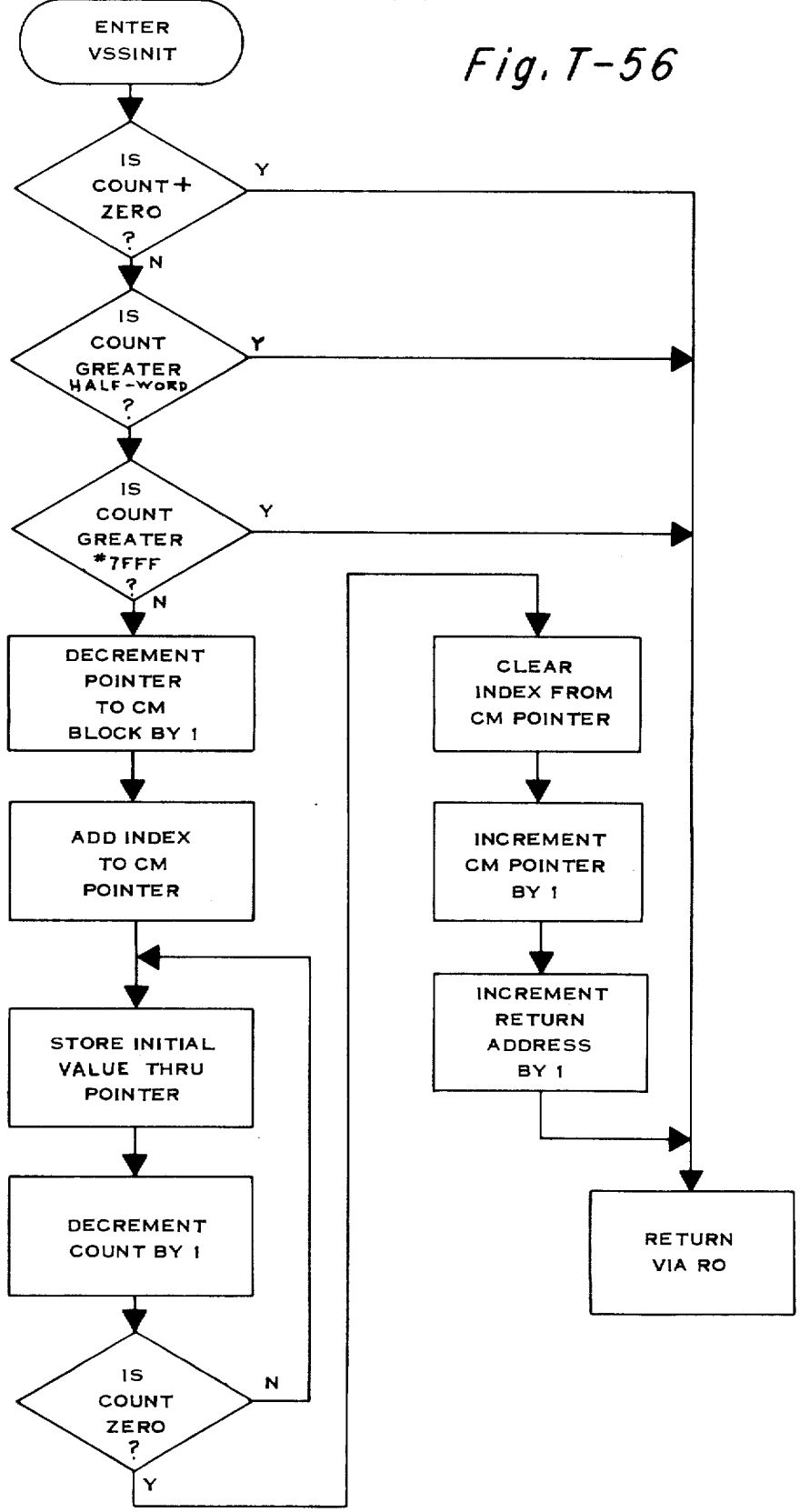
Fig. T-56

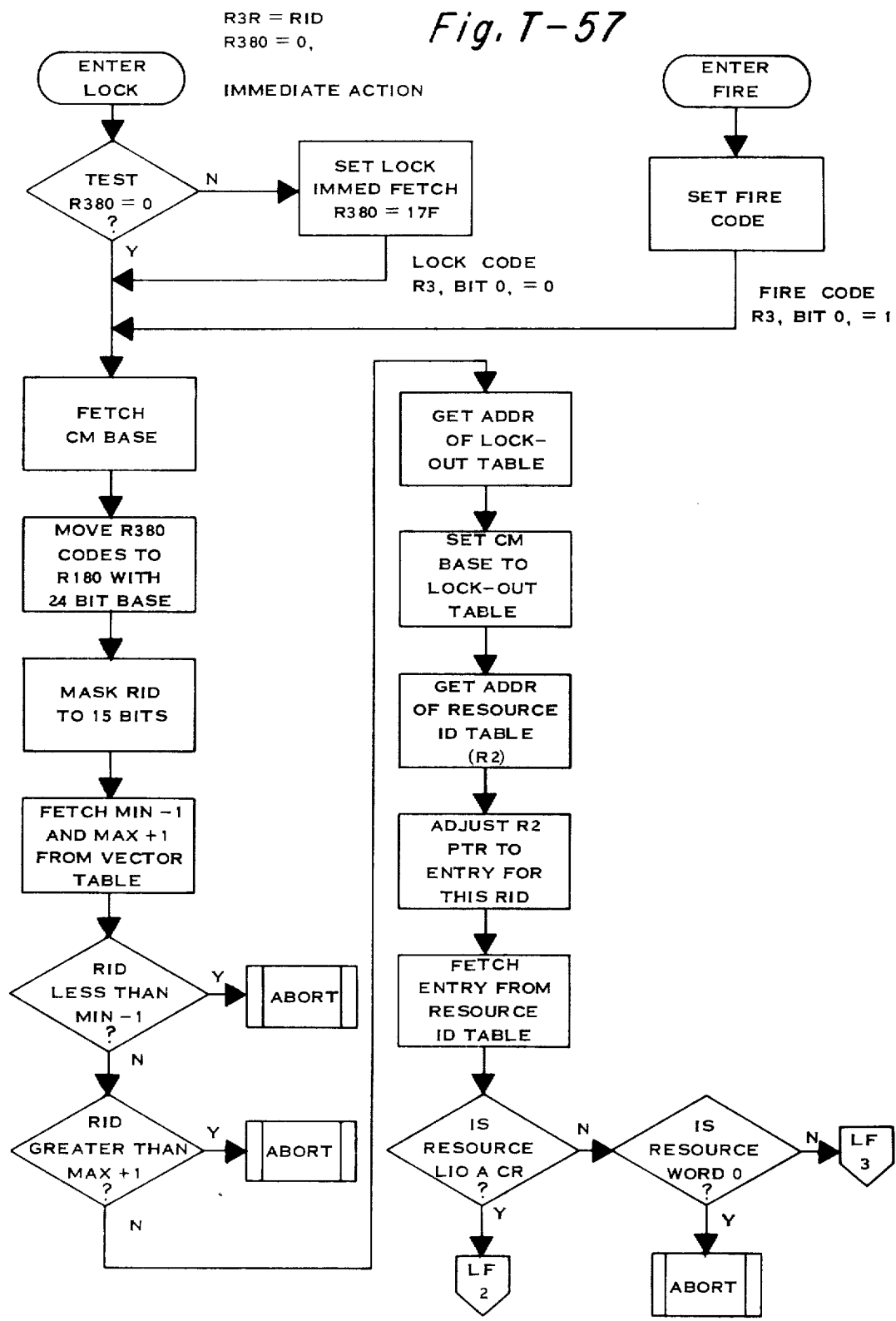
Fig. T-57

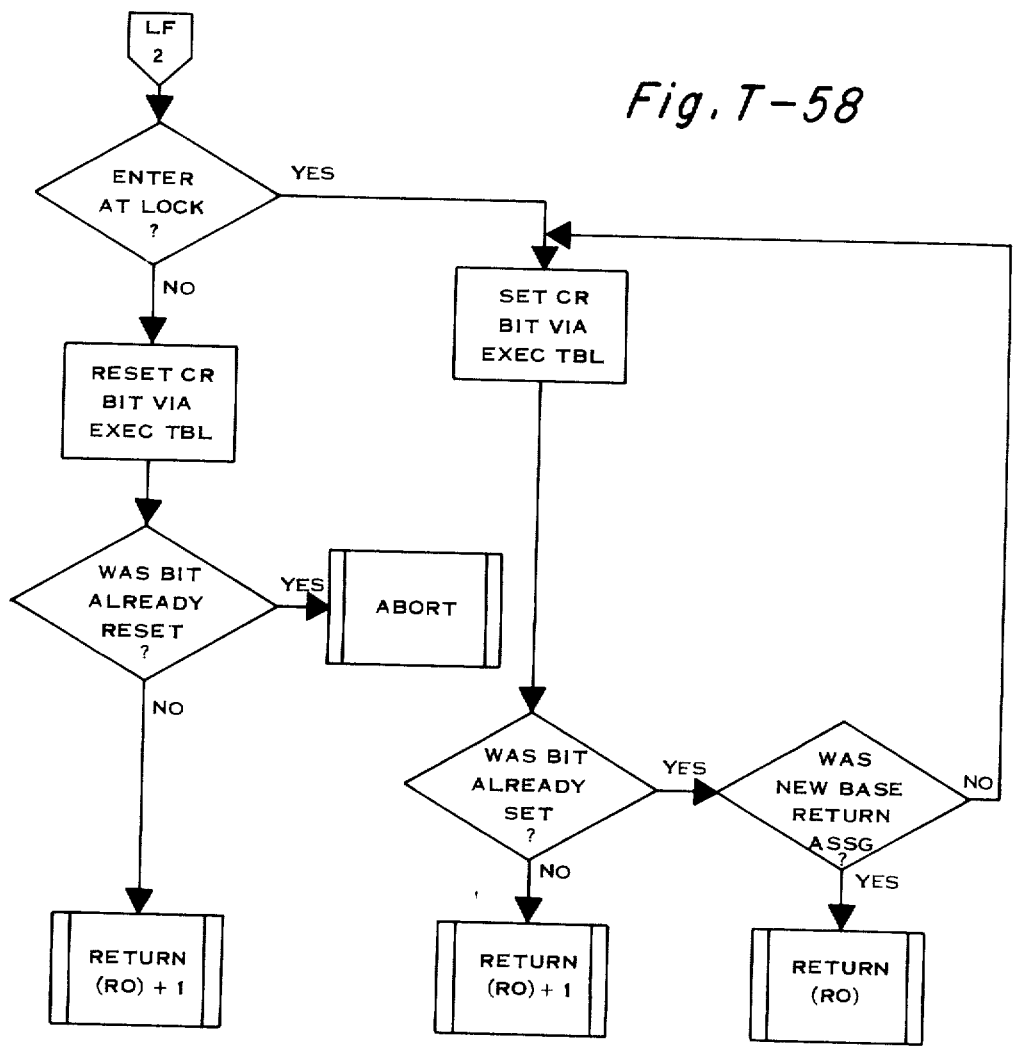
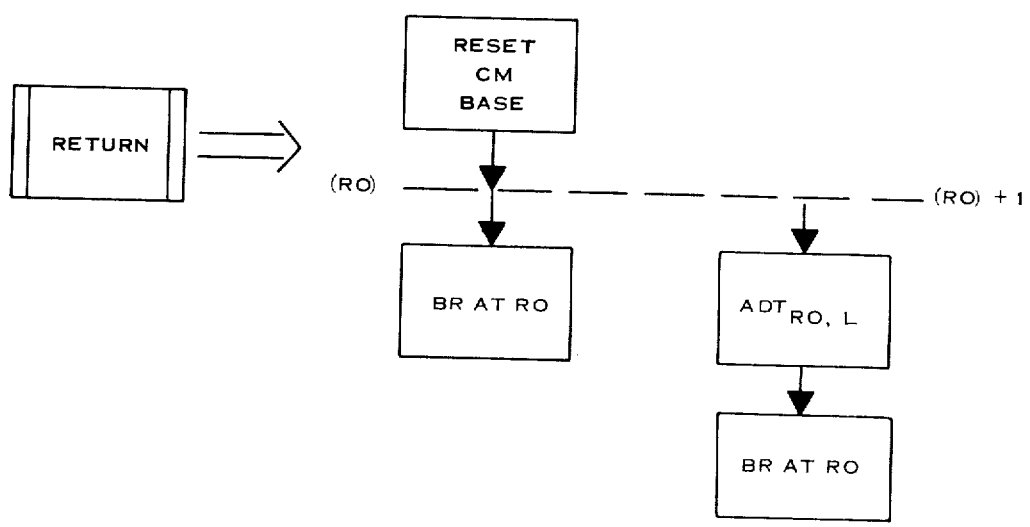
Fig. T-58

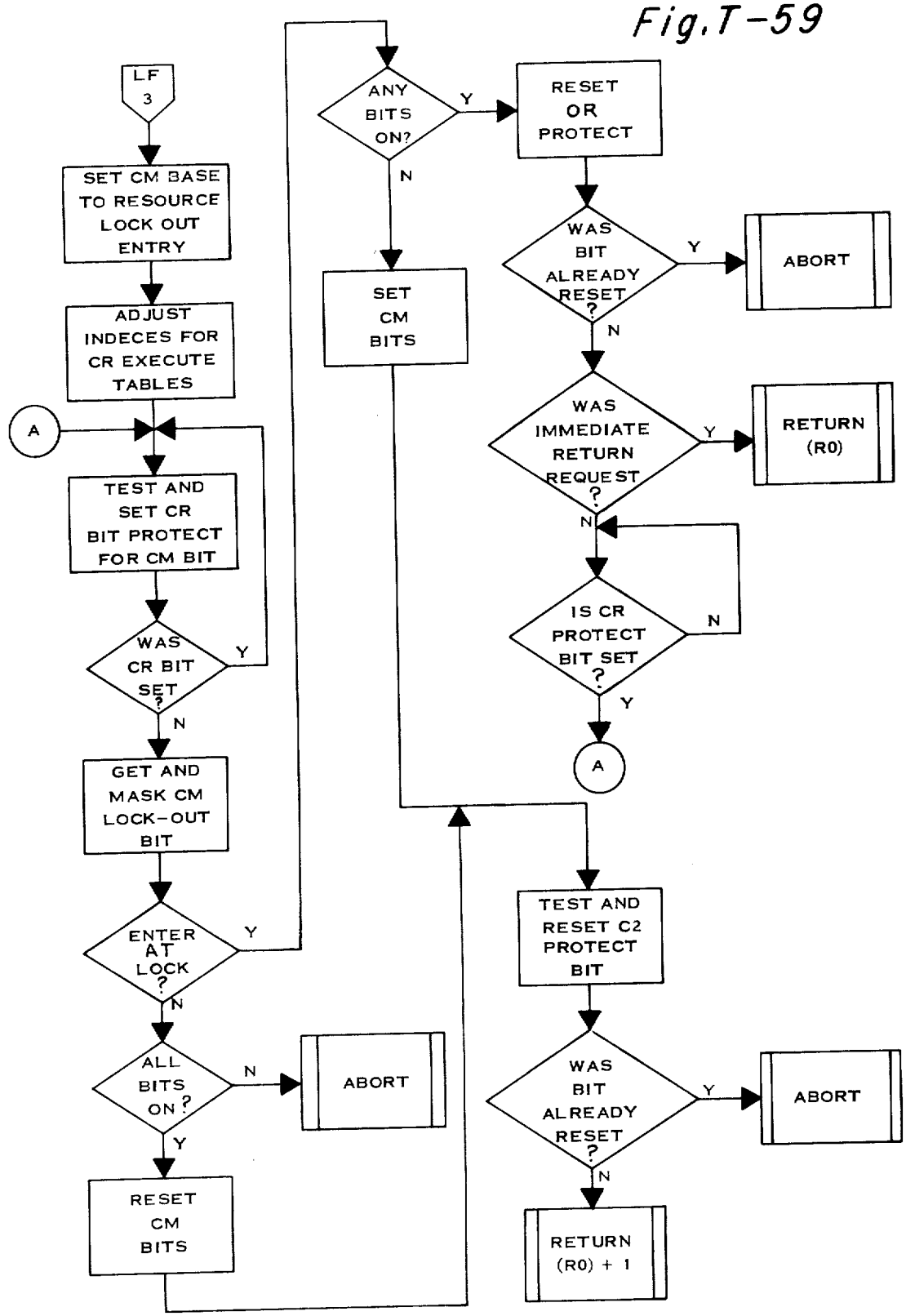
Fig.T-59

CONTROL SYSTEM FOR A STORED PROGRAM MULTIPROCESSOR COMPUTER

This is a continuation of application Ser. No. 178,357, filed Sept. 7, 1971.

TABLE OF CONTENTS

I. Introduction
II. Objects of the Invention
III. Brief Description of the Figures
IV. Summary of the Invention
V. Specific embodiment of the Invention
  A. Master Controller
    1. Master Controller - General Internals
    2. Master Controller - Polling Loop
    3. PP Processors - Overview
    4. PP Controller
    5. VP Service Loop
    6. CP Processors - General Overview
    7. CP Controller
    8. Master Controller Processors - General Overview
    9. Subprocess Scheduler
    10. Timer List Processor
    11. Device Attention Processor
    12. Interactive Terminal Processors
    13. TCC Request Processor
    14. Terminal Communication Area Processor
    15. Terminal Output Processor
    16. System Error Processing
    17. System Error Processor
  B. Command Controller
    1. General Internal Routines
      a. Command Controller Polling Loop
      b. Device Attention Service Request List Processor
      c. Command Sequence Request List Processor
      d. Command Attention List Processor
      e. DIO Processing Complete List Processor
      f. TIO Processing Complete List Processor
      g. Driver Manager Processing Complete List Processor
      h. Breakpoint Processing Complete List Processor
      i. Page Allocation SAT Processor
      j. Page Deallocation SAT Processor
      k. Process Request Scheduling List Processor
      l. Sub-Program Scheduling List Processor
      m. Command Controller Entry Point
      n. Page Management Threshold Cross Processor
      o. ENQ Request Processor
      p. Job Termination Initiation Processor
      q. Timer Service Request Processor
      r. Service Call Service Request Processor
      s. SAT.TDEL Processor
      t. SAT.JCAN Processor
      u. SAT.JOBT and SAT.EOJ Processor
      v. SAT.TCBR and SAT.TDBR Processor
      w. SAT.TCBA and SAT.TDBA Processor
      x. SAT.CPST Processor
      y. SAT.STTM Processor
      z. SAT.LIM Processor
      aa. SAT.CSS Processor
      bb. SAT.CSR Processor
      cc. SAT.THPO Processor
      dd. SAT.TRR Processor
      ee. SAT.CERS Processor
    2. Detailed Internal Routines
      a. Command Controller Entry Point
      b. Page Management Threshold Crossed Processor
      c. ENQ Request Processor
      d. Job Termination Initiation Processor
      e. Timer Service Request Processor
      f. Service Call Service Request Processor
      g. SAT.TDEL Processor
      h. SAT.JCAN Processor
      i. SAT.JOBT and SAT.EOJ Processor
      j. SAT.TCBR and SAT.TDBR Processor
      k. SAT.TCBA and SAT.TDBA Processor
      l. SAT.CPST Processor
      m. SAT.STTM Processor
      n. SAT.LIM Processor
      o. SAT.CSS Processor
      p. SAT.CSR Processor
      q. SAT.THPO Processor
      r. SAT.TRR Processor
      s. SAT.CERS Processor
    3. General Internal Routines
      a. CCRELARG Command Controller Subroutine
      b. CCSC7500 Command Controller Subroutine
      c. CCSC8000 Command Controller Subroutine
      d. CSSCSREB Command Controller Subroutine
      e. CSSJCCHK Command Controller Subroutine
      f. CSSLNHLS Command Controller Subroutine
      g. CCCDLHLS Command Controller Subroutine
      h. CSSEMCHC Command Controller Subroutine
      i. CSSEMCHS Command Controller Subroutine
      j. CSSEMCHT Command Controller Subroutine
      k. CCEMGMSR Command Controller Subroutine
      l. CCEMCCAN Command Controller Subroutine
      m. CCTRFDSB Command Controller Subroutine
      n. BGNCSRTN Command Controller Subroutine
    4. Detailed Internal Routines
      a. LNHLS Procedure
      b. DLHLS Procedure
      c. CHEMC, CHEMS, CHEMT Procedure
      d. BGNCS Procedure
      e. Device Attention Service Request List Processor
      f. Command Sequence Request List Processor
      g. Command Attention List Processor
      h. DIO Processing Complete List Processor
      i. TIO Processing Complete List Processor
      j. Driver Manager Processing Complete List Processor
      k. Breakpoint Processing Complete List Processor
      l. Page Allocation SAT Processor
      m. Page Deallocation SAT Processor
      n. Process Request Scheduling List Processor
      z. SAT.JOBT Processor
      aa. SAT.EOJ Processor
      bb. SAT.TCBR Processor
      cc. SAT.TDBR Processor
      dd. SAT.TCBA Processor
      ee. SAT.TDBA Processor
      ff. SAT.CPST Processor gg. SAT.STTM Processor
hh. SAT.LIM Processor
ii. SAT.CSS Processor
jj. SAT.CSR Processor
kk. SAT.THPO Processor
ll. SAT.TRR Processor
mm. SAT.CERS Processor
nn. CCRELARG Command Controller Subroutine
oo. CCSC7500 Command Controller Subroutine
pp. CCSC8000 Command Controller Subroutine
qq. CSSCSREB Command Controller Subroutine
rr. CSSJCCHK Command Controller Subroutine
ss. CSSLNHLS Command Controller Subroutine
tt. CSSDLHLS Command Controller Subroutine
uu. CSSEMCHC Command Controller Subroutine
vv. CSSEMCHS Command Controller Subroutine
ww. CSSEMCHT Command Controller Subroutine
xx. CCEMGMSR Command Controller Subroutine
yy. CCEMCCAN Command Controller Subroutine
zz. CCTRFDSB Command Controller Subroutine
aaa. BGNCSRTN Command Controller Subroutine C. Task Controller
 1. General Internals
 2. Detailed Internal Routines
 3. Page Management
 4. Resource Lock-Out Facilities - General Internals
   o. Sub-Program Scheduling List Processor
   p. CCACTCOM Command Controller Subroutine
   q. CCTERMCS Command Controller Subroutine
   r. CCPD1000 Command Controller Subroutine
   s. RSBST, RDQST, RFNCD, RDRIO, Procedure
   t. WSBST, WRQST, WFNCD, WPRIO, Procedure
 5. External Routines
   a. Device Attention Service Request List Processor
   b. Command Attention List Processor
   c. Command Exit Processing
   d. V.PRT Processor
   e. SAT.PGAL Processor
   f. SAT.PGDL Processor
   g. V.SCOM Processor
   h. V.JAF Processor
   i. Command I/O Wating List
   j. DIO Processing Complete List Processor
   k. TIO Processing Complete List Processor
   l. Driver Manager Processing Complete List Processor
   m. Breakpoint Waiting List
   n. Breakpoint Processing Complete List Processor
   o. CCACTCOM Command Controller Subroutine
   p. CCTERMCS Command Controller Subroutine
   q. CCPD1000 Command Controller Subroutine
   r. Command Controller Entry Point
   s. Page Management Threshold Crossed Processor
   t. ENQ Request Processor
   u. Job Termination Initiation Processor
   v. Service Call Service Request (SCSR) Processor
   w. Timer Service Request Processor
   x. SAT.TDEL Processor
   y. SAT.JCAN Processor This invention relates to stored program electronic digital computers, and more specifically to a control system for said computers where there exists a plurality of processors. The processors for which a control system is disclosed may be virtual processors more specifically and more fully described in the embodiment of an advanced scientific computer in U.S. Pat. Nos. 3,573,851 and 3,573,852 assigned to the same assignee as this patent application.

A control system for said computer provides control, scheduling, and resources necessary for the orderly and efficient flow of stored computer programs in a multi-programming environment. The control system is composed of a hierarchy of four stored program controllers with each controller exercising control over a given level of work. Each of said controllers is responsible for servicing certain computer resources and makes scheduling decisions within its respective area of responsibility.

The four stored program controllers which operate in different virtual processors within the computing system are the Master Controller, the Command Controller, the Task Controller, and the Disk I/O Controller. Each controller has one or more input and output queues which are configured in doubly linked-list fashion which provides for communication necessary between controllers. Typically, the output of one controller is positioned into the input queue of another controller.

Said Master Controller is at the top of the controller hierarchy and communicates with all processors and devices through an array of communication registers. Several of said registers are partitioned into bit fields which represent the request status of processors and devices which are monitored frequently by the Master Controller to determine when certain functions are to be performed. The Master Controller acknowledges requests by changing the bit status in the communication registers and passes the request to the next lowest level controller, the Command Controller.

The Master Controller has the ultimate scheduling authority for all hardware in the computer system and may force a processor to yield if a high priority resources requests service.

The Command Controller is responsible for scheduling the sets of computer instruction groups, called commands, each of which performs a function with a predetermined and reserved resource. The controller constructs the sequence of commands in a queue necessary to define a process.

The execution of the command queue resulting from the operation of Command Controller is controlled by the next level of the control hierarchy, the Task Controller. To obtain the optimum efficiency of the virtual processors, it is desirable to time share their processing power among small program units. The commands in the queue constructed by the Command Controller are broken down into small program units called tasks. Each task has memory and execution time limits such that no system command will monopolize a processor in an unproductive manner. The Task Controller is the next in the controller hierarchy and has the function of scheduling each task, monitoring task linkage, managing transient system central memory, and insuring completion of commands as directed by the Command Controller. Task controller also has the responsibility of servicing requests for data transfers between memory and secondary and peripheral storage devices.

Task Requests for disc processing are the responsibility of the Disc Controller. The Task Controller constructs lists of disc input/output requests and the Disc Controller reorders said requests so that the use of the data channel associated with the discs is optimized.

It is therefore an object of this invention to provide a new and improved data processing system having a plurality of processors.

Another object of this invention is to provide a stored program computer having a plurality of processors with a control system in the computer having a hierarchy of controllers.

Another object of this invention is to provide a stored program computer having a hierarchy of four stored program controllers with each controller exercising control over a given level of work.

Another object of this invention is to provide a stored program computer having a plurality of controllers arranged in a hierarchy of control with each controller responsible for servicing computer resources and making scheduling decisions.

For a more complete understanding of the invention and for further objects and advantages thereof, reference may now be had to the following description taken in conjunction with the accompanying drawings in which.

Figure 1:
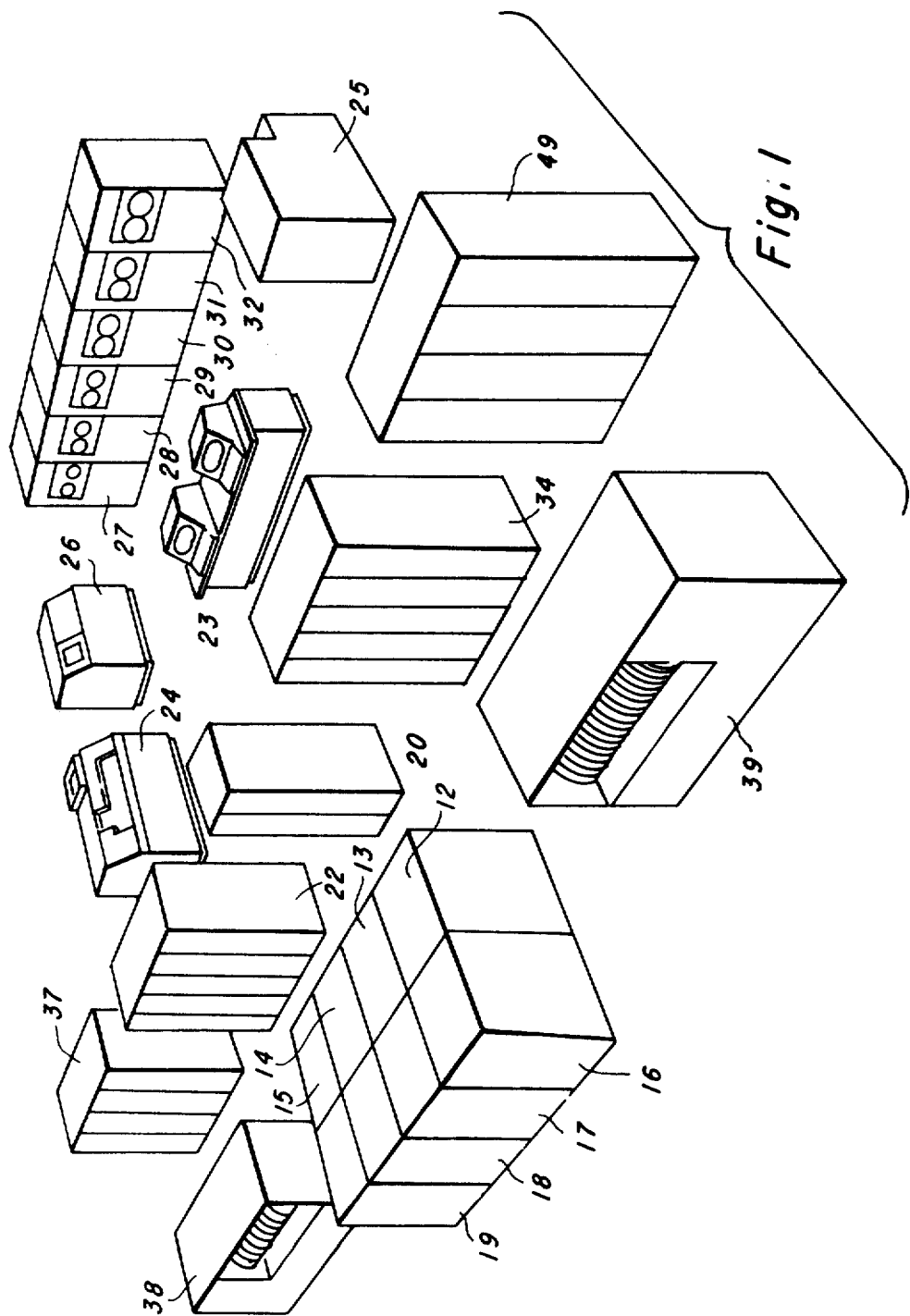
FIG. 1 illustrates an arrangement of the computer components to which the present invention may apply.
Figure 2:
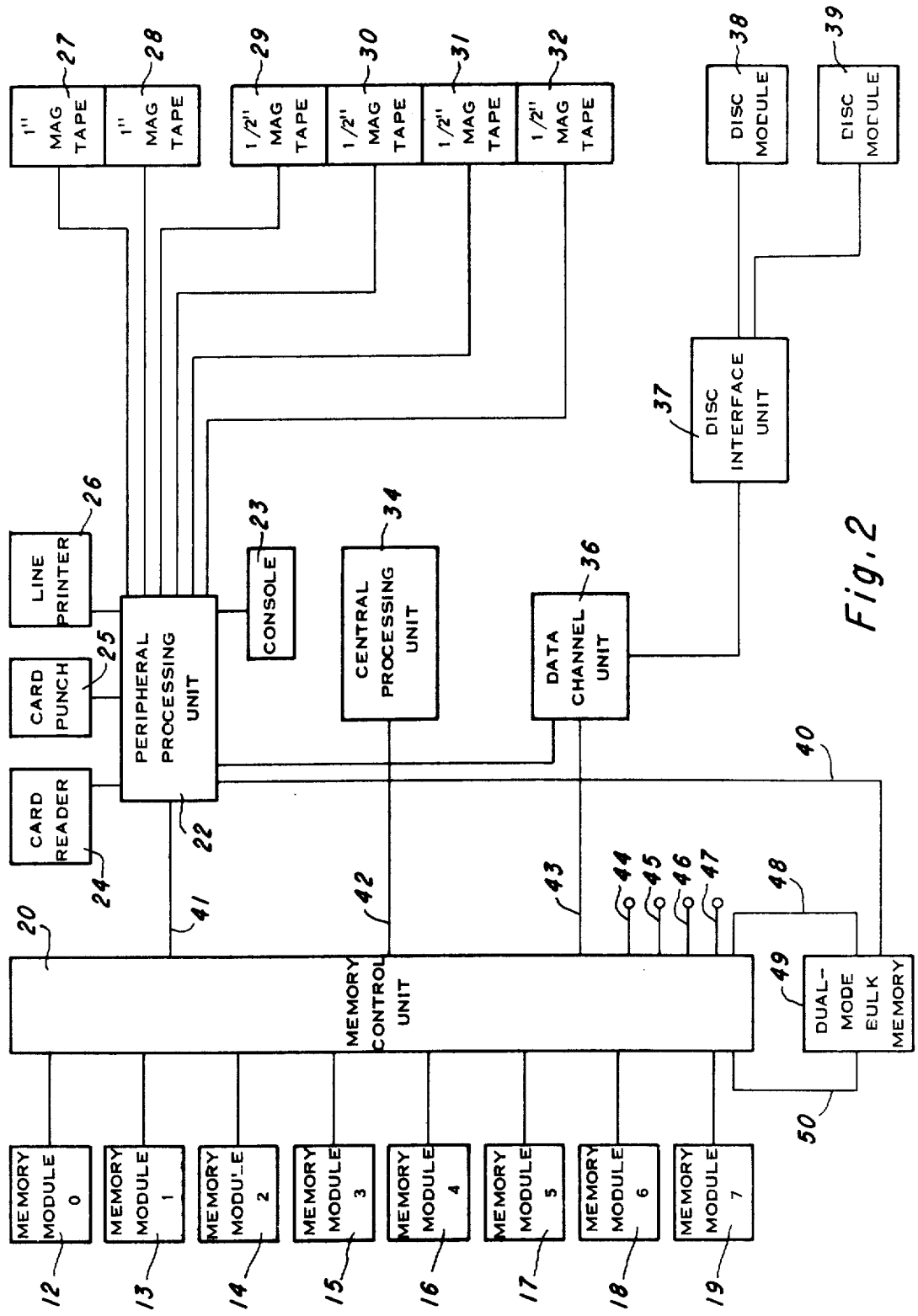
FIG. 2 is a block diagram of the system of FIG. 1.
Figure 3:
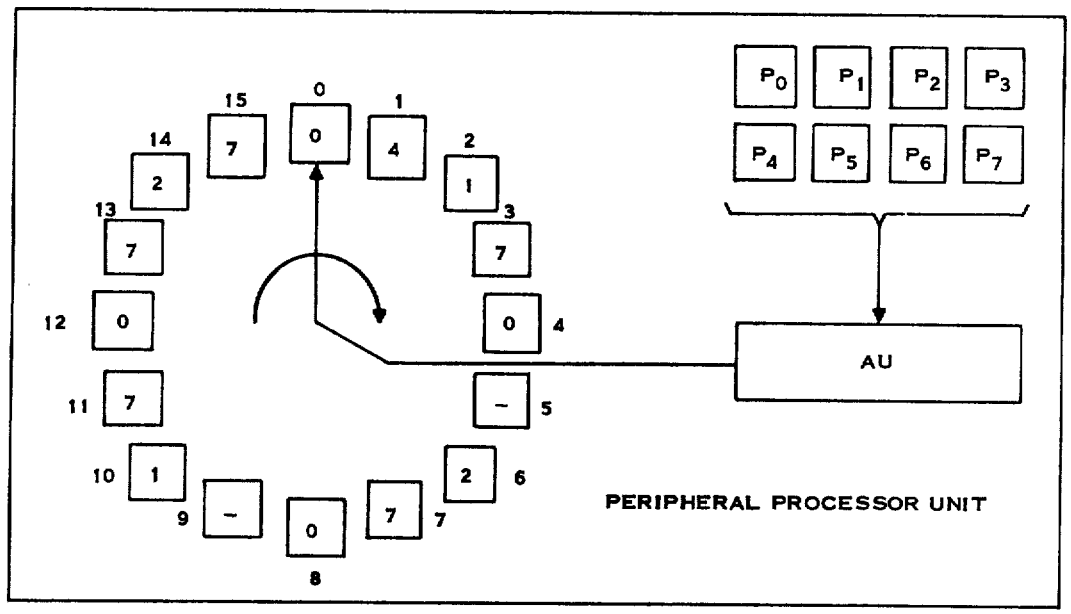
Figure 7:
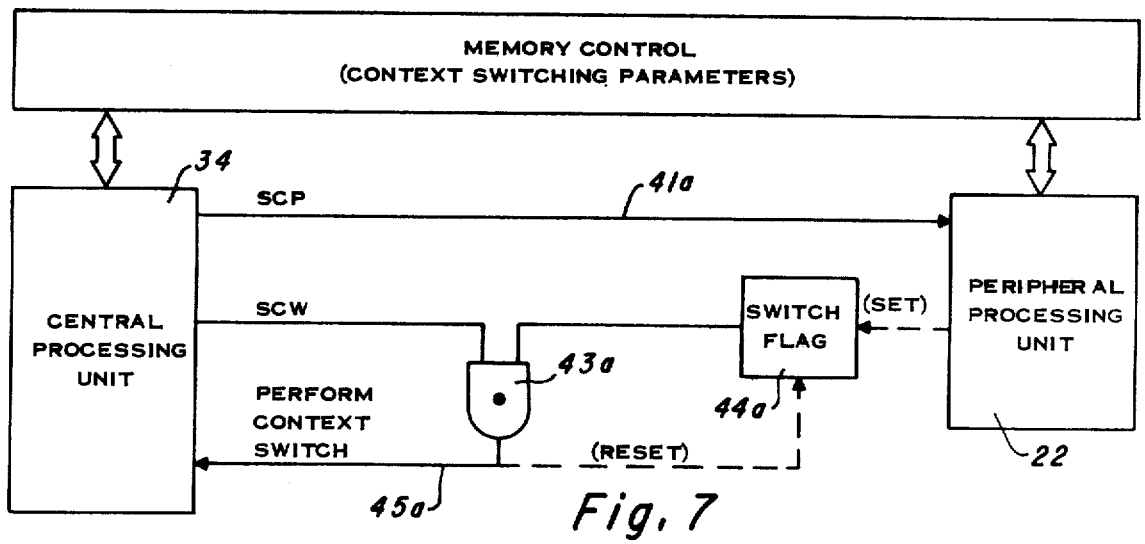
Figure 4:
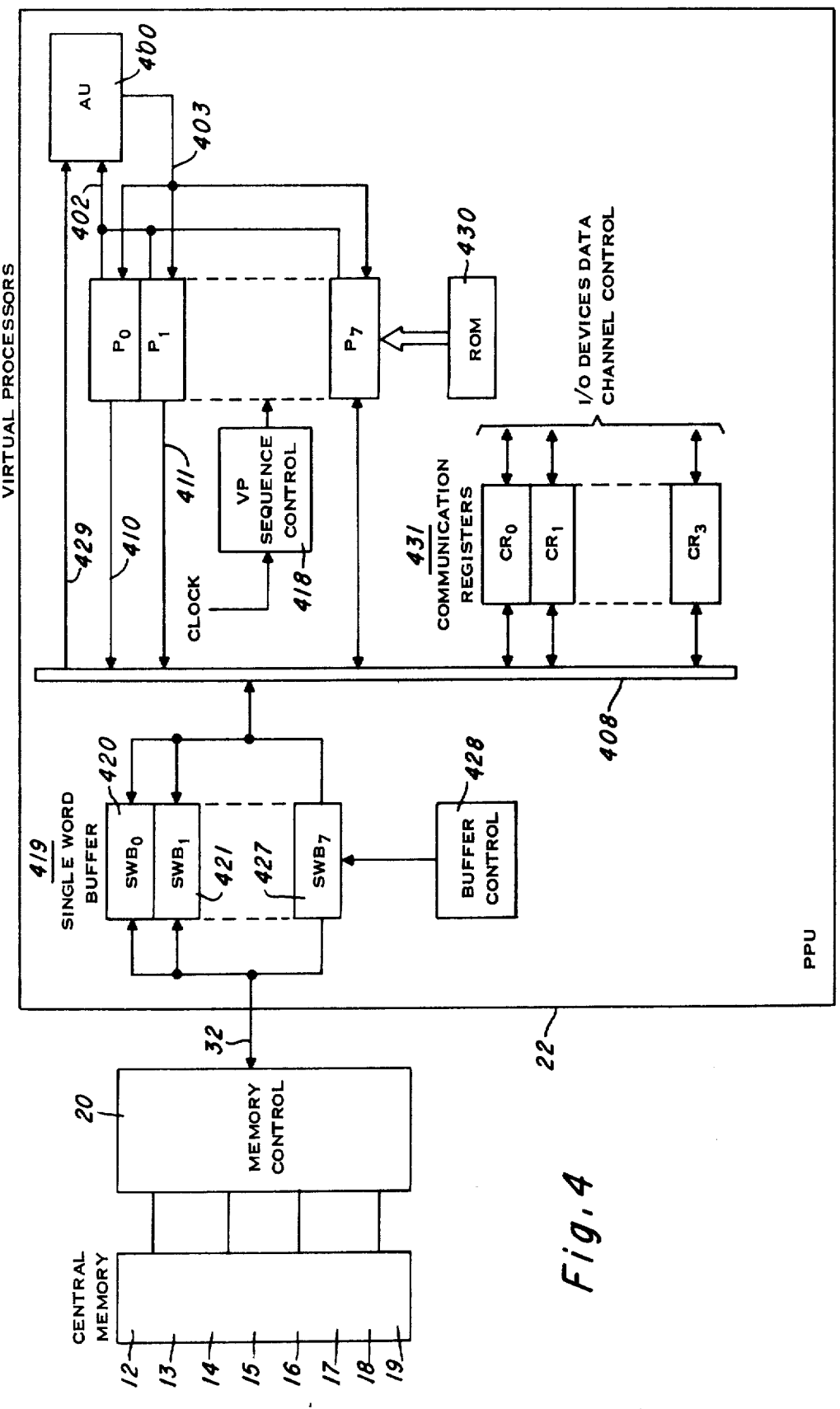
Figure 8:
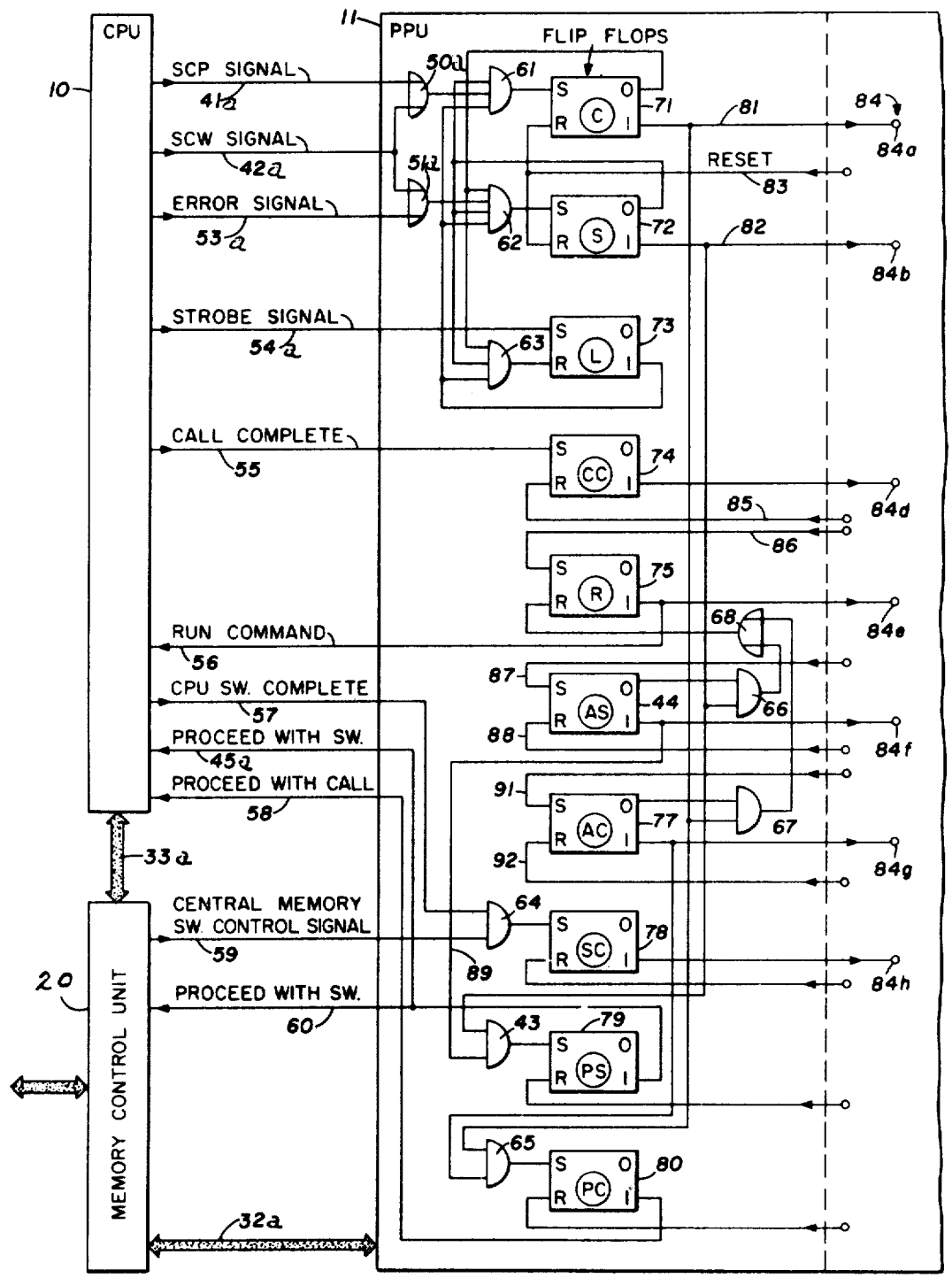
Figure 9:
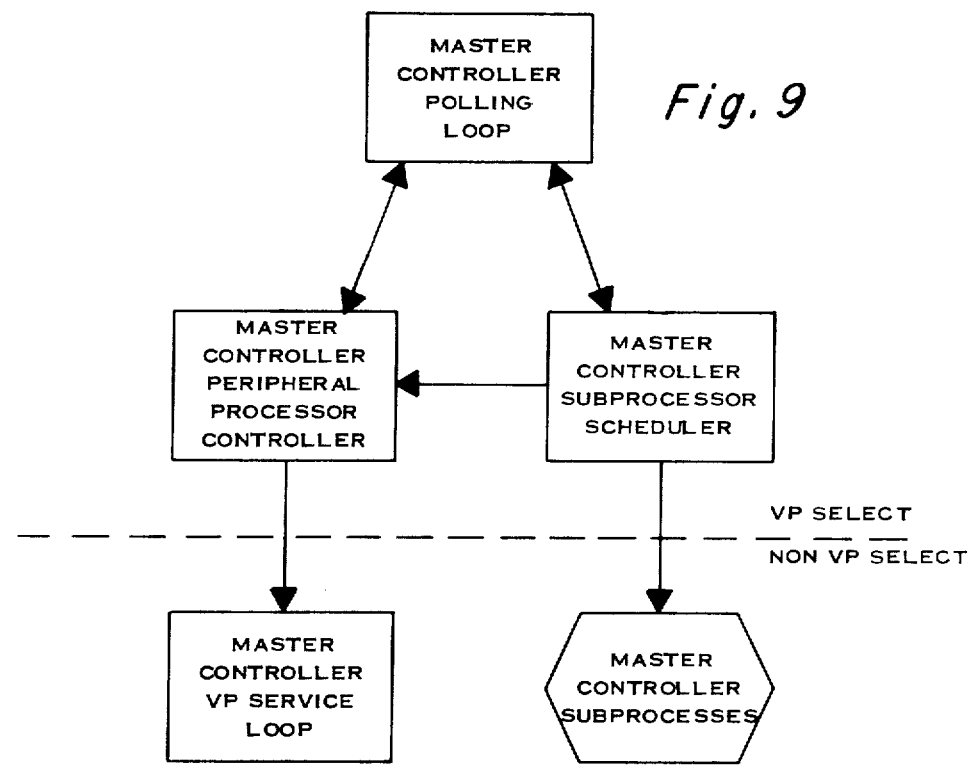
Figure 10:
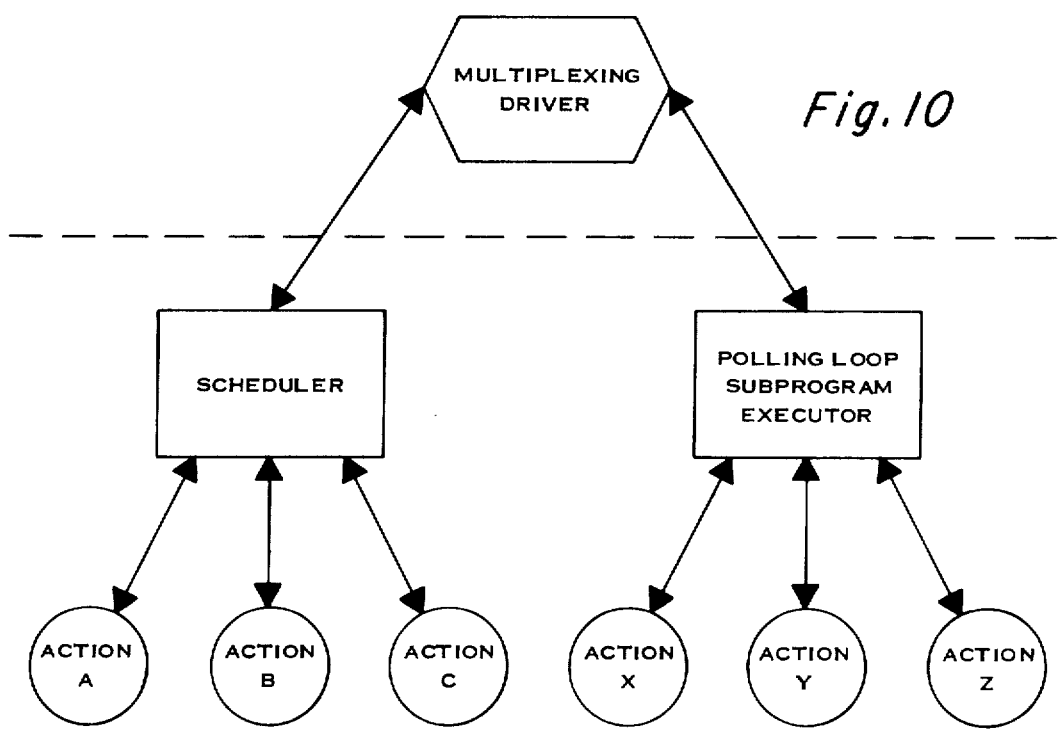
Figure 11:
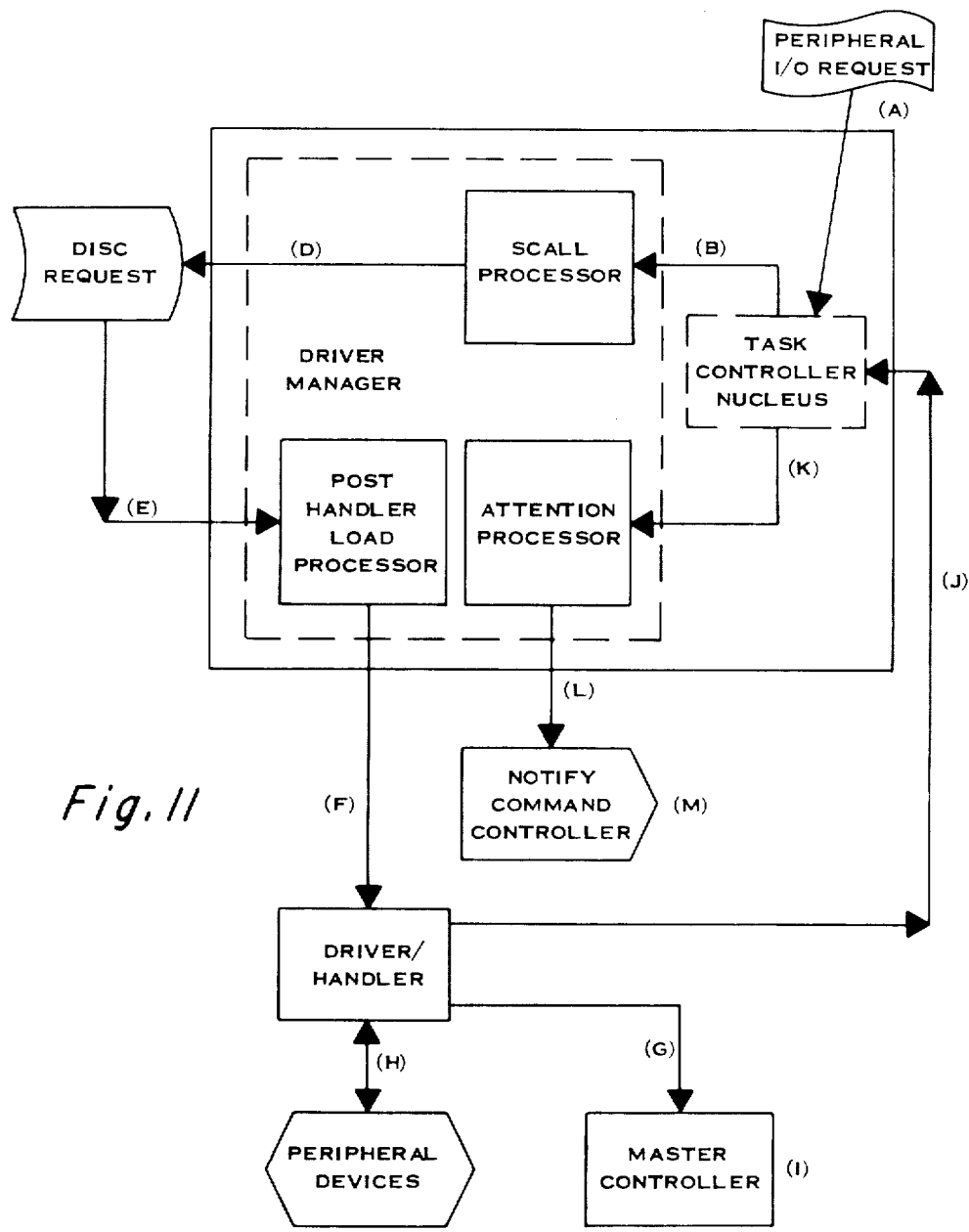
Figure 12:
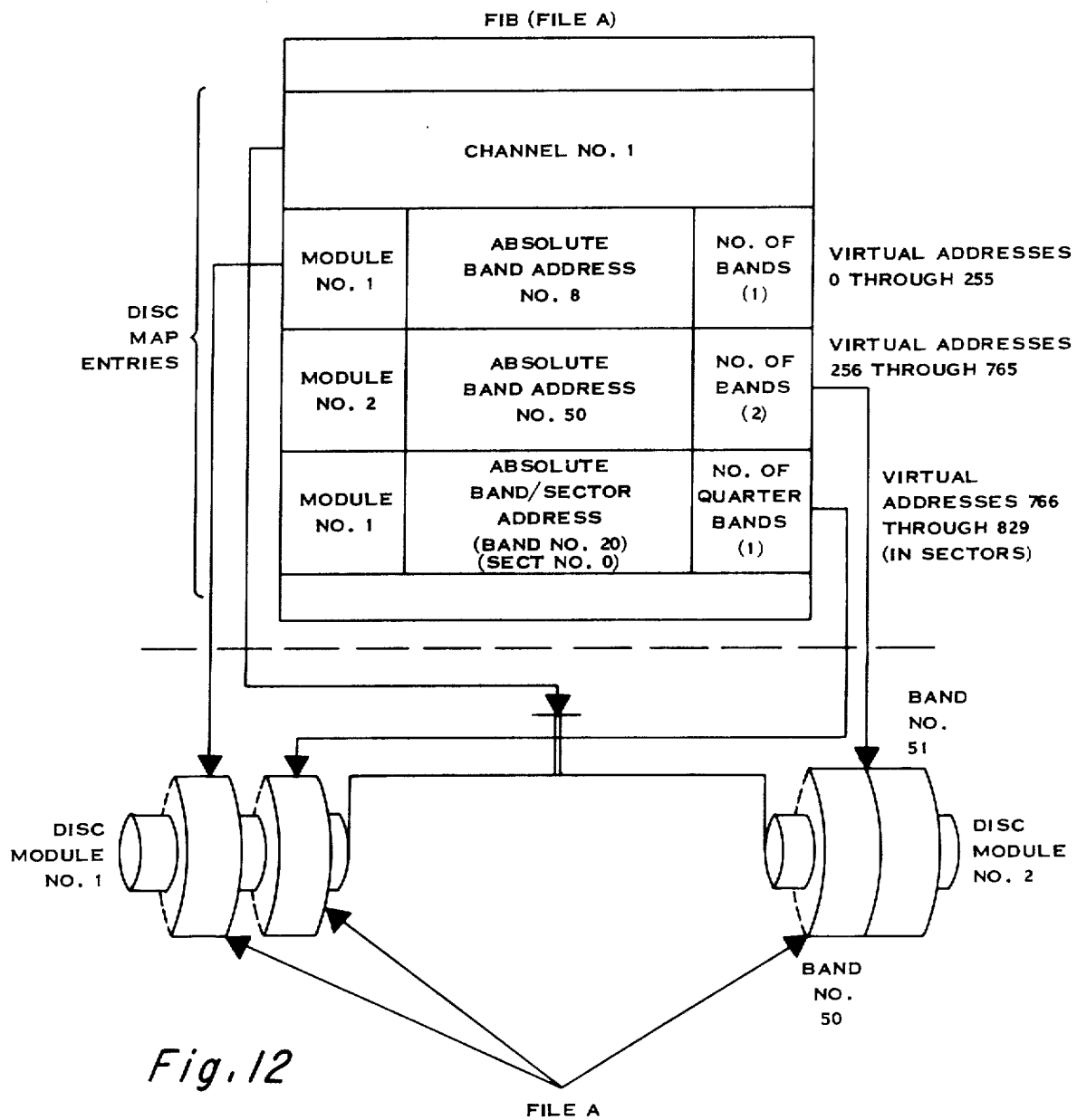
Figure 13:
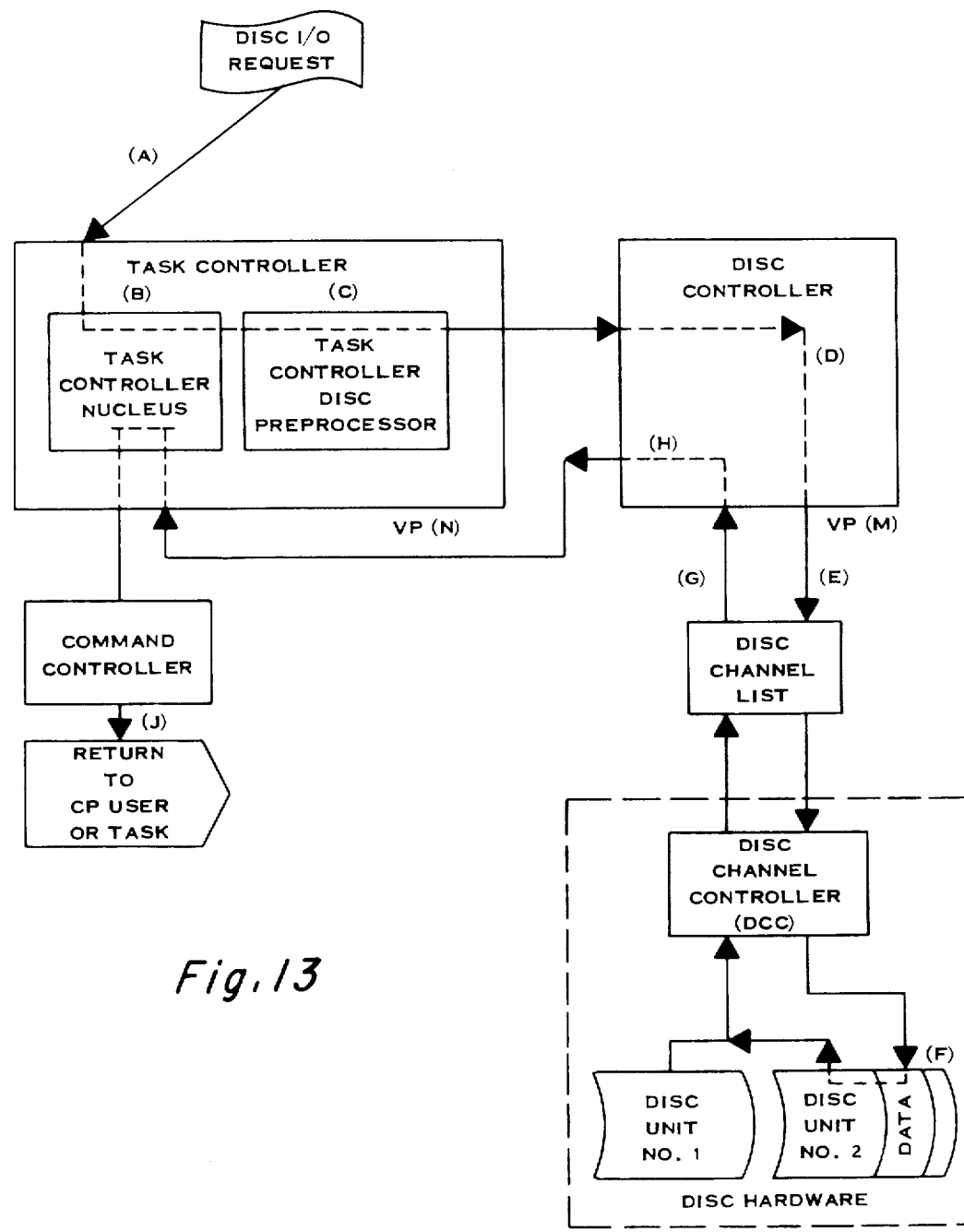
Figure 14:
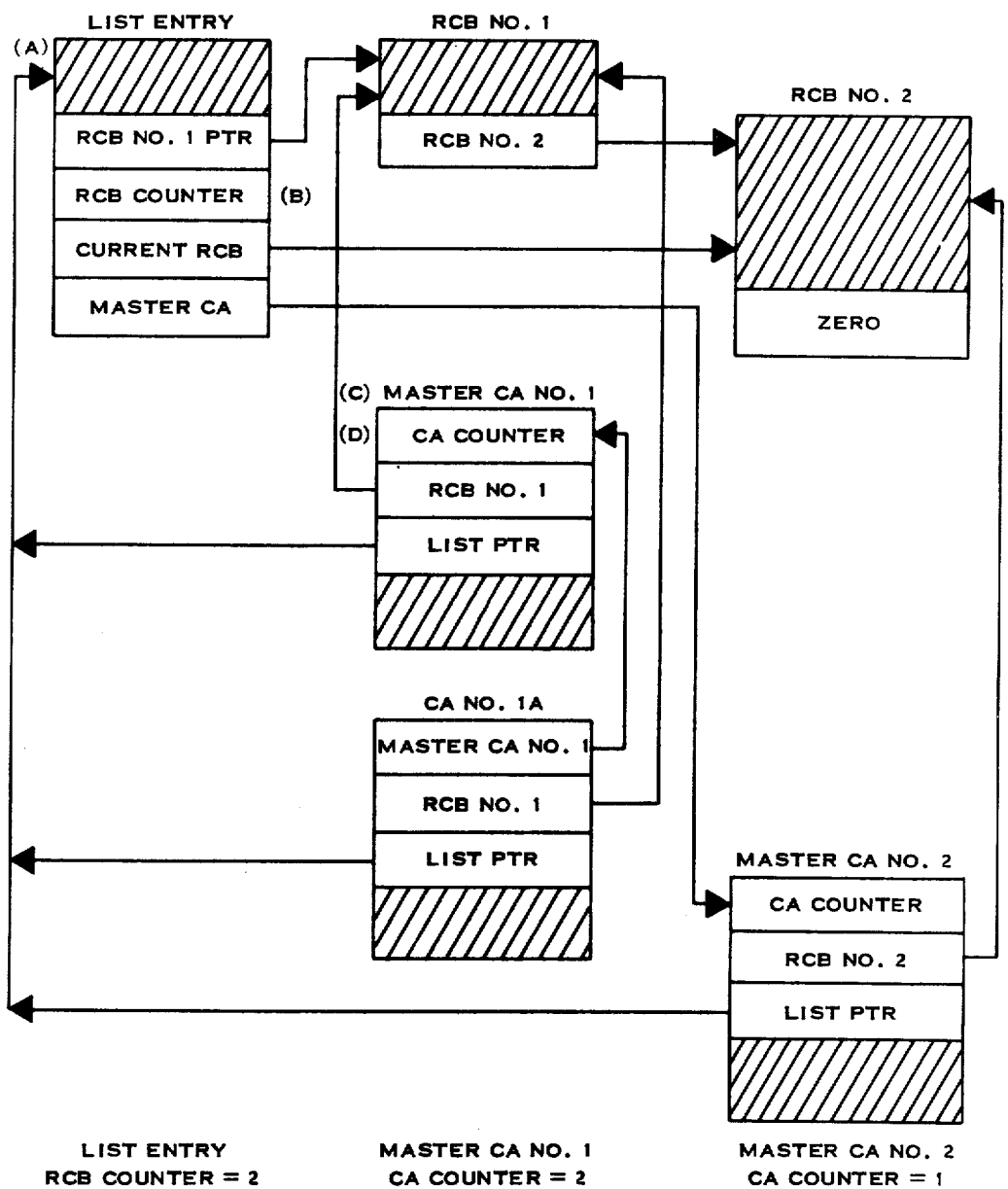
Figure 15:
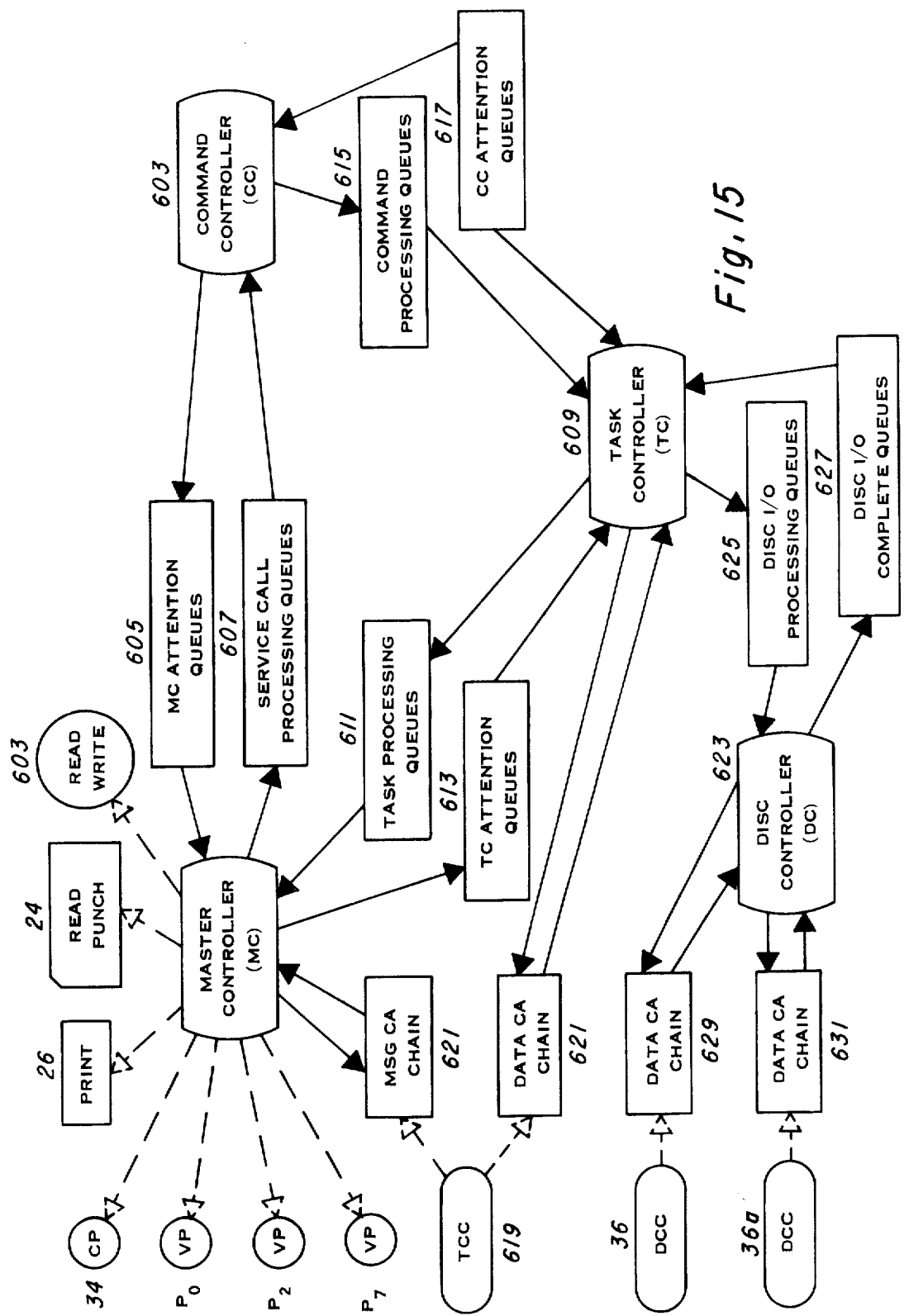

FIG. 3 diagrammatically illustrates timesharing of virtual processors in the peripheral processor of FIGS. 1 and 2;

FIG. 4 is a block diagram of the peripheral processor;

FIG. 5 illustrates access to a bit or cell within the communication register of FIG. 4;

FIG. 6 illustrates the virtual processor sequence control of FIG. 4;

FIG. 7 shows a block diagram of the context switching;

FIG. 8 shows the structure of the context switching;

FIG. 9 shows the structure of the Master Controller;

FIG. 10 shows the logical structure of the Command Controller;

FIG. 11 illustrates the interfaces involved for driver management from a peripheral I/O request which was initiated to the task controller;

FIG. 12 shows the relationship between the disc maps, the virtual disc addresses and the physical location of the file on disc;

FIG. 13 shows the disc input/output flow;

FIG. 14 illustrates the post request processor controls;

FIG. 15 is a block diagram of the control system.

The FIG. M series are as follows:

FIG. M1 shows the Master Controller;

FIGS. M2–M4 show the Master Controller Polling Loop;

FIGS. M5–M8 show the PP Controller;

FIGS. M9–M10 show the VP Service Loop;

FIGS. M11, M14 and M15 show the Task Prologue of the VP Service Loop;

FIGS. M12, M16 and M17 show the Task Wrap-Up of the VP Service Loop;

FIGS. M13, M18 and M19 show the Trap Wrap-Up of the VP Service Loop;

FIGS. M20–M38 show the CP Processors;

FIGS. M39–M42 show the Subprocess Scheduler;

FIGS. M43–M44 show the Timer List Processor;

FIG. M45 shows the Device Attention Processor;

FIG. M46 shows the Interactive Terminal Processors;

FIGS. M47–M48 show the TCC Communication Area Processor;

FIG. M49 shows the TCC Message Output Processor; and

FIGS. M50–M55 show the System Error Processing.

In The FIG. C series:

FIGS. C1–C8 show the Command Controller Polling Loop.

FIG. C9 shows the Device Attention Service Request List Processor.

FIG. C10 shows the Command Sequence Request List Processor.

FIGS. C11–13 show the Command Attention List Processor.

FIGS. C14–15 show the DIO Processing Complete List Processor.

FIGS. C16–17 show the TIO Processing Complete List Processor.

FIGS. C18–19 show the Driver Manager Processing Complete List Processor.

FIG. C20 shows the Breakpoint Processing Complete List Processor.

FIG. C21 shows the Page Allocation SAT Processor.

FIG. C22 shows the Page Deallocation SAT Processor.

FIG. C23 shows the Process Request Scheduling List Processor.

FIG. C24 shows the Sub-Program Scheduling List Processor.

FIG. C24 shows the Command Controller Entry Point.

FIG. C25 shows the Page Management Threshold Crossed Processor.

FIG. C26 shows the ENQ Request Processor.

FIG. C27 shows the Job Termination Initiation Processor.

FIG. C28 shows the Timer Service Request Processor.

FIGS. C29–31 show the Service Call Service Request Processor.

FIG. C32 shows the SAT.TDEL Processor.

FIGS. C33–34 show the SAT.JCAN Processor.

FIG. C35 shows the SAT.JOBT and SAT.EOJ Processor.

FIG. C36 shows the SAT.TCBR and SAT.TDBR Processor.

FIG. C37 shows the SAT.TCBA and SAT.TDBA Processor.

FIG. C38 shows the SAT.CPST Processor.

FIG. C39 shows the SAT.STTM Processor.

FIG. C42 shows the SAT.CSS Processor.

FIG. C42 shows the SAT.CSR Processor.

FIG. C43 shows the SAT.THPO Processor.
FIG. C44 shows the SAT.TRR Processor.
FIG. C45 shows the SAT.CERS Processor.
FIG. C46 shows the Command Controller Entry Point.
FIG. C47 shows the ENQ Request Processor.
FIG. C48 shows the Job Termination Initiation Processor.
FIG. C49 shows the Timer Service Request Processor.
FIGS. C50–53 show the Service Call Service Request Processor.
FIGS. C54–56 show the SAT.TDEL Processor.
FIGS. C51–61 show the SAT.JCAN Processor.
FIG. C62 shows the SAT.JOBT and SAT.EOJ Processor.
FIGS. C63–65 show the SAT.TCBR and SAT.TDBR Processor.
FIGS. C66–68 show the SAT.TCBA and SAT.TDBA Processor.
FIGS. C69–70 show the SAT.CPST Processor.
FIGS. C71–74 show the SAT.STTM Processor.
FIG. C75 shows the SAT.LIM Processor.
FIG. C76 shows the SAT.CSS Processor.
FIG. C77 shows the SAT.CSR Processor.
FIG. C78 shows the SAT.THPO Processor.
FIGS. C79–80 show the SAT.TRR Processor.
FIG. C81 shows the SAT.CERS Processor.
FIG. C82 shows the CCRELARG Command Controller Subroutine.
FIGS. C83–84 show the CCSC7500 Command Controller Subroutine.
FIG. C85 shows the CCSC8000 Command Controller Subroutine.
FIG. C86 shows the CSSCSREB Command Controller Subroutine.
FIG. C87 shows the CSSJCCHK Command Controller Subroutine.
FIG. C88 shows the CSSLNHLS Command Controller Subroutine.
FIGS. C88–89 show the CSSDLHLS Command Controller Subroutine.
FIGS. C90–91 show the CSSEMCHC Command Controller Subroutine.
FIGS. C92–94 show the CSSEMCHS Command Controller Subroutine.
FIGS. C95–96 show the CSSEMCHT Command Controller Subroutine.
FIG. C97 shows the CCEMGMSR Command Controller Subroutine.
FIG. C98 shows the CCEMCCAN Command Controller Subroutine.
FIG. C99 shows the BGNCSRTN Command Controller Subroutine.
FIG. C100 shows the LNHLS Procedure.
FIG. C101 shows the DLHLS Procedure.
FIG. C102 shows the CHEMC, CHEMS, CHEMT Procedure.
FIG. C103 shows the BGNCS Procedure.
FIGS. C104–108 show the Device Attention Service Request List Processor.
FIGS. C109–112 show the Command Sequence Request List Processor.
FIGS. C113–114 show the DIO Processing Complete List Processor.
FIG. C115 shows the TIO Processing Complete List Processor.
FIG. C116 shows the Driver Manager Processing Complete List Processor.
FIGS. C117–118 show the Breakpoint Processing Complete List Processor.
FIGS. C119–120 show the Page Allocation SAT Processor.
FIG. C121 shows the Page Deallocation SAT Processor.
FIGS. C122–126 show the Process Request Scheduling List Processor.
FIG. C127 shows the Sub-Program Scheduling List Processor.
FIGS. C128–129 show the CCACTCOM Command Controller Subroutine.
FIGS. C130–131 show the CCPD1000 Command Controller Subroutine.
FIG. C132 shows the RSBST, RDQST, RFNCD, RPRIO Procedure.
FIG. C133 shows the WSBST, WRQST, WFNCD, WPRIO Procedure.

In The FIG. T Series
FIG. T-1 shows the Task Controller Polling
FIGS. T-2/T-5 show the Task Request Lists Processor
FIGS. T-6/T-14 show the Task Complete List Processor
FIGS. T-15/T-16 show the DIO Processor
FIGS. T-17/T-18 show the Large Memory Request List Processor
FIGS. T-19/T-20 show the Terminal I/O Processor
FIG. T-21 show the Breakpoint Complete List Processor
FIG. T-22 shows the Breakpoint Request List Processor
FIG. T-23 shows the Command Controller
FIGS. T-24/T-37 shows the Page Management
FIGS. T-38, T-40/T-42 show the CM BLock Allocator
FIG. T-39 shows the Controller CM Allocator
FIGS. T-43/T-44 show the Cell Allocator
FIGS. T-45/T-47 show the Internal Memory Allocator
FIGS. T-48/T-53 show the CM Block/Cell Deallocator
FIGS. T-54/T-56 show the Convert Block to Cell
FIGS. T-57/T-59 show the Lock/Free In order to describe the present invention an advanced scientific computer system of which the present invention forms a part, will first be described generally, and then individual components in the role of the present invention and its interaction with other components of the system will be explained.

Referring now to FIG. 1, the computer system includes a central processing unit (CPU) 34 and a peripheral processing unit (PPU) 22. Memory is provided for both CPU 34 and PPU 22 in the form of eight modules of active element random access memory units 12-19. Such storage units may be of the type known in the art. In the form illustrated, each of the storage modules provides 16, 384 32-bit words.

The memory provides for 140 nanosecond cycle time, and on the average, 120 nanosecond access time. Each memory access results in the transfer of information in groups of 8 32-bit words, hereafter referred to as an octet. Thus, each memory module 12-19 is partitioned into 2048 octets.

In addition to storage modules 12-19, rapid access disc storage modules 38 and 39 are provided wherein the access time on the average is about 16 milliseconds.

A memory control unit 20 is provided for control of memory operations, access and storage.

A card reader 24 and a card punch unit 25 are provided for input and output. In addition, tape units 27-32 are provided for input/output (I/O) purposes as well as storage. A line printer 26 is also provided for output service under the control of the PPU 22. The elements of the computer are interconnected by cables.

It is to be understood that the processor system thus has a memory or storage hierarchy of five levels. The most rapid access storage is in the CPU 34 which has nine octet buffers, each octet consisting of 256 bits. The next most rapid access is in the active element memory units 12-19. The next most rapid access is in the bulk memory extension 49. The next most available storage is the disc storage units 38 and 39. Finally, the tape units 27-32 complete the storage array.

A twin-cathode-ray tube (CRT) monitor console 23 is provided. The console 23 consists of two adapted CRT-keyboard terminal units which are operated by the PPU 22 as input/output devices. It can also be used through an operator to command the system for both hardware and software checkout purposes and to interact with the system in an operational sense permitting the operator through the console 23 to interrupt a given program at a selected point for review of any operation, progress or results, and then to determine the succeeding operation. Such operations may involve the further processing of the data or may direct the unit to undergo a transfer in order to operate on a different program or on different data.

There will now be described in a general manner the organization of the computer system by reference to FIG. 2. Memory modules 12-19 are controlled by the memory control unit 20 in order to input or output octets of data to and from the memory modules. Memory control unit 20 provides gating, mapping and protection of the data within the memory stacks as required.

A signal bus 43 extends between the memory control 20 and data channel unit 36 which is connected to the discs 38 and 39 by way of a disc interface unit 37. Each disc module has a capacity of 25 million words. The data channel unit 36 and the disc interface unit 37 support the disc units 38 and 39. The data channel unit 36 is a simple wired program computer capable of moving data to and from memory discs 38 and 39 through the disc interface unit 37. Upon command only, the data channel unit 36 may move memory data from the discs 38 and 39 via the bus 43 through the memory control unit 20 to the memory modules 12-19 or to the memory extension 49.

Bidirectional channels extend between each disc 38 and 39 and the disc interface unit 37. One data word at a time is transmitted between a disc unit 38 and 39 and the data channel unit 36 through the disc interface 37. Data from memory stacks 12-19 are transmitted to and from data channel 36 in the memory control unit 20 in eight-word blocks.

A single bus 41 connects the memory control unit 20 with the PPU 22. PPU 22 operates all I/O devices except the discs 38 and 39. Data from the memory modules 12-19 are transferred to and from the PPU 22 via a memory control unit 20 in eight word blocks. When a read occurs from memory, a read/restore is carried out in the memory stacks 12-19. The eight words are funneled down in the PPU 22 with only one of the eight words being used within the PPU 22 at a time. Such "funnelling down" of data words within the PPU 22 is desirable because of the relatively slow usage of data required by the PPU 22 and the I/O devices as compared with the CPU 34. A typical available word transfer rate for an I/O device controlled by the PPU 22 is about 100 kilowords per second.

The PPU 22 contains eight virtual processors therein, the majority of which may be programmed to operate various ones of the I/O devices as required. The tape units 27 and 28 operate a 1 inch wide magnetic tape, while tape units 29-32 operate with ½ inch magnetic tapes to enhance the capabilities of the system.

The virtual processors in the PPU 22 take instructions from the central memory and operate upon these instructions. The virtual processors include program counters and a time-shared arithmetic unit in the peripheral processing unit. The virtual processors execute programs under instruction control. The PPU 22 and the virtual processors are described in more detail in U.S. Pat. No. 3,573,852 for "Variable Time Slot Assignment of Virtual Processors", assigned to Texas Instruments Incorporated.

The PPU 22 operates upon the program contained in memory and executed by virtual processors in an efficient manner and additionally provides monitoring controls to the programs being run in the CPU 34.

CPU 34 is connected to memory stacks 12-19 through the memory control 20 via a bus 42. The CPU 34 may utilize all eight words in an octet provided from the memory modules 12-19. Additionally, the CPU 34 has the capability of reading or writing any combination of those eight words. Bus 41 handles three words every 60 nanoseconds, two words input to the CPU 34 and one word output to the memory control unit 20.

Buses 44-47 are provided from the memory control unit 20 to be utilized when the capabilities of the computer system are to be enlarged by the addition of other processing units and the like.

Each of the buses 41-48 is independently gated through the memory control unit 20 to each memory module 12-19 thereby allowing memory cycles to be overlapped to increase processing speed. A fixed priority preferably is established in the memory controls to service conflicting requests from the various units connected to the memory control unit 20. The internal memory control unit 20 is given the highest priority with the external buses 43, 41, 42, 43 and 44-47 being serviced in that order. The external bus processor connectors are identical, allowing the processors to be arranged in any other priority order desired.

The dual mode bulk memory unit 49 is connected to the memory control unit 20 by means of buses 50 and 48. The maximum data rates over busses 48 and 50 is 40 megawords per second. Data in the dual mode bulk memory unit 49, transferred bia bus 50, is in the address space of the high speed memory modules 12-19, and randomly accessed, 8 words per fetch cycle. Data may be moved to and from the dual mode bulk memory unit 49 via bus 50 in a random access fashion from any processor located on buses 41-48 which includes the bulk memory unit itself. Blocks of contiguous data are moved to and from the dual mode bulk memory unit 49 over bus 48 to and from any memory module 12-19 by control of a data channel built into the bulk memory unit 49. The data channel unit built into the bulk memory unit 49 is initiated by the PPU22 by communication via bus 40.

In typical operation, programs awaiting execution on the discs 38 and 39 are moved by control of the data channel unit 36 through bus 43 by way of memory control unit 20 and through bus 50 to the dual mode bulk memory unit 49. When storage becomes available in the high speed memory, consisting of modules 12–19, regions of data can be transferred at 40 megawords per second from the bulk memory unit 49 by way of bus 48 under control of the memory control unit 20 to any one of the memory modules 12–19. This action is controlled exclusively by the PPU22.

The PPU22 in the present system is able to anticipate the need and supply demands of the CPU34 and other components of the system generally by utilization of the particular form of control for time-sharing as between a plurality of virtual processors within the PPU22. More particularly, programs are to be processed by a collection of virtual processors within the PPU22. Where the programs vary widely, it becomes advantageous to deviate from unpartial time-sharing as between virtual processors.

In the system shown in FIG. 3, some virtual processors may be greatly favored in allocation of processing time within the PPU22 over other virtual processors by the multiprocessor control system. Further, provision is made for changing frequently and drastically the allocation of time as between the processors.

FIG. 3 indicates that the virtual processors $P_0$–$P_7$ in the PPU22 are serviced by the arithmetic unit AU400 of PPU22.

The general concept of cooperation on a time-sharing sense, as between an arithmetic unit, such as unit 400 and virtual processors such as processors $P_0$–$P_7$ is known. The system for controlling such a configuration is described herein. The processors $P_0$–$P_7$ are virtual processors occupying sixteen time slots. The construction of the present system provides for variable control of the time allocations in dependence upon the nature of the task confronting the overall computer system. $P_0$ is a dedicated processor in which the master controller executes at all times.

In FIG. 3, eight virtual processors $P_0$–$P_7$ are employed in PPU22. The arithmetic unit 400 of PPU22 is to be made available to the virtual processors one at a time. More particularly, one virtual processor is channeled to the arithmetic unit 400 with each clock pulse. The selections from among the virtual processors is performed by a sequencer diagramatically represented by switch 401. The effect of a clock pulse represented by a change in position of the switch 401 is to actuate the arithmetic unit 400 which is coupled to the virtual processors in accordance with the code selected for time slots 0–15. Only one virtual processor may be used to the exclusion of all the others at one extreme. At the other extreme, the virtual processors might share the time slots equally. The system for providing this flexibility is shown in FIGS. 4–6.

FIG. 4. The organization of the PPU22 is shown in FIG. 4. The central memory 12–19 is coupled to the memory control unit 20 and then to channel 32. Virtual processors $P_0$–$P_7$ are connected to the arithmetic unit 400 by means of a bus 402 with the arithmetic unit 400 communicating back to the virtual processors $P_0$–$P_7$ by way of bus 403. The virtual processors $P_0$–$P_7$ communicate with the internal bus 408 of the PPU22 by way of channels 410–417. A buffer unit, 419, having eight single word buffer registers 420–427 is provided. One register is exclusively assigned to each of the virtual processors $P_0$–$P_7$. The virtual processors $P_0$–$P_7$ are provided with a sequence control unit with the sequence control unit 418 in which implementation of the switch 401 of FIG. 3 is located. Control unit 418 is driven by clock pulses. The buffer unit 419 is controlled by a buffer control unit 428. The channel 429 extends from the internal bus 408 to the arithmetic unit 400.

The virtual processors $P_0$–$P_7$ are provided with a fixed, read-only memory 430 known in the art. In the preferred embodiment of the invention, the read-only memory 430 is made up of pre-wired, diode array programs for rapid access.

A set of 64 communication registers 431 is provided for communicating between the bus 408, the I/O devices, and the data channels. In this embodiment of the system, the communication registers are provided in the unit 431.

The shared elements include the arithmetic unit 400, the read-only memory 430, the file of communication registers 431 and the single word buffer 419 which provide access to central memory units or modules 12–19.

The read-only memory 430 contains a pool of programs and is not accessed except by reference from the program counters of the virtual processors. The pool excludes a skeletal executive program and at least one control program for each I/O device connected to the system. The read-only memory 430 has an access time of 20 nanoseconds and provides 32-bit instructions to the virtual processors $P_0$–$P_7$. Total program space in the read-only memory 430 is 1024 words. The memory is organized into 256 word modules so that portions of the programs can be modified without complete re-fabrication of the memory.

The I/O device programs may include control functions for the device storage medium as well as data transfer functions. Thus, motion of mechanical devices can be controlled directly by the program rather than by highly special purpose hardware for each device type. Variations to a basic program are provided by parameters supplied by the basic problem. Such parameters are carried in central memory units 12–19 or in the accumulator registers of the virtual processor executing the program.

The source of instructions for the virtual processors may be either read-only memory 430 or central memory modules 12–19. The memory being addressed from the program counter in a virtual processor is controlled by the addressing mode which can be modified by the branch instruction, or by clearing the system. Each virtual processor is placed in the read-only memory mode when the system is cleared.

When a program sequence is obtained from central memory, it is acquired via the buffer 419. Since this is the same buffer used for data transfer to or from central memory 12–19 and since central memory access is slower than read-only memory access, execution time is more favorable when a program is obtained from read-only memory 430.

Time slot zero may be assigned to one of the eight virtual processors by a switch on the control maintenance panel. This assignment cannot be controlled by the program. The remaining time slots are initially unassigned. Therefore, only the virtual processors selected by the maintenance panel switch operate at the outset. Furthermore, since program counters in each of $P_0$–$P_7$ are initially cleared, selected virtual processor begins executing program from address zero of read-only memory 430 which contains a starter program typically known as a bootstrap. The selection switch on the maintenance panel also controls switch one of the eight bits in the file 431 is set by a bootstrap signal initiated by the operator.

The buffer 419 provides the virtual processors access to central memory modules 12-19. The buffer 419 consists of eight 32-bit data registers, eight 24-bit address registers and controls. Viewed by a single processor, the buffer 419 appears to be only one memory data register and one memory address register. At any given time, the buffer 419 may contain up to eight memory requests, one for each virtual processor. These requests preferably are processed on a combined basis of fixed priority, and first-in first-out priority. Preferably, four priority levels are established, and if two or more requests of equal priority are unprocessed, at any time, they are handled on a first-in, first-out basis.

When a request arrives at the buffer 419, it automatically has a priority assignment determined by the memory modules 12-19 arranged in accordance with virtual processor numbers and all requests from a particular processor receive the priority encoded in two bits of the priority file. The contents of the file are programmed by the executive program and the priority code assignment for each virtual processor is a function of the program to be executed. In addition to these two priority bits, a time tag may be employed to resolve cases of equal priority. The registers 431 are each of 32-bits. Each register is addressable from the virtual processors and can be read or written by the device to which it connects. The registers 431 provide the control and data links to all peripheral equipment including the system console. Some parameter switch control system functioning are also stored in the communication registers 431 from which control is exercised through the stored program controllers. FIG. 5: each cell in register 431 has two sets of inputs as shown in FIG. 5. One set is connected into the PPU22 and the other set is available for use by the peripheral device. Data from the PPU22 is always transferred into the cell in synchronism with the system clock. The gate for riding into the cell from the external device may be generated by the device interface, and not necessarily synchronously with the system clock.

FIG. 6. FIG. 6 illustrates structure which will permit allocation of a preponderance of the time available to one or more virtual processors $P_0$-$P_7$ in preference to the others or to allocate equal time.

Control of the time slot allocation has between processors $P_0$-$P_7$ is by means of two of the communication registers 431. Registers $431_n$ and $431_m$ are shown in FIG. 6. Each 32-bit register is divided into eight segments of four bits per segment. For example, the segment 440 of register $431_n$ has four bits $a$-$b$ which are connected to AND gates 441-444 respectively. The segment 445 has four bits $a$-$b$ connected to AND gates 446-449 respectively. The first AND gates for all groups of four or the gates for all the "$a$" bits, namely AND gates 441 and 446, etcetra, are connected to one input of an OR gate 450. The gates for the "$b$" bits in each group are connected to OR gates to an OR gate 451 the third to OR gate 452, the fourth to OR gate 453.

The outputs of the OR gates 450-453 are connected to the register 454 whose output is applied to a decoder 455. Eight output decoder lines extend from the decoder 455 to control the inputs and the outputs of each of the virtual processors $P_0$-$P_7$.

The sequence control unit 418 is fed by clock pulses on channel 460. The sequence control 418 functions as a ring counter of 16 stages with an output from each stage. In the present case, the first output line 461 from the first stage is connected to one input of each of AND gates 441-444. Similarly, the output line 462 is connected to the AND gates 446-449. The remaining 14 lines from sequencer 418 are connected to successive groups of four AND gates.

Three of the four bits 440, the bits $b$, $c$ and $d$, specify one of the virtual processors $P_0$-$P_7$ by a suitable state on the line of the output of decoder 455. The fourth bit, bit $a$, is employed to either enable or inhibit any decoding for a given set, depending upon the state of bit $a$, thereby permitting a given time slot to be unassigned.

It will be noted that the arithmetic unit 400 is coupled to the register $431_n$ and $431_m$ as by channels 472 whereby the arithmetic unit 400 under the control of the program, will provide the desired allocations in the registers $431_n$ and $431_m$. In this response, thus in response to the clock pulses on line 460 the decoder 455 may be stepped on each clock pulse from one virtual processor to another depending on the contents of the register $431_n$ and $431_m$ the entire time may be devoted to one of the processors or may be divided equally or as unequally as the codes in the registers $431_n$ and $431_m$ determine.

Turning now to the control lines leading from the output of the decoder 455, it is to be understood at this point that the logic leading from the registers $431_n$ and $431_m$ to the decoder have been illustrated at the bit level. In contract, the logic leading from the decoder 455 to the arithmetic unit 400 for control of the virtual processors $P_0$-$P_7$ is shown, not at the bit level, but at the total communication level between the processors $P_0$-$P_7$ and the arithmetic unit 400.

Code lines 463-470 extend from decoder 455 to the units $P_0$-$P_7$, respectively.

The flow of processor data on channels 478 is enabled for inhibited by states on lines 463-470. More particularly, channel 463 leads to an AND gate 490 which is also supplied by channel 478. An AND gate 500 is in the output channel of $P_0$ and it is enabled by a state on line 473. Similarly, gates 491-497 and gates 501-507 control virtual processors $P_1$-$P_7$.

Gates 500-507 are connected through OR gate 408 to the arithmetic unit 400 for flow of data thereto. By this means, only one of $P_0$-$P_7$ operates at any one time and the time is proportioned by the contents of the cells 440-445 etcetra as clocked by the sequencer 418.

FIG. 7 illustrates in block diagram, the interface circuitry between the PPU22 and the CPU34 to provide automatic context switching of the CPU while "looking ahead" in time in order to eliminate time consuming dialog between the PPU22 and CPU34. In operation, the CPU34 executes user programs on a multi-program basis. The PPU22 services requests by the programs being executed by the CPU34 for input and output services. The PPU22 also schedules the sequence of user programs operated upon by the CPU34.

More particularly, the user programs being executed within the CPU34 requests I/O service from the PPU22 by either a "system call and proceed" (SCP) command or a "system call and wait" (SCW) command. The user program within the CPU34 issues one of these commands by executing an instruction which corresponds to the call. The SCP command is issued by a user program when it is possible for the user program to proceed without waiting for the I/O service to be provided but while it proceeds, the PPU22 can secure or arrange new data or a new program which will be required by the CPU in future operations. The PPU22 then provides the I/O service in due course to the CPU34 for use by the user program. The SCP command is applied by way of the signal path 41a to the PPU22.

The SCW command is issued by a user program within the CPU34 when it is not possible for the program to proceed without the provision of the I/O service from the PPU22. This command is issued via line 42a. In accordance with the present invention the PPU22 constantly analyzes the programs contained within the CPU34 not currently being executed to determine which of these programs is to be executed next by the CPU34. After the next program has been selected, the switch flag 44a is set. When the program currently being executed by the CPU34 reaches a state wherein SCW request is issued by the CPU34, the SCW command is applied to line 44a to apply a perform context switch signal on line 45a.

More particularly, a switch flag unit 44a will have enabled the switch 43a so that an indication of the next program to be executed is automatically fed via line 45a to the CPU34. This enables the next program or program segment to be automatically picked up and executed by the CPU34 without delay generally experienced by interrogation by the PPU22 and a subsequent answer by the PPU22 to the CPU34. If, for some reason, the PPU22 has not yet provided the next program description, the switch flag 44a will not have been set and the context switch would be inhibited. In this event, the user program within the CPU34 that issued the SCW call would still be in the user processor but would be in an inactive state waiting for the context switching to occur. When context switching does occur, the switch flag 44a will reset.

The look ahead capability provided by the PPU22 regarding the user program within the CPU34 not currently being executed enables context switching to be automatically performed without any requirement for dialog between the CPU34 and the PPU22. The overhead for the CPU34 is dramatically reduced by this means, eliminating the usual computer dialog.

Having described the context switching arrangement between the central processing unit 34 and the peripheral processing unit 22 in a general way, reference should now be had to FIG. 8 wherein a more detailed circuit has been illustrated to show further details of the context switching control arrangement.

In FIG. 8, the CPU34, the PPU22 and the memory control unit 20 have been illustrated in a functional relationship. The CPU34 produces a signal on line 41a. This signal is produced by the CPU34 when, in the course of execution of a given program, it reaches a SCP instruction. Such a signal then appears on line 41a and is applied to an OR gate 50a.

The CPU may be programmed to produce an SCW signal which appears on line 42a. Line 42a is connected to the second input or OR gate 50a as well as to the first input of an OR gate 51.

A line 53 extends from CPU34 to the second input of OR gate 51. Line 53 will provide an error signal in response to a given operation of the CPU34 in which the presence of an error is such as to dictate a change in the operation of the CPU. Such change may be, for example, switching the CPU from execution of a current program to a succeeding program.

On line 54, a strobe signal may appear from the CPU34. The strobe signal appears as a voltage state which is turned on by the CPU after any one of the signals appear on lines 41a, 42a or 53.

The presence of a signal on either line 41a or 42a serves as a request to the PPU22 to enable the CPU34 to transfer a given code from the program then under execution in the CPU34 into the memory through the memory control unit 20 as by way of path 33a. The purpose is to store a code in one cell reserved in central memory 12–19 (FIG. 1) for such interval as is required for the PPU22 to interrogate that cell and then carry out a set of instructions dependent upon the code stored in the cell. In the present system, a single word location is reserved in memory 12–19 for use by the system in the context switching and control operation. The signal appearing on line 55 serves to indicate to the PPU22 that a sequence, initiated by either an SCP signal on line 44a or an SCW signal on line 42a, has been completed.

On line 56 a run command, a signal is applied from the PPU22 to the CPU34 and, as will hereinafter be noted, is employed as a means for stopping the operation of the CPU34 when certain conditions in the PPU22 exist.

A signal appears on line 57 which is produced by the CPU in response to a SCW signal on line 42a or an error signal on line 53. The PPU22 initiates a series of operations in which the CPU34, having reached a point in its operation where it cannot proceed further, is caused to transfer to memory a code representative of the total status of the CPU34 at the time it terminates its operation on that program. Further, after such storage, an entirely new status is switched into CPU34 so that it can proceed with the execution of a new program. The new program begins at the status represented by the code switched thereinto. When such a signal appears on line 57, the PPU22 is so conditioned as to permit response to the succeeding signal on lines 41a, 42a or 53. As will be shown, the PPU22 then monitors the state appearing on line 57 and in response to a given state thereon will then initialize the next succeeding program and data to be utilized by the CPU34 when an SCW signal or an error signal next appear on lines 42a and 53 respectively.

Line 45a, shown in FIGS. 7 and 8, provides an indication to the CPU34 that it may proceed with the command to switch from one program to another.

The signal on line 58 indicates to the CPU34 that the selected reserved memory cell is available for use in connection with the issuance of an SCP or an SCW.

The signal on line 59 indicates that insofar as the memory control unit is concerned the switch command has been completed so that coincidence of signals on lines 57 and 59 will enable the PPU22 to prepare for the next CPU status change. The signal on line 60 provides the same signal as appeared on line 45a but applies it to memory control unit 20 to permit unit 20 to proceed with the execution of the switch command.

It will be noted that the bus 32a and the bus 33a of FIG. 8 that the switching components responsive to the signals on lines 41a, 42a and 53–60 are physically located within and form an interface section of the PPU22. The switching circuits include the OR gate 50a and 51. In addition, AND gates 61–67, AND gate 43a, and OR gate 68 are included. In addition, ten flip-flop storage units 71–75, 77–80 and 44a are included.

The OR gate 50a is connected at its output to one input of the AND gate 61. The output of AND gate 61 is connected to the set terminal of unit 71. The 0-output of unit 71 is connected to a second input of the AND gate 61 and to an input of AND gates 62 and 63.

The output of OR gate 51 is connected to the second input of AND gate 62, the output of which is connected to the set terminal of unit 72. The 0-output of unit 72 is connected to one input of each of AND gates 61–63. The strobe signal on line 54 is applied to the set terminal of unit 73. The 1-output of unit 73 is connected to an input of each of the AND gates 61–63.

The function of the units 50a, 51, 61–63 and 71–73 is to permit the establishment of a code on an output line 81 when a call is to be executed and to establish a code on line 82 if a switching function is to be executed. Initially such a state is enabled by the strobe signal on line 54 which supplies an input to each of the AND gates 61–63. A call state will appear on line 81 only if the previous states of 0 unit 71 and S unit 72 are zero. Similarly, a switching state will appear on line 82 only if the previous states of units 71 and 72 were zero.

It will be noted that a reset line 83 is connected to units 71 and 72 the same being controlled by the program for the PPU22. The units 71 and 72 will be reset after the call or switch functions have been completed.

It will be noted that the lines 81 and 82 extend to terminals 84a and 84b of a set of terminals 84 which are program accessible. Similarly, 1-output lines from units 74, 75, 44, 77 and 78 extend to program accessible terminals. While all of the units 71–75, 77–80 and 44a are program accessible, those which are significant so far as the operation under discussion is concerned in connection with context switching have been shown.

Line 55 is connected to the set terminal of unit 74. This records or stores a code representing the fact that a cell has been completed. After the PPU22 determines or recognizes such fact indicated at terminal 84d, then a reset signal is applied by way of line 85.

A program insertion line 86 extends to the set terminal of unit 75. The 1-output of unit 75 provides a signal on line 56 and extends to a program interrogation terminal 84e. It will be noted that unit 75 is to be reset automatically by the output of the OR gate 68. Thus, it is necessary that the PPU22 be able to determine the state of unit 75.

Unit 44a is connected at its reset terminal to program insertion line 88. The 0-output of unit 44a is connected to an input of an AND gate 66. The 1-output of unit 44a is connected to an interrogation terminal 84f, and by way of line 89, to one input of AND gate 43a. The output of AND gate 66 is connected to an input of OR gate 68. The second input of OR gate 68 is supplied by way of AND gate 67. An input of AND gate 67 is supplied by the 0-output of unit 77. The second input of AND gate 67 is supplied by way of line 81 from unit 71. The set input of insertion line 91. The reset terminal is supplied by way of line 92. The function of the units 44a and 77 and their associated circuitry is to permit the program in the PPU22 to determine which of the functions, call or switch, as set in units 71 and 72, are to be performed and which are to be inhibited.

The unit 78 is provided to permit the PPU22 to interrogate and determine when a switch operation has been completed. The unit 79 supplies the command on lines 45a and 60 which indicates to the CPU and the memory control unit 20, respectively, that they should proceed with execution of a switch command. Unit 80 provides a signal on line 58 to instruct CPU34 to proceed with the execution of a call command only when units 71 and 77 have 1-outputs energized.

The foregoing thus illustrates the manner in which switching from one program to another in the CPU34 is carried out automatically in dependence upon the status of conditions within the CPU34 and in dependence upon the control exercised by the PPU22. This operation is termed context switching and may be further delineated by Table I below which describes the operations, above discussed, in equation form.

The salient characteristics of an interface between the CPU34 and PPU22 for accommodating the SCW and SCP and error context switching environment are:

(a) A CPU request is classified as either
  (1) an error stimulated request for context switch,
  (2) an SCP, or
  (3) an SCW.
(b) One CPU request is processed at a time.
(c) Context switching and/or call completion is automatic, without requiring PPU intervention, through the use of separate flags for "call" and "switch".
(d) One memory cell is used for the SCP and SCW communication.
(e) Separate completion signals are provided for the "call" and "switch" of an SCW so that the "call" can be processed prior to completion of "switch".
(f) A CPU run/wait control is provided.
(g) Interrupt for PPU when automatically controlled CPU requests have been completed. This interrupt may be masked off.

Ten OR bits, i.e., bits in one or more words in the communication register 431, FIG. 11, later to be described, are used for this interface. They are as follows in terms of the symbols shown in FIG. 4.

TABLE I

| | |
|---|---|
| [C] | monitor "call" request storage (request signal c') |
| [S] | context switch request storage (request signal s') |
| [L] | $\dot{C}$, S load request/reply storage (request signal a') |
| | set $C = L \bar{C} \bar{S} c'$ ⎫ reset by PPU at end |
| | set $S = L \bar{C} \bar{S} s'$ ⎬ of request processing |
| | set $L = l'$ ⎭ |
| | reset $L = \bar{C} \bar{S} L$ |
| [AS] | automatic context switching flag |
| | set AS : by PPU when automatic context switching is to be permitted |
| | reset AS : by PPU when automatic context switching is not to be permitted |
| [AC] | automatic call processing flag |
| | set AC : by PPU when automatic call processing is to be permitted |
| | reset AC : by PPU when automatic call processing is not to be permitted |
| [R] | CPU run flag |
| | set R : by PPU when it is desired that the CPU run |
| | reset R = $\overline{AS} \cdot S + \overline{AC} \cdot C$ |
| [CC] | call complete storage (complete signal cc') |
| | set CC = cc' |
| | reset CC : by PPU when C and S are reset |
| [SC] | switch complete storage $\Big\{$ CPU complete signal: PSC / MCU complete signal: MCS |
| | set SC = PSC · MSC |
| | reset SC : by PPU when C and S are reset |
| [PS] | proceed command to CPU to initiate context switching |
| | set PS = AS · S |
| | reset PS : by PPU when C and S are reset |

TABLE I-continued

| PC | proceed command to CPU to initiate use of memory call |
|---|---|
| | set PC = AC · C |
| | reset PC : by PPU when C and S are reset |

Further to illustrate the automatic context switching operations, Tables II and III portray two representative samples of operation, setting out in each case the options of call only, switch only, or call and switch.

TABLE II

Automatic context switching and call processing, continuous CPU running

| Time | | AC | AS | PC | PS | R | L | CC | SC | C | S | Flip Flop (FIG. 4) |
|---|---|---|---|---|---|---|---|---|---|---|---|---|
| i-- | | 1 | 1 | 0 | 0 | 1 | 1 | 0 | 0 | 0 | 0 | |
| ii-- | | | | | | | | | | | | |
| iii-- | 1 1 0 0 1 0 0 0 0 1 | 1 | 1 | 0 | 0 | 1 | 0 | 0 | 0 | 1 | 0 | 1 1 0 0  1 0 0 0  1 1 |
| iv-- | 1 1 0 1 1 0 0 1 0 1 | 1 | 1 | 1 | 0 | 0 | 0 | 0 | 0 | 1 | 0 | 1 1 1 1  1 0 0 0  1 1 |
| v-- | | | | | | | | | | | | | 1 1 1 1  1 0 1 0  1 1 |
| vi-- | 1 1 0 0 1 0 0 0 0 1 | 1 | 1 | 1 | 0 | 0 | 0 | | 0 | 1 | 0 | 1 1 1 1  1 0 1 1  1 1 |

PPU re-initializes where, during time
i-- waiting for CPU rrequest;
ii-- request code loaded;
iv-- begin procedure;
v-- call complete; and
vi-- switch complete.

TABLE III

Automatic call processing, automatic context switching disabled, CPU running until context switching occurs

| Time | | AC | AS | PC | PS | R | L | CC | SC | C | S | Flip Flop (FIG. 4) | |
|---|---|---|---|---|---|---|---|---|---|---|---|---|---|
| i | | 1 | 0 | 0 | | 1 | 0 | 0 | 0 | 0 | 0 | | |
| ii | | 1 | 0 | 0 | 0 | 1 | 1 | 0 | 0 | 0 | 0 | | |
| iii PPU | 1 0 0 0 1 0 0 0 0 1 | 1 | 0 | 0 | 0 | 1 | 0 | 0 | 0 | 1 | 0 | 1 0 0 0  1 0 0 0  1 1 | PP |
| iv Note A | 1 0 0 1 0 0 0 0 0 1 | 1 | 0 | 1 | 0 | 1 | 0 | 0 | 0 | 1 | 0 | 1 0 1 1  0 0 0 0  1 1 | Not B |
| v | | 1 | 0 | 1 | 0 | 1 | 0 | 1 | 0 | 1 | 0 | 1 0 1 1  0 0 10 1 1 | |
| vi | 1 0 0 1 0 0 0 1 0 1 | | | | | | | | | | | 1 0 1 1  0 0 1 1  1 1 | |

PPU re-initializes

CONTROL SYSTEM

In FIG. 15, the Master Controller 601 is shown having access to the Central Processor 34, the Virtual Processors $P_0-P_7$, the Printer 26, the Reader Punch 24 and the Read-Write 603. The Master Controller 601 will assign program units to the processors including the Central Processor and will perform initial interface with the external devices and monitor all processes.

The Master Controller is connected to the Command Controller 603 through the Master Controller Attention Queues 605 and the Service Call Processing Queues 607. The Master Controller 601 is connected to the Task Controller 609 through the Task Processing Queues 611 and Task Controller Attention Queues 613. The Command Controller 603 is connected to the Task Controller 609 through the Command Processing Queues 615 and the Command Controller Attention Queues 617. The Master Controller 601 is connected to the Terminal Channel Controller 619 through the Message Communication Area Chain 621. The Task Controller 609 is connected to the Terminal Channel Controller 619 through the Data Communication Area Chain 621. The Task Controller 609 is connected to the Disc Controller 623 through the Disc I/O Processing Queues 625 and the Disc I/O Complete Queues 627. The Disc Controller 623 connects to the Disc Channel Controller 36 through a Data Communication Area Chain 629 and a second disc channel controller 36a may be connected to the Disc Controller 623 through the Data Communication Area Chain 631.

The Command Controller schedules jobs and commands within the job. It allocates disc space. The Command Controller controls flow of work by initiating commands and passing work to Task Controller for execution.

The Task Controller schedules individual tasks and Central Processor steps within a command for execution. It allocates Central Memory. The Task Controller passes Disc I/O requests to the Disc I/O Controller. The Task Controller passes tasks and Central Processor programs to the Master Controller for processor assignment.

DISC I/O CONTROLLER

The Disc I/O Controller acts as the interface with the hardware Channel Controller. The Disc I/O Controller manages all disc requests so as to optimize effective channel bandwidth.

The computer described herein is a multiprocessor. There are nine different processors in the computer with one central processing unit and eight virtual processors. There are thus in effect nine independent computers in the computing system. There are four control functions in the computer with a heirarchy of control. Four of the virtual processors are dedicated to the controller functions.

All nine computers have an access to many locations in central memory. Thus there is an identical address accessibility. In addition, each computer has access to the communication register file.

There are four controllers in the computing system. The Master Controller, the Command Controller, the Task Controller and the Disc I/O Controller.

The Command Controller assigns groups of command sequences over groups of tasks to the computers. The Task Controller determines the task to be done such as intelligence gathering and the like. The Master Controller decides what processors will do tha tasks. The Disc I/O Controller will control the transfer of data between the discs and central memory.

The control system described herein is different from previous computers in that there are not different independent controllers in the computing system but four controllers with a heirarchy of control.

MASTER CONTROLLER (1) provides software control of the virtual processor and central processor utilization, (2) responds to asynchronous signals from the peripheral devices and interactive digital communication terminals, (3) monitors system error processing, and (4) bootstraps and initializes the system.

There is a nucleus, which is the main polling loop of the Master Controller. The main polling loop of the Master Controller responds to device attention signals to provide a sufficient control of the virtual processors, central processor, the peripheral devices and terminals.

The major share of the Master Controller's work is initiated in a dedicated virtual processor to achieve a quick response time. This dedicated or nonselected virtual processor may be termed the Master Controller Virtual Processor and is one of the eight virtual processors other than a virtual processor which is allocated to the nucleus of the Master Controller.

VIRTUAL PROCESSOR UTILIZATION

The Master Controller performs four types of virtual processor utilization and control functions. These functions provide for:

(1) allocation of a virtual processor to a system task, (2) allocation of a virtual processor for Master Controller work (subprocess), (3) control of the virtual processors through a Master Controller service component (virtual processor service loop), and (4) taking an active task out of virtual processor execution (trapping).

VIRTUAL PROCESSOR SERVICE LOOP

There is a virtual processor service loop component in the Master Controller which controls the nonselect virtual processes. The nonselect virtual processors enter and execute the Master service controller service loop upon completion of (1) a standard system call (SCALL) from a task, (2) virtual processor execution for a task, (3) priming a task for executing, and (4) a Master Controller subprocess.

Control is also exerted over the nonselect virtual processors during Master Controller service loop execution to a yield indication provided in the communication register file. This is carried out through each logical break point in the virtual processor service loop execution, the nonselect virtual processors will test the yield indicator and will determine whether that nonselect virtual processor is to report to the Master Controller through the ROM idle loop. The yield indicators in the communication register file provide a means to interrupt a virtual processor during service loop execution so the Master Controller can use the nonselect virtual processor for special purposes.

The nonselect virtual processors report to a ROM idle loop when a nonselect virtual processor in the service loop detects a task processing and subprocessing scheduling lists are empty. The ROM idle loop indicates to the Master Controller that the nonselect virtual processors are idle and available for scheduling work.

TRAPPING VIRTUAL PROCESSORS

The Master Controller can exert control over a virtual processor during task execution by trapping (i.e., taking an active task out of virtual processor execution [a given virtual processor for use by the Master Controller]). Trapping is accomplished through the setting of communication register file bits to which peripheral processor hardware responds, and the virtual processor traps to a ROM location where control is returned to Master Controller service loop.

Trapping is accomplished at the task level. All status information associated with the trapped disc is saved in the task parameter table and the task entry is placed at the front of the high priority task process list. Placement on the task process list allows a task to be rescheduled for execution in the next available virtual processor.

SUBPROCESSES

Subprocesses are initiated to perform systems services required at the Master Controller. By definition, a subprocess is a component of the Master Controller that performs a vital service and executes in a nonselect virtual processor. Subprocesses share a common data base with the nucleus of the Master Controller. Subprocess scheduling is a parameter of system generation in that some subprocesses may or may not be scheduled for nonselect virtual processor processing.

The Master Controller subprocess schedular determines the order in which subprocesses are to be executed. The virtual processor service loop initiates subprocesses upon detection of entries on the subprocess scheduling list. The subprocesses which are scheduled by the subprocess scheduler are as follows:

(1) terminal input/output communication area processor, (2) timer tube processor (3) error processing (4) terminal input/output processor,
(5) performance information selective processor,
(6) device attention processor,
(7) central processor controller, and
(8) Master Controller communication list processor.

VIRTUAL PROCESSOR ALLOCATION FOR TASKS

System tasks are inputted to the Master Controller on one of two priority task priority processing lists for virtual processor allocation. When a task is selected for virtual processor execution, the task entry is removed from the task processing list and is then primed for execution. Prior to task execution, the Master Controller builds table entries which point to an active tasks task entry and task parameter table, and loads a base program counter and a virtual process register file. The base program counter and the virtual processor register file are both contained in the task processor table. The control of the virtual processor is then passed to the task for execution.

The time a task is permitted to execute in the virtual processor can be controlled by the Master Controller. A virtual processor which enters an endless program loop in execution will be discovered by the Master Controller and will be removed from virtual processor execution. The Master Controller also services requests from task execution in the virtual processor for resetting the communication register file or the central memory protection when required. A task is post-processed by the Master Controller upon completion of virtual processor execution. This post-processing may be termed a task wrap-up.

Following the task execution, the base program counter and the virtual process registers for that task are saved in the task parameter table. The task parameter table is removed from the task parameter table address list and the task entry is removed from the active task list. The task entry is placed on the task complete queue for the task controller's wrap-up of the task, and control is returned to the virtual processor service loop.

CENTRAL PROCESSOR UTILIZATION

The central processor utilization is accomplished by the Master Controller through
(1) allocation of the central processor steps,
(2) responding to serve at central processor service calls, and
(3) control of the central processor.

The Master Controller exerts control over the central processor hardware logic that is necessary to place a central processor program into execution. Allocation is accomplished by removing entries from the central processor execution list and placing the address of the program into a dedicated word which causes the hardware to start execution of the program.

The Master Controller services the central processor for context switching issued by a central processor step through a monitor call and wait instruction. Context switching is the hardware mechanism for removing the central processor from execution and saving the status associated with the central processor step.

A central processor step will issue a service call (the step may or may not be context switched) that signals the Master Controller through the communication registers that the central processor step requires system services. The Master Controller intercepts the service call and builds a service request entry for passing the necessary information to the command controller for processing.

Context switches of the central processor may be forced by the Master Controller when a high priority step needs to be assigned to immediate central processor execution. Priority steps may also be forced from execution when they have exceeded a given time limit or for the purpose of time slicing the central processor. The central processor step is normally context switched automatically by the hardware for step termination. However, when there are no central processor steps waiting or trying for central processor execution, the Master Controller forces a central processor step out of execution through use of the central processor maintenance hardware logic to terminate a step. The Master Controller also forces the central processor steps into execution through use of the central processor maintenance hardware logic.

The Master Controller monitors the peripheral devices (for instance, tapes, printer, punch, terminals) for attention by way of the communication register file. The input information from these peripheral devices and the control signal outputs to these devices will be through the communication register file. In response to asynchrnous signals from peripheral devices, the Master Controller builds a service request entry which contains an image of the device attention bits for the command controller for analysis. These entries are then used by the Command Controller to initiate appropriate commands for processing of the devices.

The Master Controller responds to the digital communication terminal in two ways:

(1) the Master Controller monitors signals (communication register bits) which indicate that a terminal input message requires transferring to the operating system. When the appropriate communication register bit is set a communication area is linked on the terminal channel controller's high priority communication area chain for input.

(2) the Master Controller monitors communication of completed communication areas on the high priority terminal channel list. When a completed message has been detected, the completed message is removed from the high priority channel list and passed to the command controller for analysis and subsequent processing. The Master Controller also places output messages from the command controller on the high priority terminal channel list which are communications to the terminal word.

The Master Controller interfaces with the peripheral devices, peripheral processor, central processor, and the terminal channel controllers to the central register file. Information may be inputted from new devices and control signals may be outputted through these devices from the communication register file.

SPECIAL FUNCTIONS

ERROR PROCESSES

The master controller monitors system error processing by detecting a system error bit set in the communication register file. The system error bits are set by the system control component by tasks.

When an error is detected, the master controller initiates necessary routines to service the error. If an error is severe enough, then the master controller takes the action necessary to shut down the system. The system shut down may be either:

(1) an orderly shut down or (2) a crash shut down.

The master controller is responsible for the initial system loading. The initial system loads consist of bootstrapping the system, the subsequent initialization of all system components and bringing the system up to an operational level.

MASTER CONTROLLER DEBUG

The master controller provides special functions for master control debug. Special control of the virtual processors is permitted by an exercise task which completes execution to stop all other exercise virtual processors at that time. The master control debug users can then examine the relationship between one or more virtual processors in simultaneous execution.

PERFORMANCE INFORMATION COLLECTION

The master controller provides special functions for performance information collection processing. The master controller saves scheduling and processing information in special performance information collection processing buffers which are used for system evaluation.

The master controller also provides a special interface for initiating the execution of the performance information collection central processing step that empties and processes operating system data collection buffers.

STRUCTURE OF MASTER CONTROLLER (as shown in FIG. 9)

The nucleus of the master controller executes at a selected virtual processor that is composed of three main components. These components are:

(1) the main polling loop, (2) the subprocess scheduler, and (3) the peripheral processor controller.

These three components share various tables and have a common data base structure. The nucleus of the master controller monitors the communication register file, in order to communicate with the virtual processors, the central processor, the peripheral devices and the terminal channel.

MAIN POLLING LOOP

The main polling loop of the master controller monitors requests from the external world. Whenever a signal is detected for master controller work, the main polling loop initiates the appropriate action. To initiate the request, the main polling loop will pass control to the peripheral processor controller or the subprocess scheduler in the selected virtual processor.

When the main polling loop detects that the execution of a subprocess is required, control is passed to the subprocess scheduler. The subprocess scheduler may pass control to the requested subprocess if the master controller virtual processor select scheduling is required. The scheduling is time dependent, then subprocess scheduler passes control to the peripheral processor controller for immediate virtual processor allocation. If the subprocess is not time dependent and there is no available virtual processor, then the subprocess scheduler makes an entry in a table so the subprocess will be executed by the next available virtual processor. After the scheduling of a subprocess, control is returned to the main polling loop of the master controller.

Control of virtual processor select is passed to the peripheral processor controller whenever the slave to master or availability communication register bits are set. These bits indicate that a virtual processor needs servicing by the peripheral processor controller. The reason word indicates to the peripheral process controller the state of the virtual processor. Following servicing, control is returned to the main polling loop of the master controller.

MAIN POLLING LOOP

The function of the main polling loop is to detect signals from the various hardware and software components to which the master controller has been assigned service responsibility. The components and associated conditions monitored can be summarized as follows.

The central processor is monitored for:

(1) context switching, (2) initial step loading, (3) step terminating and unloading for step time slicing, (4) step time limit control, (5) step priority override, (6) service call processing, and (7) system error processing.

The peripheral processors are monitored for virtual processor availability and system error detection.

Peripheral devices are monitored for device attenuation signals.

The system list is monitored for a list entry time expiration.

The terminal channel is monitored for:

(1) communication error completions, (2) imput message requests, (3) output message requests, and (4) system error detection.

System tasks are monitored for:

(1) protected communication register access requests, (2) protected central memory access requests, (3) system error processing, and (4) execution time control.

The master controller debug component is monitored for special virtual processor control requests.

Subprocess scheduling can be controlled by establishing a time limit control.

SUBPROCESS SCHEDULER

The function of the subprocess scheduler is to schedule the execution of subprocesses in response to the servicing requirements as detected by the main polling loop. A scheduling table controls the way in which a particular subprocess is scheduled. This scheduling type table (SYSGEN) initialized table permits four types of scheduling:

(1) virtual processor-select only, (2) available virtual processor, or virtual processor-select immediately, (3) available virtual processor, or trapped virtual processor, (4) next virtual processor becomes available.

Subprocesses which are scheduled for execution into a virtual processor other than the master controller virtual processor-select may be queued up while waiting for a virtual processor to become available.

PERIPHERAL PROCESSOR CONTROLLER

The function of the peripheral processor controller is to service requests associated with the peripheral processor. These include:
(1) protected communication register and access requests,
(2) protected central memory access requests,
(3) available virtual processor scheduling, and
(4) master controller debug virtual processor control.

These requests are signalled from nonselect virtual processors through communication register bits assigned to each virtual processor and an octet of dedicated central memory. A virtual processor requiring servicing sends its communication register bit, called slave-to-master bit, indicating that it has stored a slave-to-master reason in the dedicated central memory octet. This reason in the dedicated central memory octet has been accessed by the peripheral processor controller when the appropriate action is taken.

COMMAND CONTROLLER

The command controller is the controller of the computer system responsible for scheduling activities. This includes scheduling of jobs which can be batch jobs, terminal jobs, or remote batch jobs. Remote batch jobs are treated the same as batch jobs except for disposition of data. The command controller analyzes its service requests to determine resource requirements and subsequently schedules execution of the service requests.

In the process of scheduling execution of the service requests, the command controller handles the reservation of two resources: the disc and the central memory. The command controller effectively allocates disc space but it does not actually decide which physical portion of a disc a job or a task will be assigned to. The assignment of disc space is made by a command initiated by the command controller. The command controller checks the amount of disc space that any command is going to use before the command starts executing. The command controller does not allow execution to begin if the command will require more disc space than is available. Thus, the command controller does not decide the actual physical assignment of disc space but it does decide the amount of assignment.

To perform the job execution functions, the command controller interprets the in toto job specification language file (IJSL) and controls the terminals in a sense of deciding which terminal will be allowed to come on line or which messages will be accepted at a given time.

The command controller's primary responsibility is to control the system resources and guarantee that the system optimizes the use of these resources. Command controller is aware of all command terminations. The command controller has the job level information required in the scheduling of jobs. The command controller can give high priority to commands associated with the particular job when trying to speed the throughput for that job.

JOB PROCESSING

The command controller is responsible for scheduling the different stages of job processing which are:
(1) initiation,
(2) job specification language translation,
(3) preprocessing,
(4) execution, and
(5) termination.

The command controller initiates the job input stream reader which is the component of the system which brings jobs into the system from an external source. For the initiation of the job input stream reader, it is determined whether enough disc space is available for reading in source jobs.

Included in job initiation is the control of remote batch jobs from the terminals. The command controller determines the type of device (for instance, curve meter, tape drives, disc) to be used as a job source input device.

When there are jobs in the source state the command controller decides when and which jobs to have translated by the job specification language translator. The job specification language translator is initiated for the source jobs that are available as the disc becomes available for the internal job specification file. The job specification language translator takes the job specification language source statements and produces an internal job specification language file. The internal job specification language file is in a machine-oriented form which is easier to analyze by the computer system than the source job specification language and if there is a syntax error, the command controller does not schedule the execution of the job.

After the job has been translated, the command controller decides which jobs have been translated so preprocessing can be initiated. To determine which jobs can have preprocessing iniated, the command controller needs to make sure that all resources needed to start the job execution are available. For instance, catalogs, specific tape reels and other resources.

The command controller checks the internal job specification language job parameters to see how much disc space, central memory and processing time is required for the job. From this check which determines what resources are available and what resources are required, the command controller decides whether to run the job or wait until more resources are available (the requirement for disc space is usually the main consideration to determine whether the job is to be run or to wait).

When a job is in the preprocessing phase, each command sequence in the preprocessing function is scheduled. The command controller then decides which jobs to schedule for execution from those jobs which have been preprocessed. During job execution itself, the scheduling becomes more involved in the command controller must balance the memory and disc requirements for each job step. A job may execute job specification language statements which increase or decrease disc requirements at different stages within job execution. The command controller considers this during the scheduling of job execution.

The command controller is responsible for job termination. This process is accomplished in the command controller by job termination command sequence which involves closing all the files of the job, doing job accounting and sending the job output to the appropriate location.

At job termination, the command controller closes the job file and releases memory that the particular job being terminated used during execution. The main scheduling problem at job termination is that of disposing of all the print files acquired during the job. Printing jobs may be awaiting termination if there are not enough printers available. Also batch output could be routed to other local devices for off-line printing. Remote batch output could be printed locally if the original input terminal or at some other terminal designated by the job or the operator.

COMMAND PROCESSING

Command controller is responsible for the scheduling of commands. Commands are sequences of tasks identified by the command controller to provide logical breakpoints in the resource needs for scheduling purposes. A command is either an analysis or an execution command. An analysis command is initiated by the command controller to obtain scheduling information. If an analysis command determines that resources are available, then an execution command may be initiated to perform a requested system service.

Many of the commands a command controller schedules are context independent, that is, they perform some basic processing function, but this type of function is needed in more than one type of work. (A function which opens flies can be used for file management, as a file input/output, and as a system service.

The command controller is responsible for the preparation of commands for scheduling. For each command sequence in the system, there is an entry in a table termed the command sequence table which defines the commands in that particular sequence in the order in which these commands execute and the attributes of the command. Command controller determines if the command sequence table which commands in the sequence to schedule it.

The command controller manipulates the data structures associated with a command. The standard command parameter table is built for the first command in the sequence. For a command which has terminated, the command controller determines whether a command parameter table of the terminating command should be released and a new one built for the next command in the sequence.

An argument table may or may not be passed by a terminating command. Due to the context independent features of commands, an argument table may be passed in one command sequence using a particular command and not be passed in another command sequence using the same command. The command sequence table specifies whether an argument table will be passed by a particular command in the sequence.

After evaluating the data attributes of a command, the command controller determines whether the command to be scheduled is a non-reintrant command. If the command is non-reintrant and all the data associated with that command is correct, then the command entry is placed on a scheduling list.

When a command is scheduled, the command entry for that command is placed on the command processing list. A task entry is placed on the task request queue by command controller for the first task in the command to be initiated by task controller.

When a command completes execution, command termination is initiated by the task controllers placing the command entry for that command on a command attention list. For standard command exits, the command sequence table is interrogated and the next command in that command sequence is scheduled.

COMMAND SEQUENCE PROCESSING

The command controller uses a table-driven implementation technique called Command Sequences to control the execution of commands needed to perform a request. The Command Sequences perform various types of activities, by specifying a sequence of specialized functions (commands) to perform a larger more global function. Examples of system functions performed by Command Sequences are as follows:

(1) the internal job specification language analyzer which is a part of the command controller request command sequences to process the work specified on job specification language statements. The master controller receives service calls from the central processor and passes the requests to the command controller. The command controller then initiates the command sequences needed to analyze the requests. The peripheral processor debug, which is the on-line operating system debugging system, generates requests for command sequences to handle operation interaction with the peripheral processor and the central processor debug facilities. The system communicator generates requests for command sequences to handle operator interaction, to cancel jobs, to delete input/output requests and the like. The command sequences are also used for the analysis and processing of terminal requests by the command controller.

All command sequences have certain attributes such as central memory and disc space requirements, estimated number of input/output requests, and estimated amount of time required to execute the command sequences. From these attributes, and from the job level information to which the command controller has access the command controller decides which command sequences to initiate. Each command within a command sequence is also scheduled based upon the same considerations as the scheduling of the command sequences themselves.

COMMAND CONTROLLER SUBPROGRAMS

The command controller subprograms are functionally similar to tasks since a command controller subprogram represents a certain unit of code or a certain sequence of instruction. However, the command controller subprograms are actually executed in the command controller's dedicated virtual processor. Because the command controller comprehends commands as units of work, the command controller subprograms have command level data structures. That is, the command controller subprograms are activated by an entry in the command sequence table and have a command entry and a command parameter table. The command controller subprograms perform different functions for the control system.

The first function is that of sequence dependent work. That is, at certain points in some of the command sequences, some cleanup work is done. Data structure may have to be manipulated or some work is done which cannot be delegated to a task; thus, this type of work is done by a command controller subprogram.

The second type of subprogram manipulates lists within the command controller. Command controller subprograms which manipulate lists solve a lockout problem. More than one component accesses a list to add or remove list entries a lockout problem may exist. The command controller subprograms resolve this type of problem since only one subprogram will be executed in the command controller's dedicated virtual processor.

The command controller subprograms are also used to resolve interface incompatibility that has occurred because of miscommunication or unforeseen problems in the design phase. For example, a command may need parameters not available to the calling components. The command controller subprogram can obtain and supply these parameters which will be necessary for that command to execute.

The command controller subprograms may also be used because of size. Where the code requires less than 20 instructions, it becomes reasonably economical to execute these instructions in the command controller's dedicated virtual processor. This type of subprogram cannot be executed as a last task of a command because if command is context independent and may thus be a command in other command sequences which do not require execution of the subprogram.

Because command controller subprograms have a command entry and command parameter table structure and are initiated through a command sequence table, the command controller subprograms can be used in making disc input/output calls, that is, a disc input/output call by the command controller is made by using a subprogram and as such is indistinguishable from a command making a disc/output call as far as the task controller is concerned.

COMMAND CONTROLLER STRUCTURE

The command controller multiplexes two functional units within one virtual processor as shown in FIG. 10. These two functional units are the scheduler component of the command controller and the polling loop subprogram executer component and command controller. This design of the command controller allows the scheduling components to be altered without impacting any of the bookkeeping and commands sequence interpretation functions of the command controller.

The scheduling component of the command controller determines when command sequences will be initiated when commands will be started and when subprograms will be executed. The polling loop and subprogram executor component of the command controller holds the various input queues for the command controller and executes subprograms that have been scheduled by the scheduler component.

Both the scheduler and the polling loop components are divided into subcomponents called actions. An action is a modulo module of code which performs a specialized function in the command controller. Actions are implemented to provide a modular design for the command controller. The sequence in which these actions are executed is determined by an action sequence table in the command controller's task parameter table. The action sequence table contains an entry for each action in each entry defines two possible exits for that action, thus determining which action will be performed next. There are two action sequence tables: one for the scheduler and one for the polling loop and subprogram executor.

After each action control is returned to the multiplexing driver. This driver decides which of the two components of the command controller will execute next. This is accomplished by checking in ratio (scheduler-executor ratio) built into the command controller's task parameter table at system generation time. This ratio determines which component will be allowed to execute more frequently. For example, the scheduler could be allowed to execute one hundred actions for every five actions that the polling loop executes. The multiplexing driver must keep a running count of the number of actions executed by each component and initiate succeeding actions accordingly. When an action terminates, an action sequence table interpretor determines which action for this component should be executed next and stores the address of that action in the dedicated word of the command controller's task parameter table. Control is transferred to the multiplexing driver which determines which component will execute next and transfers control directly to the correct action of that component.

The command controller has the same basic data structure as a task, that is, a task entry, a task parameter table, a command entry and a command parameter table under a system job. The command controller has base relative access to its own task parameter table and stores information in it. Temporary storage is provided for command controller execution, and data constant areas are provided for the different components of command controller. Within the data constant areas, there are counters which control the execution flow within command controller by indicating to the various components how many times queues should be scanned and how many entries should be removed from a queue each time it is scanned.

Command controller's task parameter table contains the command directory of all the commands in the system. Each entry in the command directory contains information such as:

(1) amount of disc used by the command,
(2) amount of central memory required by the command,
(3) number of tasks in the command,
(4) whether the command does disc input/output,
(5) whether the command is reentrant,
(6) whether the command is resident,
(7) whether the command is currently loaded, and
(8) whether the command is currently active.

Also, in the command controller's task parameter table, there is a command sequence table directory which contains the addresses of all the command sequence tables, the address of the first command in each command sequence, and other information similar to that in the command directory. The action sequence tables are also in command controller's task parameter table and are used to control the flow of work inside the command controller.

TASK CONTROLLER

The task controller is the component of the ASC Operating System responsible for monitoring the flow of tasks through the system. A task is the most basic unit of work scheduled by the system. Task controller is central memory resident and executes in a dedicated virtual processor.

Task controller performs the following basic functions:

(1) allocates central memory for executable code and builds parameter tables needed for the execution of a task,
(2) manages all communication and transfer of control between tasks,
(3) preprocesses all disc input/output requests,
(4) facilitates the transfer of data between the ASC and remote terminals, and
(5) provides the interface between the system and the peripheral device driver/handlers.

TASK PROCESSING

Task processing can be broken into two major areas:
(1) the preprocessing of tasks and
(2) monitoring task completions.

In preprocessing tasks, task controller loads tasks from disc to central memory if the tasks are not currently residing in central memory. After tasks have been loaded into central memory, task controller builds a task parameter table to satisfy the task data structure requirements for task execution. Task controller also records the current status of a task which involves the setting of a task which involves the setting of various indicators contained in the task directory. Task execution is initiated by placing the task entry on a processing list to master controller for virtual processor allocation.

Task controller also services tasks which have completed execution. Task completions result from the execution of a standard call (SCALL). A SCALL is a standard system linkage to initiate a subsequent task or pass control to a system control component. For a task-to-task call, task controller modifies the activation record of the terminating task to reflect initiation of the requested task and performs the preprocessing required to initiate the task being called. If a task's SCALL request requires command controller attention, task controller places the task entry of the calling task on the proper action list for command controller to process. For a SCALL requesting disc input/output services, task controller links the disc input/output request on a list for disc preprocessing. For SCALLs to terminal input/output and to driver manager, the appropriate list entry, previously built by the calling task, is placed on the proper list for processing.

TASK DIRECTORY

The task directory is a control component system table which contains an entry for each task in the system. Each task directory entry contains all the information required by task controller to preprocess the task. Whenever the task directory is accessed, the entry which is used is locked out from other system components which might try to access the same entry.

The task directory entry for each task specifies whether the task is currently resident in central memory or whether it is to be loaded from disc into central memory. Certain tasks will always be central memory resident, but most tasks will reside in central memory only during the execution of the task code. The task directory also indicates whether the task is serially reusable or reentrant.

The task directory indicates to task controller when central memory utilized by a task should be deallocated. Task code may be deallocated upon completion of execution of the task, or task code may remain in central memory and be deallocated by the task deallocator when central memory resources are critical. The task deallocator increases the amount of central memory available to the system be deallocating task code not currently being executed.

The task directory indicates to the system if a task is trap inhibited. If a task is trap inhibited the task may not be interrupted by master controller during task execution.

The task directory contains a count of the number of users currently using a particular copy of task code. The count is updated by task controller upon preprocessing and completion of task code.

The task directory indicates to task controller the amount of central memory required by a task during execution for the task parameter table. Before the central memory is reserved, task controller augments the task parameter table size to include all overhead words required by the system. Another task directory parameter indicates the actual code length, including all data constants, required for a particular task. The task code length is required by task controller if a disc input/output request is required to load the task from disc. A data displacement parameter in the task directory indicates the displacement from the load point of a task to the data constants associated with the task.

A central memory address is contained in the task directory to indicate the load point of a task when the task is in central memory. For code being loaded by a disc input/output request, task controller updates this central memory address to indicate the current position in central memory of the task code. There is also a word in each task directory entry to indicate the absolute disc address of tasks which reside on disc.

TASK CONTROLLER STRUCTURE

The basic structure of task controller consists of the following components:
(1) main polling loop,
(2) driver manager,
(3) disc preprocessor, and
(4) terminal servicing component.

TASK CONTROLLER POLLING LOOP

Task controller's polling loop is that component of task controller which provides the input that drives the task controller. The polling loop consists of linked lists, dedicated central memory words, and an unconditional transfer of control to disc input/output preprocessor. The linked lists, if non-empty, contain input elements which task controller services. The dedicated central memory words in task controller's polling loop are driver manager completion words which, when non-zero, cause task controller to activate its driver manager component.

The input lists to task controller consist of the following:

(1) task request lists, on which command controller and task controller place task activation records for tasks to be executed;

(2) task complete lists, on which master controller places task entries of tasks having executed a SCALL;

(3) disc input/output complete lists, on which the disc input/output controller places completed disc requests for task controller to direct to the proper source;

(4) memory deallocation list, on which command controller and task controller place task entries and task parameter tables for task controller to deallocate later;

(5) large memory request list, on which command controller places task entries for task requests requiring central memory at the page (4096 words) level;

(6) terminal input/output communications area chain that task controller polls for completed terminal data transfers;

(7) breakpoint complete list, on which master controller places task entries of tasks having executed a software breakpoint;

(8) breakpoint restart list, on which command controller places task entries of tasks to be restarted after executing a software breakpoint.

The priorities of the various input lists are satisfied by the multiple occurrence of a list or lists in the polling loop. Once an event is detected in the polling loop, task controller exits the loop to the particular processor required and returns to the polling loop when all processing is completed.

DRIVER MANAGER

Driver manager is that part of task controller which provides the interface with the peripheral input/output driver/handlers to effect data transfers between central memory and the peripheral devices (e.g., tape, card reader, punch, printer).

When peripheral I/O needs to be done for a task, the task will pass control to task controller via a special SCALL. After the task controller recognizes from the SCALL type that peripheral input/output activity needs to be initialed, control will be passed to a part of task controller called driver manager. Driver manager will initiate the peripheral input/output activity as indicated by an argument table passed to task controller by the calling task.

Driver manager will pass control to a device driver/handler component to initiate the data transfer. When the data transfer has been completed, control will be returned to the driver manager portion of task controller by the driver/handler. Driver manager will then pass control to the command controller, which will continue to process the command sequence that requested the peripheral input/output.

FIG. 11 and outline description illustrate the interfaces involved for driver manager from a peripheral I/O request which was initiated to task controller.

(a) SCALL to task controller with a peripheral I/O request (b) task controller nucleus passes control and the peripheral I/O request to the driver manager SCALL processor.

(c) if the device handler is in central memory, the driver manager SCALL processor transfers the data from the peripheral I/O request into a dedicated communication area and sets a communication register bit which causes a driver to initiate a device handler. Driver manager SCALL processor may make an entry on a task processing list for a driver if the driver is not executing in a virtual processor.

(d) if the device handler is not in central memory, driver manager SCALL processor will make a disc I/O request for the handler to be loaded from disc.

(e) when the disc I/O request is completed, control is given to the post handler load processor.

(f) the post handler load processor does the same processing that is described for the driver manager SCALL processor under point (c) above.

(g) for double buffered tape requests only, when a buffer is filled, the device handler sets a slave-to-master bit which notifies master controller.

(h) the device handlers interface directly with the hardware to perform data transfers between the peripheral I/O devices and central memory.

(i) the master controller nucleus passes control to the buffer attention processor. The buffer attention processor puts a disc I/O request on a list which will activate disc I/O preprocessing in task controller. The disc I/O request is supplied by the task whose peripheral I/O request is being serviced.

(j) when the device handler completes servicing a communication area, task controller will be notified.

(k) the task controller nucleus will pass control to the driver attention processor.

(l) the driver attention processor informs command controller of the completion of the peripheral I/O request.

(m) command controller continues processing of the command sequence which issued the peripheral I/O request.

TASK CONTROLLER DISC PREPROCESSOR (TCDP)

The task controller disc preprocessor validates the user disc I/O request, allocates central memory to be used for communication areas, and builds the communication areas that are used by the disc data channels for the actual transfer of data between central memory and the disc.

Task Controller Disc Preprocessor is a list driven component. A list entry is placed on one of three disc I/O requests lists by task controller before task controller disc preprocessor is called. Task controller calls TCDP as a subroutine through the vector table. There are three priority disc I/O requests lists, the highest priority being used for one inch streaming tapes. Although the list entry is the only form of input for TCDP, the list entry contains pointers to control blocks. These control blocks contain the information necessary to service a disc I/O request.

TCDP validates all user I/O requests to insure proper use of the disc. Depending upon the type of disc I/O user, the TCDP validates the (1) request control block (RCB),
(2) file use,
(3) central memory use, and
(4) disc file appendages. When errors are detected during validation, the appropriate status is recorded and the request control block aborted.

Upon successful completion of a disc request validation, the TCDP then converts the user's virtual disc address to an absolute disc address. The virtual disc address is converted to an absolute disc address by using the disc map contained in the file information block (FIB) to calculate the physical location on disc. TCDP also determines if a discontiguous break in disc space has occurred by adding the number of words (to be transferred) to the beginning absolute disc address and then checking the disc map for that file. For every discontiguous disc break that occurs for an I/O request, there will be built a corresponding communication area.

Communication areas (CAs) are allocated and built by TCDP upon completion of request validation and absolute disc address calculations. The communication areas are used by the disc hardware to obtain the information that is required for the actual disc data transfers. After being built, a communication area is linked on one of two lists which initiates disc controller processing. Task controller disc preprocessor returns to the task controller when an error condition occurs or all communication areas have been built for a given request control block. When all the communication areas have been built for a disc I/O request (more than one request control block may compose a disc I/O request), the disc request list entry is removed from the task controller disc preprocessor input list and placed on an "in process" list.

One other function of task controller disc preprocessor is to provide disc controller the linkages needed to relate completed communication areas to the originating disc request list entry.

TERMINAL SERVICING COMPONENT

The task controller is responsible for the transfer of large blocks of data and certain communication messages between the advanced scientific computer and the terminal environment. The main terminal input/output (TIO) function of the task controller is to manage queues which are responsible for the transfer of data between the ASC central memory and either the terminal world or the disc.

A parameter block is passed to task controller by the command requesting that a terminal input/output transfer take place. While task controller is processing the request, the initiating command will be suspended. The parameter block which is passed will contain all of the information required. The parameter block will be a terminal communication information block (TCIB) which was built by the master controller when the service request message was input to the ASC programming system or by a command sequence started to process a command parameter service call. The communications area will be updated and ready for the data transfer. The terminal communication information block will contain a pointer to the disc input/output queue entry which contains a pointer to the request control block, both of which were constructed by the calling command for the disc to central memory part of the transfer. The block of central memory required for storage of the data between transfers is obtained by task controller.

Task controller will link the queue entries provided onto the necessary queues to see that the data transfers are carried out. When they have been completed, the terminal communication information block will be passed back to the calling task and the task restarted at Call + 1.

TASK CONTROLLER LIST PROCESSING

A major portion of task controller's function is accomplished through response to inputs on linked lists which task controller polls. The main polling loop of task controller monitors the lists associated with task controller processing and initiates activity to process the list entries.

To initiate a task, command controller places an entry on the task request list. When task controller finds the entry on the task request list, the task to be started is preprocessed and initiated by task controller.

Another element on task controller's polling loop is the large memory request list. Inputs on the large memory request list are similar to inputs found on the task request list in that entries on the large memory request list are task entries for the initiation of tasks. The difference is that tasks being initiated through the large memory request list require central memory usage at the page (4K words) level. Tasks such as the central processor step loader and tasks requiring peripheral I/O transfers with large central memory buffers are placed on the large memory request list. Task controller processes the large memory request list by searching the list, determining the memory requirements, and communicating with page management (a component of memory management) to determine if the central memory requirements are available. The required amount of memory is reserved when page management can satisfy the memory needs of a task entry on the large memory request list. After satisfying the memory requirements, the large memory request entry is processed in the same manner as entries from the task request list.

Task controller polls a deallocation list to determine if any task activation records are to be deallocated. The deallocation list may contain a task parameter table (TPT) or a task entry (TE). Task controller deallocates the task entry, the task parameter table and all blocks of central memory associated with the the task.

Task controller polls the disc I/O (DIO) complete list for completed disc I/O requests and determines the destination of completed disc I/O requests. If the disc input/output request was from task controller to load (disc to central memory) a task, task controller completes preprocessing and initialization of the task that was loaded. All other disc I/O requests are returned to command controller by placement on a command attention list to notify command controller of disc I/O completion.

Task controller polls the low priority terminal I/O list to determine when a terminal I/O request is complete. If the list entry indicates that the request is complete, task controller delinks the entry and deallocates the memory for that entry. If a disc I/O request is required to complete a terminal-to-disc transfer, task controller is responsible for initiating the disc input/output request. If a disc I/O request has completed and a central memory-to-terminal transfer is required, task controller initiates the transfer. Task controller also allocates and deallocates all central memory required for terminal-to-disc and disc-to-terminal transfers.

Master controller places task entries on the task complete list for SCALLs being processed in the task's virtual processor. For standard task-to-task communication, task controller completes the wrapup of the current task and preprocesses the task being requested. For disc I/O or driver manager SCALLs, task controller is responsible for passing an argument list to the particular I/O preprocessor. For terminal I/O calls, task controller passes an argument table to the terminal I/O preprocessor. Also for terminal I/O calls, task controller is responsible for initiating data transfers from disc to terminal, terminal to disc, and for providing the central memory necessary for these transfers. For central processor execution requests, task controller places the argument list passed (a step entry) onto the central processor execution list. All other SCALL types are treated as exits to command controller. Task controller places a status and function code in a command entry and places this entry on command controller's command attention list.

BREAKPOINT PROCESSING

Software breakpoints in the operating system interface with the systems analyst via the master controller debug component (MCD). Prior to invoking the master controller debug component, however, all levels of control are involved in breakpoint servicing.

When a task hits a breakpoint, master controller places the task entry (TE) on a breakpoint complete list to task controller. If the breakpoint was to interrupt other executing tasks, their task entries are also placed on the breakpoint complete list. The task entry and task parameter table of the task retain sufficient task status information to allow the restart of the task. Task controller's functions at breakpoint time are to (1) gather all task entries on the breakpoint complete list associated with one breakpoint into an argument list, (2) move all associated command entries (CEs) to the command breakpoint waiting list, and (3) invoke the master controller debug component command sequence which services the argument list of task entries.

Upon the master controller debug component's completion of breakpoint servicing, command controller places the command entries back on the command processing list and task controller receives the task entries. If the task entry indicates the breakpoint halted this task during execution of the task code proper, the task is placed on the front of the high priority task processing list for restarting by master controller. If the breakpoint in another task caused this task to be terminated during the execution of a SCALL, the SCALL was allowed to complete and task controller places this task entry on the task complete list for SCALL servicing.

EXERCISE TASK FACILITIES

Task controller supports the master controller debug component by recognizing exercise tasks and servicing them in a special fashion. An exercise task is either (1) a task entered into the system after SYSGEN time on a temporary basis or (2) a system task which, during execution, will be treated as an exercise.

The task controller services for exercise tasks consist of maintaining an exercise task directory for those temporary tasks entered into the operating system by the master controller debug component user. The exercise task directory is a variable-length linked list of entries supplied by the master controller debug component. Each entry contains the exercise task's identification number as well as all of the information as specified for each system task in the system task directory, with the one exception being the disc address since exercise tasks will be central memory resident for the duration of their existence. Task controller accepts exercise task directory entries from the master controller debug, validates them with respect to their being central memory resident, in central memory flags, and enters them in the exercise task directory. Task controller also deletes entries from this directory upon request of the master controller debug component.

DISC CONTROLLER

Disc management is responsible for the processing of all ASC disc requests. Disc requests are composed of two major categories:

(1) disc data transfers and (2) allocation of disc space.

Disc input/output (DIO) controls the processing involved with I/O requests that require disc data transfers. Disc I/O validates disc I/O requests and builds the control blocks needed by the ASC hardware for disc data transfers. Disc I/O provides the means for scheduling of disc requests and for the optimization of disc requests according to their physical positions on the disc. Disc I/O monitors all disc I/O requests upon their completion by the disc hardware.

The disc assignment component (DAC) provides the capability to allocate disc space for user or system files. The disc assignment provides the means for recording the physical units of disc space allocated for a file, thus allowing the capability to "map" discontiguous units for a disc file. The disc assignment component also releases disc space for assignment when a file is no longer needed or required.

ACCESS CAPABILITIES

There is a collection of components which provides different levels of I/O control. The I/O components are:

(1) Fortran I/O (FIO), (2) Logical I/O (LIO), and (3) Disc I/O (DIO). Each I/O component is relatively independent; i.e., the interfaces between them are obtained through standard system linkages and control blocks.

The logical I/O central processor subroutine provides central processor (CP) users with a logical record file concept and removes the responsibility for physical block formatting of disc records from disc I/O. Fortran and assembly language programs use logical I/O to process their disc files. Logical I/O processing provides the user the capability to transfer records between disc and central memory (CM), therefore relieving the user of responsibility of making physical disc I/O requests.

Fortran I/O is a central processor subprogram that provides an interface component between the Fortran program and logical I/O. Fortran I/O is used only during execution of a program, and a separate copy of the required components of Fortran I/O is loaded with each central processor program.

Disc I/O (a logical name which represents a group of Operating System components responsible for disc Input/Output) provides the user capabilities to access or transfer to disc physical blocks of data. Once a file is open, the user may issue a command to access the disc file. The user communicates with disc I/O through commands (i.e., READ, WRITE) contained in standard control blocks. These commands and control blocks define the type of disc I/O requests and the extent of the user's access areas.

Disc management also provides the user a standard set of system procedures for defining a disc I/O request. These procedures are used by the central processor user to allocate control block space and to define the type of disc I/O request. The request control block (RCB) contains the control parameters necessary for executing a disc request. A facility is also available to chain or stack requests, but only one call is issued the system for serving the request. The system accepts the disc requests and passes them to disc input/output (DIO) for processing. Upon completion of the disc request the associated status is recorded in the request control block. A system service that tests for the completion of the disc request is provided to be called by the central processor program.

DISC MAPPING

The ASC system provides a means to map allocated disc space. "Mapping" the disc allows the user to employ virtual disc addressing, thus viewing a file as contiguous sectors on the disc. Virtual disc addressing eliminates the need to know the physical location of the allocated disc and makes that location transparent to the user.

The disc assignment component is responsible for managing the assignment of disc space and the subsequent mapping of the allocated disc space. The disc map for a file is contained in the file information block (FIB) and the disc I/O file information block (DIOFIB). The disc I/O file information block is a central memory resident table used by disc I/O to convert virtual disc addresses to absolute addresses for a disc request. The file information block is needed to retain a disc copy of the file characteristics and the disc map.

Virtual disc addresses for a disc file range from zero to some maximum. Due to virtual disc addressing the user never knows the physical location of a disc file. The disc space allocated for a disc file may be contiguous or discontiguous fragments of the disc. The following example illustrates the word format for virtual disc addresses:

```
64 WORDS    = 1 SECTOR
256 SECTORS = 1 BAND
```

| BAND | SECTOR | WORD |
|------|--------|------|

BITS 0        1/18    2526   31

The format of the virtual disc address allows the user to logically view a file as contiguous words. This is because the overflows resulting from a binary add will increment the sector or band fields as required. Thus there is no required need for individual fields for a virtual disc address.

FIG. 12 shows the relationship between the disc maps in the File Information Block, the virtual disc addresses, and the physical location of the file on disc. The example illustrated is one particular case of how a file has been allocated. For file A, there has been allocated three separate fragments of disc space. Each fragment allocated for file A has a corresponding map entry in the file information block. The first entry is disc map contains a channel entry which shows the channel address for the following map entries. The order of the disc map entries determines the order of the file. Each map entry gives the beginning absolute disc address for the associated disc fragment and the number of allocated quarter bands or whole bands. Also contained in a map entry is a field which shows the disc module address. The virtual disc addresses are converted to absolute addresses by starting with the first map entry and calculating the number of words associated with that entry. If the virtual disc address is within the calculated range, then the virtual disc address is associated with that disc map entry. If no match is found, the number of words for each disc map entry is added to the counter and compared to the virtual disc address until a match is found. Note that the total number of bands or quarter bands fields from all the disc map entries equals the maximum virtual disc address.

DISC INPUT/OUTPUT COMPONENTS

The task controller disc preprocessor and disc controller are logically combined under the heading of disc I/O to facilitate the following discussion.

The disc I/O system consists of two basic components:

(1) task controller disc preprocessor, and
(2) disc controller (DC).

The above mentioned components are serially reusable and are central memory resident code. Task controller disc preprocessor and task controller execute in the same virtual processor. Disc controller executes in its own dedicated virtual processor.

FIG. 13 illustrates the flow of a disc request and the interrelationship between disc controller and task controller disc preprocessor. To use this diagram, follow in order the alphabetical path and read the corresponding description:

(a) SCALL to task controller (TC) with a disc I/O request.

(b) task controller links the disc request on a list and passes control to the task controller disc preprocessor (TCDP).

(c) the task controller disc preprocessor validates the disc request, builds a communication area (CA), and links the communication area on a list which initiates the disc controller (DC).

(d) the disc controller schedules the disc request.

(e) the disc controller links the communication area on a disc channel list which drives the disc hardware.

(f) the disc request has physically been serviced by the disc hardware.

(g) the disc controller notes the completion of the disc request in the disc channel list.

(h) the disc controller delinks the completed communication area and shows completion of the disc request to the task controller.

(i) the task controller notes completion of the disc request and informs command controller.

(j) the program which issued the disc request is notified of completion or restarted if in a "Wait" state.

TASK CONTROLLER DISC PREPROCESSOR (TCDP)

The task controller disc preprocessor validates the user disc I/O request, allocates central memory to be used for communication areas (CA), and builds the communication areas that are used by the disc data channels for the actual transfer of data between central memory and the disc.

TCDP is a list driven component. A list entry is placed on one of three disc I/O request lists by task controller before TCDP is called. Task controller calls TCDP as a subroutine through the vector table. There are three priority disc I/O request lists, the highest priority being used for one inch streaming tapes. Although the list entry is the only form of input for TCDP, the list entry contains pointers to control blocks. These control blocks contain the information necessary to service disc I/O request.

TCDP validates all user I/O requests to insure proper use of the disc. Depending upon the type of disc I/O user, the TCDP validates the (1) request control block (RCB),
(2) file use,
(3) central memory use, and
(4) disc file appendages. When errors are detected during validation, the appropriate status is recorded and the request control block aborted.

Upon successful completion of a disc request validation, the TCDP then converts the user's virtual disc address to an absolute disc address. The virtual disc address is converted to an absolute disc address by using the disc map contained in the file information block (FIB) to calculate the physical location on disc. TCDP also determines if a discontiguous break in disc space has occurred by adding the number of words (to be transferred) to the beginning absolute disc address and then checking the disc map for that file. For every discontiguous disc break that occurs for an I/O request, there will be built a corresponding communication area.

Communication areas (CAs) are allocated and built by TCDP upon completion of request validation and absolute disc address calculations. The communication areas are used by the disc hardware to obtain the information that is required for the actual disc data transfers.

After being built, a communication area is linked on one of two lists which initiates disc controller processing. TCDP returns to the task controller when an error condition occurs or all communication areas have been built for a given request control block. When all the communication areas have been built for a disc I/O request (more than one request control block may compose a disc I/O request), the disc request list entry is removed from the TCDP input list and placed on an "in process" list.

One other function of TCDP is to provide the disc controller the linkages needed to relate completed communication areas to the originating

DISC CONTROLLER

The disc controller (DC) is composed of three major subcomponents:
(1) priority scheduler,
(2) post request processor, and
(3) disc optimization.

PRIORITY SCHEDULER

The priority scheduler is basically a "polling loop" which determines the order of events that are to take place in disc controller. The priority scheduler may also be considered as the nucleus of disc controller which initiates "actions". Actions are initiated as a response to some scheduling decision. The three major action groups are:
(1) scheduling and linking communication areas on the disc channel lists (disc optimization),
(2) completion of disc I/O requests (post request processor), and
(3) error processing.

There are three basic inputs that priority scheduler uses in the analysis for the determination to start an action:
(1) the communication area input lists,
(2) completed communication areas on a channel list, and
(3) detection of communication register (CR) file error conditions. Any severe system error conditions that are detected will be processed first and cause the disc controller to stop processing. When a parity error is detected for a completed communication area, priority scheduler will reschedule the communication area so the error may be corrected. Part of priority scheduler's work is to determine if any CAs have been completed by the disc hardware. If a high priority CA on a disc channel list has been completed, then priority scheduler will schedule this communication area (CA) for postprocessing before entries on the CA input lists. There are two priority CA input lists in which entries are supplied by task controller disc preprocessor. The priority scheduler will schedule the highest priority list entries first for processing. In summary, priority scheduler provides the analysis necessary to determine what action is to take place next in disc controller.

DISC OPTIMIZATION

Disc Optimization is activated by priority scheduler as an action. The basic function of disc optimization is to schedule and link communication areas on the disc channel list for disc hardware processing.

The majority of disc optimization's work is done in the scheduling of communication areas. Scheduling is basically determining the placement of a communication area on one of the disc channel lists according to:
(1) a communication area's priority,
(2) the first-in-first-out (FIFO) method,
(3) the current physical position of the disc in relation to disc head, otherwise known as the shortest-access-time-first method, and
(4) the size of the data transfer. As a result of scheduling, communication areas are not necessarily placed on the disc channel lists in the same order as received from task controller disc preprocessor. Some previously scheduled communication areas (non-priority) can have their positions altered on the disc channel lists by disc optimization. Sector addressing conflicts between (previously scheduled) non-priority communication areas and a priority communication area (that is yet to be scheduled) can cause the repositioning of non-priority communication areas on the disc channel list so the priority communication area can occupy that contested position. Priority requests are scheduled first because they are time dependent. When a communication area has been scheduled and linked on a disc channel list by disc optimization, control is returned to priority scheduler.

POST REQUEST PROCESSOR

The post request processor is initiated by the priority scheduler when the decision has been made to process a completed communication area from one of the disc channel lists. The post request processor processes completed communication areas by:
(1) monitoring the completion of the total disc request,
(2) special processing for the streaming of seismic tapes,
(3) calculating the current end-of-file (EOF) after writing data to the disc,
(4) releasing central memory resources used for communications areas' construction, and
(5) detecting and recording error conditions.

Post request processor is primarily responsible for completion of the total disc I/O request. In the majority of disc I/O requests, there will be associated several communications areas. Since the scheduled communications areas for a given disc request will complete at different points in time, there must be provided a method to record communications areas completions. FIG. 13 illustrates how post request processor controls the completion of a dic request.

The arrows (PTR) illustrate the linkages provided for post request processor to access the different control blocks associated with a disc request.

(a) a list entry is provided for each disc I/O request, (b) the request control block counter is associated with each disc request and denotes the number of request control blocks to be processed. When all communications areas have been completed for a given request control block, then the request control block counter is decremented by one. If the request control block counter equals zero, then the disc request has completed.

(c) a master communications area is built for each request control block and is used to control communications areas completions for the request control block. The master communications area also provides a point of collection for status information.

(d) the communications areas counter is contained within the master communications area and shows the number of outstanding communications areas for a request control block. When a communications area completes, the communications area counter is decremented by one. If the communications areas counter equals zero, then all communications areas have been completed for request control block.

Upon completion of a disc I/O request, post request processor passes the completed request to task controller and returns control to priority scheduler.

SYSTEM PROCESSING LEVELS

The steps or operations involved in the processing of jobs by the ASC Operating System (OS) are designated by five distinct levels: Jobs, Steps, Command Sequences, Commands, and Tasks.

Job processing provides Operating System (OS) service for jobs and involves the recording, scheduling, activating, controlling, and accounting services. Processing accomplished for jobs can involve any of the lower processing levels; i.e., Step, Command Sequence, Command or Task.

Step processing deals with loading a Central Processor (CP) step into Central Memory, providing a map of the Central Memory assigned for that step, exercising control in placing the step in execution, and providing system services for the step in execution.

Command Sequence processing involves the performance of a unit of work by Peripheral Processor (PP) components. Command Sequences are scheduled by the Command Controller. Command Sequences may be requested by components processing for the job, components processing a service request made by a CP Step, or by any command which determines that a command sequence must be performed to complete work requirements.

Command and Task processing concerns the scheduling and execution of work in the PP. A command is a group of tasks. Tasks are relatively small units of code which may be scheduled to execute in the PP.

Each of these five processing levels is defined and a description of the processing is discussed in more detail under topic headings which correspond to the particular level.

In order to facilitate processing at various levels, the controllers construct activation records. An activation record is a data structure used by the Operating Sytem to record and subsequently initiate a unit of work.

Activation records contain data used in scheduling, recording, controlling, and initiating a unit of work by the OS. A Job Entry (JE) and Job Parameter Table (JPT) are created for each job before the job is read into memory. The JE and its corresponding JPT form the activation record for a job. In a like manner, other activation records such as a Command Entry (CE) and Command Parameter Table (CPT), Step Entry (SE) and Step Parameter Table (SPT), and Task Entry (TE) and Task Parameter Table (TPT) are created before the activation of each Command, Step or Task, respectively. All activation records for Commands, Steps or Tasks associated with a particular job are linked to the activation record for that job. Command Controller creates the activation records for Jobs, Commands, Steps, and the first Task of any Command which is to be initiated. Task Controller creates the activation record for subsequent Task initiations.

Command and Step activation records are linked from the Job Entry (JE). Activation records for a Command may be associated with the activation of a Step, or only with the processing of the job. Each Command Entry (CE) contains a field which defines whether the activation record for that command is associated with the step or with processing of the job.

There are three distinct ways in which activation records are used. They are used to:
1. connect interrelated records on the same level.
2. link lower processing levels to higher processing levels.
3. provide a reentrant data base.

JOB PROCESSING

A Job is a structure within which a user requests units of work to be performed. Jobs processed by the ASC Operating Sytem are either local batch jobs (input from on site devices) or terminal jobs (input to the ASC from a terminal computer). Batch jobs received by the ASC from a terminal are called remote batch jobs. A batch job is represented by the Job Specification Language (JSL) between the "JOB" JSL statement and the "END" JSL statement.

Terminal jobs are not necessarily batch jobs. There are four types of Terminal jobs, the Terminal Operating System Job, the Minimal Interactive job, the Interactive Job, and Terminal Batch Jobs. The Terminal Operating System Job is used to "bring up" a Terminal. The Minimal Interactive Job is used to schedule interactive sessions (communication between the ASC and terminal user). The Interactive Job is created by the Mineral Interactive Job or another Interactive Job and makes a wide variety of services available to the interactive user.

Job Processing involves response by the ASC Operating System to system service requests. System service requests issued for a job are related to the hardware in the following manner: Job Specification Language statements are placed on disc, files needed by the job are accessed by means of the disc, peripherals may be used in moving files to and from disc, and the processing activities could make demands on the Virtual Processors and the Central Processor.

Before a job can be initiated by the Operating System, an activation record for the job must be created. The activation record for a job consists of a Job Entry (JE) and a corresponding Job Parameter Table (JPT). As a job is processed, its Job Entry is linked to various lists. These lists are contained in the System Vector Reference Table and are designed to record the current status of each job.

JOB ENTRIES

Before a job is initiated by the ASC Operating System, a Job Entry is created to record the job. Job Entries are Central Memory cells allocated by the Command Controller and linked to lists pointed to by the System Vector Reference Table. As a job is processed, system control components delink its Job Entry (JE) from one list and link that Job Entry (JE) to another list to reflect the current status of that job. These lists to which Job Entries are linked are used for scheduling further processing of jobs.

Each Job Entry contains a unique Job Identifier assigned by the Command Controller when the Job is initially activated. Other job related information contained in the Job Entry, which is used by the controllers, reflects the priority and status of the job.

JOB PARAMETER TABLE

Associated with each Job Entry is a Job Parameter Table (JPT). Each JPT provides linkage parameters to various job related data. The Command Controller allocates and links each Job Parameter Table (JPT).

The JPT is composed of an Overhead Area used primarily by the controllers and a Data Control Area used by controllers and system components. The Overhead Area of the JPT contains information about the current JPT size and information about Central Memory allocated to the job for system tables used by system components. The Data Control Area of the JPT contains table pointers, linked list headers, and data constants.

The Job Parameter Tables provide system components the necessary linkages to access Job Specification Language statements, terminal reservation information, the Job File, synonyms defined for cataloged files, Job Log messages, output print/punch files, and other information associated with particular jobs.

PROCESSING BATCH JOBS

A batch job is an arbitrary unit of work defined by the user. Scheduling decisions are made to input as many jobs as can be supported by the available resources. A backlog of work allows scheduling work to keep the Operating System active. If jobs and resources are available, a backlog is created. Multiprogramming can occur as the various system components may be processing for various jobs concurrently.

When the Operating System determines that the resources are available to input a job, the Operating System creates a Job Entry and Job Parameter Table, initiates the system components which activate an input device, and places the source Job File on disc. The Job Entry is linked to the Job Input List while the job is being read in. After the statements for a particular batch job have been read in, the Job Entry for that job is moved to the Source Job List. The existence of a Job Entry in the Source Job List indicates that the input is complete and that the job is awaiting translation of its Job Specification Language to Internal Job Specification Language (IJSL).

JOB SPECIFICATION LANGUAGE TRANSLATION

The Job Entry for a particular job remains linked to the Source Job List until the Job Specification Language (JSL) Translator can be scheduled to convert the JSL statements to Internal Job Specification Language (IJSL). It is a major scheduler decision to activate the JSL Translator since the Translator can require a large amount of system resources. Upon activation of the Translator, the Job Entry is delinked from the Source Job List and linked to the Job In Transit List. The Job In Transit List signifies that the Job Specification Language is currently undergoing translation.

The JSL Translator puts a print image of the source JSL in the Job Log and puts IJSL into the Job File.

When the translation processing is completed for a job, that job's Job Entry is delinked from the Job In Transit List and linked to the Internal Job Statement List. Job Entries linked to the Internal Job Statement List represent jobs which are awaiting the job execution preparations or "preprocessing" that must be accomplished by the Operating System before the job can be placed in execution.

JOB EXECUTION PREPARATION

Preparing a job for execution (preprocessing) involves four things. They are: (1) providing a disc copy of every catalog that will be needed by the job, (2) informing the operator what tapes (if any) will be required, (3) building access name entries for job level disc files, and (4) making a preliminary scan of the job's IJSL to gather scheduling data. To begin these services, the Job Entry is delinked from the Internal Job Statement List and linked to the Preprocessing List. Subsequently a system component (the IJSL Analyzer) is called to gather scheduler information and activate catalog look-up statements. Catalog look-up involves providing a disc copy of catalogs needed by the job and providing the operator a display regarding tapes that will be needed by the job. Analysis of the IJSL also provides information about resources, such as disc and peripherals, which will be used in scheduling the job for execution.

Multiprogramming becomes more significant during the preprocessing stages. While the Operating System is executing a job, several jobs may be in the preprocessing state. For instance, the Operating System notifies the operator of external events that must take place so that the job, when it is placed in execution, will not have to wait for that external event (such as finding a tape) to occur. Different jobs make different demands on system resources and during preprocessing requirements for more resources that are available may cause a job to wait while subsequent jobs are scheduled for execution. Catalogs required by a job which are not disc resident can delay that job because a tape must be mounted to bring the catalog from tap to disc.

Completion of the Preprocessing of a job is detected by the IJSL Analyzer. Subsequently, that job's Job Entry is delinked from the Preprocessing List and linked to the Job Execution Ready List. A Job Entry linked to the Job Execution Ready List effectively notifies the Command Controller that the preprocessing for that job is complete and the job is awaiting execution.

JOB EXECUTION

The Command Controller examines that Job Execution Ready List to schedule jobs for execution. The Command Controller determines whether or not the resource requirements for the job can be met at this time. If the resources are available, the job is scheduled for execution. This is a critical scheduling point because it is when the job is placed in execution that the largest demand for system resources (in particular disc and Central Memory) occurs. When a job is scheduled for execution, that job's Job Entry is delinked from the Job Execution Ready List and linked into the Active Job List. To start the execution of a job, the Internal Job Specification Language (IJSL) Analyzer is activated by the Command Controller.

IJSL statements are processed sequentially. The IJSL Analyzer may be activated several times during the execution of a job. Activation of the IJSL Analyzer causes a Command Sequence Request Entry to be built (See Command Sequence Processing SRD) which will cause processing to continue at a lower level (i.e., command sequence processing). The Command Sequence initiated by the IJSL Analyzer may cause execution of a job, the IJSL Analyzer may also be activated to initiate Film Management command sequence requests which provide File I/O and access capabilities. Files which must reside on disc for CP Step access are provided on disc through File I/O in the order specified by IJSL. File I/O may require mounting of tapes requested for readiness during preprocessing. In summary, the IJSL Analyzer is called to analyze each IJSL statement and initiate that command sequence request which will perform the processing specified by the IJSL statement. Each IJSL statement is completely processed before the next IJSL statement is examined.

The detection of the "EOJ" IJSL statement by the IJSL Analyzer signals the completion of the job's execution and causes the Job Entry for that job to be delinked from the Active Job List and linked to the Job Termination List. Linking a Job Entry to the Job Termination List causes the Command Controller to schedule job termination processing components.

JOB TERMINATION

Termination of a job involves printing the Job Log and outputing print and punch files created for the job. For terminal batch jobs, the output is routed the appropriate terminal or on site peripheral device. Job termination causes removal of system data structures representing that particular job activation. During the job termination, all Job Local Files for that particular job are closed and the files' disc space is released to the Operating System. Completion of the Job Termination processing causes the Job Entry for the terminated job to be delinked from the Job Termination List and linked to the Job Termination Complete List. The presence of a Job Entry on the Job Termination Complete List signals the Command Controller that a job has been processed and terminated. Subsequently Command Controller delinks that Job Entry and releases the Central Memory associated with that Job Entry to the Operating System.

SUMMARY OF JOB PROCESSING

Table SDL1 illustrates the lists on which a Job Entry may be linked and the processors involved which use and move Job Entries. To use the diagram, follow in order the alphabetical path and read the corresponding description.

(a) A job is ready for input, a Job Entry is created.
(b) The Job Entry is linked to the "Job Input List."
(c) The Job Input Stream Reader is invoked to read; the job is read to disc.
(d) The Job Entry is delinked from the "Job Input List" and linked to the "Source Job List."
(e) The Job Specification Language (JSL) Translator is scheduled and the Job Entry is delinked from the "Source Job List" and linked to the "Job In Transit List."
(f) The source JSL is translated to Internal Job Specification Language (IJSL).
(g) The Job Entry is delinked from the "Job in Transit List" and linked to the "Internal Job Statement List."
(h) The Job Entry is delinked from the "Internal Job Statement List" and linked to the "Preprocessing List."
(i) The IJSL Analyzer is called to perform preprocessing (catalog look-up).
(j) The Job Entry is delinked from the "Preprocessing List" and linked to the "Job Execution Ready List."
(k) The Job Entry is delinked from the "Job Execution Ready List" and linked to the "Active Job List" when the Command Controller schedules the job for execution.
(l) The IJSL Analyzer is again initialized and requests execution of IJSL statments.
(m) After all IJSL statments have been analyzed, the IJSL Analyzer links the Job Entry to the "Job Termination List."
(n) The Job Termination Processes output system files for the job and provide system cleanup.
(o) The Job Entry is delinked from the "Job Termination List" and linked to the "Job Termination Complete List."
(p) The Job Entry is removed; the job has been processed.

TABLE SDL1

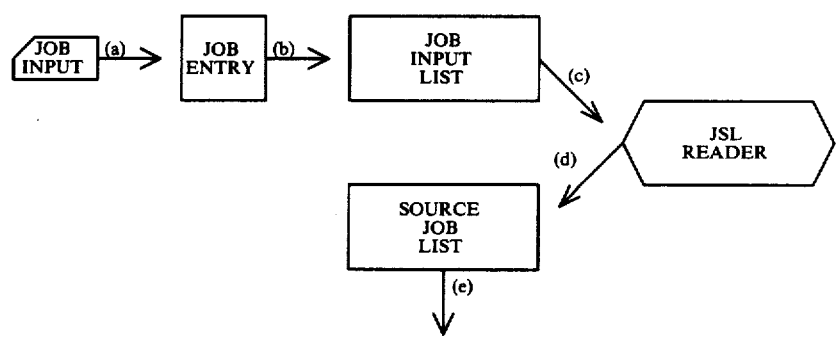

TABLE SDL1-continued

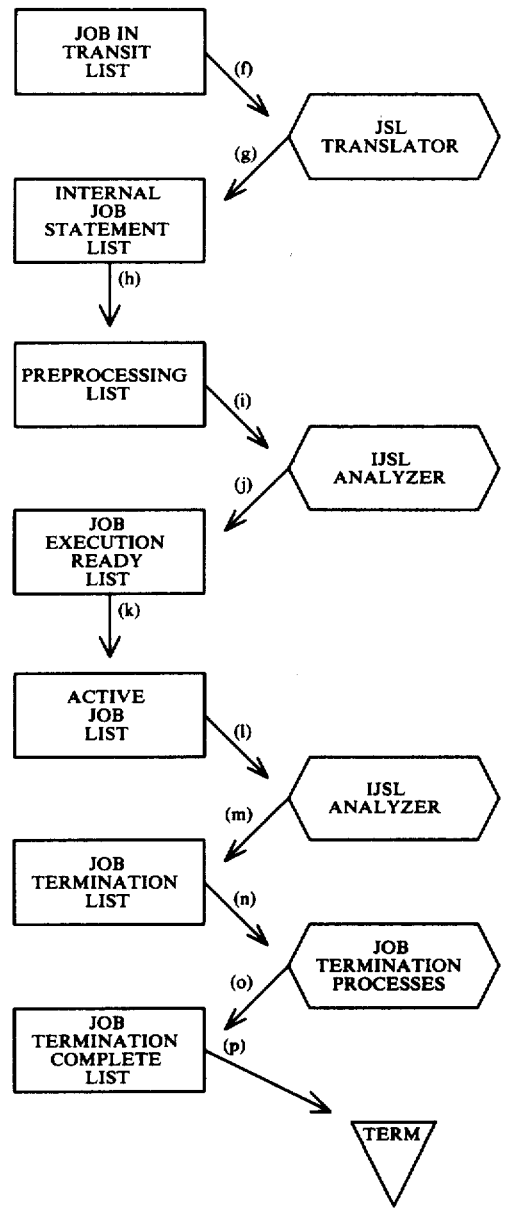

TERMINAL JOBS

Terminal Jobs are input to the ASC Operating System from a terminal computer. A terminal computer may not have resources available or the facilities within the Terminal Operating System (TOS) to process the terminal users' jobs. However, the Terminal Operating System linked to the ASC Operating System provides the terminal user a means to utilize all the facilities and resources available to local jobs processed by the ASC Operating System.

The ASC Operating System is designed to accomodate terminal jobs. System data structures are used for controlling the terminal jobs related to a terminal for which the ASC Operating System is performing work.

All active terminal structures are linked to the System Vector Reference Table to provide convenient access for the ASC Operating System. There are three types of terminal jobs. They are, the Terminal Operating System Job, Terminal Batch Job, and Interactive Job. These jobs will be described subsequently. Activation records for Terminal Operating System jobs are linked on a System Vector Reference Table list. All other active terminal jobs are linked to the job activation record of the corresponding Terminal Operating System Job. When a terminal job terminates, its output will be routed for transmission to the destination terminal.

TERMINAL OPERATING SYSTEM JOBS

The job structure created (by the ASC Operating System) for a terminal computer which must be linked to the ASC is a Terminal Operating System (TOS) job. The Terminal Operating System (TOS) makes a request to be linked to the ASC Operating System. This request from the TOS causes the ASC to provide the necessary job structures required for terminal processing (i.e., a TOS job structure). An active TOS job signals the ASC Operating System that a particular terminal is active. More than one ASC terminal may be active, and each active terminal will have a Terminal Operating System job.

Once a TOS job has been activated, the Terminal Operating System (TOS) will be allowed to submit terminal service calls to request ASC services. Some of the TOS service requests are to create terminal job structures, to perform ASC disc to terminal (TOS) data transfers, to cancel terminal jobs, and to dispose of output for terminal jobs. These service calls are processed as a part of the Terminal Operating System's job. Only service calls requesting ASC services are processed for the TOS job (i.e., no Job Specification Language statements are processed for TOS jobs).

TERMINAL BATCH JOBS

Terminal batch jobs are processed by the ASC Operating System by utilizing the same processing techniques as described for local batch jobs. However, terminal batch jobs are associated with the Terminal Operating System job which submitted the terminal batch job. This association is maintained until the job terminates, at which time the job's output is routed for transmission to destination terminal.

INTERACTIVE JOBS

An interactive job is an ASC job which may require terminal user action to specify the processing to be performed for that job. In order to accomodate this requirement, the terminal user will conduct an interactive session associated with his interactive job. An interactive session is a period of time in which the terminal user has an interaction link to his interactive job.. Upon proper identification of his interactive job to the ASC Operating System, the terminal user can have his interactive session activated. During an interactive session, the terminal user may specify the processing to be performed for his interactive job. If his interactive job is a Standard Interactive Job, he may communicate with a step of that job.

The Standard Interactive Job and the Minimal Interactive Job are two types of interactive jobs. The Standard Interactive Job provides four basic capabilities to the terminal user during his interactive session: (1) The terminal user may request ASC disc-to-terminal or terminal-to-ASC disc data transfers, (2) JSL statements may be input to be processed for an interactive jobs, (3) Standard Interactive Job structures for future interactive sessions may be created, and (4) The terminal user may cancel his CP step, terminate his interactive session, or cancel his interactive job.

The Minimal Interactive Job provides the terminal user with the basic capability of creating a Standard Interactive Job structure and submitting the initial JSL statements to be processed for that job. The purpose of a Minimal Interactive Job is to allow the terminal user the minimum resources necessary to create a Standard Interactive Job (The Standard Interactive Job may require considerably more resources). A Minimal Interactive Job is minimal in the sense that no JSL statements will be executed, and the only ASC disc required will be that disc necessary to submit the JSL statements for the Standard Interactive Job.

The terminal user may need more capabilities and resources than are provided to his Minimal Interactive Job. Therefore, he may convert his Minimal Interactive Job to a Standard Interactive Job by requesting and receiving more resources, or he may create a Standard Interactive Job in order to conduct a more sophisticated session at some delta time in the future.

STEP PROCESSING

A Step is defined as a collection of program units link edited to form an executable module which is characterized by execution in the Central Processor (CP), being called by a Job Specification Language (JSL) statement, and residing after intiation in Central Memory (CM) or residing in a wait state on disc (swapped out). Step processing involves determining the amount of Central Memory (CM) required for the CP Step to execute, reading the load module into Central Memory (CM) from disc, building a map CM assigned to the Step, setting the protect registers for use of the hardware, and releasing resources used by the Step.

The basic functions of Step processing are Step preparation, loading the Step, executing the Step, and terminating the Step.

STEP ENVIRONMENT

Steps are executed in the Central Processor (CP), but require system services from the Peripheral Processor (PP). Before a Step can execute, system components examine the Internal Job Specification Language and allocate resources needed by that Step.

The Central Memory allocated for a Step is mapped by Peripheral Processor system components to provide the parameters needed to load that Step. Once a Step is loaded into CM, the Task Controller notifies the Command Controller that the Step is loaded and ready for execution. Subsequently, Command Controller initializes execution of that Step.

During step processing, a Step Entry and a Step Parameter Table are built for each step.

A Step Entry (SE) and an associated Step Parameter Table (SPT) form the activation record for a Step.

STEP ENTRY

Each Step Entry (SE) contains a Step identifier and a pointer to the Step Parameter Table (SPT) associated with that Step. Information concerning the priority and status of the Step are contained within the Step Entry. Each Step's Step Entry is linked to the Job Entry of the Job from which that step is taken. Once the Step Entry is linked to the list to which the Entry points, the SE contains a forward and backward pointer to the successor and predecessor entries, respectively. The successor (forward) entry may be a Command Entry, Step Entry, or Job Entry. If the successor entry of the SE is a Command Entry, a service request has been issued by that step and a command has been activated to process that serivce request. If the successor entry of the SE is another SE, no service requests are outstanding for the particular step, but another step of the job has been activated. If the successor pointer is to the Job Entry, the SE is the last entry in the linked list and no service request are active for the step and no other steps of the job are active.

The predecessor (back) pointer points to a Command Entry if a Command is in execution for a previous Step or system component, to a Step Entry if a previous Step is in execution and has no outstanding service calls for system components, or to the Job Entry if no previous Commands or Steps are currently being executed.

In summary, Step Entries and Command Entries are linked to the Job Entry of the Job for which the Step or Command is executed. The order in which Steps and Commands are linked is significant. Command Entries which are a result of a system service request by a Step are linked as a successor to the Step Entry of the Step which made the service request. Command Entries linked to the Job Entry prior to a Step Entry signify system processing for the job not associated with a particular Step.

STEP PARAMETER TABLE

The Step Parameter Table (SPT) is a Central Memory Table which consists of an Overhead Area and a Data Constant Area.

The Step Parameter Table (SPT) overhead area in addition to a SE pointer and SPT size is utilized by the Master Controller when service calls are processed for the Step. The SPT does not contain any Command Sequence Table information. The Master Controller scratch area, the size, the SE pointer, and the argument table pointer constitute the Overhead Area of the SPT.

The Data Constant Area of the SPT contains information about the Internal Job Specification Language (e.g., the load module header length and virtual disc address, a pointer to the load module, the CP execution time specified by the Job Specification Lauguage, the Load Module File access name and member name), the load time parameter vector length and virtual disc address, the file information vector length and virtual disc address, the character string information vector length and virtual disc address, and the run time parameter vector.

The SPT also contains other information about the Step. The step local file Access Name List header resides in the SPT. If a command is waiting for the Step to complete execution a waiting command CE pointer is found in the SPT. The SPT also contains a pointer to the Job Parameter Table (JPT).

PREPARING THE STEP

The processing of a Step begins when the Internal Job Specification Language (IJSL) Analyzer encounters an Execute IJSL statement. The IJSL Analyzer builds a Command Sequence Request Entry which is placed on the Command Controller's polling loop to cause execution of the Step preparation system components.

The primary function of Step preparation is the determination of all Central Memory requirements necessary to load a Step.

The Step preparation system components examine the IJSL to determine the access name of the Load Module File output by the Linkage Editor. The Load Module File contains a Load Module Header which contains a virtual disc address of the load time parameter table. The load time parameter table contains parameters used in conjunction with the load time parameter vector in the Execute IJSL and the JSL Variable Table to establish the length of any variable arrays. The Load Module Header contains the basic load module length which establishes the Central Memory requirements for the Step provided no variable length arrays are included for the Step. If the step contains one or more varible length arrays, the basic load module length and variable length arrays' Central Memory requirements are added to determine the overall Central Memory requirement for loading the Step.

After the calculation of Central Memory requirements and before loading a Step, the Step Entry is created for that Step and linked to the Job Entry with which that Step is associated. Subsequently, the Command Controller issues a large memory request for loading the Step to the Task Controller. The larger memory request is made through a Task Entry built by the Command Controller. After the memory has been reserved, system components are initiated to load the step.

STEP LOADING

The Task Controller obtains large memory requests through the "Large Memory Request List" and subsequently reserves the Central Memory requested. After the Central Memory required to load a Step has been reserved, a system component, the Loader, is initiated to load the Step into Central Memory. The Loader is scheduled and initiated by the Command Controller through an interface with the Task Controller.

The Loader obtains the pages of Central Memory reserved for the Step, constructs these pages into a Central Memory map, and establishes the protect registers. The protect registers contain virtual addresses used by system components to insure that memory accessed by the CP user is within the specified protect category of that user's allocated Central Memory.

After the Central Memory map is built and the protect registers are set, the CP user's text is read into Central Memory from disc. The user's text (program) exists on disc in the "Load Module File" output by the Linkage Editor. Header information and text maps provide the information necessary to read text from disc to Central Memory (CM). Text maps contain virtual disc addresses of the user's text which is to be loaded and virtual CM addresses of where the text is to be stored. The header information of the Load Module File contains a virtual disc address to the Load Time Parameter Table. The loader obtains the load time parameters from the Load Time Parameter Table vector and/or JSL Variable Table and places them into the user's program text at load time.

Load time parameters may specify one or more dimensions of variably dimensioned arrays. The Load Time Parameter Table contains a virtual CM address designating where the address of the Central Memory allocated for an array is to be stored. The loader uses the virtual address in the Load Time Parameter Table to store the starting virtual address of an array in the user's text.

In summary, the load time parameters provide the capability for the user to access arrays of a variable length and to specify constants in the program text.

After a CP Step is loaded into memory, a Step Parameter Table (SPT) is built. The Step Parameter Table (SPT) is used by the Controllers in processing service calls generated by the Step and by the step termination processing. The SPT is built and subsequently linked to the Step Entry by the Loader.

The Loader stores information in the SPT about run time parameters which may be used by the CP Step during execution. The loader stores the run time parameter vector of the Execute IJSL in the SPT. All run time parameters for a step are specified in the run time parameter vector as either a constant or an index into the JSL Variable Table. The CP Step may generate a service call to access the run time parameters at execu tion time. Run time parameters may be passed from step to step through the JSL Variable Table.

The Loader also obtains the starting address for the CP Step program from the Loader Module File header. The starting address is subsequently placed in a save area that will be utilized by the hardware to cause execution of the Step in the Central Processor. The Loader puts a pointer to this save area into the Step Parameter Table. Once the Loader has loaded a CP Step and built the Step Parameter Table, the Loader is terminated and control is returned to the Command Controller to make a scheduling decision.

Command Controller links the loaded Step's Step Entry on a "CP Request List". Command Controller components examine the Step Entries on the CP Request List for priorities and scheduling, and links the Step Entry to the "Cp Execution List". The Master Controller takes a Step Entry from the CP Execution List and puts that Step Entry at the "Primed Step" location. The Master Controller obtains map and protect area pointers from the Step Parameter Table and subsequently stores these pointers in dedicated Central Memory locations. These pointers are used by the Central Processor (CP) Hardware for loading the CP internal registers prior to Step execution. The Master Controller also sets bits used by the maintenance logic to cause the CP to start execution of the CP Step.

EXECUTING THE STEP

When the Master Controller recognizes that the Step is in execution, Master Controller places the executing Step's Step Entry (SE) in the "Step Active" location and primes the next Step for execution.

Service Calls made by CP Steps in execution for system services may cause a "context switch" to occur. The context switch occurs when the CP execution of the Step must wait for system services to be scheduled and performed by the Peripheral Processor (PP). A content switch causes the SE of the Step in execution at the time of the context switch to be placed on the "Step Waiting List", and the next primed Step will begin execution in the CP.

A service call for system services may indicate that the CP execution of the Step is complete, which causes step combination processing to begin. A service call for system services which indicates at CP execution of the Step is not complete causes the Step to be reprimed if a context switch has occured. A Monitor Call and Wait (MCW) or a WAIT statement will cause a context switch to occur.

There are a large number of service calls for system service that can be issued by the CP Step. Some examples are:

(1) a request to open a file,
(2) a request to read from a disc file, or write to a disc file,
(3) an overlay request (this would invoke the Loader), or
(4) a request for run time parameters.

Run time parameters may be accessed during the execution of the Step to make a decision or for computations. Run time parameters can be specified on Job Specification Language (JSL) statements.

TERMINATING A STEP

Step termination involves releasing resources obtained by the Step. All files opened by the step but not closed by the step are closed by the step termination process. All step local files are released. Some files cannot be released because they are job local, i.e., may be used by another Step of the job, and others because they are system created output files which are to be output when the job terminates.

The step termination processes also examine the IJSL to determine whether or not a dump has been requested. If a dump is required, a disc file is created which is a copy of the Central Memory used by the Step.

After all files opened by a Step are closed (and a disc copy made of the dump file if requested), all the pages of Central Memory allocated for the Step's execution are released to the system.

COMMAND SEQUENCE PROCESSING

A Command Sequence is a predefined sequence of commands which performs a specific system function. Some examples of system functions which involve command sequences are cataloging files, preprocessing Internal Job Specification Language (IJSL) statements, are initially allocating disc space for files.

A command is a sequence of tasks that forms a unit for scheduling purposes.

Command sequences allow commands to be scheduled in different contexts without modification of the particular commands. Direct calls between commands restrict the execution of a command to a specific context. However, command sequences (and an associated Command Sequence Table) provide a high level of flexibility and modularity within the ASC Operating System.

Command sequences define and identify the functions that are performed by the system, and the Command Sequence Table (CST) associated with each command sequence is the implementation of that command sequence. A system function may be specified by selecting (from the set of available commands) the commands needed to perform the functions, and subsequently specifying with the Command Sequence Table the order of execution and the data disposition of the selected commands.

COMMAND SEQUENCE TABLE

Each Command Sequence Table (CST) contains an entry for each potential command which may be activated in the sequence. The Command Sequence Table specifies the order of execution and the data disposition of each command. A particular command may be activated more than once within a command sequence. Each entry in the Command Sequence Table contains a pointer to the command associated with that entry. Only commands and Command Controller subprograms will constitute the entries of the CST. (Command Controller subprograms are defined and discussed as a part of Command Controller, SRD)

The CST cannot be created or constructed independently of the construction of the commands. Commands and CSTs are interrelated and one does affect the other.

COMMAND SEQUENCE TABLE DIRECTORY

The Command Sequence Table Directory (CSTD) is Central Memory (CM) resident and contains a five word entry for each Command Sequence.

Each CSTD entry contains a pointer to the one CST associated with a corresponding command sequence. The CSTD entry also contains scheduling information and related command sequence resource requirements.

The CSTD is required because any CST may or may not be CM resident.

COMMAND DIRECTORY

The Command Directory is the complete directory for all the commands known to the Operating System. The Command Directory contains information required to activate and schedule a command. Command Sequence Table entries point to the commands within the Command Directory.

COMMAND SEQUENCE REQUEST ENTRY

Activation of a command sequence may be initialized by various system components. Any system component initiating a command sequence must either cause a Command Sequence Request Entry (CSRE) to be created or create a CSRE and place the CSRE in the Command Sequence Request Queue of the Command Controller. The CSRE contains an index to the entry in the CSTD which represents the requested sequence. The CSRE also contains information linking the request to the job and caller, and may provide an argument table pointer.

Table SDL2 outlines the relationship between a Command Sequence Request Entry, the Command Sequence Table Directory, the Command Sequence Tables, and the Command Directory.

The identification field of the Command Sequence Request Entry refers to a Command Sequence Table by the use of the Command Sequence Table Directory. A particular CST details the sequence of commands necessary to perform the desired function. Note that in the Command Directory there is only one entry per command, but that this command may be referred to by several different CSTs or by various entries within a single CST.

monitoring the progress of a function. Command Controller is a table driven mechanism such that, given a completely different set of Command Sequence Tables or commands, entirely different system functions could be monitored and controlled by the Command Controller with few modifications of the Command Controller. For this reason command sequences add flexibility to the ASC Operating System.

The Master Controller, Task Controller, and Disc I/O Controller are directly involved with the Command Sequence concept. When a controller determines that a system function must be performed, a Command Sequence Request Entry is built by that controller and placed on the Command Sequence Request Queue of the Command Controller. Command Controller subsequently uses the request queue to initiate a command sequence.

A command or a Command Controller subprogram may request another system function to be processed which is a command sequence. For example, if a command in the process of execution determines that another system function must be executed, that command has the capability to request a command sequence. Procedures are provided which allow commands to initiate command sequences.

Command Sequences hold a unique position in the processing level structure in that command sequences do not have activation records. However, the Command Entry and Command Parameter Table of the command that is currently being executed (within the command sequence) could be considered to be the activation record for that command sequence. Data can be passed from command to command via the Command Parameter Table.

COMMAND EXITS

TABLE SDL2

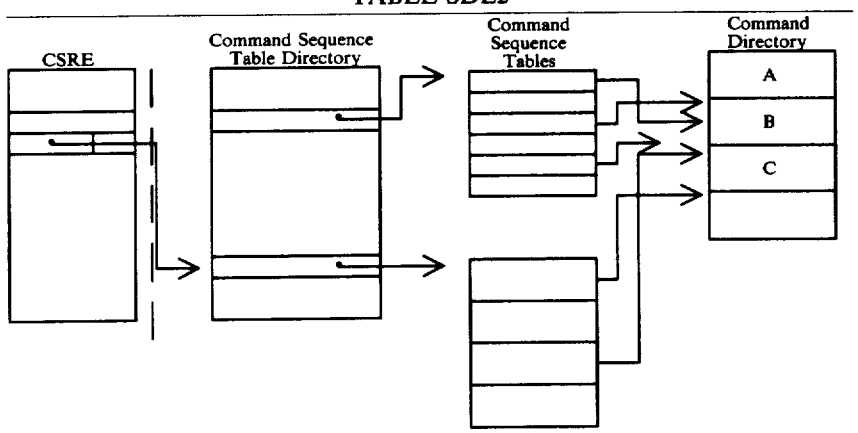

USAGE OF COMMAND SEQUENCES

Basically a command sequence is a means of implementing work by the Operating System. Command sequences are interrogated and used by the Command Controller, but Command Sequences may be initiated or requested by any Controller (Master Controller, Task Controller, Command Controller, and Disc I/O Controller) or by Commands and Command Controller Subprograms.

The sequence tables provide a means for directing and specifying command initiation. Sequence Tables may be referenced by the scheduling procedures of the Command Controller and may also serve as a means for Each command has one or more exits drained in the CST. Each executing command determines the exit to be taken upon termination of that command. Each exit causes the next command in the sequence to be activated. The command sequence terminates with a special entry in the CST. This entry initiates command sequence cleanup procedures and specifies the next command sequence. The maximum number of exits allowed is 255. Each exit defined for a command is required to point to another entry in the same CST. Exits allows looping or branching at the command levels and provide Operating System flexibility at the command sequence level.

FUNCTION CODES

A function code in each CST entry may be used to specify a different operating procedure for the command. This allows the particular command to examine the function code to determine the code within the command to be executed. In this way, the function code provides flexibility at the command level.

DATA DISPOSITION

Each CST entry defines the data disposition for a command when that command is activated or exits. For example, the Command Parameter Table (CPT) of the previous command may be passed to the new command, pushed into the CPT stack, or released to the system. The Task Entry (TE) and Task Parameter Table (TPT) of the previous command may also be saved or released. These capabilities provide considerable flexibility in the system, not only in the data structure but also in the control structure of the command. For example, if the previous CPT is pushed and the TE and TPT are saved, then the command when reactivated will begin at call plus one. This provides a procedure similar to a subroutine call, but at the command level. However, if the CPT is pushed and the TE and TPT are not saved, then reactivation of that command will begin at its initial task. By changing the data disposition requirements, changes may also be made in the control exercised for the command.

It should be noted that if the CPT is pushed and the TE and TPT are not saved, that CPT can be pulled from the CPT stack and used for any command, not necessarily the same command that pushed the CPT.

The CPT for the new command may be pulled from the CPT stack, created by Command Controller or passed from the previous command.

In addition to the data disposition of the CPT, the TE, and the TPT, the argument table is also specified in the CST. An argument table may be passed between the commands or may be released when the previous commands exits. Note that the CST only specifies the disposition of the data, the Command Controller establishes the data structure and does the manipulation.

SCALL RELATIONSHIP

The CST is related to the specifications given in the standard call (SCALL) of the command. In particular, the argument table indicator of the SCALL and the argument table specification of the CST permit many combinations of data transfer between the commands. The argument table specification of the CST notifies Command Controller whether an argument table is or is not to be passed, but the argument table indicator in the SCALL tells which argument table is to be passed and where it is located. Thus, The SCALL specification of the argument table indicator directory affects the construction of the CST. For example, if the CST indicates an argument table is to be passed, the SCALL must pass an argument table or an error will result. If the CST specifies that the argument table is to be released, this directive will override specifications in the SCALL.

The SCALL completion code also relates to command sequences and commands. The SCALL completion code specifies the exit to be taken by the command, but the CST determines what command is to be activated after a command exit is taken. The completion code also affects the construction of the CST in that completion codes may restrict the data passing relations of the CST.

TYPES OF COMMAND SEQUENCES

Command Sequences are classified as belonging to one of three types depending on the "type" of command sequence request. The types of command sequences and examples of requests for each type follow:
1. User Requests
   a. CP service calls.
   b. Job Specification Language/Internal Job Specification Language Requests.
   c. Terminal Requests.
2. Controller Requests
   a. Job processing (e.g., Job Input Stream Reader, Job Terminator).
   b. Command Controller Service (e.g., Internal Job Specification Language Analyzer).
3. System Requests
   a. Master Controller Debug (MCD), System Communicator (SYSCOM), Disc Input/Output (DIO).
   b. System Command.

COMMAND AND TASK PROCESSING

A task is a unit of code which has certain size limitations and the execution time restriction of executing for less than one millisecond. The size limitation of tasks is 512 words of memory. However, most tasks occupy less than 256 words of memory. The size limitation provides a better way to manage memory. For instance memory, required for a non-resident task request, can be obtained if some tasks reside in memory which are not executing at the time the request is made. The execution time restriction on tasks allows a task to complete execution instead of being interrupted because a high priority task must be executed. The high priority task can be assigned a Virtual Processor (VP) as soon as a VP is available, which would be at most one millisecond.

A command is a sequence of tasks which generally requires a fixed amount of resources. To reinforce this definition of a command, the reasoning used to establish commands is discussed. A large process (such as implementing a Job Specification Language (JSL) statement, providing system services for a Central Processor (CP) step, or performing a unit of work for a terminal) requires execution of tasks in some particular order to accomplish the work required by that process. Various tasks in a particular process may be executed depending on the data supplied for that process. Each process is a string of tasks where the actual tasks that are executed may have different resource requirements. Some tasks may have considerably larger disc or central memory requirements than other tasks. Other tasks may be executed several times in order to achieve the results required in processing. At these points the task string needs to be broken for scheduling considerations. Tasks which execute as a sequence and have relatively the same resouce requirements may be grouped as a Command. Grouping tasks as a Command allows the Command Controller to determine, prior to scheduling, the resources that may be required for that Command.

ANALYSIS AND EXECUTION OF COMMANDS

There are two types of commands. These can be referred to as analysis commands and execution commands. Analysis commands are those commands which gather information for scheduling. Execution commands are those commands which actually perform the work after the analysis commands have provided scheduling information. For example, there is an analysis command which determines the central memory requirements for loading a CP Step into central memory. An execution command executes, after the analysis command, which actually loads the CP Step into central memory so that step may be executed.

COMMAND DIRECTORY

The Command Directory is the complete directory for all the commands known to the Operating System. The Command Directory contains information required to activate and schedule a command. For instance, the resources (disc and central memory) which may be used and interfaces (such as DIO requests or SYSCOM) which may occur during the execution of the tasks of a command. Information in the Command Directory may be supplemented by information passed to the scheduler by an analysis command. For instance, an analysis command may determine a resource requirement for another command by passing information to the scheduler which will be put into the Command Directory for the scheduling of a subsequent command.

COMMAND ACTIVATION RECORD

An activation record is created by Command Controller for the activation of a Command. Activation records for commands consist of a Command Entry (CE) and a Command Parameter Table (CPT). Command Entries (CEs) are linked to various lists during processing to reflect the work to be initiated or the work accomplished for a command. (For details about these lists refer to Command Processing Lists.) Command Entries are also linked indirectly to the Job for which the command is performing. For instance, a CE may be linked to another CE, a Step Entry (SE) or a Job Entry (JE), to connect interrelated records on the same level.

COMMAND ENTRY

Each Command Entry (CE) has a Command identifier. Command identifiers are numbers representing the order of entries in the Command Directory. Each CE contains priority, status, and queue information related to the command, and a function code which may be used by the command. Each CE also contains a pointer to a corresponding Command Parameter Table (CPT) and a pointer to the activation record of the lower processing level, the Task Entry.

COMMAND PARAMETER TABLE

The Command Parameter Table (CPT) contains information related to a Command Sequence Table used to determine the current location within the command sequence. The CPT also contains a CE pointer, the current size (in words) of the CPT, and the memory requirements (maximum) of the particular command. The CPT may contain a pointer to another CPT being saved for a subsequent command, and/or a command argument table pointer to be passed to the command at the beginning of the command sequence or to another command in the sequence.

The CPT also contains a pointer to the Job Parameter Table. No other information is initialized by Command Controller for the particular command in the CPT. Each command has the responsibility of using a system procedure which expands the size of the CPT to fit the requirements of that particular command.

TASK ACTIVATION RECORD

The activation record for a task is a Task Entry (TE) and a Task Parameter Table (TPT). The TE is linked to the Command Entry of the Command which is currently active. The TPT is used by the task to obtain input parameters and access higher level activation records.

TASK ENTRY

The Task Entry (TE) information is much the same as for Command and Job Entries The TE contains a Task identifier. The Task identifier is an index into Task Controller's Task Directory. The TE status, queue, function and priority information is copied from the Command Entry. The TE also contains pointers to higher level activation records and a pointer to the Task Parameter Table (TPT).

TASK PARAMETER TABLE

The Task Parameter Table (TPT) is composed of an overhead area and a Task data constant area. The overhead area contains a pointer to the Task Entry, the size of the TPT (in words), and a cell count which represents the current number of cells, allocated this task by Memory Management, not linked to a system structure. Ownership threads of memory obtained by the task but not linked to the system structures are kept in the overhead area so the memory may be released to the system upon termination of the task. The TPT overhead contains an area to save the Central Memory Base, the program counter, and the four VP registers.

The TPT overhead also contains information necessary to manipulate a system subroutine linkage stack utilizing a hardware stack instruction. Subroutine linkages are accomplished by system procedures which utilize this stack to provide both linkage (i.e., the storage of return addresses) and scratch area through the subroutines. Providing subroutine linkage on the TPT level allows the subroutine linkage to be reentrant as the TPT is reentrant.

The last entry in the overhead area of the TPT is the address of the first execution instruction of the Task Code, the load point. For initial execution of a Task, the program counter and the load point will be the same. At restarts, however, the program counter may not point to the first executable instruction.

The Task's Data Constant Area is the area of the TPT that is used by the Task Code. The Task Controller initializes a Job Parameter Table pointer, Command Parameter Table pointer, argument table pointer, and data constant pointer within the Task's TPT. The remaining area is scratch space which can be used as required by the Task for acquiring Central Memory or for loading and storing save areas.

COMMAND PROCESSING LISTS

Command and Task Processing occurs during the execution of a Command Sequence. Command Sequence Request Entries notify the Command Controller that a sequence of commands must be scheduled. The scheduler examines the resource requirements for the command sequence. If resources are available, the first command in that Command Sequence is scheduled. The Command Entry (CE) for the Command is linked to a Command Processing List. A Command Entry linked to a Command Processing List notifies the Task Controller to activate the first task of the first command in the Command Sequence.

Once the first take of the Command starts execution, the presence of the CE on the Command Processing List signifies that the Command is in execution. Tasks terminate with either a task call or a command call. If a task call is made, Task Controller starts the called task into execution. If a command call is made, Task Controller delinks the CE of the Command whose Task made the call and links that CE to a Command Attention List.

A Command level call causes Command Controller intervention because a scheduling decision must be made. Command Controller polls the Command Attention Lists to decide further scheduling. Subsequently, the activities are scheduled which are required to complete the command sequence or signify the completion of that command sequence. Effectively, Command Controller is notified that a scheduling decision must be made when a Command Entry is linked to a Command Attention List.

STANDARD SYSTEM LINKAGES

The standard system linkages within the ASC Operating System are (1) Standard Calls (SCALLs), (2) System Subroutine Calls.

STANDARD CALLS

The Standard Call (SCALL) is the linkage between a task and the Operating System's control components. The flow of processing of the SCALL originates with the execution of the SCALL procedure expansion within the task itself. Control is then passed to the SCALL Subroutine, functionally a component of the Task Controller. This reentrant subroutine interrogates the SCALL parameters, placed in the Virtual Processor Registers (VPRs) by the SCALL procedure expansion, and places a list of SCALL parameters in the overhead of the Task Parameter Table. Control now passes to Task Wrapup, a component of the Master Controller. Task Wrapup's function is to remove the Task Entry (TE) from the Active Task List, the Task Parameter Table (TPT) from the TPT Address List and place the TE on the Task Complete List for servicing by Task Controller. The Virtual Processor (VP) in which the task had been executing is now available for reallocation by Master Controller. Task Controller, in servicing the Task Complete List, interrogates the SCALL parameters and either performs or requests the action requested by those parameters.

There are two basic SCALL categories: (1) those that provide a linkage between tasks, and (2) those that request a service from one of the Operating System control components. The first (the task-to-task linkage) category has the following format:

SCALL <type>, <task ID>, [,<argument list>]

The two "types" in this category are the Standard (V.STAN) and the Pass-the-TPT (V.PASS). The "task ID" is the identifier of the task to which linkage is desired and the optional "argument list" specifies an argument list to be passed to the called task. The argument list parameter is only valid on the Standard (V.STAN) call.

Task Controller services these SCALL types by deallocating the current task and associated data areas as required and by preprocessing the requested task.

The second category of SCALLs is those requesting control component services. This category has the following format:

SCALL <type>, <completion code>
[,<argument list> [,<memory needs>]].

In general, the completion code is a parameter to Command Controller which may specify either a subsequent event or the disposition of the task after servicing of the SCALL, the meaning being dependent on the type. The argument list, optional with some types, mandatory with others, is handled as per the type request as is the memory needs parameter. A brief description of the types of SCALLs in this category follows. The SCALL V.EXIT is a call to exit a task sequence to Command Controller. The completion code serves to identify the next event in the Command Sequence Table. If an argument list is present it is passed to the next command and the memory needs parameter provides scheduling information for Command Controller on the estimated CM resources required for future commands as determined by this terminating command.

The SCALL V.EXWT is a call to Command Controller to place this task in a wait state until the request specified by the completion code has been satisfied. The argument list and memory needs parameters are defined as above.

The SCALL V.ERR is a call to Command Controller to take a specific error-recovery action as defined in the argument list, a requirement for this type. The completion code specifies the action taken after error processing. Memory needs are as above.

The memory needs parameter is not meaningful for the following SCALL types.

The SCALL V.CSRQ (or V.CSRE) is a request for a Command Sequence Request Queue Entry to be made; the SCALL V.CPX is a request for a Central Processor Execution Queue Entry to be made; the SCALL V.SCOM is a call to the System Communicator, SYSCOM. The above three types are handled in similar fashion; i.e., Task Controller stores the SCALL type and argument list information and brings the service request to Command Controller's attention.

The SCALL V.DIO is a request for Disc I/O service. Task Controller moves the argument list to the DIO request list and places the command in an I/O wait state; Command Controller will restart the command after the I/O service.

The SCALL V.DMGR is a Driver Manager service request. The Driver Manager component of Task Controller interrogates the argument list and initiates the specified peripheral I/O requests. The command is placed in an I/O wait state for Command Controller to service upon I/O completion.

The SCALL V.TIO is a request for terminal I/O service. The Terminal I/O component of Task Controller interrogates the argument list and performs the requested I/O service. In addition, Task Controller manages any intermediate CM buffering for terminal-to-disc and disc-to-terminal data transfers. The command is placed in an I/O wait state to be restarted by Command Controller upon I/O completion.

The SCALL V.POCN is a special SCALL type without any optional parameters. Task Controller accesses the CM page request in the TE and cancels the reservation previously made by Task Controller for these pages. The task is returned to the Large Memory Request List for future processing.

The SCALL V.TCTASK indicates the termination of a "Task Controller" task which requires no post-processing. Task Controller servicing of this SCALL is completed upon recognition of the V.TCTASK type code.

The SCALL V.MCDR is a call to Task Controller from a Master Controller Debug (MCD) task that requests the restart of breakpoint exercises. Task Controller initiates the restart of the tasks indicated in the argument list.

The SCALL V.LXTD and V.DXTD types are requests from MCD for Task Controller to make (V.LXTD) or delete (V.DXTD) Exercise Task Directory entries. Task Controller interrogates the argument list and updates his Exercise Task Directory as required.

SYSTEM SUBROUTINE LINKAGES

Within the ASC Operating System there are two basic types of system subroutines. In order to access these subroutines, the system must provide linkage to the caller. The two types of subroutine linkages provided for the respective subroutines are:

1. Uncontrolled exit subroutine linkages
2. Controlled exit subroutine linkages

Uncontrolled exit subroutines can only return control to the process that called them. Uncontrolled exit subroutines can be described as follows:

1. Small or no memory needs.
2. No multileve, subroutine requirements.
3. Registers undefined upon return.

The purpose of the Uncontrolled exit subroutine linkage is to provide for effective subroutine development where small memory requirements exist.

Each subroutine call passes a return pointer in VPR0 to CALL + 1. The subroutine error return location is CALL + 2.

The remainder of the VPRs are available for parameter passing on input and for results on output.

The registers not used for results are, in general, undefined upon return.

Controlled exit subroutines conditionally call other processes before returning control to the calling process.

Controlled exit subroutines can be described as follows:

1. Moderate or substantial memory needs.
2. Multilevel subroutine capabilities required.
3. Registers preserved upon return.

The purpose of the controlled exit subroutine linkage is to provide multilevel subroutine calls with the ability to save the calling programs' VPRs and CM Base at each level of subroutine call.

Each subroutine call passes a return pointer in VPR0 to CALL + 1. The subroutine error return location is CALL + 1. The subroutine normal return location is CALL + 2.

In VPR1, the calling program passes a pointer to a CM Block for use by the subroutine as a save area. The first six words of this Subroutine Parameter Table (SBPT) must be reserved for the called system subroutine. The remaining words of the SBPT may be used for passing parameters or argument list pointers and receiving results as specified by the subroutine.

VPR2 and VPR3 are available for passing parameters and results also. When not used as such, the registers are preserved for the calling program.

Implementation: The called subroutine, upon entry, will save the CM Base and VPRs of the calling program in words zero through four of the SBPT. Word five of the SBPT is initialized to zero. If the called subroutine requires use of any additional memory, it will call Memory Management and save a pointer to the acquired CM block in word five of the SBPT. This word will serve as an ownership word to be checked when the subroutine returns control to the calling program. The acquired block can provide any memory required by the subroutine and, if applicable, a SBPT for calling an additional level of subroutine.

SYSTEM DATA STRUCTURES

The System Data Structures Overview describes the most global control tables used by the Operating System. Control tables are used primarily in the control of the Operating System. In the following sections functionally interrelated control tables are organized together for discussion. These discussions show the general formats of control tables and their relationship to the Operating System.

SYSTEM VECTOR REFERENCE TABLE

The purpose of the System Vector Reference Table (SVRT) is to provide a global data base for the ASC Operating System, that is, a data base which is universally available to all components within the Operating System. The SVRT also serves as a communications link between the Virtual Processors (VPs) in the ASC multiprocessor environment.

The SVRT resides in a predefined area of low-order Central Memory (see FIG. 1) where its components can be addressed by the "absolute" instructions provided in the Peripheral Processor (PP). The SVRT is structured at System Generation (SYSGEN) time and data is placed in the SVRT at both SYSGEN time and at Initial System Load (ISL) time, the nature of the data determining when it is supplied.

The concept of a global data base as opposed to more "local" data structures is used for that data which many components of the Operating System need to access. Since many Operating System components, principally tasks, may be non-CM-resident, an absolute reference table greatly reduces the time and complexity of the access to the various data structures, tables, and segments of Operating System code which may reside at arbitrary locations within Central Memory.

The SVRT is made up of the following types of data:

1. central memory resident system subroutine entry point addresses,
2. I/O drivers and device handler entry point addresses,
3. Communications Areas addresses for I/O Driver/Handler usage,
4. global data table addresses,
5. system constants,
6. linked list headers, and
7. System Scratch Areas.

Of the above data types, only the system constants and linked list headers are placed in the SVRT at SYSGEN time. This skeleton table is then placed on disc for ISL. At ISL time, the SVRT is loaded into CM as the first Operating System component. As the remainder of the Operating System components are loaded from disc, their reference pointers are placed in the SVRT according to Vector Table Entry (VTE) information supplied with each component at SYSGEN time and the actual CM load address supplied by ISL.

The System Scratch Areas of the SVRT are utilized by those Operating System components that require absolute scratch or save areas for either internal usage or for communication between components. These areas are not serviced at SYSGEN or ISL time but are merely used by the Operating System as required.

FILE ACCESS STRUCTURES

The primary function of file access is to provide the user with the necessary linkage parameters for access to an allocated file.

The Open Command may be required to build various system data structures. These may include a DIO File Information Block (PIOFIB), a file's File Information Block (FIB), an Access Name List Entry (ANLE), a System Open File Table (SOFT) entry, a Referencing Command List (RCL), and a Waiting Command List (WCL).

The basic function of the Open Command is to provide a PIOFIB, properly connected to the system data structures, so that the caller of the Open Command may perform I/O operations on a file.

If the file being opened is already open to other users and if the conditions for file sharing are met, the new user will share the existing PIOFIB.

If the file being opened is already open and conditions for file sharing are not met, the identity of the opening command is placed in the Waiting Command List so that Command Controller may determine when to reinitiate the open request for that command.

If the file being opened is not already open, a new PIOFIB is constructed for the file, and it is connected to the system data structure by addition of an entry to the System Open File Table (SOFT).

Whenever a file is opened, the identity of the opening command is placed in the Referencing Command List (RCL) associated with the file; and the location of the System Open File Table entry pertaining to the file is placed in a location such that the Close Command may access this SOFT entry.

Other functions are performed depending on the options of the open request.

If the file to be opened exists on the disc prior to the open, the file may be identified to open directly by its disc address or indirectly by an access name.

If the discs address is supplied directly, the Open Command searches the System Open File Table to locate the PIOFIB which exists if the file is already open.

If the file is not already open, the disc address is used to acquire the file's FIB (File Information Block) from the disc so that a PIOFIB can be constructed.

If an access name is used, the disc address is obtained from an entry in the Access Name List of the Job Parameter Table (JPT). The access name entry must have been made prior to the open by use of either the ASG process or FI process. The entry may also have been made by the JF process, provided that some previously executed command of the job had caused the allocation of the disc space for the job.

If the file to be opened does not exist on disc prior to the open, and it is not a step local file, open may be used to create the file on disc. Two forms of open requests may be used for file creation: (1) If the allocation option is specified in the open request, the file is created; and the disc address of the file is returned to the opener. No access name is used. (2) If an access name is the supplied in the open request and the corresponding Access Name List Entry (in the JPT) indicates that the file does not exist on disc, the file is created; and the disc address of the file is placed in the Access Name List Entry. Such an Access Name List Entry must have been made prior to the open by use of the JF process.

The open process for a step local file is equivalent to the open process when allocation is requested. However, instead of returning the disc address of the file to the opener, an Access Name List Entry is created and the address placed in it. The access name to be used for the file must be supplied by the opener.

The Access Name List used for step local files is separate from that used for other files. Further, each step has its own step local Access Name List. Therefore, the access names used for step local files need be unique only for the step. Two steps of a job may use the same step local access name (for different step local files).

The step local process is different than the JF process (with allocation) in that the Access Name List Entry created by the Open Command is removed from the list when the file is closed.

The opening of a System output (Sysout) file is the same as the opening of a step local file. However, when the Sysout file is subsequently closed, the file is not released; but it is recorded in the Job Log for later printing or punching. The access name must be supplied in the PCB.

The open process for a Step Created Job Local File is similar to a Step Local open process except that access name must be unique for the job. The Access Name List Entry becomes a part of the JPT Access Name List. The opener supplies the access name. The Entry is treated exactly the same as a JF Type Open after disc space is allocated for the file. Unless closed with the release option, the Entry will remain a part of the JPT Access Name List until termination of the job.

A request to open a file which requires initial allocation of the disc space will cause the LIO characteristics from the caller's File Control Block (FCB) to be transfered to the file's File Information Block (FIB) and the PIOFIB. Exception: Access Name Open of a Job File with an LIO card processed for that access name prior to the open request will cause the LIO characteristics in the Access Name List Entry to be transferred to the FIB, PIOFIB, and caller's FCB.

A request to open a file which has already been allocated disc space will cause the Open Command to put the LIO characteristics into the caller FCB from either the Access Name List Entry (if an LIO card had been processed), or the PIOFIB (if no LIO card has been processed).

TABLE SDS 1

|  | PROTECTION | | |
|---|---|---|---|
|  | Execute | Write | Read |
| #0 Hardward - ROM | ↑ | ↑ | ↑ | ↑ |

TABLE SDS 1-continued

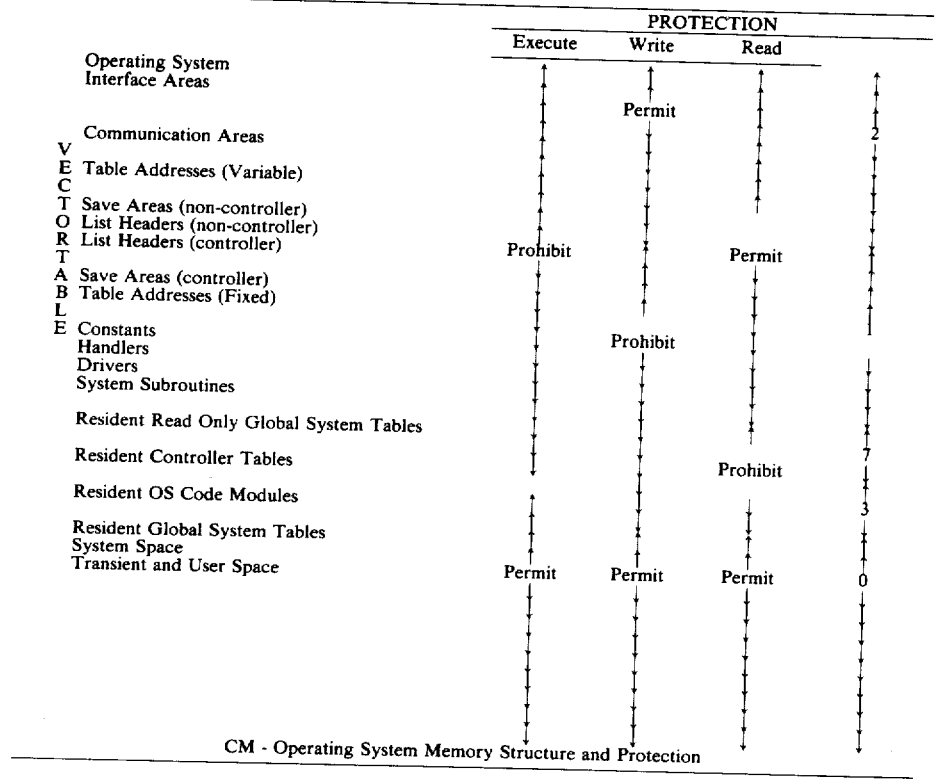

CM - Operating System Memory Structure and Protection

The open process is controlled by the function field of the FCB. Access Name — indicates use of an access name to locate an existing file; with creation of a JF file it is required. Disc Address — indicates use of the disc address to locate the file. Step Local File — indicates that the file is to be created as a step local file. Disc Allocation — indicates that the file is to be created and the disc address of the file returned to the opener. Sysout File — indicates that a Sysout file is being created. Step Created Job Local File — indicates that the file is to be created by the same process as a step local, but the file can exist for the duration of the job.

The FCB function code must be specified according to the type of open to be performed. Chart #1 indicates which parameters must be supplied for each function, where:

R - Required
O - Optional
N - Not Used
I - Required when file is Initially allocated.

The Status of the Open Command is indicated in the FCB. The Open Command will return a completion code of zero if the open was successful; otherwise, the completion code will indicate an error completion encountered during the process of opening. If the completion code requires further description, a modifier is also returned.

TABLE SDS2

| FUNCTION | FCB PARAMETERS Access Name 1st 4 Chars | Access Name Last 4 Chars | Intended Use | Allocation Initial | Allocation Increment | Allocation Maximum | Record Size Block Size | LIO Flags Key Size |
|---|---|---|---|---|---|---|---|---|
| Access Name | R | R | R | O | O | O | I | I |
| Disc Address | R | N | R | N | N | N | N | N |
| Disc Allocation | N | N | R | R | R | R | R | R |
| Step Local | R | R | R | O | O | O | I | I |
| Sysout | R | R | R | O | O | O | I | I |
| Step Local Job File | R | R | R | O | O | O | I | I |

Table SDS3 indicates the parameters which may be modified by the open process (excluding the status, completion code, and modifier). Complete words not modified are not shown.

S - Same (Not modified)
R - Returned with successful open
L - Modified if an LIO card has been processed, or file has been allocated
N - Not Returned

TABLE SDS3

| FUNCTION | FCB PARAMETERS Access Name | 1st Four Chars | Record Size Block Size | LIO Flags Key Size | SOFT Displacement | ANLE Pointer |
|---|---|---|---|---|---|---|
| Access Name | S | | L | L | R | R |
| Disc Address | S | | L | L | R | N |
| Disc Allocation | R | | S | S | R | N |
| Step Local | S | | S | S | R | R |
| Sysout | S | | S | S | R | R |
| Step Created Job Local File | S | | L | L | R | R |

Each request to open a file is validated to determine that the intended activity is compatible with the state of the file. The state of a file is categorized as:
(0) Closed (or not open)
(1) Open with one read user
(2) Open with one write user
(3) Open with one read/write user
(4) open with N shared read/write user
(5) Open with N shared read users.

Table SDS4 indicates the file states with which each intended file activity is compatible.

TABLE SDS4

| INTENDED ACTIVITY | CURRENT STATE | | | | | |
|---|---|---|---|---|---|---|
| | 0 | 1 | 2 | 3 | 4 | 5 |
| Read Exclusive | yes | no | no | no | no | no |
| Write Exclusive | yes | no | no | no | no | no |
| Read/Write Exclusive | yes | no | no | no | no | no |
| Shared Read/Write | yes | no | no | no | yes | no |
| Shared Read | yes | no | no | no | no | yes |

If the intended file activity is incompatible with the state of the file, the open will be delayed; the command ID will be placed in the Waiting Command List. When the file is closed by all users, the Close Command will pass a pointer to the Waiting Command List (WCL) to Command Controller. Command Controller will then reinitiate the Open request for those commands which are waiting.

If the file is being created by the Open Command, it will be treated as a not open file for the purpose of validation.

If the open is successful, the file's PIOFIB is updated to indicate changes of state caused by the open.

Each request to open a file by access name is validated to determine that the caller has permission to carry on his intended activity. Permission may be to read, write, or to execute the file.

If the open cannot be completed because the intended activity is not compatible with access permission, the open will not be completed and an error completion code will be returned.

For any open, logical file characteristics are collected by the Open Command and stored in the appropriate control block or information block.

Sources of characteristics are:
LIO card (characteristics in access name entry)
LFCB
file's FIB The set of characteristics which results are placed in the FCB.

If the Open Command is required to perform a disc allocation, the size specifications (allocation parameters) may be obtained from two sources:
(1) The FCB
(2) The Access Name List Entry.

If the disc allocation option or step local file option is specified, any sizes specified in the FCB are used.

If the access name option is specified and the file is a non-allocated JF file, the sizes may be obtained from both the Access Name List Entry and the FCB. The size values are placed in the Access Name List Entry by the JF process. If any of the three sizes is specified in both the FCB and the Access Name List Entry, the largest value is used. If zero sizes are specified, zero values will be used.

If any error is detected by the Open Command, the control blocks involved are returned to the Operating System. The error is reported to the caller via the completion code and completion code modifier fields in the FCB.

Table SDS5 represents the data structures used by the Open Command. The linkage pointer lines are used to show how the control blocks may be accessed when the FCB function is a type that utilizes an access name. If the FCB function indicates a disc address open, the diagram would be modified to the extent that the Access Name List Entry and RCL could not exist.

TABLE SDS5

System Data Structures linked by the Open Command. (This representation valid only for Opens requested using an access name.)

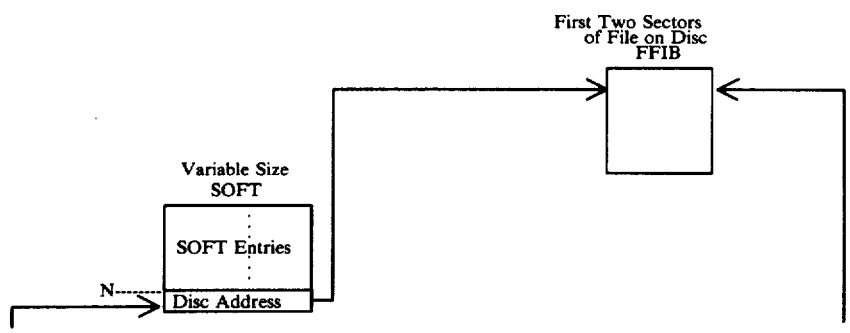

-continued
TABLE SDS5
System Data Structures linked by the Open Command. (This representation valid only for Opens requested using an access name.)

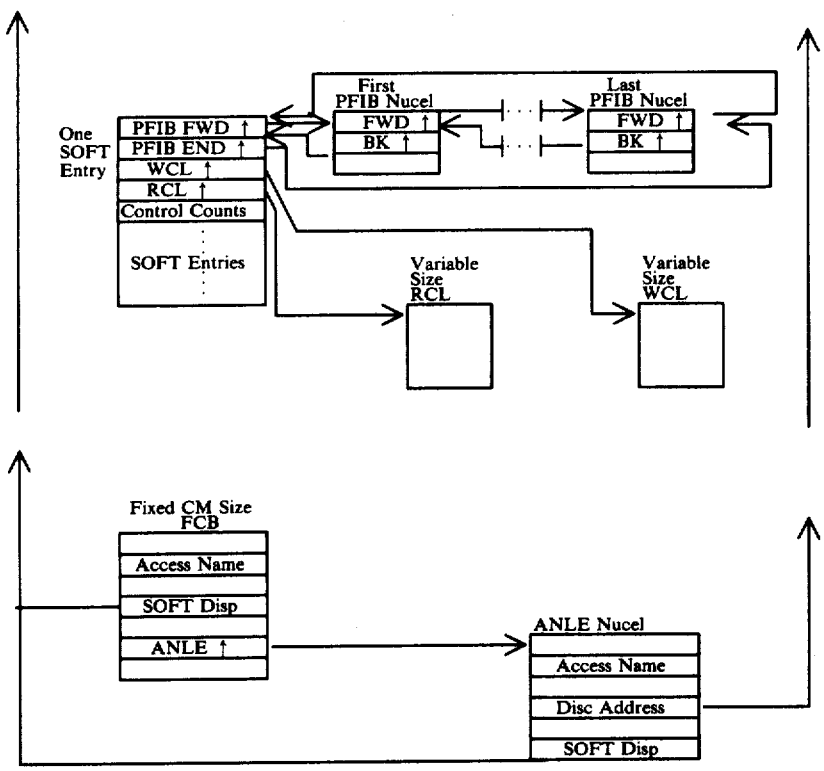

Note:
SOFT Word
= SOFT Disp

The following System data structures are created and/or used by the Open Command.

| | File Control Block | | | |
|---|---|---|---|---|
| The File Control Block may be in any CM location. | | | | |
| | Byte 0 | Byte 1 | Byte 2 | Byte 3 |
| Word 0 | Not Used | Function | Not Used | |
| 1 | Access Name (4 Chars) or Disc Address | | | |
| 2 | Access Name (last 4 Chars) | | | |
| 3 | USE | Status | C. Code | C. Mod |
| 4 | Displacement to SOFT Entry | | | |
| 5 | Allocation Initial | | | |
| 6 | Allocation Increment | | | |
| 7 | Allocation Maximum | | | |
| 8 | Pointer to Access Name List Entry | | | |
| 9 | Record Size | | Block Size | |
| 10 | LIO Flags | | Key Size | |

| | |
|---|---|
| Word 0 Byte 0: | Not Used |
| Byte 1: | 0 indicates Access Name Open |
| | 1 indicates Disc Address Open |
| | 2 indicates Disc Allocation Open |
| | 3 indicates Step Local File Open |
| | 4 indicates Sysout File Open |
| | 5 indicates Step Created Job File Open |
| Word 0 Bytes 2&3: | Not Used |
| Word 1: | If access name required, first four characters of access name; if Disc Address Open, disc address of File's FIB. |
| Word 2: | If access name required, last four characters of access name. Otherwise, not used. |
| Word 3 Byte 0: | Intended Use |
| | 0 None |
| | 1 Read Only (One User) |
| | 2 Write Only (One User) |
| | 3 Read and Write (One User) |
| | 4 Shared Read and Write (N Users) |
| | 5 Shared Read (N Users) |
| | 8 Execute |
| | 9 Indicates FIO Request |
| Byte 1: | Status of Open Process |
| | 0 Not Started |

-continued

| | |
|---|---|
| Byte 2: | 1 In Process<br>2 Complete<br>Completion Code<br>0 Successful Completion, return to caller<br>1 Parameter Conflict, return to caller<br>2 Unable to locate Access Name Entry, return to caller<br>3 Disc Address not address of a FIB, return to caller<br>4 Attempt to open file already opened by caller command (not yet closed), return to caller<br>5 Conflict of intended use and access permission. (byte 3 contains permission), return to caller<br>6 Parity Error encountered attempting to read the FIB. return to caller<br>7 Unable to obtain disc space for allocation, return to caller, the Open Command may write MSG to Joblog.<br>8 Attempt to duplicate access name of a step local file, return to caller<br>9 Access Name Entry's type inappropriate, return to caller, the Open Command may write MSG to Joblog. |
| Byte 3: | Completion Code Modifier if Completion Code 5, permission allowed:<br>0 None      4 Execute<br>1 Read      5 Execute and Read<br>2 Write      6 Execute and Write<br>3 Read and Write      7 Execute, Read and Write<br>If Completion Code 9, Access Name List Entry's type (See ANLE for entry types.) |
| Word 4: | The displacement to the SOFT Entry for P10F1B Pointer and Disc Address of the File. |
| Word 5: | Allocation Initial if disc allocation is to be performed; specifies initial allocation to be acquired. |
| Word 6: | Allocation Increment - Amount of disc space in sectors to be added when current end of file is reached. |
| Word 7: | Allocation Maximum - Maximum size in sectors the file will be allowed to attain. An attempt to write beyond end of file after maximum size is attained will fail. |
| Word 8: | Contains a pointer to the Access Name List Entry. The Open Command puts this pointer in the FCB after confirming that an entry has been made for the access name. |
| Word 9 Left: | Record Size (Logical Record Size in Words) |
| Right: | Block Size (Logical Block Size in Words) |
| Word 10 Left: | LIO Flags |
| Bits 0 & 1: | Record Type<br>0   FIXD    2    VARV<br>1   VARF    3    WDCT |
| Bit 2: | Block Type<br>0   FIX    1    VAR |
| Bit 3: | Access Method<br>0   Sequential    1    Keyed |
| Bit 4: | Subfile<br>0   No    1    Yes |
| Bit 5: | Stream<br>0   No    1    Yes |
| Bit 6: | ASC Tape<br>0   No    1    Yes |
| Bit 7: | Abort/Accept<br>0   Abort    1    Accept |
| Bits 8-15: | Not currently used |
| Word 10 Right: | Key size (in words) |

File's File Information Block (FIB)

The FIB is the first two sectors of the file (on disc). It contains the LIO characteristics by which the file was created to be accessed. The FIB also contains the Disc Map and information needed by File Management. The fields of the FIB and a description of the fields follow.

| | | File Information Block - FIB | | |
|---|---|---|---|---|
| | Byte 0 | Byte 1 | Byte 2 | Byte 3 |
| Word 0 | * | F | I | B |
| 1 | | File Management | User Count | Type |
| 2 | | Record Size | | Block Size |
| 3 | | LIO Flags | | Key Size |
| 4 | | Inactive File Chain Pointer | | |
| 5 | | SOFT Disp. for Catalog File | | |
| 6 | | VDA of Catalog Node (NHL) | | |
| 7 | Sign Indic | Version No | RW Flag | Erase |
| 8 | | Current End of File (VDA) | | |
| 9 | | Current Allocation | | |
| 10 | | Allocation Increment | | |
| 11 | | Allocation Maximum | | |
| 12 | # Map Entries | Not Used | Lst Ch/Mod Used | Bad Band |
| 13 | | Channel - First Map Entry | | |
| 14 | | Second Map Entry | | |
| 15 Map Entry | } up to 112 map entries | | | |
| 127 Map Entry | | | | |

Word 0:      *FIB - to identify a file FIB (used as validation)

-continued

| | |
|---|---|
| Word 1 Byte 0&1: | Used by File Management |
| Byte 2: | User Count - the number of users who have referred to the file. |
| Byte 3: | Type of File<br>0  Step local          3  Cataloged File<br>1  Address Opened/  4  FI Created File<br>     Allocated<br>2  JF File             5  Sysout File |
| Word 2 Left: | Record Size (Logical record size in words) |
| Word 2 Right: | Block Size (Logical record size in words) |
| Word 3: | Same as description of Word 10 in the FCB |
| Word 4: | Inactive File Chain Pointer - DA of next file on inactive chain |
| Word 5: | Location in the SOFT of the entry for the catalog which references this file |
| Word 6: | Catalog Node VDA (Virtual Disc Address of the Node Header List for the catalog node) |
| Word 7 Byte 0: | Sign Indic - Indicates the form and sign of the version number<br>0  Not specified     2  Positive signed number<br>1  Unsigned number  3  Negative signed number |
| Byte 1: | Version Number in the form specified by Sign Indic - (Binary #) |
| Byte 2: | RW Flag (Read/Write Flag)<br>0    Read Copy of Cataloged File<br>1    Write Copy of Cataloged File |
| Byte 3: | Erase Flag - Set by release when the file is made inactive<br>0    indicates the file need not be erased when released<br>1    indicates the file is to be erased |
| Word 8: | Current EOF (VDA) - The virtual address of the word after the last word which was written into the file is also the number of words which have been written into the file. |
| Word 9: | Current Allocation - The number of words allocated for the file. |
| Word 10: | Allocation Increment - The number of words to be added to the file allocation when an attempt is made to write at current EOF (or beyond). |
| Word 11: | Allocation maximum - The maximum number of words which can be allocated for the file. |
| Word 12 Byte 0: | Number of Map Entries |
| Byte 1: | Not Used |
| Byte 2: | Last Channel/Mod. Used |
| Byte 3: | Not Used |
| Word 13: | Map Channel Entry/First Map Entry (Absolute Disc Address of FIB) |
| Word 14-27: | Map Entries - One Map Entry for each contiguous extent of the file. |

PIOFIB

The PIOFIB is constructed of Queue Blocks, with the SOFT (System Open File Table) containing an entry for each opened PIOFIB. The number of Queue Blocks for the PIOFIB is variable depending on the length of the Disc Map.

| | PIOFIB | | | |
|---|---|---|---|---|
| Word | 0 | | Forward Pointer | |
| | 1 | | Back Pointer | |
| 2 | P | F | I | B |
| 3 | Modify | State | Not Used | Type |
| 4 | Record Size | | Block Size | |
| 5 | LIO Flags | | Key Size | |
| 6 | | | Currrent End of File (VDA) | |
| 7 | | | Current Allocation | |
| 8 | | | Allocation Increment | |
| 9 | | | Allocation Maximum | |
| 10 | #Map Entries | Not Used | Last Chnl/ Mod Used | Not Used |
| 11 | | | Channel - First Map Entry | |
| 12 | | | Second Map Entry | |
| 13 | | | Third Map Entry | |
| 14 | | | Fourth Map Entry | |
| 15 | | | Fifth Map Entry | |

| | |
|---|---|
| Queue Block 1<br>Word 0: | Pointer to next queue block if map entries exceed the limits of first queue block. |
| Word 1: | Pointer to Chain Header |
| Word 2: | PFIB - to identify PIOFIB. Used for validation by DIO. |
| Word 3 Byte 0: | Modify (to determine if FIB has been modified)<br>0    indicates the FIB has not been modified by DIO and will not be updated when closed<br>1    indicates the FIB has been modified by DIO and will be updated when closed. |
| Byte 1: | State - current use of file<br>0  None                      2  Write Only<br>1  Read Only            3  Read and Write<br>4  Shared Read and Write  5  Shared Read |
| Byte 2: | Not Used |
| Byte 3: | Type<br>0  Step Local              3  Access Name Opened: Cata- |

-continued

|  | 1 | Address Opened/ Allocation | 4 | loged File Access Name Opened: FI |
|---|---|---|---|---|
|  | 2 | Access Name Opened: JF File | 5 | File Sysout File |

Word 4&5: Description same as FCB words 9 and 10.
Word 6: Virtual Disc Address of the Current End of File
Word 7: Current Allocation in Sectors
Word 8: Allocation Increment in Sectors
Word 9: Allocation Maximum in Sectors
Word 10 Byte 0: Number of Map Entries
  Byte 1: Not Used
  Byte 2: Last Channel/Mod. Used
  Byte 3: Not Used
Word 11: Map Channel Entry and First Map Entry
Words 12-15: Second thru Fifth Map Entries
Queue Block 2: Queue Block 2 and any others required to enter Map Entries are constructed as follows:
Word 0: Pointer to next Queue block for Map Entries
Word 1: Back Pointer to preceding Queue block of this PIOFIB
Words 2-15: Map Entries
As many as are needed to contain the map will be used.

SYSTEM OPEN FILE TABLE (SOFT)

The SOFT will contain one entry for each disc file which is open. When a file not previously opened is opened, the Open Command will make a six-word entry in the SOFT. If the file has already been opened, the Open Command will increment the open count. Entries will be removed by the Close Command when a file is closed to all users.

The table will occupy one contiguous block of Central Memory. The address of the table will be contained in a system vector table. An entry may be addressed by displacement from the table origin.

The entry of the table will contain:

All addressing of PIOFIBs will be made indirectly through the table; no other element of any data structure will contain the memory address of a PIOFIB.

EXAMPLE SOFT ENTRIES
System Open File Table

| Word | 0 | Length of Table (allocated words) | |
|---|---|---|---|
|  | 1 | Current Number Entries in SOFT | |
|  | 2 | Disc Address of File | Entry format with one |
|  | 3 | PIOFIB Pointer | referencing command and |
|  | 4 | PIOFIB End Pointer | no commands waiting to |
|  | 5 | Zeros | open the File. |
|  | 6 | Referencing Command ID | |
|  | 7 | O.C.=1    SC=0    FM    WC=O | |
|  |  | 8    Disc Address of File | Entry format with more |
|  |  | 9    PIOFIB Pointer | than one referencing com- |
|  |  | 10   PIOFIB End Pointer | mand and 1 command waiting |
|  |  | 11   Waiting Command ID | to open the File. |
|  |  | 12   RCL Pointer | |
|  | 13 | 0.0 >1    SC=0    FM    WC=1 | |
|  |  | 14   Disc Address of File | Entry format with more |
|  |  | 15   PIOFIB Pointer | than one referencing com- |
|  |  | 16   PIOFIB End Pointer | mand and more than one |
|  |  | 17   WCL Pointer | command waiting to open |
|  |  | 18   RCL Pointer | the File. |
|  | 19 | O.C.>1    SC=O    FM    WC>1 | |
|  | 20 | Next SOFT | |
|  |  | 21 | Entry |

REFERENCING COMMAND LIST (RCL)

A list of the commands which have opened the file. Each command will be identified by a one-word name. The name is supplied by Command/Task Controller in a fixed location of every CPT.

When a file is opened for the first user, the Command ID is put in the SOFT entry. If the open count is ≧ 2, the RCL pointer is in the SOFT entry and the user Command IDs remain in the RCL for as long as the Open Count is ≧2. When the Open Count=1, the re-

| Word 0: | Disc Address of File - to identify the file, may be used as key to search table. |
|---|---|
| Word 1: | CM address of PIOFIB |
| Word 2: | Pointer to the end of PIOFIB chain |
| Word 3: | Waiting Command List Pointer |
| Word 4: | Referencing Command List Pointer |
| Word 5 Byte 0: | Open Count (Number Commands which have opened the file) |
| Byte 1: | Swap Count (Number Commands which have opened the file and are currently swapped out) |
| Byte 2: | For File Management of Catalogs |
| Byte 3: | Wait Count (Number Commands waiting to open the file) |

The first two words of the table are reserved for determining if the table should be expanded or reduced in size, and whether there is room to make a new entry.

maining Command ID will be placed in the SOFT entry (RCL pointer word), and the list will be released to Memory Management.

Command IDs will be added to the RCL by the Open Command and removed by the Close Command. The number of entries in the RCL is given by the Open Count of the SOFT.

The RCL will be allocated in contiguous blocks of $2^n - 2$ but not less than $2^3 - 2$. The first word of the RCL will indicate the size of the list. The SOFT entry's Open Count will represent the number of referencing command IDs in the list.

WAITING COMMAND LIST (WCL)

A list of commands which have attempted to open the file but cannot because the state of the file is not compatible with the intended use of the file.

The WCL will be allocated in contiguous blocks of $2^n - 2$, but not less than $2^3 - 2$.

When all users who have opened the file close the file, the Close Command will pass a pointer to Command Controller in an augment table. Command Controller will then reinitiate the open request for the commands in that list.

The first word of the WCL will indicate the size of the list until the file is closed to all users. Before the Close Command passes the list to Command Controller, the size of the list will be removed. The first word of the list will then be used to indicate the number of command IDs which are in the list. Command Controller will be responsible for releasing the CM used for the list to Memory Management.

ACCESS NAME LIST ENTRY

Access Name List Entries are part of the job Queue. One entry is made for each access name defined in the job. The entries are made by Catalog Look Up (preprocessing for names defined by ASG, FI and JF cards) and by the Open Command for Step Local and Sysout Files.

Step Local And Sysout Files' Access Name List Entries are linked off the steps by CPT. No other card may cause modification of the LIO characteristics for an existing entry.

| Access Name List Entry |
| --- |
| Forward Pointer |
| Back Pointer |
| Access Name (1st 4 Chars) |
| Access Name (Last 4 Chars) |

| Record Size | Block Size |
| --- | --- |
| LIO Flags | Key Size |

| Type | LIO Card | Open Count | Access Attributes |
| --- | --- | --- | --- |

} Contents Depends on Type

Allocation Initial
Allocation Increment
Allocation Maximum
SOFT Displacement for PIOFIB Words 0 & 1: For Memory Management
Word 2: First Four Characters of Access Name
Word 3: Last Four Characters of Access Name
Word 4 & 5: Description Same as Words 9 & 10 of FCB
Word 6 Byte 0: Entry type
 1 Entry Made by JF Card; file not allocated
 2 Entry Made by JF Card; file allocated
 3 Entry made by ASG Card; file not on disc
 5 Entry made by ASG; copy of file on disc
 6 FI File, on disc, ready to open
 7 Entry made by the Open Command; Step Local File
 8 Entry made by the Open Command; Sysout File
 9 File is prepared for PCU by FI (OPEN will allocate for PCU)

| Byte 1: | LIO Card |
| --- | --- |
| | 0 LIO Card not processed |
| | 1 LIO Card has been processed |
| Byte 2: | Open Count (the number of steps in the job which have used this access name to open the file) |
| Byte 3: | Access Attributes (0 - no permission, 1 permission) |
| | Bit 28 = Read Attribute |
| | Bit 29 = Write Attribute |
| | Bit 30 = Execute Attribute |
| | Bit 31 = File has been locked |
| Words 7,8&9: | Contents Depends on Type (Word 6 Byte 0) |
| | Type 1 = JF not allocated |
| | Word 7, 8 & 9 not used |
| | Type 2 = JF allocated |
| | Word 7 - FIB Pointer (DA of File) |
| | Word 8 & 9 - Not used |
| | Type 3 = ASC - no file on disc |
| | Word 7 Not used |
| | Word 8 - SOFT displacement for Catalog File |
| | Type 5 = ASC |
| | Word 7 - FIB Pointer (DA of File) |
| | Word 8 - SOFT displacement for Catalog File |
| | Word 9 - VDA of Catalog Node (NHL) |
| | Type 6 = FI File, ready to open |
| | Word 7 - FIB Pointer (DA of File) (This is entered by FI not by CLU.) |
| | Words 8 & 9 - Not used |
| | Type 7 & 8 = Step Local or Sysout File |
| | Words 7 - FIB Pointer (DA of File) |
| | Words 8 & 9 - Not used |
| | Type 9 = FI File, not on disc |
| | Words 7, 8 & 9 - Not used |
| Words 10, 11, 12: | Will contain disc parameter information for some types. If no disc parameters are found in FCB or ANLE. system default parameters are used. |
| Word 13: | After the file is opened, a displacement to the SOFT entry is placed in ANLE Word 13. |

MASTER CONTROLLER GENERAL INTERNALS — FIG. M-1

1. Function — The ASC Operating System Controller performs four types of service:
 A. Processor allocation (Central Processor and non-dedicated Virtual Processors),
 B. Execution or scheduling of Central Processor or Virtual Processor requested services,
 C. Processor fault detection and processing, D. Detection and processing of asynchronous signals from peripheral devices.

2. Organization — The ASC Operating System Master Controller is organized as a "polling loop" with a collection of conditionally executed subprocessors. The subprocessors may be executed in the Master Controller dedicated Virtual Processor or may be scheduled for execution in a nondedicated Virtual Processor.

There are seven processing routines which are executed due to seven independent conditions. They are:

A. Central Processor Controller — controls the interface between the CP and the Operating System. It is executed whenever the CP Execution List is non-empty, whenever a MCP or MCW signal is detected from the CP, and whenever a step cancellation process is initiated. If the CP Execution List is non-empty, the CP Controller sets up the tables for the CP step so that the step can be context switched into execution; i.e., the step is "primed" for execution. When a MCP or a MCW signal has occurred, the CP Controller identifies and validates the CP request and either schedules or executes the appropriate service routine. For the step cancellation process, the CP Controller checks the active step and the "primed" step for cancellation and returns the cancelled steps to Command Controller. The Global Cancellation CR bit is then reset. The SE cancellation bit is checked for each step as the step's SE is delinked from the CP Execution Lists and before the step is "primed" for execution.

B. Virtual Processor Allocator — is executed due to a VP becoming available. Its action is to receive Task Entries for tasks to be executed from the Task Controller, allocate a Virtual Processor for the task's use, and return Task Entries of completed tasks to the Task Controller.

C. System Error Processor — is executed due to Time Slot Override or System Error Termination bit being set. Its action is to provide the operator with a hard-copy of the system's status when the error was detected.

D. Peripheral Device Handler Processor — (for paper and magnetic tape media) is executed due to an asynchronous signal from a peripheral device handler. Its action is to determine which device handler sent the signal and transfer control to the appropriate location within Driver Manager.

E. Peripheral Device Attention Processor — is executed due to an asynchronous signal from system peripheral devices. Its action is to request a command sequence from the Command Controller to process the signal.

F. Interactive Terminal Attention Processor — is executed due to an asynchronous signal from a remote terminal. Its action is to request a command sequence to process the signal.

G. Debug Action Processor — is executed upon request from Master Controller Debug Component. Its action is to perform requested control actions for dedicated Exercise VP's.

MASTER CONTROLLER POLLING LOOP — FIGS. M2 - M3, M4

1. Purpose — This module is the main control routine of Master Controller. Its polling loop investigates various events occurring in the ASC Computing System. When an event occurs, the Subprocess Scheduler is notified to schedule the servicing of this event by a slave VP. For high priority events, either Master Controller's VP provides needed servicing or, through the Subprocess Scheduler, a non-inhibited VP is trapped to provide the servicing. These two facilities provide low response time for high priority events.

2. Characteristics — This is a stand-alone routine continuously running in a VP dedicated to Master Controller. It is always core-resident.

3. Input — The setting of any or all of the specific bits polled by this polling loop (listed below) constitutes the input to this module.

4. Output — Output consists of a Subprocess ID number passed to the Subprocess Scheduler and a return address pointing to the appropriate return location in the polling loop.

5. List of items polled by loop
   * Device Attention Bits in CR file.
   * Entries on System Timer List.
   * Requests for service from CP.
   * System Error Bit.
   * Requests for Terminal Input/Output Servicing.
   * Time Slot Override Byte in CR file.
   * First Entry on Subprocess Scheduling Table for Expiration of Time.
   * Slave-to-Master Bits in the CR file.
   * VP Available Byte in CR file.
   * MCD Stop Bit.
   * Global Cancellation Bit 6. Processing Description — The MC Polling Loop is entered by VP-Select when VP-Select has finished its initializing of required events. VP-Select continuously polls various events except when it must execute a very high-priority subprocess.

Listed below are detailed descriptions of the bits tested and the functions executed.

A. Device Attention Bits in CR File: These bits are set by other components of the ASC System requesting some form of input or output. A busy bit is used to lock out the DA Subprocessor when a slave VP is executing that module. If the busy bit is not set, and if any DA bits are set, a request is made to the Subprocess Scheduler to schedule the execution of the DA Subprocessor.

B. Entries on the System Timer List: Using a busy bit as lockout, the polling loop knows whether the Timer List (TL) Subprocessor is active. If the bit is set, the polling loop continues. If the bit is reset, the loop checks for an expired top entry on the Timer List and, if necessary, requested the Subprocess Scheduler to schedule the execution of the TL Subprocessor.

C. Requests for CP Servicing: The polling loop monitors needs for CPU servicing when the CP Controller busy bit indicates that the CP Controller is inactive. The following conditions are checked:

1. The CP Response Byte is tested for any bits set. This CR byte is the location at which the CPU hardware indicates CP step servicing is required.

2. When the CP is not "primed", a check is made of the CP Execution Lists for CP Steps requiring CP Execution.

3. When the CPU is active, the time limit of the currently active CP Step is maintained in dedicated CM. This limit is checked in the polling loop to detect time expiration of that step.

4. When a low priority CP step is active, the high priority CP Execution List is monitored to detect the need for "priority override" servicing of the CPU.

When any of the above items indicate that CP servicing is required, the CP Controller Subprocess ID is passed to the Subprocessor Scheduler for initiation of the CP Controller.

An additional CR bit is provided to permit the CP to be placed "under test." When this CR bit is set, the CP items mentioned are not polled.

D. Requests for Terminal I/O Servicing: This servicing consists of three subprocessors: a TIO Communication Area Processor, a TIO Request Processor to support input messages from terminal to ASC, and a TIO Message processor to service output messages from the ASC to terminals.

The Terminal Attention bits in the CR file are monitored to detect signals indicating a terminal has requested to input a message. The TIO Request Subprocessor is invoked to prepare for the message input. This subprocessor's ID is passed to the Subprocess Scheduler to schedule the subprocessor's execution.

The Terminal High Priority Communication Area Chain is monitored for completed or "timed out" communication areas. The TIO Communication Area subprocessor is invoked when either of these conditions is detected. The subprocessor's ID is passed to the Subprocess Scheduler to schedule this subprocessor's execution.

The Terminal Message Output List is polled to detect requests from the Command Controller for the output of messages to the terminals. When output messages require processing, the Terminal Message Subprocessor's ID is passed to the Subprocess Scheduler for the scheduling of the execution of this subprocess.

E. The Time Slot Override Control bit in the CR file is monitored by the polling loop to detect indications from the PPU hardware that a failure has occurred in the PPU. When this condition is detected, the System Error Processor is executed.

F. The System Error Bit in the CR file is monitored by the polling loop. When set, this bit indicates that a system task or subroutine has detected a system error. The System Error Processor is invoked to process this condition.

G. The Subprocess Scheduling Table is monitored whenever it is non-empty for the expiration of the first empty. When time out occurs, the first entry in the table is removed, and that subprocessor is executed.

H. Slave-to-Master Bits in the CR File: These bits are set by a VP when it enters the ROM idle loop. This setting tells Master Controller that it has reached a logical break in its processing.

A STM Reason Word is also set, telling Master Controller the reason the VP has entered the idle loop. If any STM bits are set, the MC Polling Loop immediately services these bits by going to the PP Controller.

I. Availability Byte in the CR file: This CR byte tells the Polling Loop which slave VP is available to do necessary work. The Polling Loop looks for work to be done and, if possible, sends the available VP back to the VP Service Loop via the PP controller.

J. MCD Stop Bit: This CR Bit is polled to detect requirements for the servicing of VPs currently processing in the exercise mode. When this bit is set, the polling loop passes control to PP Controller for processing as required.

K. Global Cancellation CR Bit: When this CR bit is set, it will signify to Master Controller that a step cancellation process has been initiated by Command Controller. Master Controller's Polling Loop will schedule the CP Controller subprocess for execution if possible. The CP Controller will recognize this bit and will interrogate both the currently active and currently "primed" steps for cancellation.

All CP steps will be checked for cancellation before they are "primed", but this CR bit allow the cancellation of CP steps regardless of their processing status at the time of cancellation. The CR bit is reset by the CP Controller upon detection of its being set.

PP PROCESSORS — OVERVIEW

The PP Processors include the PP Controller and VP Service Loop.

PP Controller is executed in VP Select. It maintains control of the non-dedicated VPs and services requests from non-dedicated VPs through Slave-to-Master Reason Words and Slave-to-Master CR bits. Through the Availability CR bits, it retains idle VPs in the ROM Idle Loop until needed for processing.

The VP Service Loop is executed by the non-dedicated VPs. They remain in this loop when there are tasks or subprocessors requiring processing, returning to the ROM Idle Loop only when no processing is required. VP-Select retains the capability to monitor non-dedicated VPs through a Yield CR bit. This bit is tested at each logical breakpoint in the VP Service Loop. If the bit is set, a VP reports to the Idle Loop.

PP CONTROLLER - FIGS. M-5, M-6, M-7, M-8

1. Purpose — PP Controller controls execution of system tasks and controller subprocesses.
2. Characteristics — PPU Controller is a resident routine executing in the selected VP. It is called by the Master Controller Polling Loop upon detection of Slave-to-Master or Availability bits.
3. Input
   A. Slave-to-Master Bits — VPs requiring service enter the ROM Idle Loop, causing their S-T-M bit to be set.
   B. Availability Bits — VPs, when not processing system tasks or controller subprocesses, remain in the ROM Idle Loop with their AVailability bit set.
   C. Slave-to-Master Reason Words — This octet reflects the reason a VP has entered the Idle Loop and indicates the type of processing required.
   D. Exercise VP Status Byte — This CR byte indicates which VPs are dedicated for MCD Exercises.
   E. Task Process Lists (TPL1, TPL2) — These lists contain the TEs of tasks waiting to be executed.
   F. Subprocess Scheduling Table — This table contains the Subprocess Identification codes of subprocesses awaiting execution.
4. Output — None
5. Interfaces — Master Controller Polling Loop — This routine passes control when activity is detected in the Slave-to-Master byte or when a VP is available and activity is detected in the Subprocess Scheduling Table or Task Process Lists.

Subprocess Scheduler — This routine passes control to PP Controller when a VP is available and a subprocess requires scheduling.

6. Processing Description — PP Controller receives control from the Polling Loop when activity is detected in the Slave-to-Master byte. PP Controller polls the the S-T-M byte to determine which VP has set its S-T-M. The associated S-T-M Reason Word is accessed and processed as follows:

A. SCALL Reason — The VP is released to Task "Wrap-Up" code for processing of the task which made the SCALL.

B. Protect Request Reason — When a VP requires access to protected CRs or memory, it may request that its protect be set or reset by VP - Select.

C. Trap Complete Reason — When a VP is trapped out of task execution, it may enter the Idle Loop. It is then released to a Trap "Wrap Up" code.

D. Task Prologue Complete — When a VP completes "Task Prologue" code, it may enter the Idle Loop to be released to the current task.

E. Subprocess Complete — When a VP completes subprocess execution, it may return to the Idle Loop as an available VP.

F. Task Wrap-Up Complete — A VP completing Task "Wrap-Up" may report to the Idle Loop as an available VP.

G. VP Idle — When a VP finds no tasks or subprocessors requiring execution, it returns to the Idle Loop as an available VP.

H. Driver Manager Reason — When a paper or tape handler requires servicing, it sets its S-T-M bit to request servicing by the Driver Manager portion of Master Controller.

PP Controller may permit a VP to remain in the VP Serivce Loop or to report to the Idle Loop upon completion of Task Prologue, Task Wrap-Up or subprocess execution by setting a Yield Bit which is tested by each VP before entering the Idle Loop. This process allows the VPs to remain active without servicing by VP-Select and retains PP control of VP activity when necessary.

PP Controller receives control when a VP is available and a subprocess or task is awaiting execution. PP Controller polls the Availability byte and releases the VP to the requested subprocess or to the VP Service Loop for task execution.

7. Special Functions

Performance Information Collection Support — The current time, VP Number, and a sub-function code is entered in the PIC Buffer for each Slave-to-Master or Availability Bit processed. The subfunctions are (1) S-T-M- processing, where S-T-M Reason Word is also saved; (2) allocation of available VP to the VP Service Loop; and (3) allocation of available VP to a subprocessor, where the Subprocess ID is saved.

Master Controller Debug Support — The PP Controller is called when a VP executing in the exercise mode is to be stopped at the option of the MCD user. The requested VP is terminated via a task level interrupt using the PPU interrupt capabilities.

VP SERVICE LOOP — FIGS. M-9, M-10

1. Purpose — The VP Service Loop is a polling loop in which non-dedicated VPs reside when there are systems tasks or Master Controller Subprocessors requiring execution.

2. Characteristics — It is a resident, reentrant routine executed by all non-dedicated VPs.

3. Input

A. Task Process Lists (TPL1, TPL2) — System Task Entries awaiting execution are input to the VP Service Loop by the Task Controller through the High Priority Task Process List (TPL1) or the Low Priority Task Process List (TPL2).

B. Subprocess Scheduling Table (SST) — Master Controller Subprocessors awaiting execution are input to the VP Service Loop by the Master Controller through this table.

4. Output — Task Complete Lists (TCL1, TCL2) - Following task execution System Task Entries are returned to the Task Controller via the Task Complete Lists.

5. Interfaces

Task Controller — The Service Loop interfaces with Task Controller through the Task Process and Complete Lists.

B. Subprocess Scheduler — The Service Loop interfaces with the Subprocess Scheduler through the Subprocess Scheduling Table.

6. Components

A. Task Prologue — This Service Loop subcomponent prepares system tasks for execution. (FIGS. M-11, M-14, M-15)

B. Task Wrap-Up — This Service Loop subcomponent services system tasks following execution. (FIGS. M-12, M-16, M-17)

C. Trap Wrap-Up — This Service Loop subcomponent services system tasks following task level interrupts which result when the Subprocess Scheduler requires use of that task's VP. (FIGS. M-13, M-18, M-19)

7. Processing Description

When activity is detected in the Task Processing Lists or Subprocess Scheduling Table, available VPs are released to the VP Service Loop by the PP Controller.

If the Subprocess Scheduling Table is active, a VP removes the first entry and executes the requested subprocessor. On completion of the subprocessor execution, that VP checks the High and Low Priority Task Processing Lists for activity. Tasks may be scheduled by Task Controller into specific VPs. Hence the Task Processing Lists must be scanned to examine each Task's TE until one that can be executed in that VP is found.

The Task Prologue is then entered. The TE of the task is delinked from its list, and the Active Task List and TPT Address List are set up. The CM protect, CR protect and Trap Inhibit Status of the task are set up from the Task Entry. The Trap Inhibit Status indicates whether the VP may be trapped for use in subprocess scheduling during the execution of the task. This protects tasks which must perform time critical operations. The Program Counter, CM Base, and VPRs are then set up from the TPI, and the task execution is started.

Following task execution, the SCALL Subroutine is executed. It moves SCALL data in the VPRs to the TPT and saves the Program Counter and CM Base in the TPT. The Task Wrap-Up subcomponent of the VP Service Loop is executed to reset the Active Task List and TPT Address List. the CR protect the CM protect statuses are updated in the task's TE. the TE of the terminating task is moved to the High or Low Priority Task Complete List. The VP then returns to the VP Service Polling Loop.

At each logical breakpoint in the VP Service Loop, a Yield bit is tested. If the bit is set, that VP reports to the ROM Idle Loop, setting a Slave-to-Master Reason Word and CR bit to indicate its current position in the loop.

When a VP completes the VP Service Polling Loop and finds no processing required, it enters the ROM Idle Loop and indicates its availability to Master Controller.

8. Special Functions
   A. Master Controller Debug Support — Three additional subcomponents provide the required MCD support. Available VPs are allocated to MCD Exercise Tasks by the Exercise Task Prologue. (FIGS. M-14, M-15) Control of Exercise Tasks which terminate through an SCALL or Breakpoint are provided by the Exercise Task Wrap-Up (FIGS. M-16, M-17) and the Exercise Trap Wrap-Up (FIGS. M-18, M-19).

The MCD Command is requested whenever an Exercise Task terminates due to a Breakpoint or, optionally, due to an SCALL. The option is also supported for all Exercise Tasks to be stopped when any Exercise Task terminates. When an Exercise Task terminates, its VP is released for further system use, and if the "ALL" option is selected, Exercise Task allocation is suspended.

A mode of operation is supported in which tasks releated to a specific Exercise Job are prevented from execution and removed from the system.

B. Performance Information Collection Support — The Task ID, VP number, and current time are entered in the PIC Buffer for each task starting or completing execution during PIC mode.

CP PROCESSORS — GENERAL OVERVIEW (FIGS. M-20, M-38)

Master Controller support for CP Step Processing consists of the CP Controller. CP Controller is a resident Master Controller Subprocessor which may be scheduled for execution in VP Select or an available VP. It is initiated by the Master Controller Polling Loop and Subprocess Scheduler upon detection of entries in the CP Execution Lists or signals from the Central Processor through the CP Control, Response, and Condition bytes of the CR file. It is also initiated upon the detection of a new step cancellation process.

Initial step loading is accomplished through use of the Common Command Register. This requires the pre-setting of registers in the Central Processor and Memory Control Unit.

The processing of service calls and context switches is performed upon detection of signals through the CP Response byte.

A priority system allows CP steps requiring immediate execution to override low priority steps.

Time slicing and step execution time control are maintained through communication between the Polling Loop, which monitors a time limit for the active CP step, and the CP Controller, which terminates the step reaching its time limit.

The current condition of the CPU is reflected by the CP Condition Byte. Error conditions occurring during step execution are reported by the CPU through this byte. The System Error Processor is activated when the CPU detects error conditions other than those caused by the CP step.

Step cancellation is supported in the CP Controller in two areas. First, in order to allow the cancellation detection of the active step (cancelled any time after it had been investigated for cancellation at pre-prime time), the Global Cancellation CR bit is checked. If this bit is set, both the active and "primed" step are checked for cancellation and processed if necessary. Secondly, as each step is delinked from the CP Execution Lists, the step's SE is investigated for cancellation. It is then either processed for cancellation or "primed" for CP execution.

CP CONTROLLER

1. Purpose — This subprocessor is used by Master Controller to interface with the Central Processor (through the three CP bytes in the CR file-CP Control byte, CP Response byte and CP Condition byte) and to interface with other components of the ASC Operating System (through the CP Execution Lists, Step Waiting List, Service Call Service Request List and the Global Cancellation CR Bit). The functions of the subprocessor are to initiate the execution of CP steps, to detect service request from the CP steps, to support the step cancellation process, and to monitor the condition of the Central Processor.

2. Characteristics — CP Controller is a resident Master Controller subprocessor which may be scheduled for execution in VP Select or an available VP.

3. Input — Input to the CP Controller consists of signals from the CPU (through the CP Control, Response, or Condition bytes in the CR file), CP steps from the Command Controller (through the CP Execution Lists), and the communication from Command Controller that a step cancellation process has been initiated (through the Global Communication CR Bit).

4. Output — Output from the CP Controller consists of signals to the CPU through the three CP CR bytes and the Common Command Register (CCR), signals to the Memory Control Unit through the CCR, and CP Step service requests to the Command Controller via the Service Call Service Request List.

5. Interfaces — The CP Controller interfaces with the Command Controller through the Service Call Service Request List, CP Execution Lists, and Global Cancellation CR Bit, with the CPU through the CP CR bytes and CCR, with the MCU through the CCR, and internally with the Master Controller Polling Loop.

6. Processing Description
   A. The CP Controller is initiated whenever the Master Controller Polling Loop detects one of the following conditions:
      1. Activity on the CP Execution Lists with no step primed.
      2. Signals from the CPU via the CP CR bytes.
      3. Time out of the currently active CP step.
      4. Activity on the high priority CP Execution List when a low priority step is active.
      5. Initiation of a new step cancellation process.
   B. When activated, the CP Controller passes through a sequence of checks which permit it to service the many combinations of events which may have occurred in addition to the actual condition detected by the Master Controller Polling Loop.
      1. The first check determines whether a CPU system failure has been indicated. The System Error and Attention bits of the CP Response byte are checked. If they are set, the current CP step is processed for abnormal termination without saving the CPU intermediate level status. The SE of the step is entered on the Step Waiting List, and a Service Call Service Request is issued for servicing of the step by Command Controller. A bit in the Flag Word of the Step Parameter Table is set to indicate that the Intermediate Map is invalid. The System Error Processor is then called to provide a hard copy of the system status.

2. The Switch Complete Bit in the CP Response byte is checked to test for automatic context switch occurrence. If the SC bit is set, the CP has switched from execution of the active step to execution of the primed step as a result of a Monitor Call and Wait in the active step or a program error in the active step. If a program error has occurred, its type (i.e., arithmetic exception, invalid instruction, or protect violation) is indicated in the Flag Word of the SPT.

3. If no switch has occurred, the Message Complete bit in the CP Response byte is checked. If set, a Monitor Call and Proceed has been issued by the active CP step. A request is made for servicing by Command Controller via the Service Call Service Request List. The Service Call Control Block pointer passed from the CP step is passed to Command Controller in the Service Call Service Request entry.

4. The condition of the CP Step Cancellation CR bit is investigated next. If the bit is zero, then processing continues with the next function of the controller. If the bit is set, it is immediately reset. If there is no step active, then a check is made on the "primed" CP step. For an active step the CP run bit is reset, using the CCR subroutine. A delay is taken to allow for the possible initiation of a switch before the run bit was reset. The CP response byte is then investigated for a possible switch, error, or message occurring after the run bit was reset. If a switch, error, or message did occur, the Global Cancellation CR bit is set and the CP controller is restarted. Processing continues on the active step if no switch occurred. The active step is investigated for cancellation through the step cancellation flag in the step's SE. If the flag is not set, the step is not cancelled. The allow switch CR bit is reset and the run bit is set to allow the CP step to continue processing, at least until a switch is encountered. If the cancellation flag in the SE is set, the active step is wrapped up and the step's SE is placed on the Step Waiting List. A service call is then issued to Command Controller for the CP step.

The "primed" step, if any, is next investigated and is processed very similar to the active step. If the primed step is to be cancelled, then it is deprimed and its SE linked onto the Step Waiting List. A service call is again issued to Command Controller for the step. A separate subroutine to handle the performance information collection is used for any step that is cancelled.

5. A check for a "prime override" condition is made next. This condition exists when a low priority is primed for execution and there is activity on the high priority CP Execution List. The servicing of this condition consists of the following:

a. The Allow Switch bit is reset. This prevents an automatic switch from starting.

b. A delay is taken to permit a started switch to complete.

c. If a switch has started, the CP Controller processing sequence is restarted.

d. If no switch has occurred, the primed CP step can be deprimed and returned to the low priority CP Execution List.

6. The next item in the CP Controller processing sequence is to prime a step if one is not already primed. The high and low priority CP Execution Lists are checked in that order, and the first step found is primed for execution. The Allow Switch bit is reset to permit automatic context switches.

7. The Reason Bits of the CP Response byte are processed next. This four-bit field is interpreted as follows:

Bits 1-3 contain an octal number (0-7). They are set by the CPU hardware with a defined meaning for each number. Bit 0 is set by the Master Controller Polling Loop to indicate a step time out or priority override.

a. Reasons 1, 2 or 3 are processed identically. They indicate that the Message Complete or Switch Complete bits were set during an attempt by the CP to perform a message or context switch. Since this is not permitted, the CP has stopped. Because Messages and Switches have been processed and those bits reset, it is only necessary to restart the CP.

b. Reasons 4 and 5 are processed identically. They indicate that the Allow Call bit was reset during an attempt by the CP to issue a message. Since the Allow Call bit is not used by Master Controller, this condition is processed by setting the Allow Call bit and restarting the CPU.

c. Reason 6 indicates that the Allow Switch bit was reset during an attempt by the CPU to make a Monitor Call and Wait context switch. The current step is unloaded from the CP using the CCR Store Intermediate command. The message word (Service Call Control Block address) is retrieved from the intermediate map, and a service request is issued to Command Controller via the Service Call Service Request List. The Step Entry is moved to the Step Waiting List.

d. Reason 7 indicates that the Allow Switch bit was reset during an attempted context switch due to a CP program error. The step is unloaded from the CP and passed to the Command Controller through a Service Call Service Request, with the Step Entry placed on the Step Waiting List.

e. Master Controller Reasons include CP step time out and "run override".

A time limit is maintained for the currently active step to support time slicing and job level time limit control. When this limit is exceeded, the CP Controller is activated. The current step is unloaded or switched if a step is primed. If the limit for time slicing was reached, the step is returned to the appropriate CP Execution List for its next time slice. If the user-requested time limit has expired, the step is moved to the Step Waiting List and a Service Call Service Request is issued to Command Controller.

A "run override" condition exists when a low priority step is active and a high priority step is primed. When CP Controller detects this condition, it exchanges the two steps, using a CCR command, and returns the previously active step to the low priority CP Execution List. This processing and the previously described "prime override" processing provide the capability for immediate processing of high priority CP steps independent of any other CP activity.

f. The next check in the CP Controller processing sequence is to load a CP Step if one is primed and the CP is not active. The CPU and MCU are loaded through CCR Commands to set up for execution. The CP run bit is turned on, and if another step is waiting for execution, it is primed.

g. Before this available VP is returned to the VP Service Loop a check is made on the Global Cancellation CR bit. If it is set the CP Controller is restarted. If reset, then the exit is taken.

ATTACHMENT A

CP Control Byte
CR Oa Byte 3

| CA | CT | SA | SP | SR | TR | AC | AS |

CP Response Byte
CR 12 Byte 0

| SE | AT | MC | SC | RZ(0-7) | | | |

CP Condition Byte
CR 12 Byte 2

| CC | AB | BP | PE | IL | AE | PV | RB |

CP Control Byte
  Set and reset by Master Controller for control of CP servicing. Bits CA, CT, SA, and SP are internal to Master Controller, whereas bits SR, TR, AC, and AS are read by CP hardware.
CP Response Byte
  Set by CP hardware to inform Master Controller of a CP service requirement. Reset by Master Controller after servicing the CP requirement.
CP Condition Byte
  Set by CP hardware to inform Master Controller of the CP condition. All bits but RB are reset by Master Controller.

Bit Code Interpretation
CA: CP Available
  Set by Master Controller when no CP step is primed. Indicates to MC the need to poll for activity on the CP execution queue. Reset by MC when a CP step is primed.
CT: CP Test
  Set by MC to indicate CP control is being relinquished to MCD. When set, MC will not respond to any other activity in the CP Response or Condition Bytes.
SA: Step Active
  Set by MC when a CP step is initiated. Reset by MC when a CP step terminates and no step was primed for execution.
SP: Step Primed
  Set by MC when CP step is primed for switching. Reset by MC when a switch is detected or forced.
SR: System Reset
  Set by MC to initiate a CP reset; must be reset by MC before any other CP action is taken.
TR: Terminate Request
  Set by MC to terminate outstanding CCR requests or Automatic Switches in the CP. Reset by MC.
AC: Allow Call
  Set by MC to permit automatic MCP and MCW calls; reset by MC to inhibit these calls.
AS: Allow Switch
  Set by MC to allow automatic MCW and Error Context Switching; reset by MC to inhibit this switching.
SE: System Error
  Set by CP to indicate a Parity Error or Breakpoint; reset by MC
AT: Attention
  Set by CP to indicate a Parity Error or Breakpoint during automatic switching; reset by MC.
MC: Message Complete
  Set by CP.
SC: Switch Complete
  Set by CP.

MC and SC can be decoded to determine the reason for the call or switch:

| MC | SC | INTERPRETATION |
|----|----|----|
| 0 | 0 | Ready |
| 0 | 1 | Switch due to error |
| 1 | 0 | MCP - cell |
| 1 | 1 | MCW - call and switch |

MC and SC must be reset by Master Controller to the "Ready" state (00) before an automatic call/switch can occur.

RZ (0-7) Reason Code
  Set by CP to inform Master Controller of the following Context Switch conditions:

| Code | Interpretation |
|------|----------------|
| 0000 | NOOP |
| 0001 | MCP has occurred while MC and/or SC were set. |
| 0010 | MCW has occurred while MC and/or SC were set. |
| 0011 | Error has occurred while MC and/or SC were set. |
| 0100 | MCW has occurred while AC is reset. |
| 0101 | MCP has occurred while AC is reset. |
| 0110 | MCW has occurred while AS is reset. |
| 0111 | Error has occurred while AS is reset. |
| 1000 | Currently Active CP Step has timed out. |

CC: Command Complete
  Set by the CP to inform Master Controller that the last requested CP CCR command has been performed; reset by MC.
AB: Abnormal
  Set by the CP to inform MC that the last requested CP CCR command resulted in abnormal termination; reset by MC.
BP: Breakpoint
  Set by the CP to inform MC that the CP has reached the Breakpoint Address; reset by MC.
PE: Parity Error
  Set by the CP to inform MC of a CM parity error; reset by MC.
IL: Illegal Operation Set by the CP when an illegal operation code forces on Error Context Switch; reset by MC.

AE: Arithmetic Exception
Set by the CP when an arithmetic exception forces an Error Context Switch; reset by MC.

PV: Protect Violation
Set by the CP when a CM protect violation forces an Error Context Switch; reset by MC.

RB: Run Bit
Continuously gated CR bit reflecting the state of the CP's internal run bit.

MASTER CONTROLLER PROCESSORS - GENERAL OVERVIEW

Master Controller is organized as a collection of processing units called subprocessors. The subprocessors may be scheduled for execution in VP - Select or an available VP. A scheduling-type code is assigned to each subprocess to permit control of scheduling and adjustment of scheduling type to meet particular system requirements.

The main scheduling component is the Subprocess Scheduler (FIGS. M39, M40, M41 and M42), which utilizes the Subprocess Scheduling Table to pass subprocess identification codes to available VPs for execution. Since an excessive system task load could make execution by a slave VP impossible, the Scheduler establishes time limits for the start-up of each subprocessor to ensure execution of a subprocessor by the Selected VP. The Subprocess Scheduler has the capability to interrupt a VP during execution of system tasks to permit subprocess execution.

The following subprocessors have been defined as general purpose Master Controller Processors:

1. Device Attention Processor - This subprocessor builds a Command Sequence Request Entry for the Command Controller, passing as an argument an image of the Device Attention CR Halfword.
2. Timer List Processor — This subprocessor removes expired System Timer List entries and performs the requested function.

SUBPROCESS SCHEDULER

1. Purpose — The Subprocess Scheduler schedules the execution of subprocessors. A dual priority scheme is used to allow all subprocessors to be executed eventually. A scheduling table slowing the next subprocessor that needs servicing by the slave VPs is maintained. If necessary, non-inhibited tasks can be trapped to allow more rapid response time for high-priority events.
2. Characteristics — This module is executed in Master Controller's VP and is always core-resident.
3. Input — Input consists of Subprocess ID number entered in VPR1 (right half) and a return address in VPR0.
4. Output — Output consists of a new entry in the Subprocess Scheduling Table.
5. Interfaces
    A. MC Polling Loop.
    B. Subroutine for making entries in the scheduling table.
    C. PP Controller.
6. Processing Description This routine is entered by Master Controller's VP when the Polling Loop finds that a subprocessor needs scheduling. Using the SP ID number (1-9), a predetermined priority-type is obtained from the Subprocess Priority Type Table in dedicated CM. This priority-type number (1,2,3 or 4) will determine how the subprocess is scheduled.

With a priority type of 1, the subprocess is immediately executed by Master Controller's VP. With a priority type of 2, a check is made for any available VP. If a VP is available, it is released (using the PP Controller) to execute this subprocess module. If a VP is not available, the subprocessor is executed using Master Controller's VP (in essence, it becomes a type 1 priority). If the priority type is 3, a check is again made for an available VP. If one is available, it is released to do this subprocess. If no VP is available, then an entry is made on the Subprocess Scheduling Table. A check is made for any VP that is in a condition suitable for trapping. If no VP can be trapped, control is passed back to the Polling Loop. If a VP can be trapped, its specific bit is set in the VP Interrupt Control Byte of the CR file. This causes the requested VP to complete its current instruction and then trap to a designated ROM location. With a priority-type of 4, a check is made for an available VP. If there is one available, it is sent (using PP Controller) to the subprocess. If no VP is available, an entry is made on the Subprocess Scheduling Table, and control is returned to the Polling Loop. The next VP to poll the Subprocess Scheduling Table will execute this subprocessor.

7. Special Functions — Performance Information Collection

The Subprocess Scheduling Type, resulting scheduling method, and time scheduled are entered in the PIC Buffer.

TIMER LIST PROCESSOR — FIGS. M43-M44

1. Purpose — The Timer List Processor provides controller response to the System Timer List.
2. Characteristics
    A. It is a resident Controller Subprocess executed in an available VP.
    B. It is called by the Controller Subprocess Scheduler when a Timer List entry is due to processing.
3. Input
    A. System Timer List — Entries are placed on this queue when a function needs to be scheduled at some future time.
    B. Real Time Clock — These five CR bytes provide a time base for determining whether a Timer List entry is due.
4. Output Timer List Processor performs a function depending on Timer Action Code.
5. Interfaces None
6. Processing Description — The Timer List Processor removes entries which are due from the Timer List and performs the requested function. The entry contains the Timer Action Code and two arguments. The following are the action codes and the resultant processing:

| | | |
|---|---|---|
| A. | NOP (No operation) | No action taken. |
| B. | LL (Lock a List) | The list specified by argument 1 is locked. |
| C. | FL (Free a List) | The list specified by argument 1 is freed. |
| D. | MCH (Move Cell to Head) | The cell pointed to by argument 1 is moved from the Timer Action Waiting List to the head of the list specified by argument 2. |
| E. | MCT (Move Cell to Tail) | The cell pointed to by argument 1 is moved from the Timer Action Waiting List to the tail of the list specified |

-continued by argument 2.

After the function is performed, the Timer List cell is released and the Timer List is examined again for expired entries.

7. Special Functions — Performance Information Collection

The following information is entered in the PIC Buffer during PIC mode:
Timer Action Code
List ID
Time Cell entered
Time Cell due
Current Time

DEVICE ATTENTION PROCESSOR — FIG. M45

1. Purpose — The Device Attention Processor provides controller response to asynchronous signals from peripheral devices.
2. Characteristics
   A. It is a resident Controller Subprocess executed in an available VP.
   B. It is called by the Controller Subprocess Scheduler when any bits are set in the Device Attention CR halfword.
3. Input — Device Attention CR Halfword.
4. Output — An entry is made on the Command Sequence Request Queue requesting processing of the Device Attention bits.
5. Interfaces — Command Controller — Command Controller receives the Command Sequence Request Queue entry and initiates the appropriate processing.
6. Processing Description — When activity is detected in the Device Attention Halfword, the Controller Subprocess Scheduler passes control to the Device Attention Processor which builds an image of the Device Attention bits in an argument list. An entry is then made on the Command Sequence Request Queue passing the argument list to Command Controller.
7. Special Functions — Performance Information Collection - The time and Device Attention images are entered in the PIC Buffer during PIC mode.

INTERACTIVE TERMINAL PROCESSORS

The Interactive Terminal Processors are used to handle the requirements of the TIO upon Master Controller.

Master Controller is the sole manager of the TCC High Priority CA Chain. It alone processes additions and deletions to this list.

By polling certain resources, the Master Controller determines which, if any, TIO function to perform. Specific bits in the CR file are used to indicate to the ASC programming system that the Terminal Channel Controller has a communications message ready to send. When the Master Controller finds that one of the CR bits used to represent each Data Concentrator (DC) is set, it starts a subprocessor in an available VP to link a Communication Area (CA) onto the TCC High Priority CA Chain.

Another resource polled by the Master Controller is a TIO entry on the Terminal High Priority Output List. If a Communications Message is to be output to a terminal, Command Controller places an entry on this list. Master Controller initiates a subprocessor to move the entry to the High Priority CA Chains.

When Master Controller finds an entry on the TCC High Priority CA Chain, it starts a subprocessor to service that entry. This consists of checking the complete bit, checking for time out, and, if necessary, setting the start bit in the CA of this entry.

A special bit is used as a lock-out by Master Controller. When this bit is set, MC knows that an available VP is doing some required TIO function. MC will not start another TIO function until the present one is finished and the bit is reset.

TCC REQUEST PROCESSOR FIG. M46

1. Purpose — This processor builds a 32 word block, initializing the first 8 words as a Communication Area for the TCC High Priority CA Chain. This module is used with other service routines to satisfy TIO's requirements of Master Controller.
2. Characteristics — This subprocessor is a resident portion of Master Controller, operating in an available VP.
3. Input — Input is the setting of any of the Selector Interface Unit Attention Bits in the CR file by TCC whenever a communication message is ready for transfer.
4. Output — A 32 word cell with an 8 word initialized CA is linked to the TCC High Priority CA Chain.
5. Interfaces
   A. MC Main Polling Loop.
   B. TCC through the SIU Attention Bits.
6. Processing Description The Master Controller Polling Loop polls the SIU Attention Bits in the CR file, and if any one is set, MC assigns an available VP to this routine.

This routine then obtains a 32 word cell from memory management. The first 8 usable words of this cell are initialized as a Communication Area using the TCC CA format. The cell is linked to the TCC High Priority CA Chain. The whole 32 word area is referred to as the Terminal Communication Information Block or TCIB.

7. Special Functions — Performance Information Collection - Current time is entered in the PIC Buffer when a TCC request is processed.

TERMINAL COMMUNICATION AREA PROCESSOR — FIGS. M47–M48

1. Purpose 13 This routine provides Master Controller with the ability to service entries on the TCC High Priority CA chain. This module is used in conjunction with other routines to satisfy TIO's requirements of Master Controller.
2. Characteristics — This subprocessor is a resident portion of Master Controller operating in an available VP.
3. Input — Input consists of an entry on the TCC High Priority CA Chain.
4. Output — Output consists of the servicing of an entry on the TCC High Priority CA Chain.
5. Interfaces
   A. Master Controller Polling Loop
   B. Command Controller, through entries on the Command Sequence Request Queue (CSRQ).
6. Processing Description Master Controller Polling Loop detects an entry on the TCC High Priority CA Chain and assigns this module an available VP to service that entry.

If the entry on the TCC HP CA Chain is completed, it is delinked from the CA Chain and passed via the CSRQ, telling Command Controller that this CA entry is finished transferring its message.

If the entry is not completed, this routine checks for a time out condition for the CA entry. If the CA entry has not timed out, then the start bit is turned on. If it has timed out, Command Controller is so informed.

7. Special Functions — Performance Information Collection - An entry is made in the PIC Buffer showing the time a Communication Area was processed.

TERMINAL OUTPUT PROCESSOR - FIG. M49

1. Purpose — This subprocessor processes messages output from the ASC to the Interactive Terminals via the TCC High Priority CA Chain.
2. Characteristics — This routine is a resident Master Controller Subprocessor. It may be scheduled in an available VP or in VP Select.
3. Input — Input to this subprocessor consists of entries on the Terminal High Priority Output List. These entries are Communication Areas prepared by the Command Controller for output to the terminals.
4. Output — Output from this subprocessor consists of entries on the Terminal High Priority CA Chain. The entries are Communication Areas ready for processing.
5. Interfaces
   A. Master Controller Polling Loop
   B. Command Controller, through the High Priority Output List
   C. The Terminal Channel Controller, through the High Priority CA Chain.
6. Processing Description.

The Master Controller Polling Loop monitors the High Priority Output List. Upon detection of entries on this list, the Subprocess Scheduler initiates this subprocessor. The subprocessor moves the entries from the High Priority Output List to the High Priority Communication Area Chain.

SYSTEM ERROR PROCESSING — FIGS. M50, M51, M52, M53, M54, M55

The philosophy of handling system errors will be to obtain a hard copy of the system status as quickly as possible after detection of an error. System errors will include those errors detected in system subroutines and those errors detected by system tasks. Other errors detected by ASC hardware, such as CM parity errors also will be included as system errors. For these errors, hardware will set the Time Slot Override bit and the Time Slot Override Reason byte in the CR file.

This version of System Error Processing will not include any investigation of the error or any form of error recovery. This initial version will be as simple as possible. It is very desirable to obtain the status of the machine as soon as possible rather than try to do any elaborate error investigation.

System error processing may be initiated through the execution of a "SYSERR" procedure. The SYSERR procedure will set the trap inhibit bit, (to prohibit this VP from being trapped by Master Controller), save all the VP's registers, and pass an error code to the system error subroutine. The system error subroutine will set the error code and the location of the error into augmented dedicated CM. Note that the SYSERR Procedure and the system error routine are both reentrant; therefore more than one VP may initiate system error processing simultaneously. Each VP entering the system error subroutine will set the System Error bit in the CR file, which is monitored by Master Controller. IF the VP is not VP Select it will enter a waiting loop. If the VP is VP Select it will enter the System Error Processor. The System Error Processor will obtain the status of the system and produce a hard copy dump of CM. The System Error Processor will save the current CP file and fetch the internal registers of all slave VP's through the PMC logic. The internal registers for any VP having gone through the SYSERR procedure will contain all #Es in CM for the first six of ten registers. The internal registers for VP Select will contain all zeroes in CM. If an error in the PMC logic is encountered, CM will contain all #Fs in the locations for each succeeding VP's internal registers.

Error codes will range from #0000 to #7FFF for system tasks and together with the unique Task ID will help interpret the cause of the system error. For each system subroutine, there will be assigned a unique error code for each detectable error; i.e., for each different type of error within a system subroutine, the error will be assigned an error code that will be unique within the whole system. Error codes for system subroutines will range from #8000 to #FFFF.

SYSTEM ERROR PROCESSOR

1. Purpose — To handle all system errors within the ASC system. It will obtain a hard copy dump of the system status of the machine as quickly as possible.
2. Characteristics — This module will include a reentrant system subroutine as a preprocessor for system errors invoked with the "SYSERR" call. The system error processor itself will be non-reentrant because it must only be executed in VP Select to access the PPU Maintenance registers in the CR file.
3. Input — The System Error Processor may be invoked either of two ways and its input will depend on which way it is initiated. If System Error Processing is initiated by the "SYSERR" procedure, the input will consist of an error code and an error location to the preprocessor and only a return pointer to the error processor itself. If the hardware detects an error, it will set the T-S-O Control Bit and Master Controller will invoke the System Error Processor.
4. Output — Output will be a hard copy dump of the system status. Central Memory will contain the current CR file contents as well as the contents of the ten internal registers of each slave VP. Dedicated octets of CM will contain the error code and the location of the error if initiated by a "SYSERR" call.
5. Interfaces — Interfaces will include communication with the PMC logic for fetching the internal registers and with the ROM dump routine to dump CM. Special CR bits, the T-S-O Control Bit and the System Error Bit, will be used to let Master Controller know of any detected errors.
6. Components — Components will include a "SYSERR" Procedure used by system tasks and subroutines at appropriate places, a system subroutine preprocessor, and a main processor.
7. Processing Description — System Error Processing may be initiated either by the hardware setting of the T-S-O Control Bit or through the use of the "SYSERR" procedure. Both the System Error Bit and the T-S-O Control Bit will be monitored by Master Controller and if either is set Master Controller will enter the System Error Processor.

If System Error Processing is invoked by the "SYSERR" call, the Trap Inhibit Bit will be set to prohibit Master Controller from trapping this VP while it is in the preprocessing portion of error handling. All four of the VP's registers will be saved in augmented CM so that more than one VP may be initiating System Error Processing at any one time. The error code from the "SYSERR" call is then passed to the reentrant system error subroutine.

The preprocessor subroutine will save the error code and the address of the error location in dedicated CM. It will check the current VP against VP Select and set the System Error Bit to inform Master Controller. If the current VP is VP Select, control is transferred to the System Error Processor. If the current VP is not VP Select, the current VP will idle in a waiting loop.

The System Error Processor may be entered either of two ways: (1) when Master Controller detects the setting of the System Error Bit or the T-S-O Control Bit or (2) when VP Select is detected in the system error preprocessor subroutine. The System Error Processor will obtain the contents of the current CR file and store them into Central Memory. It will also fetch the internal registers of each VP other than VP Select and place their contents into Central Memory.

The System Error Processor will then use the ROM Dump routine to obtain a hard-copy print of all of Central Memory.

The locations of each component saved in CM will be fixed. The locations will be for these four components: (1) Current CR file contents, (2) Current Contents of Internal registers of each VP, (3) Octet of error codes, and (4) Octet of error locations. The contents of the internal registers of each VP will be stored in CM in a multiplexed format. The location of these in CM will begin on an octet boundary, so there will be a first value from each VP on the first line, a second value from each VP on the second line, and so on up to the tenth line. This will make for easier reading since all values for each VP will be in sequence down the page. If any VP has been found to have passed through the "SYSERR" procedure, its internal registers will not be fetched. The first six registers will not contain any useful information and their locations in CM will contain all #Es. The VPRs for this VP will contain their values upon entrance to the "SYSERR" call.

VP Select will be included in the above if it comes through the "SYSERR" procedure. Otherwise, the register locations in CM for VP Select will contain all zeroes.

8. Interpretation of Dump — The procedure to interpret the printed dump of CM is outlined below:
   A. Look at location #490 in dump. If all error codes in this octet are zero, the error was detected by hardware and the error processing was initiated by Master Controller. In this case, the T-S-O Control Bit (the high order bit of location #401) should be set. If any of the error codes was non-zero and the T-S-O Control Bit was reset, then the error processing was initiated by one or more VPs detecting system errors. The position of the non-zero error codes within the octet will tell which VPs produced the errors. Examination of the hexadecimal value of the error code will determine whether the error was caused by a system task or a system subroutine. If the error code was for a system subroutine then check the current table of system subroutine errors for the cause of the error.

If a system task caused the error, the particular task involved can be determined by locating the task's ID in the task's TE. First go to the octet of active tasks at location #160. Add to this octet the VP number that caused the error. At this new address find the pointer to the task's TE. Add a displacement of two to the TE pointer and go to this new address. The right halfword of this last location will contain the ID of the task. Also, if needed, the current base value of the task in execution can be found in the octet located at #168.

B. Look at location #498 in the dump.
   For those tasks or subroutines that invoked system error processing through the "SYSERR" procedure, this octet will have the hexadecimal address of the location of the "SYSERR" call. If error processing was invoked by hardware through the T-S-O Control Bit, this octet should be all zeroes.

C. Look at locations #440 through #48F.
   This series of ten octets will contain the internal registers of all VFs in a multiplexed format. For VPs that have passed through the "SYSERR" procedure, the first six register values (for that VP) in CM will contain #Es. The next four register values will be the VPR values upon entrance to the "SYSERR" procedure. If VP Select has not come through the "SYSERR" procedure its internal registers will contain zeroes in CM, otherwise its CM register values will be as above.

Note that because of timing considerations, more than one VP may indicate an error. Also, the T-S-O Control Bit may be set.

9. SYSERR Procedure — The "SYSERR" Procedure format is given below. The error codes for system tasks will range from #0000 to #7FFF, while system subroutine error codes will range from #8000 to #FFFF.

Examples of "SYSERR" calls:
A. With specified hexadecimal error code.

| Label | Operator | Operand |
|---|---|---|
| [Error] | SYSERR Proc Expansion | #7071 |

B. With error code in TPT or CPT.

| Label | Operator | Operand |
|---|---|---|
| [ERROR] | SYSERR (CPT,CPTDPL) Proc Expansion | (TPT,TPTDL) | where TPTDPL(CPTDPL) is the displacement of the error code within the TPT (CPT).

COMMAND CONTROLLER

The following section describes the Command Controller. The Command Controller is responsible for scheduling activities. This includes scheduling of jobs. The Command Controller analyzes its service requests to determine resource requirements and subsequently schedules execution of the service request. The Command Controller handles the reservation of two resources - the disc and the Central Memory. The ( m mand Controller is responsible for scheduling the different stages of job processing. The Command Controller is also responsible for the scheduling of command Commands are sequences of tasks identified by the Command Controller to provide logical breakpoints in resource needs for scheduling purposes. To control the execution of commands needed to perform a request, the Command Controller uses a table driven implementation technique called Command Sequences.

The following description of the Command Controller describes various aspects of the Command Controller starting with the Command Controller Polling Loop. The C series of figures are referenced in the Command Controller description.

The following activities are controlled by the command controller:
  Job processing,
  Command sequence processing,
  Command Controller subprograms, and
  Command Controller structure.

0. Title. Command Controller Polling Loop (FIGS. C1–C8)
1. Entry Point. BOSSO
2. Purpose. Polling loop for the Command Controller
3. Overview. It polls the various Command Controller lists and initiates appropriate processors.
4. Inputs. See lists referenced below.
5. Outputs. None
6. Tables Referenced.
   (a) Command Controller TPT
   (b) SATPRTAB — An internal transfer vector used for processing SAT's. (Referenced via VSA.-SATT)
   (c) CE
   (d) TCIB
7. Lists Accessed.

| | | | |
|---|---|---|---|
| VLH.SCSR | VLH.CAL1 | VLH.TPC | VLH.JPL |
| VLH.CSRQ | VLH.CAL2 | VLH.BPCL | VLH.SJL |
| VLH.DASR | VLH.DPC1 | VLH.TIUSR | VLH.IJSL |
| VLH.CSRL | VLH.DPC2 | VLH.TOSR | VLH.JERL |
| VLH.PRSL | VLH.DMC1 | VLH.SSL | VLH.JTBT |
| VLH.SPSL | VLH.DMC2 | VLH.ENQR | VLH.TSRL |
| VLH.CSL | | | |

8. PROC's Used.
   (a) TLTE
   (b) DLINK
   (c) LINKS
9. Subroutines Used.

| | | |
|---|---|---|
| SCSRPRO | CCCALPRO | CCPMTCPR |
| CCCSRQPR | CCSA1000 | CCENQPRP |
| CCDASRPR | CCSA2000 | JPLPRO |
| CCCS1000 | CCSA3000 | CCSJL |
| CCPRTPRO | CCBPCLPR | CCCIJSL |
| CCSPPRO | BGNCSRTN | CCJERL |
| STARTCOM | CCACTCOM | CCJTBT |
| | | CCTSRL |

10. Input/Output. None
1. Title. Device Attention Service Request List Processor
2. Purpose. The Device Attention Service Request List (DASR) Processor is responsible for requesting the command Sequences to Service Device Attention bits.
3. Input. A CSRE containing a Device Attention Bit Image Table pointer is input to the DASR Processor.
4. Output. CSRE's for command sequences to service the Device Attention bits are put on the Command Sequence Request List.
5. Overview. The DASR Processor gets the image of the Device Attention (DA) bits from the DA Bit Image Table addressed by the input CSRE. The DASR Processor builds a CSRE for each DA bit which is set in the DA bit image and puts those CSRE's on the Command Sequence Request List.
6. Flow. Flowchart in FIG. C9
1. Title. Command Sequence Request List Processor.
2. Purpose. The Command Sequence Request List (CSRL) Processor is responsible for requesting scheduling of the first command in a requested command sequence.
3. Input. A Command Sequence Request Entry (CSRE) is input to the CSRL Processor to indicate that a command sequence is to be initiated.
4. Output. A CE and CPT containing the information necessary to schedule the first command in the request command sequence are output by the CSRL Processor.
5. Overview. The CSRL Processor uses the input CSRE to build a CE and CPT for the first command in the requested command sequence. If the requested command sequence is non-reentrant and currently in execution, the CE for the first command is placed on the Command Sequence Waiting List, and the CSRL Processor has completed execution. If the requested command sequence is reentrant or if it is non-reentrant but not currently in execution, the CE and CPT are initialized for scheduling, and the CE is placed on the Sub-Program Scheduling List if the first command is a Sub-Program, or on the Command Scheduling List if the first command is reentrant or if it is non-reentrant but not currently in execution, or on the Non-reentrant Command Request Queue if the first command is non-reentrant and currently in execution.
6. Flow. Flowchart in FIG. C10
1. Title. Command Attention List Processor.
2. Purpose. The Command Attention List Processor (CALP) is responsible for processing a command which has requested a Command Controller Service.
3. Input. Input to CALP is a CE and CPT containing the information necessary to perform the requested service.
4. Output. The output is dependent on the specific service requested and may be one or more of the following or none at all:
   (a) The input CE is put on one of the following lists:
     (1) Command Scheduling List
     (2) Sub-Program Scheduling List
     (3) Command Waiting List
     (4) Non-Reentrant Command Request List
     (5) Process Request Scheduling List
     (6) Scheduler Service List
   (b) A CSRE is built and put on the Command Service Request List.
5. Overview. The CALP determines from the CE and CPT the type of Command Controller service requested. If SYSCOM is the service requested, a CSRE is built for the SYSCOM command sequence and is put on the Command Sequence Request List (CSRL). The input CE is put on the Command Waiting List or normal CALP processing is continued on the input CE and CPT.

If "Job Activity File" is the service requested, a CSRE is built for the Job Log command sequence and is put on the CSRL. The input CE is put on the Command Waiting List.

If "Command Sequence Request" is the service requested, a CSRE supplied by the calling command is put on the CSRL, and normal processing is continued on the input CE and CPT.

If "Process Request" is the service requested, the input CE is put on the Process Request Scheduling List.

If none of the above services is requested, normal processing occurs. The completion code for advancing the CST pointer is obtained from the input CPT. If the completion code insists that the calling command is to be restored, the input CE and CPT are prepared for scheduling. The CALP then determines if a Scheduler Service was requested via a Scheduler Argument Table; and if so, the input CE is put on the Scheduler Service List. If a Scheduler service was not requested, the input CE is put on one of the following lists:
  (a) Command Scheduling List
  (b) Sub-Program Scheduling List If the completion code does not indicate restart, CALP determines if the command making the service request is reentrant. If the command making the service request is non-reentrant, the first CE for that command found on the Non-Reentrant Command Request List is put on the Command Scheduling List. If none is found, the command is set "not-active" in the command directory.

The CST pointer is then updated according to the completion code to point to the CST entry for the next command in the sequence. The input CPT is then prepared for CST option processing. If the next CST entry is a CST "Termination entry," the first CE for the terminating sequence found on the Command Sequence Waiting List is initialized for scheduling and then put on one of the following lists:
  (a) Command Scheduling List
  (b) Sub-Program Scheduling List
  (c) Non-Reentrant Command Request List The data structure for the terminating sequence is then released, and the command sequence termination is processed in one or more or none of the following ways:
  (a) The IJSL Analyser may be started.
  (b) A command waiting for this requested process may be scheduled.
  (c) The next process in a Process Request Table will be initiated if those processes are to be initiated sequentially.
  (d) The JE may be moved to a different linked list.
  (e) A CSRE will be built as specified in the CST "Termination" entry and put on the Command Sequence Request List.

If the next entry in the CST is a normal entry, the data structure for that next command is created in one of the following ways as indicated in the CST entry:
  (a) The same CPT used by the previous command may be used by the next command.
  (b) A new CPT may be built and the old CPT may or may not be saved.
  (c) A CPT that was previously saved may be used by the next command and the CPT used by the previous command may or may not be saved. The CALP then determines if a Scheduler service was requested via a Scheduler Argument Table; and if so, the input CE is put on the Scheduler Service List. If a Scheduler Service was not requested by the command being processed, the input CE is then prepared for scheduling and is put on one of the following lists:
  (a) Command Scheduling List
  (b) Sub-Program Scheduling List
  (c) Non-Reentrant Command Request List
  (d) Command Waiting List
6. Flow. Flowcharts in FIG. C11-13

1. Title. DIO Processing Complete List Processor.
2. Purpose. The DIO Processing Complete List (DPCL) Processor is responsible for processing a command for which DIO processing has been completed.
3. Input. Input to the DPCL Processor is a Task DIO Queue Entry (TDQE) which contains the address of the CE for the command for which the DIO processing has been completed.
4. Output. The output is context dependent and may be one of the following or none at all:
  (a) The input CE is put on one of the following lists:
    (1) Command Scheduling List
    (2) Sub-Program Scheduling List
    (3) Non-Reentrant Scheduling List
    (4) Command Waiting List
  (b) A CSRE is built and put on the Command Sequence Request List.
5. Overview. The DPCL Processor finds the CE associated with the input TDQE and removes that CE from the Command I/O Waiting List (CIWL). The DPCL Processor then determines if a disc append is being requested by DIO. If an append is not being requested, normal CALP processing is then performed on the CE and associated CPT as described under the Command Attention List Processor.

If an append is being requested, the CE is put on the Command Waiting List, and a CSRE is built for the Disc Allocation command sequence and is put on the Command Sequence Request List.
6. Flow. Flowcharts in FIG. $C_{14-15}$
1. Title. TIO Processing Complete List Processor.
2. Purpose. The TIO Processing Complete List (TPCL) Processor is responsible for processing a command for which TIO processing has been completed.
3. Input. Input to TPCL Processor is a TCIB which contains the address of the CE for the command for which the TIO processing has been completed.
4. Output. The output is context dependent and may be one of the following or none at all:
  (a) The input CE is put on one of the following lists:
    (1) Command Scheduling List
    (2) Sub-Program Scheduling List
    (3) Non-Reentrant Command Request List
  (b) A CSRE is built and put on the Command Sequence Request List.
5. Overview. The TPCL Processor finds the CE associated with the input TCIB and removes that CE from the Command I/O Waiting List (CIWL). Normal CALP processing is then performed on that CE and the associated CPT as described under the Command Attention List Processor.
6. Flow. Flowcharts in FIG. C16-17
1. Title. Driver Manager Processing Complete List Processor
2. Purpose. The Driver Manager Processing Complete List (DMPC) Processor is responsible for processing a command for which Driver Manager processing has been completed.
3. Input. Input to the DMPC Processor is a Driver Manager Request Entry (DMRE) which contains the address of the CE for the command for which the Driver Manager processing has been completed.
4. Output. The output is context dependent and may be one of the following or none at all:
   (a) The input CE is put on one of the following lists:
       (1) Command Scheduling List
       (2) Sub-Program Scheduling List
       (3) Non-Reentrant Command Request List
   (b) A CSRE is built and put on the Command Sequence Request List.
5. Overview. The DMPC Processor finds the CE associated with the input DMRE and removes that CE from the Command I/O Waiting List (CIWL). Normal CALP processing is then performed on that CE and associates CPT as described under the Command Attention List Processor.
6. Flow. Flowcharts in FIG. C18-19

1. Title. Breakpoint Processing Complete List Processor.
2. Purpose. The Breakpoint Processing Complete List (BPCL) Processor is responsible for rescheduling exercize commands which have been breakpointed.
3. Input. Input to the BPCL Processor is a Breakpoint Processing Complete List entry which contains the addresses of the CE's for the commands which have been breakpointed.
4. Output. The BPCL Processor puts the CE's addressed in the BPCL entry on the Breakpoint Restart List.
5. Overview. The BPCL Processor uses the input BPCL entry to find the CE's for the breakpointed commands. The BPCL Processor moves these CE's from the Breakpoint Waiting List to the Breakpoint Restart List. When all CE's have been moved, the BPCL entry is released.
6. Flow. Flowchart in FIG. C20

1. Title. Page Allocation SAT Processor.
2. Purpose. The Page Allocation SAT (PGAL) Processor is responsible for obtaining CM pages for commands requesting pages of CM.
3. Input. A CE containing the address of a Page Allocation Scheduler Argument Table is input to the PGAL Processor.
4. Output. The address of the first page assigned is returned to the calling command in the SAT.
5. Overview. The PGAL Processor finds the Page Allocation SAT from the input CE. Using parameters from the SAT, the PGAL Processor calls the Page Allocation System Subroutine to assign the CM page or pages. Upon return from Page Allocator, the PGAL Processor puts the address of the first page assigned into the SAT if the requested page or pages were assigned. If the requested page or pages were not assigned, the SAT is placed on the Memory Waiting List.
6. Flow. Flowchart in FIG. C21

1. Title. Page Deallocation SAT Processor.
2. Purpose. The Page Deallocation SAT (PGDL) Processor is responsible for returning to the system CM pages used by commands.
3. Input. A CE containing the address of a Page Deallocation Scheduler Argument Table is input to the PGDL Processor.
4. Output. None.
5. Overview. The PGDL passes the parameters from the input SAT to the Page Deallocation System Subroutine which will return CM pages to the system. Upon return from the Page Deallocation Subroutine, the PGDL Processor releases the input SAT. The PGDL Processor will then call the Page Allocation System Subroutine for each SAT on the Memory Waiting List.
6. Flow. Flowchart in FIG. C22

1. Title. Process Request Scheduling List Processor.
2. Purpose. The Process Request Scheduling List (PRSL) Processor is responsible for initiating the processes requested in a Process Request Table (PRT).
3. Input. Input to the PRSL Processor is a CE and CPT containing the address of a PRT.
4. Output. The PRSL Processor puts a CSRE on the Command Sequence Request List for each process requested in a PRT.
5. Overview. The PRSL Processor gets the PRT addressed by the input CPT and determines which flags are set in the PRT. If the "sequential processing" is specified, a CSRE is built for the first process requested, the CSRE is placed on the CSRL, and the input CE is placed on the Command Waiting List.
If "sequential processing" is not specified, a CSRE is built for each process requested and put on the CSRL.
If "wait" is specified the input CE is put on the Command Waiting List. If "wait" is not specified the input CE is placed on a Command Attention List, and the input PRT is released.
If "pass restart information" is specified, the "Calling PRT Pointer" and "PRT Entry Number" fields are moved from the input CE to the CSRE built for the single process requested, those fields are cleared in the input CE, and the input CE is put on a Command Attention List.
6. Flow. Flowcharts in FIG. C23

1. Title. Sub-Program Scheduling List Processor.
2. Purpose. The Sub-Program Scheduling List (SPSL) Processor is responsible for executing Command Controller Sub-Programs.
3. Input. Input to the SPSL Processor is a CE and CPT containing the information necessary to execute the requested Sub-Program.
4. Output. N/A
5. Overview. The SPSL Processor gives control to the Sub-Program specified by the input CE and CPT. The SPSL uses the input CE to get the entry point address of the Sub-Program from the Command Directory, sets the base register to the input CPT, and gives control to the Sub-Program. The Sub-Program returns control to the SPSL Processor via a CCALL.
6. Flow. Flowcharts in FIG. C24

0. Title. Command Controller Entry Point.
1. Purpose. This is the entry point for the Command Controller.
2. Inputs. CM Base Register is set to Command Controller TPT.
3. Outputs. CSRE for CS. SYLGI Command Sequence is linked on VLH.CSRL.
4. Overview. A CSRE is built for the SYSLOG Initialization Command Sequence (CS.SYLGI) and linked to VLH.CSRL, and a branch is made to the CC Polling Loop.
5. Flow. Flowchart is in FIG. C25

0. Title. Page Management Threshold Crossed Processor
1. Purpose. The Page Management Threshold Crossed (PMTC) Processor initiates swapping of CP steps to disc to make CM pages available to Memory Management to prevent CM deadlock.

2. Input. VSA.PMTC
3. Output. Not yet defined.
4. Overview. The PMTC will initiate the CP Step Swapper. (This mechanism is as yet undefined.) The "Threshold Checked" flag in the Page Allocation Control Table will be set and VSA.PMTC will be reset to zero.

0. Title. ENQ Request Processor
1. Purpose. The ENQ Request (ENQR) Processor restarts commands which are waiting for resources which have become available.
2. Input. CE on VLH.ENQR
3. Output. CE on VLH.CAL1 or VLH.CAL2
4. Overview. The ENQR Processor moves a CE from VLH.ENQR to VLH.CAL1 or VLH.CAL2, depending on priority of the CE.
5. Flow. Flowchart is in FIG. C26

0. Title. Job Termination Initiation Processor
1. Purpose. The Job Termination Initiation Processor processes requests to initiate job termination.
2. Inputs. JE on VLH.JTBT.
3. Outputs. (a) Input JE on VLH.JBT. (b) A CSRE for Job Terminator Command Sequence (CS.J0BT) is put on VLH.CSRL.
4. Overview. The Job Termination Initiation Processor moves a JE from VLH.JTBT to VLH.JBT and requests the Job Terminator Command Sequence (CS.JOBT).
5. Flow. Flowchart is in FIG. C27

0. Title. Timer Service Request Processor
1. Purpose. The Timer Service Request Processor processes Timer Queue Service requests.
2. Inputs. A Delayed Process Request Table (DPRT) on VLH.TSRL.
3. Outputs. A CSRE on VLH.CSRL.
4. Overview. The Timer Service Request Processor delinks all entries (DPRT's) from VLH.TSRL, converts them to CSRE's by clearing the Time Delay (DPR.TDEL) and DPRT ID (DPR.UID) fields in the DPRT, and links the CSRE's on VLH.CSRL.
5. Flow. Flowchart is in FIG. C28

0. Title. Service Call Service Request Processor
1. Purpose. The Service Call Service Request Processor processes CP Service Call Service Requests.
2. Input. A CSRE containing the virtual address of the Service Call Control Block at CSR.ARGP and the SE pointer at CSR.HLSP.
3. Output.
   (a) The SE may be moved from VLH.SWL to one of the following lists:
     (1) VLH.SBT
     (2) VLH.SSTL
     (3) VLH.CPX1 or VLH.CPX2
   (b) A CSRE may be built and put on VLH.CSRL.
4. Overview. The SCSR processor obtains the information from the input CSRE and releases the CSRE. The SCSR Processor then accesses the Service Call Control Block and processes the service request. If a Command Sequence is required to process the Service Call, a CSRE is built for the Command Sequence and is put on VLH.CSRL. If the Service Call is for CP Step suspension, the SE is moved to VLH.SSTL. If Step Terminator is to be initiated, the SE is put on VLH.SBT.
5. Flow. Flowchart is in FIG. C29-31

0. Title. SAT.TDEL Processor
1. Purpose. The SAT.TDEL Processor processes Scheduler requests for job structure deallocation.
2. Inputs. SATOA
3. Outputs. A CSRE for CS.JDEAL Command Sequence is put on VLH.CSRL.
4. Overview. The SAT.TDEL Processor increments the total amount of disc available by the amount of disc released by the terminating job and then restarts all commands waiting for disc which can be restarted. The job count for the system is decremented and the CS.JDEAL Command Sequence is requested.
5. Flow. Flowchart is in FIG. C32

0. Title. SAT.JCAN Processor
1. Purpose. The SAT.JCAN Processor processes Scheduler requests to initiate job cancellation.
2. Input. SAT $OC_{16}$
3. Output.
   (a) If cancelled job is a TOS or Data Concentrator job, the JE is linked on VLH.JTBT.
   (b) If cancelled job is not a TOS or Data Concentrator job, the JE is linked on VLH.JICL.
4. Overview. The SAT.JCAN Processor processes each JE to be cancelled as follows:
   (a) The "Cancel" flag is set, and the "Outstanding Cancel Request" and "Active Job" flags are reset in the JE.
   (b) The "Cancel" flag is set in each CE and SE in the job's "Hanging Loop Structure."
   (c) If the job is a Standard Interactive Job, all Command Sequences which are part of this job and are waiting for terminal responses or Data Concentrator buffers will be restarted.
   (d) If the cancelled job is a TOS or Data Concentrator Job, the JE is linked on VLH.JTBT; else, the JE is linked on VLH.JICL. When all JE's have been processed, the "Cancel CP Step" CR bit, CRM.CPSC, is set.
5. Flow. Flowcharts are in FIGS. C33-34

0. Title. SAT.JOBT and SAT.EOJ Processor
1. Purpose. The SAT.JOBT and SAT.EOJ Processor processes Scheduler requests to initiate job termination.
2. Inputs. SATOD or SATOE
3. Outputs. The JE whose address is given in the input SAT is linked in VLH.JTBT.
4. Overview. The SAT.JOBT and SAT.EOJ Procesor moves the JE whose address is given in the input SAT from the list into which it is currently linked to VLH.JTBT.
5. Flow. Flowchart is in FIG. C35

0. Title. SAT.TCBR and SAT.TDBR Processor
1. Purpose. The SAT.TCBR and SAT.TDBR Processor processes Scheduler requests for assignment of Data Concentrator buffers.
2. Inputs. SAT $50_{16}$ or SAT $51_{16}$
3. Output.
   (a) If a buffer is available, the buffer size is put in the calling SAT.
   (b) If no buffer is available,
     (1) The CE of the calling command is put on VLH.CWL.
     (2) A TWLE is built and linked to the Terminal Device Status Block.
4. Overview. Using the Facility ID from the input SAT, the SAT.TCBR and SAT.TDBR Processor finds the Terminal Device Status Block (TDSB) and finds the Communication Information Area in the TDSB if the input SAT is SAT $50_{16}$ or finds the Data Information Area in the TDSB if the input SAT is SAT $51_{16}$. If the buffer count in the CIA or DIA is non-zero, that count is decremented by 1 and the buffer size is put in the input SAT. If the buffer count is zero, a TWLE is built using the information from the input SAT, that TWLE is linked to the Terminal Wait List in the CIA or DIA, and the CE of the calling command is put on VLH.CWL.
5. Flow. Flowchart is in FIG. C36
0. Title. SAT.TCBA and SAT.TDBA Processor
1. Purpose. The SAT.TCBA and SAT.TDBA Processor is responsible for processing Scheduler requests to assign Data Concentrator buffers to waiting commands.
2. Input. SAT $52_{16}$ and SAT $53_{16}$
3. Output. If a buffer is available and a command is waiting for a buffer, the buffer size is put in the SAT associated with the CE of the waiting command, and the waiting command's CE is put on VLH.CSL.
4. Overview. The SAT.TCBA and SAT.TDBA Processor finds the Communication Information Area (CIA) if the input SAT is SAT $52_{16}$ or the Data Information Area (DIA) if the input SAT is SAT $53_{16}$ in the Terminal Device Status Block (TDSB) whose address is given in the input SAT. If the buffer count in the CIA or DIA is non-zero and there is an entry on the Terminal Wait List in the CIA or DIA, the CE whose address is given in that Terminal Wait List Entry (TWLE) is restarted and the TWLE is released.
5. Flow. Flowchart is in FIG. C37
0. Title. SAT.CPST Processor
1. Purpose. The SAT.CPST Processor processes Scheduler requests for CP Step initiation.
2. Inputs. A CE containing a pointer to a SAT59 at CE.SATP.
3. Outputs. An SE is linked on VLH.CPX1 or VLH.CPX2.
4. Overview. The SAT.CPST Processor transfers the required information from the CE of the calling command to the SE whose address is given in the SAT. The SE is linked into the "Hanging Loop Structure" of the job and then is linked onto VLH.CPX1 or VLH.CPX2, depending on priority. C38
0. Title. SAT.STTM Processor
1. Purpose. The SAT.STTM Processor processes Scheduler requests for CP Step Termination.
2. Input. A CE containing a pointer to a SAT $5A_{16}$ at CE.SATP.
3. Output. A CSRE for the CS.IJSLA Command Sequence may be put on VLH.CSRL.
4. Overview. The SAT.STTM Processor calls the Page Deallocation System Subroutine to release the CM pages assigned to the CP Step. Upon return from the Page Deallocation System Subroutine, the Page Allocator is called for each entry on VLH.MWL. The SAT.STTM Processor processes a calling PRT if one exists for the CP Step and requests the CS.IJSLA Command Sequence if there is an IJSL Request ID in the SE. This processor then delinks the SE from the "Hanging Loop Structure" of the job and releases the SE and SPT.
5. Flow. Flowchart is in FIG. C39
0. Title. SAT.LIM Processor
1. Purpose. The SAT.LIM Processor processes Scheduler requests for changes to disc requirements.
2. Inputs. SAT5B
3. Outputs. If disc not available,
   (a) calling SAT put on VLH.SAO1
   (b) calling CE put on VLH.CWL
4. Overview. The SAT.LIM Processor checks the amount of disc requested against the amount of disc available and if the disc is available, the amount available is decremented by the amount requested.
Flowchart — FIG. C40
If the disc is not available, the calling SAT is put on VLH.SAO1, and the CE of the calling command is put on VLH.CWL.
0. Title. SAT.CSS Processor
1. Purpose. The SAT.CSS Processor processes Scheduler requests to suspend a Command Sequence.
2. Input. SAT $A1_{16}$
3. Output. CE is linked on VLH.CWL.
4. Overview. The SAT.CSS Processor links the CE of the caller onto VLH.CWL.
5. Flow. Flowchart is in FIG. C41
0. Title. SAT.CSR Processor
1. Purpose. The SAT.CSR Processor processes Scheduler requests to restart Command Sequences waiting for terminal responses or Data Concentrator buffers.
2. Input. SAT $A2_{16}$
3. Output. A CE is linked on VLH.CSL
4. Overview. The SAT.CSR Processor finds the CE address in the input SAT and moves that CE from VLH.CWL to VLH.CSL. If there is a response pointer in the SAT, that pointer is put in the SAT associated with the CE being restarted.
5. Flow. Flowchart is in FIG. C42
0. Title SAT.THPO Processor
1. Purpose. The SAT.THPO Processor processes Scheduler requests to output terminal messages on the TCC High Priority CA Chain.
2. Input. SAT $A3_{16}$
3. Output.
   (a) TCIB on VLH.THPO
   (b) CE of calling command put on VLH.CWL
4. Overview. The SAT.THPO Processor links the CE of the calling command on VLH.CWL and links the TCIB whose address is given in the input SAT on VLH.THPO.
5. Flow. Flowchart is in FIG. C43
0. Title. SAT.TRR Processor
1. Purpose. The SAT.TRR Processor processes Scheduler requests for responses from the terminal environment.
2. Input. SAT $A4_{16}$
3. Output.
   (a) The CE of the calling command will be put on VLH.CWL if a response has not been input from the terminal.
   (b) A response pointer will be placed in the SAT if a response has been input from the terminal.
4. Overview. Using the Facility ID from the input SAT, the SAT.TRR Processor finds the Terminal Device Status Block and searchs the Terminal Wait List in the Response Information Area of that TDSB for a TWLE for this request. When that TWLE is found, if a response is linked to the TWLE, a pointer to that response is put in the input SAT, and the response is delinked from the TWLE. If there is no response the CE of the calling command is put on VLH.CWL.
5. Flow. Flowchart is in FIG. C44
0. Title. SAT.CERS Processor 1. Purpose. The SAT.CERS Processor processes Scheduler requests to restart suspended Command Sequences.
2. Input. SAT $AC_{16}$
3. Output. A CE is linked on VLH.CSL.
4. Overview. The SAT.CERS Processor finds the CE address in the input SAT and moves that CE from VLH.CWL to VLH.CSL.
3. Flow. Flowchart is in FIG. C45
0. Title. Command Controller Entry Point
1. Entry Point. CCINITEP
2. Purpose. This is the entry point for the Command Controller.
3. Overview. A request is made for the SYSLOG Initialization Command Sequence (CS.SYLGI) via the BGNCS Procedure and a branch is taken to the CC Polling Loop.
4. Inputs. The CM Base Register is set to the Command Controller TPT.
5. Outputs. None
6. Tables Referenced. Command Controller TPT
7. Lists Accessed. None
8. PROC's Used. BGNCS
9. Subroutines Used. None
10. Input/Output. None
11. Flowcharts. Flowchart is in FIG. C46
0. Title. Page Management Threshold Crossed Processor
1. Entry Points. CCPMTCPR
2. Purpose. The Page Management Threshold Crossed (PMTC) Processor initiates swapping of CP Steps to disc to make CM pages available to Memory Management to prevent CM deadlock.
3. Overview. The mechanism for initiation of CP Step Swapper has not yet been designed. At the current time the PMTC Processor merely sets the "Threshold Checked" flag, VPM.PMTC, in the Page Allocation Control Table (PACT) and clears VSA.PMTC.
4. Inputs.
    (a) VPR0 - return address
    (b) VSA.PMTC - non-zero value
5. Outputs.
    (a) VPM.PMTC flag set in PACT at VPM.FLAG
    (b) VSA.PMTC set to zero
6. Tables Referenced. PACT
7. Lists Accessed. None
8. PROC's Used. None
9. Subroutines Used. None
10. Input/Output. None
0. Title. ENQ Request Processor
1. Entry Points. CCENQRPR
2. Purpose. The ENQ Request Processor restarts commands waiting for resources which are now available.
3. Overview. The ENQ Request Processor moves a CE from VLH.ENQR to VLH.CAL1 or VLH.CAL2, depending on the priority of the CE.
4. Inputs.
    (a) VPR0 - return address
    (b) A CE linked on VLH.ENQR
5. Output. A CE is linked on VLH.CAL1 or VLH.CAL2
6. Tables Referenced.
    (a) Command Controller TPT
    (b) CE
7. Lists Accessed.
    (a) VLH.ENQR
    (b) VLH.CAL1
    (c) VLH.CAL2
8. PROC's Used.
    (a) DLINKS
    (b) RPRIO
    (c) WRQST
    (d) LINKP
9. Subroutines Used. None
10. Input/Output. None
11. Flowchart. Flowchart is in FIG. 47
0. Title. Job Termination Initiation Processor
1. Entry Point. CCJTBT
2. Purpose. The Job Termination Initiation Processor processes requests to initiate job termination.
3. Overview. The Job Termination Initiation Processor moves a JE from VLH.JTBT to VLH.JBT and requests the Job Terminator Command Sequence (CS.JOBT).
4. Inputs
    (a) VPR0 - return address
    (b) JE on VLH.JTBT
5. Outputs.
    (a) Input JE on VLH.JBT
    (b) A CSRE for Job Terminator Command Sequence on VLH.CSRL.
6. Tables Referenced.
    (a) Command Controller TPT
    (b) JE
7. Lists Accessed.
    (a) VLH.JTBT
    (b) VLH.JBT
8. PROC's Used.
    (a) DLINKS
    (b) WRQST
    (c) LINKP
    (d) BGNCS
9. Subroutines Used. None
10. Input/Output. None
11. Flowcharts. Flowchart is in FIG. 48
0. Title. Timer Service Request Processor
1. Entry Point. CCTSRL
2. Purpose. The Timer Sequence Request Processor processes Timer Queue service requests.
3. Overview. The Timer Service Request Processor delinks all entries from VLH.TSRL, converts those entries (DPRT's) to CSRE's by clearing the Time Delay (DPR.TDEL) and DPRT ID (DPR.UID) fields in the DPRT, and links the CSRE's on VLH.CSRL.
4. Inputs. DPRT on VLH.TSRL
5. Outputs. CSRE on VLH.CSRL
6. Tables Referenced.
    (a) Command Controller TPT
    (b) DPRT
7. Lists Accessed.
    (a) VLH.TSRL
    (b) VLH.CSRL
8. PROC's Used.
    (a) DLINKS
    (b) LINKP
9. Subroutines Used. None
10. Input/Output. None
11. Flowcharts. Flowchart is in FIG. C49
0. Title. Service Call Service Request Processor
1. Entry Point. SCSRPRO
2. Purpose. The Service Call Service Request (SCSR) Processor processes CP Service Call Service Requests.

3. Overview. The SCSR Processor obtains the information from the input CSRE and releases that CSRE. The SCSR Processor then accesses the input Service Call Control Block (SCCB) and either processes the service request internally or requests a Command Sequence to process the service request, depending on the SCCB pointer and the information in the SCCB.
4. Inputs
 (a) VPR0 - return address
 (b) A CSRE on VLH.SCSR
 (c) In CSRE
  (1) at CSR.HLSP - SE pointer
  (2) at CSR.ARGP - SCCB virtual address
5. Outputs.
 (a) The SE may be put on one of the following lists:
  (1) VLH.SBT
  (2) VLH.SSTL
  (3) VLH.CPX1
  (4) VLH.CPX2
 (b) a CSRE may be built and put on VLH.CSRL.
6. Tables Referenced.
 (a) Command Controller TPT
 (b) CSRE
 (c) SE
 (d) SPT
 (e) SCCB
 (f) VSA.SCCS
7. Lists Accessed.
 (a) VLH.SCSR
 (b) VLH.SWL
 (c) VLH.SBT
 (d) VLH.SSTL
 (e) VLH.CSRL
8. PROC's Used.
 (a) DLINKS
 (b) RCELL
 (c) CALL
 (d) DLINK
 (e) WRQST
 (f) LINKP
 (g) RPRIO
 (h) CGET
9. Subroutines Used.
 (a) VSSCVTA
 (b) CSSCSREB
 (c) CCSC7500
 (d) CCSC8000
10. Input/Output. None
11. Flowcharts. Flowchart is in FIGS. C 50-53
0. Title. SAT. TDEL Processor
1. Entry Point. JOBTDEL
2. Purpose. The SAT. TDEL Processor processes Scheduler requests for job structure deallocation.
3. Overview. The SAT. TDEL Processor increments the total amount of disc available by the amount of disc released by the terminating job and restarts all commands waiting for disc which can be restarted. The job count for the system is decremented and the CS. JDEAL Command Sequence is requested via the BGNCSRTN Command Controller Subroutine.
4. Inputs.
 (a) VPR0 - return address
 (b) CTPTCEPT (in CCTPT) - CE address
 (c) CTPTJSV4 (in CCTPT) - SATOA address
5. Outputs.
 (a) A CSRE for the CS.JDEAL Command Sequence is put on VLH.CSRL.
 (b) CE's may be moved from VLH.CWL to VLH.CSL.
6. Tables Referenced.
 (a) Command Controller TPT
 (b) CE
 (c) SATOA
 (d) SAT5B
7. Lists Accessed.
 (a) VLH.SAO1
 (b) VLH.CWL
8. PROC's Used.
 (a) NEXTS
 (b) DLINK
9. Subroutines Used.
 (a) CCACTCOM
 (b) BGNCSRTN
10. Input/Output. None
11. Flowcharts. Flowchart is in FIGS. C54-56
0. Title. SAT.JCAN Processor
1. Entry Points. CCJCANPR
2. Purpose. The SAT.JCAN Processor processes Scheduler requests to initiate job cancellation.
3. Overview. The SAT.JCAN Processor processes each JE to be cancelled as follows:
 (a) The "Cancel" flag, JOB,CANC, is set and the "Outstanding Cancel Request" flag, JOB,OCNR, and "Active Job" flag, JOB,ACTJ, are reset in the JE.
 (b) The "Cancel" flag, CE,CANCL, is set in each CE and SE in the job's "Hanging Loop Structure."
 (c) If the job is a Standard Interactive Job, all TWLE's for this job linked to the Terminal Device Status Block will be released and the CE associated with each TWLE will be moved to VLH.CSL.
 (d) If the job is a TOS or Data Concentrator job, the JE is linked onto VLH.JTBT; else, the JE is linked on VLH.JICL.
When all JE's have been processed, the "Cancel CP Step" CR bit, CRM.CPSC, is set.
4. Input.
 (a) VPR0 - return address
 (b) CTPTCEPT (in CCTPT) - CE address
 (c) In CE (at CE.SATP) - SAT $OC_{16}$ address
5. Output. JE's on VLH.JTBT or VLH.JICL.
6. Tables Referenced.
 (a) Command Controller TPT
 (b) SAT $OC_{16}$
 (c) JE
 (d) CE
 (e) Terminal Device Status Block (TDSB)
 (f) TWLE
 (g) SAT $50_{16}$
 (h) SAT $51_{16}$
 (i) SAT $A4_{16}$
7. Lists Accessed
 (a) VLH.JTBT
 (b) VLH.JICL
 (c) VLH.CWL
 (d) Terminal Wait Lists in TDSB
8. PROC's Used
 (a) TJSINT
 (b) TJDCNJ
 (c) TJTOSJ
 (d) WRQST
 (e) DLINK
 (f) LINKP
 (g) RCELL 9. Subroutines Used
   (a) CCTRFDSB
   (b) CCACTCOM
10. Input/Output None
11. Flowcharts Flowchart is in FIGS. C51–C61
0. Title. SAT.JOBT and SAT.EOJ Processor
1. Entry Point. JOBTBT
2. Purpose. The SAT.JOBT and SAT.EOJ Processor processes Scheduler requests to initiate job termination.
3. Overview. The SAT.JOBT and SAT.EOJ Processor moves the JE whose address is given in the input SAT from the list into which it is currently linked to VLH.JTBT.
4. Inputs.
   (a) VPR0 - return address
   (b) CTPTJSV4 (in CCTPT) - SATOD or SATOE address
5. Output. JE linked onto VLH.JTBT.
6. Tables Referenced.
   (a) Command Controller TPT
   (b) SATOD
   (c) SATOE
   (d) JE
7. Lists Accessed. VLH.JTBT
8. PROC's Used.
   (a) DLINK
   (b) LINKP
   (c) WRQST
9. Subroutines Used. None
10. Input/Output. None
11. Flowcharts. Flowchart is in FIG. C62
0. Title. SAT.TCBR and SAT.TDBR Processor
1. Entry Points.
   (a) CCTCBRPR
   (b) CCTDBRPR
2. Purpose. The SAT.TCBR and SAT.TDBR Processor processes Scheduler requests for assignment of Data Concentrator buffers.
3. Overview. This processor gets the Facility ID from the input SAT and calls the CCTRFDSB Command Controller Subroutine to find the Terminal Device Status Block (TDSB). This processor accesses the Communication Information Area in the TDSB if the input SAT is SAT $50_{16}$; or it accesses the Data Information Area in the TDSB if the input SAT is SAT $51_{16}$. If a buffer of the requested type is available, the buffer count in the CIA or DIA is decremented, and the buffer size is put into the input SAT. If a buffer is not available, a Terminal Wait List Entry is built using the information from the input SAT and linked on the Terminal Wait List in the CIA or DIA of the TDSB, and the CE of the calling command is linked on VLH.CWL.
4. Inputs.
   (a) VPR0 - return address
   (b) CTPTCEPT (in CCTPT) - CE address
   (c) In CE (at CE.SATP) - SAT $50_{16}$ or SAT $51_{16}$ address
5. Outputs.
   (a) Buffer size is put in input SAT, or
   (b) CE of calling command is linked on VLH.CWL, and a TWLE is linked on Terminal Wait List in CIA or DIA of TDSB.
6. Tables Referenced.
   (a) Command Controller TPT
   (b) CE
   (c) SAT $50_{16}$
   (d) SAT $51_{16}$
   (e) TDSB
   (f) TWLE
7. Lists Accessed.
   (a) VLH.CWL
   (b) Terminal Wait Lists in CIA and DIA of TDSB
8. PROC's Used.
   (a) CALL
   (b) CGET
   (c) BLHDR
   (d) LINKP
   (e) WRQST
9. Subroutines Used.
   (a) VSSLOCK
   (b) VSSFREE
   (c) CCTRFDSB
10. Input/Output. None
11. Flowcharts. Flowchart is in FIGS. C63–65
0. Title. SAT.TCBA and SAT.TDBA Processor
1. Entry Points.
   (a) CCTCBAPR
   (b) CCTDBAPR
2. Purpose. The SAT.TCBA and SAT.TDBA Processor processes Scheduler requests to assign Data Concentrator buffers to waiting commands.
3. Overview. The SAT.TCBA and SAT.TDBA Processor gets the address of the Terminal Device Status Block (TDSB) from the input SAT. If the input SAT is SAT $52_{16}$, the Communication Information Area (CIA) in the TDSB is accessed. If the input SAT is SAT $53_{16}$, the Data Information Area (DIA) in the TDSB is accessed. If the buffer count in the appropriate information area is non-zero and if there is a Terminal Wait List Entry (TWLE) on the Terminal Wait List in that area, the CE whose address is given in that TWLE is restarted, and that TWLE is released.
4. Inputs.
   (a) VPR0 - return address
   (b) CTPTCPET (in CC TPT) - CE address
   (c) In CE (at CE.SATP) - SAT $52_{16}$ or SAT $53_{16}$ address
5. Outputs.
   (a) A CE may be moved from VLH.CWL to VLH.CSL.
   (b) The buffer size is put into the SAT associated with the restarted CE.
6. Tables Referenced.
   (a) Command Controller TPT
   (b) CE
   (c) SAT $52_{16}$
   (d) SAT $53_{16}$
   (e) SAT $50_{16}$
   (f) SAT $51_{16}$
   (g) TDSB
   (h) TWLE
7. Lists Accessed.
   (a) VLH.CWL
   (b) Terminal Wait Lists in CIA and DIA of TDSB
8. PROC's Used.
   (a) CALL
   (b) DLINKS
   (c) RCELL
   (d) DLINK
9. Subroutines Used.
   (a) VSSLOCK (b) VSSFREE
(c) CCACTCOM
10. Input/Output. None
11. Flowcharts. Flowchart is in FIGS. C66–68
0. Title. SAT.CPST Processor
1. Entry Point. CCCPSTPR
2. Purpose. The SAT.CPST Processor processes Scheduler requests for CP Step initiation.
3. Overview. The SAT.CPST Processor transfers the required information from the CE of the calling command to the SE whose address is given in the input SAT and clears those fields in the CE of the calling command. The SE is linked into the "Hanging Loop Structure" of the job and then is linked onto VLH.CPX1 or VLH.CPX2, depending on priority.
4. Inputs.
    (a) VPR0 - return address
    (b) CTPTCEPT (in CC TPT) - CE address
    (c) In CE (at CE.SATP) - SAT59 address
5. Outputs. The SE whose address is given in the input SAT is linked onto VLH.CPX1 or VLH.CPX2.
6. Tables Referenced.
    (a) Command Controller TPT
    (b) CE
    (c) SAT 59
    (d) SE
7. Lists Accessed.
    (a) VLH.CPX1
    (b) VLH.CPX2
8. PROC's Used.
    (a) LNHLS
    (b) RPRIO
    (c) WRQST
    (d) LINKP
9. Subroutines Used. None
10. Input/Output. None
11. Flowcharts. Flowchart is in FIGS. C69–70
0. Title. SAT.STTM Processor
1. Entry Points. CCSTTMPR
2. Purpose. The SAT.STTM Processor processes Scheduler requests for termination of a CP Step.
3. Overview. The SAT.STTM Processor calls the Page Deallocation System Subroutine to release the CM Pages assigned to the CP Step and upon return calls the CCPD1000 Command Controller Subroutine. This processor then increments the completion count in the calling PRT, if there is a calling PRT pointer in the SE, and if all entries in the PRT are complete, the CE associated with the PRT will be moved to VLH.CAL1 or VLH.CAL2; but if all entries are not complete and the PRT is being processed sequentially, the PRT Processor is entered at entry point CCPR5000.
If there is an IJSL Request ID in the SE, a CSRE is built for CS.IJSLA Command Sequence.
The SE is removed from the "Hanging Loop Structure" of the job, delinked from VLH.SBT and released with the SPT.
The "Service Call" bit is reset in the CE of the caller (Step Terminator).
4. Input.
    (a) VPR0 - return address
    (b) CTPTCEPT (in CC TPT) - CE address
    (c) In CE (at CE.SATP) - SAT $5A_{16}$ address.
5. Output.
    (a) SE and SPT are released.
    (b) A CSRE may be put on VLH.CSRL.
6. Tables Referenced.
    (a) Command Controller TPT
    (b) SAT $5A_{16}$
    (c) PRT
    (d) CE
7. Lists Accessed.
    (a) VLH.CSRL
    (b) VLH.CAL1
    (c) VLH.CAL2
3. PROC's Used.
    (a) RCELL
    (b) RPRIO
    (c) DLINK
    (d) WRQST
    (e) LINKP
    (f) CGET
    (g) DLHLS
9. Subroutines Used.
    (a) VSSRELP
    (b) CCPD1000
    (c) CSSCSREB
10. Input/Output. None
11. Flowcharts. Flowchart is in FIGS. C71–74
0. Title SAT.LIM Processor
1. Entry Point. JOBLIM
2. Purpose. The SAT.LIM Processor processes Scheduler requests for changes to disc requirements.
3. Overview. The SAT.LIM Processor determines if the amount of disc requested is available, and if it is available, the total amount of disc available is decremented, in VSA.DKUS.
If the disc requested is not available, the input SAT is linked on VLH.SAO1 and the input CE is linked on VLH.CWL to wait for disc to become available.
4. Inputs.
    (a) VPR0 - return address
    (b) CTPTJSV4 - SAT5B address
    (c) CTPTCEPT - CE address
5. Outputs. If disc is not available,
    (a) calling SAT put on VLH.SAO1
    (b) calling CE put on VLH.CWL
6. Tables Referenced.
    (a) Command Controller TPT
    (b) CE
    (c) SAT5B
7. Lists Accessed.
    (a) VLH.SAO1
    (b) VLH.CWL
8. PROC's Used.
    (a) LINKP
    (b) WRQST
9. Subroutines Used. None
10. Input/Output. None
11. Flowcharts. Flowchart is in FIG. C75
0. Title. SAT.CSS Processor
1. Entry Point. CCCSSPR
2. Purpose. The SAT.CSS Processor processes Scheduler requests for the Command Sequence suspension
3. Overview. The SAT.CSS Processor links the input CE on VLH.CWL.
4. Input.
    (a) VPR0 - return address
    (b) CTPTCEPT (in CC TPT) - CE address
    (c) In CE (at CE.SATP) - SAT $A1_{16}$ address
5. Output. Input CE is put on VLH.CWL
6. Tables Referenced.
    (a) Command Controller TPT
    (b) CE 7. Lists Accessed.
  (a) VLH.CWL
8. PROC's Used.
  (a) WRQST
  (b) LINKP
9. Subroutines Used. None
10. Input/Output. None
11. Flowcharts. Flowchart is in FIG. C76
0. Title. SAT.CSR Processor
1. Entry Point. CCCSRPR
2. Purpose. The SAT.CSR Processor processes Scheduler requests to restart Command Sequences waiting for terminal responses or Data Concentrator buffers.
3. Overview. The SAT.CSR Processor gets the CE address from the input SAT. If there is also a response pointer in the input SAT, that response pointer will be put in the SAT associated with the CE to be restarted. The CCACTCOM Command Controller Subroutine is called to restart the CE.
4. Input.
  (a) VPR0 - return address
  (b) CTPTCEPT (in CC TPT) - CE address
  (c) In CE (at CE.SATP) - SAT $A2_{16}$ address
5. Output. A CE is put on VLH.CSL.
6. Tables Referenced.
  (a) Command Controller TPT
  (b) CE
  (c) SAT $A2_{16}$
  (d) SAT $A4_{16}$
7. Lists Accessed.
  (a) VLH.CWL
8. PROC's Used.
  (a) DLINK
9. Subroutines Used.
  (a) CCACTCOM
10. Input/Output. None
11. Flowcharts. Flowchart is in FIG. C77
0. Title SAT.THPO Processor
1. Entry Points. CCTHPOPR
2. Purpose. The SAT.THPO Processor processes Scheduler requests to output terminal messages on the TCC High Priority CA chain.
3. Overview. The SAT.THPO Processor links the CE of the calling command on VLH.CWL and links the TCIB whose address is given in the input SAT on VLH.THPO.
4. Input.
  (a) VPR0 - return address
  (b) CPTPCEPT (in CC TPT) - CE address
  (c) In CE (at CE.SATP) - SAT $A3_{16}$ address
5. Output.
  (a) Caller's CE is put on VLH.CWL
  (b) TCIB is put on VLH.THPO
6. Tables Referenced.
  (a) Command Controller TPT
  (b) CE
  (c) SAT $A3_{16}$
  (d) TCIB
7. Lists Accessed.
  (a) VLH.CWL
  (b) VLH.THPO
8. PROC's Used.
  (a) WRQST
  (b) LINKP
9. Subroutines Used. None
10. Input/Output. None
11. Flowcharts. Flowchart is in FIG. C78

0. Title. SAT.TRR Processor
1. Entry Points. CCTRRPR
2. Purpose. The SAT.TRP Processor processes Scheduler requests for responses from the terminal environment.
3. Overview. The SAT.TRR Processor gets the Facility ID from the input SAT and calls the CCTRFDSB Command Controller Subroutine to find the Terminal Device Status Block (TDSB). This processor finds the Terminal Wait List Entry (TWLE) for this request on the Terminal Wait List of the Response Information Area in the TDSB. If a response is linked to the TWLE, that response is delinked from the TWLE, and a pointer to the response is put into the input SAT. If there is no response, the CE of the calling command is put on VLH.CWL.
4. Input
  (a) VPR0 - return address
  (b) CTPTCEPT (in CC TPT) - CE address
  (c) in CE (at CE.SATP) - SAT $A4_{16}$ address
5. Output.
  (a) The CE of the calling command is put on VLH.CWL, or
  (b) A response pointer is put into the input SAT.
6. Tables Referenced.
  (a) Command Controller TPT
  (b) CE
  (c) SAT $A4_{16}$
  (d) TDSB
  (e) TWLE
7. Lists Accessed.
  (a) VLH.CWL
  (b) Terminal Waiting List in Response Information Area of TDSB.
8. PROC's Used.
  (a) CALL
  (b) NEXTS
  (c) DLINKS
  (d) WRQST
  (e) LINKP
9. Subroutine Used.
  (a) CCTRFDSB
  (b) VSSLOCK
  (c) VSSFREE
10. Input/Output. None
11. Fowcharts. Flowchart in FIGS. C79-80
0. Title. SAT.CERS Processor
1. Entry Points. CCCERSPR
2. Purpose. The SAT.CERS Processor processes Scheduler requests to restart suspended Command Sequences.
3. Overview. The SAT.CERS Processor gets the CE address from the input SAT and moves that CE from VLH.CWL to VLH.CSL.
4. Input.
  (a) VPR0 - return address
  (b) CTPTCEPT (in CC TPT) - CE address
  (c) In CE (at CE.SATP) - SAT $AC_{16}$ address
5. Output. CE is put on VLH.CSL
6. Tables Referenced.
  (a) Command Controller TPT
  (b) CE
  (c) SAT $AC_{16}$
7. Lists Accessed.
  (a) VLH.CWL
8. PROC's Used.
  (a) DLINK 9. Subroutines Used.
   (a) CCACTCOM
10. Input/Ouput. None
11. Flowcharts. Flowchart is in FIG. C81
0. Title. CCRELARG Command Controller Subroutine
1. Purpose. The CCRELARG Subroutine releases all CM blocks singly linked from a given word in CM.
2. Overview. The CCRELARG Subroutine, given the address of a CM word, will release all CM blocks in a singly linked list linked to that word.
3. Input
   (a) VPR0 - return address
   (b) VPR2 - address of CM word
4. Output. None
5. Error Conditions. None
6. Tables Referenced. Command Controller TPT
7. Flowcharts. Flowchart is in FIG. C82
0. Title. CCSC7500 Command Controller Subroutine
1. Purpose. The CCSC7500 Subroutine makes a waiting CP Step a candidate for execution.
2. Overview. The CCSC7500 Subroutine determines if the SE has been cancelled.
   If the SE has been cancelled and if all service calls for this Step are complete, the SE will be moved from VLH.SWL to VLH.SBT and the CCSC8000 Command Controller Subroutine is called to request Step Terminator. If all service calls are not complete, no processing is done.
   If the SE has not been cancelled, the SE is linked on VLH.CPX1 or VLH.CPX2, depending on the priority of the SE.
3. Input.
   (a) VPR0 - return address
   (b) VPR2 - SE address
4. Output. The Se may be put on one of the following lists:
   (a) VLH.SBT
   (b) VLH.CPX1
   (c) VLH.CPX2
5. Error Conditions. None
6. Tables Referenced.
   (a) Command Controller TPT
   (b) SE
7. Flowcharts. Flowchart is in FIGS. C83-84
0. Title. CCSC8000 Command Controller Subroutine
1. Purpose. The CCSC8000 Subroutine requests Service Call Command Sequences.
2. Overview. The CCSC8000 Subroutine builds the Service Call Argument Table and calls the CSSCSREB Command Controller Subroutine to build a CSRE for the Service Call Command Sequence. The "Service Call" flag CSR.SCCE, is set in the CSRE, the CSRE is linked on VLH.CSRL, and the "Active Service Call Count" is incremented in the SE.
3. Input.
   (a) VPR0 - return address
   (b) VPR1 - Command Sequence ID
   (c) In CC TPT
       (1) At CTPTTMP7 - SE address
       (2) At CTPTTMP8 - SCCB virtual address
       (3) At CTPTTMPA - SPT address
4. Output. A CSRE is put on VLH.CSRL.
5. Error Conditions. None
6. Tables Referenced.
   (a) Command Controller TPT
   (b) CSRE
   (c) Service Call Argument Table
   (d) SE
7. Flowcharts. Flowchart is in FIG. C85
0. Title. CSSCSREB Command Controller Subroutine
1. Purpose. The CSSCSREB Subroutine builds a Command Sequence Request Entry (CSRE).
2. Overview. The CSSCSREB Subroutine uses the information input in the VP Registers to build a CSRE and returns the address of the CSRE in VPR1.
3. Inputs.
   (a) VPR0 - return address
   (b) VPR1 - value to go in CSRE at CSR.CSID
   (c) VPR2 - address to go in CSRE at CSR.HLSP
   (d) VPR3 - address to go in CSRE at CSR.ARGP
4. Output. VPR1 - CSRE address
5. Error Conditions. None
6. Tables Referenced.
   (a) Command Controller TPT
   (b) CSRE
7. Flowcharts. Flowchart is in FIG. C86
0. Title. CSSJCCHK Command Controller Subroutine
1. Purpose. The CSSJCCHK Subroutine checks for job cancellation when a JE is being moved from one linked list to another.
2. Overview. The CSSJCCHK Subroutine checks the "cancel" flag, JOB.CANC, in the JE and returns to call +2 if the "cancel" flag is not set. If the "cancel" flag is set, the JE will be put on VLH.JTBT, and control will be returned to the caller at call +1.
3. Input. (a) VPR0 - return address
   (b) VPR1 - JE address (JE not linked on a list.)
4. Output.
   (a) If job cancelled, JE put on VLH.JTBT.
5. Error Conditions. None
6. Tables Referenced.
   (a) Command Controller TPT
   (b) JE
7. Flowchart is in FIG. C87
0. Title. CSSLNHLS Command Controller Subroutine
1. Purpose. The CSSLNHLS Subroutine links a CE or SE into the "Hanging Loop Structure" of a job.
2. Overview. The CSSLNHLS Subroutine links the input CE or SE into the "Hanging Loop Structure" of a job as the successor cell to the cell whose address is given in the input CE or SE at CE.JECEP.
3. Input.
   (a) VPR0 - return address
   (b) VPR2 - CE or SE address
   (c) In CE or SE (at CE.JECEP) - CE, SE, OR JE address
4. Output. None
5. Error Conditions. None
6. Tables Referenced.
   (a) CE
   (b) SE
   (c) JE
7. Flowcharts. Flowchart is in FIG. C88
0. Title. CSSDLHLS Command Controller Subroutine
1. Purpose. The CSSDLHLS Subroutine delinks a CE or SE from the "Hanging Loop Structure" of a job.
2. Overview. The CSSDLHLS Subroutine delinks the input CE or SE from the "Hanging Loop Structure" of a job and returns the address of the CE or SE in VPR2.
3. Input.
   (a) VPR0 - return address
   (b) VPR2 - CE or SE address
4. Output. VPR2 - CE or SE address 5. Error Conditions. None
6. Tables Referenced.
   (a) CE
   (b) SE
   (c) JE
7. Flowcharts. Flowchart is in FIGS. C88-89

0. Title. CSSEMCHC Command Controller Subroutine
1. Purpose. The CSSEMCHC Subroutine determines if a CE is part of an exercise job and, if so, checks the Command ID against the current maximum value, checks to insure that the Command Directory entry exists, and checks for exercise job cancellation.
2. Overview. The CSSEMCHC Subroutine finds the JE associated with the input CE and checks the "exercise" flag in that JE.
   If the "exercise" flag is not set control is returned to the caller at call +2.
   If the "exercise" flag is set, the "cancel" flag is checked, and if it is set, a branch is taken to the CCEMCCAN Command Controller Subroutine.
   If the "cancel" flag is not set, the Command ID and Command Directory entry are checked. If the Command ID is invalid or the Command Directory entry does not exist, the CCEMGMSR Command Controller Subroutine is called to notify MCD of the error.
3. Input.
   (a) VPR0 - return address (normal return address is content of VPR0 +1)
   (b) VPR1 - CE address
4. Output. None
5. Error Conditions. None
6. Tables Referenced.
   (a) Command Controller TPT
   (b) JE
   (c) CE
   (d) Command Directory
7. Flowcharts. Flowchart is in FIGS. C90-91

0. Title. CSSEMCHS Command Controller Subroutine
1. Purpose. The CSSEMCHS Subroutine determines if a CSRE is part of an exercise job and, if so, checks the Command Sequence ID against the current maximum value, checks to insure that the Command Sequence Table Directory Entry exists, and checks for exercise cancellation.
2. Overview. If the "exercise" flag is set in the JE associated with the input CE is set, the "cancel" flag in the JE is checked, and if it is set, the CSRE is released and control is returned to the caller at call +1.
   If the "cancel" flag is not set, the Command Sequence ID and Command Sequence Table Directory Entry are checked. If the Command Sequence ID is invalid or the Command Sequence Table Directory Entry does not exist, the CCEMGMSR Command Controller Subroutine is called to notify MCD of the error.
3. Input.
   (a) VPR0 - return address (normal return address is content of VPR0 +1)
   (b) VPR1 - CSRE address
4. Output. None
5. Error Conditions. None
6. Tables Referenced.
   (a) Command Controller TPT
   (b) CSRE
   (c) JE
   (d) Command Sequence Table Directory
7. Flowcharts. Flowchart is in FIGS. C92-C 94

0. Title. CSSEMCHT Command Controller Subroutine
1. Purpose. The CSSEMCHT Subroutine determines if the Command Sequence being terminated is part of an exercise job and if so determines if MCD should be notified.
2. Overview. If the "exercise" flag is set in the JE associated with the input CE is set, the "cancel" flag in the JE is checked, and if it is set, the CCEMCCAN Command Controller Subroutine is called.
   If the "cancel" flag is not set, this subroutine determines from the MCD flags in the JPT if MCD should be notified of command sequence termination, and if so, the CCEMGMSR Command Controller Subroutine is called.
3. Input.
   (a) VPR0 - return address (normal return address is content of VPR0 +1)
   (b) VPR1 - CE address
4. Output. None
5. Error Conditions. None
6. Tables Referenced.
   (a) Command Controller TPT
   (b) CE
   (c) JE
   (d) JPT
7. Flowcharts. Flowchart is in FIGS. C95-96

0. Title. CCEMGMSR Command Controller Subroutine
1. Purpose. The CCEMGMSR Subroutine requests the CS.SCRE Command Sequence.
2. Overview. The CCEMGMSR Subroutine builds an argument table for the CS.SCRE Command Sequence and calls the CSSCSREB Command Controller Subroutine to build a CSRE. The CSRE is linked on VLH.CSRL.
3. Input.
   (a) CTPTTMP3 (in CC TPT) - return address
   (b) CTPTTMP5 (in CC TPT) - value for word 0 of argument table
   (c) CTPTTMP2 (in CC TPT) - value for word 1 of argument table
4. Output. A CSRE is linked on VLH.CSRL.
5. Error Conditions. None
6. Tables Referenced.
   (a) Command Controller TPT
   (b) CSRE
7. Flowcharts. Flowchart is in FIG. C97

0. Title. CCEMCCAN Command Controller Subroutine
1. Purpose. The CCEMCCAN Subroutine determines if exercise job cancellation is complete.
2. Overview. The CCEMCCAN Subroutine sets the "cancelled" flag in the input CE and searches the "Hanging Loop Structure" of the job associated with the input CE for a non-cancelled CE. If all CE's are cancelled, the "Jobs Being Cancelled Count," VSA.CJCN, is decremented, and the CCEMGMSA Command Controller Subroutine is called.
3. Input.
   (a) CTPTTMP3 (in CC TPT) - return address
   (b) CTPTTMP2 (in CC TPT) - CE address
4. Output. None
5. Error Conditions. None
6. Tables Referenced.
   (a) Command Controller TPT
   (b) CE
   (c) JE
7. Flowcharts. Flowchart is in FIG. C98

0. Title. CCTRFDSB Command Controller Subroutine
1. Purpose. The CCTRFDSB returns in VPR1 the address of the Terminal Device Status Block for the Facility ID given in R3L.
2. Overview. This subroutine accesses the Facility Loop-Up Table addressed in VSA.FLTB and using the Facility ID given in R3L finds the Terminal Device Status Block address for the given Facility ID. (Since the format of the Facility Loop-Up Table is changing for the August release causing this subroutine to change, Flowcharts will not be supplied until August.)
3. Input.
   (a) VPR0 - return address
   (b) R3L - Facility ID
4. Output. VPR1 - TDSB address
5. Error Conditions. If a TDSB is not found, a branch is taken to a SYSERR with an error code of $30CC_{16}$.
6. Tables Referenced.
   (a) VSA.FLTB 0. Title. BGNCSRTN Command Controller Subroutine
1. Purpose. The BGNCSRTN Subroutine makes a Command Sequence Request.
2. Overview. The BGNCSRTN Subroutine calls the CSSCSREB Command Controller Subroutine to build the CSRE. The BGNCSRTN Subroutine then links the CSRE on VLH.CSRL.
3. Input.
   (a) VPR0 - return address
   (B) VPR1 - Command Sequence ID
   (c) VPR3 - Argument table address
   (d) CTPTTMP1 (in CC TPT) - address to be put in CSRE at CSR.HLSP.
4. Output. (a) CSRE on VLH.CSRL.
5. Error Conditions. None
6. Tables Referenced.
   (a) Command Controller TPT
   (b) CSRE
7. Flowcharts. Flowchart is in FIG. C99

0. Title. LNHLS Procedure
1. Purpose. The LNHLS Procedure provides the linkage to the CSSLNHLS Command Controller Subroutine.
2. Overview. The LNHLS Procedure branches to the CSSLNHLS Command Controller Subroutine saving the return address in VPR0.
3. Procedure Definition Parameters. None
4. Input.
   (a) VPR2 - address of CE to be linked into an "HLS"
   (b) At CE.JECEP in CE - Address of cell to which this CE should be linked as the "HLS" successor cell.
5. Output. To CSSLNHLS Subroutine:
   (a) VPR0 - return address
   (b) VPR2 - same as on input
   (c) At CE.JECEP in CE - same as on input
6. Error Conditions. None
7. Subroutines Called. CSSLNHLS Command Controller Subroutine
8. Tables Referenced. None
9. Flowcharts. Flowchart in FIG. C100

0. Title. DLHLS Procedure
1. Purpose. The DLHLS Procedure provides the linkage to the CSSDLHLS Command Controller Subroutine.
2. Overview. The DLHLS Procedure branches to the CSSDLHLS Subroutine, saving the return address in VPR0.
3. Procedure Definition Parameters. None
4. Input. VPR2 - address of CE to be removed from the "Hanging Loop Structure"
5. Output. To CSSDLHLS Subroutine:
   (a) VPR0 - return address
   (b) VPR2 - same as on input
6. Error Conditions. None
7. Subroutines Called. CSSDLHLS Command Controller Subroutine
8. Tables Referenced. None
9. Flowcharts. Flowchart in FIG. C101

0. Title. CHEMC, CHEMS, CHEMT Procedure
1. Purpose. This procedure is responsible for interfacing with the CSSEMCHC, CSSEMCHS, and CSSEMCHT Command Controller Subroutines.
2. Overview. This procedure determines if the "Exercise Mode" CR bit is on and if so prepares input for the CSSEMCHC, CSSEMCHS, or CSSEMCHT Command Controller Subroutine and then branches to the appropriate subroutine, saving the return address in VPR0.
3. Procedure Definition Parameters.
   CQ(1) is the name of the Command Controller Subroutine to which a branch is to be made. If CHEMC is invoked, CQ(1) is CSSEMCHC. If CHEMS is invoked, CQ(1) is CSSEMCHS. If CHEMT is invoked, CQ(1) is CSSEMCHT.
4. Input.
   (a) CP(1) - The displacement in the Command Controller TPT of the word containing the address of the CE or CSRE being processed.
   (b) CP(2) - The address to which control is to be returned if normal processing is to be stopped.
5. Output. To subroutine
   (a) VPR1 - address of CE or CSRE being processed
   (b) VPR0 - return address (if processing to be continued, return address is content of VPR0 +1.)
6. Error Conditions. None
7. Subroutines Called.
   One of the following Command Controller Subroutines will be called:
   (a) CSSEMCHC
   (b) CSSEMCHS
   (c) CSSEMCHT
8. Tables Referenced. Command Controller TPT.
9. Flowcharts. Flowchart in FIG. C102

0. Title. BGNCS Procedure
1. Purpose. The BGNCS Procedure calls the BGNCSRTN Command Controller Subroutine.
2. Overview. The BGNCS Procedure loads the Command Sequence ID into VPR1 if necessary, clears VPR3, and branches to the BGNCSRTN Command Controller Subroutine saving the return address in VPR0.
3. Procedure Definition Parameters. None
4. Input.
   (a) VPR1 or VP(1) - Command Sequence ID
   (b) CTPTTMP1 (in CC TPT) - address to be put in CSRE at CSR.HLSP.
5. Output. To BGNCSRTN Subroutine:
   (a) VPR1 - Command Sequence ID
   (b) VPR3 - zero (0)
   (c) CTPTTMP1 (in CC TPT) - same as at input
6. Error Conditions. None
7. Subroutines Called. BGNCSRTN 8. Tables Referenced. None
9. Flowcharts. Flowchart is in FIG. C 103
1. Title. Device Attention Service Request List Processor
2. Entry Points. CCDASRPR
3. Purpose. The Device Attention Service Request List (DASR) Processor is responsible for requesting the command sequences to Service Device Attention bits.
4. Overview. The DASR Processor builds a CSRE for each Device Attention (DA) bit which is set in the DA bit image input to the processor. Those CSRE's are put on the Command Sequence Request List.
5. Inputs.
   (a) VPR0 - return address
   (b) CSRE on VLH.DASR
   (c) In CSRE at displacement of CSR.ARGP - DA Big Image Table
6. Outputs.
   (a) CSRE's on VLH.CSRL
7. Tables Referenced.
   (a) DA Bit Image Table
   (b) CSRE
   (c) Command Controller TPT
8. Lists Accessed.
   (a) VLH.DASR
   (b) VLH.CSRL
9. PROC's Used.
   (a) CGET
   (b) DLINKS
   (c) LINKP
   (d) RCELL
   (e) WRQST
10. Subroutines Used.
    (a) CSSCSREB
11. Input/Output. None
12. Flow. Flowcharts in FIGS. C104-C108
1. Title. Command Sequence Request List Processor.
2. Entry Points. CCCS1000
3. Purpose. The Command Sequence Request List (CSRL) Processor is responsible for requesting scheduling of the first command in a requested command sequence.
4. Overview. The CSRL Processor builds a CE and CPT for the first command in a requested command sequence. If the requested command sequence is non-reentrant and currently in execution, the new CE is put on the Command Sequence Waiting List. If the requested command sequence is reentrant or is non-reentrant but not currently in execution, the CSRL Processor enters the Command Attention List Processor at entry point CCCA4000 to prepare the CE and CPT for scheduling.
5. Inputs.
   (a) VPR0 - return address
   (b) CTPTCSRP (in CC TPT) - CSRE address
6. Output.
   (a) CTPTRTRN - return address CTPTCEPT - CE address CTPTCPTP - CPT address CTPTCSTP - CST pointer CTPTCDIX - CDIR index
   (b) CE on VLH.CSWL
7. Tables Referenced.
   (a) CST Directory
   (b) Command Sequence Tables
   (c) Command Controller's TPT
   (d) CSRE
   (e) CE
   (f) CPT 8. Lists Accessed.
   (a) VLH.CSWL
9. PROC's Used.
   (a) CGET
   (b) CHEMS
   (c) LINKP
   (d) LNHLS
   (e) RCELL
   (f) RPR10
   (g) WPR10
   (h) WRQST
10. Subroutines Used.
    (a) CCRELARG
11. Input/Output. None
12. Flow. Flowcharts in FIGS. C109-112
1. Title. Command Attention List Processor.
2. Entry Points.
   (a) CCCALPRO
   (b) CCCA2000
   (c) CCCA4000
3. Purpose. The Command Attention List Processor (CALP) is responsive for processing a command which has requested a Command Controller service.
4. Overview. The CALP determines the type of Command Controller service requested by the calling command. If SYSCOM is the service requested, a CSRE is built for the SYSCOM command sequence and is put on the Command Sequence Request List (CSRL). The input CE is put on the Command Waiting List or normal CALP processing is continued on the input CE and CPT.
   If "Job Activity File" is the service requested, a CSRE is built for the Jog Log command sequence and is put on the CSRL. The input CE is put on the Command Waiting List.
   If "Command Sequence Request" is the service requested, a CSRE supplied by the calling command is put on the CSRL, and normal processing is continued on the input CE and CPT.
   If "Process Request" is the service requested, the input CE is put on the Process Request Scheduling List and processing is complete.
   If none of the above services is requested, normal processing occurs beginning at entry point CCCA2000. The completion code for advancing the CST pointer to the next entry in the CST is obtained from the input CPT. If the completion code indicates that the calling command is to be restarted, the input CE and CPT are prepared for scheduling. The CALP then determines if a Scheduler service was requested via a Scheduler Argument Table; and if so, the input CE is put on the Scheduler Service List. If a scheduler service was not requested, the input CE is put on one of the following lists:
   (a) Command Scheduling List
   (b) Sub-Program Scheduling List
   If the completion code does not indicate restart, CALP determines if the command making the service request is reentrant. If the command making the service request is non-reentrant, the first CE for that command found on the Non-Reentrant Command Request List is put on the Command Scheduling List. If none is found, the command is set "not-active" in the command directory.
   The CST pointer is then updated according to the completion code to point to the CST entry for the next command in the sequence. The input CPT is then prepared for CST option processing. If the next CST entry is a CST "Termination" entry, the first CE for the terminating sequence found on the Command Sequence Waiting List is initialized for scheduling and then put on one of the following lists:
(a) Command Scheduling List
(b) Sub-Program Scheduling List
(c) Non-Reentrant Command Request List The data structure for the terminating sequence is then released, and the command sequence termination is processed in one or more or none of the following ways:
(a) The IJSL Analyser may be started.
(b) A command waiting for this requested process may be scheduled.
(c) The next process in a Process Request Table will be initiated if those processes are to be initiated sequentially.
(d) The JE may be moved to a different linked list.
(e) A CSRE will be built as specified in the CST "Termination" entry and put on the Command Sequence Request List.

If the next entry in the CST is a normal entry, the ıta structure for that next command is created in one of the following ways as indicated in the CST entry:
(a) The same CPT used by the previous command may be used by the next command.
(b) A new CPT may be built and the old CPT may or may not be saved.
(c) A CPT that was previously saved may be used by the next command and the CPT used by the previous command may or may not be saved.

The CALP then prepares the CE and CPT for scheduling at entry point CCCA4000 and determines if a Scheduler service was requested via a Scheduler Argument Table; and if so, the input CE is put on the Scheduler Service List. If a Scheduler service was not requested, the input CE is put on one of the following lists:
(a) Command Scheduling List
(b) Sub-Program Scheduling List
(c) Non-Reentrant Command Request List
(d) Command Waiting List Inputs.
(a) At entry point CCALPRO VPR0 - return address CTPTCEPT (in CC TPT) - CE address
(b) At entry point CCA2000 CTPTRTRN - return address CTPTCEPT - CE address CTPTCPTP - CPT address
(c) At entry point CCCA4000 CTPTRTRN - return address CTPTCEPT - CE address CTPTCPTP - CPT address CTPTCSTP - CST pointer CTPTCDIX - CDIR index Outputs.
(a) The input CE may be put on one of the following lists:
 (1) VLH.CSL
 (2) VLH.SPSL
 (3) VLH.CWL
 (4) VLH.NRRQ
 (5) VLH.PRSL
 (6) VLH.SSL
(b) A CSRE may be put on VLH.CSRL Tables Preferenced.
(a) Command Directory
(b) Command Sequence Tables
(c) CST Directory
(d) Command Controller TPT
(e) CE
(f) CPT 8. Lists Accessed.
(a) VLH.CSL
(b) VLH.CSRL
(c) VLH.CSWL
(d) VLH.CWL
(e) VLH.DL
(f) VLH.NRRQ
(g) VLH.PRSL
(h) VLH.SSL 9. PROC's Used.
(a) CGET
(b) CHEMC
(c) DLINK
(d) LINKP
(e) NEXTS
(f) RCELL
(g) RFNCD
(h) WFNCD
(i) WRQST
(j) WSBST 10. Subroutines Used.
(a) CCACTC0M
(b) CCRELARG
(c) CCTERMCS
(d) CSSCSREB 11. Input/Output. None 1. Title. DIO Processing Complete List Processor.
2. Entry Points. CCSA1000
3. Purpose. The DIO Processing Complete List (DPCL) Processor is responsible for processing a command for which DIO processing has been completed.
4. Overview. The DPCL Processor removes the CE associated with the input Task DIO Queue Entry (TDQE) from the Command I/O Waiting List.

If a disc append is being requested, the CE is put on the Command Waiting List, a CSRE is built for the Disc Allocation command sequence, and that CSRE is put on the Command Sequence Request List. Processing is then complete.

If a disc append is not requested, the DPCL Processor joins the Command Attention List Processor at entry point CCCA2000.

5. Inputs.
(a) VPR0 - return address
(b) CTPTCEPT (in CC TPT) - TDQE address

6. Outputs.
(a) If disc append requested
 (1) CE on VLH.CWL
 (2) CSRE on VLH.CSRL
(b) To CALP entry point CCCA2000
 (1) CTPTRTRN - return address
 (2) CTPTCEPT - CE address
 (3) CTPTCPTP - CPT address 7. Tables Referenced.
(a) TDQE
(b) CE
(c) Command Controller TPT 8. Lists Accessed.
(a) VLH.CIWL
(b) VLH.CWL
(c) VLH.CSRL 9. PROC's Used.
(a) CGET
(b) DLINK
(c) LINKP (d) WRQST
10. Subroutines Used.
  (a) CSSCSREB
11. Input/Output. None
12. Flow. Flowcharts in FIGS. C113-114
1. Title. TIO Processing Complete List Processor
2. Entry Points. CCSA3000
3. Purpose. The TIO Processing Complete List (TPCL) Processor is responsible for processing a command for which T10 processing has been completed.
4. Overview. The CPCL Processor removes the CE associated with the input TCIB from the Command I/O Waiting List and joins the Command Attention List Processor at entry point CCCA2000.
5. Input.
  (a) VPR0 - return address
  (b) CTPTCEPT (in CC TPT) - TCIB address
6. Output.
  (a) CTPTRTRN - return address
  (b) CTPTCEPT - CE address
  (c) CTPTCPTP - CPT address
7. Tables Referenced.
  (a) TCIB
  (b) CE
  (c) Command Controller TPT
8. Lists Accessed.
  (a) VLH.CIWL
9. PROC's Used.
  (a) DLINK
  (b) WRQST
10. Subroutines Used. None
11. Input/Output. None
12. Flow. Flowchart in FIG. C115
1. Title. Driver Manager Processing Complete List Processor
2. Entry Points. CCSA2000
3. Purpose. The Driver Manager Processing Complete List (DMPC) Processor is responsible for processing a command for which Driver Manager processing has been completed.
4. Overview. The DMPC Processor removes the CE associated with the input Driver Manager Request Entry (DMRE) from the Command I/O Waiting List and joins the Command Attention List Processor at entry point CCCA2000.
5. Inputs.
  (a) VPR0 - return address
  (b) CTPTCEPT (in CC TPT) - DMRE address
6. Outputs. (a) CTPTRTRN - return address
  (b) CTPTCEPT - CE address
  (c) CTPTCPTP - CPT address
7. Tables Referenced.
  (a) DMRE
  (b) CE
  (c) Command Controller TPT
8. Lists Accessed.
  (a) VLH.CIWL
9. PROC's Used.
  (a) DLINK
  (b) WRQST
10. Subroutines Used. None
11. Input/Output. None
12. Flow. Flowcharts in FIG. C116
1. Title. Breakpoint Processing Complete List Processor
2. Entry Points. CCBPCLPR
3. Purpose. The Breakpoint Processing Complete List (BPCL) Processor is responsible for rescheduling exercise commands which have been breakpointed.
4. Overview. The BPCL Processor moves CE's for breakpointed commands from the Breakpoint Waiting List to the Breakpoint Restart List to allow those commands to be restarted.
5. Inputs.
  (a) VPR0 - return address
  (b) CTPTCEPT (in CC TPT) - bpcl entry address
6. Outputs.
  (a) CE's on VLH.BKRL
7. Tables Referenced.
  (a) Command Controller TPT
  (b) BPCL entry
8. Lists Accessed.
  (a) VLH.BKWL
  (b) VLH.BKRL
9. PROC's Used.
  (a) CHEMC
  (b) DLINK
  (c) LINKP
  (d) RCELL
  (e) WRQST
10. Subroutine Used. None
11. Input/Output. None
12. Flow. Flowcharts in FIGS. C117-118
1. Title. Page Allocation SAT Processor.
2. Entry Point. CCPAGEAL
3. Purpose. The Page Allocation SAT (PGAL) Processor is responsible for obtaining CM pages for commands requesting pages of CM.
4. Overview. The PGAL Processor passes the parameters from the input SAT to the Page Allocation System Subroutine to assign the requested CM pages. Upon return from the subroutine, the PGAL Processor puts the address of the first page assigned into the SAT if the page or pages were assigned. If the page or pages were not assigned, the SAT is placed in the Memory Waiting List and the input CE is placed on the Command Waiting List.
5. Inputs.
  (a) VPR0 - return address
  (b) CTPTCEPT (in CC TPT) - CE address
  (c) In CE at displacement of CE.SATP - SAT #54 address
6. Outputs.
  (a) If memory assigned
    (1) Address of first page assigned is put in first data word of SAT.
  (b) If memory not assigned
    (1) SAT is put on VLH.MWL
    (2) Input CE is put on VLH.CWL
7. Tables Referenced.
  (a) SAT $54_{16}$
  (b) Command Controller TPT
  (c) CE
8. Lists Accessed.
  (a) VLH.MWL
  (b) VLH.CWL
9. PROC's Used.
  (a) CALL
  (b) NEXTS
  (c) LINKP
10. Subroutines Used.
  (a) VSSGETP
11. Input/Output. None 12. Flow. Flowchart in FIGS. C119–120
1. Title. Page Deallocation SAT Processor
2. Entry Point. CCPAGEDL
3. Purpose. The Page Deallocation SAT (PGDL) Processor is responsible for returing to the system CM pages used by commands.
4. Overview. The PGDL Processor passes the parameters in the input SAT to the Page Deallocation System Subroutine which will return the CM pages to the system. Upon return from Page Deallocator, the PGDL Processor releases the input SAT and call the Memory Waiting List processing subroutine.
5. Inputs.
   (a) VPR0 - return address
   (b) CTPTCEPT (in CC TPT) - CE address
   (c) In CE at displacement of CE.SATP - address of SAT #55
6. Outputs. None
7. Tables Referenced.
   (a) SAT $55_{16}$
   (b) Command Controller TPT
   (c) CE
8. Lists Accessed. None
9. PROC's Used.
   (a) CALL
   (b) RCELL
10. Subroutines Used.
    (a) VSSRELP
    (b) CCPD1000
11. Input/Output. None
12. Flow. Flowchart in FIG. C121
1. Title. Process Request Scheduling List Processor.
2. Entry Points.
   (a) CCPRTPRO
   (b) CCPR5000
3. Purpose. The Process Request Scheduling List (PRSL) Processor is responsible for initiating the processes requested in a Process Request Table (PRT).
4. Overview. The PRSL Processor gets the PRT addressed by the input CPT and determines which flags are set in the PRT. If the "sequential processing" is specified, a CSRE is built for the first process requested, the CSRE is placed on the CSRL, and the input CE is placed on the Command Waiting List.

If "sequential processing" is not specified, a CSRE is built for each process requested and put on the CSRL.

If "wait" is specified the input CE is put on the Command Waiting List.

If "wait" is not specified the input CE is placed on a Command Attention List, and the PRT is released.

If "pass restart information" is specified, the "Calling PRT Pointer" and "PRT Entry Number" fields are moved from the input CE to the CSRE built for the single process requested, those fields are cleared in the input CE, and the input CE is put on a Command Attention List.
5. Inputs.
   (a) at entry point CCPRTPRO
      (1) VPR0 - return address
      (2) CTPTCEPT (in CC TPT) - CE address
   (b) at entry point CCRP5000
      (1) VPR0 - return address
      (2) CTPTTMPT (in CC TPT) - PRT address
6. Outputs.
   (a) CSRE's on VLH.CSRL
   (b) CE on VLH.CWL
   (c) CE on VLH.CAL1 or VLH.CAL2
7. Tables Referenced.
   (a) CE
   (b) CPT
   (c) PRT
   (d) Command Controller TPT
8. Lists Accessed.
   (a) VLH. CSRL
   (b) VLH.CWL
   (c) VLH.CAL1
   (d) VLH.CAL2
9. PROC's Used.
   (a) LINKP
   (b) RPRIO
   (c) WRQST
10. Subroutines Used:
    (a) CSSCSREB
11. Input/Output. None
12. Flow. Flowchart in FIGS. C122–C126
1. Title. Sub-Program Scheduling List Processor.
2. Entry Points.
   (a) CCSPPRO
   (b) CCKWRTRN
3. Purpose. The Sub-Program Scheduling List (SPSL) Processor is responsible for executing Command Controller Sub-Programs.
4. Overview. The SPSL prepares for execution of a Command Controller Sub-Program and gives control to a Sub-Program. The Sub-Program returns control to the SPSL Processor at CCKWRTRN via a CCALL.
5. Inputs.
   (a) VPR0 - return address
   (b) CTPTCEPT (in CC TPT) - Sub-Program's CE address
6. Output. To Sub-Program:
   (a) Base Register - Sub-Program's CPT pointer.
   (b) CTPTCEPT - Sub-Program's CE address
   (c) CTPTCPTP - Sub-Program's CPT address
7. Tables Referenced.
   (a) CE
   (b) Command Directory
   (c) Command Sequence Tables
   (d) Command Controller TPT
8. Lists Accessed. None
9. PROC's Used. WRQST
10. Subroutines Used. None
11. Input/Output. None
12. Flow. Flowchart in FIG. C127
0. Title. CCACTCOM Command Controller Subroutine
1. Purpose. This subroutine is responsible for disposing of a CE which has been prepared for command scheduling.
2. Overview. This subroutine sends the input CE to the CCTERMCS Command Controller Subroutine if the Command Sequence is being terminated. The input CE is put on VLH.CWL if the service request made to Command Controller was a "V.EXWT" service request. The input CE is put on VLH.SPSL if the command is a Command Controller Sub-Program. If the command is non-reentrant and currently in execution, the input CE is put on VLH.NRRQ. If none of the above conditions exists, the input CE is put on VLH.CSL.
3. Input.
   (a) RO - return address
   (b) CTPTCEPT (in CC TPT) - CE address 4. Output. The input CE is sent to CCTERMCS subroutine or put on one of the following lists:
   (a) VLH.CSL
   (b) VLH.SPSL
   (c) VLH.NPRQ
   (d) VLH.CWL
5. Error Conditions. None
6. Tables Referenced.
   (a) Command Directory
   (b) CE
   (c) CPT
   (d) Command Controller TPT
7. Flow. Flowchart is in FIGS. C128–129

0. Title. CCTERMCS Command Controller Subroutine
1. Purpose. This subroutine processes a request for termination of a command sequence.
2. Overview. This subroutine releases the data structure for a terminating command sequence, processes a calling PRT if one exists, and requests the IJSL Analyser process if so indicated by the CE of the terminating command sequence. This subroutine also moves the JE for the job under which the command sequence executed to a new list or requests another command sequence if so indicated by the termination entry in the Command Sequence Table for this command sequence.
3. Input.
   (a) RO - return address
   (b) CTPTCEPT (in CC TPT) - address of CE for terminating command sequence
   (c) CTPTCPTP (in CC TPT) - address of CPT associated with the input CE.
4. Output. If there is any output, it will be one or more of the following:
   (a) A TE on VLH.DL
   (b) A CSRE for the IJSL Analyser process on VLH.CSRL.
   (c) A CSRE for a specified command sequence on VLH.CSRL.
5. Error Conditions. None
6. Tables Referenced.
   (a) Command Sequence Tables
   (b) CE
   (c) CPT
   (d) PRT
   (e) Command Controller TPT 0. Title. CCPD1000 Command Controller Subroutine.
1. Purpose. This subroutine processes SAT's on VLH.MWL when Central Memory pages have been released.
2. Overview. This subroutine passes the parameters from a SAT on VLH.MWL to the Page Allocation System Subroutine. If the Page Allocation Subroutine assigns the requested page or pages, the address of the first page assigned is put into the SAT, the SAT is removed from VLH.MWL, the associated CE is removed from VLH.CWL, and the CCACTCOM routine is called to process the CE. If the Page Allocation subroutine does not assign the requested page or pages, the SAT remains on VLH.MWL. This process is performed for each SAT on VLH.MWL.
3. Input.
   (a) RO - return address
   (b) CTPTCEPT (in CC TPT) - address of CE associated with CM Page release request.
   (c) SAT $54_{16}$ on VLH.MWL
4. Output.
   (a) At return to caller
     (1) CTPTCEPT (in CC TPT) - same as at input
   (b) To CCACTCOM CC Subroutine
     (1) RO - return address
     (2) CTPTCEPT (in CC TPT) - address of CE associated with SAT from VLH.MWL.
5. Error Conditions. None
6. Tables Referenced.
   (a) SAT $54_{16}$
   (b) Command Controller TPT
7. Flow. Flowchart in FIGS. C130–131

0. Title. RSBST, RDQST, RFNCD, RPRIO, Procedure
1. Purpose. This procedure obtains the "status", "queue", "function code", or "priority" byte from a TE, CE, SE, or JE.
2. Overview. This procedure returns in byte 3 of VPR1 the value from the appropriate byte of a TE, CE, SE, or JE whose address is given in a word in the Command Controller TPT. If RSBST is invoked, the "status" byte is obtained. If RDQST is invoked, the "queue" byte is obtained. If RFNCD is invoked, the "function code" byte is obtained. If RPRIO is invoked, the "priority" byte is obtained.
3. Procedure Definition Parameters.
   (a) for RSBST - CQ(1) is R1B0, indicating that byte 0 relative to VPR1 contains the "status" value.
   (b) for RDQST - CQ(1) is R1B1, indicating that byte 1 relative to VPR1 contains the "queue" value.
   (c) for RFNCD - CQ(1) is R1B2, indicating that byte 2 relative to VPR1 contains the "function code" value.
   (d) for RPRIO - CQ(1) is R1B3, indicating that byte 3 relative to VPR1 contains the "priority" value.
4. Input. CP(1) - the displacement within the Command Controller TPT of the word containing the address of the TE, CE, SE, or JE from which the value is to be obtained.
5. Output. R1B3 - the value from the appropriate byte of the given TE, CE, SE, or JE.
6. Error Conditions. None
7. Subroutines Called. None
8. Tables Referenced.
   (a) Command Controller TPT
   (b) TE
   (c) CE
   (d) SE
   (e) JE
9. Flowcharts. Flowcharts are in FIG. C 132

0. Title. WSBST, WRQST, WFNCD, WRPIO, Procedure
1. Purpose. This procedure puts a given value into the "status", "queue", "function code", or "priority" byte of a TE, CE, SE, or JE.
2. Overview. This procedure puts the value from byte 3 of VPR1 into the appropriate byte of a TE, CE, SE, or JE whose address is given in a word in the Command Controller TPT. If WSBST is invoked, the value is put in the "status" byte. If WRQST is invoked, the value is put in the "queue" byte. If WFNCD is invoked, the value is put in the "function code" byte. If WRPIO is invoked, the value is put in the "priority" byte.
3. Procedure Definition Parameters.
   (a) for WSBST - CQ(1) is ROB0, indicating that byte 0 relative to VPR0 is the "status" byte.
   (b) for WRQST - CQ(1) is ROB1, indicating that byte 1 relative to VPR0 is the "queue" byte.

141

(c) for WFNCD - CQ(1) is ROB2, indicating that byte 2 relative to VPR0 is the "function code" byte.

(d) for WPRIO - CQ(1) is ROB3, indicating that byte 3 relative to VPR0 is the "priority" byte.

4. Input. CP (1) - the displacement within the Command Controller TPT of the word containing the address of the TE, CE, SE, or JE into which the value is to be placed.

5. Output. None

6. Error Conditions. None

7. Subroutines Called. None

8. Tables Referenced.
   (a) Command Controller TPT
   (b) TE
   (c) CE
   (d) SE
   (e) JE 9. Flowcharts. Flowcharts are in FIG. C133

1. Title. Device Attention Service Request List Processor

2. Purpose. This processor processes requests from Master Controller to Service Device Attention bits.

3. Inputs.
   (a) Command Sequence Request Entry on VLH.DASR
   (b) Argument Table containing DA image 4. Outputs. A Command Sequence Request Entry is put on VLH.CSRL for each DA bit set in the DA image.

1. Title. Command Attention List Processor

2. Purpose. This processor processes requests from commands for Command Controller services.

3. Inputs. A CE for the command making the request.

4. Outputs. The input CE is output to one of the following processors:
   (a) Command Exit Processor
   (b) V.SCOM Processor
   (c) V.JAF Processor
   (d) V.PRT Processor 1. Title. Command Exit Processing 2. Purpose. This processing is performed to advance a command sequence to the next entry in that sequence.

3. Inputs.
   (a) The CE for the command being exited.
   (b) A completion code in the CE to indicate the next entry in the sequence.

4. Outputs. Output may be one or more of the following:
   (a) A CE on VLH.CSL
   (b) A CE on VLH.SPSL
   (c) A CE on VLH.CWL
   (d) A CE on VLH.PRSL
   (e) A CE on VLH.SSL
   (f) A CSRE on VLH.CSRL 1. Title. V.PRT Processor 2. Purpose. This processor processes Process Requests.

3. Inputs. A PRT

4. Outputs. One or more CSRE's are put on VLH.CSRL.

1. Title. SAT.PGAL Processor

2. Purpose. This processor processes scheduler calls requesting assignment of Central Memory pages.

3. Inputs. SAT $54_{16}$

4. Outputs.
   (a) The address of the first page assigned is put into the SAT.

142

(b) If the page or pages requested are not assigned, the SAT is put on VLH.MWL.

1. Title. SAT.PGDL Processor

2. Purpose. This processor processes scheduler calls requesting deallocation of Central Memory pages.

3. Inputs. SAT $55_{16}$

4. Outputs. None

1. Title. V.SCOM Processor

2. Purpose. This processor processes requests to initiate the SYSCOM process.

3. Input.
   (a) The CE of the command making the request
   (b) a function code $07_{16}$ in the CPT associated with input CE
   (c) An argument table for SYSCOM process.

4. Output.
   (a) A CSRE for SYSCOM containing the address of the SYSCOM argument table is output on VLH.CSRL.
   (b) A function code of $04_{16}$ is put into the CPT associated with the input CE to indicate the requested service has been performed.
   (c) The input CE is put on the VLH.CWL or sent to the Command Exit Processor.

1. Title. V.JAF Processor

2. Purpose. This processor processes requests to initiate the Job Activity File Process.

3. Input.
   (a) The CE of the command making the request.
   (b) A function code of $03_{16}$ in the CPT associated with the input CE.
   (c) An argument table for the Job Activity File Process.

4. Output.
   (a) A CSRE for the Job Activity File process containing a pointer to the argument for the Job Activity File process is output on VLH.CSRL.
   (b) A function code of $04_{16}$ is put into the CPT associated with the input CE to indicate that the requested service has been performed.
   (c) The input CE is output on VLH.CWL.

1. Title. Command I/O Waiting List.

2. Purpose. At present the Command Controller does not poll this list, but in the future Command Controller may poll this list to detect potentially infinite I/O waits.

3. Inputs. The CE of the command for which I/O is being done.

4. Outputs. None.

1. Title. DIO Processing Complete List Processor

2. Purpose. This processor processes service requests for commands which DIO processing has been completed.

3. Inputs.
   (a) Task DIO Queue Entry
   (b) A CE or VLH.CIWL

4. Outputs. The input CE is sent to the Command Exit Processor.

1. Title. TIO Processing Complete List Processor

2. Purpose. This processor processes service requests for commands for which TIO processing has been completed.

3. Inputs.
   (a) A TCIB
   (b) A CE on VLH.CIWL

4. The input CE is output to the Command Exit Processor.

1. Title. Driver Manager Processing Complete List Processor
2. Purpose. This processor processes service requests for commands for which Driver Manager processing has been completed.
3. Inputs.
   (a) A Driver Manager Request Entry
   (b) A CE on VLH.CIWL
4. Outputs. The input CE is sent to the Command Exit Processor.

1. Title. Breakpoint Waiting List
2. Purpose. At present this list is not polled by Command Controller, but in the future Command Controller may poll this list to detect potentially infinite breakpoint waits.
3. Inputs. The CE of the command which was breakpointed.
4. Outputs. None 1. Title. Breakpoint Processing Complete List Processor
2. Purpose. This processor processes requests to restart breakpointed commands.
3. Inputs.
   (a) A Breakpoint Processing Complete List Entry
   (b) A CE or CE's on VLH.BKWL
4. Outputs. A CE or CE's on VLH.BKRL 1. Title. CCACTCOM Command Controller Subroutine
2. Purpose. This subroutine disposes of a CE which has been prepared for command scheduling.
3. Inputs. The CE which has been prepared for command scheduling.
4. Outputs. The input CE is put on one of the following lists:
   (a) VLH.CSL
   (b) VLH.SPSL
   (c) VLH.CWL
   (d) VLH.NRRQ 1. Title. CCTERMCS Command Controller Subroutine
2. Purpose. This subroutine processes the termination of a command sequence.
3. Inputs. The CE for the command which requested command sequence termination.
4. Outputs. A CSRE may be put on VLH.CSRL.

1. Title. CCPD1000 Command Controller Subroutine
2. Purpose. This subroutine processes SAT's on VLH.MWL when Central Memory pages have been released.
3. Inputs. SAT $54_{16}$ on VLH.MWL
4. Outputs. The address of the first page assigned to each request is put in the SAT.

RSBST [entry ptr.]

where RSBST
   returns in Byte 3 of VPR1 the value in the "status" byte of the given TE, CE, or JE.
[entry ptr.]
   is the displacement in the Command Controller TPT of the word containing the address of the TE, CE, or JE from which the "status" byte is to be obtained.

| Register Status | CM Base | VPR0 | VPR1 | VPR2 | VPR3 |
|---|---|---|---|---|---|
| Before | X | X | X | X | X |
| After | Same | Same | Status byte | Same | Same |

| Register Status | CM Base | VPR0 | VPR1 | VPR2 | VPR3 |
|---|---|---|---|---|---|
| | | | value | | |

RDQST [entry ptr.]

where RDQST
   returns in Byte 3 of VPR1 the value in the "Queue" byte of the given TE, CE, or JE.
[entry ptr.]
   is the displacement in the Command Controller TPT of the work containing the address of the TE, CE, or JE from which the "Queue" byte is to be obtained.

| Register Status | CM Base | VPR0 | VPR1 | VPR2 | CPR3 |
|---|---|---|---|---|---|
| Before | X | X | X | X | X |
| After | Same | Same | Queue byte value | Same | Same |

RFNCD [entry ptr.]

where RFNCD
   returns in Byte 3 of VPR1 the value in the "Function code" byte of the given TE, CE, or JE.
[entry ptr.]
   is the displacement in the Command Controller TPT of the word containing the address of the TE, CE, or JE from which the "Function code" byte is to be obtained.

| Register Status | CM Base | VPR0 | VPR1 | VPR2 | VPR3 |
|---|---|---|---|---|---|
| Before | X | X | X | X | X |
| After | Same | Same | Function code byte value | Same | Same |

RPRIO [entry ptr.]

where RPRIO
   returns in Byte 3 of VPR1 the value in the "priority" byte of the given TE, CE, or JE.
[entry ptr.]
   is the displacement in the Command Controller TPT of the word containing the address of the TE, CE, or JE from which the "priority" byte is to be obtained.

| Register Status | CM Base | VPR0 | VPR1 | VPR2 | VPR3 |
|---|---|---|---|---|---|
| Before | X | X | X | X | X |
| After | Same | Same | Priority byte value | Same | Same |

WSBST [entry ptr.]

where WSBST
   puts the value given in Byte 3 fo VPR1 into the "status" byte of the given TE, CE, JE.
[entry ptr.]
   is the displacement in the Command Controller TPT of the word containing the address of the TE, CE, or JE into which the "status" byte value is to be placed.

| Register Status | CM Base | VPR0 | VPR1 | VPR2 | VPR3 |
|---|---|---|---|---|---|
| Before | X | X | value | X | X |
| After | Same | ? | Same | ? | Same |

WRQST [entry ptr.]

where WRQST
    puts the value given in Byte of VPR1 into the "Queue" byte of the given TE, CE, or JE.
[entry ptr.]
    is the displacement in the Command Controller TPT of the word containing the address of the TE, CE, or JE into which the "Queue" byte value is to be placed.

| Register Status | CM Base | VPR0 | VPR1 | VPR2 | VPR3 |
|---|---|---|---|---|---|
| Before | X | X | value | X | X |
| After | Same | ? | Same | ? | Same |

WFNCD [entry ptr.]

where WFNCD
    puts the value given in Byte 3 of VPR1 into the "Function code" byte of the given TE, CE, or JE.
[entry ptr.]
    is the displacement in the Command Controller TPT of the word containing the address of the TE, CE, or JE into which the "Function code" byte value is to be placed.

| Register Status | CM Base | VPR0 | VPR1 | VPR2 | VPR3 |
|---|---|---|---|---|---|
| Before | X | X | value | X | X |
| After | Same | ? | Same | ? | Same |

WPRIO [entry ptr.]

where WPRIO
    puts the value given Byte 3 of VPR1 into the "Priority" byte of the given TE, CE, or JE.
[entry ptr.]
    is the displacement in the Command Controller TPT of the word containing the address of the TE, CE, or JE into which the "Priofity" byte value is to be placed.

| Register Status | CM Base | VPR0 | VPR1 | VPR2 | VPR3 |
|---|---|---|---|---|---|
| Before | X | X | value | X | X |
| After | Same | ? | Same | ? | Same |

0. Title. Command Controller Entry Point.
1. Purpose. This is the entry point for Command Controller.
2. Inputs. CM Base Register set to Command Controller TPT.
3. Outputs. CSRE for CS.SYLGI Command Sequence put on VLH.CSRL.
1. Title. Page Management Theshold Crossed Processor 2. Purpose. The Page Management Threshold Crossed (PMTC) Processor is responsible for initiating swapping of CP Steps to disc to make enough pages of CM available to prevent CM deadlock.
3. Inputs. VSA.PMTC
4. Outputs. Not yet defined.
1. Title. ENQ Request Processor
2. Purpose. The ENQ Request Processor is responsible for restarting commands which have been waiting for resources which are now available.
3. Inputs. CE on VLH.ENQR
4. Outputs. CE on VLH.CAL1 or VLH.CAL2, depending on priority.
0. Title. Job Termination Initiation Processor
1. Purpose. The Job Termination Initiation Processor processes requests to initiate job termination.
2. Inputs. JE on VLH.JTBT.
3. Outputs.
    (a) Input JE on VLH.JBT.
    (b) A CSRE for Job Termination Command Sequence (CS.J0BT) is put on VLH.CSRL.
1. Title. Service Call Service Request (SCSR) Processor
2. Purpose. The SCSR Processor is responsible for processing CP Service Call Service Requests.
3. Inputs. A CSRE containing the virtual address of the Service Call Control Block as the argument pointer and the SE pointer as the "Hanging Loop Structure" pointer.
4. Outputs.
    (a) The SE may be moved from VLH.SWL to one of the following lists:
        (1) VLH.SBT, if Step Terminator requested.
        (2) VLH.SSTL, if Step Suspension requested.
        (3) VLH.CPX1 or VLH.CPX2, if CP Step to be restarted.
    (b) If a Command Sequence processes the Service Call, a CSRE for the sequence is built and put on VLH.CSRL.
0. Title. Timer Service Request Processor
1. Purpose. The Timer Service Request Processor processes Timer Queue service requests.
2. Inputs. DPRT (Delayed PRT) on VLH.TSRL
3. Outputs. CSRE on VLH.CSRL.
0. Title. SAT.TDEL Processor
1. Purpose. The SAT.TDEL Processor processes Scheduler requests for job structure deallocation.
2. Inputs. SATOA
3. Outputs. A CSRE for CS.JDEAL Command Sequence is put on VLH.CSRL.
1. Title. SAT.JCAN Processor
2. Overview. The SAT.JCAN Processor processes Scheduler calls to initiate job cancellation.
3. Inputs. SAT.OC$_{16}$
4. Outputs.
    (a) Cancel bit is set in JE of job being cancelled.
    (b) Cancel bit is set in each CE and SE in the job's "Hanging Loop Structure."
    (c) The "Cancel CP Step" CR bit, CRM.CPSC, is set.
    (d) If job being cancelled is a Data Concentrator or T0S job, the JE is linked on VLH.JTBT.
    (e) If job is Standard Interactive Job, restart all Command Sequences waiting for responses, data buffers, or communcation buffers.
    (f) Link JE on VLH.JICL.
0. Title. SAT.J0BT Processor 1. Purpose. The SAT.JOBT Processor processes Scheduler requests to initiate job termination as a result of job cancellation.
2. Inputs. SATOD
3. Outputs. The JE whose address is given in the input SAT is linked on VLH.JTBT.
0. Title. SAT.EOJ Processor
1. Purpose. The SAT.EOJ Processor processes Scheduler requests to initiate job termination as a result of an EOJ IJSL statement.
2. Inputs. SATOE
3. Outputs. The JE whose address is given in the input SAT is linked on VLH.JTBT.
1. Title. SAT.TCBR Processor
2. Purpose. The SAT.TCBR Processor processes Scheduler requests for assignment of Data Concentrator Communication Buffers.
3. Inputs. SAT $50_{16}$
4. Outputs.
   (a) If a buffer is available, the buffer size is placed in the calling SAT.
   (b) If no buffer is available,
      (1) the calling CE is put on VLH.CWL
      (2) a TWLE is built and linked on the Terminal Device Status Block.
1. Title. SAT.TDBR Processor
2. Purpose. The SAT.TDBR Processor processes Scheduler requests for assignment of Data Concentrator Data Buffers.
3. Inputs. SAT $51_{16}$
4. Outputs.
   (a) If a buffer is available, the buffer size is put in the calling SAT.
   (b) If no buffer is available,
      (1) the calling CE is put on VLH.CWL
      (2) a TWLE is built and linked on the Terminal Device Status Block
1. Title. SAT.TCBA Processor
2. Purpose. The SAT.TCBA Processor is responsible for processing Scheduler requests to assign Data Concentrator Communication Buffers to waiting commands.
3. Inputs. SAT $52_{16}$
4. Outputs. If a buffer is available and a command is waiting for a buffer, the CE of the waiting command is put on VLH.CSL, and the buffer size is put in the SAT associated with that CE.
1. Title. SAT.TDBA Processor
2. Purpose. The SAT.TDBA Processor is responsible for processing Scheduler requests to assign Data Concentrator Data Buffers to waiting commands.
3. Inputs. SAT $53_{16}$
4. Outputs. If a buffer is available and a command is waiting, the CE of the waiting command is put on VLH.CSL, and the buffer size is put in the SAT associated with that CE.
0. Title. SAT.CPST Processor
1. Purpose. The SAT.CPST Processor processes Scheduler requests for CP Step Initiation.
2. Inputs. SAT 59
3. Outputs. SE linked on VLH.CPX1 or VLH.CPX2
1. Title. SAT.STTM Processor
2. Overview. The SAT.STTM Processor is responsible for processing Step Termination Scheduler calls.
3. Inputs. SAT $5A_{16}$
4. Outputs. A CSRE may be built for CS.IJSLA Command Sequence and put on VLH.CSRL.

1. Title. SAT.LIM Processor
1. Purpose. The SAT.LIM Processor processes Scheduler requests for changes to disc requirements.
2. Inputs. SAT5B
3. Outputs.
   (a) If disc available, VSA.DKUS is updated.
   (b) If disc not available,
      (1) calling SAT put on VLH.SAO1
      (2) calling CE put on VLH.CWL
1. Title. SAT.CSS Processor
2. Overview. The SAT.CSS Processor is responsible for processing Scheduler calls to suspend Command Sequences.
3. Inputs. SAT $A1_{16}$
4. Outputs. CE is linked on VLH.CWL.
1. Title. SAT.CSR Processor
2. Overview. The SAT.CSR Processor processes Scheduler requests for restart of Terminal Command Sequences which are waiting for a response or a data or communication buffer.
3. SAT $A2_{16}$
4. Output.
   (a) If there is a response, the address of the response is placed in the SAT associated with the waiting CE.
   (b) The waiting CE is moved from VLH.CWL to VLH.CSL or VLH.SPSL.
1. Title. SAT.THPO Processor
2. Purpose. The SAT.THPO Processor processes Scheduler requests to output terminal messages on the TCC High Priority CA Chain.
3. Input. SAT $A3_{16}$
4. Output. The TCIB addressed in the SAT is put on VLH.THPO, and the calling CE is put on VLH.CWL.
1. Title. SAT.TRR Processor
2. Purpose. The SAT.TRR Processor processes Scheduler requests for responses from the terminal environment.
3. Inputs. SAT $A4_{16}$
4. Outputs.
   (a) The calling CE may be put on VLH.CWL.
   (b) A response pointer will be put in the calling SAT.
1. Title. SAT.CERS Processor
2. Overview. The SAT.CERS Processor processes Scheduler requests for Command Sequence restart.
3. Inputs. SAT $AC_{16}$
4. Outputs. The CE to be restarted is linked on VLH.CSL or VLH.SPSL.
1. Title. CCRELARG Command Controller Subroutine
2. Purpose. The CCRELARG Subroutine releases all CM blocks singly linked from a given word in CM.
3. Inputs. VPR0 - return address VPR2 - address of word containing pointer to first block of singly linked list.
4. Outputs. None
1. Title. CCSC7500 Command Controller Subroutine
2. Purpose. The CCSC7500 Subroutine is responsible for moving an SE from VLH.SWL to VLH.CPX1 or VLH.CPX2 to restart the associated CP Step.
3. Inputs. VPR0 - return address VPR2 - SE pointer
4. Outputs. The SE is moved to one of the following lists:
   (a) VLH.CPX1 or VLH.CPX2, depending on priority.
   (b) VLH.SBT, if the CP Step is being cancelled.

1. Title. CCSC8000 Command Controller Subroutine
2. Purpose. The CCSC8000 Subroutine is responsible for building a CSRE for a Service Call Command Sequence or for Step Terminator when a CP Step is cancelled.
3. Inputs. VPR0 - return address VPR1 - Command Sequence ID of the sequence to be requested. CTPTTMP7 (in CC TPT) - SE pointer CTPTTMP8 (in CC TPT) - SCCB virtual address CTPTTMPA (in CC TPT) - SPT pointer
4. Outputs. A CSRE is built and put on VLH.CSRL 1. Title. CSSCSREB Command Controller Subroutine
2. Purpose. The CSSCSREB Subroutine is responsible for building a Command Sequence Request Entry (CSRE).
3. Inputs. VPR0 - return address VPR1 - CSID to be put in CSRE VPR2 - "HLS" pointer for CSRE VPR3 - Argument table pointer to be put in CSRE
4. Outputs. A CSRE is built containing the information input in the VP Registers. The address of the CSRE is output in VPR1.

1. Title. CSSJCCHK Command Controller Subroutine
2. Purpose. The CSSJCCHK Subroutine is responsible for checking the job cancellation when a JE is being moved from one list to another.
3. Inputs. VPR0 - return address VPR1 - JE pointer
4. Outputs. If job is cancelled, JE is put on VLH.JTBT.

1. Title. CSSLNHLS Command Controller Subroutine
2. Purpose. The CSSLNHLS Subroutine links a CE or SE into the "Hanging Loop Structure" of a job.
3. Inputs. VPR0 - return address VPR2 - CE or SE pointer CE.JECEP (in CE or SE) - "Hanging Loop Structure" as successor cell to cell pointed to at CE.JECEP in SE or CE.

1. Title. CSSDLHLS Command Controller Subroutine
2. Purpose. The CSSDLHLS Subroutine delinks a CE or SE from the "Hanging Loop Structure" of a job.
3. Inputs. VPR0 - return address VPR2 - CE or SE pointer
4. Outputs. VPR2 - CE or SE pointer 1. Title. CSSEMCHC Command Controller Subroutine
2. Purpose. The CSSEMCHC Subroutine determines if a CE is part of an exercise job and, if so, checks the Command ID against the current maximum value, checks to insure that the Command Directory entry has not been deleted, and checks for exercise job cancellation.
3. Inputs. VPR0 - return address (normal return is contents +1) VPR1 - CE pointer
4. Outputs. A CSRE for Command Sequence, CS.SCRE, is built and put on VLH.CSRL if the Command ID is invalid, if the Command Directory entry does not exist, or if excerise job cancellation is complete.

1. Title. CSSEMCHS Command Controller Subroutine
2. Purpose. The CSSEMCHS Subroutine determines if a CSRE is part of an exercise job and, if so, checks the Command Sequence ID against the current maximum value, checks to insure that the Command Sequence Table Directory Entry has not been deleted, and checks for exercise job cancellation.
3. Inputs. VPR0 - return address (normal return address is content + 1) VPR1 - CSRE pointer
4. Outputs. A CSRE for Command Sequence CS.SCRE is built and put on VLH.CSRL if the Command Sequence ID is invalid, if the CST Directory entry does not exist, or if exercise job cancellation is complete.

1. Title. CSSEMCHT Command Controller Subroutine
2. Purpose. The CSSEMCHT Subroutine determines if the Command Sequence being terminated is part of an exercise job and if so determines if MCD should be notified.
3. Inputs. VPR0 - return address (normal return address is content of VPR0 +1) VPR1 - CE pointer
4. Outputs. A CSRE for the CS.SCRE Command Sequence is built and put on VLH.CSRL if MCD is to be notified of exercise Command Sequence Termination or if exercise job cancellation is complete.

1. Title CCEMGMSR Command Controller Subroutine
2. Purpose. The CCEMGMSR Subroutine builds a CSRE for the CS.SCRE Command Sequence.
3. Inputs. CTPTTMP3 (in CC TPT) - return address CTPTTMP5 (in CC TPT) - Message Function Code and Job ID CTPTTMP2 (in CC TPT) - CE or JE pointer
4. A CSRE on VLH.CSRL 1. Title. CCEMCCAN Command Controller Subroutine
2. Purpose. The CCEMCCAN Subroutine determines if all CE's in a cancelled job's "Hanging Loop Structure" have been cancelled and if so notifies MCD that the exercise job has been cancelled.
3. Inputs. CTPTTMP2 (in CC TPT) - address of CE being processed CTPTTMP3 (in CC TPT) - return address
4. Outputs. A CSRE for the CS.SCRE MCD Command Sequence is built and put on VLH.CSRL if exercise job cancellation is complete.

1. Title. CCTRFDSB Command Controller Subroutine
2. Purpose. The CCTRFDSB Subroutine returns to the caller in VPR1 the address of the Terminal Device Status Block for the Facility ID input in R3L.
3. Inputs. VPR0 - return address R3L - Facility ID
4. Outputs. VPR1 - TDSB address 1. Title. BGNCSRTN Command Controller Subroutine
2. Purpose. The BGNCSRTN Subroutine builds a CSRE and links that CSRE on VLH.CSRL.
3. Inputs. VPR0 - return address VPR1 - Command Sequence ID VPR3 - Argument Table pointer
4. Outputs. A CSRE is put on VLH.CSRL.

LNHLS where LNHLS
links a CE or SE whose address is given in VPR2 into the "Hanging Loop Structure" of a job as the successor cell to a cell whose address is given in the CE.JECEP word of the CE or Se.

| Register Status | CM Base | VPR0 | VPR1 | VPR2 | VPR3 |
|---|---|---|---|---|---|
| Before | X | X | X | Ce or SE Pointer | X |
| After | Same | ? | ? | ? | ? |

DLHLS where DLHLS
delinks a CE or SE whose address is given in VPR2 from the "Hanging Loop Structure" of a job and returns a pointer to the CE or SE in VPR2

| Register Status | CM Base | VPR0 | VPR1 | VPR2 | VPR3 |
|---|---|---|---|---|---|
| Before | X | X | X | CE or SE Pointer | X |
| After | Same | ? | ? | Same | ? |

CHEMC [CE ptr.],[Stop return]

where CHEMC
    determines if the CE being processed is part of an exercise job and if so checks the exercise options for that job and that CE.
[CE ptr.]
    is displacement in Command Controller TPT of word containing the address of the CE to be checked.
[Stop return]
    is the address to which control is to be returned if processing is to be stopped.

| Register Status | CM Base | VPR0 | VPR1 | VPR2 | VP |
|---|---|---|---|---|---|
| Before | CC TPT | X | X | X | X |
| After | CC TPT | ? | ? | ? | ? |

CHEMS [CSRE ptr.],[Stop return]

where CHEMS
    determines if the CSRE being processed is part of an exercise job and if so checks the exercise options for that job and that CSRE.
[CSRE ptr.]
    is the displacement in the Command Controller TPT of the word containing the address of the CSRE to be checked.
[Stop return]
    is the address to which control is to be returned if processing is to be stopped.

| Register Status | CM Base | VPR0 | VPR1 | VPR2 | VPR3 |
|---|---|---|---|---|---|
| Before | CC TPT | X | X | X | X |
| After | Same | ? | ? | ? | ? |

CHEMT [CE ptr.],[Stop return]

where CHEMT
    determines if the CE for the Command Sequence being terminated is part of an exercise job and if so to check the exercise options for that job and this CE.
[CE ptr.]
    is the displacement in the Command Controller TPT of the word containing the address of the CE being processed.
[Stop return]
    is the address to which control is to be returned if normal processing is to be stopped.

| Register Status | CM Base | VPR0 | VPR1 | VPR2 | VPR3 |
|---|---|---|---|---|---|
| Before | CC TPT | X | X | X | X |
| After | Same | ? | ? | ? | ? |

BCNCS [(CS ID)]

where BGNCS
    is a request to build a CSRE and link that CSRE on VLH.CSRL.
[CS ID]
    is optional and if specified is the system acronym for the Command Sequence ID of the Command Sequence to be requested. The Command Sequence ID may be given in VPRI instead of as a parameter on the procedure call statement.

| Register Status | CM Base | VPR0 | VPR1 | VPR2 | VPR3 |
|---|---|---|---|---|---|
| Before | CC TPT | X | (CS ID) | X | X |
| After | Same | ? | ? | ? | ? |

TASK CONTROLLER CONTROL COMPONENT - GENERAL INTERNALS

Task Controller (TC) controls all task flow through the system and handles all requests for disc I/O. TC starts all tasks requested by Command Controller, builds the TPT, services DIO requests, passes arguments to the next task, and terminates tasks on request. Task Controller is responsible also for scheduling and starting all CP steps with respect to memory requirements and availability. Through memory management and page management subroutines in the user's VP, Task Controller handles all memory allocations and deallocations, and continuously compacts memory. Task Controller is responsible also for all data transfers between terminal and disc/CM.

Task Controller performs its functions through queues and SCALLs, with the arguments of the SCALL specifying the action requested. Tasks make SCALLs to TC while controllers make entries in input queues and lists which TC polls.

Two such queues are the high and low priority Task Request Queues, where Command Controller places entries of those tasks it wishes started. Another such set are the two disc I/O complete queues through which disc I/O controller returns I/O requests. The deallocation queue is used by Command Controller to enter TEs and TPTs that are no longer needed. The Large Memory Request List is an input from Command Controller for pagelevel data requests to start CP steps and the file I/O utility command.

The Command Processing List is an input from Command Controller. CEs are left on that list for the duration of that command's execution. Task Controller puts an entry on the Command Attention Queue whenever Command Controller needs to know of an action required for that command. The high and low priority disc I/O request queues are for Task Controller to send the DIO processor requests which are completed and returned on the DCQ1 and DCQ2.

All terminals go through Task Controller for data transfers. The TIOL list is used for both requests and replies. The TWL and CIWL are lists internal to Task Controller to keep track of tasks waiting to be loaded into memory and commands waiting on a return from DIO.

When a task enters a SCALL all his registers values are stored in the TPT overhead and the task's TE is placed in TC's task completion queue.

TASK CONTROLLER CONTROL COMPONENT - DETAILED INTERNALS

1. Purpose

Task Controller is responsible for the flow of all tasks through the system. It initiates all tasks, and through the SCALL processor it is responsible for the initiation and termination of all tasks within all commands. Task Controller handles all data transfer between tasks of the same command. Task Controller is responsible for the scheduling of all CP steps in respect to their memory requirements and availability. Through the memory management subroutine in the user's VP, Task Controller controls all memory allocations and deallocations and is continuously compacting memory. Through the page allocator subroutine, Task Controller controls all page allocations and deallocations, and keeps information about its user's ID. TC is responsible for the transfer of data between the terminal and disc or CM.

2. Characteristics

A. Task Controller is CM resident.
B. The control portion of Task Controller executes in a dedicated VP.
C. The SCALL process executes in three parts: (1) the SCALL PROC executes in the caller's VP, (2) the mechanism that moves the task entry into the Task Complete Queue executes in the task's VP, and (3) the SCALL processor executes in Task Controller's VP.
D. All memory allocations and deallocations, and queue manipulations subroutines execute in the requesting task's VP.

3. Inputs

A. Task Request Lists (VLH.TRLn $n=1$, maximum number or priorities) Task Request Queues are formed of multiple-priorities queues. All these queues are processed similarly.

Command Controller inserts a Task Entry in the appropriate task request queue when it initiates a command. This entry shall contain the task identification of the first task of that command. Task Controller processes the task request queue entries by loading all non-resident CM tasks and by building, if necessary, all task parameter tables (TPT) needed for the execution of the tasks.

Table T-1 illustrates the format of the task entry in a task request queue, where the 7th word of that entry shall be zero.

TABLE T-1

Task Entry Format

3. A. (continued)

| T | O | | Memory Management | |
|---|---|---|---|---|
| S | O | | Memory Management | |
| M | A | | | Task ID |
| Status | | Queue | Function | Priority |
| 0/1 | | (0) TE Succ./CE Address (1) | | |
| 0/1 | | (0) TE Pred/CE Address (1) | | |
| 0/1 | | (1) TPT Addr/Zero (0) | | |
| B CDEFG | HIJK L | | NUMBER OF PAGES NEEDED | |

The task entry format is shown in Table T-1 where
Bit A: indicates if the task is in an exercise mode
  1 - yes
  0 - no
Bit B: Task trap inhibit
  1 = inhibit
Bit C: CR protect bit
  1 = protected
Bit D: CM protect bit
  1 = protected
Bit E: Restart in same VP bit
  1 = yes
Bit F: Start in any VP bit
  1 = yes
Bit G: VP number of where to start task
Bits H,I,J,K: Master Controller Debug control bits
Bit L: Termination Reason
where
  Hex 0 - means an assembled breakpoint
  1 - means a patched breakpoint
  2 - means an SCALL occurred
  3 - means trapped due to above
  4 - means trapped due to stop request
Bit H: indicates that this job or command has been cancelled.

B. Command Processing List (VLH.CPL) Command Controller moves the CE of the command it initiates into the Command Processing List. The CE is left on this list until the command requires servicing by Command Controller.

C. Large Memory Request List (VLH.LMRL) The Large Memory Request List contains request entries for tasks requiring memory in page units. These entries are requests for starting the CP step loader, or requests for the File I/O utility-command.

Task Controller reserves the number of pages needed before initiating the request.

Table T-1 illustrates the entry in the Large Memory Request List, where the right half of the 7th word contains the number of pages requested and the left half of that word is zero.

D. Breakpoint Request List (VLH.BKRL) MCD notifies Command Controller to restart the breakpoint tasks, CC enter the task entries for these tasks in the Breakpoint Request List Task Controller shall shall process this list and reactivate these tasks. The format of the TEs is shown in Table 1 with the 6th word containing a TPT address.

E. Breakpoint Complete List (VLH.BKCL) Master Controller breakpoints tasks upon command. MC moves the breakpoint TEs into the breakpoint complete list. TC processes this list. The list contains TEs (shown in FIG. 1) with all the bits in the left halfword of the 7th word of the Ts in the proper format according to their status at the time the breakpoint occurred. MC also flags the last entry breakpointed.

F. Deallocation List (VHL.DL) The deallocation queue may contain TPTs entered by CC. Task Controller deallocates both TEs and TPTs and all blocks of memory owned by the TPTs. Table T-2 illustrates the TE and TPT in the deallocation queue.

G. Task Complete Lists (VLH.TCLn, $n=1$, maximum number of priorities)

The Task Complete Queues are formed of multiple priority queues. These queues are processed simularly. After processing the SCALL, Master Controller shall move the Task Entry into the Task Complete Queue.

Task Controller shall process this entry and, from the information contained in the TPTs VPR save area, it shall determine the type of the SCALL. Task Controller processes the SCALL as described previously.

Table T-1 illustrates the TE in the task request queue, where the 5th word contains the address of the TPT shown in Table T-4.

The VPR Save of the TPP has the format illustrated in Table T-3.

Table T-2

| TE and TPT formats in the DLL | | | | |
|---|---|---|---|---|
| 3. F. (continued) | | | | |
| T | O | Memory Management Link | | |
| S | O | Memory Management Link | | |
| E | | | | |
| X | | Task ID | | |
| Status | Queue | Function | Priority | |
| 0/1 | TE Succ/CE Add | | | TE |
| 0/1 | TE Succ/CE Add | | | |
| 1 | TPT Address | | | |
| | MC bits | # of pages /0 | | |
| | | TPT | | |
| T | O | MM Link | | |
| S | O | MM Link | | |
| | | Task ID | | |
| TPT size | Count = 0 | | | |
| | | | | MM Suc Link |
| | | | | MM Free Link |

Memory Management
Ownership threads

Table T-2 TE and TPT formats in the DLL

Table T-3

| TPT.VPR0 | 0 | SCALL Type |
|---|---|---|
| TPT.VPR1 | 0/Argument Displacement | Task ID/C.C. |
| TPT.VPR2 | 0/Memory Needs | |
| TPT.VPR3 | Unchanged from before SCALL | |

Table T-4

| 3. G. (continued) | | | | |
|---|---|---|---|---|
| | | TPT Format | | |
| | T | 0 | Memory Management | |
| | S | 0 | Memory Management | |
| TPT.TE | 1 | | TE Address | |
| TPT.SIZE | | TPT Size | Cell Count | T |
| TPT.VPR0 | | | VPR0 Save Area | P |
| TPT.VPR1 | | | VPR1 Save Area | T |
| TPT.VPR2 | | | VPR2 Save Area | O |
| TPT.VPR3 | | | VPR3 Save Area | V |
| TPT.BASE | 1 | | CM Base | E |
| TPT.PC | 1 | | Program Counter | R |
| TPT.LOAD | 1 | | Load Point | H |
| | | | Not Used | E |
| | | | Not Used | A |
| | | | Not Used | D |
| TPT.OWN | | | Memory Management | |
| | | | Ownership Threads | |
| TPT.SV0 | | | Memory | |
| TPT.SV1 | | | Management | |
| TPT.SV2 | | | Save | |
| TPT.SV3 | | | Area | |
| | 1 | | Pointer to CPT user's area | U |
| | 1 | | Pointer to OPT user's area | S |
| | 1 | | Pointer to current argument | E |
| | 1 | | Pointer to Data Constant | R' |
| | | | | S |
| | | | User's | |
| | | | Scratch | |
| | | | Space | |

Table T-5

| System D10 Queve Entry | | | |
|---|---|---|---|
| 3. H. (continued) | | | |
| T | O | | Memory Management |
| S | O | | Memory Management |
| | | O | COMMAND Queue Status |
| A | | | TE Addr (1)/CE Addr (0) |
| | CM address of where task is to be loaded | | |
| | Absolute disc address of task code on disc | | |
| | Word Count | | Request Status |
| | Parity Error Address | | |
| QUEUE | | | |
| WORK | | | |
| AREA | | | | where Command reflects a priority #2 request -- for a read or write command.

Read = 10

Write = 11 Queue status reflects that it is a system queue entry. Bit 18 is on. Request status shall contain upon completion the status of the completion. Bit 16 is a completion bit. Disc I/O Complete Queue (VLH.DCQn, n=1, maximum number of priorities) The Task Complete Queues are formed of multiple priority queues. They are processed simularly. DIO controller, upon completion of the D10 request, shall enter the DIO request, queue entry into the D10 request queue. Task Controller processes the entry by determining the request was issued by Task Controller, Driver Manager portion f Task Controller, or a task.

If the call was issued by a task, Task Controller moves the D10 request queue entry into the Command DIO complete queue (VLH.DPC). If the call was issued by driver manager, Task Controller branches to the driver manager portion of TC to process the entry. If the call was made by TC it shall process the entry.

Table T-5 illustrates the System DIO Queue entry made by Task Controller.

Any other bit on reflects an error that has been detected. A - Determine the ID of the caller where:

A = 8 indicates that the caller is task controller's loader.

A = #C indicates that the caller is the Driver Manager part of Task Controller.

A = #A indicates that the caller is T10.

A = 0 indicates that the caller is a task.

I.Terminal I/O low priority CA chain (VLH.TIOL) Task Controller is responsible for determining if the transfer of data requested has been terminated. Upon termination of the transfer, TC is responsible for determining if any more processing is required, i.e., a DIO call, and if so, TC initiates the DIO service.

4. Outputs

A. Task Processing Lists (VLH.TPLn, n=1, maximum number of priorities) The VLH.TPLs are formed from a multiple priorities list. Task Controller moves the TE into the list after terminating all the preprocessing needed to initiate a task, such as loading the task's code and, if necessary, updating the task directory and building a TPT.

Table T-1 illustrates the format of the TE entered in the Task Processing Lists. Table T-4 illustrates the format of the TPT.

B. Command Attention List (VLH.CAQ) Task Controller moves the current Command Entry from the VLH.CPL to the VLH.CAQ whenever Command Controller attention is needed. This occurs upon completion of all commands related to SCALL.

C. Deallocation List (VLH.DL) Task Controller uses the deallocation list to input all the TPTs it decides to deallocate.

D. Terminal I/O Low Priority CA Chain (CAC.TIOL) Task Controller makes entries in this queue to request a data transfer to or from the terminal. This occurs after V.TIO SCALL has been issued by a user.

E. DIO Request Queus (VLH.DRLn, n=1, maximum number of priorities) The VLH.DRLs are formed of multiple priorities lists. Task Controller moves DIO request entry into the DIO Request Queue upon completion of the V.DIO SCALL, or when TC initiates a request to load a task code into memory. Table T-5 illustrates the format of an entry initiated by TC.

The CE, TE or TCIB address shall be entered by Task Controller. If the call was requested by Task Controller, TC enters the TE address with the high order byte containing (#80). If the request was made by a task, Task Controller shall enter the CE address with the high order byte containing an (00). If the call was made for a terminal transfer, TC enters the TCIB address with the high order byte containing a (#A0). This byte shall indicate to Task Controller, upon completion of the DIO service, the nature of the call.

F. Command I/O Waiting List (VLH.CIWL) Upon processing the V.DIO SCALL, Task Controller moves the caller's CE from the VLH.CPL to the VLH.CIWL. The CE remains on that list until the completion of the DIO service.

G. Command DIO Complete List (VLH.CDCn, n=1 maximum number or priorities) Task Controller enters the DIO queue entry in the Command DIO Complete List upon completion of processing the DIO complete queue issued by a task. The format of the DIO complete queue is discussed elsewhere in this description.

H. Command Sequence Request List (VLH.CSRL) Task Controller, upon completion of the V.MCDR SCALL, shall move a command sequence request entry in the VLH.CSRL to inform Command Controller that an exercise task or a number of exercise tasks have been breakpointed. This occurs when a breakpoint or halt MCD initiates an MCD command to process the breakpointed tasks. Task Controller also makes entries in the VLH.CSRL when it detects an error in an exercise Task Entry.

Table T-6 shows the format of the Command Sequence Request entry to request MCD.

Table T-7 shows the format of the argument bit passed to MCD for an invalid Task ID.

Table T-8 shows the format of the argument table built and passed to MCD.

Table T-6

| Command Sequence Request Entry to Request MCD | | | |
|---|---|---|---|
| T | 0 | | Memory Management |
| S | 0 | | Memory Management MCD's Command Sequence ID |
| | 0 | | |
| 0 | | 0 | 0 |
| | | 0 | |
| 1 | 0 | | JE Pointer (TC) |

Table T-6-continued

| Command Sequence Request Entry to Request MCD | | |
|---|---|---|
| 1 | 0 | Argument Table Pointer |
| 0 | 0 | 0 |

Table T-7

| Argument List to MCD Command Sequence for Invalid Task ID | | |
|---|---|---|
| T | 0 | Memory Management |
| S | 0 | Memory Management Function Code |
| 1 | | TE Address |

Format for Task Controller's Reply to MCD Indicating at Least One Exercise Task has Stopped.

Table T-8

| Argument Table Format |
|---|
| Memory Management |
| Memory Management MCD FUNCTION CODE |
| TE Pointer |
| TE Pointer |
| . |
| . |
| . |
| FFFFFFFF |

5. Internal Lists

A. Task Directory (TD) The Task Directory contains all the information pertinent to a task's status and the requirement for its execution. The task directory indicates whether or not a task is in memory, and if not, specifies the number of users. It contains the size of the code, the data requirements, the amount of memory needed for execution, and the disc address of where the code resides on the disc.

The task directory also contains information related to trapping, CM or CR protecting, the VP in which the task should be executing, and the VP in which the task should be restarted if the task is trapped.

The task directory illustrated in Table T-9 contains a four word entry for every task in the system. The format of each entry is illustrated in Table T-10.

The task ID value given to all tasks shall be proportioned to the position of that task in the task directory. Where task ID=4, the task ID is the 4th entry in the TD, and task ID=6 is the 6th task entry in the TD, and so on.

Table T-9

| Task Directory Format | |
|---|---|
| VSC.TDIR | |
| | Maximum Task ID |
| | Deallocate TE addr. |
| Task #1 | |
| Task #2 | |
| Task #3 | |
| Task #4 | |

Table T-9-continued

Task Directory Format

ETC.

where VSC.TDIR is a vector table entry referencing the Task Directory, and the first four words of the Task Directory contain the following:
- word 0: Maximum Task ID.
- word 1: Not in use
- word 2: TE address of resident Task Controller task to deallocate task code, and
- word 3: Not in use.

Table T-10

Task Directory Entry Format

```
0 1 2 3 4 5 6 7 8 9 A B C D E F    TPT Size
        Code Size                  Data Displacement
        # of users                 Code's CM Address
              Code's Absolute Disc Address
```

The task directory entries are as shown in Table T-10 and consist of:
- bit 0 Lock out flag. (Locked=1, free=0)
- bit 1 Code in CM flag. (Yes=1, no=0)
- bit 2 Load in progress flag. (yes=1, no=0)
- bit 3 Re-entrant code flag. (yes=1, no=0)
- bit 4 Not in use. (set=0)
- bit 5 Code to be loaded on an octet boundary (yes=1, no=0)
- bit 6 CM resident flag. (yes=1, no=0)
- bit 7 Deallocate code flag. (yes=1, no=0)
- bit 8 Trap inhibit flag. (yes=1, no=0)
- bit 9 CR protect flag. (set=1)
- bit A CM protect flag. (set=1)
- bit B Restart in same VP flag. (yes=1, no=0)
- bit C Start in any VP flag. (yes=1, no=0)
- bits D,E,F VP number if not start in any VP, restart in same VP flags.
- TPT size Amount of CM required by this task. (Excluding overhead).
- Code size Amount of CM required for task code.
- Data Displacement Displacement of data constants from beginning of task code.
- # of users Current number of activations of this task.
- Code's CM Address CM address of this code when in CM.
- Code's Absolute Disc Address Absolute disc address of this task code.

B. Exercise Task Directory (XID) The Exercise Task Directory has a linked structure format where every entry in that list is an 8-word block as shown in Table T-11. The task ID is the ID assigned by the user to this Exercise Task inputed in the system. This task could have the same ID of a pre-existing task; this allows the user to replace temporarily a system task for purpose of checkout.

Entries in the exercise task directory have the format shown in Table T-10.

C. Task Waiting List (VLH.TWL) The Task Waiting List is an internal list to TC containing the TEs of all tasks waiting to have their code loaded from disc to central memory.

Table T-11

Task Directory Entry

| T | 0 | Memory Management |
| S | 0 | Memory Management Task ID |

Table T-11-continued

Task Directory Entry

Section "A" of Table T-11 contains the information detailed for a normal task directory entry as shown in Table T-1C. The Task ID is provided in the first usable halfword as shown.

6. COMPONENTS - FIG. T-1

A. Polling Loop Task Controller polling loop polls all of its input queues/lists and Driver Manager common area. TC determines if there is an entry in the queue or list; if there is an entry it branches to the appropriate processor to process the entry. The queues and list TC polls are as follows:

Task Request Lists (high and low) (VLH.TR1/2)
Task Complete Lists (high and low) (VLH.TCL1/2)
DIO Complete Queues (high and low) (VLH.DCQ1/2)
Deallocation List (VLH.DL)
Large Memory Request List (VLH.LMRL)
TIO Low Priority CA Chain (CAC.TIOL)
Breakpoint Complete List (VLH.BKCL)
Breakpoint Request List (VLH.BKRL)
Paper Command Area Word (VSC.PAPD)
Tape Common Area Words (VSC.TPD1/2/3)

The order followed by TC to poll these lists or queues is determined to obtain the most effective processing of all these inputs. The high priority lists or queues shall be polled twice during one TC loop; the low priority shall be polled once during one TC loop.

At the end of every loop TC branches to DIO preprocessor to allow it to process any DIO entry in the DIO Request Queues. DIO preprocessor branches back to the polling loop upon completion.

B. Task Request Lists Processor (TRLP) - FIGS. T-2/T-5

The Task Request Lists Processor processes all requests to start execution of tasks. It shall update the task directory, load all non-resident tasks and build the TPT for all tasks. The TRLP delinks the top entry from the Task Request List and determines if the entry is for a system task or an exercise task.

If the task entry is for an exercise task, TRLP determines if the Task Directory Entries are on the exercise Task Directory list or the System Task Directory. If the entry is on the exercise Task Directory List, TRLP shall output an error if the task code is not in memory. If the task ID is invalid, i.e., not in the XTD and invalid system task ID, the TRLP informs MCD that an invalid exercise ID was entered, and returns to the polling loop. Otherwise it shall process the entry. If the task entry is for a system task, the TRLP determines if the ID is valid and issues a system error message if it is invalid. Otherwise, it shall process the task entry as follows:

The TRLP determines if the entry is available. If the entry is not available, the TE is linked back into the input queue. If the entry is available TRLP sets the lock bit on. The TRLP determines if the code is in central memory. If the code is not in memory it shall initiate a call to DIO to read the code into central memory. TRLP shall call Memory Management to allocate the central memory needed for the code, then build a system DIO request entry to request the loading of code from disc into CM. TRLP stores into the DIO request queue entry the Task Entry address with the higher order byte containing a (#80). This is done to recognize the nature and identity of the DIO caller upon completion of the service. After inputting the DIO queue entry in the DIO request queue, the TRLP returns to the polling loop.

If the code is in memory, TRLP shall determine if the code has any users. If the number of users is non zero, it determines if the code is reentrant. If the code is not reentrant the TE is linked back into the input queue. If the number of users is zero or the code is reentrant TRLP shall increment the number of users by one in the Task Directory Entry for this task.

The Task Entry is restarted when the status field contains a value of four. TRLP in this case shall determine if the load point in the TPT is the same as the CM address in the task directory. If they are not the same, TRLP replaces the value of the load point in the TPT by its new value and adjusts the program counter accordingly. TRLP also unlocks the Task Directory Entry, accesses the address of the argument displacement in the CPT, and moves the TE into the appropriate priority Task Processing List.

If this task entry is not a restart, TRLP stores the Master Controller flag from the task directory into the last word of the TE and determines if the TPT has been passed.

If the TPT has been passed from a subsequent task, TRLP stores the user's area address in the base word of the TPT, stores the CM address where the code resides from the task directory into the PC and load point words of the TPT, and stores the constants address in the constants pointer of the TPT. TRLP unloads the task directory, accesses the argument table di placement in the CPT, and links the TE into the appropriate priority Task Processing List.

If the TPT has not been passed or exited, TRLP calls memory management to allocate the TPT size needed including the TPT overhead. TRLP stores the address of the user's area of the TPT in the TE, and stores in the TPT the TPT size, the user base, the PC value, the load point, the CPT address, and the JPT address. Also it shall initialize the ownership threads, zero out all VPR save area, calculate and store the constants address, and store the address of the argument table from the current argument displacement in the CPT. Upon completion of building the TPT, TRLP links the TE into the Task Processing List's appropriate priority.

C. Task Complete List Processor (TCLP) - FIGS. T-6/T-14

This processor is responsible for processing the SCALL. It determines the SCALL type and makes entries in the appropriate queues.

The Task Complete List Processor delinks the Task Entry (TE) from the Task Complete Queue and sets the status and queue bytes in the TE to indicate TC is processing the entry. It accesses the SCALL type and outputs an error message if it is an illegal type. It accesses the caller's task ID and determines if the task is an exercise task by checking the exercise bit in the third word of the TE, or if the task ID is greater than the number of tasks in the system. If the task is an exercise task TCLP locks the exercise task directory and then searches the list to find the entry of this task. After finding the entry, TCLP saves the address to the first word of this task exercise task directory entry. If the entry is not found in the XTD, the TD is searched for an entry.

If the task called is not an exercise task TCLP loads the system task directory and uses the task ID as an index to obtain the address of the first word of the task directory entry.

After obtaining the address of the entry, TCLP determines if this entry is locked. If the entry is locked, TCLP frees the Task Directory (Exercise or System) and moves the TE back into the Task Complete Queue (VLH.TCQ). If the entry is not locked. TCLP locks the entry, frees the Task Directory (Exercise or System), decrements by one, the number of users, and checks if the number is negative. If it is negative, TCLP outputs an error message.

If the SCALL type is not a V.DIO CALL, TCLP determines if the task code has to be deallocated. If the deallocation bit is on, TCLP releases the task code. In the task directory entry, it sets the CM bit off to represent that the code is not in memory, and zeroes out the code's CM address.

Upon completion of the deallocation of the task's code, TCLP frees the task directory entry, if it is necessary.

TCLP accesses the SCALL type and, according to the type, shall process it as follows:
1. If SCALL type is V.STAN, TCLP accesses the caller's ID and stores it in the TE address field of the TPT. This is done to recognize this TPT user when an error is recognized during deallocation of this TPT. TCLP accesses the called task ID from the TPT, VPR save area, and stores it in the task ID field of the TE. TCLP accesses the argument pointer displacement. If the displacement value is positive, TCLP stores this value in the current argument field of the CPT; otherwise the value of the current argument is untouched. TCLP also zeroes out the TPT/ARG pointer field of the TE. TCLP moves the top of the TPT block into the deallocation list and moves the TE into the Task Request List (VLH.TRL).
2. If SCALL type is V.PASS, TCLP accesses the called task ID and stores it in the caller's task ID field of the TE. Then it moves the TE into the Task Request List (VLH.TRQ).
3. If the SCALL type is a V.TCTASK, TCLP returns to the polling loop.
4. The TCLP processor shall initiate the processing of all the following SCALLs by moving the completion code from the TPT, VPR save area in the function code field of the CE, and shall move the SCALL type value in the status field of the CE.
    a. If the SCALL type is a V.EXIT or V.EXKWT, TCLP shall access the memory needs from the caller's TPT, VPR save area, compact the whole word in the TPT into a halfword using the following algorithm. The word in the VPR save area has the following format:

| bits | 0 | 7 8 | 15 16 | 20 |
|---|---|---|---|---|
|  | /////// | # pages needed | /////// | # of words needed |
| bytes | 0 | 1 | 2 | 3 | where the maximum number of pages is 255 pages, and the maximum number of words is 4095 words.

The procedure used in computing shall shift right the number of words four bits (dropping the lowest significant digit), then move the 2nd byte (#1) into the 3rd byte (#2). The value generated has the following format:

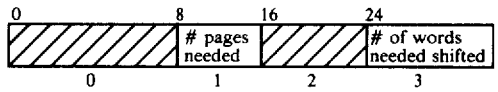

After compacting the memory needs, TCLP stores the compacted halfword in the CPT Memory Need Halfword field. Then the SCALL processor shall link the CE into the EAQ and return to the polling loop.

b. If the SCALL is V.SCRE, V.CPX, V.ERR, or V.SCOM, then TCLP accesses the argument displacement from the TPT, VPR save area, and stores it in Command Controller halfword in the CPT overhead. Then it shall move the CE from the CPL to the CAQ.

c. If the SCALL is V.DIO, the TCLP will process the SCALL by storing the completion code and SCALL type in the CE as described above. It will access the argument table passed, which is the DIO request queue entry, and store in the task ID field (4th word of the entry) the caller's CE address, with the higher order byte containing a (00). Then it will input the entry in the DIO request queue (VLH.DRQ). It will move the CE from the CPL to the Command I/O Waiting List (CIWL).

d. If the SCALL is a V.PGCN, TCLP shall cancel the number of pages reserved for this task and move the TE back into the LMRL.

5. If the SCALL is V.MCDR, TCLP shall access the argument table passed, using the argument displacement in the VPR save area of the TPT. It shall replace all TE addresses in the table with their respective CE addresses, using the fact that the entry succeeding the last TE entry is equal to (−1). Upon completion of the replacement it shall zero out the address of the argument table in the CPT and link the table into the Breakpoint Processing Complete List (VLH.BPCL). TCLP shall move the CE of the caller into the CAQ from the CPL.

6. If the SCALL is V.TIO, TCLP shall access the Terminal Control Information Block from the CPT and interrogate its function code. If the function code specifies that a terminal to disc or a disc to terminal data transfer has been requested, TCLP will call Memory Management to allocate a block of memory needed for that transfer. It will store the address of that block in the TCIB and in the DIO Request Queue Entry. If the function code specifies that a DIO transfer is first, TCLP stores the starting time into the TCIB and links the TCIB to the TIO low priority CA chain (CAC.TIOL). If the function code specifies that a terminal to CM or a CM to terminal transfer is requested, TCLP stores the starting time in the TCIB and links the TCIB to the TIO low priority CA chain.

TCLP moves the CE of the caller into the CIWL from the CPL.

7. If the SCALL is V.DMGR, TCLP breaches to the Driver Manager part of TC. Upon completion it moves the CE from the CAQ to the CIWL.

8. If the SCALL is V.DXTD, TCLP accesses the argument table passed. It interrogates its function code. If the function is for deleting one entry from the Exercise Task Directory (FC=7), TCLP locks the exercise TD and searches the list for the task ID specified in the argument table. If the TD entry for this task is not found, TCLP restarts the calling task by branching into the task request list processor. If the entry has been found, TCLP delinks the entry from the list, deallocates the cell, and then restarts the calling task.

If the function code is for deleting all entries in the XTD, TCLP deletes them all and restarts the calling task by branching to the task request list processor.

9. If the SCALL is V.LXTD, TCLP accesses the argument table passed and links it to the exercise task directory. It restarts the calling task by branching to the task request list processor.

D. DIO Processor (DIOP) - FIGS. T15-T16

The DIO Processor is responsible for processing all entries in the DIO complete queue. The DIO complete queue contains DIO queue entries. The DIOP delinks the top entry from the queue. It accesses the task ID field of the DIO request queue entry. By interrogating the higher order byte of that field DIOP determines if the call was issued by Task Controller, a task, CMGR, or TIO.

If the call was made by a task, the high order byte is set to (00). DICP shall move the DIO request entry to the Command DIO Complete List (VLH.CDC).

If the call was made by Task Controller the DIOP determines if the call was made by the task loader part of Task Controller, DMGR, or TIO parts of Task Controller. If the byte is equal to (#CO), the call was made by driver manager and the DIOP branches to driver manager. If the byte is equal to (#80), the call was made by the task loader. The DICP shall input the Task Directory by setting the "CM" bit on to indicate that the task's code has been loaded in Central Memory. Then the DIOP branches to the Task Request List Processor to initiate the task into execution. If the byte is equal to (#AO), the call was made by TIO.

E. Memory Deallocation List Processor (MDLP)

The Deallocation List Processor is responsible for deallocating all blocks in the Deallocation List (VIH.DLL). The deallocation shall contain both TE with TPTs or TPTs only. DLP shall determine if the block is a TE or a TPT from the size field in the Memory Management overhead of the block.

If the block is a TE, the DLP shall access the task ID from the TE and store it in the TE address field of the TPT pointed to from the TE. The DLP shall deallocate the TE and process the TPT as described below.

The MDLP shall deallocate the TPT and all blocks of memory owned by this TPT. It shall also check if the cell count in the TPT is zero. If the cell count is not zero, DLP shall output an error message. Otherwise it shall deallocate the TPT and, using the Memory Management ownership list header in the TPT, it shall deallocate cell blocks if any are on that list.

F. Large Memory Request List Processor (LMRLP) FIGS. T17-T18

The Large Memory Request List contains request entries for tasks requiring memory in page units. Command Controller schedules these entries, and Task Controller starts these requests upon availability of the pages. The LMRL Processor shall reserve the pages needed from Page Management.

The LMRLP loads the LMR list and accesses the address of the first entry in that list. From the 7th word of that entry, the LMRLP shall access the number of pages required for the execution of this task. It calls Page Management to reserve the number of pages needed. Page Management reserves the pages needed and returns through the norma return. If the number of pages needed exceeds the number of pages available, Page Management shall return to LMRLP through the error return label. VPR2 contains the number of pages available.

If the number of pages requested has not been reserved, the LMRLP searches a predetermined number of entries in the LMRL to determine if there is a request needing a number of pages less than or equal to the number of pages available. If no entry is found the LMRLP unlocks the LMRL and returns to the polling loop. If an entry is found this processor calls Page Management to reserve these pages. If the reservation has not been fulfilled the LMRLP branches to the Task Request List processor to start the preprocessing needed to start the execution of this task.

G. Terminal I/O Low Priority CA Chain Processor (TIOP) - FIGS. T19-T20

The TIO processor has the responsibility to determine if the terminal has completed the CA on the chain and if the terminal has time out. TIOP accesses the CA status bit to determine if the CA is completed. If it is not completed and time out has not occurred, TIOP returns to TC polling loop. If a time out has occurred, TIOP informs CC of the problem and returns to TC polling loop. If the CA is completed, TIOP determines if a DIO has to be performed. If the DIO is needed, TIOP accesses the DIO queue entry, links it to the DIO Request Queue, and returns to TC polling loop. If a DIO is not needed, TIOP releases the memory used in the transfer for a disc to terminal or terminal to disc transfer, moves the CE from the CIWL to the CAQ, and then returns to TC polling loop.

H. Breakpoint Complete List Processor (BKCLP) - FIG. T-21

This processor has the function of processing the Breakpoint Complete List. Master Controller enters into the BKCL the Task Entries (TE) of all tasks it has breakpointed. Task Controller determines if Master Controller has entered the last breakpointed TE. If the last entry has been entered, TC processes the entries. If the last entry has not been entered, TC returns to its polling loop.

Task Controller processes this list by delinking all the entries related to one breakpoint command. It builds an argument table containing the address of all TEs breakpointed in the order it has taken them off the list. A value of (0.1) is entered in the word succeeding the last address. Task Controller builds a CSRQ entry containing the address of the argument table it has built and enters the CSRQ entry into the CSRQ to inform MCD that a breakpoint has been processed.

I. Breakpoint Request List Processor (BKRLP) - FIG. T22

Upon completion of this process, MCD returns the TE it needs to restart to Command Controller. Command Controller enters the TEs of these tasks in the BRK list. This processor processes this list.

Task Controller delinks the top entry from the list, and by interrogating MC flags in the last word of the TE, it determines if the breakpointed task has made a SCALL. If the SCALL has occurred, TC moves the TE into the TCL. If the SCALL has not occurred, TC moves the TE into the TPL to allow it ot complete its execution. Task then accesses the list to determine if another related TE has to be processed as above.

7. INTERFACES

A. Command Controller - FIG. T23 Interface between Task Controller and Command Controller could be broken into four categories: Task Level, Command Level, DIO Level, and Breakpoint Level Interfaces.
 1. The Task Level Interface is through three lists: the Task Request List, the Large Memory Request List, and the Deallocation List. These lists contain task entries. The TRL is used by Command Controller to request the starting of a task. The LMRL is used by Command Controller to request the starting of a task using large amounts of pages. The DL is used by CC to request TC to deallocate this task TE and TPT and all blocks of memory owned by this TPT.
 2. The Command Level Inteeface is through three lists: the Command Processing List, the Command Attention Queue, the Breakpoint Waiting List and the Command I/O Waiting List. Command Controller links the CE of the command it initiated in the CPL. Task Controller moves the CE from the CPL to the CAQ when it requests CC attention.

Task Controller moves the Ce from the CPL to the CIWL when this command has been suspended during a service it requires. TC moves the CE from the CPL to the BKWL when these commands have been breakpointed.
 3. DIO level interface is through the Command DIO Complete List. Task Controller moves the DIO request entry into the DIO Complete List upon completion of the request issued by this command's task.
 4. Breakpoint level interface is through the Breakpoint Request List and the Breakpoint Processing Complete List. Command Controller inputs in Breakpoint Request List all TEs it wishes to restart after the breakpoint reason has been processed. Task Controller inputs in the Breakpoint Processing Complete List a list of all the CEs that have been halted because of a breakpoint.

B. Disc I/O The interface with DIO is through the DIO request queues and the DIO complete queues. Task Controller inputs in the DIO request queues all DIO request queue entries it requests DIO to service. DIO inputs in the DIO complete queues all DIO request queue entries it has completed.

C. Master Controller The interface with Master Controller is task's TPT to the called task.

```
                <Task id> is: 1. the absolute task id of the task
                                 being called which is contained in
                                 parenthesis, or
                              2. a displacement of the TPT word
                                 containing the task id of the task
                                 being called;
             3. SCALL V.EXIT, <cc>,    , [, <argument table>[,
                <memory needs>]]
                where:
                V.EXIT is the normal exit for the current command.
                     <cc> is the 1. absolute completion code which
                                     is
                                     contained in parenthesis, or
                                  2. the displacement of the TPT
                                     word
                                     containing the completion code.
                <argument table> is: 1. the displacement of the CPT
                                        word
                                        containing the address of the
                                        argument table to be passed to
```

-continued

```
                           the next command and its first
                           task, or
                        2. the symbol V.ARG which
                           indicates
                           that the current argument table
                           is to be passed.
    <memory needs>  is:  the displacement of the TPT
                           word
                           containing the amount of CM
                           required
                           by the next command for system
                           or CP
                           step use.
```
4. SCALL V.DIφ, <cc>, <argument list>
   where
   V.DIφ is a call to Disk I/O.
   ```
              <cc> is the 1. absolute completion code which
                              is
                              contained in parentheses, or
                           2. the displacement of the TPT
                              word
                              containing the completion code.
   <argument table> is: the displacement of the CPT
                           word containing the address
                           of the argument table to be
                           passed to DIφ
   ```
5. SCALL V.TIφ, <cc>, <argument table>
   where:
   V.TIφ is a call to Terminal I/O.
   ```
              <cc> is the 1. absolute completion code which
                              is
                              contained in parentheses, or
                           2. the displacement of the TPT
                              word
                              containing the completion code.
   <argument table> is: the displacement of the CPT
                           word containing the address of
                           the argument table to be paased
                           to TIφ
   ```
6. SCALL V.DMGR, <cc>, <argument table>
   where
   V.DMGR is a call to Driver Manager.
   ```
              <cc> is the 1. absolute completion code which
                              is
                              contained in parentheses, or
                           2. the displacement of the TPT
                              word
                              containing the completion code.
   <argument table> is: the displacement of the CPT
                           word containing the address of
                           the argument table to be passed
                           to Driver Manager
   ```
7. SCALL V.SCφM, <cc>, <argument table>
   where
   V.SCφM is a call to SYSCφM.
   ```
              <cc> is the 1. absolute completion code which
                              is
                              contained in parentheses, or
                           2. the displacement of the TPT
                              word
                              containing the completion code.
   <argument table> is: the displacement of the CPT
                           word
                           containing the address of the ar-
                           gument table to be passed to
                           SYSCφM
   ``` through the Task Processing List, the Task Complete List, and the Breakpoint Complete List. Task Controller inputs in the Task Processing List and TE, and requests MC to allocate a VP. MC inputs the TE in the Task Complete List to inform Task Controller of the completion of the task.

D. Terminal Task Controller interfaces with terminals through the terminal low priority CA chain. Task Controller links the Terminal Communication Information block into the chain and shall delink the entry when the service has been completed.

8. SCALL Description

A. SCALL Statement
1. SCALL <type>, <parml>[, <parm2>], <parm3>]]
   where the types and their associated parameters may
   appear as follows:
   SCALL V.STAN, >Task ID> [, <argument table>]
   where V.STAN is a standard task to task call;
   ```
   <Task id> is: 1. the absolute task id of the task being
                     called which is contained in parenthesis,
                     or
                  2. a displacement of the TPT word con-
                     taining the task id of the task being
                     called,
   <argument table> 1. the displacement of the CPT word
                  is:
                     containing the address of the argu-
                     ment table to be passed to the
                     next task,
                  2. the symbol V.ARG which indicates
                     that the current table is to be
                     passed to the next task.
   ```
2. SCALL V.PASS, <Task id>
   where
   V.PASS is a task to task call which passes the current
8. SCALL V.CPX, <cc>, <argument table>
   where
   V.CPX is a call to Task Controller to make an entry on a
   CP Execution List.
   ```
              <cc> is the 1. absolute completion code which is
                              contained in theparenthesis, or
                           2. the displacement of the TPT word
                              containing the completion code.
   <argument table> is: the displacement of the CPT
                           word containing the address of
                           the argument table to be passed
                           to Task Controller
   ```
9. SCALL V.CSRE, <cc>, <argument table>
   where:
   V.CSRE is a call to Task Controller to make a Command
   Sequence Request Entry.
   ```
              <cc> is the 1. absolute completion code which is
                              contained in parenthesis, or
                           2. the displacement of the TPT word
                              containing the completion code.
   <argument table> is: the displacement of the CPT
                           word containing the address of
                           the argument table to be passed
                           to Task Controller
   ```
10. SCALL V.TCTASK
    where
    V.TCTASK is a call to Task Controller upon completion of
    a Task Controller Task.
11. SCALL V.EXWT <cc> [, <argument table>]
    where
    V.EXWT is an exit to Command Controller with a wait for
    the next command in the Command Sequence Table.
    ```
               <cc> is the 1. absolute completion code which is
                               contained in parenthesis, or
                            2. the displacement of the TPT word
    <argument table> is: 1. the displacement of the CPT
                            word containing the address
                            of the argument table to be
                            passed to the next command
                            and its first task, or
                         2. the symbol V.ARG which indi-
                            cates that the current argu-
                            ment table is to be passed.
    ```
12. SCALL V.PGCN
    where
    V.PGCN is a call to Task Controller to cancel the page
    reservation made for this task.
13. SCALL V.LXTD,, <argument table>
    where
    V.LXTD is a call to Task Controller to link the argument
    table passed to the Exercise Task Directory.
    ```
    <argument table> is: 1. the displacement in the CPT
                         2. Symbol V.ARG.
    ```
14. SCALL V.DXTD,, <argument table>
    where
    V.DXTD is a call to Task Controller to release one or all
    exercise task directions specified in the argument table
    passed.
    ```
    <argument table > is: the displacement in the CPT of
    the argument table.
    ```
8. (cont.)
   B. (cont.)
   2. Subroutine and Processor Description
   The SCALL Process has four distinctive parts:
   The Procedure Assembly and Expansion
   The Subroutine Process
   MC Process
   TC Process
   a. The Procedure Assembly and Exparsion The SCALL pio-
      cedure assembly has the function of checking during
      assembly time for an invalid value of the SCALL and
      an incorrect number of parameters on the Procedure
      Call Line. If an error is detected, the procedure
      shall output an error flag to the user.
      The SCALL procedure expands into 3, 4 or 5 words
      following the listing shown on the next page. The -continued execution of that expansion in the caller's VP has the function of loading into caller's VPRs all the information from the Procedure Call Line. The procedure also sets flags to inform the subroutine if values in the registers are displacement in the TP of the caller.

The Procedure shall branch to the SCALL Subroutine through a Vector Table Entry.

The Subroutine Process The Scall Subroutine uses the flags from the procedure to access the values of the SCALL parameters. It has the function of storing the parameters value into the VPR save area of the caller's TPT according to the format shown.

The subroutine shall store the caller's base value into the CM base word of the caller's TPT. It also calculates and stores the PC value in the PC word of the caller's TPT.

The subroutine shall branch to Master Controller's Task wrap-up through a Vector Table Entry.

Master Controller Process The Master Controller process is described in Master Controller write-up.

Task Controller Process The Task Controller process is described in the Task Complete List Processor.

A. Page Reservation Output consists of an indication of whether the reservation was honored or not.

B. Page Allocation Output consists of the requested pages, if available.

5. Interfaces — Page Management is entered by pointers in the System Vector Table. Communications with Command Controller is for approval to move the "system-user" boundary on page assignment. Communications with Task controller are to request deallocation of non-resident, non-active task code when system usage is approaching the current limit.

6. Components — Page Management consists of the following basic components:
   A. Page Reserver Handles Reserve/Cancel Requests
   B. Page Allocator Allocates previously reserved pages or available pages.
   C. Page Deallocator Accepts returned pages.
   D. Page Assignment Control Table The data base of Page Management.

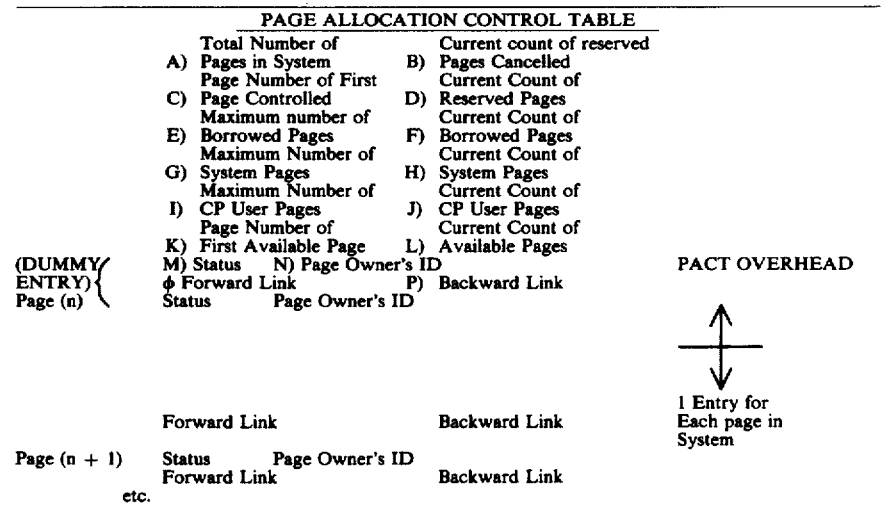

FIGS. T24–33
PAGE MANAGEMENT - DETAILED INTERNALS

Purpose — Page Management is a functional part of Task Controller with responsibilities of managing Central Memory on the page level. Page Management serves Memory Management and CP step requirements as well as system page needs.

Characteristics — Page Management consists of CM resident system subroutines. Page Management routines are re-entrant with the exception of the usage of the Page Assignment Control Table, PACT.

Inputs — Inputs to Page Management occur on three levels:

A. Page Reservation Inputs consists of page requirements.

B. Page Allocation Inputs consist of the page requirements and the caller's/user's ID.

C. Page Deallocation Inputs consist of the returned pages. Input parameters formatting is accomplished using system procedures.

Outputs — Outputs of Page Management occur at two levels:

7. PACT Overhead Descriptions

A. Total Number of Pages in System

B. Current Count of Reserved Pages Cancelled — The number of Previously Reserved Pages (for CP User or for System Task Buffers) that have been cancelled by Page Management and allocated for system use.

C. Page Number of First Page Controlled — The first page above the dedicated CM allowed to system tables and resident routines.

D. Current Count of Reserved Pages — Total number of pages that are currently reserved.

E. Maximum Number of Borrowed Pages — Total number of User Pages allowed to be borrowed by Memory Management at any one time.

F. Current Count of Borrowed Pages — Total number of pages that are currently borrowed.

G. Maximum Number of System Pages — Total number of pages that Memory Management is allowed to be allocation for system use.

H. Current Count of System — Total number of pages currently allocated for system use.

I. Maximum Number of CP User Pages — Total number of pages allowed the CP Users' steps at any one time.

J. Current Count of CP User Pages — Total number of pages currently allocated to the CP Users' steps.

K. Page Number of First Available Page — The page number of the next available page in the system.

L. Current Count of Available Pages — Total number of pages available to be either reserved or allocated.

M. Status — Gives the status of each page.

| STATUS | INTERPRETATION |
|---|---|
| #00 | Page is available |
| #80 | Page is allocated to Memory Management as system page |
| #01 | Page is allocated to Memory Management as a borrowed page |
| #02 | Page is allocated to a system task as a buffer |
| #03 | Page is allocated to a CP User's step |
| #FF | Page was allocated as a dedicated system page at SYSGEN time |

N. Page Owner's ID
1. SE address for a CP User's page.
2. TE address for a system task's page.
3. Zero for Memory Management and available pages.

O. Forward Link — Page Number of the succeeding page in this chain. The last page of a chain will have a zero here.

P. Backward Link — Page number of the previous page in this chain. The first page of a chain wil have a zero here.

8. Calling Procedure Formats The calling procedure for Page Management are as follows:
(Error Return is CALL+1, Normal Return is CALL+2):

```
A. Memory Management - System pages
   1. Get Page
              Input: VPR1 - one
                     VPR2 - Zero
              (LABEL) (OPERATOR) (OPERAND)
              Call: [GET] GETPAGE V.SMEM
              Output: VPR1 - Address of page given.
   2. Release Page
              Input: VPR1 - (MSB = 0) - Page number of page to be
                                        released.
                     VPR2 - One
              (LABEL) (OPERATOR) (OPERAND)
              Call: [RELSE] RELPAGE V.SMEM
              Output: None
B. Memory Management - Borrowed pages
   1. Get Page
              Input: VPR1 - One
                     VPR2 - Zero
              (LABEL) (OPERATOR) (OPERAND)
              Call: [RELSE] RELPAGE V.SMEM
              Output: None
B. Memory Management - Borrowed pages
   1. Get Page
              Input: VPR1 - One
                     VPR2 - Zero
              (LABEL) (OPERATOR) (OPERAND)
              Call: [GET] GETPAGE V.BEM
              Output: VPR1 - Address of page given
   2. Release Page
              Input: VPR1 - (MSB = 0) - Page number of page to be
                                        released.
                     - (MSB = 1) - Page address of page to be
                                   released.
                     VPR2 - One
              (LABEL) (OPERATOR) (OPERAND)
              Call: [RELSE] RELPAGE V.BEM
              Output: None
C. System task for buffer
   1. Get Page
              Input: VPR1 - One
                     VPR2 - Pointer to TE.
              (LABEL) (OPERATOR) (OPERAND)
              Call: [GET] GETPAGE V.TASK
              Output: VPR1 - Address of page given.
   2. Release Page
              Input: VPR1 - (MSB = 0) - Page number of page to be
                                        released.
                     - (MSB = 1) - Page address of page to be
                                   released.
                     VPR2 - One
              (LABEL) (OPERATOR) (OPERAND)
              Call: [RELSE] RELPAGE V.TASK
              Output: None
D. System task for specific page
   1. Get Page
              Input: VPR1 - Page number of page requested
                     VPR2 - Pointer to TE
              (LABEL) (OPERATOR) (OPERAND)
              Call: [GET] GETPAGE V.SPEC
              Output: None
   2. Release Page
              Input: VPR1 - (MSB = 0) - Page number of page to be
                                        released.
                     - (MSB = 1) - Page address of page to be released.
                     VPR2 - One
              Call: (LABEL) (OPERATOR) (OPERAND)
                    [RELSE] RELPAGE V.TASK
              Output: None
E. Task Controller for reserving system task buffers or CP step
   pages.
   1. Reserve Pages
              Input: VPR1 - Number of pages requested to be
                                        reserved.
              (LABEL) (OPERATOR) (OPERAND)
              Call: [RESRV] GETPAGE V.RSRV.
              Output: VPR2 - Number of pages available to be
                             reserved if this request not honored.
   2. Cancel Pages
              Input: VPR2 - Number of pages to be cancelled
                            that were previously reserved.
              (LABEL) (OPERATOR) (OPERAND)
              Call: [CANCEL] RELPAGE V.CNCL
              Output: None
F. System task to allocate CP step page.
   1. Get Pages
              Input: VPR1 - Number of pages previously reserved
                                        to be allocated now.
                     VPR2 - Pointer to step's SE.
              (LABEL) (OPERATOR) (OPERAND)
              Call: [GET] GETPAGE V.LOAD
              Output: VPR1 - Address of first page given (first
                             page will contain table of page
                             numbers of each page given, if more
                             than one page).
                     VPR2 - Number of available pages if request
                            could be honored.
   2. Release Pages
              Input: VPR1 - (MSB = 0) - Page number of first page
                                        to be released.
                     - (MSB = 1) - Page address of first page
                                   to be released.
                     VPR2 - Number of pages to be released.
              (LABEL) (OPERATOR) (OPERAND)
              Call: [RELSE] RELPAGE V.LOAD
              Output: None
```

9. Types of Pages

A. Reserved Page — One reserved by Task Controller for subsequent use by a system task either for loading a CP step or for use as a buffer. No status is set in any PACT entries — the number of pages reserved will be kept in the PACT overhead.

B. System Page — A page given to Memory Management for system task use. The appropriate status will be set in the PACT entry. Pages for system tasks' buffers are not included. Entries in the PACT overhead will have the current count of system pages allocated as well as the maximum amount of pages to be allocated as system pages.

C. Borrowed Page — A system page taken out of the transient area of CM. In the PACT overhead will be a count of the current number of borrowed pages along with the maximum allowable number of borrowed pages. The only component allowed to have a borrowed page will be MM. The decision to increase the value of the maximum amount of borrowed pages will be made by Command Controller.

D. User Page — A page allocated to a CP step previously reserved by Task Controller. The request for a User Page will be made by a system task. The status and owner's ID are put in the PACT entries for each user page. The current number of user pages out and the maximum number of user pages allowed are kept in the PACT overhead. Large buffers used by system tasks will be considered the same status as user's page status. Each buffer page will be taken from the user page area.

Virtual Map of Central Memory

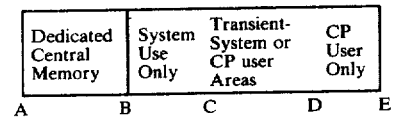

A　B　C　D　E

Dynamic Region Boundaries

| Set Region Boundaries

Region Description
A-B- CM dedicated for system use - never controlled by CM management.
B-C- Maximum system usage controlled by both Page and Memory Management, includes minimum system space retained by Memory Management.
C-D Maximum borrowed space used by Memory Management-transient area.
B-D- Maximum space at any time used by Memory Management for system.
C-E- Maximum space used by CP user and by system tasks as buffers.
D-E- Space used by CP users or by system tasks as buffers.

11. Processing Description Page Management will consist of a preprocessor for each type of call, a page controller for both allocating pages and deallocating pages, a page allocator and a page deallocator. Flow within Page Management will start with a procedure call statement, continue to either page controller, go to the particular preprocessor, and end after executing either page allocator or page deallocator. Page Reserver will be the only preprocessor that ends at the completion of the preprocessor - no pages are allocated or deallocated.

For each type of call the appropriate page controller is entered. The page controllers will lock the PAC Table and save all of the incoming register values. Then each controller will save the current base value and reset the base to point to the PACT overhead area. For the GETPAGE page controller, the number of pages requested is compared to the number of pages currently available. An error return is taken if not enough pages are available even though they may have been previously reserved. Each controller next determines which preprocessor to enter and exits to that preprocessor.

Each preprocessor will check the input parameters against its specific current limits in the PACT overhead and do an error return if necessary. If no errors are found, the specific counts in the PACT are updated and control is either given to page allocator, page deallocator, or returned to the caller.

Page allocator will allocate pages to a user or caller, given there are no errors in the input data and the required number of available pages exist. For a request of one page, the next available page will be delinked from the chain of available pages and its status set. For multiple page requests, the above procedure is followed for each page. In addition, a table is built in the first page allocated containing the page numbers of all pages allocated. The specific format of this table is given below. For multiple pages, the entries in the PAC Table for the pages given are left linked together for easier deallocation.

Displacement

| | | |
|---|---|---|
| Page address of 1st page | 0 | Page number of 1st Page |
| | 1 | Page number of 2nd Page |
| | 2 | Page number of 3rd Page |
| | . | " |
| | . | . |
| | . | . |
| | n | " nth page |
| n + 1 | | −1 (End of Table) |

Page deallocator will add released pages to the available page chain provided there were no errors in previous processing of this call. The status of each page returned is reset to the availability status and linked onto the available chain. For multiple page deallocation the whole set of returned pages are linked as a unit to the available page chain.

The reservation of pages will be handled in a simple manner. A count will be kept of the current amount of pages reserved, but no pages will be allocated. The amount of pages reserved will always be kept equal to or less than the current amount of available pages. Because of the above condition, a count is kept of the number of reserved pages that have been cancelled by Page Management for system use. If Task Controller makes a request for reserving pages, and the count of reserved pages cancelled by Page Management is greater than zero, the request will not be honored. If the request is made for page reservation and the count of reserved pages cancelled by Page Management is equal to zero, then a comparison will be made on the number of available pages. If the sum of the previously reserved page count and the amount requested is greater than the amount of available pages, then the amount of pages available to be reserved is returned and an error exit is executed. If pages can be reserved the amount requested is simply added to the current amount of reserved pages.

The cancellation of previously reserved pages will take into consideration the amount, if any, of reserved pages already cancelled by Page Management. If the number of reserved pages cancelled by Page Management is zero, then the number of pages to be cancelled is compared to the number of previously reserved pages. If the number of previously reserved pages is less than the number of pages to be cancelled, then an error return is executed. For a normal return the number of reserved pages must be greater than or equal to the number of pages to be cancelled. If the number of reserved pages cancelled by Page Management is greater than zero, then it is compared to the number of pages to be cancelled. If the number of pages already cancelled is greater, then the positive difference in the two numbers replaces the old number of already cancelled pages in the PAC Table overhead and a normal exit is executed. If the number of pages to be cancelled is greater, then the positive difference will provide a new number of pages to be cancelled. The new number of pages to be cancelled will be compared to the current number of reserved pages and if less than or equal to that number, a normal return will be taken. If however, the new number of pages to be cancelled is greater than the number of previously reserved pages, an error return will be taken.

The allocation of previously reserved pages will investigate the current status of previously reserved pages before actually allocating the reserved pages. They may have been cancelled by Page Management between the time of reservation and the time of cancellation and thus are no longer available. If the allocation cannot be honored, an error return is executed. The previously reserved pages should then be cancelled. As will all other allocation requests a check is made on the current number of available pages.

If the number of system pages available drops below a set minimum Task Controller will be informed. Task Controller will, if possible, deallocate Central Memory through the deletion of non-resident, non-active system tasks. A specified CR file bit will be used to communicate to Task Controller.

Command Controller will be informed if the number of user pages available falls below a set minimum. Command Controller will then transfer some of the current CP steps from CM to disc, thereby releasing parts of CM. Another CR file bit will be used for this communication.

If Memory Management requests a borrowed page when the maximum has been reached, Command Controller will be asked to enlarge the amount of borrowed pages. Communication will be through a CR file bit.

MEMORY MANAGEMENT

1. Purpose Memory Management, a component of the global Task Controller Services, allocated Central Memory resources to system components. Memory Management is responsible for allocation of all CM below page (4096 words) level. Allocation is done in two formats: CM blocks which are "owned" by the caller's data structure and requested in any size (1 word to 4094 words) required and CM cells which are used in linked lists and are of a power of two words in size.

Each block or cell of memory allocated by Memory Management contains two "overhead" words utilized by Memory Management and Linked List Management for control of the CM resources.

Memory Management facilities are provided by CM resident, serially reusable and reentrant system subroutines, the serially reusable portion being that which performs actual allocation or deallocation of the CM block or cell.

COMPONENTS - MEMORY MANAGEMENT

1. CM Block Allocator - VSSGETM (FIGS. T38, T40, T41, T42)
    1. Purpose This subroutine is called by the GETCM PROC. Some of the code contained in the subroutine is common to both VSSGETM and VSSCGET. The subroutine makes checks for errors in the calling parameters and sets up registers for a call to VSSCMGT which actually gets the block of CM.

Upon return from VSSCMGT, the VSSGETM subroutine places a pointer to the memory acquired in the CPT, JPT, or TPT. The ownership threads are established for the block of CM, and a check is made to determine if initialization is requested. If so, a call is made to VSSINIT to initiate the CM acquired.

Upon return from VSSINIT the user's base is restored and control is returned to the GETCM PROC.
    2. Characteristics The VSS GETM subroutine is CM resident and executes in the caller's VP.
    3. Input
        A. Return Address is VPR0
        B. Size or TPT displacement of size in VPR1
        C. If VPR2 bit 16 is 0, then VPR1=Size, else VPR1=displacement within the given table for Size word
        D. VPR2 bits 17-18 table for linking CM block
            00=CPT
            01=JPT
            10=TPT
        E. VPR2 bit 19=0, no initial value; =1, initial value given in R3.
    4. Output
        A. Address of the block of CM acquired is contained in VPR1.
        B. Address of the block of CM acquired is placed in the table specified and ownership established.
        C. All other VPRs are undefined upon return.
        D. The CM base is unchanged.
    5. Interfaces
        A. VSSCGET subroutine (FIG. T39)
        B. VSSCMGT subroutine
        C. VSSINIT subroutine
        D. TPT, CPT or JPT.
    6. Calling Procedure VSSGETM is called by the GETCM PROC which has the following format:

| | | |
|---|---|---|
| [Label] GETCM <size>, <table>, <displacement> [,<initial value>] | | |
| where | | |
| Size: | Size must be the actual amount of memory needed, not $2^n-2$, and may be written in one of two ways:<br>a) Size may be the actual size needed; in this case it must be enclosed in parentheses; or<br>b) Size may be the displacement of a CM location in the TPT which contains the size and must not be enclosed in parentheses. | |
| Table: | Table will be the table in which the address is placed. This must be JPT, CPT, or TPT. | |
| Displacement: | Displacement is the displacement within the table at which the address will be placed. | |
| Initial Value: | Initial Value is an option with the GETCM PROC and may or may not be used. If the option is used, the memory acquired will contain the value of this parameter. The acceptable range for this initial value is from 0 to #FFFFFFFF. | |

2. Controller CM Allocator CSSCGET (FIG. T39)
    1. Purpose The VSSCGET subroutine is used by controllers (Master Controller, Command Controller, Task Controller and D10) to acquire memory. If differs from VSSGETM in that no "ownership" is attached to the block. Instead, a count is kept in the TPT overhead of how many blocks of memory are acquired by a particular controller. When the controller releases a block of memory, the count is decremented.
    2. Characteristics The VSSCGET subroutine is CM resident and executes in the caller's VP.
    3. Input
        A. Size of the block requested is in VPR1.
        B. Return address is VPR0.
    4. Output
        A. Address of the block of CM acquired is contained in VPR2.
        B. Cell count in TPT overhead is incremented.
        C. All other VPRs are undefined.

D. The CM base is unchanged.
5. Interfaces
   A. VSSGETM
   B. VSSNUCL
   C. VSSCMGT
   D. Overhead portion of TPT (cell count).
6. Description The VSSCGET subroutine saves the user's base and resets the base to the TPT overhead. A check is made to see if the size request is an error (if so, subroutine will ABEND). The subroutine then branches to the common code for VSSCGET and VSSGETM (see description of VSSGETM for details).

3. Cell Allocator - VSSNUCL (FIG. T44)
   1. Purpose The VSSNUCL subroutine is called by the NUCELL PROC. A cell of memory will be acquired. Rather than establish "ownership" of the cell, a count will be kept in the TPT overhead to determine how many cells the task acquires.
   2. Characteristics The CSSNUCL subroutine is a CM resident routine which executes in the caller's VP.
   3. Input
      A. Return address in VPR0.
      B. If VPR2R is negative, then VPR1=TPT displacement of size; or VPR1=size.
   4. Output
      A. Address of the cell in VPR2.
      B. Cell count in TPT incremented by 1.
      C. The other VPRs are undefined.
      D. The CM Base is unchanged.
   5. Interfaces
      A. VSSCMGT.
      B. CSSCGET.
   6. Calling Procedure The VSSNUCL subroutine is called by the NUCELL PROC with the following format: NUCELL <size> Size may be specified in one of two ways:
      A. Size may be the actual size needed, which must be a power of two, in which case it must be enclosed in parentheses.
      B. Size may be the symbolic name of a CM location in the TPT which contains the size and must not be enclosed in parentheses. Example 1 - NUCELL (8)

Description: The address of the first word of an eight-word cell will be returned in R2.

7. Description Upon entry into the VSSGETM subroutine, the user's base, return address, and initial value (if any) are saved in the TPT save area. The registers are then set up for the code common to VSSGETM and VSSCGET. Common Code for VSSGETM and VSSCGET: A check is made to ensure that the size requested is not too large (GT 4094) or too small (zero). The size is then converted to a power of two sizes and a call is made to VSSCMGT to fetch the block of memory.

Upon return from VSSCMGT, the CM base is set to the TPT overhead. A code flag is checked to see if the call came from VSSCGET. If the call was a controller's call, a branch is taken into the VSSNUCL subroutine for further processing (see description of VSSNUCL for details).

If the call originated in VSSGETM, a test of the table code bits is made to determine which table the address will be placed in. If the table specified was the TPT, the two overhead words in the CM block are used to link the block to the TPT ownership thread in the overhead portion of the TPT. The pointer to the CM block is then incremented to point to the user's area of the block and stored in the TPT.

If the table specified was not the TPT, the contents of the word in the table to receive the pointer is checked. If the word is empty (zero), the pointer to the CM block is incremented to point to the user's area and then stored in the table. If the word is not empty, a test is made to see if the table specified was the JPT. If so, the subroutine will ABEND as stacked blocks are not allowed in the JPT. If the table specified was the CPT, it is assumed that the contents of the word to receive the pointer to the CM block is a pointer to another CM block that was previously gotten. The subroutine will then "push" the first block down and link the new block to the table. Once the block has been linked to a table, the return address is picked up from the TPT save area as well as the initial value if initialization is required. The user's CM base is restored and a test for initialization is made. If no initialization is required, the return address is incremented by 1 and return is made to the caller. If initialization is required, a branch is made to VSSINIT with the return address to the caller inserted in R0. In every case, the sign bit (bit 0) in the 32 bit word containing the address of the block of CM required is set to one. This bit is interrogated by deallocation routines to distinguish between addresses of blocks of CM and linked list headers.

4. Internal Memory Allocator - VSSCMGT (FIGS. T45, T46, T47)
   1. Purpose CMGT is an internal subroutine which searches the Memory Assignment Control Table (MACT) for an available block of memory. If no block of the requested size is found on the first try, VSSCMGT will search the table until it finds a block, then break the block into the requested sizes.
   CMGT is called by VSSGETM (GETM call), VSSCGET (controller's call), and VSSNUCL (NUCELL call).
   2. Input
      A. Return address in VPR0.
      B. Block size as exponent of two in VPR1.
   3. Output Address of CM block in VPR2.
   4. Interfaces
      A. VSSGETM subroutine.
      B. VSSCGET subroutine.
      C. VSSNUCL subroutine.
      D. Memory Assignment Control Table.
   5. Description Upon entry into CMGT, the address of the MACT table is gotten from the System Vector Table. The exponent of two size is multiplied by four and used to index into the MACT to the appropriate four word header for the size requested. The CM base is set to this entry (to facilitate manipulation of the table), and the MACT is locked out to prevent changes while the subroutine is executing.

The return address to the caller is saved in the Memory Management absolute save area in the Vector Table. An index is also set up to enable the subroutine to go from header to header within the MACT.

The subroutine picks up the available count in the header and checks to see if any blocks are available. If no blocks of CM are available, the index is incremented by 4 and the next larger header is accessed.

Once an available block is found, a check is made to see if the end of the MACT was reached. (NOTE: the last entry in the MACT shows a negative available block count to signify the end of the table.) If the end of the table is reached (i.e., no CM available) a request is made to Page Allocator for an additional page of memory.

Once a block of memory is found, the available count for that size is decremented. The out count for the requested size is incremented, and the block of memory is delinked from the MACT. The requested size is placed in the size field of the block delinked, and the block is marked as unavailable for allocation (tag bit turned on).

A check now is made to see if the correct size was found on the first try (i.e., index=0). If not, the index is decremented by 4, and the address of the delinked block is saved in the Memory Management Vector Table save area.

The buddy of the delinked block then is found by computing the "inclusive OR" of the address with the mask contained in the MACT header. The new size is placed in the buddy's size field, and the available count is incremented as the buddy is linked to the MACT.

The address of the cell to be returned is picked up from the Vector Table and a check made to see if the breakdown is complete (i.e., index=0).

Note: the address stored in the Vector Table may be a block larger than the size requested, but as the cell is broken down, its buddy(s) is/are linked to the table until, eventually, the block is of the requested size.

Once the breakdown is complete, or if the requested size was found on the first try, the return address is picked up from the Vector Table and the MACT is freed. Control then is returned to the calling routine.

5. CM Block/Cell Deallocator - VSSRELM/VSSRLCL/VSSRLAR (FIGS. T48, T49, T50, T51)

1. Purpose The system subroutine VSSRELM/VSSRLCL/VSSRLAR is provided to release Central Memory blocks or cells acquired by calls to VSSGETM, VSSCGET, or VSSNUCL. VSSRELM accepts a pointer to the user area of the block being returned. VSSRLCL accepts a pointer to the head of the cell being returned. VSSRLAR searches the CPT for the argument table and then enters VSSRELM code for processing. The returned block/cell is checked for validity and returned to the Memory Assignment Control Table. See also FIGS. T52 and T53.
  2. Characteristics The subroutine is CM resident and is coded reentrant with the exception of the segment which manipulates the Memory Assignment Control Table. This segment of code is serially reusable and is locked-out from reentrant use by a CR protect bit. The subroutine is executed in the caller's VP.
  3. Input
     A. For VSSRELM Calls: VSSRELM is called by the RELCM procedure which provides the inputs from the procedure parameters. Error return address is RO. Since error conditions are undefined, normal return is made via (RO)+1. R2R contains a table code and displacement. The three right most hex characters are a displacement into the given table of where the pointer to the CM block is located. The left-hex in R2R is defined as binary:
       0000=CPT,
       0010=JPT, or
       0100=TPT.
     B. For VSSRLCL Calls: Error return address in RO. Since error conditions are undefined, normal return is made via (RO)+1. R2 contains a pointer to the head of the cell being returned.
     C. For VSSRLAR Calls: Error return address in RO, normal return made via (RO)+1.
  4. Output The returned CM is linked onto the Memory Assignment control Table at the appropriate location. For returned cells, the cell count in the TPT overhead of the calling task is decremented by one. For returned blocks, the pointer to the CM block is altered, depending on the table it was contained in, as follows:
       JPT — pointer is zeroed.
       CPT — pointer is zeroed if not singly linked, is replaced by the next CM pointer if singly linked.
       TPT — pointer is zeroed. In addition, the TPT ownership threads in the TPT overhead are altered to indicate the fact that the block has been delinked. For returned cells, the cell count in the TPT overhead is decremented.
  5. Interfaces. Entry into VSSRELM, VSSRLCL, and VSSRLAR is made via Vector Table. Return is made via the return address in RO plus one. The Memory Assignment Control Table is accessed via the System Vector table.
  6. Components. None.
  7. Calling Procedures. CM blocks are returned to Memory Management by use of the RELCM PROC. The format is as follows:

[label] RELCM <Table>
[,<Displacement>[,<error>]]

The content of the registers upon successful completion of the proc is undefined.

| 1. Table: | Table must be the table which contains the address of the block of memory. This must be JPT, CPT, TPT, or the symbol ARG which implies the argument table is to be released. |
|---|---|
| 2. Displacement: | Displacement is the displacement in the table at which the address is located. (This parameter is not applicable for the RELCM ARG call.) |
| Examples : | RELCM TPT, 5<br>RELCM JPT, 10<br>RELCM ARG<br>CM cells are returned to Memory Management by the RCELL PROC in the following format:<br>RCELL [ ERROR ]<br>The RCELL PROC will return a cell to the list of available cells. The PROC should be called with R2 containing the address of the cell to be returned. |

8. Description. The description will be divided into three areas: CM block processing, CM cell processing, and block and cell common processing.
     Entry into VSSRELM is made to return to CM block to the available CM. The table code is evaluated and the CM block pointer is fetched. The block's first two words are checked for valid tag and size fields, and the block's address is checked for boundary alignment appropriate for its size. If these tests are satisfied, one of the three following procedures is taken:
     A. For JPT pointers — the pointer is zeroed.

B. For CPT pointers — the block is tested for a singly linked block pointer. If one is found, it replaces this block's pointer in the CPT; if one is found, the CPT cell is zeroed.

C. For TPT pointers — the pointer is zeroed and the block is delinked from the TPT ownership threads.

Entry into VSSRLAR is made to return an argument list to the available CM. All argument lists are CPT owned CM blocks, and VSSRLAR accesses the CPT overhead to determine where in the CPT the argument pointer is located. Once this is done, control is passed into VSSRELM for CPT Pointers as described above.

Entry into VSSRLCL is made to return a CM cell to the available CM. The cell's tag and size fields are validated, as is its address. If valid, the cell count in the TPT overhead of the caller is decremented.

Once the CM block/cell has been validated, common VSSRELM/VSSRLCL code returns it to the MACT as follows:

A. The CM base is set to point to the appropriate entry in the MACT dependent on the size of the returned block/cell.

B. The MACT is tested for availability and locked when accessed.

C. The "out" count in the MACT is decremented, and the available count is compared against the maximum. If the available is less than the maximum, the block/cell returned is linked onto the MACT at this point, the available count incremented, the MACT freed, and normal return made.

D. If the available count equals or exceeds the maximum for the size block/cell returned, the block/cell is coalesced, if possible, until a page is reached, a buddy is unavailable, or available count is less than the maximum in a step of the coalescing sequence.

E. Coalescing two blocks of CM takes the following form:
 1. The address of the buddy block is determined, using the half-word buddy mask in the MACT for each size block.
 2. The buddy is checked for availability. If unavailable, the original block is linked to the MACT at the appropriate size entry and normal return is made.
 3. If the buddy is available, it is delinked from the MACT. The address of the head of the resulting block is determined and becomes the original address for repetition of the above sequence of steps.

6. VSSCBTC — CONVERT BLOCK TO CELL (FIGS. T54, T55, T56)

1. Purpose. The VSSCBTC subroutine will convert CM from block format to cell format. The block is removed from the system table specified and a cell pointer returned to the caller with the cell count in the TPT overhead incremented.

2. Characteristics. VSSBTC is a fully re-entrant system subroutine which executes in the caller's VP.

3. Input. R0 contains the error return address. R1 contains the block format table code and displacement as follows:
 A. R1L — undefined
 R1 bits 16 and 17 — table code
  00 = CPT
  01 = JPT
  10 = TPT
 R1 bits 18 and 19 — undefined, and
 R1 bits 20 through 31 — displacement in the given table of the block pointer.
 B. R1 = 0, argument list to be converted.

4. Outputs. R2 contains the address of the cell returned and the cell count in the TPT overhead is incremented by one.

5. Interfaces. Entry into VSSCBTC is made via the System Vector Table, return is via (R0) for errors, (R0) + 1 for normal exit.

6. Components. None.

7. Description. The VSSCBTC subroutine is entered with a system table code and displacement of a pointer to a CM block. The block is removed from the table and any applicable ownership threads, the table pointer being set to either zero or, in the case of a singly linked CPT structure, the pointer to the next block. The block pointer is moved to the block overhead, the cell count in the user's TPT is incremented, and return is made via (R0) + 1.

Error return, via (R0), is taken if the original table word was not a CM block pointer or if an invalid displacement is given.

7. VSSCCTB CONVERT CELL TO BLOCK

1. Purpose. The VSSCCTB subroutine will convert CM in cell format (NUCELL) to CM in block format (GETCM). In converting, the cell count will be decremented a block ownership will be established as per the owning table's requirements.

2. Characteristics. The VSSCCTB subroutine is fully re-entrant and executes in the caller's CP.

3. Input.
 R0 — error return address. (Normal return is via (R0) + 1).
 R1 — CM block format table codes and displacement as follows:
  R1L — undefined
  R1, bits 16 and 17,
   = 00 CPT
   = 01 JPT
   = 10 TPT
  R1, bits 18 and 19, undefined, and
  R1, bits 20 through 31, displacement into given table of where block address is to be placed.
 R2 — address of cell to be re-formatted.

4. Output. The CM cell will be re-formatted to that of a CM block. The cell count in the TPT overhead will be decremented and ownership will be established as required for the table specified. The address of the first user word of the block will be placed in the table specified and returned in R2.

5. Interfaces. Entry is made into VSSCCTB via the System Vector Table. Error return is made via (R0), normal return via (R0) + 1.

6. Components. None.

7. Description. VSSCCTB is entered with a cell address in VPR2 and ownership table code is displacement in VPR1. The table code and displacement is validated, an error return taken for an invalid table cell count in the TPT overhead is decremented and the cell address is placed in the appropriate table. For a TPT block, ownership threads are established, for a CPT block, single linkage is built if required. Normal return is made via (R0) + 1.

8. Central Memory Initialization — VSSINIT

1. Purpose. VSSINIT is a system subroutine which initializes a block of up to 32,767 words of Central Memory to a given value.
2. Characteristics.
    A. VSSINIT is a fully re-entrant system subroutine which executes in the caller's VP.
    B. VSSINIT resides in ROM.
3. Inputs.
    A. Error return address in R0, normal return at (R0) + 1.
    B. Address of first word of CM to be initialized in R1.
    C. Number of CM words to be initialized in R2.
    D. Initial value to be stored in CM contained in R3.
4. Outputs.
    A. CM block initialized
    B. Address of first word of CM retained in R1.
    C. Initial value retained in R3.
5. Interfaces.
    A. Entry is made via System Vector Table.
    B. Error exit is made via return address in R0.
    C. Normal exit is made via return address in R0 plus one.
6. Components. None.
7. Description.
    A. Number of words must be greater than zero and less than 32,768. Error return is taken if count is outside this range.
    B. Indexed pointer is developed to address of first CM word less one.
    C. Initial value is stored via this indirect, indexed pointer. Index is decremented from count to one.
    D. Address to first word of CM block is restored without index.
    E. Return pointer is incremented by one and return is made.

RESOURCE LOCK-OUT FACILITIES — GENERAL INTERNALS

To prevent one VP from changing a list or queue or using a system resource at the same time another VP is accessing that same list, queue or resource, CR bits and CM bits are dedicated to certain resources as lock bits. CR bits are dedicated to high priority queues and resources in which a fast lock out facility is necessary. When the time and code are not so critical, a CM bit is assigned. When a task, controller or routine needs exclusive use of a resource at a certain time, it sets the appropriate bits for that resource to a predefined value. Other users, checking these bits before using the resource, will detect that the resource is in use and will wait for it to be freed so that it can be locked, or will process other code, returning later.

To set a CM bit, the CM word containing this bit must be locked by a CR bit. Then the CM bit can be set and the CM word released. This prevents different VPs from setting a CM bit at the same time.

LOCK/FREE — VSSLOCK/VSSFREE FIGS. T57-59

1. Purpose. The System subroutine VSSLOCK/VSSFREE provides a method of locking and freeing a specified resource by the use of either a CR bit or a CM bit(s). The primary usage of Lock and Free will be in the area of queue lock-outs.

2. Characteristics. VSSLOCK/VSSFREE is coded in fully reentrant code but is not executed as a fully reentrant routine. Segments of code are locked out from reentrant access by CR protect bits and therefore become serially reusable. VSSLOCK/VSSFREE is CM resident and executes in the caller's VP.
3. Inputs. Immediate return address in R0. This return is taken if the resource is unavailable and immediate return is requested. Normal return is to (R0) + 1. Resource ID in R3R. Return code in R3B0.
    A. R3B0=0, wait for resource.
    B. R3B0≠0, immediate return if resource is not immediately available.
4. Outputs. Resource's Lock-out bit(s) set or reset as per request, if resource was available or wait requested. Return to (R0) + 1. Immediate return to (R0), if resource unavailable and return requested.
5. Interfaces.
    A. Entry is made via System Vector Table.
    B. Immediate return Lock exit is made via return address in R0.
    C. Normal exit is made via return address in R0 + 1.
    D. Resource ID table accessed via a System Vector Table pointer. The resource ID table is comprised of single word entries, one entry per resource. Each resource is assigned a resource ID which is a number centered about #200. Queue resources are assigned IDs of #200 and up; non-queue resources are assigned IDs of #1FF and down. The Vector table pointer to the resource ID table points to the Resource=#200 entry. The resource ID table entry is as follows:

| bits | 0 | 1 | 15 | 16 | 31 |
|------|---|---|----|----|----|
|      | F | L |    | R  |    |

Entries in the resource ID table word consist of:
(1) All zero. If the fullword is zero, the resource is not protected.
(2) F field, bit zero, equals 1. If bit zero equals 1, the resource is protected by a CR bit. The CR byte address is contained in the L field, bits 1–15 of the RID table entry, and the bit number within the CR byte is given in the R field, bits 16–31.
(3) F Field, bit zero, equals zero. If bit zero equals zero, the resource is protected by a CM bit or bits in the Resource Lock-out Table, or is an undefined resource. If the R field is non-zero, the L field is an index into the Resource Lock-out Table to the doubleword entry containing the CM Lock-out bit(s), whereas the R field contains a mask indicating the position of the CM Lock-out bit(s) in the Resource Lock-out Table halfword containing the Lock-out bits. If the R field is zero, (and the L field is non-zero, i.e., the fullword is not zero), the resource is not defined and any access to this resource will cause and ABEND within the system.
E. Resource Lock-out Table accessed via a System Vector Table pointer. The Resource Lock out Table consists of two basic sections: the execute tables and the Lock-out table itself.
(1) The Lock-out Execute tables are comprised of three tables which manipulate CR bits via EXEC instructions. Each table consists of eight instructions, each instruction dealing with one of the eight bits in the CR byte. The CR byte address is placed in the index register X3L prior to executing the EXEC instruction. The bit number to be dealt with is used as an index into the particular table desired. The three tables are:
(a) Skip and set if zero.
(b) Skip and reset if one.
(c) And skip on one.

(2) The Resource Lock-out Table is comprised of doubleword entries of the following form:

|  | word | 1 | word | 2 |
|---|---|---|---|---|
| entry 1 | not | lock | protect | protect |
| entry 2 | used | out | CR | CR |
| '' | '' | bits | hex | bit |
| etc. | '' |  | address |  |

The Resource Lock-out Table doubleword entry consists of:
(a) First halfword not used.
(b) Second halfword contains 16 CM Resource Lock-out bits, each bit assigned to a resource or unassigned where a 1 indicates the resource is unavailable and 0 indicates the resource is available.
(c) Third halfword contains the hexidecimal address of a CR byte in which a CR bit will be used to lock-out the CM resource bits in the second halfword entry during manipulation by this routine.
(d) Fourth halfword contains the bit number for the CR byte given in the third halfword. The Resource Lock-out Table presently consists of eight doubleword entries containing 128 CM Lock-out bits and is expandable.
F. Resource ID limits halfwords in the System Vector Table. These halfwords, combined in one word, are used to validate the upper and lower limits on the resource IDs input to the Lock/Free routines.

6. Components. None.
7. Calling Procedures. The VSSLOCK subroutine is called by the LOCK PROC with the following format:

L$\phi$CK resource ID [, return 1 ]
where:
   resource ID     is 1. a list or queue ID specified by its vector table list header address in VLH. notation, or 2. a non-list of non-queue ID which is to be defined as need arises and which will take on an RID. notation.
   return 1     is an optical return point within the current control section to which control will be returned if the specified resource is not available to be locked out. If this second parameter is omitted, the L$\phi$CK routine will execute a loop of code waiting for the specified resource to become available, Then lock it.

The VSSFREE subroutine is called by the FREE PROC with the following format:
FREE resource ID [, error ]
where
   resource ID     is 1. a list or queue ID specified by its vector table list header address in VLH. notation, or 2. a non-list or non-queue ID which is to be defined as need arised and which will take on an RID. notation.

8. Description.
A. VSSLOCK/VSSFREE is entered containing a resource ID in R3R and, for VSSLOCK, a return code in R3B0. VSSLOCK entry causes R3B0 to be left zero if zero on entry, set to #7 if non-zero. Thus R3B0= +, Lock entry; R3B0=0, immediate return on resource not available. VSSFREE entry causes R3B0 to be set #80, minus.

B. Resource ID limit values are fetched from the vector table and are used to validate the given resource ID. Values below the minimum ID or above the maximum cause an error branch within the subroutine.

C. Central Memory base is set to the Resource Lock-out table so the base-relative EXEC instruction can be executed on the execute tables.

D. The Resource ID table entry indicating CR protection, the following procedure is followed:
(1) Lock/Free code is tested.
(2) For Free resource the skip-on-one-and-reset table is executed for the given CR, and, if successful, a normal return is made to (R0) + 1. If not successful, an error branch is taken.
(3) For Lock resource the skip-on-zero-and-set table is executed. If successful, normal return is made to (R0) + 1. If unsuccessful, the return code is tested. If an immediate return is requested, return is made to (R0); if not, this procedure is repeated until the skip-on-zero-and-set instruction is successful.

F. For a Resource ID table entry indicating CM protection, the following procedure is followed:
(1) CM base is altered by the displacement into the Resource ID table of the current Resource Lock-out table entry. Execute table indexes are correspondingly altered. The CR protection byte and bit values are fetched for the CM Lock-out table entry.
(2) The skip-on-zero-and-set execute table is executed for the CR protection bit; unsuccessful execution causes looping until the instruction is successfully executed.
(3) The CM Lock-out bits are fetched and masked with the resource's mask.
(4) For a Free request all CM bits are reset for this resource if all CM bits for the resource were set. If all bits were not set, an error branch is taken. After all bits are reset, the CR protection bit is reset and normal return is made.
(5) For a Lock request the resource is tested for availability. If available, the CM bits are set, the CR bit is reset, and a normal return is made. If the resource is not available, the CR bit is reset. If an immediate return is requested, it is taken here. If not, the CR protection bit is polled for activity, and, when found, the above process is repeated until successful.

What is claimed is:
1. In a stored program computer comprising a plurality of data processors, a common control system comprising:
(a) a master controller, operatively connected and responsive to said plurality of data processors, and a plurality of subcontrollers wherein each of said master controller and subcontrollers has a specific function and responsibility for a plurality of said processors and wherein each of said master controller and subcontrollers is autonomous with respect to its function and responsibility; and
(b) memory register means for interconnecting said master controller and subcontrollers in a fixed hierarchy of control, said master controller being bilat- erally connected to at least one of said subcontrollers through said memory register means, said subcontrollers being bilaterally connected to at least the next least and next most significant subcontrollers in said hierarchy through said memory register means.

2. The common control system according to claim 1 wherein each controller includes:
   (a) means for setting bits in the memory register means connecting it to a next lower controller in said hierarchy for the transfer of data, instructions and/or control signals wherein the status of such memory register means causes the next lower controller in the hierarchy to perform its function in a manner specified by the setting;
   (b) means for setting bits in the memory register means connecting it to a next higher controller in said hierarchy into a status indicating to such higher controller that its function has been completed; and
   (c) polling means for repeatedly testing the status of said memory register means.

3. The common control system according to claim 1 including communication register means connecting at least one of said controllers with at least one of said processors and/or input/output devices for communicating control signals between said at least one controller and such processors and/or input/output devices wherein each of such processors and/or input/output devices includes means for setting bits in said communication register means and wherein the polling means of said at least one controller also tests the status of said communication register means.

4. The common control system according to claim 1 wherein the function of each of said controllers includes scheduling priorities within its specified responsibility for a plurality of said processors.

5. The common control system according to claim 4 wherein the scheduled priorities are communicated to the next lower controller in the hierarchy by means of the register memory means and wherein the memory register means includes a plurality of registers which are linked in a manner determined by said scheduled priorities.

6. The common control system according to claim 1 wherein the master controller is the highest controller in the hierarchy and it allocates work among the processors and communicates this allocation to the processors by means of the communication register means.

7. The common control system according to claim 1 wherein the second highest controller in said hierarchy is a command controller which places sets of instruction groups into a waiting queue which is communicated to the third highest controller in said hierarchy by means of said register memory means.

8. The common control system according to claim 7 wherein the command controller includes means for allocating memory locations of the central memory upon request.

9. The common control system according to claim 7 wherein the third controller is a task controller which executes the queue constructed by the command controller and wherein the task controller includes means for breaking down said queues into tasks.

10. The common control system according to claim 9 wherein the task controller breaks down the tasks in such a manner that the tasks have a predetermined memory space limit and execution time limit.

11. The common control system according to claim 9 wherein the task controller also includes means for controlling the transfer of data between the central memory and at least one additional memory device.

12. The common control system according to claim 9 wherein the task controller also includes means for monitoring the flow of tasks through the computer.

13. The common control system according to claim 1 wherein the fourth controller in the hierarchy is a disc controller which controls the data channel connected to the discs.

14. The common control system according to claim 13 wherein the disc controller contains means for rearranging requests for use of the data channel connected to the discs.

15. The common control system according to claim 1 wherein the controllers are stored program controllers.

16. In a stored program computer comprising a plurality of data processors, a common control system comprised of:
   (a) a master controller, operatively connected and responsive to said plurality of data processors, and a plurality of subcontrollers wherein each of said master controller and subcontrollers has a specific function and responsibility for a plurality of said processors and wherein each of said master controller and subcontrollers is autonomous with respect to this function and responsibility;
   (b) memory register means for interconnecting said master controller and subcontrollers in a fixed hierarchy of control, said master controller being bilaterally connected to at least one of said subcontrollers through said memory register means, said subcontrollers being bilaterally connected to at least the next least and next most significant subcontrollers in said hierarchy through said memory register means;
   (c) communication register means operatively connected and responsive to said plurality of processors having a plurality of settable bit positions; and
   (d) a plurality of input/output devices each including means for setting attention bits in said communication register means to request servicing by one of said plurality of processors wherein at least one of said master controller and subcontrollers schedules processing of data received from one of said input/output devices in a selected one of said processors according to the status of the attention bits set in the communication register and wherein the polling means of said at least one master controller and subcontrollers also tests the status of said communication register means.

17. The common control system according to claim 16 wherein said communication register means includes predetermined availability bits which are set when a processor has reached a break in its processing and wherein the polling means of said at least one controller also tests said availability bits.

18. The common control system according to claim 16 wherein at least some of said processors are virtual processors which time share an essential part necessary for the functioning of the processors.

19. The common control system according to claim 18 wherein some of said virtual processors function as controllers.

20. The common control system according to claim 19 wherein the virtual processors functioning as subcontrollers are selected by a virtual processor functioning as a master controller.

21. A stored program computer having a plurality of data processors and a central memory coupled to each of said plurality of processors comprising:
   (a) a common control system for controlling said plurality of data processors;
   (b) a plurality of peripheral devices including input/output devices;
   (c) a communication register means having a plurality of memory registers with each memory register having a plurality of individually settable bit positions, at least some of said bit positions designated as attention bits being settable by said input/output devices and at least some of said bit positions being designated availability bits being settable by said plurality of processors;
   (d) means in said control system for polling said bit positions within said communication register means; and
   (e) means in said control system for scheduling processing of data from said peripheral devices in dependence upon the status of the bit positions designated the attention bits in said communication register means, said processing routed in selected processors by said control system in dependence upon the status of the bit positions designated the availability bits in said communication register means.

22. The system according to claim 21 wherein the peripheral devices set predetermined bit positions designated as attention bits to process data from such peripheral devices by one of said processors.

23. The system according to claim 21 wherein said processors set predetermined bit positions designated as said availability bits when such processors reach a logical break in their processing, thereby indicating to the control system that such processors are available for further assignment of processing.

* * * * *